US012045923B2

(12) United States Patent
Barlier et al.

(10) Patent No.: US 12,045,923 B2
(45) Date of Patent: Jul. 23, 2024

(54) EMOJI RECORDING AND SENDING

(71) Applicant: Apple Inc., Cupertino, CA (US)

(72) Inventors: Guillaume Pierre André Barlier, Sunnyvale, CA (US); Aurelio Guzman, San Jose, CA (US); Nicolas Scapel, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/071,434

(22) Filed: Nov. 29, 2022

(65) Prior Publication Data

US 2023/0090342 A1 Mar. 23, 2023

Related U.S. Application Data

(63) Continuation of application No. 17/220,752, filed on Apr. 1, 2021, now Pat. No. 11,532,112, which is a (Continued)

(51) Int. Cl.
*G06T 13/40* (2011.01)
*G06F 3/01* (2006.01)
(Continued)

(52) U.S. Cl.
CPC .............. *G06T 13/40* (2013.01); *G06F 3/012* (2013.01); *G06F 3/0484* (2013.01); *G06F 3/04842* (2013.01); *G06V 40/166* (2022.01); *G06V 40/176* (2022.01); *H04M 1/72436* (2021.01); *G06F 3/04886* (2013.01); *G06V 40/161* (2022.01); *H04L 51/04* (2013.01);
(Continued)

(58) Field of Classification Search
CPC ...... G06T 13/40; H04N 23/63; H04N 23/611; G06V 40/161; G06V 40/166; G06V 40/174; G06V 40/176
See application file for complete search history.

(56) References Cited

U.S. PATENT DOCUMENTS

| | | | |
|---|---|---|---|
| 5,559,947 | A | 9/1996 | Wugofski |
| 5,995,119 | A | 11/1999 | Cosatto et al. |

(Continued)

FOREIGN PATENT DOCUMENTS

| | | | |
|---|---|---|---|
| CN | 1581901 | A | 2/2005 |
| CN | 101055646 | A | 10/2007 |

(Continued)

OTHER PUBLICATIONS

Advisory Action received for U.S. Appl. No. 16/583,706, dated Mar. 21, 2022, 3 pages.

(Continued)

*Primary Examiner* — King Y Poon
*Assistant Examiner* — Vincent Peren
(74) *Attorney, Agent, or Firm* — DLA Piper LLP (US)

(57) ABSTRACT

The present disclosure generally relates to generating and modifying virtual avatars. An electronic device having a camera and a display apparatus displays a virtual avatar that changes appearance in response to changes in a face in a field of view of the camera. In response to detecting changes in one or more physical features of the face in the field of view of the camera, the electronic device modifies one or more features of the virtual avatar.

36 Claims, 114 Drawing Sheets

Related U.S. Application Data continuation of application No. 16/896,457, filed on Jun. 9, 2020, now Pat. No. 10,997,768, which is a continuation of application No. 16/676,087, filed on Nov. 6, 2019, now Pat. No. 10,846,905, which is a continuation of application No. 15/981,754, filed on May 16, 2018, now Pat. No. 10,521,948.

(60) Provisional application No. 62/671,979, filed on May 15, 2018, provisional application No. 62/557,121, filed on Sep. 11, 2017, provisional application No. 62/556,412, filed on Sep. 9, 2017, provisional application No. 62/507,177, filed on May 16, 2017.

(51) Int. Cl.

| | |
|---|---|
| ***G06F 3/0484*** | (2022.01) |
| ***G06F 3/04842*** | (2022.01) |
| ***G06V 40/16*** | (2022.01) |
| ***H04M 1/72436*** | (2021.01) |
| ***H04N 23/611*** | (2023.01) |
| *G06F 3/04886* | (2022.01) |
| *H04L 51/04* | (2022.01) |
| *H04M 1/72439* | (2021.01) |
| *H04N 23/63* | (2023.01) |

(52) U.S. Cl.

CPC .... *H04M 1/72439* (2021.01); *H04M 2250/52* (2013.01); *H04N 23/611* (2023.01); *H04N 23/63* (2023.01)

(56) References Cited

U.S. PATENT DOCUMENTS

| | | | |
|---|---|---|---|
| 6,088,040 | A | 7/2000 | Oda et al. |
| 6,173,402 | B1 | 1/2001 | Chapman |
| 6,323,846 | B1 | 11/2001 | Westerman et al. |
| 6,545,682 | B1 | 4/2003 | Ventrella et al. |
| 6,570,557 | B1 | 5/2003 | Westerman et al. |
| 6,919,892 | B1 | 7/2005 | Cheiky et al. |
| 7,027,054 | B1 | 4/2006 | Cheiky et al. |
| 7,046,838 | B1 | 5/2006 | Sakagawa et al. |
| 7,180,524 | B1 | 2/2007 | Axelrod |
| 7,227,976 | B1 | 6/2007 | Jung et al. |
| 7,657,849 | B2 | 2/2010 | Chaudhri et al. |
| 7,908,554 | B1 | 3/2011 | Blattner |
| 8,130,219 | B2 | 3/2012 | Fleury et al. |
| 8,131,848 | B1 | 3/2012 | Denise |
| 8,169,438 | B1 | 5/2012 | Baraff et al. |
| 8,254,647 | B1 | 8/2012 | Nechyba et al. |
| 8,488,040 | B2 | 7/2013 | Chen et al. |
| 8,601,379 | B2 | 12/2013 | Marks et al. |
| 8,867,849 | B1 | 10/2014 | Kirkham et al. |
| 8,949,618 | B1 | 2/2015 | Lee et al. |
| 8,988,490 | B2 | 3/2015 | Fujii |
| 9,104,908 | B1 | 8/2015 | Rogers et al. |
| 9,170,645 | B2 | 10/2015 | Park et al. |
| 9,269,196 | B1 | 2/2016 | Fan et al. |
| 9,298,257 | B2 | 3/2016 | Hwang et al. |
| 9,451,210 | B1 | 9/2016 | Smus |
| 9,576,400 | B2 | 2/2017 | Van Os et al. |
| 9,639,974 | B2 | 5/2017 | Smith et al. |
| 9,747,716 | B1 | 8/2017 | Mallet et al. |
| 9,786,084 | B1 | 10/2017 | Bhat et al. |
| 9,913,246 | B1 | 3/2018 | Carey et al. |
| 9,949,697 | B2 | 4/2018 | Iscoe et al. |
| 10,155,168 | B2 | 12/2018 | Blackstock et al. |
| 10,169,897 | B1 | 1/2019 | Geiger et al. |
| 10,171,985 | B1 | 1/2019 | Czajka et al. |
| 10,237,276 | B2 | 3/2019 | Gupta |
| 10,262,327 | B1 | 4/2019 | Hardebeck et al. |
| 10,325,416 | B1 | 6/2019 | Scapel et al. |
| 10,325,417 | B1 | 6/2019 | Scapel et al. |
| 10,376,153 | B2 | 8/2019 | Tzvieli et al. |
| 10,397,391 | B1 | 8/2019 | Czajka et al. |
| 10,410,434 | B1 | 9/2019 | Scapel et al. |
| 10,580,221 | B2 | 3/2020 | Scapel et al. |
| 10,607,065 | B2 | 3/2020 | Milman et al. |
| 10,607,419 | B2 | 3/2020 | Os et al. |
| 10,628,985 | B2 | 4/2020 | Mishra et al. |
| 10,659,405 | B1 | 5/2020 | Chang et al. |
| 10,708,545 | B2 | 7/2020 | Rivard et al. |
| 10,789,753 | B2 | 9/2020 | Miller et al. |
| 10,796,480 | B2 | 10/2020 | Chen et al. |
| 10,810,409 | B2 | 10/2020 | Bacivarov et al. |
| 10,931,813 | B1 | 2/2021 | Kim et al. |
| 11,055,889 | B2 | 7/2021 | Lee et al. |
| 11,107,261 | B2 | 8/2021 | Scapel et al. |
| 2001/0019330 | A1 | 9/2001 | Bickmore et al. |
| 2001/0033675 | A1 | 10/2001 | Maurer et al. |
| 2001/0047365 | A1 | 11/2001 | Yonaitis |
| 2001/0050689 | A1 | 12/2001 | Park |
| 2002/0015024 | A1 | 2/2002 | Westerman et al. |
| 2002/0061130 | A1 | 5/2002 | Kirk et al. |
| 2002/0072993 | A1 | 6/2002 | Sandus et al. |
| 2002/0109668 | A1 | 8/2002 | Rosenberg et al. |
| 2003/0154446 | A1 | 8/2003 | Constant et al. |
| 2005/0027716 | A1 | 2/2005 | Apfel |
| 2005/0137015 | A1 | 6/2005 | Rogers et al. |
| 2005/0190059 | A1 | 9/2005 | Wehrenberg |
| 2005/0193343 | A1 | 9/2005 | Kawabe et al. |
| 2005/0202748 | A1 | 9/2005 | Porter |
| 2005/0231513 | A1 | 10/2005 | Lebarton et al. |
| 2005/0231625 | A1 | 10/2005 | Parulski et al. |
| 2005/0248582 | A1 | 11/2005 | Scheepers et al. |
| 2006/0017692 | A1 | 1/2006 | Wehrenberg et al. |
| 2006/0143569 | A1 | 6/2006 | Kinsella et al. |
| 2006/0188144 | A1 | 8/2006 | Sasaki et al. |
| 2006/0294465 | A1 | 12/2006 | Ronen et al. |
| 2007/0025723 | A1 | 2/2007 | Baudisch et al. |
| 2007/0081081 | A1 | 4/2007 | Cheng |
| 2007/0168357 | A1 | 7/2007 | Mo |
| 2008/0052242 | A1 | 2/2008 | Merritt et al. |
| 2008/0133580 | A1 | 6/2008 | Wanless et al. |
| 2008/0242423 | A1 | 10/2008 | Kerr et al. |
| 2008/0267459 | A1 | 10/2008 | Nakada et al. |
| 2008/0300572 | A1 | 12/2008 | Rankers et al. |
| 2009/0027337 | A1 | 1/2009 | Hildreth |
| 2009/0044113 | A1 | 2/2009 | Jones et al. |
| 2009/0055484 | A1 | 2/2009 | Vuong et al. |
| 2009/0083847 | A1 | 3/2009 | Fadell et al. |
| 2009/0132371 | A1 | 5/2009 | Strietzel et al. |
| 2009/0144173 | A1 | 6/2009 | Mo et al. |
| 2009/0168756 | A1 | 7/2009 | Kurapati et al. |
| 2009/0175509 | A1 | 7/2009 | Gonion et al. |
| 2009/0195545 | A1 | 8/2009 | Debevec et al. |
| 2009/0202114 | A1 | 8/2009 | Morin et al. |
| 2009/0254859 | A1 | 10/2009 | Arrasvuori et al. |
| 2009/0297022 | A1 | 12/2009 | Pettigrew et al. |
| 2009/0300513 | A1 | 12/2009 | Nims et al. |
| 2009/0307629 | A1 | 12/2009 | Horiuchi et al. |
| 2009/0312049 | A1 | 12/2009 | Isomursu |
| 2010/0007665 | A1 | 1/2010 | Smith et al. |
| 2010/0026640 | A1 | 2/2010 | Kim et al. |
| 2010/0097375 | A1 | 4/2010 | Tadaishi et al. |
| 2010/0123915 | A1 | 5/2010 | Kashimoto |
| 2010/0124363 | A1 | 5/2010 | Ek et al. |
| 2010/0153847 | A1 | 6/2010 | Fama |
| 2010/0164684 | A1 | 7/2010 | Sasa et al. |
| 2010/0169376 | A1 | 7/2010 | Chu |
| 2010/0199200 | A1 | 8/2010 | Fujioka |
| 2010/0203968 | A1 | 8/2010 | Gill et al. |
| 2010/0207721 | A1 | 8/2010 | Nakajima et al. |
| 2010/0211900 | A1 | 8/2010 | Fujioka |
| 2010/0322111 | A1 | 12/2010 | Li |
| 2011/0007174 | A1 | 1/2011 | Bacivarov et al. |
| 2011/0025707 | A1 | 2/2011 | Fujioka |
| 2011/0064388 | A1 | 3/2011 | Brown et al. |
| 2011/0067098 | A1 | 3/2011 | Ruggiero et al. |
| 2011/0074807 | A1 | 3/2011 | Inada et al. |
| 2011/0080356 | A1 | 4/2011 | Kang et al. |
| 2011/0248992 | A1 | 10/2011 | Van et al. |
| 2011/0252344 | A1 | 10/2011 | Van |

(56) References Cited

U.S. PATENT DOCUMENTS

2011/0296324 A1 12/2011 Goossens et al.
2011/0298808 A1 12/2011 Rovik
2011/0304629 A1 12/2011 Winchester
2011/0306420 A1 12/2011 Nishimoto et al.
2011/0306422 A1 12/2011 Nishimoto et al.
2012/0011453 A1 1/2012 Shimono et al.
2012/0069028 A1 3/2012 Bouguerra
2012/0075328 A1 3/2012 Goossens
2012/0079377 A1 3/2012 Goossens
2012/0079378 A1 3/2012 Goossens
2012/0081282 A1 4/2012 Chin
2012/0139830 A1 6/2012 Hwang et al.
2012/0154557 A1 6/2012 Perez et al.
2012/0218125 A1 8/2012 Demirdjian et al.
2012/0223952 A1 9/2012 Kanemaru et al.
2012/0233120 A1 9/2012 Nijim et al.
2012/0235790 A1 9/2012 Zhao et al.
2012/0289290 A1 11/2012 Chae et al.
2012/0299945 A1 11/2012 Aarabi
2012/0309520 A1 12/2012 Evertt et al.
2012/0327183 A1 12/2012 Fujii
2013/0015946 A1 1/2013 Lau et al.
2013/0044128 A1 2/2013 Liu et al.
2013/0067453 A1 3/2013 Luan
2013/0136341 A1 5/2013 Yamamoto
2013/0147933 A1 6/2013 Kulas et al.
2013/0148867 A1 6/2013 Wang
2013/0176208 A1 7/2013 Tanaka et al.
2013/0235045 A1 9/2013 Corazza et al.
2013/0258040 A1 10/2013 Kaytaz et al.
2013/0318347 A1 11/2013 Moffat
2013/0342672 A1 12/2013 Gray et al.
2014/0013422 A1 1/2014 Janus et al.
2014/0040066 A1 2/2014 Fujioka
2014/0047560 A1 2/2014 Meyer et al.
2014/0062853 A1 3/2014 Chaudhri et al.
2014/0078144 A1 3/2014 Berriman et al.
2014/0085293 A1 3/2014 Konoplev et al.
2014/0085460 A1 3/2014 Park et al.
2014/0085487 A1 3/2014 Park et al.
2014/0092130 A1 4/2014 Anderson et al.
2014/0111420 A1 4/2014 Ahn et al.
2014/0115451 A1 4/2014 Sheldon-Dante
2014/0137013 A1 5/2014 Matas
2014/0143693 A1 5/2014 Goossens et al.
2014/0157153 A1 6/2014 Yuen et al.
2014/0165000 A1 6/2014 Fleizach et al.
2014/0198121 A1 7/2014 Tong et al.
2014/0213318 A1 7/2014 Leem et al.
2014/0220855 A1 8/2014 Heilbron et al.
2014/0254434 A1 9/2014 Jain et al.
2014/0267311 A1 9/2014 Evertt et al.
2014/0279062 A1 9/2014 Hackman et al.
2014/0283128 A1 9/2014 Shepherd et al.
2014/0292641 A1 10/2014 Cho et al.
2014/0313307 A1 10/2014 Oh et al.
2014/0336808 A1 11/2014 Taylor et al.
2014/0354401 A1 12/2014 Soni et al.
2014/0354538 A1 12/2014 Lee et al.
2014/0358475 A1 12/2014 Boulkenafed et al.
2014/0361974 A1 12/2014 Li et al.
2014/0362091 A1 12/2014 Bouaziz et al.
2014/0366159 A1 12/2014 Cohen
2015/0024592 A1 1/2015 Chandrashekar et al.
2015/0029097 A1 1/2015 Craig
2015/0033364 A1 1/2015 Wong
2015/0049014 A1 2/2015 Saito
2015/0084950 A1 3/2015 Li et al.
2015/0121251 A1 4/2015 Siddhartha et al.
2015/0130716 A1 5/2015 Sridharan et al.
2015/0172238 A1 6/2015 Ahmed et al.
2015/0172584 A1 6/2015 Park et al.
2015/0195277 A1 7/2015 Faaborg et al.
2015/0208244 A1 7/2015 Nakao
2015/0213307 A1 7/2015 Beeler et al.
2015/0254886 A1 9/2015 Li
2015/0261292 A1 9/2015 Conzola et al.
2015/0261387 A1 9/2015 Petersen et al.
2015/0310259 A1 10/2015 Lau et al.
2015/0312185 A1 10/2015 Langholz et al.
2015/0312523 A1 10/2015 Li et al.
2015/0325029 A1 11/2015 Li et al.
2015/0346912 A1 12/2015 Yang et al.
2015/0350125 A1 12/2015 Henderson
2015/0379252 A1 12/2015 Tang et al.
2016/0005206 A1 1/2016 Li et al.
2016/0006987 A1 1/2016 Li et al.
2016/0030844 A1 2/2016 Nair et al.
2016/0037331 A1 2/2016 Vernon et al.
2016/0042548 A1 2/2016 Du et al.
2016/0050169 A1 2/2016 Ben Atar et al.
2016/0055370 A1 2/2016 Garcia
2016/0057087 A1 2/2016 Gomba
2016/0063828 A1 3/2016 Verweij et al.
2016/0086387 A1 3/2016 Os et al.
2016/0092043 A1 3/2016 Missig et al.
2016/0094705 A1 3/2016 Vendrow
2016/0104034 A1 4/2016 Wilder et al.
2016/0105388 A1 4/2016 Bin Mahfooz et al.
2016/0110922 A1 4/2016 Haring
2016/0127641 A1 5/2016 Gove
2016/0134635 A1 5/2016 Thelin et al.
2016/0134840 A1 5/2016 Mcculloch
2016/0163084 A1 6/2016 Corazza et al.
2016/0182661 A1 6/2016 Brezina et al.
2016/0191958 A1 6/2016 Nauseef et al.
2016/0192324 A1 6/2016 Zhang et al.
2016/0217601 A1 7/2016 Tsuda et al.
2016/0227115 A1 8/2016 Bin Mahfooz et al.
2016/0231878 A1 8/2016 Tsuda et al.
2016/0247308 A1 8/2016 Jiao et al.
2016/0247309 A1 8/2016 Li et al.
2016/0267699 A1 9/2016 Borke et al.
2016/0275724 A1 9/2016 Adeyoola et al.
2016/0291822 A1 10/2016 Ahuja et al.
2016/0292901 A1 10/2016 Li et al.
2016/0292903 A1 10/2016 Li et al.
2016/0300379 A1 10/2016 Du et al.
2016/0307028 A1 10/2016 Fedorov
2016/0328874 A1 11/2016 Tong et al.
2016/0328875 A1 11/2016 Fang et al.
2016/0328876 A1 11/2016 Tong et al.
2016/0328886 A1 11/2016 Tong et al.
2016/0332025 A1 11/2016 Repka
2016/0350957 A1 12/2016 Woods et al.
2016/0364600 A1 12/2016 Shah et al.
2016/0378304 A1 12/2016 Bahgat et al.
2017/0018289 A1 1/2017 Morgenstern
2017/0032554 A1 2/2017 O'Donovan et al.
2017/0046045 A1 2/2017 Tung et al.
2017/0046065 A1 2/2017 Zeng et al.
2017/0046426 A1 2/2017 Pearce et al.
2017/0046507 A1 2/2017 Archer et al.
2017/0069124 A1 3/2017 Tong et al.
2017/0080346 A1 3/2017 Abbas
2017/0083086 A1 3/2017 Mazur et al.
2017/0083524 A1 3/2017 Huang et al.
2017/0083586 A1 3/2017 Huang et al.
2017/0098122 A1 4/2017 El Kaliouby et al.
2017/0102916 A1 4/2017 Noble et al.
2017/0113140 A1 4/2017 Blackstock et al.
2017/0132828 A1 5/2017 Zelenin et al.
2017/0140214 A1 5/2017 Matas et al.
2017/0147802 A1 5/2017 Li
2017/0163588 A1 6/2017 Devasthali et al.
2017/0164888 A1 6/2017 Matsuda et al.
2017/0193684 A1 7/2017 Du et al.
2017/0206095 A1 7/2017 Gibbs et al.
2017/0256086 A1 9/2017 Park et al.
2017/0269792 A1 9/2017 Xu et al.
2017/0285764 A1 10/2017 Kim et al.
2017/0286423 A1 10/2017 Shorman et al.
2017/0323266 A1 11/2017 Seo
2017/0346772 A1 11/2017 Albouyeh et al.

(56) References Cited

U.S. PATENT DOCUMENTS

| | | | |
|---|---|---|---|
| 2017/0358117 | A1 | 12/2017 | Goossens et al. |
| 2018/0004404 | A1 | 1/2018 | Delfino et al. |
| 2018/0025219 | A1 | 1/2018 | Baldwin et al. |
| 2018/0047200 | A1 | 2/2018 | O'Hara et al. |
| 2018/0063603 | A1 | 3/2018 | Tang et al. |
| 2018/0081515 | A1 | 3/2018 | Block et al. |
| 2018/0088787 | A1 | 3/2018 | Bereza et al. |
| 2018/0091732 | A1 | 3/2018 | Wilson et al. |
| 2018/0101227 | A1 | 4/2018 | Frueh et al. |
| 2018/0115503 | A1 | 4/2018 | Baldwin et al. |
| 2018/0130094 | A1 | 5/2018 | Tung et al. |
| 2018/0157901 | A1 | 6/2018 | Arbatman et al. |
| 2018/0165862 | A1* | 6/2018 | Sawaki .................. H04N 7/157 |
| 2018/0181201 | A1 | 6/2018 | Grant et al. |
| 2018/0189549 | A1 | 7/2018 | Inomata |
| 2018/0197343 | A1 | 7/2018 | Hare et al. |
| 2018/0225263 | A1 | 8/2018 | Zhong et al. |
| 2018/0268589 | A1 | 9/2018 | Grant |
| 2018/0316775 | A1 | 11/2018 | Kwon et al. |
| 2018/0321826 | A1 | 11/2018 | Bereza et al. |
| 2018/0324353 | A1 | 11/2018 | Kim et al. |
| 2018/0335927 | A1 | 11/2018 | Anzures et al. |
| 2018/0335929 | A1 | 11/2018 | Scapel et al. |
| 2018/0335930 | A1 | 11/2018 | Scapel et al. |
| 2018/0336715 | A1 | 11/2018 | Rickwald et al. |
| 2019/0079597 | A1 | 3/2019 | Kada et al. |
| 2019/0080070 | A1 | 3/2019 | Van Os et al. |
| 2019/0087082 | A1 | 3/2019 | Chaudhri et al. |
| 2019/0171338 | A1 | 6/2019 | Voss et al. |
| 2019/0171869 | A1 | 6/2019 | Fortune et al. |
| 2019/0180088 | A1 | 6/2019 | Norimatsu |
| 2019/0188895 | A1 | 6/2019 | Miller et al. |
| 2019/0266775 | A1 | 8/2019 | Lee et al. |
| 2019/0266807 | A1 | 8/2019 | Lee et al. |
| 2019/0276051 | A1 | 9/2019 | Marti et al. |
| 2019/0279410 | A1 | 9/2019 | Orvalho et al. |
| 2019/0295056 | A1 | 9/2019 | Wright |
| 2019/0339847 | A1 | 11/2019 | Scapel et al. |
| 2019/0347868 | A1 | 11/2019 | Scapel et al. |
| 2019/0370492 | A1 | 12/2019 | Falchuk et al. |
| 2020/0074711 | A1 | 3/2020 | Barlier et al. |
| 2020/0142484 | A1 | 5/2020 | Maalouf et al. |
| 2020/0234481 | A1 | 7/2020 | Scapel et al. |
| 2020/0302669 | A1 | 9/2020 | Barlier et al. |
| 2020/0306640 | A1 | 10/2020 | Kolen et al. |
| 2020/0358725 | A1 | 11/2020 | Scapel et al. |
| 2020/0358726 | A1 | 11/2020 | Dryer et al. |
| 2021/0027514 | A1 | 1/2021 | Kwon et al. |
| 2021/0056769 | A1 | 2/2021 | Scapel et al. |
| 2021/0097875 | A1 | 4/2021 | Alexander et al. |
| 2021/0264656 | A1 | 8/2021 | Barlier et al. |
| 2021/0312684 | A1 | 10/2021 | Zimmermann et al. |
| 2021/0335055 | A1 | 10/2021 | Scapel et al. |
| 2021/0382544 | A1 | 12/2021 | Butcher et al. |
| 2021/0390753 | A1 | 12/2021 | Scapel et al. |
| 2022/0122309 | A1 | 4/2022 | Kim et al. |
| 2022/0137724 | A1 | 5/2022 | Schliemann et al. |
| 2022/0244838 | A1 | 8/2022 | Bereza et al. |
| 2023/0343053 | A1 | 10/2023 | Scapel et al. |
| 2023/0350489 | A1 | 11/2023 | Butcher et al. |
| 2023/0364936 | A1 | 11/2023 | Antonakis |
| 2023/0384860 | A1 | 11/2023 | Dedonato et al. |

FOREIGN PATENT DOCUMENTS

| | | | |
|---|---|---|---|
| CN | 101329707 | A | 12/2008 |
| CN | 101472158 | A | 7/2009 |
| CN | 101692681 | A | 4/2010 |
| CN | 101742053 | A | 6/2010 |
| CN | 101930284 | A | 12/2010 |
| CN | 102035990 | A | 4/2011 |
| CN | 102142149 | A | 8/2011 |
| CN | 102298797 | A | 12/2011 |
| CN | 102394919 | A | 3/2012 |
| CN | 102479388 | A | 5/2012 |
| CN | 102841683 | A | 12/2012 |
| CN | 102984195 | A | 3/2013 |
| CN | 102999934 | A | 3/2013 |
| CN | 103116902 | A | 5/2013 |
| CN | 103209642 | A | 7/2013 |
| CN | 103294171 | A | 9/2013 |
| CN | 103346957 | A | 10/2013 |
| CN | 103886632 | A | 6/2014 |
| CN | 104011738 | A | 8/2014 |
| CN | 104115503 | A | 10/2014 |
| CN | 104170318 | A | 11/2014 |
| CN | 104170358 | A | 11/2014 |
| CN | 104376160 | A | 2/2015 |
| CN | 104732396 | A | 6/2015 |
| CN | 104753762 | A | 7/2015 |
| CN | 104753766 | A | 7/2015 |
| CN | 104836879 | A | 8/2015 |
| CN | 104935497 | A | 9/2015 |
| CN | 105051651 | A | 11/2015 |
| CN | 105099861 | A | 11/2015 |
| CN | 105100462 | A | 11/2015 |
| CN | 105139438 | A | 12/2015 |
| CN | 105374055 | A | 3/2016 |
| CN | 105391843 | A | 3/2016 |
| CN | 105391937 | A | 3/2016 |
| CN | 105844101 | A | 8/2016 |
| CN | 106101358 | A | 11/2016 |
| CN | 106575444 | A | 4/2017 |
| CN | 107171934 | A | 9/2017 |
| CN | 107613085 | A | 1/2018 |
| CN | 107924113 | A | 4/2018 |
| EP | 1599862 | A2 | 11/2005 |
| EP | 2028611 | A1 | 2/2009 |
| EP | 2394711 | A1 | 12/2011 |
| EP | 2416563 | A2 | 2/2012 |
| EP | 2713298 | A1 | 4/2014 |
| EP | 2741175 | A2 | 6/2014 |
| EP | 2762997 | A2 | 8/2014 |
| EP | 2960822 | A1 | 12/2015 |
| EP | 3118761 | A1 | 1/2017 |
| EP | 3190563 | A1 | 7/2017 |
| EP | 3308563 | A1 | 4/2018 |
| EP | 3396618 | A1 | 10/2018 |
| JP | 10-116351 | A | 5/1998 |
| JP | 2000-283720 | A | 10/2000 |
| JP | 2001-92783 | A | 4/2001 |
| JP | 2001-334071 | A | 12/2001 |
| JP | 2002-222412 | A | 8/2002 |
| JP | 2003-150550 | A | 5/2003 |
| JP | 2004-194069 | A | 7/2004 |
| JP | 2004-287558 | A | 10/2004 |
| JP | 2005-115480 | A | 4/2005 |
| JP | 2005-202651 | A | 7/2005 |
| JP | 2005-293280 | A | 10/2005 |
| JP | 2006-65683 | A | 3/2006 |
| JP | 2006-520053 | A | 8/2006 |
| JP | 2006-259930 | A | 9/2006 |
| JP | 2007-52770 | A | 3/2007 |
| JP | 2007-528240 | A | 10/2007 |
| JP | 2007-329632 | A | 12/2007 |
| JP | 2008-15800 | A | 1/2008 |
| JP | 2009-135770 | A | 6/2009 |
| JP | 2009-211166 | A | 9/2009 |
| JP | 2010-28404 | A | 2/2010 |
| JP | 2010-224837 | A | 10/2010 |
| JP | 2010-541046 | A | 12/2010 |
| JP | 2011-40865 | A | 2/2011 |
| JP | 2011-70623 | A | 4/2011 |
| JP | 2011-517810 | A | 6/2011 |
| JP | 2011-192228 | A | 9/2011 |
| JP | 2011-525648 | A | 9/2011 |
| JP | 2011-199523 | A | 10/2011 |
| JP | 2011-217146 | A | 10/2011 |
| JP | 2011-258159 | A | 12/2011 |
| JP | 2012-18569 | A | 1/2012 |
| JP | 2012-38292 | A | 2/2012 |
| JP | 2012-168802 | A | 9/2012 |
| JP | 2012-208719 | A | 10/2012 |
| JP | 2013-9073 | A | 1/2013 |

(56) References Cited

FOREIGN PATENT DOCUMENTS

| | | | |
|---|---|---|---|
| JP | 2013-88906 | A | 5/2013 |
| JP | 2013-97814 | A | 5/2013 |
| JP | 2013-114498 | A | 6/2013 |
| JP | 2013-140540 | A | 7/2013 |
| JP | 2013-178723 | A | 9/2013 |
| JP | 2014-110009 | A | 6/2014 |
| JP | 2014-206817 | A | 10/2014 |
| JP | 2015-36925 | A | 2/2015 |
| JP | 2015-56142 | A | 3/2015 |
| JP | 2015-207051 | A | 11/2015 |
| JP | 2016-136324 | A | 7/2016 |
| JP | 2016-162000 | A | 9/2016 |
| JP | 2016-534435 | A | 11/2016 |
| JP | 6240301 | B1 | 11/2017 |
| JP | 6266736 | B1 | 1/2018 |
| JP | 2018-84878 | A | 5/2018 |
| JP | 2018-514020 | A | 5/2018 |
| JP | 2018-106365 | A | 7/2018 |
| JP | 2018-109924 | A | 7/2018 |
| JP | 2018-151966 | A | 9/2018 |
| KR | 10-2011- 0089429 | A | 8/2011 |
| KR | 10-2012-0006610 | A | 1/2012 |
| KR | 10-2012-0127842 | A | 11/2012 |
| KR | 10-2012-0130627 | A | 12/2012 |
| KR | 10-2014-0039737 | A | 4/2014 |
| KR | 10-2016-0014623 | A | 2/2016 |
| KR | 10-2016-0026337 | A | 3/2016 |
| KR | 10-2016-0063058 | A | 6/2016 |
| KR | 10-2017- 0012384 | A | 2/2017 |
| KR | 10-2017-0023063 | A | 3/2017 |
| KR | 10-2017-0117306 | A | 10/2017 |
| KR | 10-1866407 | B1 | 6/2018 |
| KR | 10-2019-0033082 | A | 3/2019 |
| WO | 2004/079530 | A2 | 9/2004 |
| WO | 2009/114239 | A1 | 9/2009 |
| WO | 2009/133710 | A1 | 11/2009 |
| WO | 2010/059306 | A2 | 5/2010 |
| WO | 2012/068193 | A2 | 5/2012 |
| WO | 2013/097139 | A1 | 7/2013 |
| WO | 2013/097264 | A1 | 7/2013 |
| WO | 2013/152453 | A1 | 10/2013 |
| WO | 2013/152454 | A1 | 10/2013 |
| WO | 2013/152455 | A1 | 10/2013 |
| WO | 2013/169849 | A2 | 11/2013 |
| WO | 2014012456 | A1 | 1/2014 |
| WO | 2014/094199 | A1 | 6/2014 |
| WO | 2014/105276 | A1 | 7/2014 |
| WO | 2014/193465 | A1 | 12/2014 |
| WO | 2015/065928 | A1 | 5/2015 |
| WO | 2015/069153 | A1 | 5/2015 |
| WO | 2015/119605 | A1 | 8/2015 |
| WO | 2015/167590 | A1 | 11/2015 |
| WO | 2015/195216 | A1 | 12/2015 |
| WO | 2015/196448 | A1 | 12/2015 |
| WO | 2016/026402 | A2 | 2/2016 |
| WO | 2016/036218 | A1 | 3/2016 |
| WO | 2016/045005 | A1 | 3/2016 |
| WO | 2016/049439 | A | 3/2016 |
| WO | 2016/101124 | A1 | 6/2016 |
| WO | 2016/101131 | A1 | 6/2016 |
| WO | 2016/101132 | A1 | 6/2016 |
| WO | 2016/161556 | A1 | 10/2016 |
| WO | 2017/012302 | A1 | 1/2017 |
| WO | 2017/015949 | A1 | 2/2017 |
| WO | 2017/043314 | A1 | 3/2017 |
| WO | 2017/218193 | A1 | 12/2017 |
| WO | 2018/057272 | A1 | 3/2018 |
| WO | 2018/151758 | A1 | 8/2018 |
| WO | 2018/212801 | A1 | 11/2018 |
| WO | 2019/216999 | A1 | 11/2019 |
| WO | 2019/217177 | A1 | 11/2019 |
| WO | 2020/112561 | A1 | 6/2020 |
| WO | 2021/071532 | A1 | 4/2021 |

OTHER PUBLICATIONS

A Day in the Life of Mike, "#SnapChat Vs #Msqrd", Available Online at: <https://www.youtube.com/watch?v=vS_1mrWXmC8>, See especially 4:22-6:05, Mar. 9, 2016, 4 pages.

AKG Technical, "Mojipop app//Mozipop gif maker app//How to use mojipop app; AKG Technical", Available online at: https://www.youtube.com/watch?v=_9pdQ3CpWA4, Feb. 4, 2019, 4 pages.

Ali et al., "Facial Expression Recognition Using Human to Animated-Character Expression Translation", Oct. 12, 2019, 8 pages.

Androidslide, "Camera Zoom FX", Available at: <https://www.youtube.com/watch?v=AHmPn8y74wY>, Nov. 5, 2011, 3 pages.

Appes Stela, "Gif Me! Camera [Android] Video review by Stelapps", Available Online at: <https://www.youtube.com/watch?v=uae0xUucOyY>, Jul. 17, 2014, 3 pages.

Applicant-Initiated Interview Summary received for U.S. Appl. No. 15/714,887, dated Aug. 19, 2020, 4 pages.

Applicant-Initiated Interview Summary received for U.S. Appl. No. 15/714,887, dated Mar. 17, 2020, 5 pages.

Applicant-Initiated Interview Summary received for U.S. Appl. No. 15/940,017, dated Dec. 26, 2019, 5 pages.

Applicant-Initiated Interview Summary received for U.S. Appl. No. 15/940,017, dated Jun. 30, 2020, 5 pages.

Applicant-Initiated Interview Summary received for U.S. Appl. No. 16/519,850, dated Jun. 26, 2020, 4 pages.

Applicant-Initiated Interview Summary received for U.S. Appl. No. 16/582,500, dated Aug. 25, 2020, 5 pages.

Applicant-Initiated Interview Summary received for U.S. Appl. No. 16/582,500, dated Dec. 27, 2021, 8 pages.

Applicant-Initiated Interview Summary received for U.S. Appl. No. 16/582,500, dated Feb. 1, 2021, 6 pages.

Applicant-Initiated Interview Summary received for U.S. Appl. No. 16/582,500, dated Jul. 1, 2022, 6 pages.

Applicant-Initiated Interview Summary received for U.S. Appl. No. 16/583,706, dated Aug. 9, 2021, 5 pages.

Applicant-Initiated Interview Summary received for U.S. Appl. No. 16/583,706, dated Feb. 27, 2020, 6 pages.

Applicant-Initiated Interview Summary received for U.S. Appl. No. 16/583,706, dated Nov. 18, 2020, 7 pages.

Applicant-Initiated Interview Summary received for U.S. Appl. No. 16/663,062, dated Dec. 18, 2020, 3 pages.

Applicant-Initiated Interview Summary received for U.S. Appl. No. 17/220,752, dated Jul. 22, 2022, 3 pages.

AT&T Customer Care, "How to Access & Manage Contacts on Your Samsung Galaxy S9 | S9+ | AT&T Wireless", Online Available at: https://www.youtube.com/watch?v=nb4Zf9Xi5ZQ, Mar. 9, 2018, 8 pages.

Beyouravatar, "Faceshift studio tutorial part 4.8: tracking—fbx export", Available online at : https://www.youtube.com/watch?v=_yqmc9yzKLM, Nov. 19, 2012, 3 pages.

Bomen XYZ, "Cara membuat stiker di android, WhatsApp, Fb Messenger dll || Work 100%", Available online at: https://www.youtube.com/watch?v=cafBfzD1Bbo, Feb. 21, 2019, 3 pages.

Brief Communication Regarding Oral Proceedings received for European Patent Application No. 19172407.9, dated Nov. 9, 2020, 1 page.

Brief Communication Regarding Oral Proceedings received for European Patent Application No. 19172407.9, dated Nov. 20, 2020, 2 pages.

Canchichi, "Mii Creation", Online available at: https://www.youtube.com/watch?v=bYm7IEYu42k, Jan. 16, 2007, 4 pages.

Certificate of Examination received for Australian Patent Application No. 2019100497, dated Jul. 29, 2019, 2 pages.

Certificate of Examination received for Australian Patent Application No. 2019101019, dated Nov. 12, 2019, 2 pages.

Certificate of Examination received for Australian Patent Application No. 2019101667, dated Mar. 20, 2020, 2 pages.

Certificate of Examination received for Australian Patent Application No. 2020100675, dated Jun. 30, 2020, 2 pages.

Certificate of Examination received for Australian Patent Application No. 2020101715, dated Oct. 6, 2020, 2 pages.

(56) References Cited

OTHER PUBLICATIONS

CHAN et al., "FrontFace", Facilitating Communication Between HMD Users and Outsiders Using Front-Facing-Screen HMDs, Sep. 4-7, 2017, 5 pages.
Chicaview, "What is New! Make Funny GIFs Clips—Gif Me (Phone App)", Available online at: <https://www.youtube.com/watch?v=0LPGSFFP-V0>, See especially 1:15-2:25, Sep. 20, 2016, 3 pages.
Corrected Notice of Allowance received for U.S. Appl. No. 15/940,017, dated Aug. 27, 2020, 2 pages.
Corrected Notice of Allowance received for U.S. Appl. No. 15/940,017, dated Oct. 21, 2020, 3 pages.
Corrected Notice of Allowance received for U.S. Appl. No. 15/981,754, dated Oct. 15, 2019, 2 pages.
Corrected Notice of Allowance received for U.S. Appl. No. 15/981,754, dated Oct. 24, 2019, 2 pages.
Corrected Notice of Allowance received for U.S. Appl. No. 16/142,288, dated Jul. 30, 2019, 5 pages.
Corrected Notice of Allowance received for U.S. Appl. No. 16/519,850, dated Nov. 2, 2020, 5 pages.
Corrected Notice of Allowance received for U.S. Appl. No. 16/519,850, dated Sep. 8, 2020, 5 pages.
Corrected Notice of Allowance received for U.S. Appl. No. 16/582,570, dated Mar. 31, 2020, 2 pages.
Corrected Notice of Allowance received for U.S. Appl. No. 16/663,062, dated Apr. 14, 2021, 2 pages.
Corrected Notice of Allowance received for U.S. Appl. No. 16/663,062, dated Jul. 21, 2021, 2 pages.
Corrected Notice of Allowance received for U.S. Appl. No. 16/676,087, dated Aug. 3, 2020, 2 pages.
Corrected Notice of Allowance received for U.S. Appl. No. 16/676,087, dated Aug. 19, 2020, 2 pages.
Corrected Notice of Allowance received for U.S. Appl. No. 16/676,087, dated Jul. 8, 2020, 2 pages.
Corrected Notice of Allowance received for U.S. Appl. No. 16/896,457, dated Apr. 6, 2021, 3 pages.
Corrected Notice of Allowance received for U.S. Appl. No. 16/896,457, dated Feb. 24, 2021, 2 pages.
Corrected Notice of Allowance received for U.S. Appl. No. 16/896,457, dated Jan. 28, 2021, 2 pages.
Corrected Notice of Allowance received for U.S. Appl. No. 17/091,460, dated Feb. 16, 2022, 6 pages.
Corrected Notice of Allowance received for U.S. Appl. No. 17/091,460, dated Feb. 25, 2022, 6 pages.
Corrected Notice of Allowance received for U.S. Appl. No. 17/220,752, dated Oct. 14, 2022, 2 pages.
Decision on Appeal received for Korean Patent Application No. 10-2019-7033799, dated Jul. 19, 2022, 23 pages.
Decision on Appeal received for U.S. Appl. No. 15/714,887, dated Feb. 18, 2022, 14 pages.
Decision to Grant received for Danish Patent Application No. PA201770418, dated Oct. 25, 2019, 3 pages.
Decision to Grant received for Danish Patent Application No. PA201770419, dated Oct. 25, 2018, 2 pages.
Decision to Grant received for Danish Patent Application No. PA201770720, dated Aug. 8, 2019, 2 pages.
Decision to Grant received for Danish Patent Application No. PA201770721, dated Jun. 17, 2019, 2 pages.
Decision to Grant received for Danish Patent Application No. PA201870372, dated Jun. 17, 2020, 2 pages.
Decision to Grant received for Danish Patent Application No. PA201870375, dated Jul. 24, 2019, 2 pages.
Decision to Grant received for Danish Patent Application No. PA201870377, dated May 14, 2019, 2 pages.
Decision to Grant received for Danish Patent Application No. PA201870381, dated Oct. 14, 2019, 2 pages.
Decision to Grant received for European Patent Application No. 17853654.6, dated Apr. 15, 2021, 2 pages.
Decision to Grant received for European Patent Application No. 18704335.1, dated Sep. 24, 2020, 2 pages.
Decision to Grant received for European Patent Application No. 19172407.9, dated Jun. 17, 2021, 2 pages.
Decision to Grant received for European Patent Application No. 20168021.2, dated Feb. 3, 2022, 2 pages.
Decision to Grant received for Japanese Patent Application No. 2019-563408, dated Aug. 25, 2021, 3 pages.
Enterbrain, "No. 5 Create your own Avatar Mii Studio", vol. 26, No. 11, p. 138, Feb. 24, 2011, 4 pages.
European Search Report received for European Patent Application No. 19172407.9, dated Oct. 9, 2019, 4 pages.
European Search Report received for European Patent Application No. 19181242.9, dated Nov. 27, 2019, 4 pages.
European Search Report received for European Patent Application No. 19186042.8, dated Sep. 12, 2019, 4 pages.
European Search Report received for European Patent Application No. 19211833.9, dated Jul. 1, 2020, 4 pages.
European Search Report received for European Patent Application No. 20168021.2, dated Jul. 8, 2020, 4 pages.
Examiner's Answer to Appeal Brief received for U.S. Appl. No. 15/714,887, dated Aug. 27, 2021, 23 pages.
Examiner's Pre-Review Report received for Japanese Patent Application No. 2019-563560, dated Dec. 27, 2021, 4 pages.
Extended European Search Report received for European Patent Application No. 17853654.6, dated Jul. 8, 2019, 9 pages.
Extended European Search Report received for European Patent Application No. 20191533.7, dated Nov. 13, 2020, 8 pages.
Extended European Search Report received for European Patent Application No. 21166287.9, dated Nov. 5, 2021, 10 pages.
Extended European Search Report received for European Patent Application No. 22154034.7, dated May 11, 2022, 14 pages.
FaceRig, "FaceRig Mobile Selfie Tip", Available online at: https://www.youtube.com/watch?v=x3DZHnXWZ3U, Oct. 18, 2016, 3 pages.
FaceRig, "FaceRig Mobile Tip: How to record with and without the camera feed", Available Online at: https://www.youtube.com/watch?v=Iwk9FIWGvVM, Nov. 8, 2016, 3 pages.
Final Office Action received for U.S. Appl. No. 15/714,887, dated Nov. 13, 2020, 60 pages.
Final Office Action received for U.S. Appl. No. 15/714,887, dated Nov. 15, 2019, 55 pages.
Final Office Action received for U.S. Appl. No. 15/870,195, dated Dec. 13, 2018, 27 pages.
Final Office Action received for U.S. Appl. No. 15/940,017, dated Apr. 15, 2020, 19 pages.
Final Office Action received for U.S. Appl. No. 15/940,017, dated Dec. 20, 2018, 17 pages.
Final Office Action received for U.S. Appl. No. 15/940,232, dated Jan. 10, 2019, 27 pages.
Final Office Action received for U.S. Appl. No. 16/116,221, dated Mar. 22, 2019, 35 pages.
Final Office Action received for U.S. Appl. No. 16/582,500, dated Apr. 29, 2022, 23 pages.
Final Office Action received for U.S. Appl. No. 16/582,500, dated Nov. 30, 2020, 20 pages.
Final Office Action received for U.S. Appl. No. 16/583,706, dated Jun. 11, 2020, 31 pages.
Final Office Action received for U.S. Appl. No. 16/583,706, dated Nov. 18, 2021, 39 pages.
Finton Trina, "Intel Pocket Avatars App", Online Available at <https://www.youtube.com/watch?v=qFCx4gTZIGw>, Jan. 9, 2015, 3 pages.
Flatlinevertigo, "Black Desert Online: Intro to Hair Customization", Online Available at: <https://www.youtube.com/watch?v=9MCbfd_eMEg>, Sep. 9, 2015, 3 pages.
Flyme Global, "Flyme 6—Setup Contact Avatar", Available online at: https://www.youtube.com/watch?v=HvmyZdovhEk, May 15, 2017, 3 pages.
Gao et al., "Automatic Unpaired Shape Deformation Transfer", ACM Transactions on Graphics, Online available at: https://doi.org/10.1145/3272127.3275028, 2018, 11 pages.
Gardener Ricardo, "How to Create and Use AR Emoji Galaxy S10, S10 Plus", Available online at: https://www.youtube.com/watch?v=wNjgUQzFYto, May 9, 2019, 3 pages.

(56) References Cited

OTHER PUBLICATIONS

Gavin Brady, "How to Remove Old User Account Pictures in Windows 10", Available online at: https://www.howtogeek.com/369601/how-to-remove-old-user-account-pictures-in-windows-10/, Oct. 16, 2018, 5 pages.
Giphy Inc. Communication, "Giphy Cam. The GIF Camera", Available at: <https://web.archive.org/web/20170309234909/https://play.google.com/store/apps/details?id=com.giphy.camera>, Mar. 9, 2017, pp. 1-3.
Here are Warez Files: Eve Online Character Creator, Online Available at: <http://theherearewarezfiles.blogspot.com/2014/03/eve-online-character-creator-download.html>, Mar. 3, 2014, 7 pages.
Holotech Studios Entertainment, "FaceRig", Available at: <https://web.archive.org/web/20161120090627/https://play.google.com/store/apps/details?id=com.holotech.facerig&hl=da>, Nov. 9, 2016, 3 pages.
How to Use MSQRD, Available Online at: <https://web.archive.org/web/20160505072814/https:/www.wikihow.com/Use-MSQRD>, May 5, 2016, 3 pages.
Intel Newsroom, "New Pocket Avatars App from Intel", Online Available at <https://www.youtube.com/watch?v=R6q4sa7Q4ws>, Jun. 19, 2014, 3 pages.
Intention to Grant received for Danish Patent Application No. PA201770418, dated Aug. 22, 2019, 2 pages.
Intention to Grant received for Danish Patent Application No. PA201770418, dated Nov. 16, 2018, 3 pages.
Intention to Grant received for Danish Patent Application No. PA201770419, dated Mar. 28, 2018, 2 pages.
Intention to Grant received for Danish Patent Application No. PA201770720, dated Apr. 4, 2019, 2 pages.
Intention to Grant received for Danish Patent Application No. PA201770720, dated Jun. 21, 2019, 2 pages.
Intention to Grant received for Danish Patent Application No. PA201770721, dated Apr. 4, 2019, 2 pages.
Intention to Grant received for Danish Patent Application No. PA201870372, dated Feb. 13, 2020, 2 pages.
Intention to Grant received for Danish Patent Application No. PA201870375, dated Jun. 3, 2019, 2 pages.
Intention to Grant received for Danish Patent Application No. PA201870375, dated Mar. 26, 2019, 2 pages.
Intention to Grant received for Danish Patent Application No. PA201870377, dated Mar. 26, 2019, 2 pages.
Intention to Grant received for Danish Patent Application No. PA201870381, dated Jul. 18, 2019, 2 pages.
Intention to Grant received for European Patent Application No. 17853654.6, dated Nov. 23, 2020, 8 pages.
Intention to grant received for European Patent Application No. 18704335.1, dated Apr. 17, 2020, 6 pages.
Intention to Grant received for European Patent Application No. 19172407.9, dated Feb. 11, 2021, 9 pages.
Intention to Grant received for European Patent Application No. 19181242.9, dated Oct. 28, 2021, 16 pages.
Intention to Grant received for European Patent Application No. 20168021.2, dated Apr. 15, 2021, 8 pages.
Intention to Grant received for European Patent Application No. 20168021.2, dated Sep. 20, 2021, 8 pages.
International Preliminary Report on Patentability received for PCT Patent Application No. PCT/US2018/014658, dated Nov. 28, 2019, 14 pages.
International Preliminary Report on Patentability received for PCT Patent Application No. PCT/US2018/014892, dated Nov. 28, 2019, 8 pages.
International Preliminary Report on Patentability received for PCT Patent Application No. PCT/US2017/049760, dated Apr. 4, 2019, 9 pages.
International Preliminary Report on Patentability received for PCT Patent Application No. PCT/US2018/033044, dated Nov. 28, 2019, 8 pages.
International Preliminary Report on Patentability received for PCT Patent Application No. PCT/US2019/023793, dated Nov. 19, 2020, 12 pages.
International Preliminary Report on Patentability received for PCT Patent Application No. PCT/US2020/014176, dated Jul. 29, 2021, 9 pages.
International Preliminary Report on Patentability received for PCT Patent Application No. PCT/US2020/025913, dated Nov. 18, 2021, 11 pages.
International Search Report and Written Opinion received for PCT Patent Application No. PCT/US17/49760, dated Jan. 19, 2018, 12 pages.
Search Report and Written Opinion received for PCT Patent Application No. PCT/US2018/014658, dated Jun. 6, 2018, 20 pages.
International Search Report and Written Opinion received for PCT Patent Application No. PCT/US2018/014892, dated Mar. 7, 2018, 10 pages.
International Search Report and Written Opinion received for PCT Patent Application No. PCT/US2018/033044, dated Sep. 11, 2018, 13 pages.
International Search Report and Written Opinion received for PCT Patent Application No. PCT/US2019/023793, dated Aug. 27, 2019, 17 pages.
International Search Report and Written Opinion received for PCT Patent Application No. PCT/US2020/014176, dated Mar. 26, 2020, 12 pages.
International Search Report and Written Opinion received for PCT Patent Application No. PCT/US2020/025913, dated Sep. 15, 2020, 19 pages.
International Search Report and Written Opinion received for PCT Patent Application No. PCT/US2021/033320, dated Nov. 2, 2021, 19 pages.
International Search Report and Written Opinion received for PCT Patent Application No. PCT/US2021/049989, dated Dec. 6, 2021, 11 pages.
Invitation to Pay Addition Fees received for PCT Patent Application No. PCT/US2018/014658, dated Apr. 11, 2018, 14 pages.
Invitation to pay Additional fees received for PCT Patent Application No. PCT/US17/49760, dated Nov. 21, 2017, 2 pages.
Invitation to Pay Additional Fees received for PCT Patent Application No. PCT/US2019/023793, dated Jul. 5, 2019, 11 pages.
Invitation to Pay Additional Fees received for PCT Patent Application No. PCT/US2020/025913, dated Jul. 24, 2020, 11 pages.
Invitation to Pay Additional fees received for PCT Patent Application No. PCT/US2021/033320, dated Sep. 10, 2021, 12 pages.
Invitation to Pay Search Fees received for European Patent Application No. 20722020.3, dated Feb. 16, 2021, 3 pages.
Itjungles, "Samsung Galaxy S8: How to Assign a Photo to a Contact", Available online at: <https://www.youtube.com/watch?v=2ZdwxijxDzE>, Feb. 13, 2018, 3 pages.
Itjungles, "Samsung Galaxy S9: How to Add Stickers to Text Messages", Available online at: https://www.youtube.com/watch?v=ojGC_UMQds0, Jan. 22, 2019, 3 pages.
Jabbari Ibrahim, "How to set up Google Gboard's 'Mini' stickers", Available online at: https://www.youtube.com/watch?v=z_sWkctRr8Q, Aug. 30, 2018, 3 pages.
Jinxy Thrifty, "Pocket Avatars App Review", Online Available at <https://www.youtube.com/watch?v=-hhw17GLHsU>, Jan. 16, 2015, 3 pages.
Koti Kotresh, "Color with Asian Paints. A Mobail App by Android Application-2018", Available Online at <https://www.youtube.com/watch?v=M6EIO7ErYd0&feature=youtu.be&t=81>, May 6, 2018, 2 pages.
Kyoko Makino, "How to Make a Lookalike Face Icon for Your Friend", ASCII, Japan Weekly, ASCII Media Works Inc., vol. 24, pp. 90-93, Jul. 17, 2014, 7 p.
Latest Technology, "How to Create Personalized Emojis on Gboard Using Your Selfies II Personal Emojis", Available online at: https://www.youtube.com/watch?v=udyom84oqqA, Nov. 1, 2018, 3 pages.
Mai et al., "Frontal Screens on Head-Mounted Displays to Increase Awareness of the HMD Users' State in Mixed Presence Collaboration", May 15, 2019, 10 pages.
Mai et al., "Transparent HMD", Revealing the HMD User's Face to Bystanders, Nov. 26-29, 2017, 6 pages.
Mega Ninja, "Face rig review", Available online at : https://www.youtube.com/watch?v=8YqeeiEVkRg, Feb. 6, 2017, 3 pages.

(56) References Cited

OTHER PUBLICATIONS

Minutes of the Oral Proceedings received for European Patent Application No. 19181242.9, mailed on Dec. 15, 2020, 6 pages.
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages.
Modestneko, "How to Use Facerig", Available Online at: https://www.youtube.com/watch?v=e25_nuRNIOM, Mar. 31, 2019, 4 pages.
Nathan B Tech, "New Samsung S10 AR Emojis in Depth", Available online at: https://www.youtube.com/watch?v=xXeNSuNoEHc, Mar. 17, 2019, 4 pages.
NCCU DCT, "Faceshift", Available online at: https://www.youtube.com/watch?v=4Ph0_SP8tpA, Dec. 1, 2014, 3 pages.
Nineverything, "Making a Mii on Switch—all of the options", Online available at: https://www.youtube.com/watch?v=kUDPmbBK7ys, Feb. 23, 2017, 3 pages.
Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.
Non-Final Office Action received for U.S. Appl. No. 15/714,887, dated May 27, 2020, 48 pages.
Non-Final Office Action received for U.S. Appl. No. 15/714,887, dated May 30, 2019, 47 pages.
Non-Final Office Action received for U.S. Appl. No. 15/940,017, dated Jun. 18, 2018, 15 pages.
Non-Final Office Action received for U.S. Appl. No. 15/940,017, dated Sep. 30, 2019, 16 pages.
Non-Final Office Action received for U.S. Appl. No. 15/940,232, dted Jun. 18, 2018, 23 pages.
Non-Final Office Action received for U.S. Appl. No. 16/035,419, dated Jan. 30, 2019, 24 pages.
Non-Final Office Action received for U.S. Appl. No. 16/116,221, dated Nov. 13, 2018, 27 pages.
Non-Final Office Action received for U.S. Appl. No. 16/142,288, dated Nov. 20, 2018, 15 pages.
Non-Final Office Action received for U.S. Appl. No. 16/142,305, dated Nov. 23, 2018, 32 pages.
Non-Final Office Action received for U.S. Appl. No. 16/142,328, dated Nov. 8, 2018, 18 pages.
Non-Final Office Action received for U.S. Appl. No. 16/519,850, dated Mar. 23, 2020, 8 pages.
Non-Final Office Action received for U.S. Appl. No. 16/582,500, dated Jun. 2, 2020, 15 pages.
Non-Final Office Action received for U.S. Appl. No. 16/582,500, dated Sep. 17, 2021, 18 pages.
Non-Final Office Action received for U.S. Appl. No. 16/583,706, dated Jan. 10, 2020, 27 pages.
Non-Final Office Action received for U.S. Appl. No. 16/583,706, dated Mar. 4, 2021, 34 pages.
Non-Final Office Action received for U.S. Appl. No. 16/663,062, dated Oct. 28, 2020, 14 pages.
Non-Final Office Action received for U.S. Appl. No. 16/676,087, dated Apr. 9, 2020, 55 pages.
Non-Final Office Action received for U.S. Appl. No. 17/091,460, dated Sep. 10, 2021, 10 pages.
Non-Final Office Action received for U.S. Appl. No. 17/220,752, dated Apr. 15, 2022, 21 pages.
Non-Final Office Action received for U.S. Appl. No. 17/370,505, dated Jul. 6, 2022, 14 pages.
Non-Final Office Action received for U.S. Appl. No. 15/870,195, dated May 2, 2018, 22 pages.
Notice of Acceptance received for Australian Patent Application No. 2017330208, dated Nov. 28, 2019, 3 pages.
Notice of Acceptance received for Australian Patent Application No. 2018269375, dated Dec. 3, 2020, 3 pages.
Notice of Acceptance received for Australian Patent Application No. 2018270420, dated Jul. 21, 2021, 3 pages.
Notice of Acceptance received for Australian Patent Application No. 2019265357, dated Dec. 24, 2020, 3 pages.
Notice of Acceptance received for Australian Patent Application No. 2020201721, dated Jul. 6, 2021, 3 pages.
Notice of Acceptance received for Australian Patent Application No. 2021201681, dated Feb. 3, 2022, 3 pages.
Notice of Allowance received for Chinese Patent Application No. 201880022585.3, dated Oct. 28, 2020, 6 pages.
Notice of Allowance received for Chinese Patent Application No. 201910278273.5, dated Nov. 19, 2020, 2 pages.
Notice of Allowance received for Chinese Patent Application No. 201910379481.4, dated Nov. 9, 2020, 6 pages.
Notice of Allowance received for Chinese Patent Application No. 201910563974.3, dated Jun. 2, 2021, 2 pages.
Notice of Allowance received for Chinese Patent Application No. 201910692958.4, dated Jul. 21, 2020, 2 pages.
Notice of Allowance received for Chinese Patent Application No. 201911219517.9, dated Jul. 4, 2022, 6 pages.
Notice of Allowance received for Chinese Patent Application No. 202010776600.2, dated Apr. 1, 2021, 8 pages.
Notice of Allowance received for Japanese Patent Application No. 2018-184254, dated Jun. 15, 2020, 5 pages.
Notice of Allowance received for Japanese Patent Application No. 2019-511975, dated Dec. 14, 2020, 4 pages.
Notice of Allowance received for Japanese Patent Application No. 2020-120086, dated Nov. 15, 2021, 5 pages.
Notice of Allowance received for Korean Patent Application No. 10-2019-7005136, dated Feb. 19, 2021, 5 pages.
Notice of Allowance received for Korean Patent Application No. 10-2019-7033634, dated Aug. 20, 2021, 4 pages.
Notice of Allowance received for Korean Patent Application No. 10-2020-7032147, dated May 12, 2021, 5 pages.
Notice of Allowance received for Korean Patent Application No. 10-2021-7015473, dated Feb. 24, 2022, 5 pages.
Notice of Allowance received for Korean Patent Application No. 10-2021-7023617, dated Dec. 21, 2021, 6 pages.
Notice of Allowance received for Korean Patent Application No. 10-2021-7038284, dated Feb. 25, 2022, 5 pages.
Notice of Allowance received for Korean Patent Application No. 10-2022-7017766, dated Jun. 14, 2022, 6 pages.
Notice of Allowance received for Korean Patent Application No. 10-2022-7017767, dated Jun. 14, 2022, 6 pages.
Notice of Allowance received for U.S. Appl. No. 15/870,195, dated Sep. 23, 2019, 13 pages.
Notice of Allowance received for U.S. Appl. No. 15/940,017, dated Aug. 6, 2020, 10 pages.
Notice of Allowance received for U.S. Appl. No. 15/940,232, dated Jun. 4, 2019, 12 pages.
Notice of Allowance received for U.S. Appl. No. 15/981,754, dated Jul. 17, 2019, 15 pages.
Notice of Allowance received for U.S. Appl. No. 15/981,754, dated Sep. 18, 2019, 14 pages.
Notice of Allowance received for U.S. Appl. No. 16/035,419, dated May 24, 2019, 14 pages.
Notice of Allowance received for U.S. Appl. No. 16/116,221, dated Nov. 22, 2019, 13 pages.
Notice of Allowance received for U.S. Appl. No. 16/116,221, dated Sep. 20, 2019, 13 pages.
Notice of Allowance received for U.S. Appl. No. 16/142,288, dated Jun. 24, 2019, 10 pages.
Notice of Allowance received for U.S. Appl. No. 16/142,288, dated Mar. 27, 2019, 9 pages.
Notice of Allowance received for U.S. Appl. No. 16/142,288, dated May 1, 2019, 4 pages.
Notice of Allowance received for U.S. Appl. No. 16/142,305, dated Apr. 3, 2019, 5 pages.
Notice of Allowance received for U.S. Appl. No. 16/142,305, dated May 1, 2019, 2 pages.
Notice of Allowance received for U.S. Appl. No. 16/142,328, dated Apr. 5, 2019, 7 pages.
Notice of Allowance received for U.S. Appl. No. 16/519,850, dated Aug. 26, 2020, 8 pages.

(56) References Cited

OTHER PUBLICATIONS

Notice of Allowance received for U.S. Appl. No. 16/582,570, dated Mar. 6, 2020, 28 pages.
Notice of Allowance received for U.S. Appl. No. 16/663,062, dated Jul. 13, 2021, 7 pages.
Notice of Allowance received for U.S. Appl. No. 16/663,062, dated Mar. 24, 2021, 8 pages.
Notice of Allowance received for U.S. Appl. No. 16/676,087, dated Jun. 19, 2020, 9 pages.
Notice of Allowance received for U.S. Appl. No. 16/676,087, dated Oct. 21, 2020, 9 pages.
Notice of Allowance received for U.S. Appl. No. 16/896,457, dated Jan. 8, 2021, 22 pages.
Notice of Allowance received for U.S. Appl. No. 17/091,460, dated Apr. 28, 2022, 9 pages.
Notice of Allowance received for U.S. Appl. No. 17/091,460, dated Feb. 4, 2022, 10 pages.
Notice of Allowance received for U.S. Appl. No. 17/091,460, dated May 23, 2022, 9 pages.
Notice of Allowance received for U.S. Appl. No. 17/220,752, dated Sep. 7, 2022, 8 pages.
Office Action received for Australian Patent Application No. 2017330208, dated Jul. 25, 2019, 5 pages.
Office Action received for Australian Patent Application No. 2018269375, dated Jun. 19, 2020, 4 pages.
Office Action received for Australian Patent Application No. 2018269375, dated Sep. 7, 2020, 3 pages.
Office Action received for Australian Patent Application No. 2018270420, dated Apr. 19, 2021, 4 pages.
Office Action received for Australian Patent Application No. 2018270420, dated Jan. 7, 2021, 5 pages.
Office Action received for Australian Patent Application No. 2018270420, dated Jul. 21, 2020, 5 pages.
Office Action received for Australian Patent Application No. 2020201721, dated Feb. 26, 2021, 7 pages.
Office Action received for Australian Patent Application No. 2021201681, dated Nov. 11, 2021, 4 pages.
Office Action received for Australian Patent Application No. 2021202254, dated Jun. 20, 2022, 2 pages.
Office Action received for Chinese Patent Application No. 201780053143.0, dated Dec. 16, 2021, 19 pages.
Office Action received for Chinese Patent Application No. 201780053143.0, dated Dec. 24, 2020, 21 pages.
Office Action received for Chinese Patent Application No. 201780053143.0, dated Mar. 30, 2022, 12 pages.
Office Action received for Chinese Patent Application No. 201780053143.0, dated May 22, 2020, 21 pages.
Office Action received for Chinese Patent Application No. 201780053143.0, dated Sep. 3, 2021, 24 pages.
Office Action received for Chinese Patent Application No. 201880000798.6, dated Aug. 5, 2020, 18 pages.
Office Action received for Chinese Patent Application No. 201880000798.6, dated Dec. 30, 2021, 10 pages.
Office Action received for Chinese Patent Application No. 201880000798.6, dated Jul. 2, 2021, 15 pages.
Office Action received for Chinese Patent Application No. 201880022585.3, dated May 22, 2020, 11 pages.
Office Action received for Chinese Patent Application No. 201910278273.5, dated Jan. 3, 2020, 17 pages.
Office Action received for Chinese Patent Application No. 201910278273.5, dated Jun. 9, 2020, 8 pages.
Office Action received for Chinese Patent Application No. 201910379481.4, dated Mar. 2, 2020, 18 pages.
Office Action received for Chinese Patent Application No. 201910563974.3, dated Feb. 7, 2021, 7 pages.
Office Action received for Chinese Patent Application No. 201910563974.3, dated May 8, 2020, 18 pages.
Office Action received for Chinese Patent Application No. 201910691865.X, dated Aug. 4, 2021, 10 pages.
Office Action received for Chinese Patent Application No. 201910691865.X, dated Feb. 4, 2021, 16 pages.
Office Action received for Chinese Patent Application No. 201910691865.X, dated Jul. 8, 2020, 17 pages.
Office Action received for Chinese Patent Application No. 201910691872.X, dated Jun. 3, 2020, 10 pages.
Office Action received for Chinese Patent Application No. 201910691872.X, dated Jun. 23, 2021, 10 pages.
Office Action received for Chinese Patent Application No. 201910691872.X, dated Mar. 24, 2021, 19 pages.
Office Action received for Chinese Patent Application No. 201910691872.X, dated Nov. 10, 2021, 16 pages.
Office Action received for Chinese Patent Application No. 201910692958.4, dated Mar. 19, 2020, 20 pages.
Office Action received for Chinese Patent Application No. 201911219517.9, dated Jan. 19, 2022, 11 pages.
Office Action received for Chinese Patent Application No. 201911219517.9, dated Mar. 2, 2021, 20 pages.
Office Action received for Chinese Patent Application No. 202010330318.1, dated Jul. 13, 2021, 12 pages.
Office Action received for Chinese Patent Application No. 202010330318.1, dated Mar. 31, 2021, 13 pages.
Office Action received for Chinese Patent Application No. 202010330318.1, dated Nov. 19, 2020, 18 pages.
Office Action received for Chinese Patent Application No. 202110820692.4, dateed Mar. 15, 2022, 18 pages.
Office Action received for Danish Patent Application No. PA201770393, dated Dec. 12, 2018, 7 pages.
Office Action received for Danish Patent Application No. PA201770393, dated Jan. 31, 2020, 6 pages.
Office Action received for Danish Patent Application No. PA201770393, dated Jul. 11, 2019, 2 pages.
Office Action received for Danish Patent Application No. PA201770393, dated Mar. 19, 2018, 8 pages.
Office Action received for Danish Patent Application No. PA201770418, dated May 8, 2018, 3 pages.
Office Action received for Danish Patent Application No. PA201770419, dated Jan. 10, 2018, 4 pages.
Office Action received for Danish Patent Application No. PA201770720, dated Apr. 26, 2018, 3 pages.
Office Action received for Danish Patent Application No. PA201770720, dated Nov. 16, 2018, 3 pages.
Office Action received for Danish Patent Application No. PA201770720, dated Oct. 18, 2017, 8 pages.
Office Action received for Danish Patent Application No. PA201770721, dated Apr. 26, 2018, 3 pages.
Office Action received for Danish Patent Application No. PA201770721, dated Nov. 16, 2018, 3 pages.
Office Action received for Danish Patent Application No. PA201770721, dated Oct. 19, 2017, 8 pages.
Office Action received for Danish Patent Application No. PA201870372, dated Aug. 20, 2019, 2 pages.
Office Action received for Danish Patent Application No. PA201870372, dated Jan. 31, 2019, 4 pages.
Office Action received for Danish Patent Application No. PA201870374, dated Feb. 6, 2019, 5 pages.
Office Action received for Danish Patent Application No. PA201870374, dated Jun. 17, 2019, 5 pages.
Office Action received for Danish Patent Application No. PA201870375, dated Jan. 31, 2019, 4 pages.
Office Action received for Danish Patent Application No. PA201870377, dated Jan. 31, 2019, 4 pages.
Office Action received for Danish Patent Application No. PA201970530, dated Mar. 4, 2020, 4 pages.
Office Action received for Danish Patent Application No. PA201970530, dated Mar. 25, 2021, 4 pages.
Office Action received for Danish Patent Application No. PA201970531, dated Aug. 13, 2021, 3 pages.
Office Action received for Danish Patent Application No. PA201970531, dated Feb. 17, 2020, 3 pages.
Office Action received for European Patent Application No. 17853654.6, dated Mar. 23, 2020, 4 pages.

(56) References Cited

OTHER PUBLICATIONS

Office Action received for European Patent Application No. 18703184.4, dated Dec. 14, 2021, 4 pages.
Office Action received for European Patent Application No. 18703184.4, dated Jul. 2, 2021, 6 pages.
Office Action received for European Patent Application No. 18703184.4, dated Jul. 13, 2022, 4 pages.
Office Action received for European Patent Application No. 18703184.4, dated May 6, 2020, 7 pages.
Office Action received for European Patent Application No. 18703184.4, dated Nov. 23, 2020, 8 pages.
Office Action received for European Patent Application No. 18704335.1, dated Sep. 23, 2019, 7 pages.
Office Action received for European Patent Application No. 18732519.6, dated Apr. 24, 2020, 6 pages.
Office Action received for European Patent Application No. 18732519.6, dated Oct. 6, 2020, 5 pages.
Office Action received for European Patent Application No. 19172407.9, dated Oct. 18, 2019, 7 pages.
Office Action received for European Patent Application No. 19181242.9, dated Dec. 6, 2019, 9 pages.
Office Action received for European Patent Application No. 19186042.8, dated Dec. 2, 2021, 5 pages.
Office Action received for European Patent Application No. 19186042.8, dated May 12, 2020, 5 pages.
Office Action received for European Patent Application No. 19186042.8, dated Sep. 24, 2019, 6 pages.
Office Action received for European Patent Application No. 19211833.9, dated Jan. 29, 2021, 5 pages.
Office Action received for European Patent Application No. 19211833.9, dated Jul. 13, 2020, 7 pages.
Office Action received for European Patent Application No. 20168021.2, dated Jul. 22, 2020, 8 pages.
Office Action received for European Patent Application No. 20191533.7, dated May 12, 2022, 5 pages.
Office Action received for European Patent Application No. 20722020.3, dated May 12, 2021, 9 pages.
Office Action received for European Patent Application No. 18703184.4, dated Oct. 29, 2019, 6 pages.
Office Action received for Indian Patent Application No. 201814036472, dated Jul. 8, 2021, 8 pages.
Office Action received for Indian Patent Application No. 201917046737, dated Aug. 9, 2021, 8 pages.
Office Action received for Japanese Patent Application No. 2018-184254, dated Mar. 2, 2020, 8 pages.
Office Action received for Japanese Patent Application No. 2019-511975, dated Apr. 10, 2020, 6 pages.
Office Action received for Japanese Patent Application No. 2019-563408, dated Nov. 2, 2020, 4 pages.
Office Action received for Japanese Patent Application No. 2019-563560, dated Jul. 4, 2022, 34 pages.
Office Action received for Japanese Patent Application No. 2019-563560, dated Jun. 14, 2021, 6 pages.
Office Action received for Japanese Patent Application No. 2019-563560, dated Nov. 30, 2020, 7 pages.
Office Action received for Japanese Patent Application No. 2020-120086, dated May 21, 2021, 6 pages.
Office Action received for Japanese Patent Application No. 2020-120086, dated Nov. 20, 2020, 6 pages.
Office Action received for Japanese Patent Application No. 2021-001028, dated Jan. 31, 2022, 10 pages.
Office Action received for Korean Patent Application No. 10-2019-7005136, dated Jan. 28, 2020, 5 pages.
Office Action received for Korean Patent Application No. 10-2019-7033634, dated Sep. 28, 2020, 15 pages.
Office Action received for Korean Patent Application No. 10-2019-7033799, dated Apr. 27, 2021, 9 pages.
Office Action received for Korean Patent Application No. 10-2019-7033799, dated Nov. 23, 2021, 6 pages.
Office Action received for Korean Patent Application No. 10-2020-7032147, dated Feb. 16, 2021, 6 pages.
Office Action received for Korean Patent Application No. 10-2021-7015473, dated Aug. 25, 2021, 5 pages.
Office Action received for Korean Patent Application No. 10-2022-7004578, dated Mar. 22, 2022, 11 pages.
Office Action received for Korean Patent Application No. 10-2022-7029803, dated Sep. 3, 2022, 5 pages.
Opuni Kojo, "FaceShift Studio Demo", Available online at: https://www.youtube.com/watch?v=72ty7PYKwGU, Oct. 1, 2012, 3 pages.
PC World, "How to make AR Emojis on the Samsung Galaxy S9", You Tube, Available Online: https://www.youtube.com/watch?v=8wQICfulkz0, Feb. 25, 2018, 2 pages.
Pumarola et al., "GANimation: Anatomically-aware Facial Animation from a Single Image", Proceedings of the European Conference on Computer Vision (ECCV), Jul. 24, 2018, 16 pages.
Pyun et al., "An Example-Based Approach for Facial Expression Cloning", SIGGRAPH Symposium on Computer Animation, The Eurographics Association (2003), 2003, 10 pages.
Record of Oral Hearing received for U.S. Appl. No. 15/714,887, dated Feb. 15, 2022, 16 pages.
Rekimoto et al., "Behind-the-Mask", A Face-Through Head-Mounted Display, 18, May 29-Jun. 1, 2018, 5 pages.
Result of Consultation received for European Patent Application No. 19172407.9, dated Nov. 5, 2020, 17 pages.
Result of Consultation received for European Patent Application No. 19211833.9, dated Jul. 15, 2021, 3 pages.
Result of Consultation received for European Patent Application No. 19181242.9, dated Dec. 1, 2020, 12 pages.
Sambrook Jade, "Video Selfie Filters with MSQRD for Facebook Live", Available Online at: <https://www.youtube.com/watch?v=JZrWK2NEFeg>, See especially 2:44-3:03, Jul. 2, 2016, 3 pages.
Search Report and Opinion received for Danish Patent Application No. PA201770393, dated Jun. 21, 2017, 9 pages.
Search Report and Opinion received for Danish Patent Application No. PA201770418, dated Jun. 23, 2017, 8 pages.
Search Report and Opinion received for Danish Patent Application No. PA201770419, dated Jun. 19, 2017, 6 pages.
Search Report and Opinion received for Danish Patent Application No. PA201870372, dated Sep. 14, 2018, 8 pages.
Search Report and Opinion received for Danish Patent Application No. PA201870372, dated Sep. 17, 2018, 10 pages.
Search Report and Opinion received for Danish Patent Application No. PA201870374, dated Aug. 27, 2018, 9 pages.
Search Report and Opinion received for Danish Patent Application No. PA201870375, dated Aug. 23, 2018, 8 pages.
Search Report and Opinion received for Danish Patent Application No. PA201870377, dated Sep. 4, 2018, 8 pages.
Search Report and Opinion received for Danish Patent Application No. PA201970530, dated Oct. 11, 2019, 8 pages.
Search Report and Opinion received for Danish Patent Application No. PA201970531, dated Oct. 11, 2019, 9 pages.
Search Report received for Danish Patent Application No. PA201870381, dated Sep. 13, 2018, 7 pages.
Shah Agam, "Intel's Pocket Avatars Chat App Packs 3D Avatars That Mimic Your Face and Mood", Online Available at <http://www.pcworld.com/article/2365600/intel-ventures-into-3d-mobile-chat-app-that-tracks-faces-moods.html>, Jun. 19, 2014, 3 pages.
Slashgear, "Samsung AR Emoji demo on the Galaxy S9", Available Online at <https://www.youtube.com/watch?v=GQwNKzY4C9Y>, Feb. 25, 2018, 3 pages.
Space-O Digicom Private Limited, "Tongue Piercing Booth—the Barbell Tongue Rings & Oral Piercings App", May 30, 2017, 5 pages.
Spellburst, "The Sims 3: Create a Sim With Me | #2—Dark Fairy + Full CC List!", Available online at: <https://www.youtube.com/watch?v=Dy_5g9B-wkA>, Oct. 9, 2017, 2 pages.
Stateoftech, "iPhone 6 Tips—How to Access the Camera from the Lock Screen", Screen captures with generated transcript from YouTube video clip, Online Available at: <https://www.youtube.com/watch?v=frB151RYB7U>, Jul. 2, 2015, 23 pages.
Summons to Attend Oral Proceedings received for European Patent Application No. 19172407.9, mailed on Jun. 24, 2020, 14 pages.

(56) References Cited

OTHER PUBLICATIONS

Summons to Attend Oral Proceedings received for European Patent Application No. 19181242.9, mailed on Jun. 16, 2020, 12 pages.
Summons to Attend Oral Proceedings received for European Patent Application No. 19181242.9, mailed on May 19, 2022, 7 pages.
Supplemental Notice of Allowance received for U.S. Patent Application No. 15/870, 195, dated Nov. 14, 2019, 9 pages.
Switchforce, "Nintendo Switch Mii Creation+ New Mii Options and Poses", Online Available at: https://www.youtube.com/watch?v=n4ZFuaf2k4M, Feb. 23, 2017, 8 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Ting, "Giphy Cam (iOS) | Ting Download", Available online at: https://www.youtube.com/watch?v=mykfBpyD3gg, Oct. 2, 2015, 3 pages.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages.
Twins Tornado, "New Tutorial: Add Facial Expressions to your Game Characters!", Available online at: https://www.youtube.com/watch?v=wKSjByNyaKA, Mar. 14, 2014, 4 pages.
Yom Mama, "SnapChat Tutorial for Beginners!", Available Online at: <https://www.youtube.com/watch?v=zUmj039NNOU>, See especially 6:55-7:22, Jun. 6, 2016, 3 pages.
Zhang et al., "Facial Expression Retargeting from Human to Avatar Made Easy", IEEE Transactions on Visualization and Computer Graphics, Aug. 2020, 14 pages.
Zhao et al., "An Event-related Potential Comparison of Facial Expression Processing between Cartoon and Real Faces", Online available at: https://www.biorxiv.org/content/10.1101/333898v2, Jun. 18, 2018, 31 pages.
Applicant-Initiated Interview Summary received for U.S. Appl. No. 16/582,500, dated Oct. 28, 2022, 6 pages.
Applicant-Initiated Interview Summary received for U.S. Appl. No. 17/337,164, dated Nov. 23, 2022, 2 pages.
Applicant-Initiated Interview Summary received for U.S. Appl. No. 17/370,505, dated Oct. 17, 2022, 4 pages.
Brief Communication Regarding Oral Proceedings received for European Patent Application No. 19181242.9, mailed on Oct. 5, 2022, 4 pages.
Intention to Grant received for European Patent Application No. 19181242.9, dated Nov. 17, 2022, 9 pages.
Non-Final Office Action received for U.S. Appl. No. 16/582,500, dated Sep. 23, 2022, 23 pages.
Non-Final Office Action received for U.S. Appl. No. 17/337,164, dated Sep. 21, 2022, 43 pages.
Non-Final Office Action received for U.S. Appl. No. 17/461,014, dated Dec. 7, 2022, 22 pages.
Notice of Acceptance received for Australian Patent Application No. 2020269590, dated Nov. 8, 2022, 3 pages.
Notice of Acceptance received for Australian Patent Application No. 2021202254, dated Nov. 16, 2022, 3 pages.
Notice of Acceptance received for Australian Patent Application No. 2021250944, dated Nov. 14, 2022, 3 pages.
Notice of Acceptance received for Australian Patent Application No. 2021254574, dated Dec. 14, 2022, 3 pages.
Notice of Allowance received for Chinese Patent Application No. 202110820692.4, dated Nov. 16, 2022, 2 pages (1 page of English Translation and 1 page of Official Copy).
Notice of Allowance received for Japanese Patent Application No. 2021-001028, dated Sep. 9, 2022, 4 pages (1 page of English Translation and 3 pages of Official Copy).
Notice of Allowance received for Japanese Patent Application No. 2021-566102, dated Oct. 28, 2022, 5 pages (1 page of English Translation and 4 pages of Official Copy).
Office Action received for Australian Patent Application No. 2020269590, dated Sep. 16, 2022, 2 pages.
Office Action received for Australian Patent Application No. 2021250944, dated Sep. 16, 2022, 3 pages.
Office Action received for Australian Patent Application No. 2021254574, dated Oct. 15, 2022, 3 pages.
Office Action received for Japanese Patent Application No. 2021-153573, dated Oct. 17, 2022, 4 pages (2 pages of English Translation and 2 pages of Official Copy).
Office Action received for Japanese Patent Application No. 2021-173713, dated Nov. 16, 2022, 9 pages (5 pages of English Translation and 4 pages of Official Copy).
Office Action received for Korean Patent Application No. 10-2022-7009437, dated Nov. 30, 2022, 6 pages (2 pages of English Translation and 4 pages of Official Copy).
Pavlakos et al., "Expressive Body Capture: 3D Hands, Face, and Body from a Single Image", In Proceedings of the IEEE/CVF conference on computer vision and pattern recognition 2019, online available at https://arxiv.org/abs/1904.05866, 2019, pp. 10975-10985.
Reallusion, "CrazyTalk 8 Tutorial—Customizing Eyes and Teeth", Online available at: https://www.youtube.com/watch?v=A9LgNB1PoMY, Dec. 23, 2015, 21 pages.
Zollhöfer et al., "State of the Art on Monocular 3D Face Reconstruction, Tracking, and Applications", In Computer graphics forum May 2018 (vol. 37, No. 2), online available at https://studios.disneyresearch.com/wp-content/uploads/2019/03/State-of-the-Art-on-Monocular-3D-Face-Reconstruction-Tracking-and-Applications-1.pdf., 2018, 28 pages.
Applicant-Initiated Interview Summary received for U.S. Appl. No. 16/582,500, dated Apr. 14, 2023, 4 pages.
Applicant-Initiated Interview Summary received for U.S. Appl. No. 16/582,500, dated May 4, 2023, 3 pages.
Corrected Notice of Allowance received for U.S. Appl. No. 17/370,505, dated Apr. 28, 2023, 5 pages.
Office Action received for Australian Patent Application No. 2022203285, dated Apr. 20, 2023, 4 pages.
Office Action received for Australian Patent Application No. 2022203285, dated Jan. 18, 2023, 3 pages.
Office Action received for Chinese Patent Application No. 201780053143.0, dated Nov. 30, 2022, 13 pages (6 pages of English Translation and 7 pages of Official Copy).
Office Action received for Japanese Patent Application No. 2019-563560, dated Jan. 20, 2023, 56 pages (25 pages of English Translation and 31 pages of Official Copy).
Applicant-Initiated Interview Summary received for U.S. Appl. No. 17/461,014, dated Feb. 21, 2023, 3 pages.
Corrected Notice of Allowance received for U.S. Appl. No. 17/370,505, dated Mar. 8, 2023, 5 pages.
Final Office Action received for U.S. Appl. No. 16/583,706, dated Feb. 17, 2023, 38 pages.
Intention to Grant received for European Patent Application No. 21166287.9, dated Feb. 23, 2023, 9 pages.
Notice of Allowance received for Japanese Patent Application No. 2021-153573, dated Feb. 17, 2023, 4 pages (1 page of English Translation and 3 pages of Official Copy).
Applicant Initiated Interview Summary received for U.S. Appl. No. 17/725,311, dated Jun. 30, 2023, 5 pages.
Notice of Allowance received for Korean Patent Application No. 10-2022-7009437, dated Jun. 22, 2023, 7 pages (2 pages of English Translation and 5 pages of Official Copy).
Supplemental Notice of Allowance received for U.S. Appl. No. 17/337,164, dated Jun. 26, 2023, 3 pages.
Applicant-Initiated Interview Summary received for U.S. Appl. No. 16/582,500, dated Aug. 1, 2023, 2 pages.
Examiner's Answer to Appeal Brief received for U.S. Appl. No. 16/583,706, mailed on Aug. 1, 2023, 29 pages.
IGN, "Create a Sim", The Sims 4 Wiki Guide, Available Online at: https://www.ign.com/wikis/the-sims-4/Create_a_Sim, Jun. 27, 2018, 17 pages.
Office Action received for Australian Patent Application No. 2021290132, dated Jul. 25, 2023, 3 pages.

(56) References Cited

OTHER PUBLICATIONS

Office Action received for Australian Patent Application No. 2023200867, dated Jul. 21, 2023, 3 pages.
Extended European Search Report received for European Patent Application No. 23168077.8, dated Jul. 11, 2023, 12 pages.
Notice of Allowance received for Korean Patent Application No. 10-2023-7021441, dated Jul. 6, 2023, 8 pages (2 pages of English Translation and 6 pages of Official Copy).
Office Action received for Japanese Patent Application No. 2021-173713, dated Jun. 15, 2023, 4 pages (2 pages of English Translation and 2 pages of Official Copy).
International Preliminary Report on Patentability received for PCT Patent Application No. PCT/US2021/033320, dated Dec. 22, 2022, 14 pages.
Corrected Notice of Allowance received for U.S. Appl. No. 17/370,505, dated Apr. 4, 2023, 5 pages.
Final Office Action received for U.S. Appl. No. 17/461,014, dated Apr. 6, 2023, 24 pages.
Notice of Allowance received for Korean Patent Application No. 10-2022-7029803, dated Mar. 23, 2023, 8 pages (2 pages of English Translation and 6 pages of Official Copy).
Takahashi et al., "Neural network modeling of altered facial expression recognition in autism spectrum disorders based on predictive processing framework", Scientific reports, Online available at:- https://www.nature.com/articles/s41598-021-94067-x, Jul. 26, 2021, 14 pages.
Intention to Grant received for European Patent Application No. 20722020.3, dated Jun. 7, 2023, 10 pages.
Notice of Acceptance received for Australian Patent Application No. 2022203285, dated Jun. 16, 2023, 3 pages.
Office Action received for Australian Patent Application No. 2021290132, dated Jun. 3, 2023, 3 pages.
Decision to Refuse received for Japanese Patent Application No. 2021-168243, dated Aug. 14, 2023, 7 pages (3 pages of English Translation and 4 pages of Official Copy).
Office Action received for European Patent Application No. 21733268.3, dated Aug. 8, 2023, 7 pages.
Pang et al., "Approaches to uncertainty visualization", The Visual Computer, vol. 13, No. 8, 1997, pp. 370-390.
Decision to Grant received for European Patent Application No. 19181242.9, dated Mar. 23, 2023, 3 pages.
Office Action received for European Patent Application No. 20704768.9, dated Mar. 24, 2023, 8 pages.
Office Action received for Indian Patent Application No. 202015008747, dated Mar. 15, 2023, 10 pages.
Non-Final Office Action received for U.S. Appl. No. 17/725,311, dated May 10, 2023, 54 pages.
Final Office Action received for U.S. Appl. No. 16/582,500, dated Feb. 3, 2023, 24 pages.
IGN, "Create a Sim", The Sims 4 Wiki Guide, Available Online at: https://www.ign.conn/wikis/the-sinns-4/Create_a_Sinn, Jun. 27, 2018, 17 pages.
Notice of Allowance received for U.S. Appl. No. 17/337,164, dated Feb. 7, 2023, 9 pages.
Notice of Allowance received for U.S. Appl. No. 17/370,505, dated Feb. 2, 2023, 8 pages.
Office Action received for Indian Patent Application No. 202215026505, dated Feb. 8, 2023, 9 pages.
Office Action received for Japanese Patent Application No. 2021-168243, dated Feb. 6, 2023, 8 pages (4 pages of English Translation and 4 pages of Official Copy).
Office Action received for Korean Patent Application No. 10-2022-7004578, dated Jan. 27, 2023, 8 pages (4 pages of English Translation and 4 pages of Official Copy).
Notice of Allowance received for U.S. Appl. No. 17/337,164, dated Jun. 6, 2023, 11 pages.
Office Action received for European Patent Application No. 22154034.7, dated May 26, 2023, 10 pages.
Office Action received for Korean Patent Application No. 10-2022-7004578, dated May 11, 2023, 8 pages (4 pages of English Translation and 4 pages of Official Copy).
Intention to Grant received for European Patent Application No. 18732519.6, dated Dec. 15, 2023, 10 pages.
Notice of Acceptance received for Australian Patent Application No. 2023233200, dated Oct. 17, 2023, 3 pages.
Decision on Appeal received for Korean Patent Application No. 10-2022-7004578, dated Oct. 31, 2023, 26 pages (5 pages of English Translation and 21 pages of Official Copy).
Office Action received for Japanese Patent Application No. 2022-163568, dated Dec. 22. 2023, 8 pages (4 pages of English Translation and 4 pages of Official Copy).
Krotov Ilya, "Bellus3D app experience", Available online at: https://www.youtube.com/watch?v=aSu6881Y26c&t=45s, Aug. 17, 2021, 2 pages.
Notice of Acceptance received for Australian Patent Application No. 2023200867, dated Sep. 13, 2023, 3 pages.
Notice of Allowance received for Korean Patent Application No. 10-2021-7036424, dated Sep. 11, 2023, 7 pages (2 pages of English Translation and 5 pages of Official Copy).
Office Action received for Australian Patent Application No. 2023201250, dated Sep. 11, 2023, 3 pages.
Final Office Action received for U.S. Appl. No. 17/725,311, dated Oct. 13, 2023, 66 pages.
Non-Final Office Action received for U.S. Appl. No. 16/582,500, dated Oct. 13, 2023, 25 pages.
Notice of Acceptance received for Australian Patent Application No. 2021290132, dated Sep. 29, 2023, 3 pages.
Office Action received for European Patent Application No. 19186042.8, dated Oct. 10, 2023, 6 pages.
Intention to Grant received for European Patent Application No. 20722020.3, dated Nov. 22, 2023, 10 pages.
International Search Report and Written Opinion received for PCT Patent Application No. PCT/US2023/023273, dated Sep. 15, 2023, 19 pages.
Notice of Acceptance received for Australian Patent Application No. 2023201250, dated Nov. 21, 2023, 3 pages.
Office Action received for Indian Patent Application No. 202118051150, dated Nov. 24, 2023, 5 pages.
Pre-Appeal Review Report received for Japanese Patent Application No. 2021-173713, dated Nov. 10, 2023, 4 pages (2 pages of English Translation and 2 pages of Official Copy).
Office Action received for Chinese Patent Application No. 201880004632.1, mailed on Jan. 31, 2024, 7 pages (3 pages of English Translation and 4 pages of Official Copy).
Decision to Grant received for European Patent Application No. 18732519.6, mailed on Mar. 28, 2024, 4 pages.
Applicant-Initiated Interview Summary received for U.S. Appl. No. 16/582,500, mailed on Feb. 20, 2024, 3 pages.
Applicant-Initiated Interview Summary received for U.S. Appl. No. 17/725,311, mailed on Jan. 16, 2024, 6 pages.
Applicant-Initiated Interview Summary received for U.S. Appl. No. 18/138,634, mailed on Feb. 9, 2024, 4 pages.
Corrected Notice of Allowance received for U.S. Appl. No. 17/725,311, mailed on Mar. 28, 2024, 2 pages.
Decision to Grant received for European Patent Application No. 20722020.3, mailed on Mar. 21, 2024, 4 pages.
Examiner's Answer to Appeal Brief received for U.S. Appl. No. 17/461,014, mailed on Jan. 29, 2024, 13 pages.
Extended European Search Report received for European Patent Application No. 23198442.8, mailed on Dec. 12, 2023, 5 pages.
Intention to Grant received for European Patent Application No. 23198442.8, mailed on Mar. 18, 2024, 9 pages.
Non-Final Office Action received for U.S. Appl. No. 18/138,634, mailed on Jan. 16, 2024, 14 pages.
Non-Final Office Action received for U.S. Appl. No. 18/220,200, mailed on Mar. 27, 2024, 38 pages.
Notice of Allowance received for Japanese Patent Application No. 2022-186563, mailed on Mar. 1, 2024, 4 pages (1 page of English Translation and 3 pages of Official Copy).
Notice of Allowance received for U.S. Appl. No. 17/725,311, mailed on Feb. 14, 2024, 8 pages.

(56) References Cited

OTHER PUBLICATIONS

Notice of Allowance received for U.S. Appl. No. 18/138,634, mailed on Apr. 18, 2024, 9 pages.
Office Action received for Australian Patent Application No. 2023200797, mailed on Jan. 23, 2024, 5 pages.
Office Action received for European Patent Application No. 21733268.3, mailed on Jan. 29, 2024, 7 pages.
Office Action received for European Patent Application No. 22154034.7, mailed on Feb. 19, 2024, 8 pages.
Office Action received for Japanese Patent Application No. 2021-168243, mailed on Mar. 8, 2024, 4 pages (2 pages of English Translation and 2 pages of Official Copy).
Office Action received for Japanese Patent Application No. 2022-573765, mailed on Feb. 5, 2024, 14 pages (7 pages of English Translation and 7 pages of Official Copy).
Office Action received for Korean Patent Application No. 10-2023-7025821, mailed on Mar. 12, 2024, 11 pages (5 pages of English Translation and 6 pages of Official Copy).
Office Action received for Korean Patent Application No. 10-2023-7032383, mailed on Feb. 5, 2024, 16 pages (7 pages of English Translation and 9 pages of Official Copy).
Record of Oral Hearing received for U.S. Appl. No. 16/583,706, mailed on Mar. 5, 2024, 13 pages.
Summons to Attend Oral Proceedings received for European Patent Application No. 20191533.7, mailed on Feb. 13, 2024, 7 pages.
Office Action received for Chinese Patent Application No. 201880004632.1, mailed on Apr. 3, 2024, 13 pages (7 pages of English Translation and 6 pages of Official Copy).

* cited by examiner

Figure 9A:
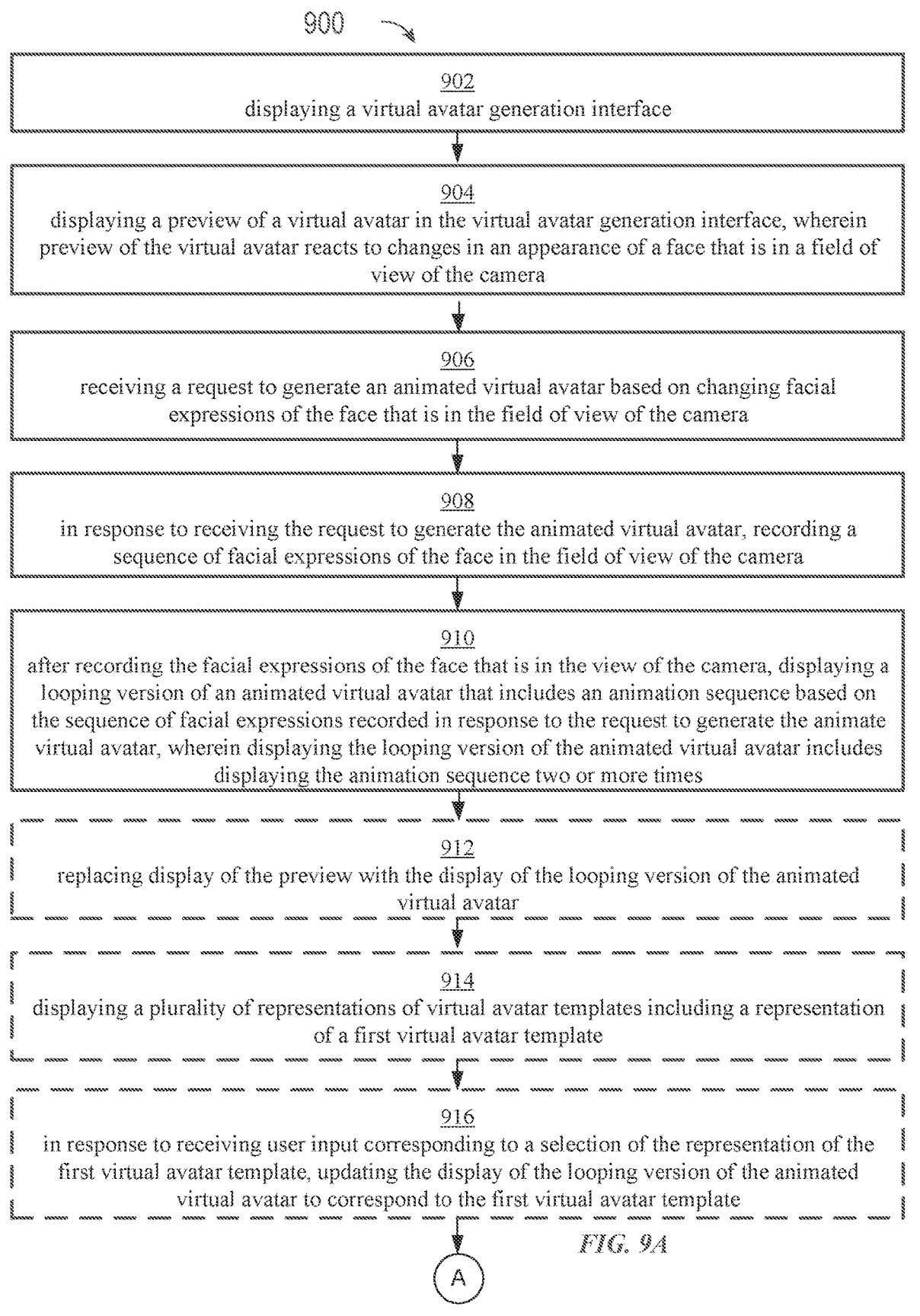

900

902
displaying a virtual avatar generation interface 904
displaying a preview of a virtual avatar in the virtual avatar generation interface, wherein preview of the virtual avatar reacts to changes in an appearance of a face that is in a field of view of the camera 906
receiving a request to generate an animated virtual avatar based on changing facial expressions of the face that is in the field of view of the camera 908
in response to receiving the request to generate the animated virtual avatar, recording a sequence of facial expressions of the face in the field of view of the camera 910
after recording the facial expressions of the face that is in the view of the camera, displaying a looping version of an animated virtual avatar that includes an animation sequence based on the sequence of facial expressions recorded in response to the request to generate the animate virtual avatar, wherein displaying the looping version of the animated virtual avatar includes displaying the animation sequence two or more times 912
replacing display of the preview with the display of the looping version of the animated virtual avatar 914
displaying a plurality of representations of virtual avatar templates including a representation of a first virtual avatar template 916
in response to receiving user input corresponding to a selection of the representation of the first virtual avatar template, updating the display of the looping version of the animated virtual avatar to correspond to the first virtual avatar template

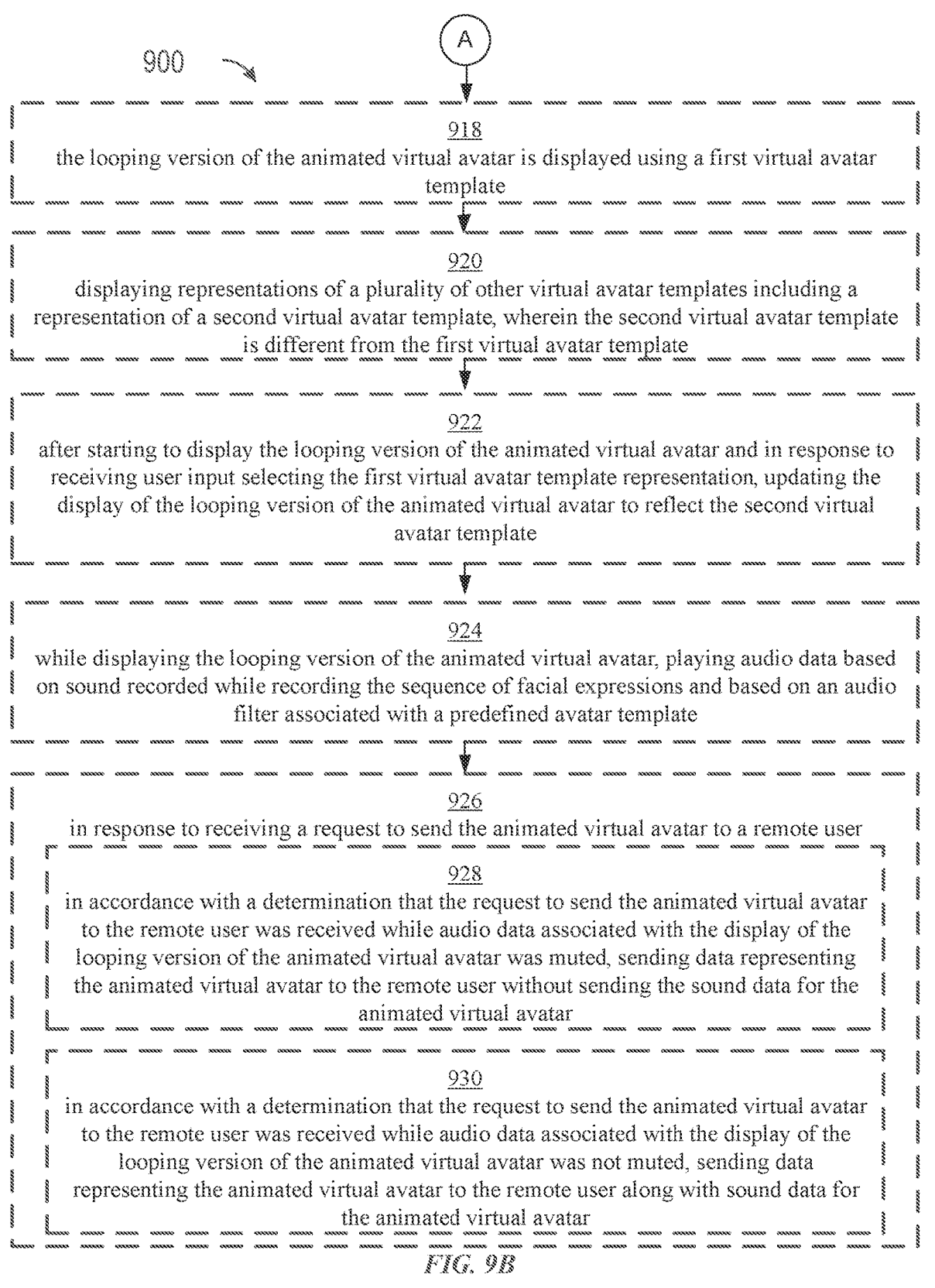

918
the looping version of the animated virtual avatar is displayed using a first virtual avatar template 920
displaying representations of a plurality of other virtual avatar templates including a representation of a second virtual avatar template, wherein the second virtual avatar template is different from the first virtual avatar template 922
after starting to display the looping version of the animated virtual avatar and in response to receiving user input selecting the first virtual avatar template representation, updating the display of the looping version of the animated virtual avatar to reflect the second virtual avatar template 924
while displaying the looping version of the animated virtual avatar, playing audio data based on sound recorded while recording the sequence of facial expressions and based on an audio filter associated with a predefined avatar template 926
in response to receiving a request to send the animated virtual avatar to a remote user 928
in accordance with a determination that the request to send the animated virtual avatar to the remote user was received while audio data associated with the display of the looping version of the animated virtual avatar was muted, sending data representing the animated virtual avatar to the remote user without sending the sound data for the animated virtual avatar 930
in accordance with a determination that the request to send the animated virtual avatar to the remote user was received while audio data associated with the display of the looping version of the animated virtual avatar was not muted, sending data representing the animated virtual avatar to the remote user along with sound data for the animated virtual avatar

*FIG. 9B*

Figure 18B:
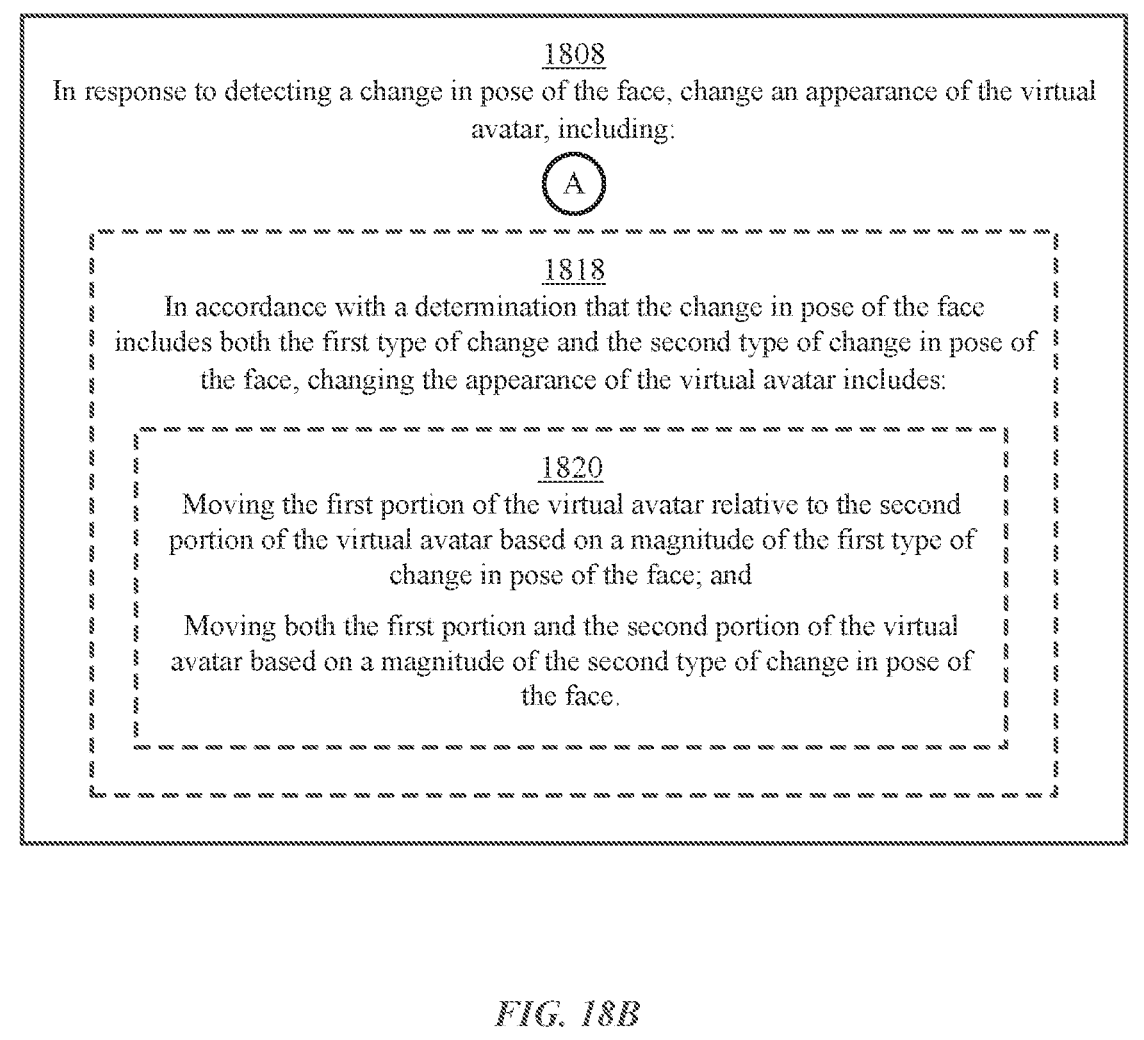

1808
In response to detecting a change in pose of the face, change an appearance of the virtual avatar, including:

(A)

1818
In accordance with a determination that the change in pose of the face includes both the first type of change and the second type of change in pose of the face, changing the appearance of the virtual avatar includes:

1820
Moving the first portion of the virtual avatar relative to the second portion of the virtual avatar based on a magnitude of the first type of change in pose of the face; and Moving both the first portion and the second portion of the virtual avatar based on a magnitude of the second type of change in pose of the face.

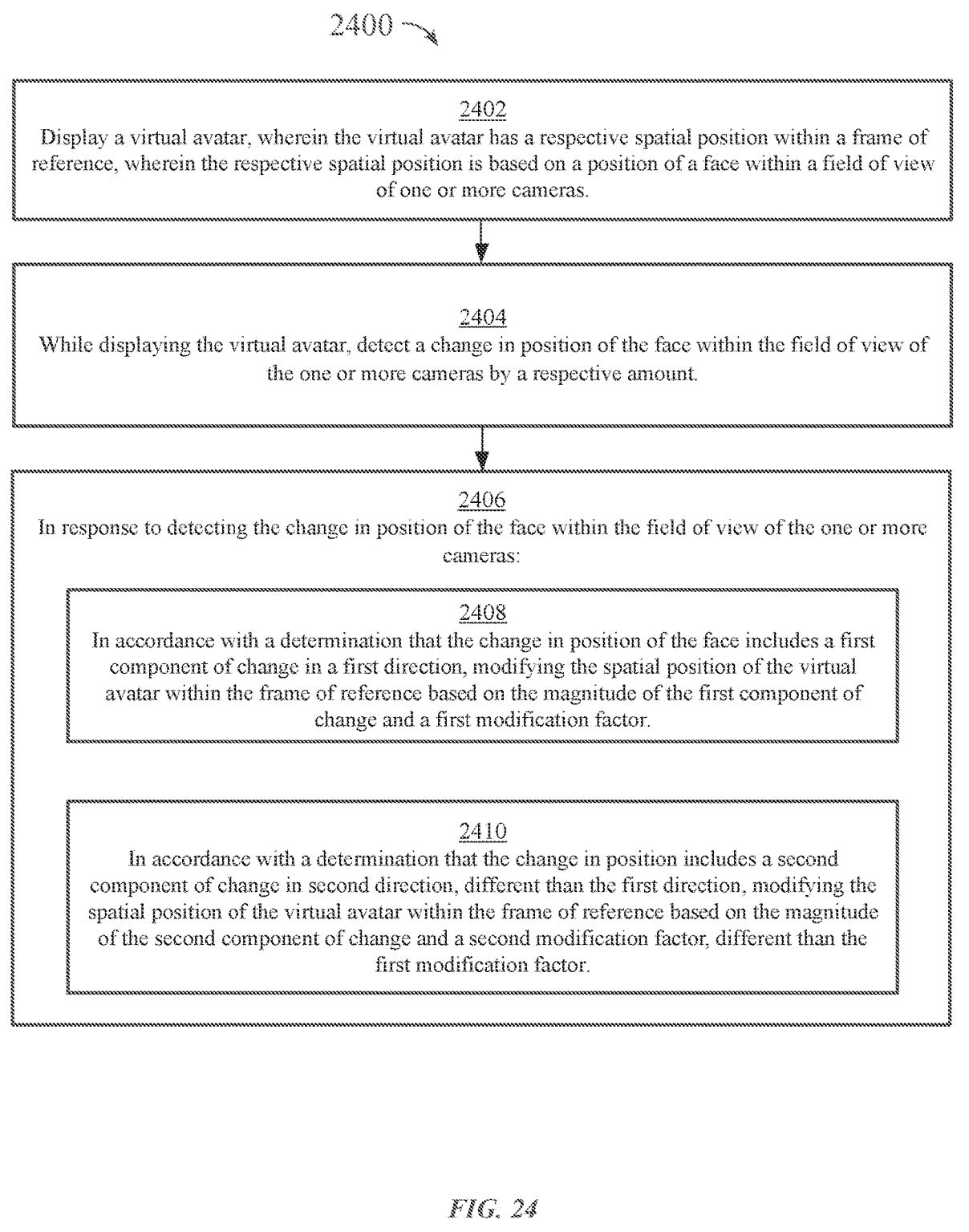

2402
Display a virtual avatar, wherein the virtual avatar has a respective spatial position within a frame of reference, wherein the respective spatial position is based on a position of a face within a field of view of one or more cameras.

2404
While displaying the virtual avatar, detect a change in position of the face within the field of view of the one or more cameras by a respective amount.

2406
In response to detecting the change in position of the face within the field of view of the one or more cameras:

2408
In accordance with a determination that the change in position of the face includes a first component of change in a first direction, modifying the spatial position of the virtual avatar within the frame of reference based on the magnitude of the first component of change and a first modification factor.

2410
In accordance with a determination that the change in position includes a second component of change in second direction, different than the first direction, modifying the spatial position of the virtual avatar within the frame of reference based on the magnitude of the second component of change and a second modification factor, different than the first modification factor.

*FIG. 24*

*FIG. 26C*
2601H
2602H
2603H
2600
2618'
2604
2606
2614'
2616'
2620
BRING YOUR FACE INTO VIEW
2622
2601I
2602I
2603I
BRING YOUR FACE INTO VIEW
2601J
2602J
2603J
BRING YOUR FACE INTO VIEW

EMOJI RECORDING AND SENDING

CROSS-REFERENCE TO RELATED APPLICATIONS

This application is a continuation of U.S. application Ser. No. 17/220,752, filed Apr. 1, 2021, and entitled "Emoji Recording and Sending," which continuation of U.S. application Ser. No. 16/896,457, filed Jun. 9, 2020, and entitled "Emoji Recording and Sending," which is a continuation of U.S. application Ser. No. 16/676,087, filed Nov. 6, 2019, and entitled "Emoji Recording and Sending," which is a continuation of U.S. application Ser. No. 15/981,754, filed May 16, 2018, and entitled "Emoji Recording and Sending," which claims priority to the following: U.S. Provisional Application No. 62/507,177, filed May 16, 2017, and entitled "Emoji Recording and Sending;" U.S. Provisional Application No. 62/556,412, filed Sep. 9, 2017, and entitled "Emoji Recording and Sending;" U.S. Provisional Application No. 62/557,121, filed Sep. 11, 2017, and entitled "Emoji Recording and Sending;" and U.S. Provisional Application No. 62/671,979, filed May 15, 2018, and entitled "Emoji Recording and Sending." The contents of each of these applications are hereby incorporated by reference in their entirety.

FIELD

The present disclosure relates generally to computer user interfaces, and more specifically to techniques for generating, recording, and sending emojis and virtual avatars.

BACKGROUND

Multimedia content, such as emojis and virtual avatars, are sometimes sent as part of messaging communications. The emojis and virtual avatars represent a variety of predefined people, objects, actions, and/or other things. Some messaging applications allow users to select from a predefined library of emojis and virtual avatars which are sent as part of a message that can contain other content (e.g., other multimedia and/or textual content). Stickers are another type of multimedia content that are sometimes sent with messaging applications. In some ways, stickers are similar to emojis and virtual avatars in that they can represent people, objects, actions, and/or other things. Some stickers and/or messaging applications allow for stickers to be associated with previously sent or received messages.

BRIEF SUMMARY

Some techniques for generating, sending, and receiving emojis and virtual avatars using electronic devices, however, are generally cumbersome and inefficient. For example, some existing techniques use a complex and time-consuming user interface, which may include multiple key presses or keystrokes. Some other existing techniques use complex and time consuming methods for manipulating and generating emojis and virtual avatars, which may include requiring the user to provide a large number of inputs to achieve the desired emoji (e.g., desired animated or dynamic emoji). Existing techniques require more time than necessary, wasting user time and device energy. This latter consideration is particularly important in battery-operated devices.

Accordingly, the present technique provides electronic devices with faster, more efficient methods and interfaces for sending and receiving emojis and virtual avatars. Such methods and interfaces optionally complement or replace other methods for sending and receiving emojis. Such methods and interfaces reduce the cognitive burden on a user and produce a more efficient human-machine interface. For battery-operated computing devices, such methods and interfaces conserve power and increase the time between battery charges.

In accordance with some embodiments, a method performed at an electronic device with a display and a camera is described. The method comprises: displaying a virtual avatar generation interface; displaying a preview of a virtual avatar in the virtual avatar generation interface, wherein the preview of the virtual avatar reacts to changes in an appearance of a face that is in a field of view of the camera; while displaying the preview of the virtual avatar, detecting an input in the virtual avatar generation interface; in response to detecting the input in the virtual avatar generation interface: in accordance with a determination that the input starts on the preview of the virtual avatar, generating a static virtual avatar that represents an expression of the face in the field of view of the camera at a respective time, wherein the respective time is determined based on a timing of the input; and in accordance with a determination that the input includes activation of a record affordance in the virtual avatar generation interface, generating an animated virtual avatar that represents a sequences of changes in the expression of the face in the field of view of the camera over a period of time, wherein the period of time is determined based on a timing of the input.

In accordance with some embodiments, a non-transitory computer-readable storage medium is described. The non-transitory computer-readable storage medium storing one or more programs configured to be executed by one or more processors of an electronic device with a display and a camera, the one or more programs including instructions for: displaying a virtual avatar generation interface; displaying a preview of a virtual avatar in the virtual avatar generation interface, wherein the preview of the virtual avatar reacts to changes in an appearance of a face that is in a field of view of the camera; while displaying the preview of the virtual avatar, detecting an input in the virtual avatar generation interface; in response to detecting the input in the virtual avatar generation interface: in accordance with a determination that the input starts on the preview of the virtual avatar, generating a static virtual avatar that represents an expression of the face in the field of view of the camera at a respective time, wherein the respective time is determined based on a timing of the input; and in accordance with a determination that the input includes activation of a record affordance in the virtual avatar generation interface, generating an animated virtual avatar that represents a sequences of changes in the expression of the face in the field of view of the camera over a period of time, wherein the period of time is determined based on a timing of the input.

In accordance with some embodiments, a transitory computer-readable storage medium is described. The non-transitory computer-readable storage medium storing one or more programs configured to be executed by one or more processors of an electronic device with a display and a camera, the one or more programs including instructions for: displaying a virtual avatar generation interface; displaying a preview of a virtual avatar in the virtual avatar generation interface, wherein the preview of the virtual avatar reacts to changes in an appearance of a face that is in a field of view of the camera; while displaying the preview of the virtual avatar, detecting an input in the virtual avatar generation interface; in response to detecting the input in the virtual avatar generation interface: in accordance with a determination that the input starts on the preview of the virtual avatar, generating a static virtual avatar that represents an expression of the face in the field of view of the camera at a respective time, wherein the respective time is determined based on a timing of the input; and in accordance with a determination that the input includes activation of a record affordance in the virtual avatar generation interface, generating an animated virtual avatar that represents a sequences of changes in the expression of the face in the field of view of the camera over a period of time, wherein the period of time is determined based on a timing of the input.

In accordance with some embodiments, an electronic device is described. The electronic device comprises: a display; a camera; one or more processors; and memory storing one or more programs configured to be executed by the one or more processors, the one or more programs including instructions for: displaying a virtual avatar generation interface; displaying a preview of a virtual avatar in the virtual avatar generation interface, wherein the preview of the virtual avatar reacts to changes in an appearance of a face that is in a field of view of the camera; while displaying the preview of the virtual avatar, detecting an input in the virtual avatar generation interface; in response to detecting the input in the virtual avatar generation interface: in accordance with a determination that the input starts on the preview of the virtual avatar, generating a static virtual avatar that represents an expression of the face in the field of view of the camera at a respective time, wherein the respective time is determined based on a timing of the input; and in accordance with a determination that the input includes activation of a record affordance in the virtual avatar generation interface, generating an animated virtual avatar that represents a sequences of changes in the expression of the face in the field of view of the camera over a period of time, wherein the period of time is determined based on a timing of the input.

In accordance with some embodiments, an electronic device is described. The electronic device comprises: a camera; a display for displaying a virtual avatar generation interface and displaying a preview of a virtual avatar in the virtual avatar generation interface, wherein the preview of the virtual avatar reacts to changes in an appearance of a face that is in a field of view of the camera; means for, while displaying the preview of the virtual avatar, detecting an input in the virtual avatar generation interface; and means for, in response to detecting the input in the virtual avatar generation interface: in accordance with a determination that the input starts on the preview of the virtual avatar, generating a static virtual avatar that represents an expression of the face in the field of view of the camera at a respective time, wherein the respective time is determined based on a timing of the input; and in accordance with a determination that the input includes activation of a record affordance in the virtual avatar generation interface, generating an animated virtual avatar that represents a sequences of changes in the expression of the face in the field of view of the camera over a period of time, wherein the period of time is determined based on a timing of the input.

In accordance with some embodiments, a method performed at an electronic device with a display and a camera is described. The method comprises: displaying a virtual avatar generation interface; displaying a preview of a virtual avatar in the virtual avatar generation interface, wherein preview of the virtual avatar reacts to changes in an appearance of a face that is in a field of view of the camera; receiving a request to generate an animated virtual avatar based on changing facial expressions of the face that is in the field of view of the camera; in response to receiving the request to generate the animated virtual avatar, recording a sequence of facial expressions of the face in the field of view of the camera; after recording the facial expressions of the face that is in the view of the camera, displaying a looping version of an animated virtual avatar that includes an animation sequence based on the sequence of facial expressions recorded in response to the request to generate the animated virtual avatar, wherein displaying the looping version of the animated virtual avatar includes displaying the animation sequence two or more times.

In accordance with some embodiments, a non-transitory computer-readable storage medium is described. The non-transitory computer-readable storage medium storing one or more programs configured to be executed by one or more processors of an electronic device with a display and a camera, the one or more programs including instructions for: displaying a virtual avatar generation interface; displaying a preview of a virtual avatar in the virtual avatar generation interface, wherein preview of the virtual avatar reacts to changes in an appearance of a face that is in a field of view of the camera; receiving a request to generate an animated virtual avatar based on changing facial expressions of the face that is in the field of view of the camera; in response to receiving the request to generate the animated virtual avatar, recording a sequence of facial expressions of the face in the field of view of the camera; after recording the facial expressions of the face that is in the view of the camera, displaying a looping version of an animated virtual avatar that includes an animation sequence based on the sequence of facial expressions recorded in response to the request to generate the animated virtual avatar, wherein displaying the looping version of the animated virtual avatar includes displaying the animation sequence two or more times.

In accordance with some embodiments, a transitory computer-readable storage medium is described. The non-transitory computer-readable storage medium storing one or more programs configured to be executed by one or more processors of an electronic device with a display and a camera, the one or more programs including instructions for: displaying a virtual avatar generation interface; displaying a preview of a virtual avatar in the virtual avatar generation interface, wherein preview of the virtual avatar reacts to changes in an appearance of a face that is in a field of view of the camera; receiving a request to generate an animated virtual avatar based on changing facial expressions of the face that is in the field of view of the camera; in response to receiving the request to generate the animated virtual avatar, recording a sequence of facial expressions of the face in the field of view of the camera; after recording the facial expressions of the face that is in the view of the camera, displaying a looping version of an animated virtual avatar that includes an animation sequence based on the sequence of facial expressions recorded in response to the request to generate the animated virtual avatar, wherein displaying the looping version of the animated virtual avatar includes displaying the animation sequence two or more times.

In accordance with some embodiments, an electronic device is described. The electronic device comprises: displaying a virtual avatar generation interface; displaying a preview of a virtual avatar in the virtual avatar generation interface, wherein preview of the virtual avatar reacts to changes in an appearance of a face that is in a field of view of the camera; receiving a request to generate an animated virtual avatar based on changing facial expressions of the face that is in the field of view of the camera; in response to receiving the request to generate the animated virtual avatar, recording a sequence of facial expressions of the face in the field of view of the camera; after recording the facial expressions of the face that is in the view of the camera, displaying a looping version of an animated virtual avatar that includes an animation sequence based on the sequence of facial expressions recorded in response to the request to generate the animated virtual avatar, wherein displaying the looping version of the animated virtual avatar includes displaying the animation sequence two or more times.

In accordance with some embodiments, an electronic device is described. The electronic device comprises: a camera; a display for displaying a virtual avatar generation interface and displaying a preview of a virtual avatar in the virtual avatar generation interface, wherein preview of the virtual avatar reacts to changes in an appearance of a face that is in a field of view of the camera; means for receiving a request to generate an animated virtual avatar based on changing facial expressions of the face that is in the field of view of the camera; means for, in response to receiving the request to generate the animated virtual avatar, recording a sequence of facial expressions of the face in the field of view of the camera; means for after recording the facial expressions of the face that is in the view of the camera, causing display of a looping version of an animated virtual avatar that includes an animation sequence based on the sequence of facial expressions recorded in response to the request to generate the animated virtual avatar, wherein displaying the looping version of the animated virtual avatar includes displaying the animation sequence two or more times.

In some embodiments, a method comprises: at an electronic device having a camera and a display: displaying a virtual avatar generation interface; displaying a preview of a virtual avatar in the virtual avatar generation interface, wherein the preview of the virtual avatar reacts to changes in an appearance of a face that is in a field of view of the camera; while displaying the preview of the virtual avatar, detecting an input in the virtual avatar generation interface; in response to detecting the input in the virtual avatar generation interface: in accordance with a determination that the input starts on the preview of the virtual avatar, generating a static virtual avatar that represents an expression of the face in the field of view of the camera at a respective time, wherein the respective time is determined based on a timing of the input; and in accordance with a determination that the input includes activation of a record affordance in the virtual avatar generation interface, generating an animated virtual avatar that represents a sequences of changes in the expression of the face in the field of view of the camera over a period of time, wherein the period of time is determined based on a timing of the input.

In some embodiments, the method comprises: at an electronic device having a camera and a display: displaying a virtual avatar generation interface; displaying a preview of a virtual avatar in the virtual avatar generation interface, wherein preview of the virtual avatar reacts to changes in an appearance of a face that is in a field of view of the camera; receiving a request to generate an animated virtual avatar based on changing facial expressions of the face that is in the field of view of the camera; in response to receiving the request to generate the animated virtual avatar, recording a sequence of facial expressions of the face in the field of view of the camera; after recording the facial expressions of the face that is in the view of the camera, displaying a looping version of an animated virtual avatar that includes an animation sequence based on the sequence of facial expressions recorded in response to the request to generate the animated virtual avatar, wherein displaying the looping version of the animated virtual avatar includes displaying the animation sequence two or more times.

In some embodiments, the method comprises: at an electronic device having one or more cameras and a display apparatus: displaying, via the display apparatus, a virtual avatar that changes appearance in response to changes in a face in a field of view of the one or more cameras, wherein the virtual avatar includes: a first portion, and a second portion that is different from the first portion; while displaying, via the display apparatus, the virtual avatar, detecting a change in pose of the face within the field of view of the one or more cameras; in response to detecting the change in pose of the face, changing an appearance of the virtual avatar, including: in accordance with a determination that the change in pose of the face includes a first type of change in pose of the face, changing the appearance of the virtual avatar includes moving the first portion of the virtual avatar relative to the second portion of the virtual avatar in accordance with a magnitude of the first type of change in pose of the face; and in accordance with a determination that the change in pose of the face includes a second type of change in pose of the face, changing the appearance of the virtual avatar includes moving both the first portion of the virtual avatar and the second portion of the virtual avatar based on a magnitude of the second type of change in pose of the face.

In some embodiments, the method comprises: at an electronic device having one or more cameras and a display apparatus: displaying, via the display apparatus, a virtual avatar, wherein the virtual avatar includes: a first avatar feature reactive to changes in a first physical feature of a face in a field of view of the one or more cameras and a second physical feature of the face within the field of view of the one or more cameras, and a second avatar feature; while displaying, via the display apparatus, the virtual avatar, detecting changes in one or more physical features of the face within the field of view of the one or more cameras; in accordance with a determination that the changes include a change in the first physical feature: modifying the first avatar feature of the virtual avatar based on the change in the first physical feature, and forgoing modifying the second avatar feature based on the change in the first physical feature; and in accordance with a determination that the changes include a change in the second physical feature: modifying the first avatar feature based on the change in the second physical feature, and forgoing modifying the second avatar feature based on the change in the second physical feature.

In some embodiments, the method comprises: at an electronic device having one or more cameras and a display apparatus: displaying, via the display apparatus, a virtual avatar, wherein the virtual avatar includes: a first avatar feature reactive to changes in a first physical feature of a face within the field of view of the one or more cameras; a second avatar feature reactive to changes in the first physical feature; and a third avatar feature not primarily reactive to changes in the first physical feature; while displaying the virtual avatar, detecting changes in the first physical feature; and in response to detecting the changes in the first physical feature: modifying the first avatar feature based on the detected changes in the first physical feature; modifying the second avatar feature base based on the detected changes in the first physical feature; and forgoing modification of the third avatar feature based on the detected changes in the first physical feature.

In some embodiments, the method comprises: at an electronic device having one or more cameras and a display apparatus: displaying, via the display apparatus, a virtual avatar, wherein the virtual avatar includes: a first avatar feature reactive to changes in a first physical feature of a face within the field of view of the one or more cameras; a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature; while displaying the virtual avatar, detecting a first change in a respective physical feature of the face within the field of view of the one or more cameras; and in response to detecting the first change in the respective physical feature, modifying the virtual avatar, including: in accordance with a determination that the detected first change in the respective physical feature is a change in the first physical feature, modifying the first avatar feature to reflect the change in the first physical feature; and in accordance with a determination that the detected first change is a change in the second physical feature and the change in the second physical feature is within the first range of changes, changing the appearance of the second avatar feature in a first manner to reflect the change in the second physical feature; in accordance with a determination that the detected first change is a change in the second physical feature and the change in the second physical feature is within the second range of changes, forgoing changing the appearance of the second avatar feature in the first manner to reflect the change in the second physical feature.

In some embodiments, the method comprises: at an electronic device having one or more cameras and a display apparatus: displaying, via the display apparatus, a virtual avatar, wherein the virtual avatar includes a plurality of avatar features that are reactive to changes in one or more physical features of a face within the field of view of the one or more cameras; while displaying the virtual avatar, detecting a change in a plurality of physical features of the face, the plurality of physical features of the face including a first physical feature that corresponds to one or more of the plurality of avatar features and a second physical feature that does not correspond to any of the plurality of avatar features; and in response to detecting the change in the plurality of physical features of the face: changing an appearance of a respective avatar feature of the plurality of avatar features wherein a magnitude and/or direction of change of the respective avatar feature is based on a magnitude or direction of change in the first physical feature; and deforming a portion of the virtual avatar that did not include an avatar feature prior to detecting the change in the one or more physical features of the face, wherein a magnitude and/or direction of deforming the portion of the avatar feature is based on the magnitude and/or direction of change in the second physical feature.

In some embodiments, the method comprises: at an electronic device having one or more cameras and a display apparatus: displaying, via the display apparatus, a virtual avatar, wherein the virtual avatar includes: a first avatar feature reactive to changes in a first physical feature of a face within the field of view of the one or more cameras; while displaying the virtual avatar, detecting a change in the first physical feature with a first physical-feature-change magnitude; in response to detecting the change in the first physical feature: in accordance with a determination that the change in the first physical feature is within a first range of physical feature values, changing the first avatar feature by a first avatar-feature-change magnitude that is based on the first physical-feature-change magnitude; and in accordance with a determination that the change in the first physical feature is within a second range of physical feature values that is different from the first range of physical feature values, changing the first avatar feature by a second avatar-feature-change magnitude that is different from the first avatar-feature-change magnitude and is based on the first physical-feature-change magnitude.

In some embodiments, the method comprises: at an electronic device having one or more cameras and a display apparatus: displaying, via the display apparatus, a virtual avatar, wherein the virtual avatar has a respective spatial position within a frame of reference, wherein the respective spatial position is based on a position of a face within a field of view of the one or more cameras; while displaying the virtual avatar, detecting a change in position of the face within the field of view of the one or more cameras by a respective amount; in response to detecting the change in position of the face within the field of view of the one or more cameras: in accordance with a determination that the change in position of the face includes a first component of change in a first direction, modifying the spatial position of the virtual avatar within the frame of reference based on the magnitude of the first component of change and a first modification factor; and in accordance with a determination that the change in position includes a second component of change in second direction, different than the first direction, modifying the spatial position of the virtual avatar within the frame of reference based on the magnitude of the second component of change and a second modification factor, different than the first modification factor.

In some embodiments, the method comprises: at an electronic device having one or more cameras and a display apparatus: displaying, via the display apparatus, a virtual avatar, wherein the virtual avatar is reactive to changes in one or more physical features of a face within a field of view of the one or more cameras; while displaying the virtual avatar, detecting a first configuration of one or more physical features of the face; while detecting the first configuration of one or more physical features of the face: in accordance with a determination that the first configuration of one or more physical features satisfies animation criteria, the animation criteria including a requirement that the first configuration is maintained for at least a first threshold amount of time in order for the animation criteria to be met, modifying the virtual avatar to include a first animated effect; and in accordance with the first configuration of one or more physical features not satisfying the animation criteria, forgoing modification of the virtual avatar to include the first animated effect.

A method is described. The method is performed at an electronic device having a display apparatus and one or more cameras. The method comprises: displaying, via the display apparatus, a virtual avatar, having a plurality of avatar features, that changes appearance in response to detected changes in pose of a face in a field of view of the one or more cameras, the face including a plurality of detected facial features, including a first facial feature; after the face was detected in the field of view of the one or more cameras with a first change in pose, the first change in pose including a change to the first facial feature, determining that tracking of the face in the field of view of the one or more cameras has failed; and in response to determining that tracking of the face in the field of view of the one or more cameras has failed, updating an appearance of a first avatar feature of the plurality of avatar features after tracking of the face failed, wherein the appearance of the first avatar feature is updated based on change characteristics of the first facial feature that were detected prior to determining that tracking of the face has failed, wherein updating the appearance of the first avatar feature includes: in accordance with a determination that the first facial feature had first change characteristics prior to detecting that tracking of the face failed, updating the appearance of the first avatar feature of the virtual avatar to a first appearance that is different from an appearance of the avatar when tracking of the face failed; and in accordance with a determination that the first facial feature had second change characteristics, different from the first change characteristics prior to detecting that tracking of the face failed, updating the appearance of the first avatar feature of the virtual avatar to a second appearance that is different from the appearance of the avatar when tracking of the face failed and different from the first appearance.

A non-transitory computer-readable storage medium is described. The non-transitory computer-readable storage medium stores one or more programs configured to be executed by one or more processors of an electronic device with a display apparatus and one or more cameras. The one or more programs including instructions for: displaying, via the display apparatus, a virtual avatar, having a plurality of avatar features, that changes appearance in response to detected changes in pose of a face in a field of view of the one or more cameras, the face including a plurality of detected facial features, including a first facial feature; after the face was detected in the field of view of the one or more cameras with a first change in pose, the first change in pose including a change to the first facial feature, determining that tracking of the face in the field of view of the one or more cameras has failed; and in response to determining that tracking of the face in the field of view of the one or more cameras has failed, updating an appearance of a first avatar feature of the plurality of avatar features after tracking of the face failed, wherein the appearance of the first avatar feature is updated based on change characteristics of the first facial feature that were detected prior to determining that tracking of the face has failed, wherein updating the appearance of the first avatar feature includes: in accordance with a determination that the first facial feature had first change characteristics prior to detecting that tracking of the face failed, updating the appearance of the first avatar feature of the virtual avatar to a first appearance that is different from an appearance of the avatar when tracking of the face failed; and in accordance with a determination that the first facial feature had second change characteristics, different from the first change characteristics prior to detecting that tracking of the face failed, updating the appearance of the first avatar feature of the virtual avatar to a second appearance that is different from the appearance of the avatar when tracking of the face failed and different from the first appearance.

A transitory computer-readable storage medium is described. The transitory computer-readable storage medium stores one or more programs configured to be executed by one or more processors of an electronic device with a display apparatus and one or more cameras. The one or more programs including instructions for: displaying, via the display apparatus, a virtual avatar, having a plurality of avatar features, that changes appearance in response to detected changes in pose of a face in a field of view of the one or more cameras, the face including a plurality of detected facial features, including a first facial feature; after the face was detected in the field of view of the one or more cameras with a first change in pose, the first change in pose including a change to the first facial feature, determining that tracking of the face in the field of view of the one or more cameras has failed; and in response to determining that tracking of the face in the field of view of the one or more cameras has failed, updating an appearance of a first avatar feature of the plurality of avatar features after tracking of the face failed, wherein the appearance of the first avatar feature is updated based on change characteristics of the first facial feature that were detected prior to determining that tracking of the face has failed, wherein updating the appearance of the first avatar feature includes: in accordance with a determination that the first facial feature had first change characteristics prior to detecting that tracking of the face failed, updating the appearance of the first avatar feature of the virtual avatar to a first appearance that is different from an appearance of the avatar when tracking of the face failed; and in accordance with a determination that the first facial feature had second change characteristics, different from the first change characteristics prior to detecting that tracking of the face failed, updating the appearance of the first avatar feature of the virtual avatar to a second appearance that is different from the appearance of the avatar when tracking of the face failed and different from the first appearance.

An electronic device is described. The electronic device comprises: a display apparatus; one or more cameras; one or more processors; and memory storing one or more programs configured to be executed by the one or more processors, the one or more programs including instructions for: displaying, via the display apparatus, a virtual avatar, having a plurality of avatar features, that changes appearance in response to detected changes in pose of a face in a field of view of the one or more cameras, the face including a plurality of detected facial features, including a first facial feature; after the face was detected in the field of view of the one or more cameras with a first change in pose, the first change in pose including a change to the first facial feature, determining that tracking of the face in the field of view of the one or more cameras has failed; and in response to determining that tracking of the face in the field of view of the one or more cameras has failed, updating an appearance of a first avatar feature of the plurality of avatar features after tracking of the face failed, wherein the appearance of the first avatar feature is updated based on change characteristics of the first facial feature that were detected prior to determining that tracking of the face has failed, wherein updating the appearance of the first avatar feature includes: in accordance with a determination that the first facial feature had first change characteristics prior to detecting that tracking of the face failed, updating the appearance of the first avatar feature of the virtual avatar to a first appearance that is different from an appearance of the avatar when tracking of the face failed; and in accordance with a determination that the first facial feature had second change characteristics, different from the first change characteristics prior to detecting that tracking of the face failed, updating the appearance of the first avatar feature of the virtual avatar to a second appearance that is different from the appearance of the avatar when tracking of the face failed and different from the first appearance.

An electronic device is described. The electronic device comprises: a display apparatus; one or more cameras; means for displaying, via the display apparatus, a virtual avatar, having a plurality of avatar features, that changes appearance in response to detected changes in pose of a face in a field of view of the one or more cameras, the face including a plurality of detected facial features, including a first facial feature; means for determining that tracking of the face in the field of view of the one or more cameras has failed after the face was detected in the field of view of the one or more cameras with a first change in pose, the first change in pose including a change to the first facial feature; and means for updating an appearance of a first avatar feature of the plurality of avatar features after tracking of the face failed, in response to determining that tracking of the face in the field of view of the one or more cameras has failed, wherein the appearance of the first avatar feature is updated based on change characteristics of the first facial feature that were detected prior to determining that tracking of the face has failed, wherein updating the appearance of the first avatar feature includes: in accordance with a determination that the first facial feature had first change characteristics prior to detecting that tracking of the face failed, updating the appearance of the first avatar feature of the virtual avatar to a first appearance that is different from an appearance of the avatar when tracking of the face failed; and in accordance with a determination that the first facial feature had second change characteristics, different from the first change characteristics prior to detecting that tracking of the face failed, updating the appearance of the first avatar feature of the virtual avatar to a second appearance that is different from the appearance of the avatar when tracking of the face failed and different from the first appearance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for generating, sending, and receiving emojis, thereby increasing the effectiveness, efficiency, and user satisfaction with such devices. Such methods and interfaces may complement or replace other methods for sending and receiving emojis.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9B are a flow diagram illustrating a method for generating and sending emojis, stickers, virtual avatars, and/or other multimedia content.

FIG. 18A-18B is a flow diagram illustrating a method for generating and modifying a virtual avatar based on a face detected by one or more cameras.

FIG. 24 is a flow diagram illustrating a method for generating and modifying a virtual avatar based on a face detected by one or more cameras.

DESCRIPTION OF EMBODIMENTS

Figure 1A:
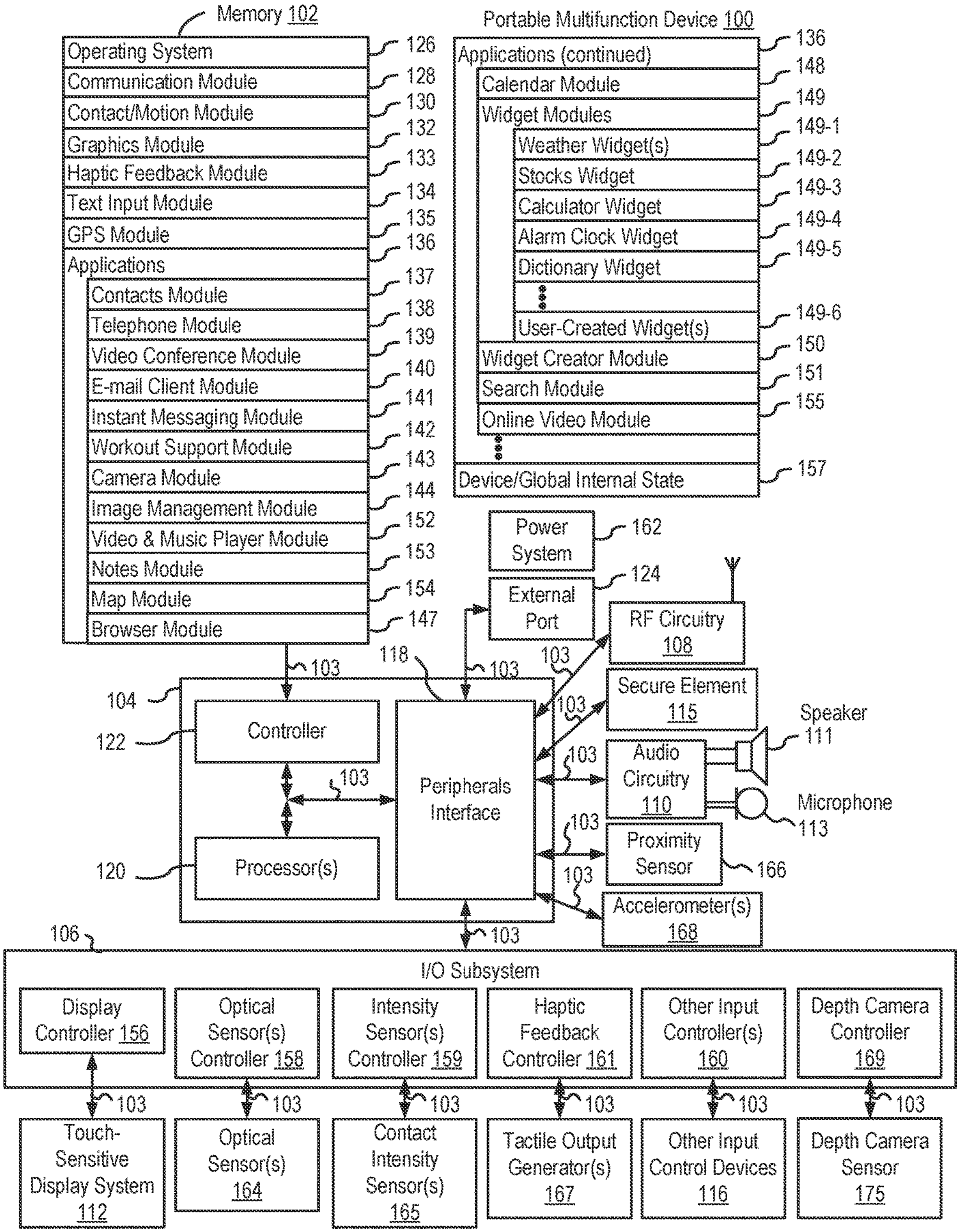
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

Sending messages with multimedia content with, or in place of, text content has the potential to better communicate a sender's message. For example, multimedia content such as virtual avatars (e.g., animated or static emojis or stickers) can provide context and/or tone (e.g., what might be called "non-verbal communication") that would be cumbersome or impossible to communicate with text alone. In some cases, predefined virtual avatars can be used to provide some of this context and/or tone. Predefined content, however, cannot cover every situation or provide finely tuned context or tone. Accordingly, there is a need for electronic devices that provide efficient methods and interfaces for generating, sending, and receiving virtual avatars as part of messages. Such techniques can reduce the cognitive burden on a user who is sending and receiving messages, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for generating, sending, and receiving virtual avatars. FIGS. 6A-6MM and 7A-7J illustrate exemplary user interfaces for receiving, generating, modifying, and sending virtual avatars. FIGS. 8A-8B and 9A-9B are flow diagrams illustrating exemplary methods for receiving, generating, modifying, and sending virtual avatars. The user interfaces in FIGS. 6A-6MM and 7A-7J are used to illustrate the processes described below, including the processes in FIGS. 8A-8B and 9A-9B. FIGS. 10A-10I, 11A-11C, 12A-12C, 13, 14A-14D, 15A-15B, 16A-16B, 17A-17B, and 26A-26H illustrate exemplary user interfaces for generating and modifying virtual avatars, in accordance with some embodiments. The user interfaces in these figures are used to illustrate the processes described below, including the processes in FIGS. 18A, 18B, 19, 20, 21, 22, 23, 24, 25, and 27. The user interfaces of FIGS. 10A-10I, 11A-11C, 12A-12C, 13, 14A-14D, 15A-15B, 16A-16B, 17A-17B, and 26A-26H and the processes of FIGS. 18A, 18B, 19, 20, 21, 22, 23, 24, 25, and 27 may be used to generate virtual avatars for use in interfaces of FIGS. 6A-6MM and 7A-7J and the processes of FIGS. 8A-8B and 9A-9B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
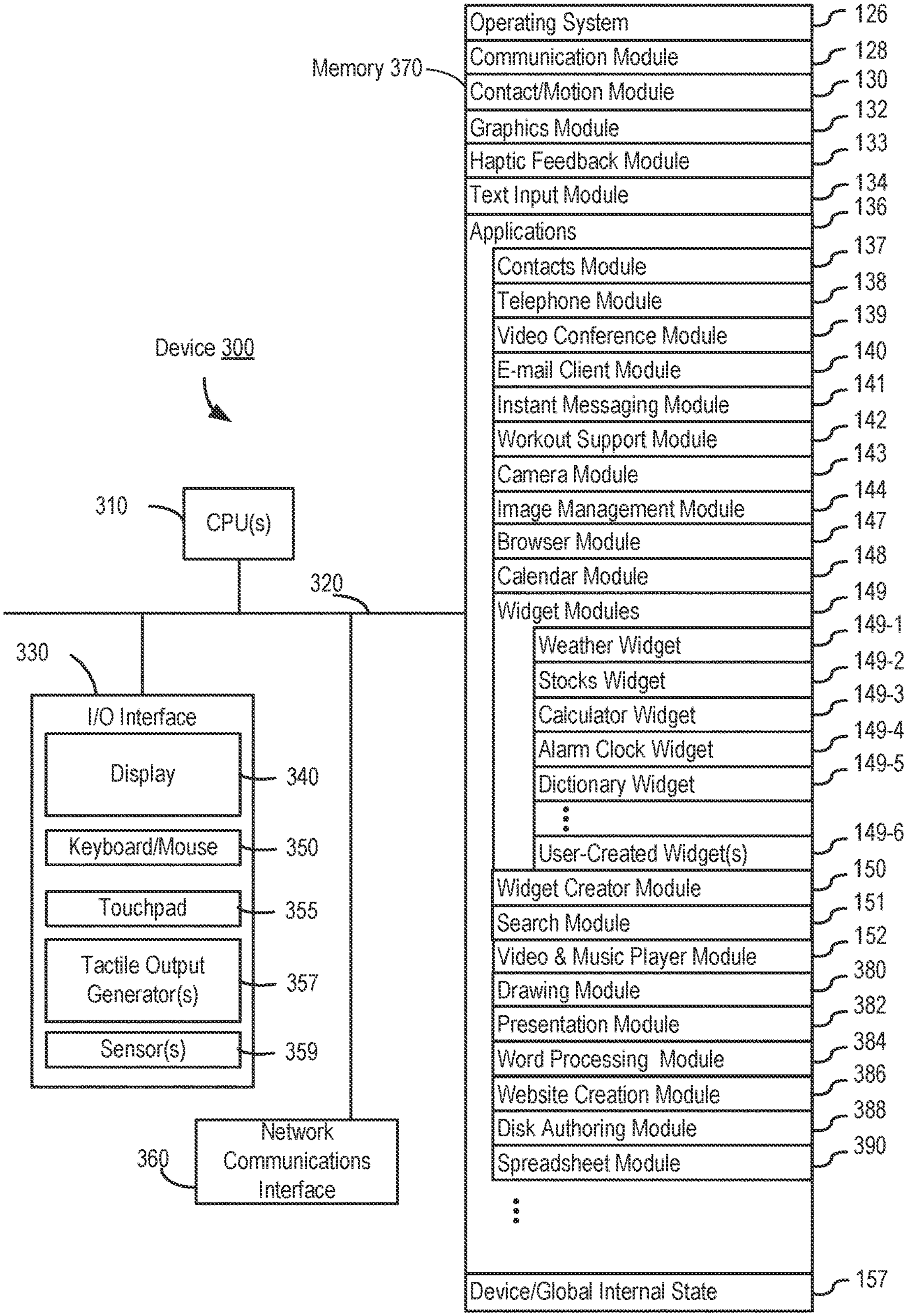
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
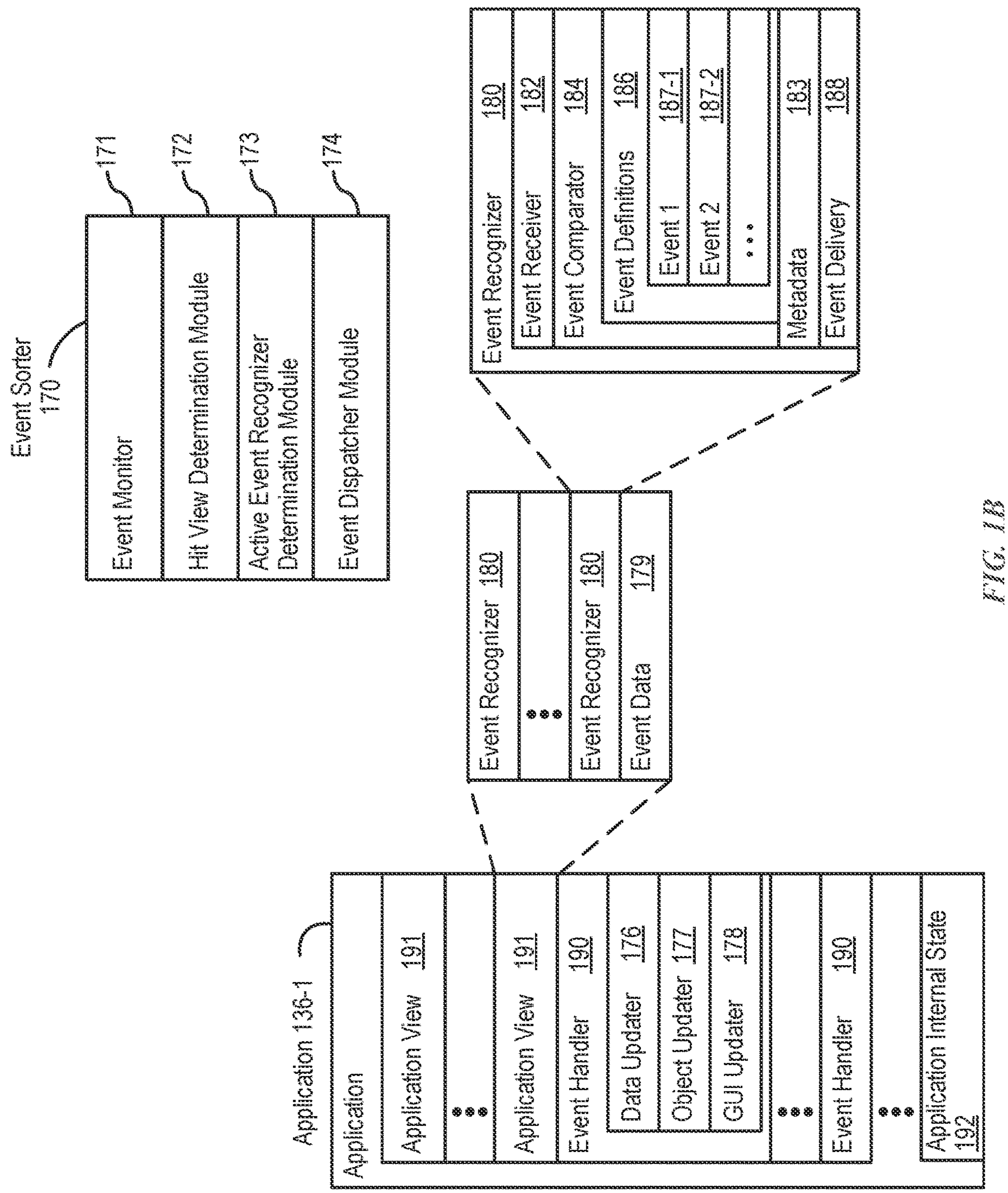
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
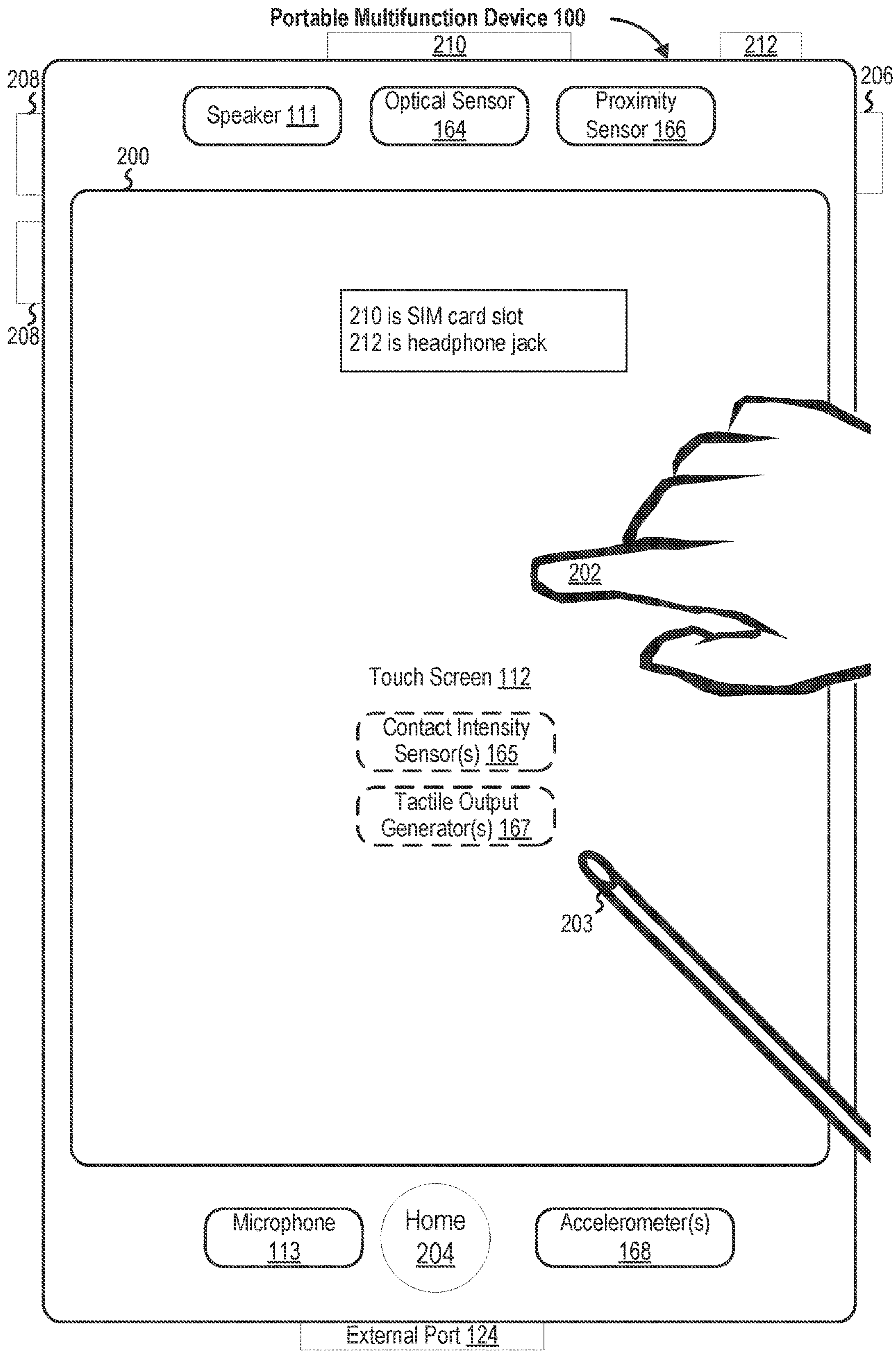
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as “home” or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child’s learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
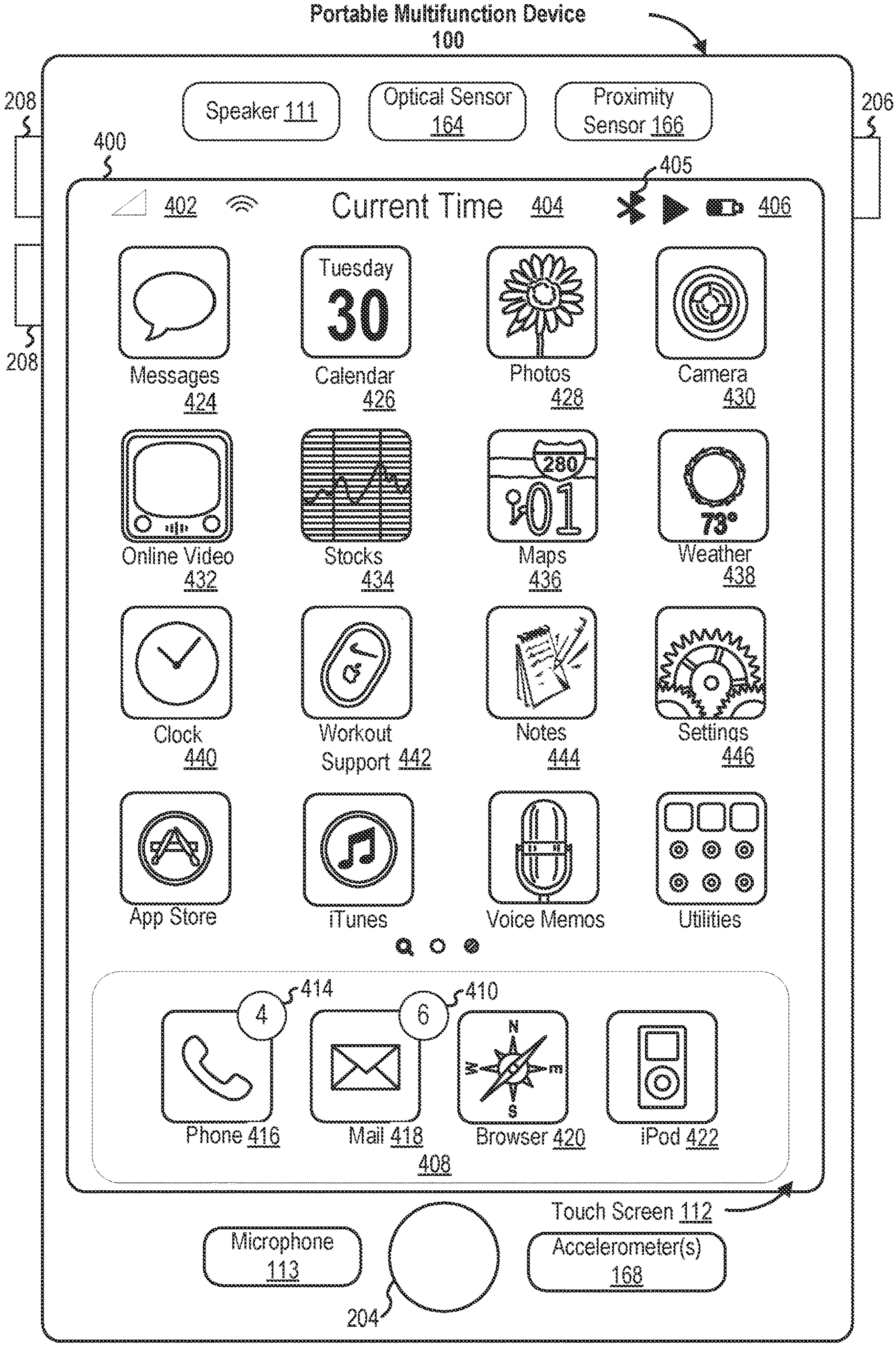
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
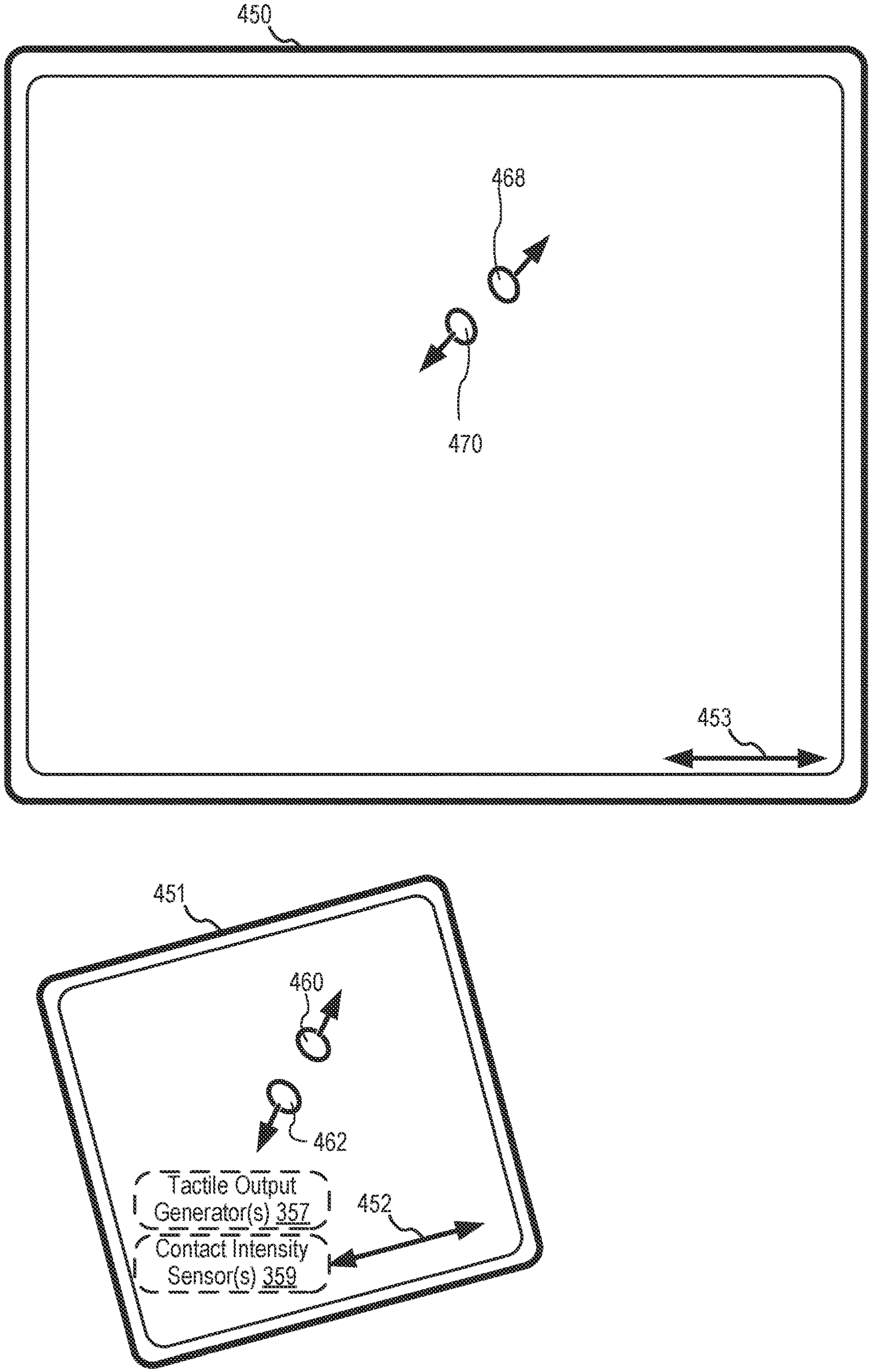
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
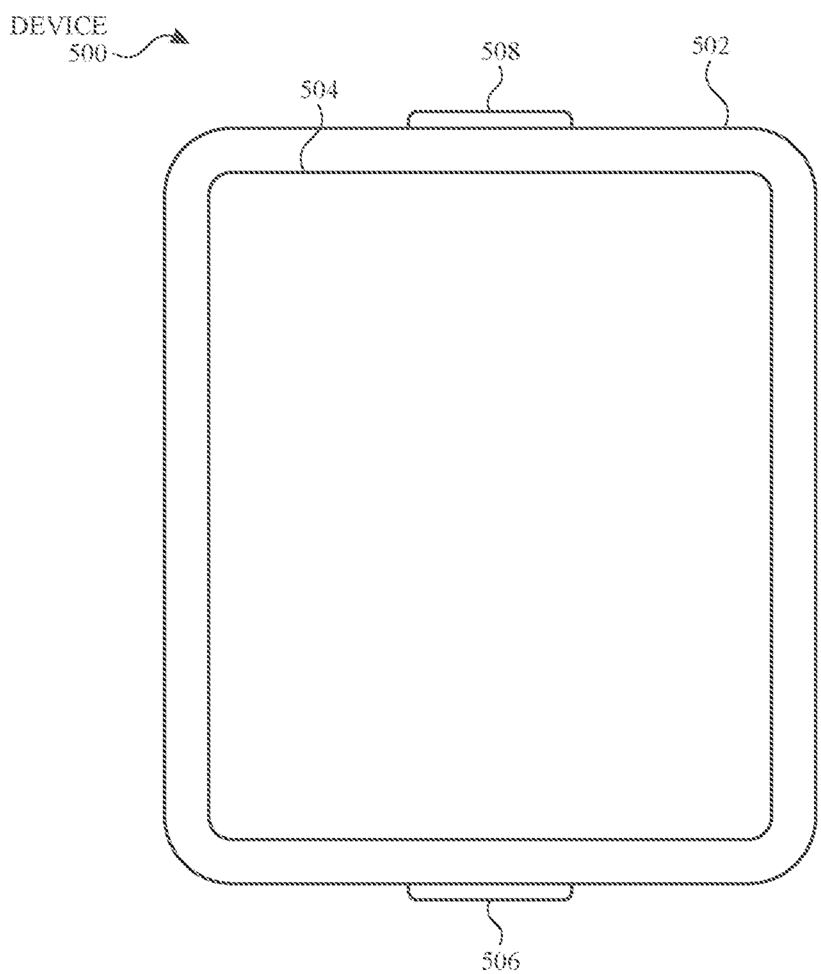
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
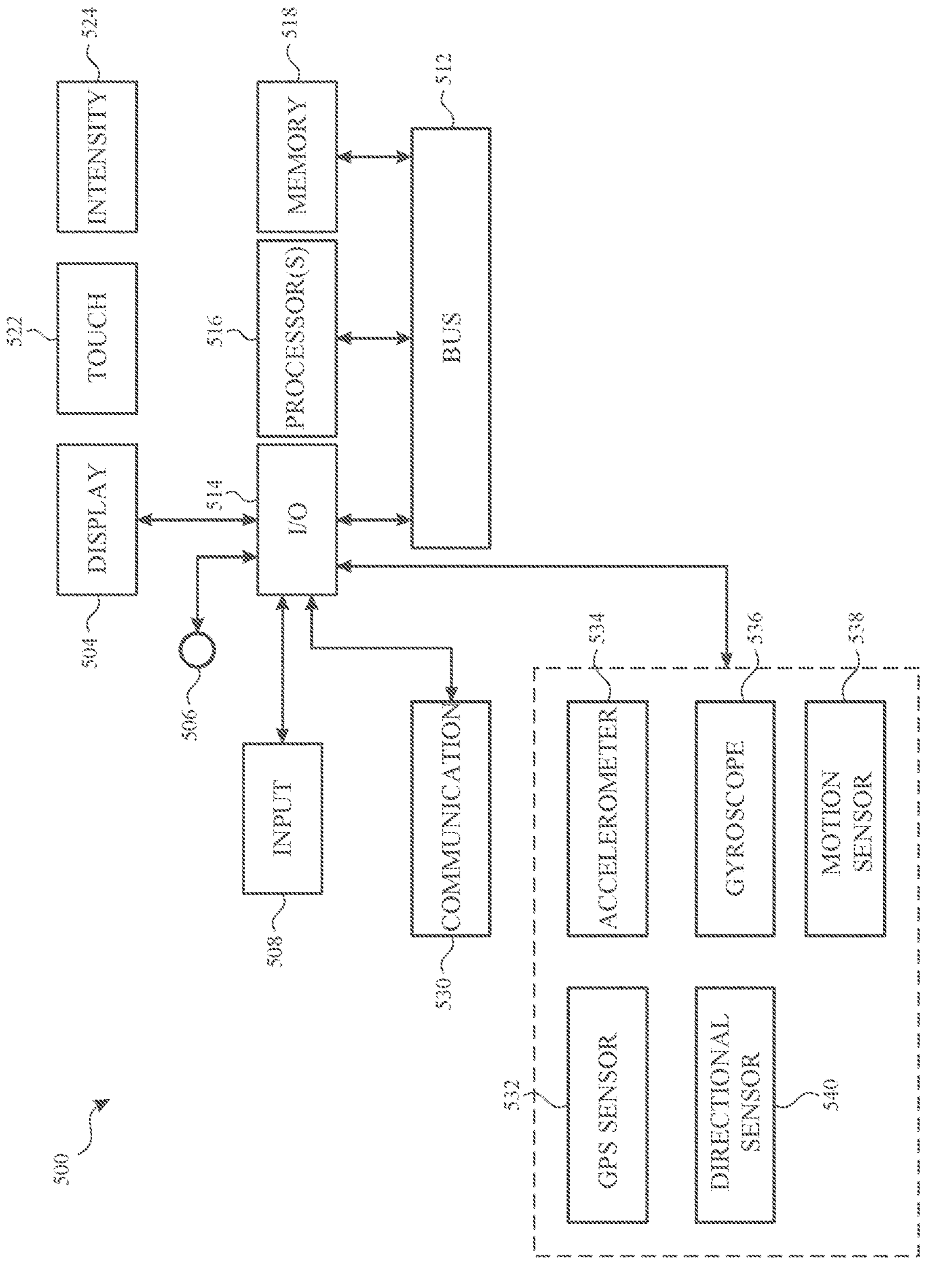
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 900, 1800, 1900, 2000, 2100, 2200, 2300, 2400, 2500, and 2700 (FIGS. 8A-8B, 9A-9B, 18A, 18B, 19, 20, 21, 22, 23, 24, 25, and 27, respectively). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6MM illustrate exemplary user interfaces for generating and sending virtual avatars, in accordance with some embodiments. The user interfaces in these figures are used to illustrate the processes described below, including the processes in FIGS. 8A-8B and 9A-9B. FIGS. 7A-7J illustrate exemplary user interfaces for receiving and playing virtual avatars, in accordance with some embodiments. FIGS. 6A-6MM and FIGS. 7A-7J use virtual avatars as a specific example of a virtual avatar.

Figure 6A:
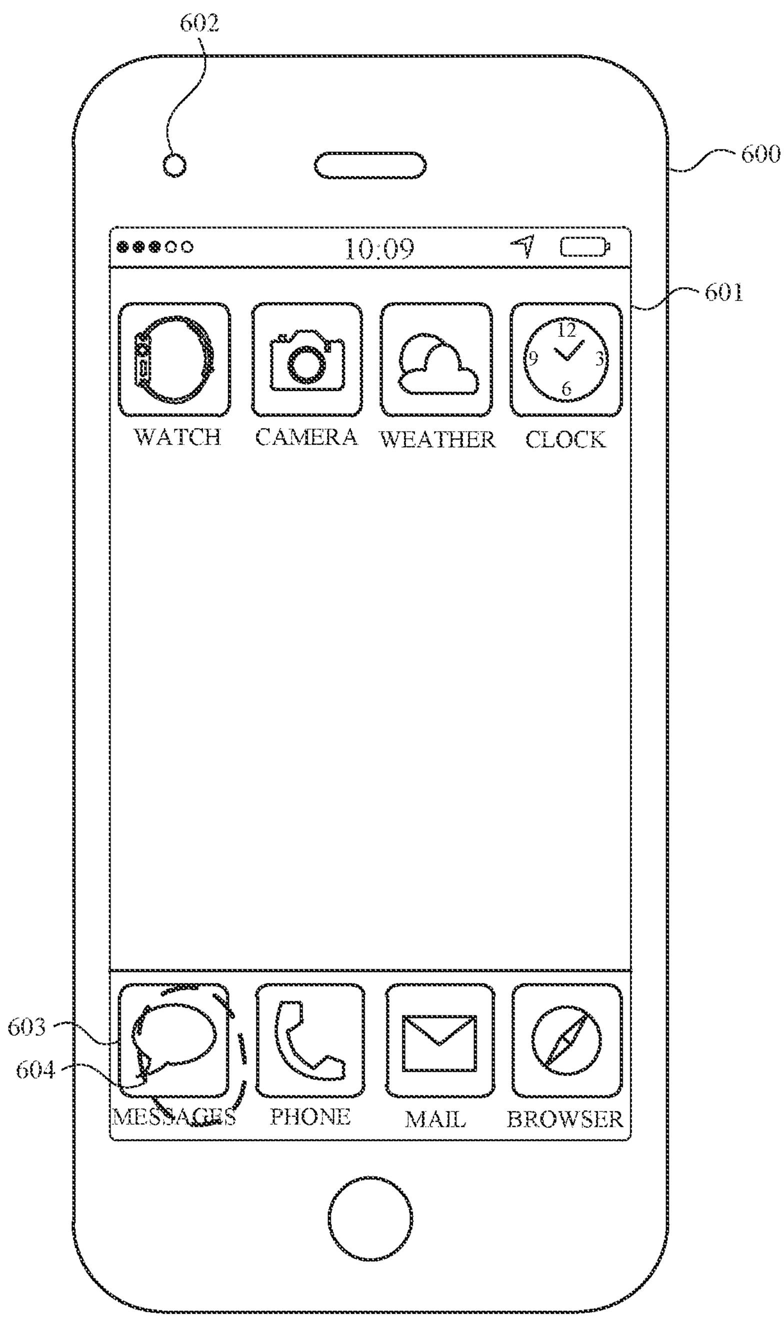
FIGS. 6A-6MM illustrate exemplary user interfaces for generating and sending emojis, stickers, virtual avatars, and/or other multimedia content.

FIG. 6A depicts device 600 having display 601, which in some cases is a touch-sensitive display, and camera 602, which, at a minimum, includes an image sensor that is capable of capturing data representing a portion of the light spectrum (e.g., visible light, infrared light, or ultraviolet light). In some embodiments, camera 602 includes multiple image sensors and/or other types of sensors. In addition to capturing data representing sensed light, in some embodiments, camera 602 is capable of capturing other types of data, such as depth data. For example, in some embodiments, camera 602 also captures depth data using techniques based on speckle, time-of-flight, parallax, or focus. Image data that device 600 captures using camera 602 includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the portion of the light spectrum. In some embodiments, device 600 includes one or more features of devices 100, 300, or 500.

In some examples, electronic device 600 includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

In FIG. 6A, device 600 is displaying a home screen interface with multiple icons for various applications, including icon 603 for a messaging application. In response to a gesture (e.g., tap gesture 604) on icon 603, device 600 displays the user interface in FIG. 6B corresponding to a messaging application associated with icon 603.

Figure 6B:
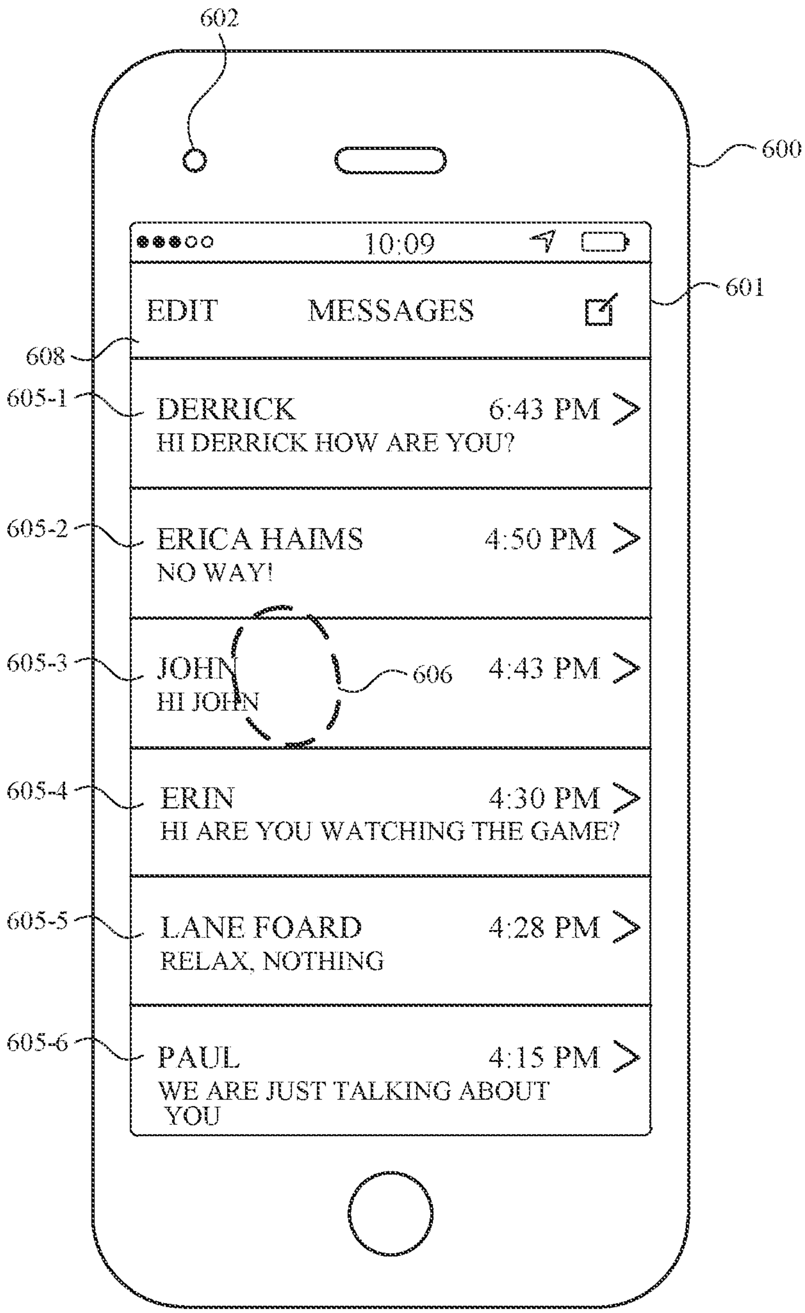

In FIG. 6B, device 600 is displaying messaging interface 608. Elements 605-1 to 605-6 correspond to previous messaging communications. Each element 605-1 to 605-6 represents one communication with one or more remote users that are each associated with their own electronic device. In response to a gesture (e.g., tap gesture 606) on a particular element, device 600 updates messaging interface 608 to display a part of a previous messaging communication with the remote user or users that are part of the communication, as depicted in FIG. 6C.

Figure 6C:
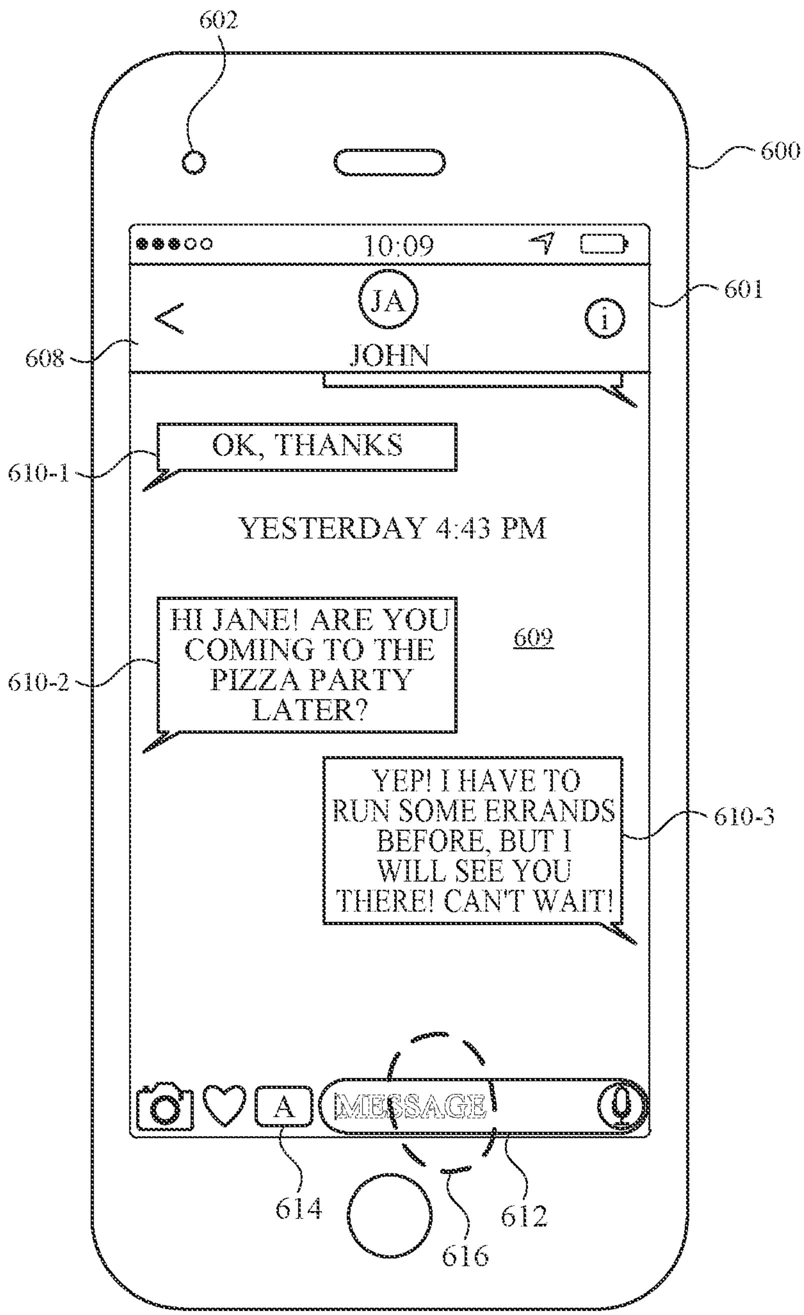

In FIG. 6C, device 600 is displaying messaging interface 608 for messaging communications with the remote user called "John" (and having initials or a monogram of "JA"). Messaging interface 608 includes message area 609 that includes four previously exchanged messages 610-1 to 610-3 (message 610-3 was sent from the user of device 600 to "John" while the other two messages were received by device 600 from "John"). Messaging interface 608 also includes message composition area 612 and message option icons, including icon 614 (e.g., that accesses an interface for selecting stickers and/or other multimedia elements for a message), to the left of message composition area 612. In some embodiments, the message option icons allow for sending different types of messages, including photos, emojis, stickers, and other forms of non-textual messages, such as those described below.

Figure 6D:
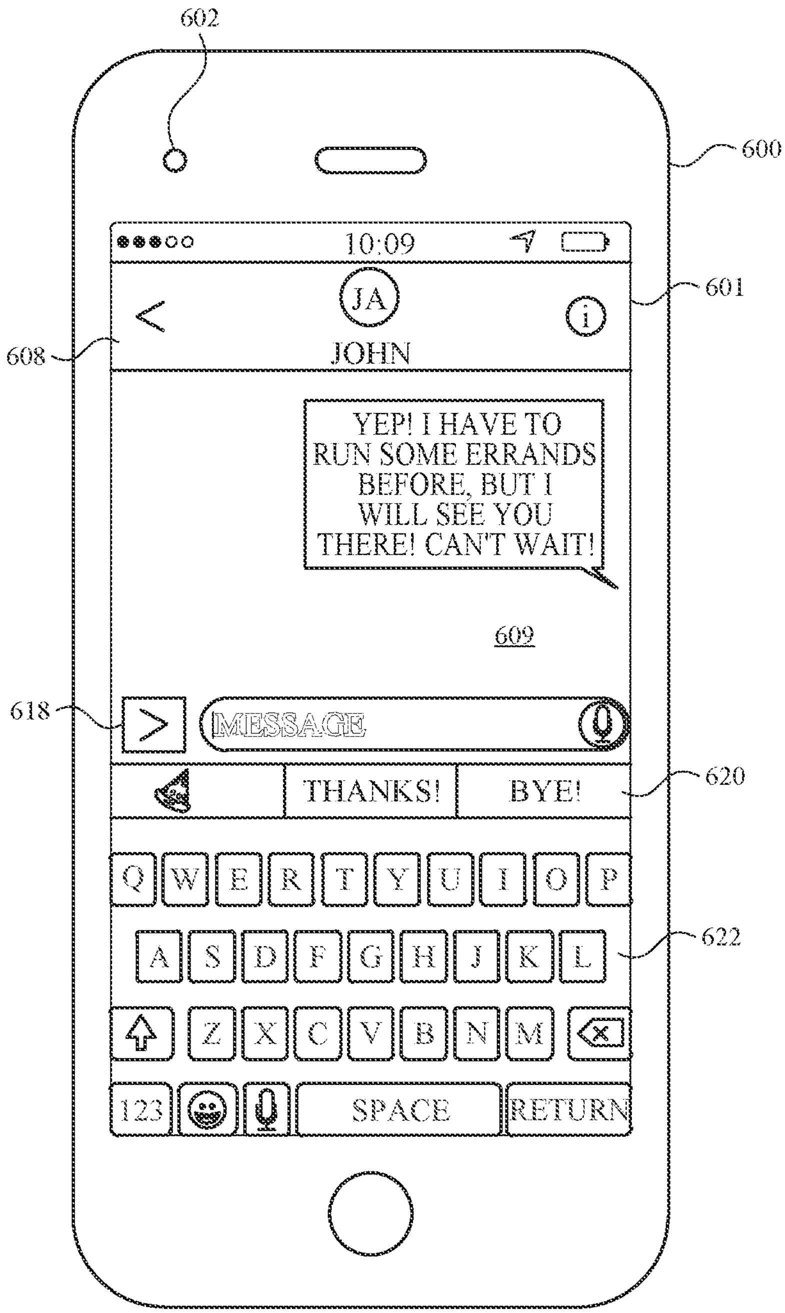

In response to device 600 detecting selection of message composition area 612 (e.g., via tap gesture 616 of FIG. 6C), messaging interface 608 is updated as depicted in FIG. 6D. For example, in FIG. 6D, the message option icons are hidden (but can be shown again by selection of button 618), suggested message responses 620 are displayed, and virtual keyboard 622 is displayed. In some cases, virtual keyboard 622 is used to enter a new message to send to the remote user.

Figure 6E:
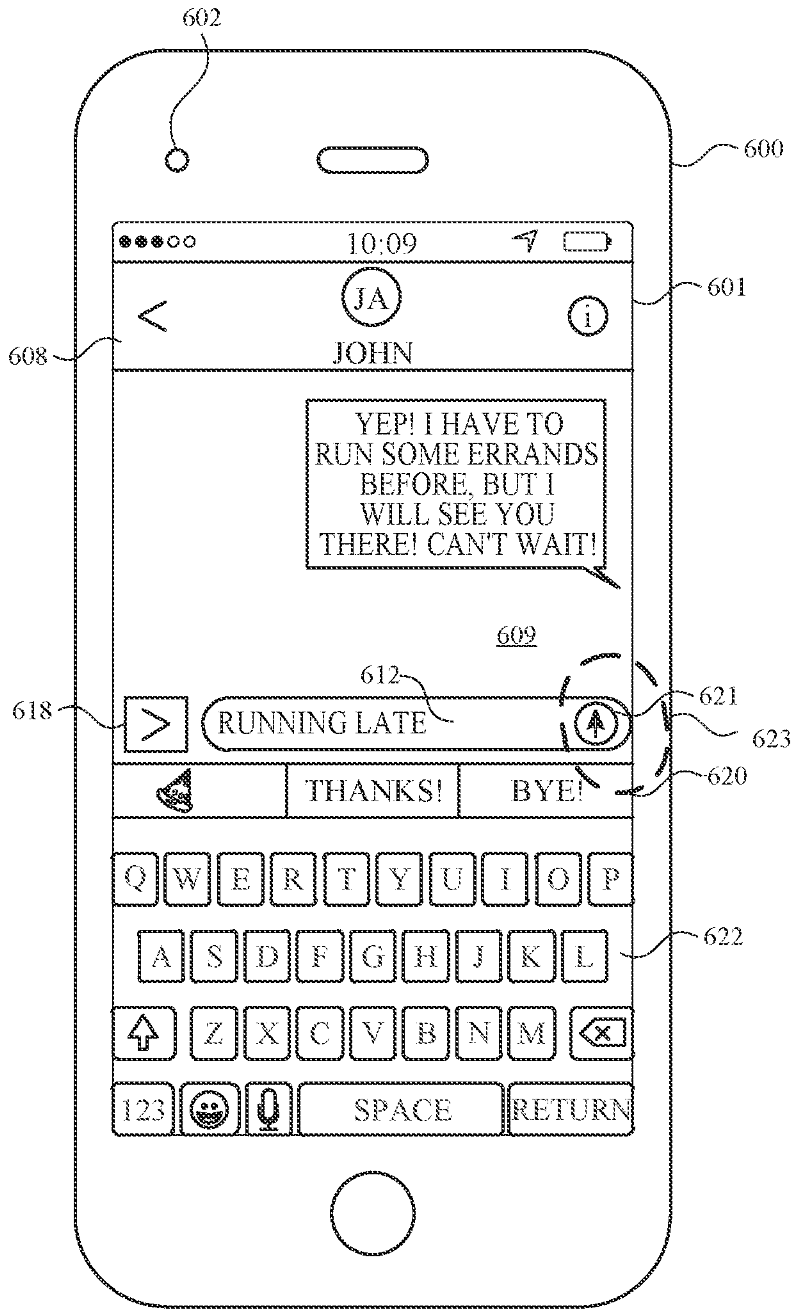

In FIG. 6E, message composition area 612 includes the text "running late," which is entered, for example, via virtual keyboard 622 or other methods, such as voice input. In response to selection of send button 621, device 600 sends the text as part of a message to one or more participants associated with the communication in message 609. In the case of FIG. 6E, device 600 sends the message to the user called "John." In FIG. 6F, device 600 has updated message area 609 to reflect the sending of the message by updating message area 612 to include message 610-4.

In some cases, the message options icons are accessed to add to or compose a new message (e.g., by adding non-textual content to the message). For example, in response to device 600 detecting selection of affordance 618 (e.g., via tap gesture 624 in FIG. 6F), message option icons, including icon 614, are displayed again, as depicted in FIG. 6G. In response to selection of icon 614 (e.g., via a gesture, such as tap gesture 626 in FIG. 6H), device 600 updates messaging interface 608, as depicted in FIG. 6I, by replacing virtual keyboard 622 with multimedia item interface 628, which is currently displaying a recent item menu 629 (sometimes known as "tray" for recent items), which includes previously sent multimedia items (e.g., stickers 630-1 to 630-4 in FIG. 6I, but other types of multimedia items, such as sound, animations, or videos, could also be included). Using this interface, a user can select a previously sent multimedia item to send again. For example, a user can select one of the stickers in recent item menu 629 of FIG. 6I via a tap gesture on the selected sticker. In response to such selection, device 600 either places the sticker in message composition area 612 or sends the selected sticker to the one or more remote users that are involved in the communication represented in message area 609. In some embodiments, a tap and drag gesture is used to place the selected sticker (or other multimedia item) in either message composition area 612 or message area 609 (and in some cases on a specific message). For example, a particular sticker is selected via a tap gesture. Without breaking contact with touch-sensitive display 601, the sticker is dragged to either message composition area 612 or message area 609 via a drag gesture. Once the desired location of the sticker is reached, contact with touch-sensitive display 601 is ceased and the sticker is placed at the last location of the contact. If the last location of the contact is in message area 609, then the sticker is sent to the one or more remote users associated with the communication represented in message area 609. Optionally, the sticker is sent to the remote users with data associating the sticker with a particular message (e.g., the sticker is sent with data indicating a particular location of a particular message to which the sticker is "stuck"). These techniques are not specific to selecting and sending stickers. It can also apply to other types of multimedia items selectable from recent item menu 629 or other locations.

In FIG. 6I, multimedia item interface 628 also includes menu selection button 632 (which allows for menus or interfaces other than recent item menu 629 to be selected via a display of buttons or other selectable items corresponding to available menus) and full screen button 634 (which allows for multimedia item interface 628 to expand to more of the display (or the entire display)). Full screen button 634 is further described below.

In addition to using menu selection button 632 to switch between menus or interfaces, gestures are also optionally used to switch between menus. For example, in response to a swipe gesture (e.g., a swipe represented by contact 636's movement across multimedia item interface 628 as depicted in FIGS. 6J and 6K), device updates multimedia item interface 628 to replace display of recent item menu 629 with virtual avatar menu 638. While recent item menu 629 is being replaced with virtual avatar menu 638, scroll indicator 639 provides feedback about how many other menus are available in multimedia item interface 628.

Figure 6F:
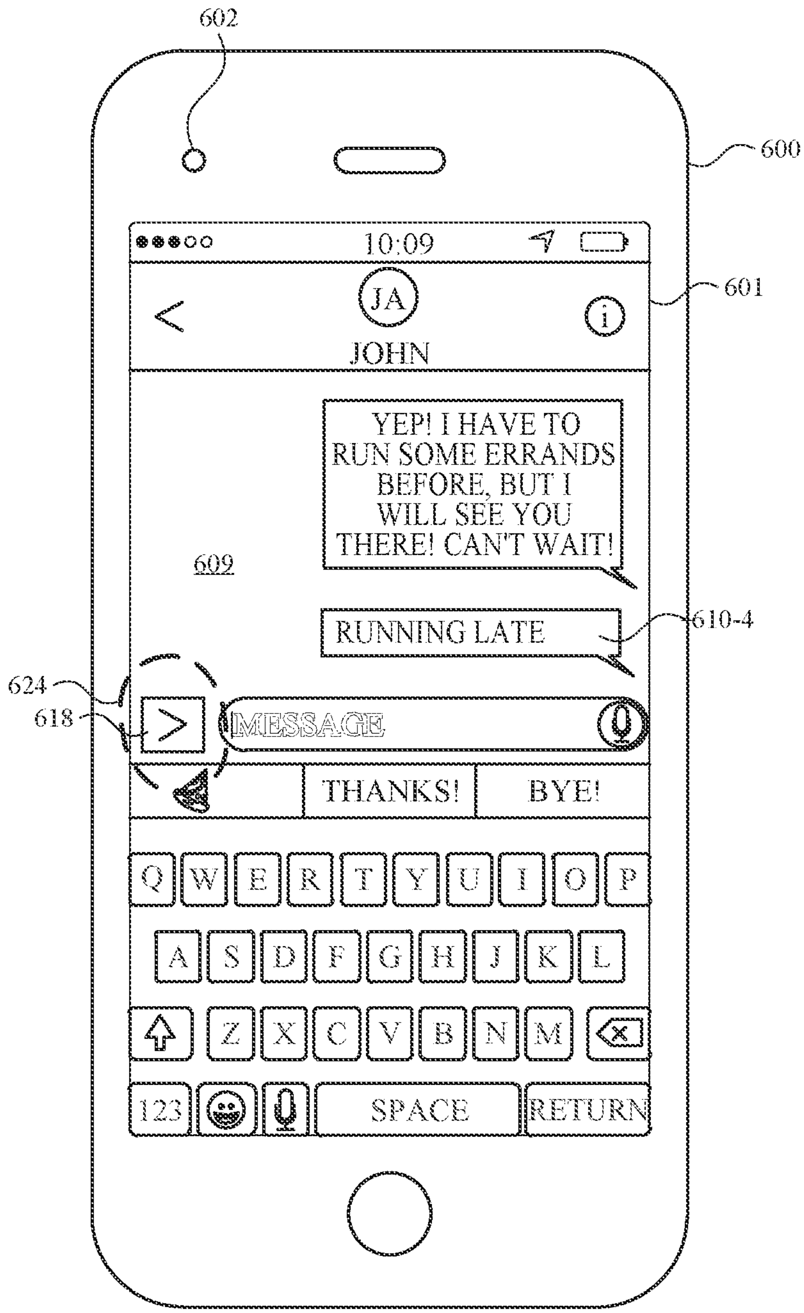
Figure 6G:
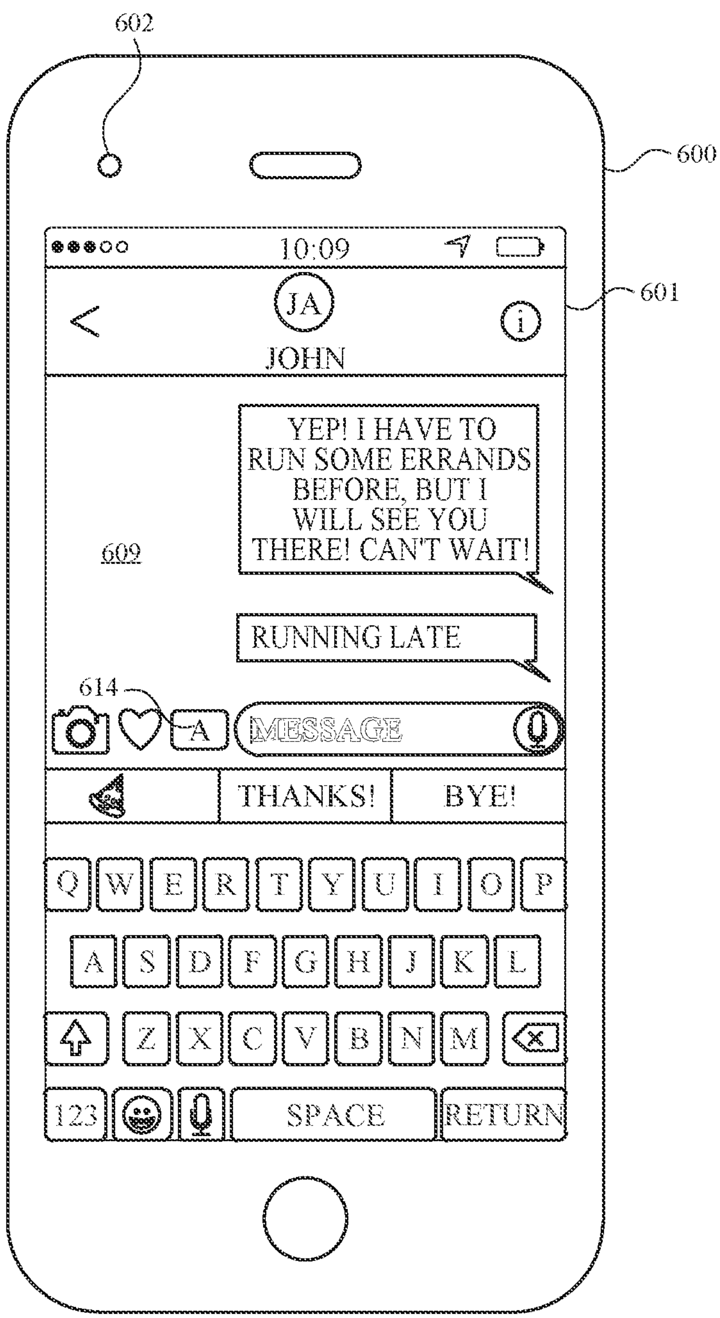
Figure 6H:
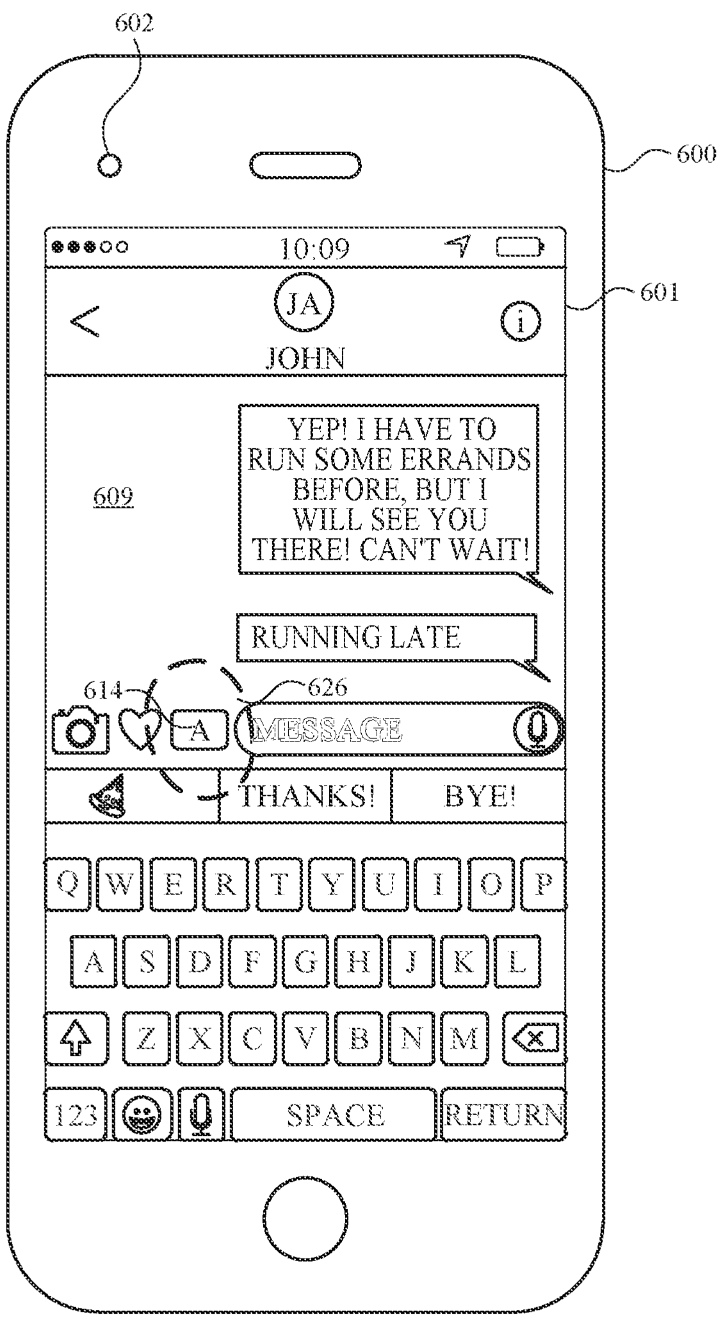
Figure 6I:
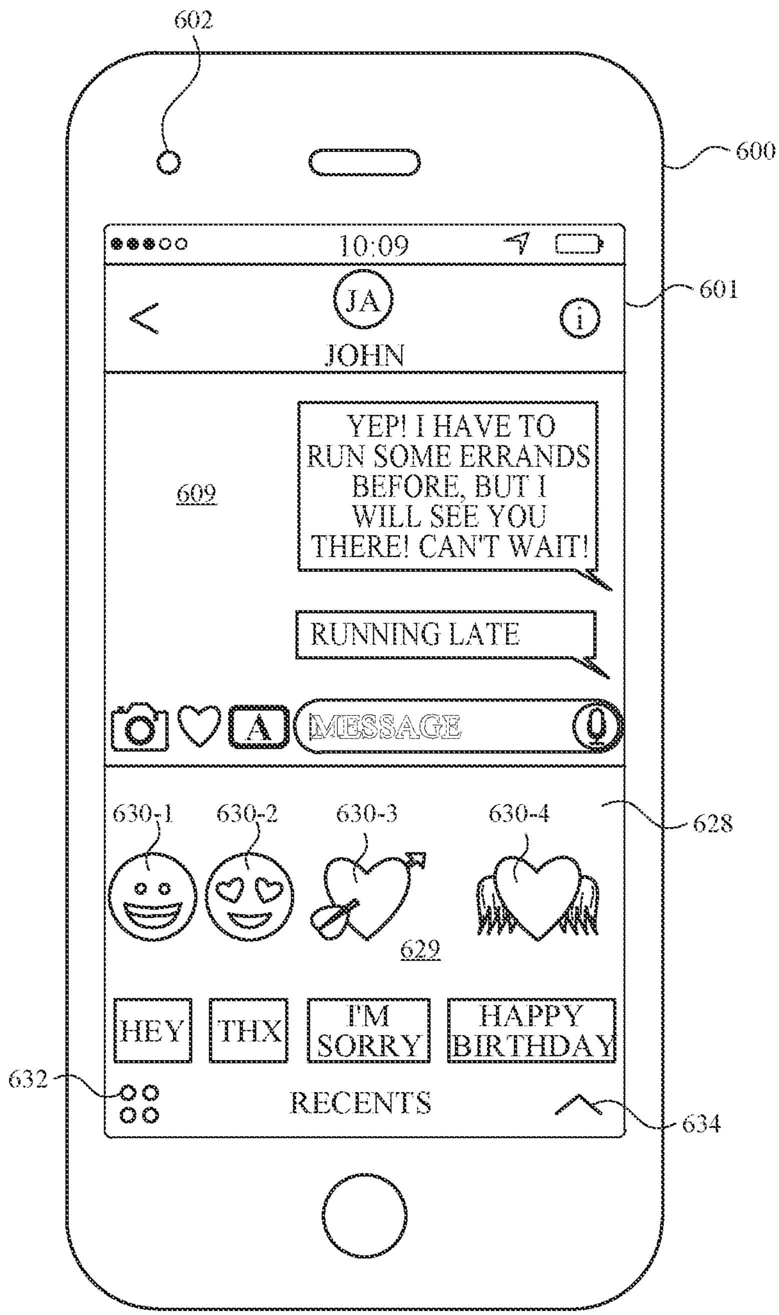
Figure 6J:
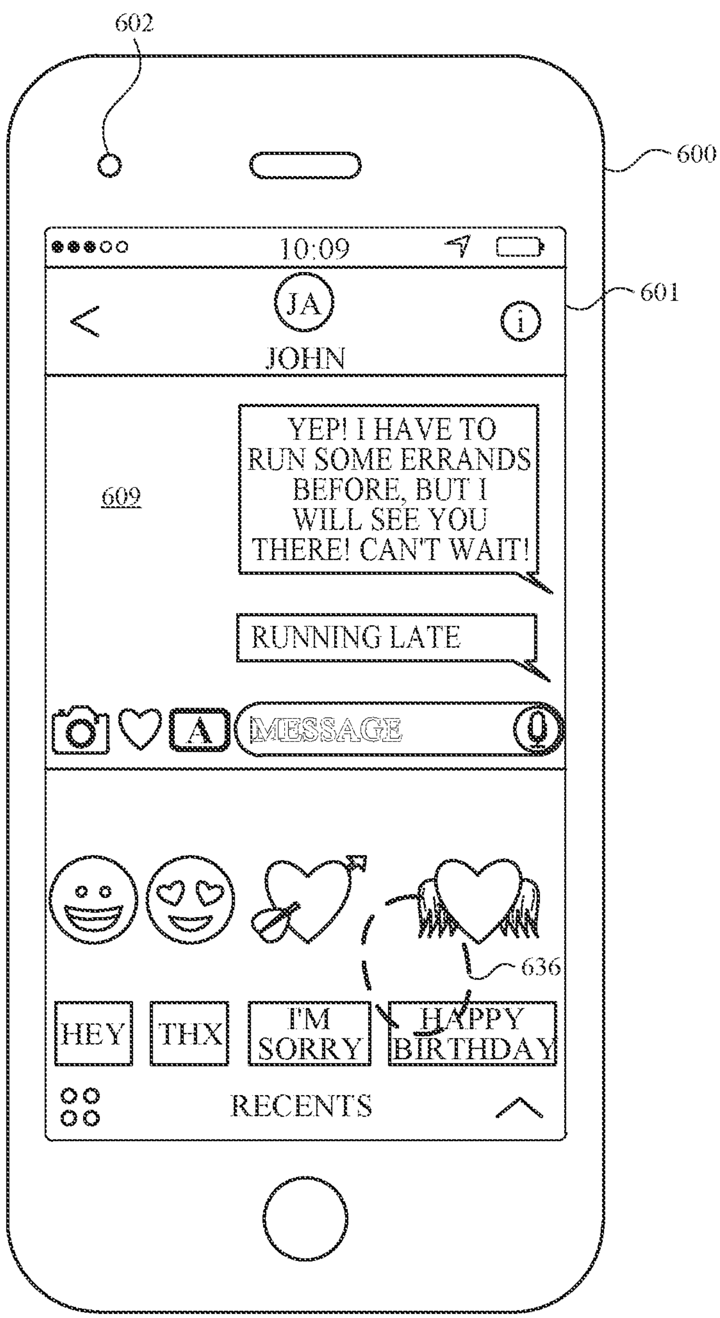
Figure 6K:
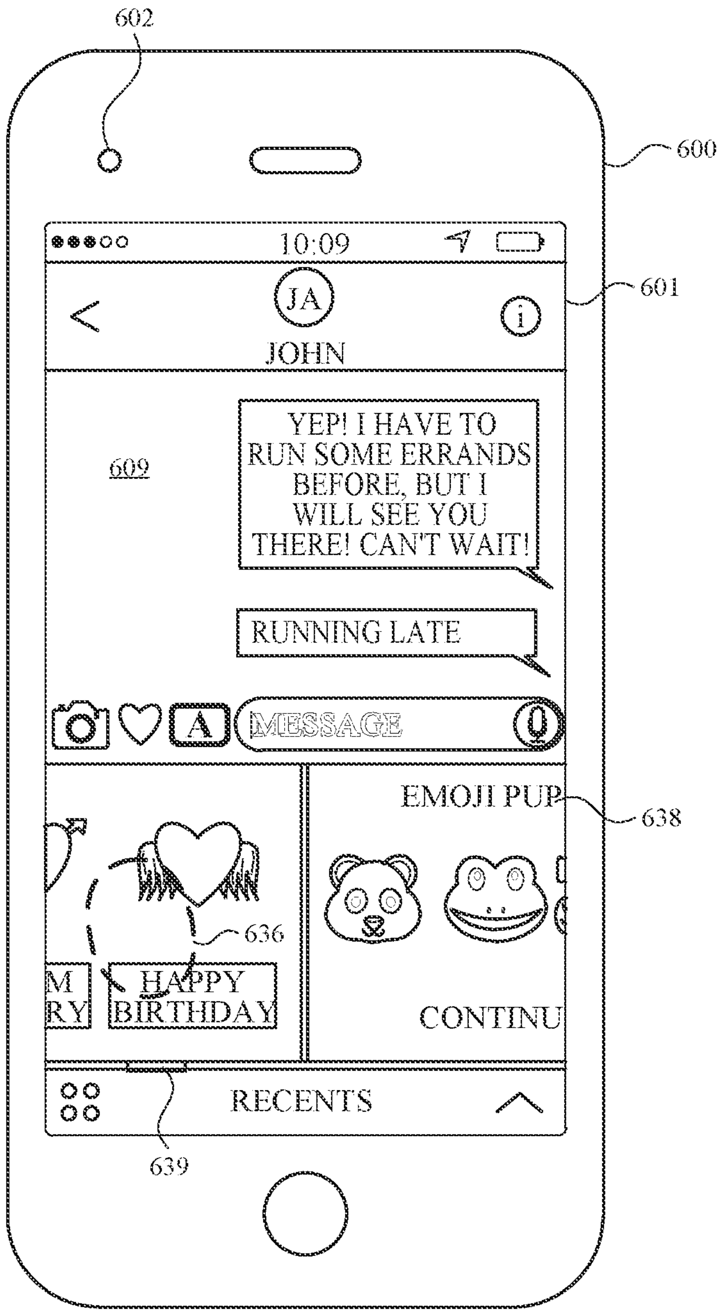
Figure 6L:
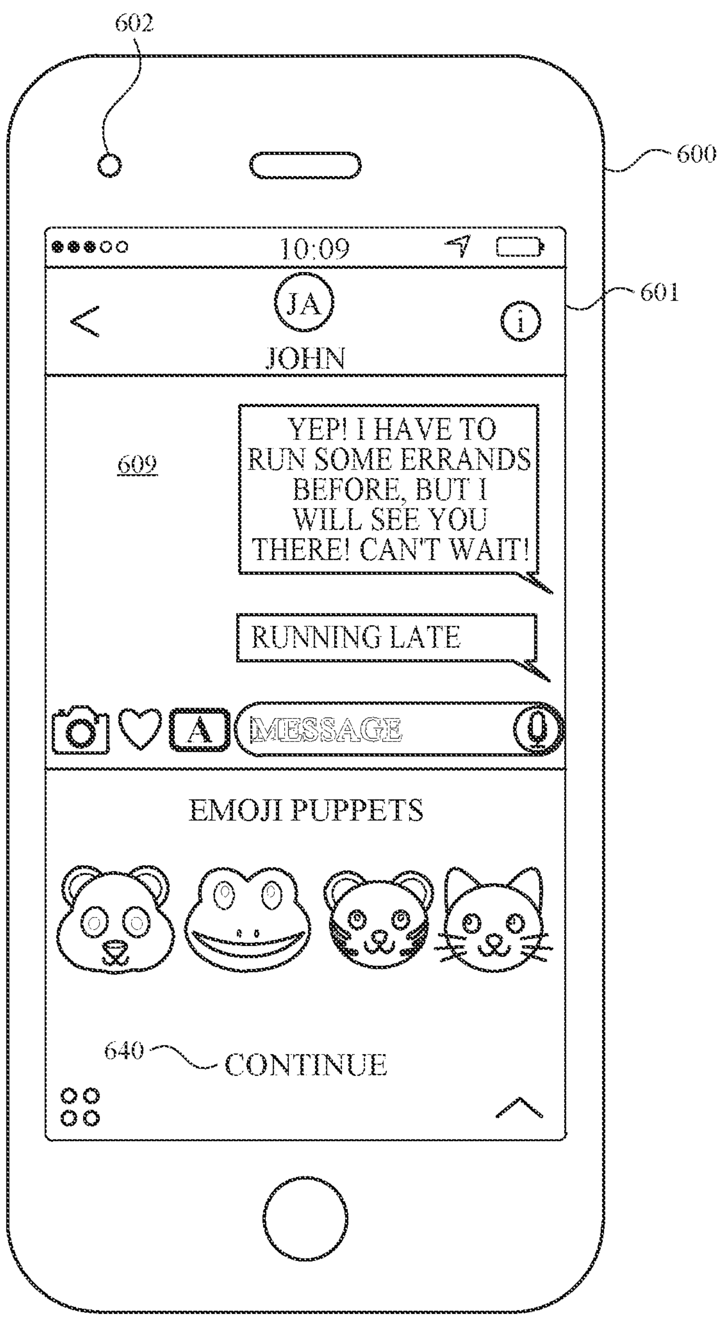
Figure 6M:
Figure 6N:
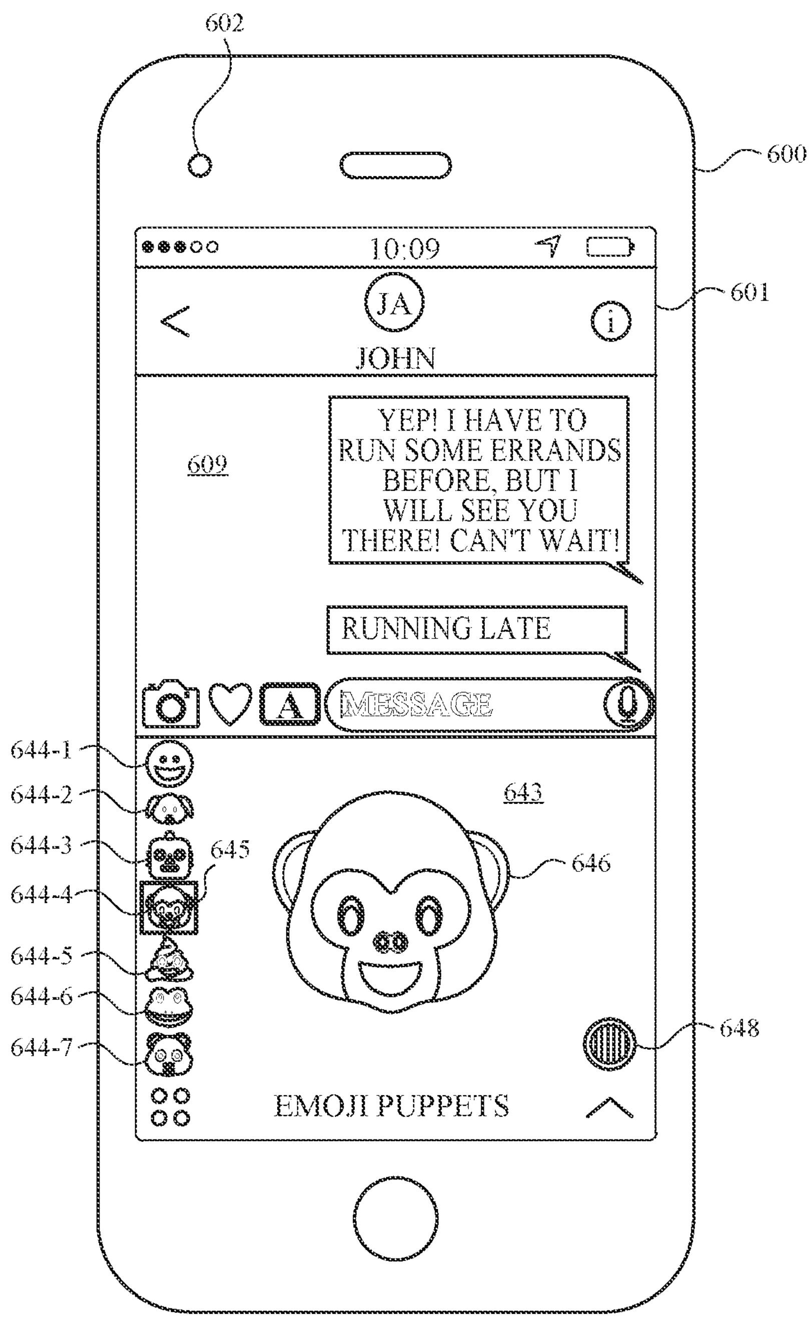

In FIG. 6L, virtual avatar menu 638 has completely replaced display of recent item menu 629. In response to device 600 detecting selection of continue affordance 640 (e.g., via a gesture such as tap gesture 642 of FIG. 6M), virtual avatar interface 643 is displayed as depicted in FIG. 6N. This interface allows users to generate new virtual avatars that reflect a user's facial movements and expressions, as further described below. In some embodiments, virtual avatar menu 638 is not displayed at all. Instead, virtual avatar interface 643 is displayed without first displaying virtual avatar menu 638.

Virtual avatar interface 643 of FIG. 6N includes avatar template representations 644-1 to 644-7 that correspond to different avatar frameworks (e.g., avatar characters that have different appearances and behavior). Each avatar template represents an avatar framework to which detected facial movements and expressions can be mapped. Indicator 645 corresponds to a currently selected avatar template. Virtual avatar preview 646 is a "live" preview of the virtual avatar in that it is updated to reflect the user's current facial movements and expressions. For example, in some embodiments, using camera 602, device 600 continuously captures image data from camera 602. The captured image data includes visible light data and depth data. Device 600 analyzes the captured image data to identify facial movements (e.g., muscle movements, head orientations, gaze direction, etc.) and/or facial expressions (e.g., a smile, a frown, an angry expression, a sad expression, a confused expression, etc.). Device 600 then updates avatar preview 646 to reflect the detected characteristics of the user, in accordance with the parameters of the avatar framework currently associated with virtual avatar preview 646. In some embodiments, device 600 starts continuously updating virtual avatar preview 646 automatically in response to virtual avatar interface 643 first executing or being displayed. Detecting selection of a representation of a different avatar template will cause device 600 to update virtual avatar preview 646 based on the newly selected avatar template.

Figure 6O:
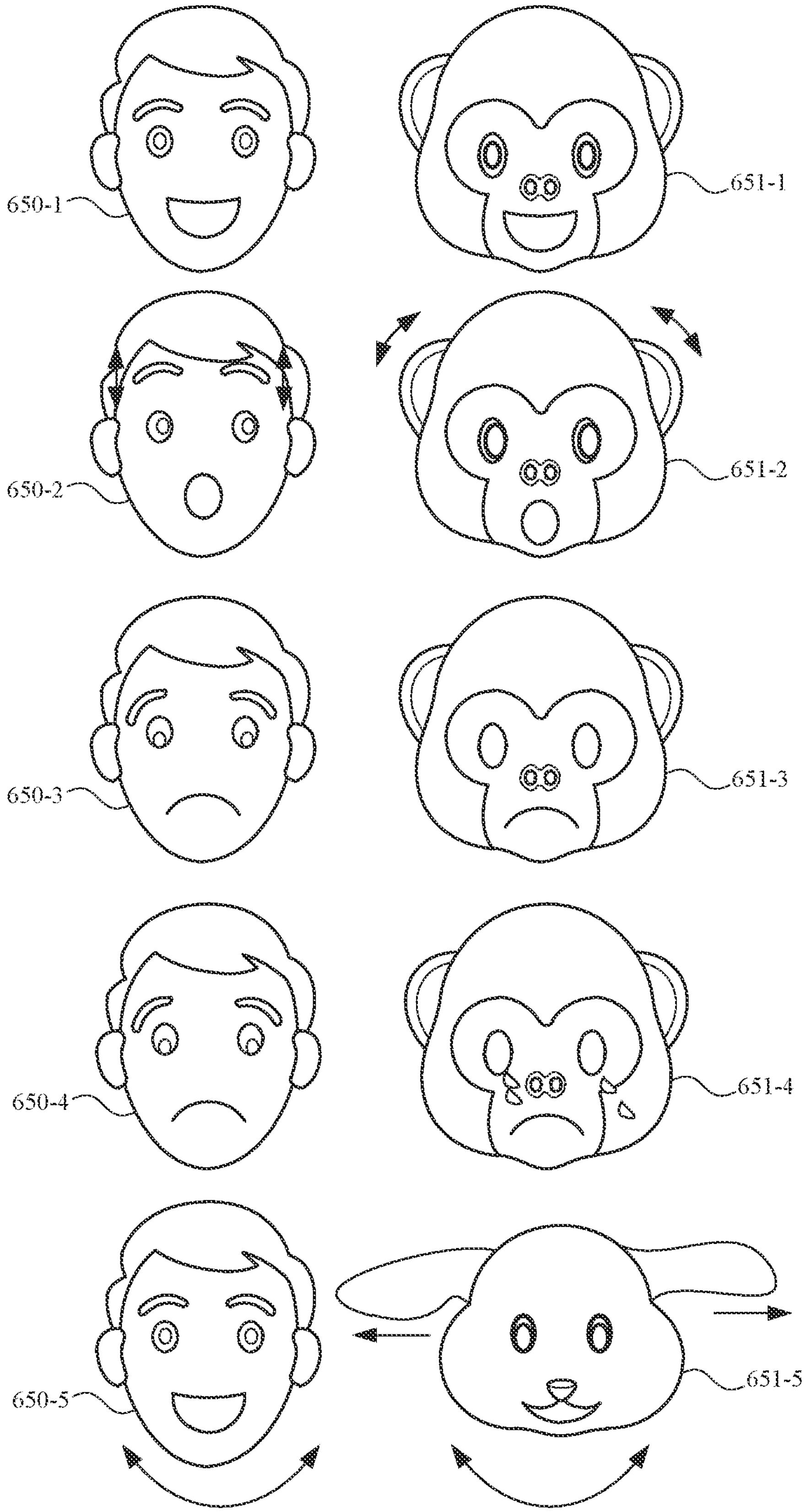

FIG. 6O depicts several examples of a user's face in captured image data 650-1 to 650-5 and corresponding updates 651-1 to 651-5 to the virtual avatar preview. These are examples of device 600 updating emoji preview 646 to reflect the user's facial movements, expressions, and poses. In captured image data 650-1, device 600 detects (for example, based on facial features, muscles, movements, and/or expressions) that the user is looking straight ahead, smiling and/or happy. In response, device 600 updates the virtual avatar preview to reflect the user's smile and/or happy expression in addition to updating the virtual avatar preview's eyes to look straight ahead, as depicted in update 651-1. While the detected physical feature of the user in the captured image data is sometimes the same physical feature in the virtual avatar that is updated so that the virtual avatar reflects the user, in other cases, a detected change in a user's physical feature results in an update of a different type of physical feature of the virtual avatar. For example, in FIG. 6O, changes in the user's eyebrows are mapped to the monkey's ears (or other feature) because the monkey does not have eyebrows, as shown by 650-2 and 651-2. In this example, the user's mouth and eyes are mapped to the monkey's mouth and eyes. In the example of image data 650-3 and update 651-3, the user's unhappy expression and/or frown are reflected in the virtual avatar preview's corresponding features. In some embodiments, if the user holds a facial expression or facial pose, as depicted by image 650-3 and 650-4, the virtual avatar preview is updated with additional features, such as tears in the case of update 651-4. This type of predefined update can also occur in response to a lack of detected movement. In some embodiments, updates are also based on detected user movement in image data. For example, device 600 detecting rotation of the user's head results in an update that similarly rotates the virtual avatar preview. In some embodiments, updates are also based on a physics model for features of the virtual avatar. For example, in image data 650-5, device 600 detects the user's head is shaking. In response, device 600 generates update 651-5 to reflect the head shaking. Additionally, in update 651-5, the puppy's ears also stick out as a result of a physics model applied to the puppy's ears.

Figure 6P:
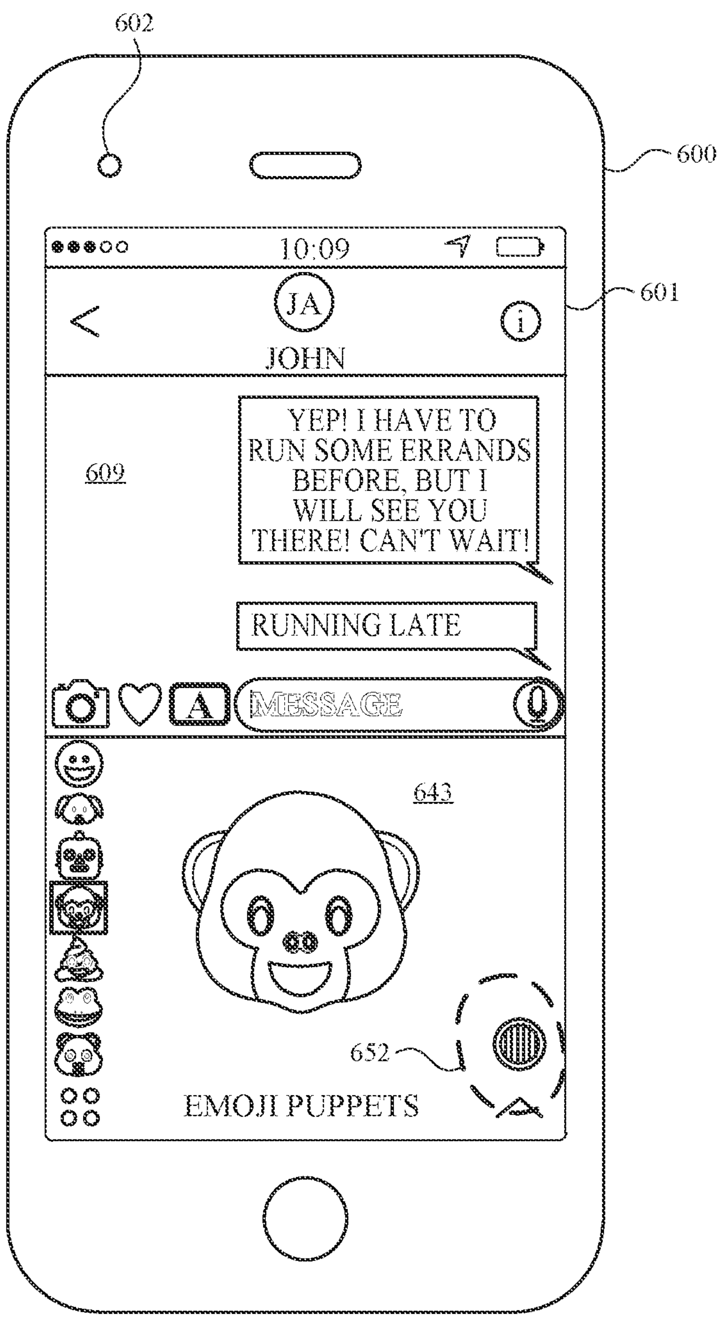
Figure 6Q:
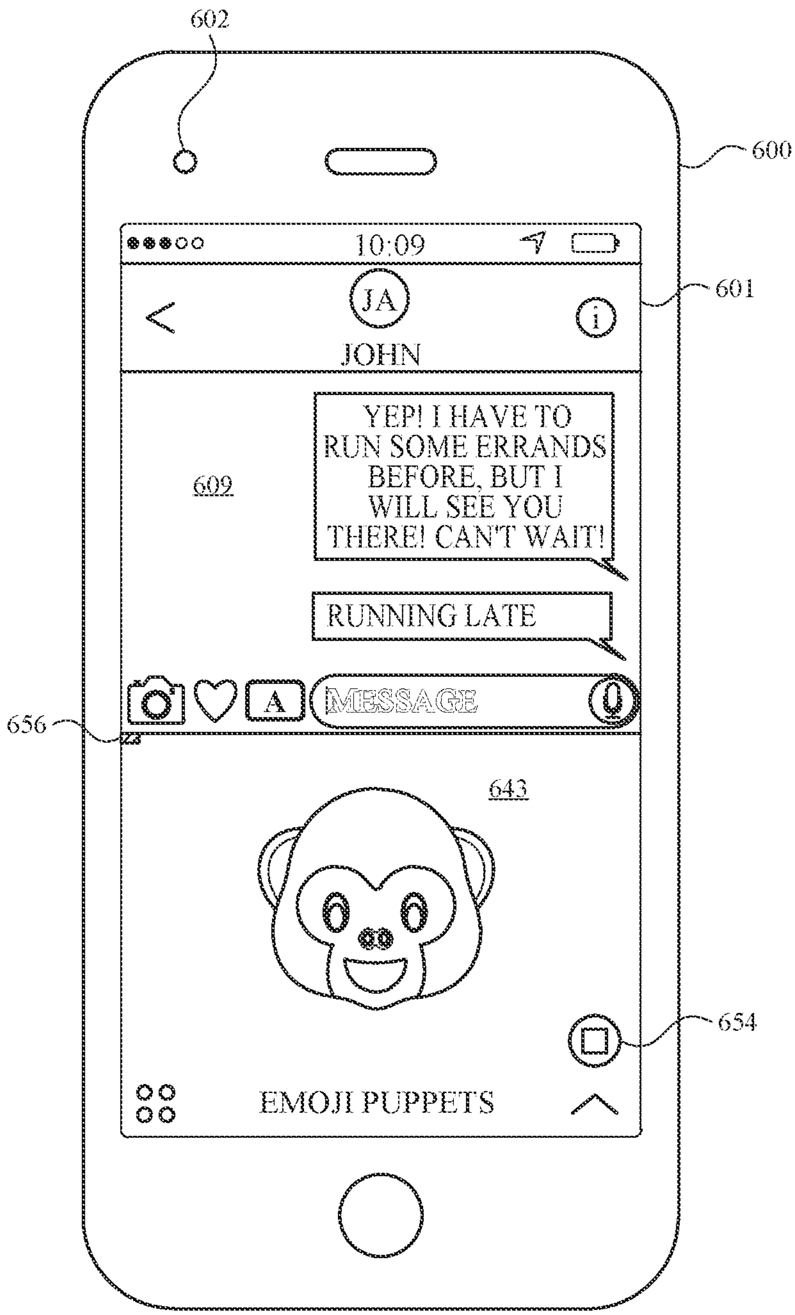

In FIG. 6P, device 600 detects selection of record button 652 via a gesture (e.g., tap gesture represented by contact 653). In response, virtual avatar interface 643 is updated to show that an animated virtual avatar is being generated, as depicted in FIG. 6Q. For example, record button 652 is replaced with stop button 654, avatar template representations 644-1 to 644-7 are no longer displayed, and record progress indicator 656 is displayed that indicates how long the animated emoji has been recorded and a relative amount of time that the virtual avatar can still be recorded. The recording can stop by any number of methods, such as by the expiration of a predetermined amount of time (e.g., 15 seconds) or by selection of stop button 654. In some embodiments, while recording, device 600 is detecting and/or storing a series of data points that are used to create an animated virtual avatar. For example, in some embodiments, device 600 records a time series of facial movements and/or facial expressions (e.g., as values of a range of possible values, with each value of the range of possible values corresponding to a predetermined movement or expression), which are then mapped onto an avatar template to create an animated virtual avatar. Alternatively, device 600 records the animated virtual avatar by creating a video recording of the virtual avatar preview as device 600 updates the virtual avatar preview to reflect the user's facial movements and/or expressions. In some embodiments, device 600 also records sound captured with a microphone of device 600 so that the recorded animated virtual avatar includes sounds that can be played back along with the recorded animations of the virtual avatar.

Figure 6R:
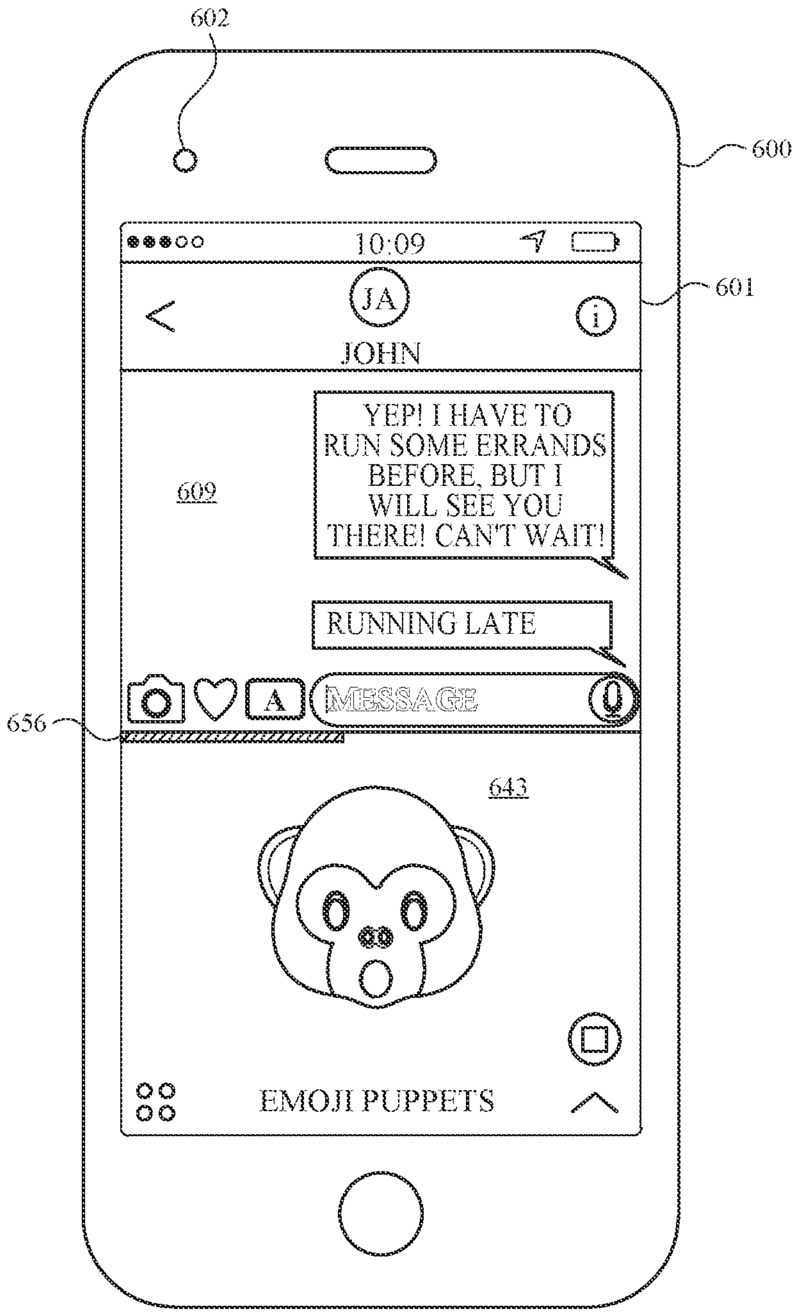
Figure 6R:
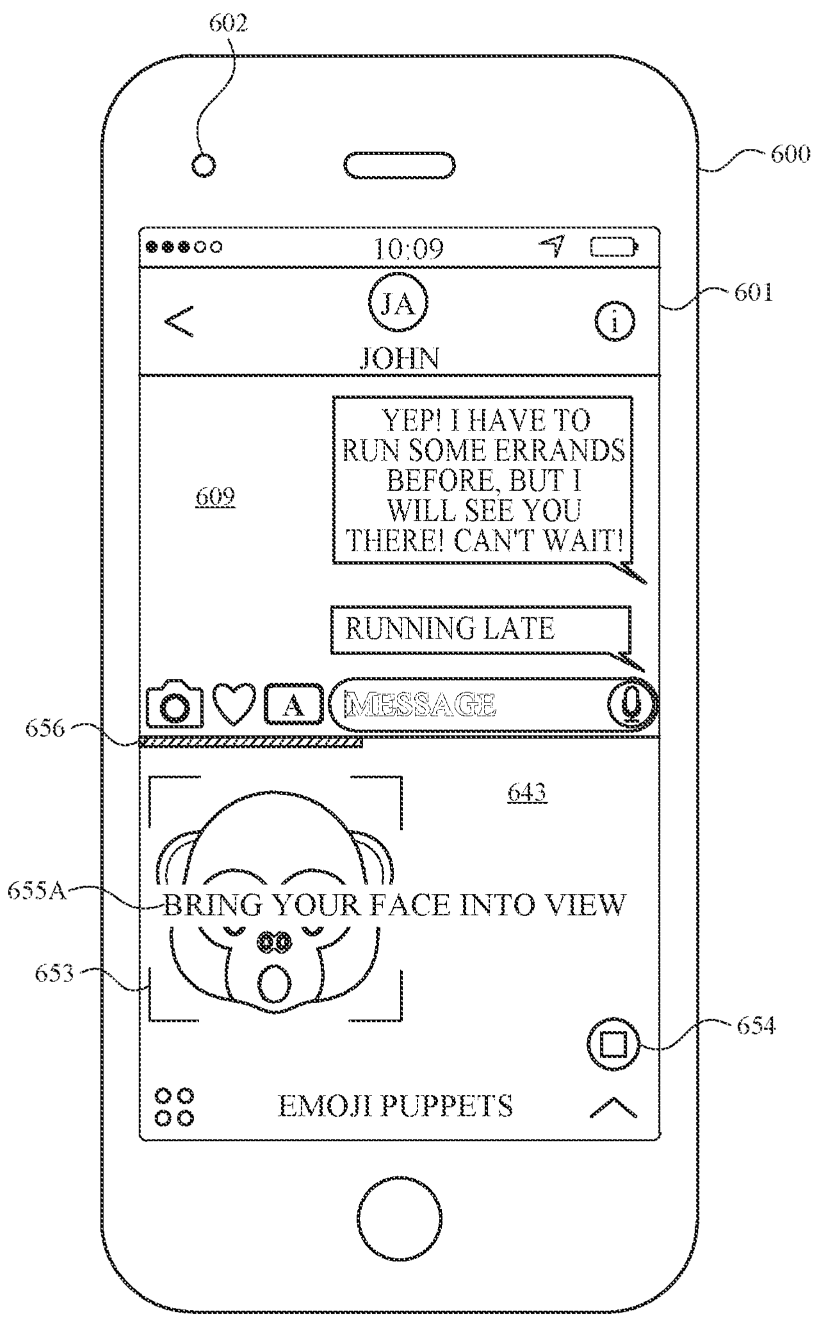
Figure 6R:
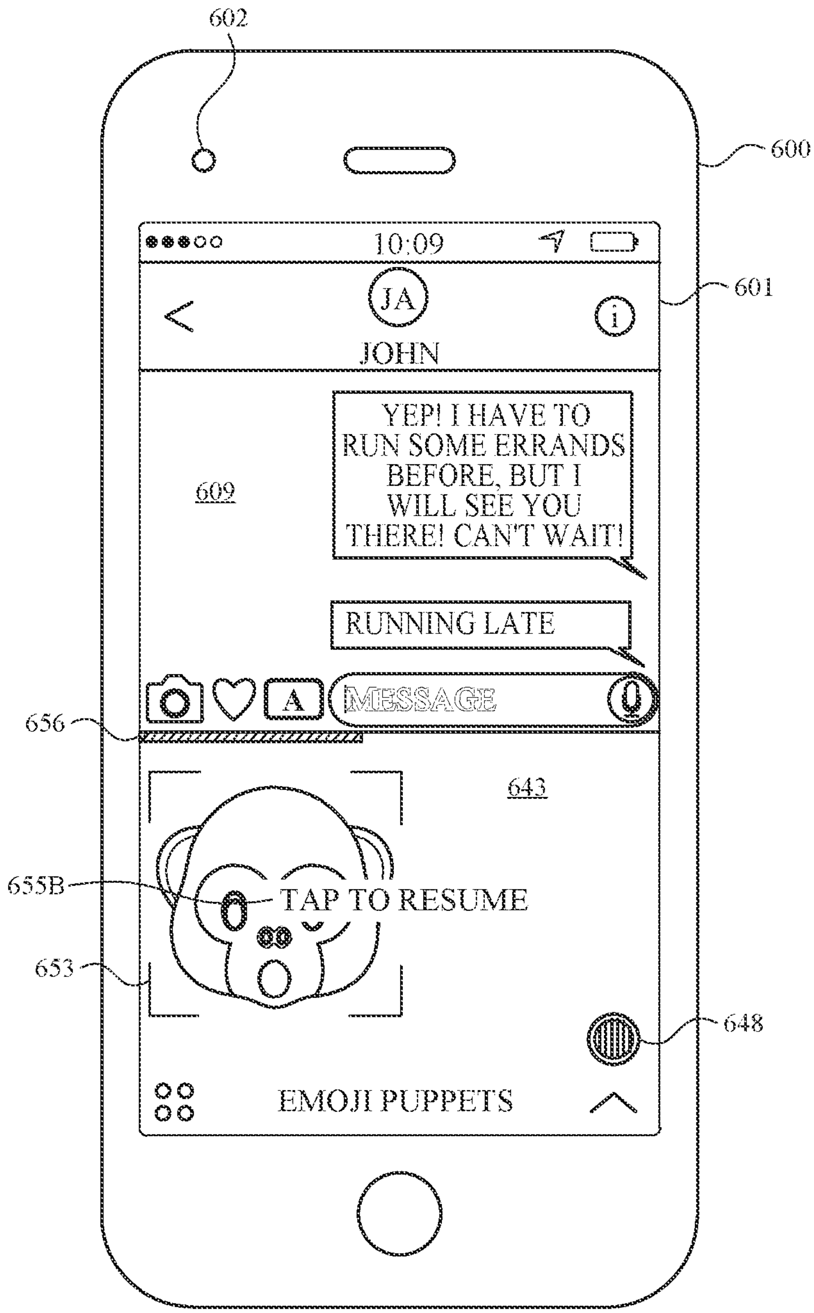
Figure 6R:
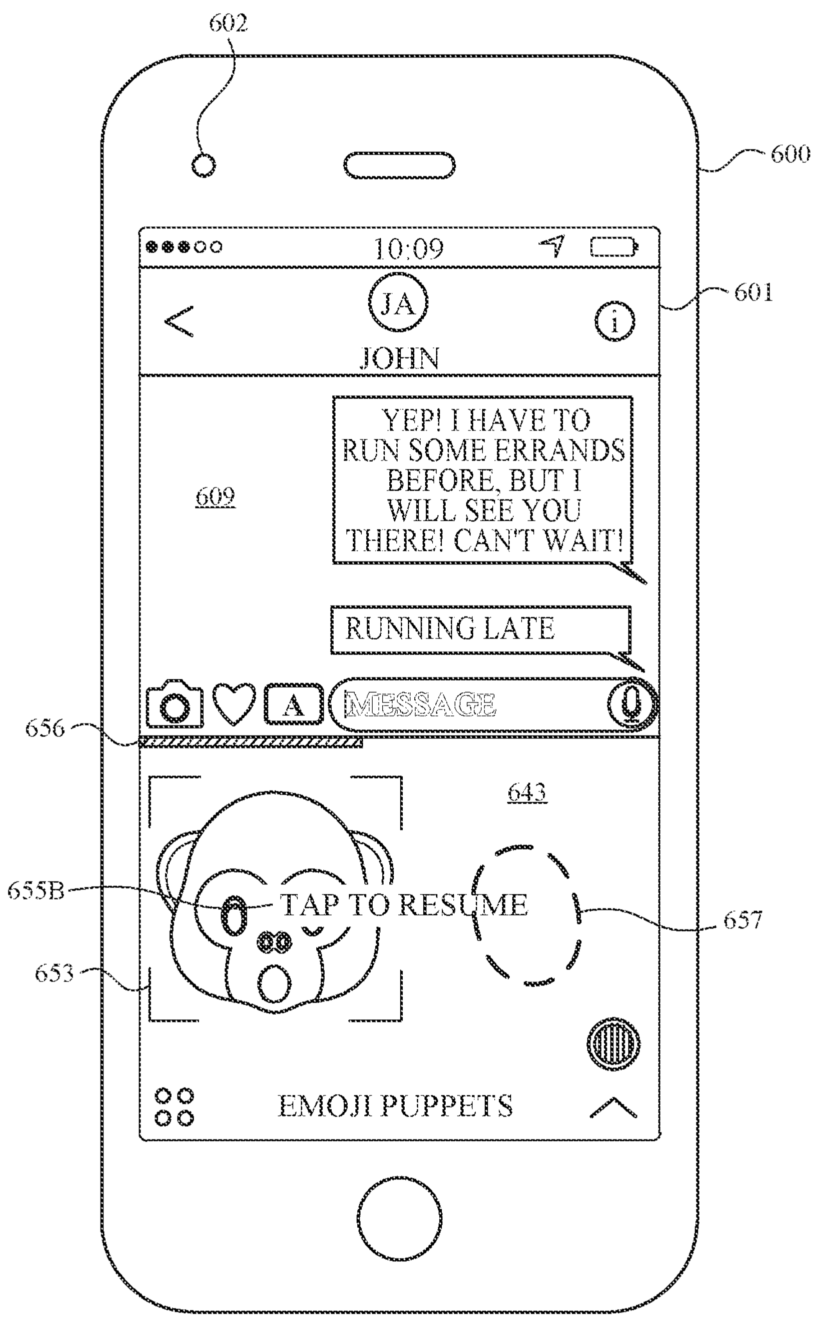
Figure 6R:
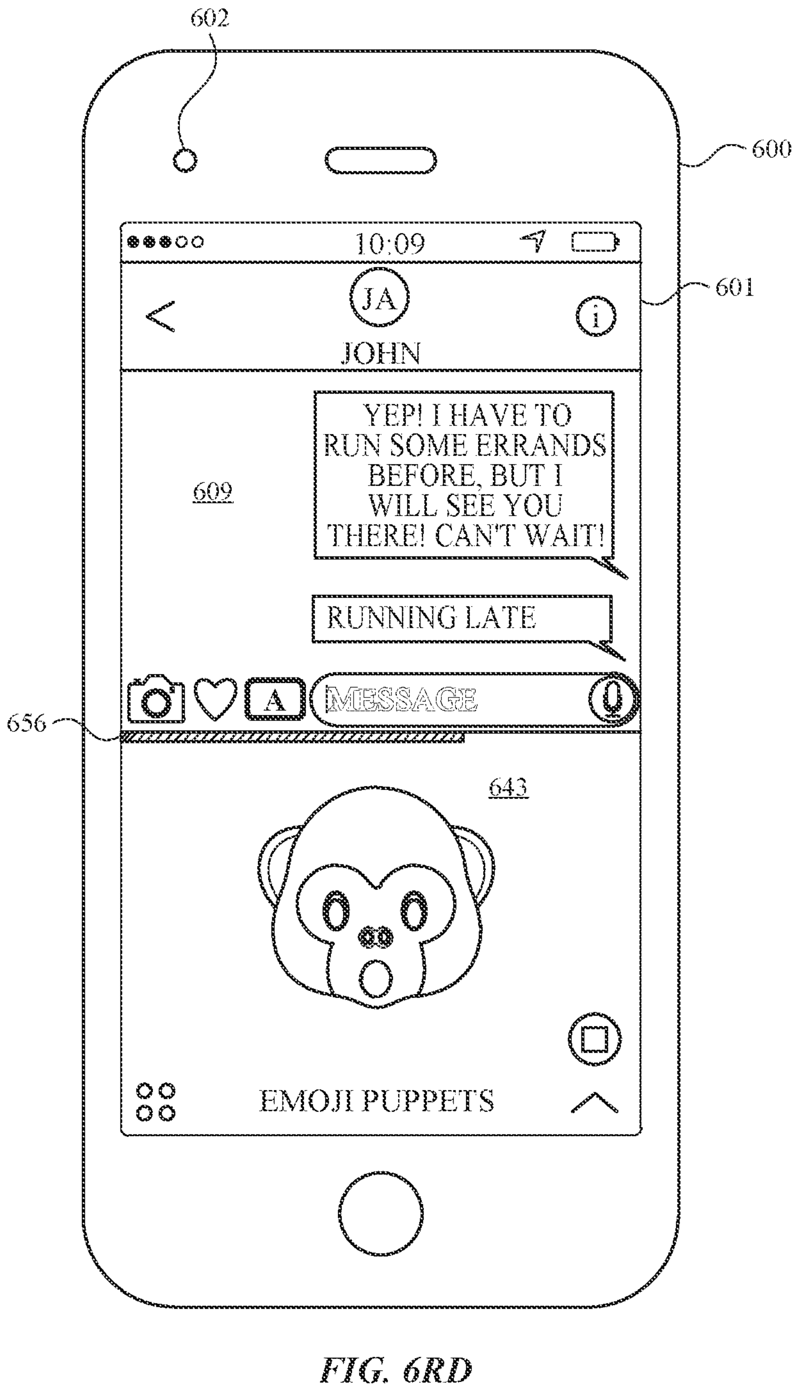

FIG. 6R depicts a later point in time during the recording of an animated virtual avatar. Virtual avatar preview 646 has been updated to reflect a newly detected facial movement and/or expression from the user. Indicator 656 has also been updated to reflect the further progress in recording the animated virtual avatar.

FIG. 6RA depicts device 600 detecting, during avatar recording, that the user has altered their position, relative to the device. Specifically, at the point in time corresponding to FIG. 6RA, the user face is no longer in the field of view of the camera. In response, device 600 displays the virtual avatar at an edge of the avatar interface 643 (e.g., an edge that corresponds to the last detected position of the user's face), displays framing corners 653 around the virtual avatar, and displays message 655A ("Bring Your Face Into View") to prompt the user to adjust their alignment with respect to the device. In some embodiments, recording of the virtual avatar continues even after the user's face is no longer detected in the field of view of the camera, though the virtual avatar will remain static (or assume a predetermined pose (e.g., a neutral pose)) while the user's face is not detected.

FIG. 6RB depicts device 600 after the user has remained outside of the field of the camera for longer than a predetermined threshold time. In response to detecting that the user has remained outside the field of view of the camera for longer than the predetermined time, device 600 pauses the recording of the virtual avatar. As shown in 6RB, device 600 has replaced stop button 654 with record button 648, in accordance with pausing of the recording. Device 600 also displays message 655B ("Tap To Resume"), indicating to the user that recording has been paused. In some embodiments, such as that shown in FIG. 6RC, a user may resume recording by tapping (e.g., tap gesture 657) anywhere in avatar interface 643, including tapping record button 648, which resumes recording as shown in FIG. 6RD. Pausing recording the virtual avatar when the user has remained outside of the field of view of the camera for longer than the predetermined threshold amount of time, and requiring another input to resume recording, reduces energy usage and usage of the depth camera which prolongs the battery life of a device run on battery power and prolongs the life of the depth camera.

Figure 6S:
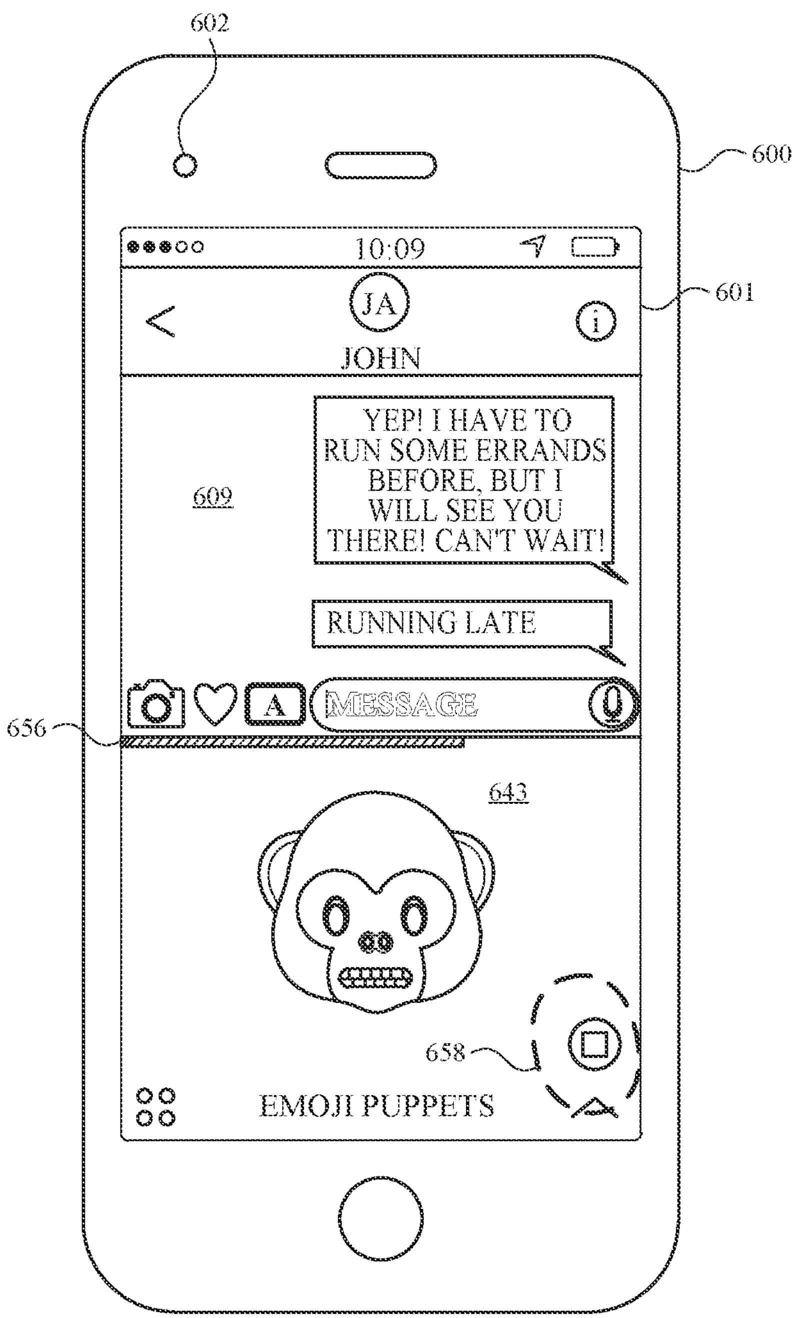
Figure 6S:
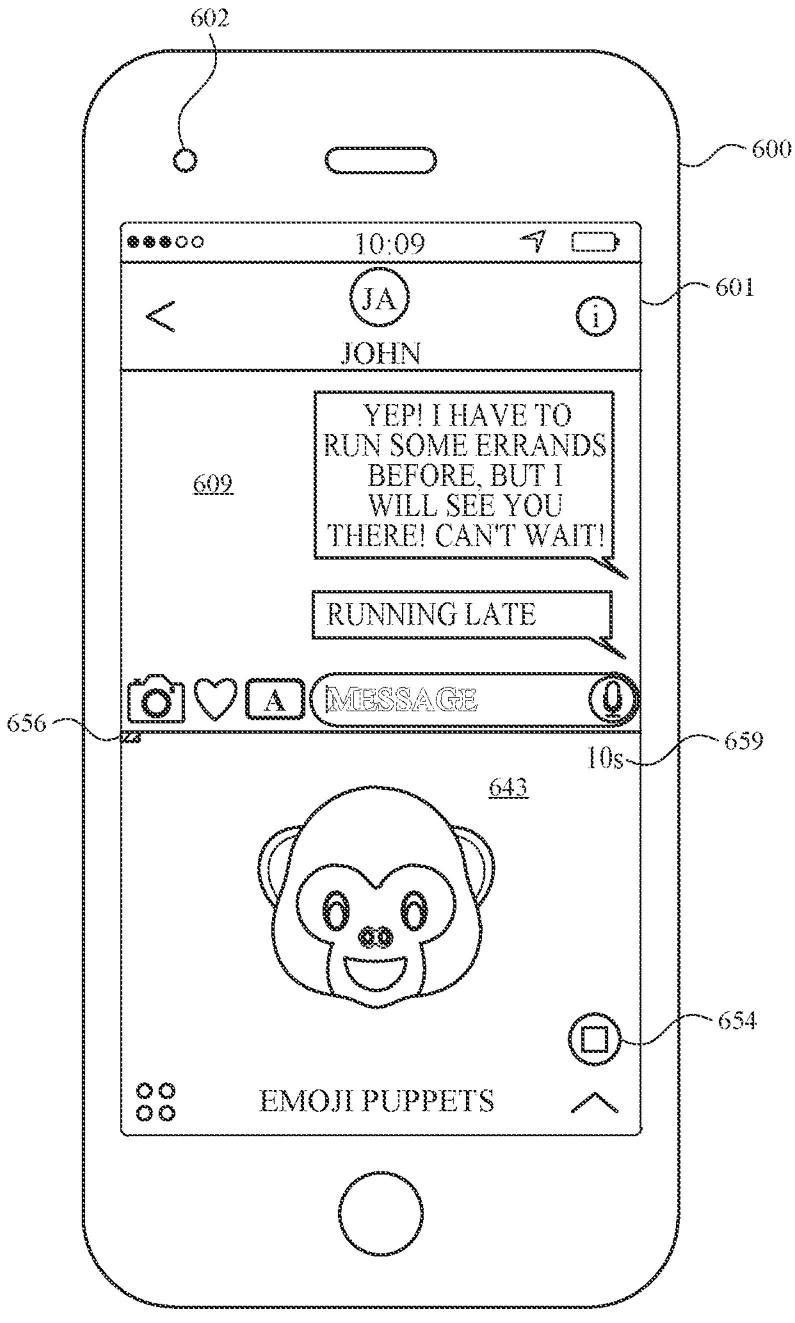
Figure 6S:
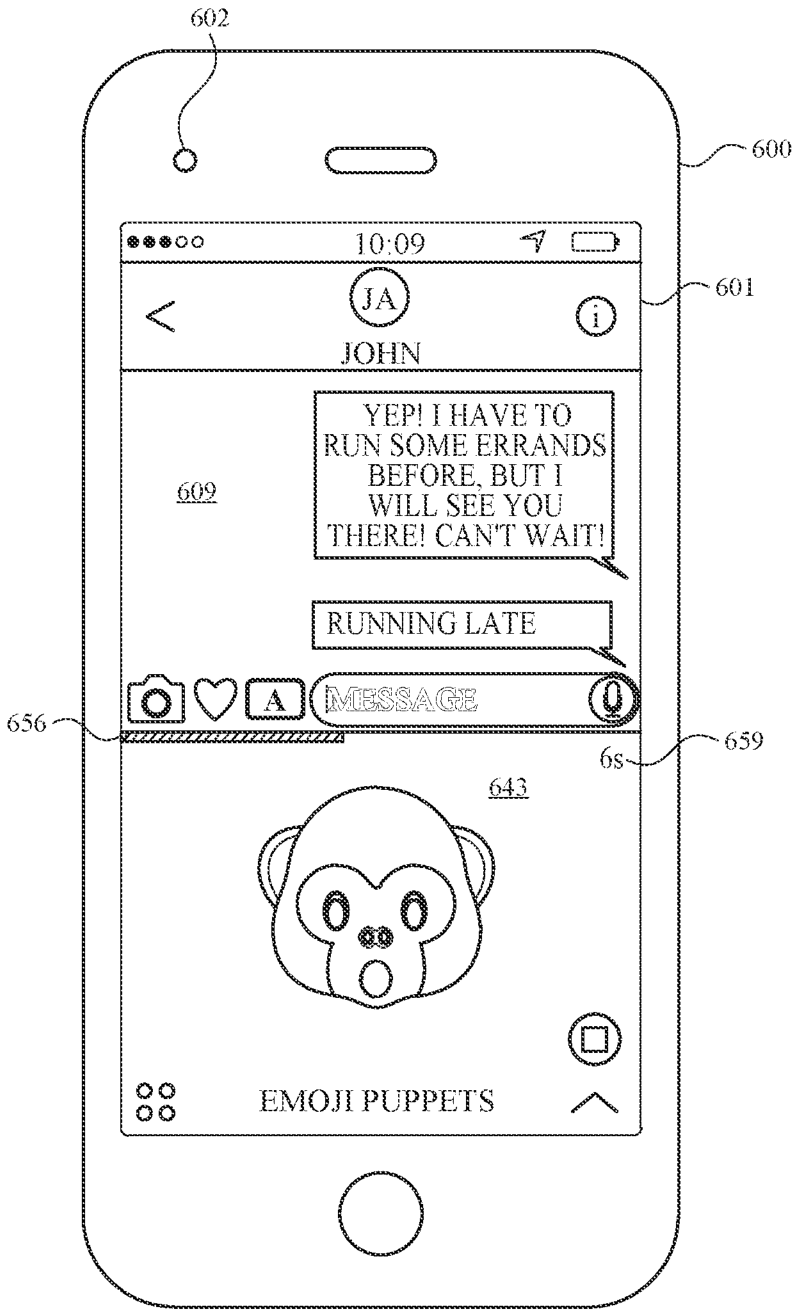
Figure 6S:
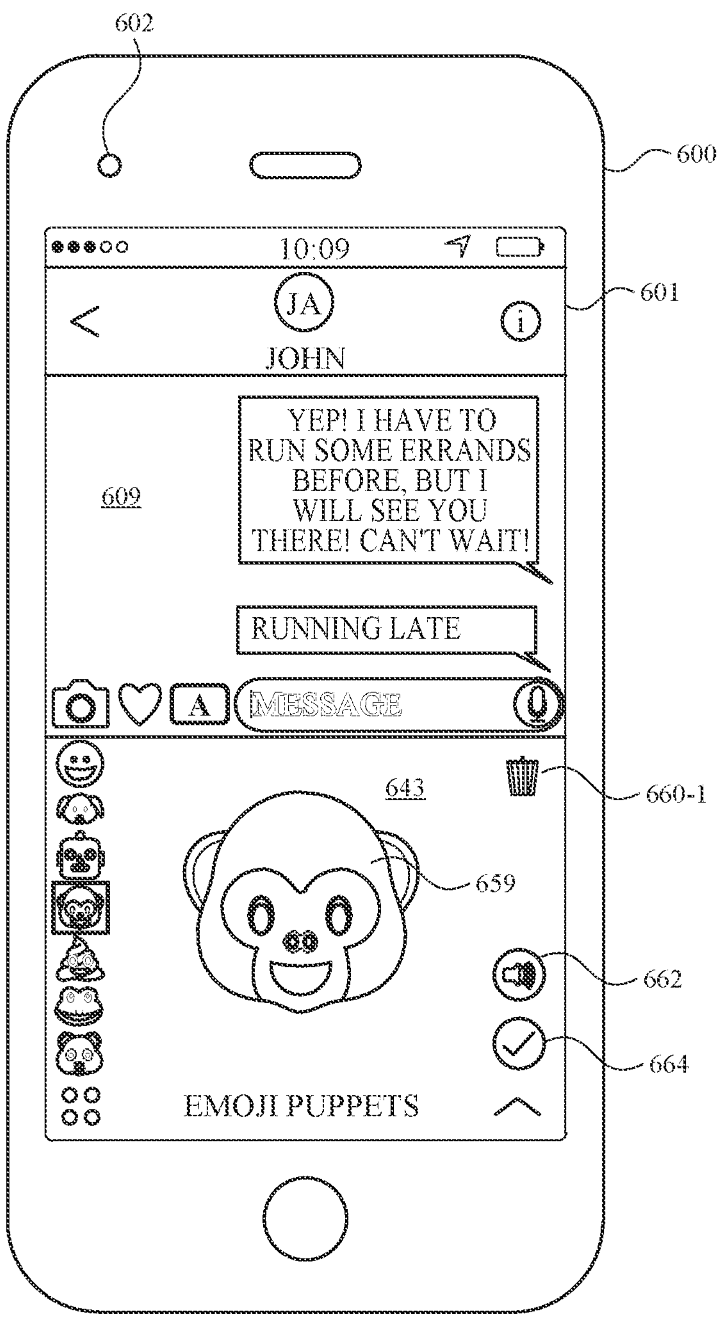

FIG. 6S depicts a yet later point in time during the recording of an animated virtual avatar. Virtual avatar preview 646 has been updated further to reflect a newly detected facial movement and/or expression from the user. Indicator 656 has also been updated to reflect the further progress in recording the animated virtual avatar.

Figure 6T:
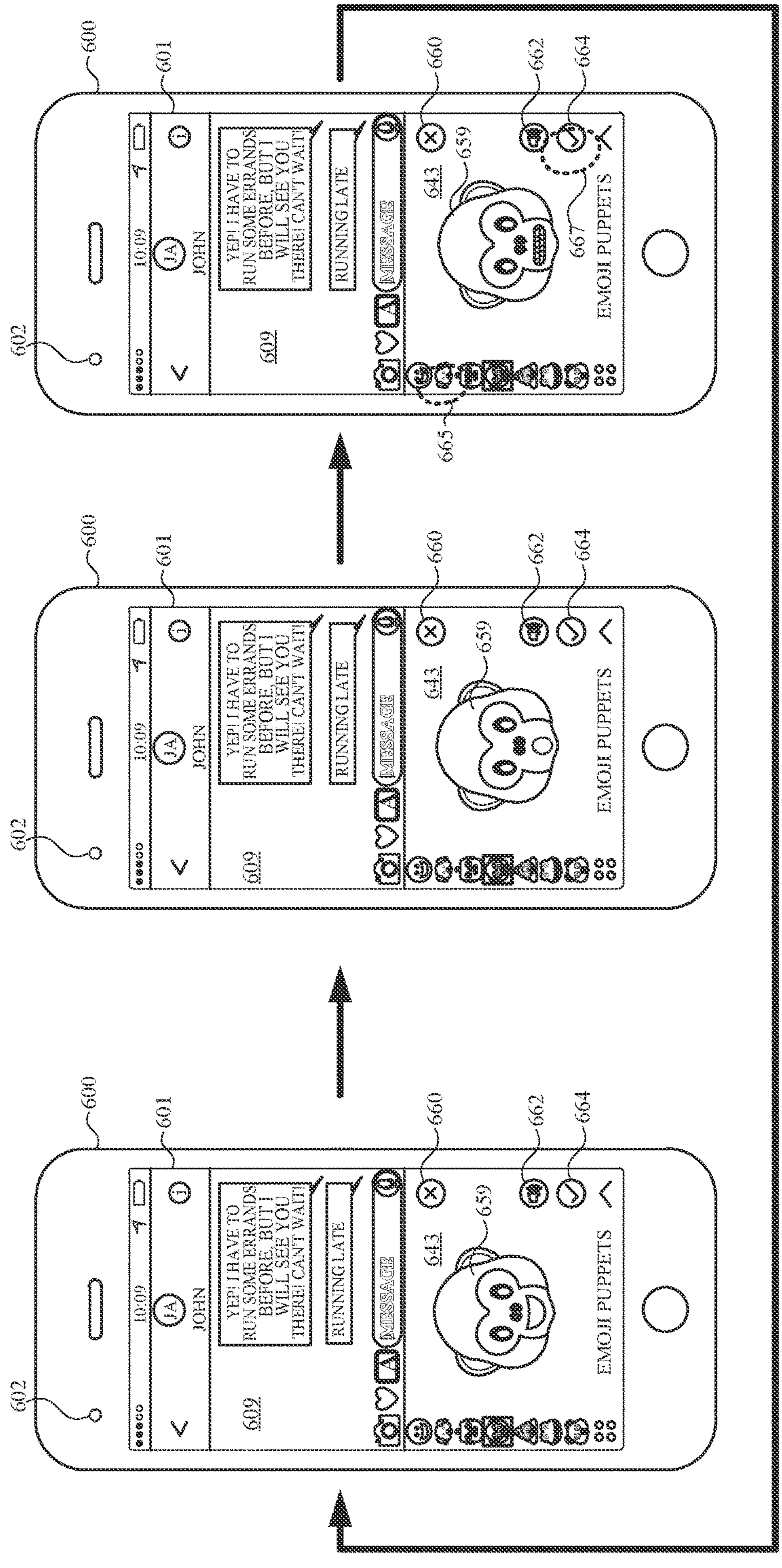

In FIG. 6S, a gesture (e.g., a tap gesture represented by contact 658) requesting recording of the animated virtual avatar to stop is received. In response, device 600 stops recording the animated virtual avatar and updates the virtual avatar interface as depicted in FIG. 6T. In other cases, device 600 stops recording the animated virtual avatar and updates the virtual avatar interface as depicted in FIG. 6T in response to expiration of a predetermined time period (e.g., 15 seconds).

FIG. 6SA to 6SC depict another embodiment of the virtual avatar interface 643 while recording (e.g., generating) a virtual avatar. As shown in FIG. 6SA, device 600 displays a timer 659 (e.g., showing 10 seconds remaining) indicating the time remaining in the current avatar recording session (e.g., a session initiated by activating record button 648). In FIG. 6SB, the same recording session has progressed for 4 seconds and timer 659 now shows 6 seconds remaining in the avatar recording session. In FIG. 6SC, the recording session has ended (i.e., FIG. 6SC is a point in time 10 seconds later than FIG. 6SA). In response to the recording session ending, device 600 replaces timer 659 with a trash can affordance 660-1 that can be activated (e.g., by a tap gesture) to discard the completed recording session. In some embodiments, trash can affordance 660-1 functions similarly to discard affordance 660 of 6T and 6U to 6UA.

In FIG. 6T, virtual avatar interface 643 now plays recorded animated virtual avatar 659 in place of displaying the virtual avatar preview, as depicted by the three snapshots of the playback of animated virtual avatar 659. In some embodiments, the recorded animated virtual avatar is played in loop (e.g., it is played at least twice without user input as indicated by the arrows in FIG. 6T). Virtual avatar interface 643 also includes discard button 660, mute button 662, and confirm button 664 (which is displayed in place of record button 652). Discard button 660 discards the displayed recorded animated virtual avatar without saving it and without sending it to a remote user. Mute button 662 allows a user to mute the playback of sound from the recorded animated virtual avatar. Confirm button 664 allows the recorded animated virtual avatar to get sent to a remote user (e.g., sending directly to one or more users associated with the communication displayed in message area 609 in response to activation of confirm button 664 or moved to message composition area 612 before a user sends the message). After device 600 detects selection of confirm button 664, virtual avatar interface 643 is updated to return to the state described with respect to FIG. 6N. In some embodiments, confirm button 664 includes a glyph or icon that is similar to or the same as a send glyph or icon (e.g., 670 in FIG. 6V) that is displayed in a send button for sending messages that are in a message composition region to indicate that the recorded animated virtual avatar can be sent to the remote user by selecting the confirm button 664.

Figure 6U:
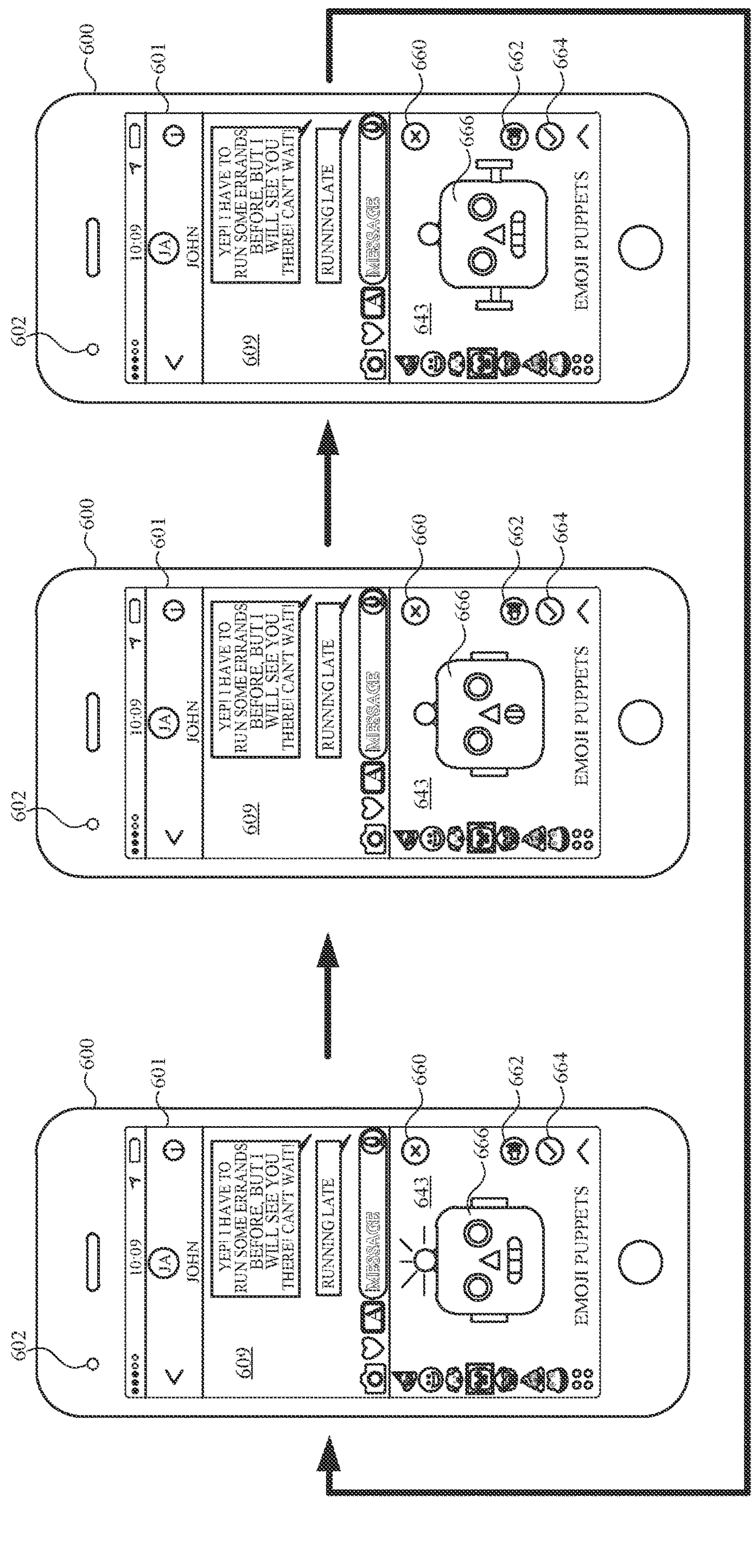
Figure 6U:
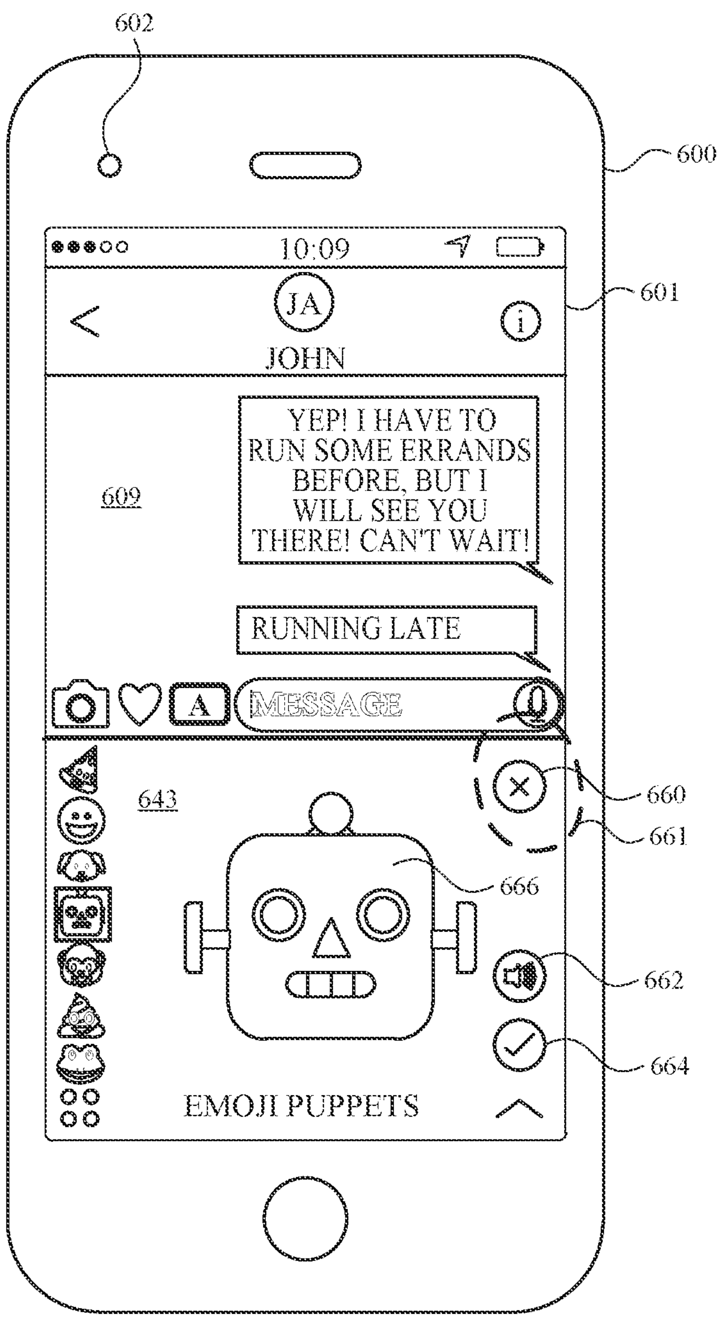
Figure 6U:
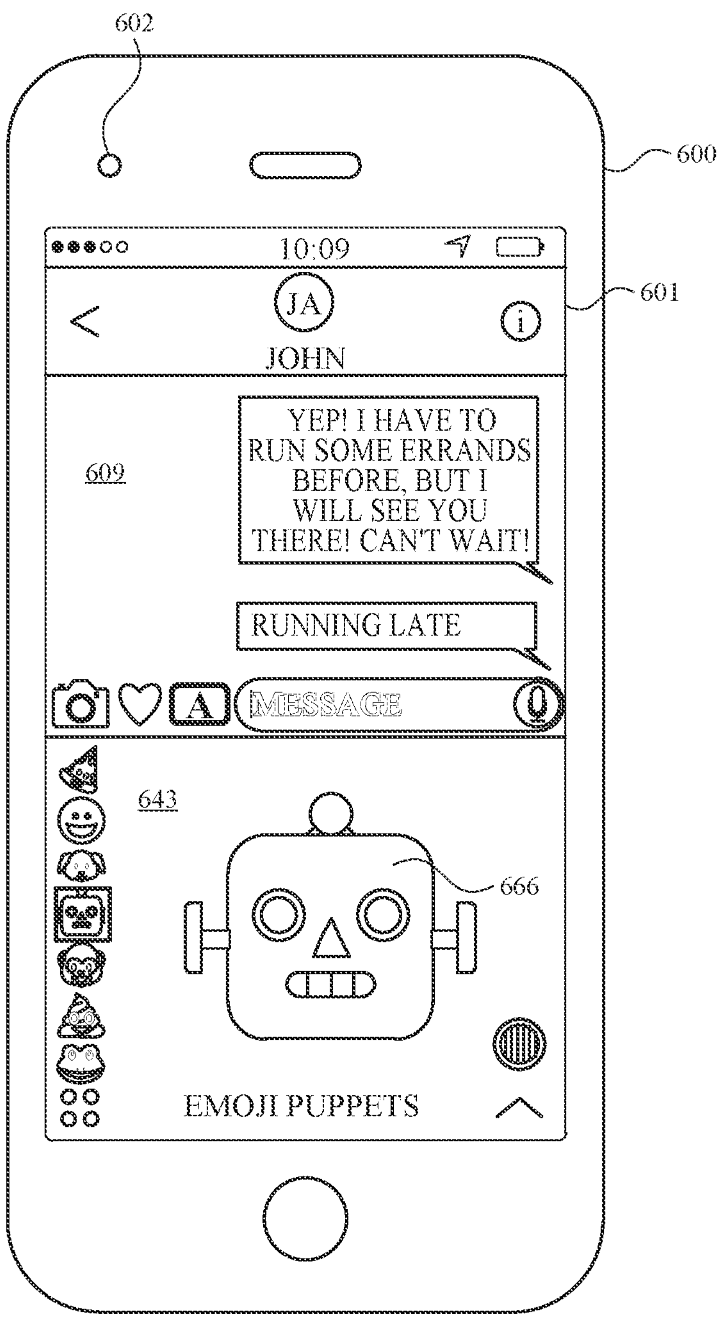

While animated virtual avatar 659 is playing, in response to tap gesture 665 on a representation of a different avatar template than the currently selected template, the animated virtual avatar is updated to reflect the new avatar template without having to rerecord the animated virtual avatar. This is depicted in FIG. 6U, which depicts animated virtual avatar 659 having been replaced by animated virtual avatar 666. The recorded facial muscles, movements, features, and expressions used to generate animated virtual avatar 659 in FIG. 6T are reapplied to the newly selected avatar template in FIG. 6U.

In FIG. 6UA, while animated avatar 666 is playing, device 600 detects a tap gesture 661 corresponding to selection of discard affordance 660. In response, device 600 discards the captured animated avatar data (e.g., forgoes adding the animated avatar to the message composition area 612) and transitions to the interface of FIG. 6UB. In FIG. 6UB, device 600 displays a pre-recording avatar interface 643, similar to that seen in FIG. 6P (e.g., including a record button). In contrast to FIG. 6P, the avatar template remains that of a robot (e.g., virtual avatar 666), rather than returning to the monkey virtual avatar 659. That is, detection of the change from avatar 659 to avatar 666 during the playback depicted in FIGS. 6T and 6U is preserved.

Figure 6V:
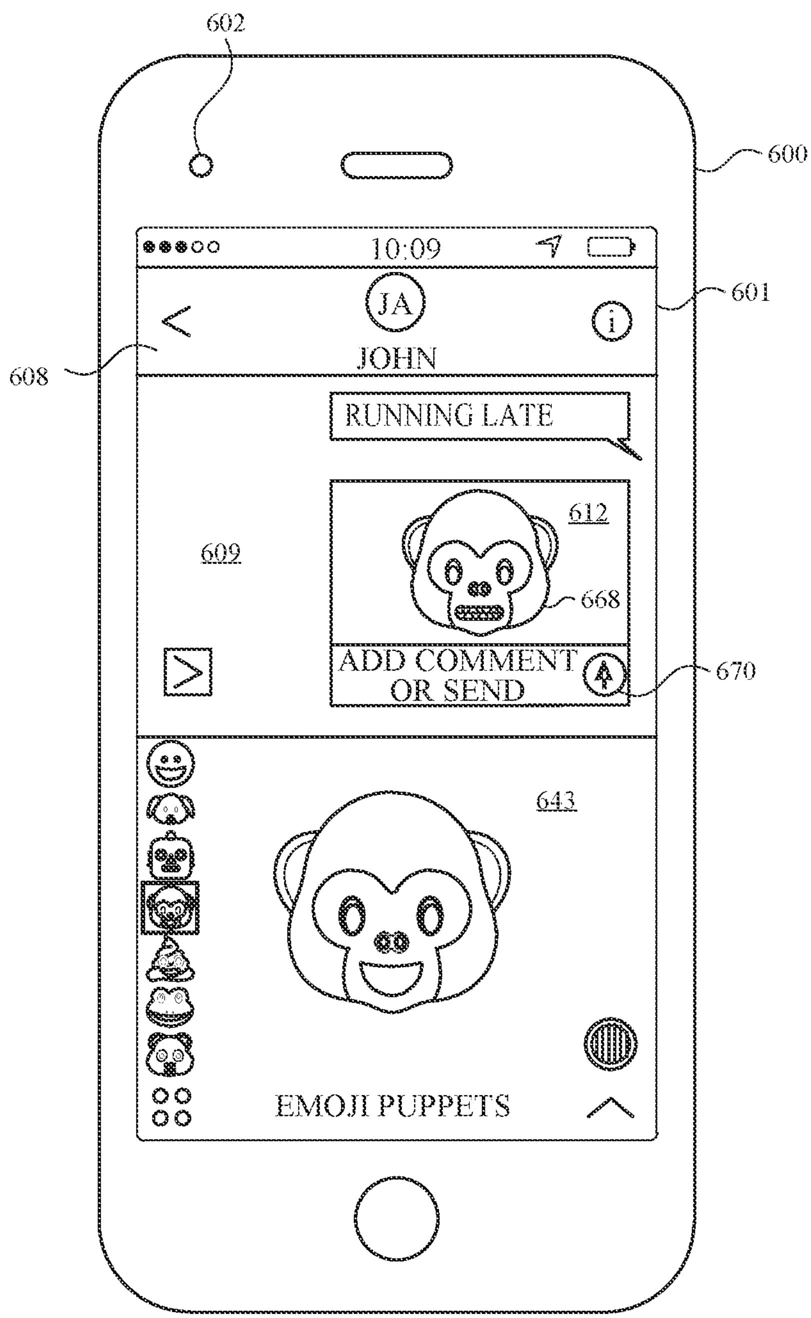
Figure 6W:
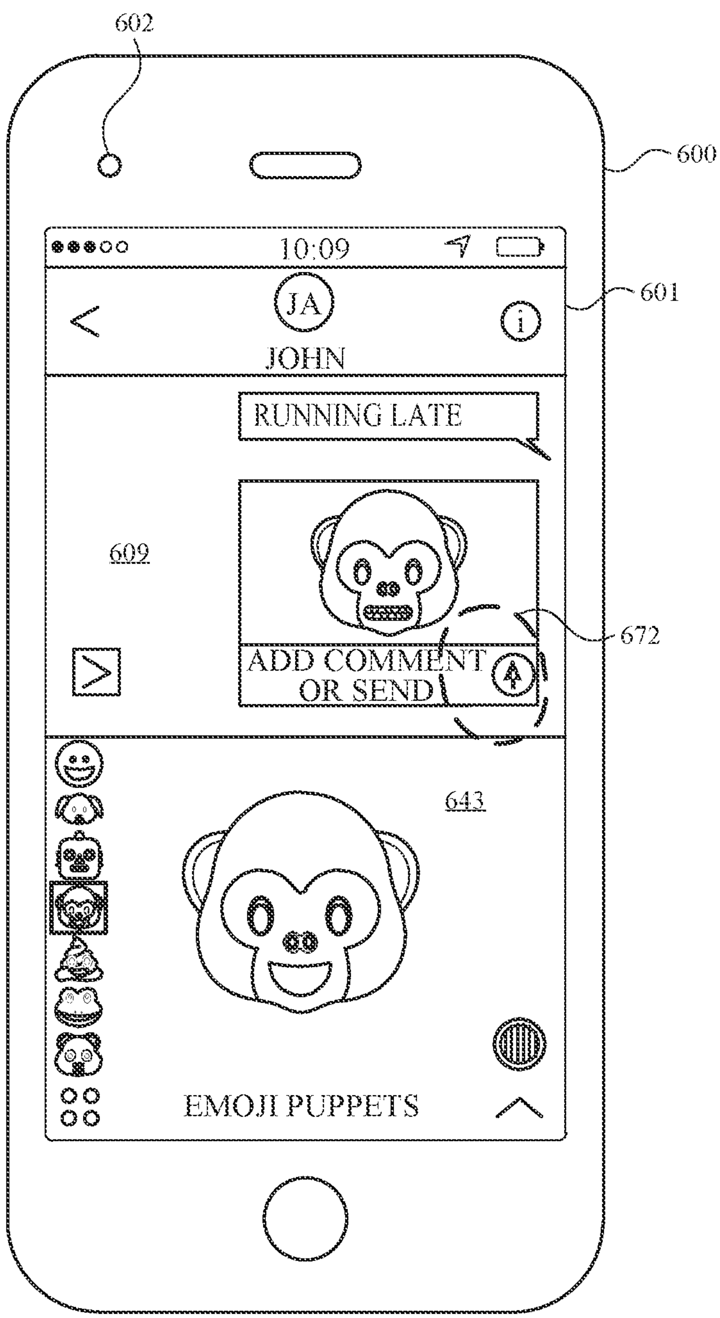
Figure 6X:
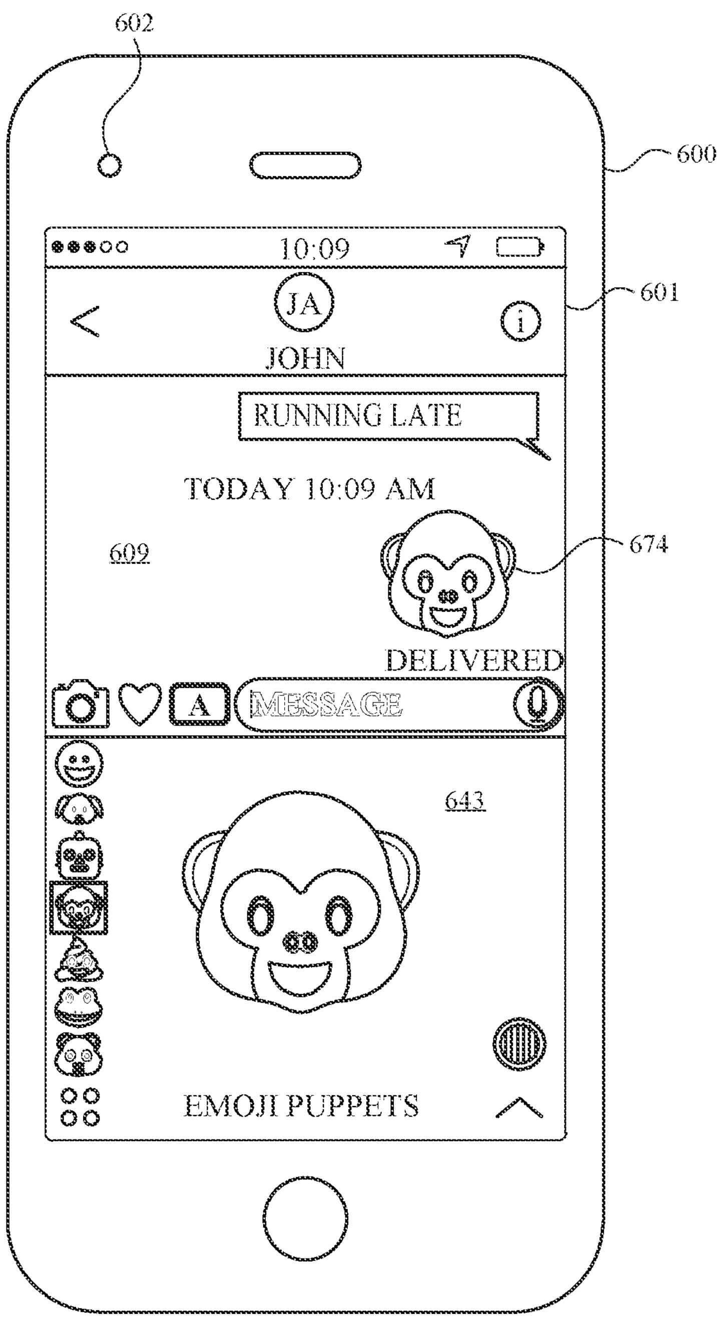

Referring back to FIG. 6T, in response to a gesture (e.g., a tap gesture represented by contact 667), device 600 adds the recorded animated virtual avatar 668 to message composition area 612 (see FIG. 6V) and returns virtual avatar interface 643 to the state described in FIG. 6N (see FIG. 6V). The user can then add more message content (e.g., text or other multimedia items) to the message (see FIG. 6V) before device 600 sends the message (e.g., in response to a tap gesture represented by contact 672 on send affordance 670, as depicted in FIG. 6W). Alternatively, upon device 600 detecting selection of confirm button 664, device 600 sends the recorded animated virtual avatar to one or more remote users associated with the communication displayed in message area 609, which is then updated to reflect that animated virtual avatar 668 has been sent to one or more users associated with the communication included in message area 609, as depicted in FIG. 6X.

Figure 6Y:
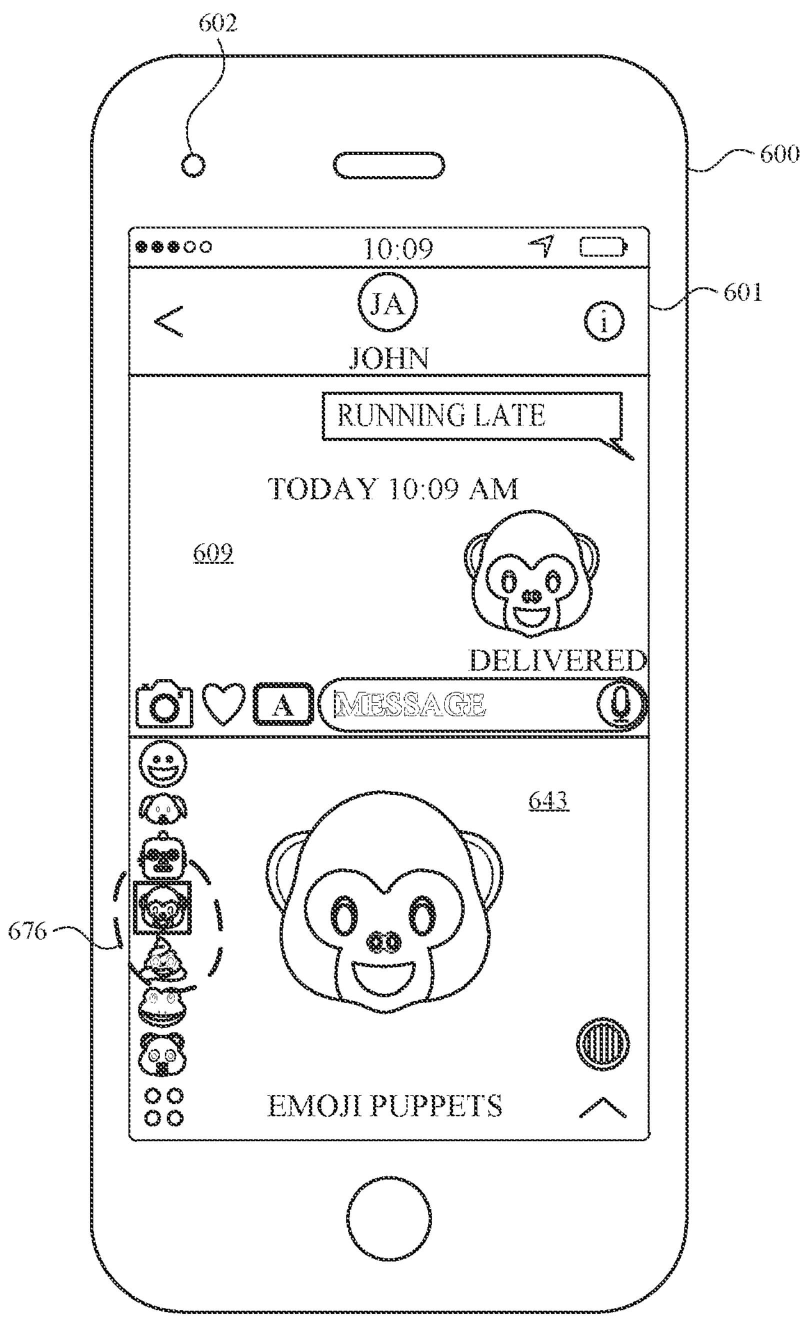
Figure 6Z:
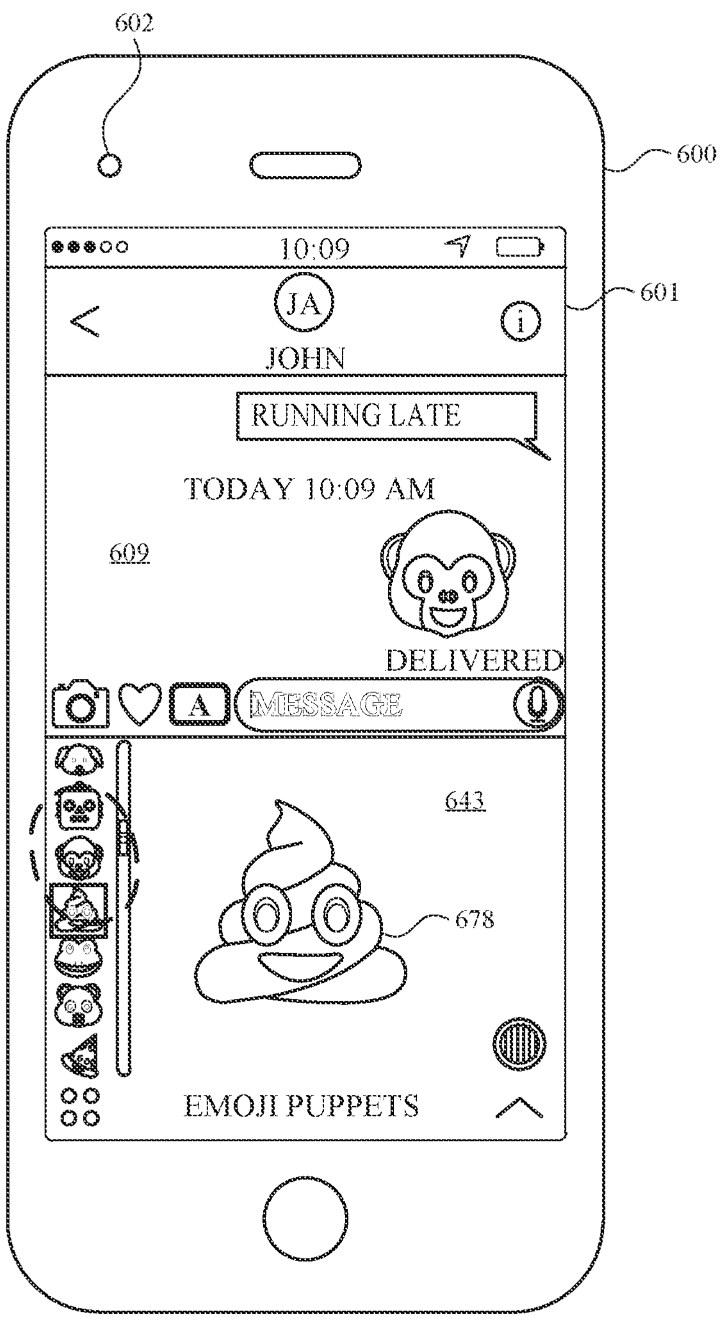
Figure 6A:
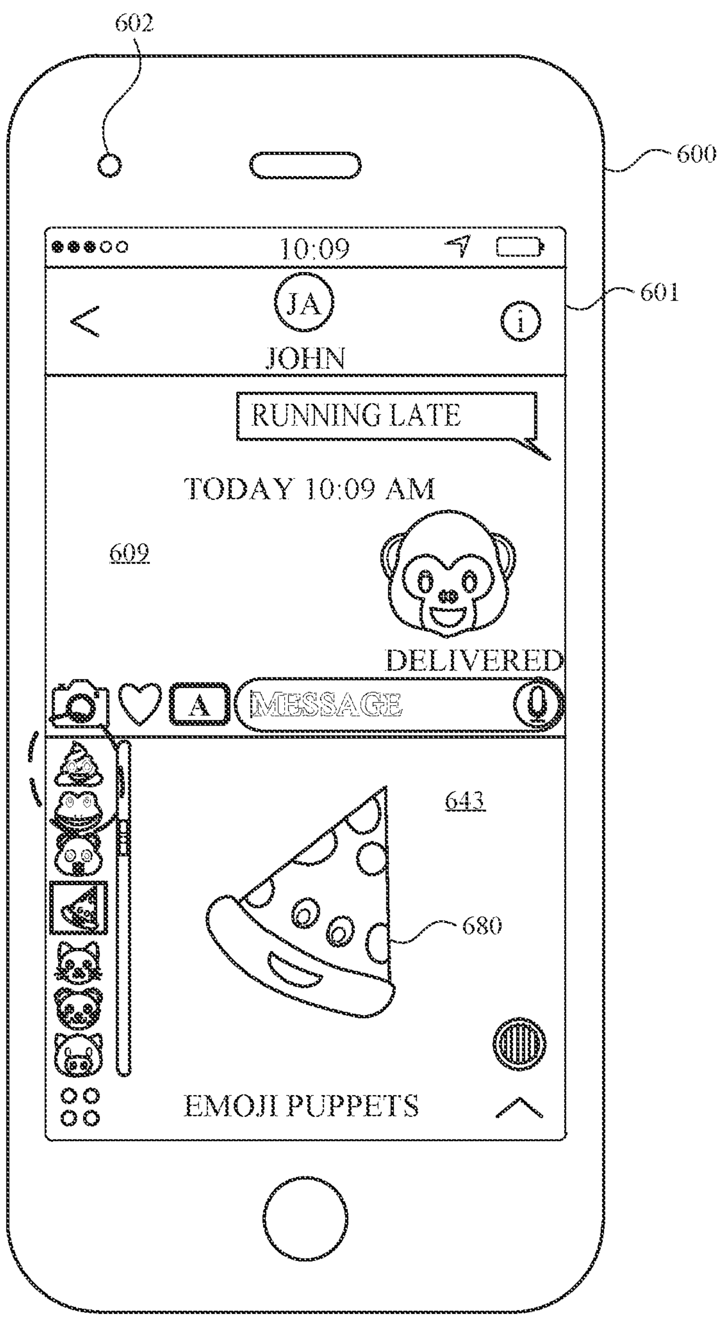
Figure 6B:
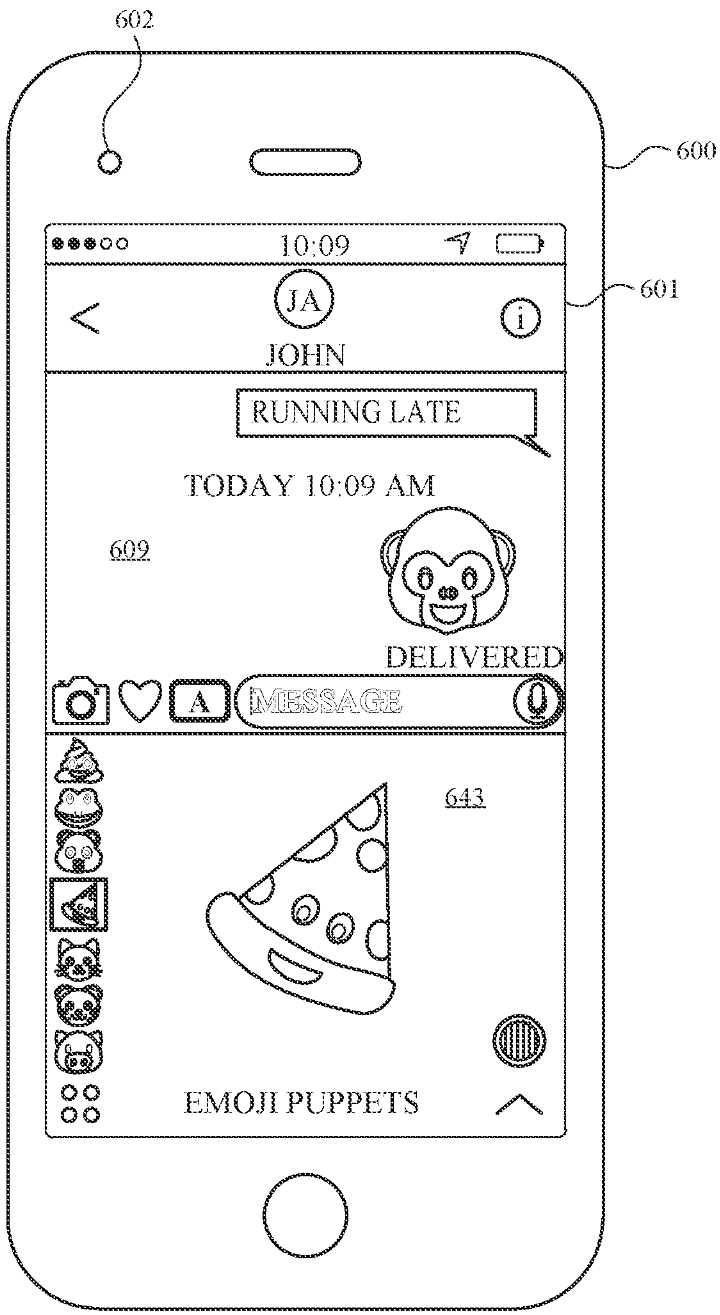
Figure 6C:
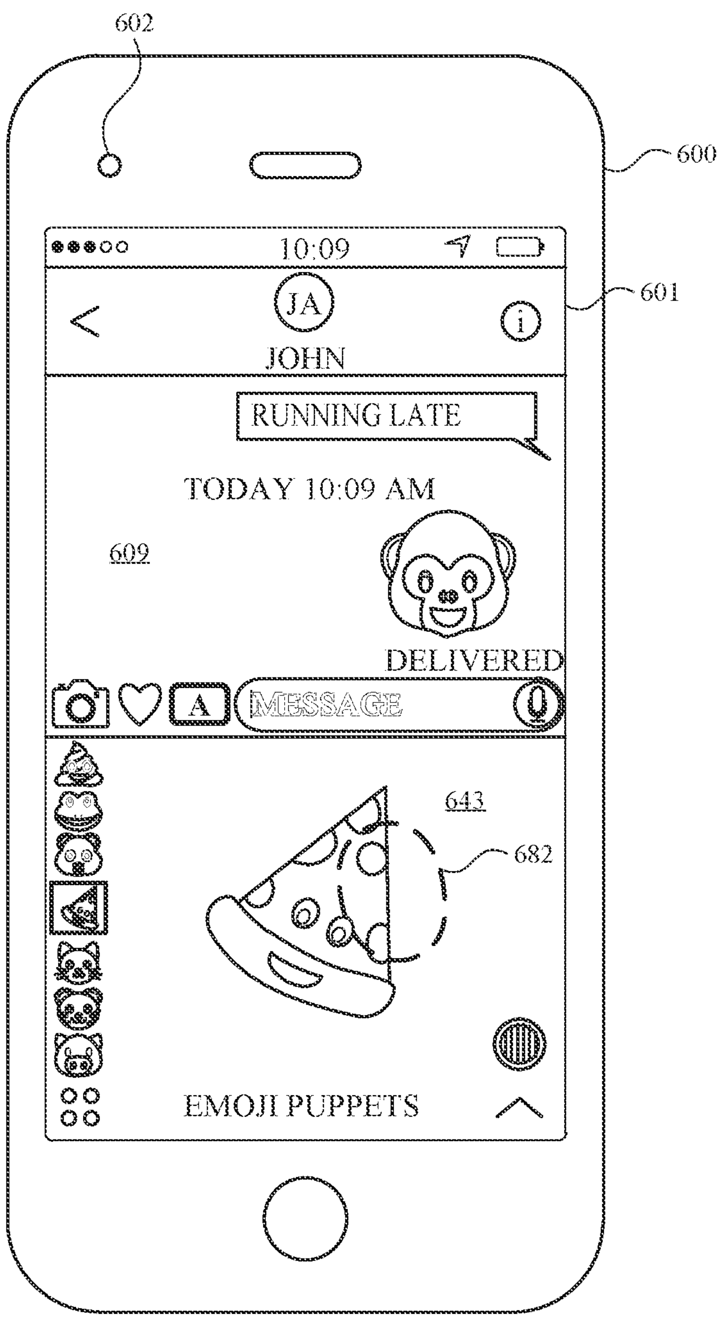
Figure 6D:
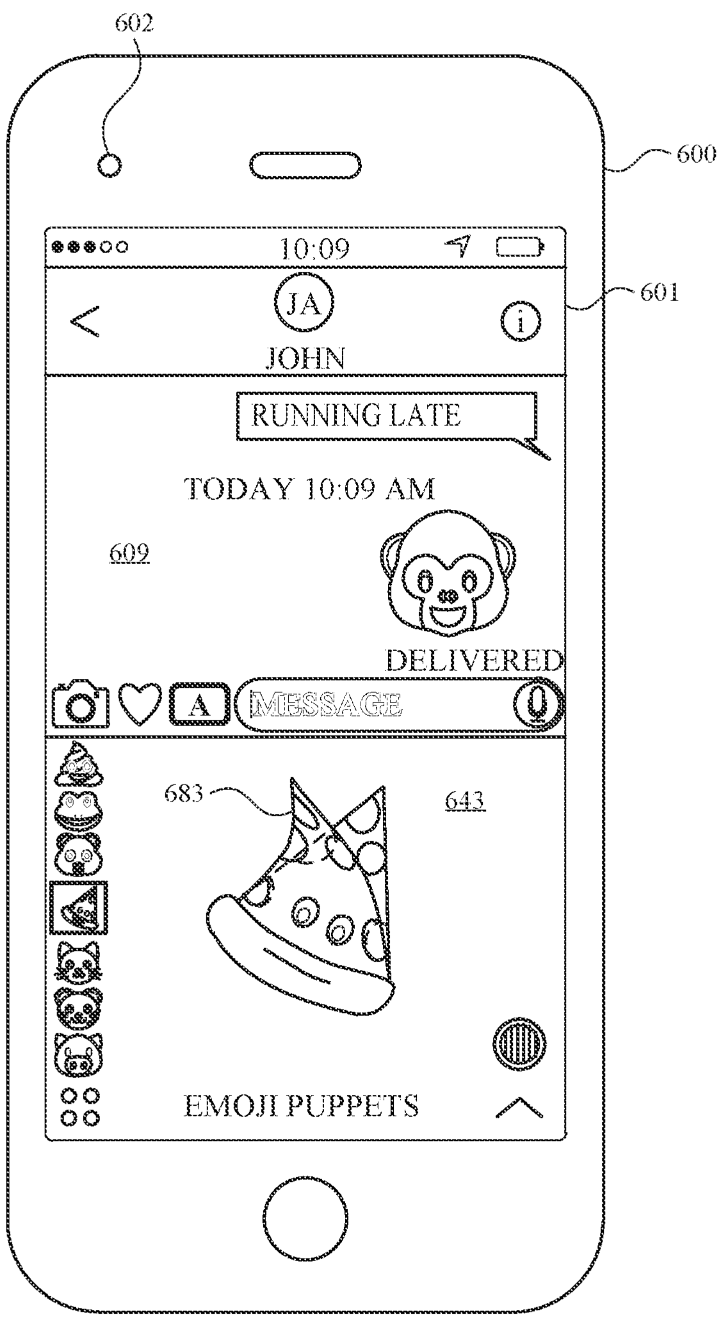
Figure 6E:
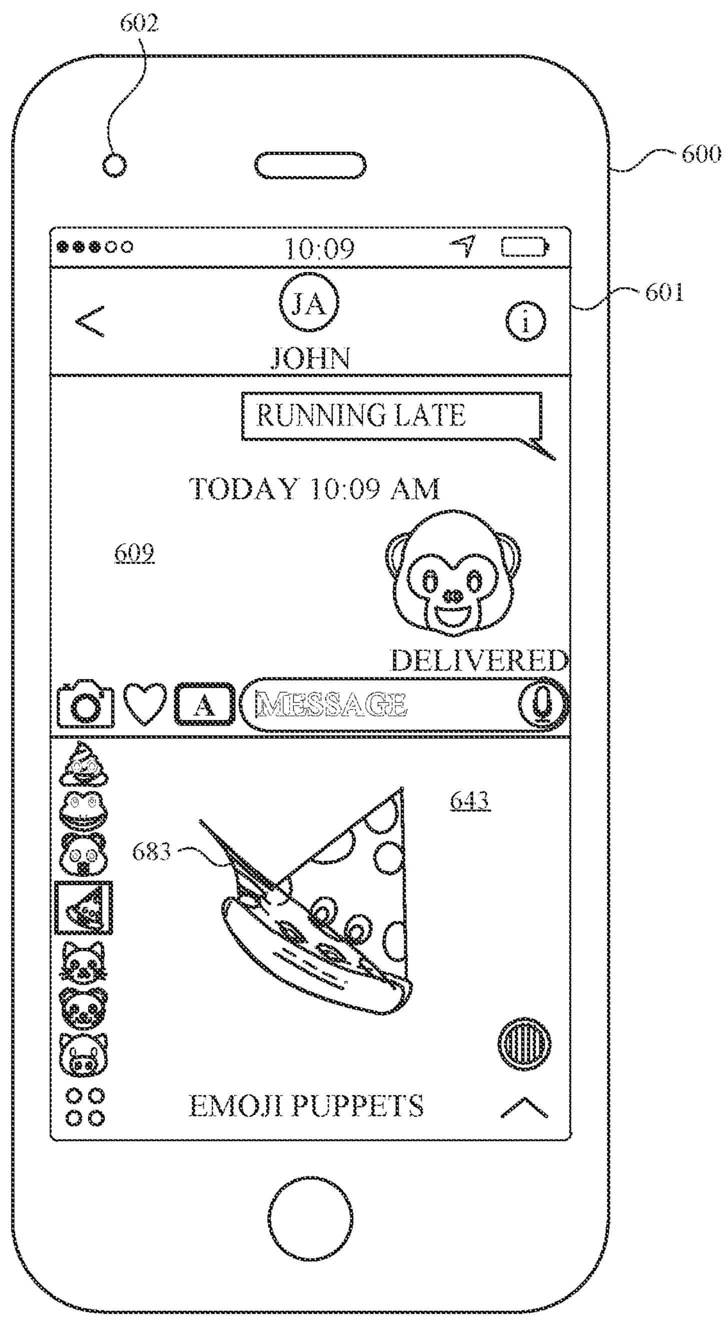
Figure 6F:
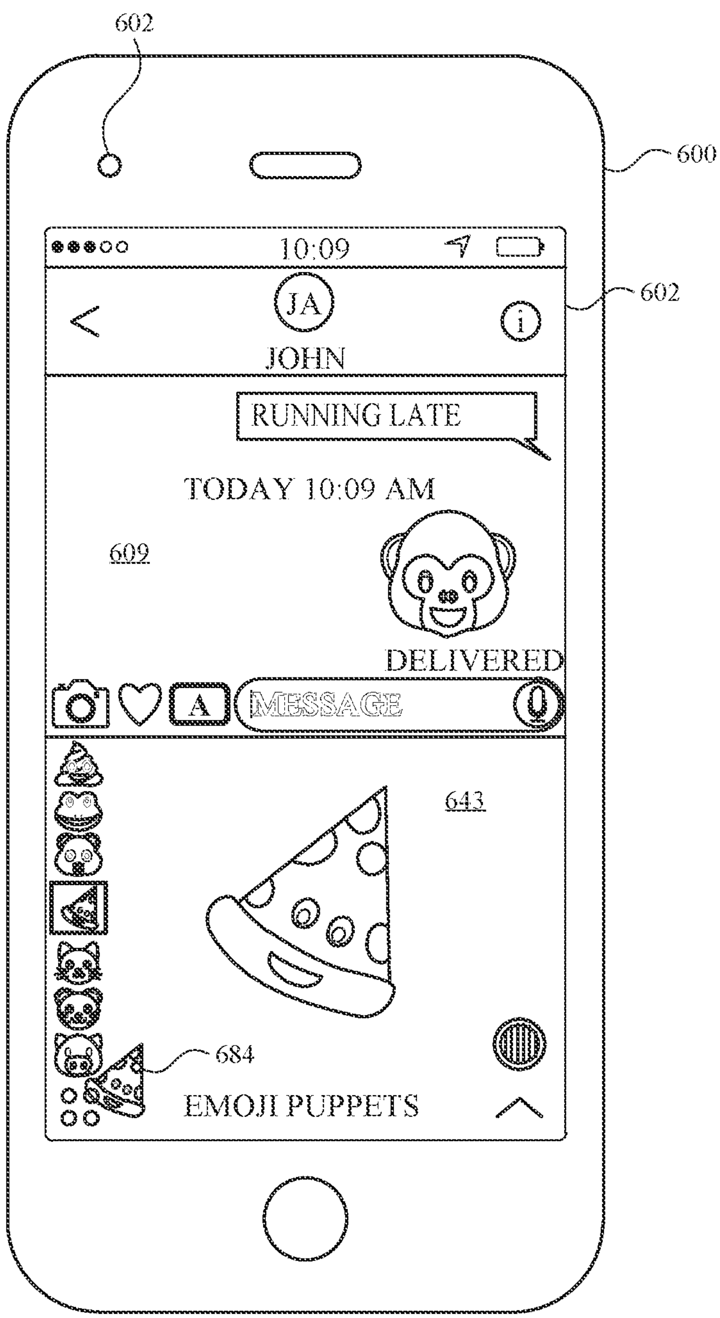
Figure 6G:
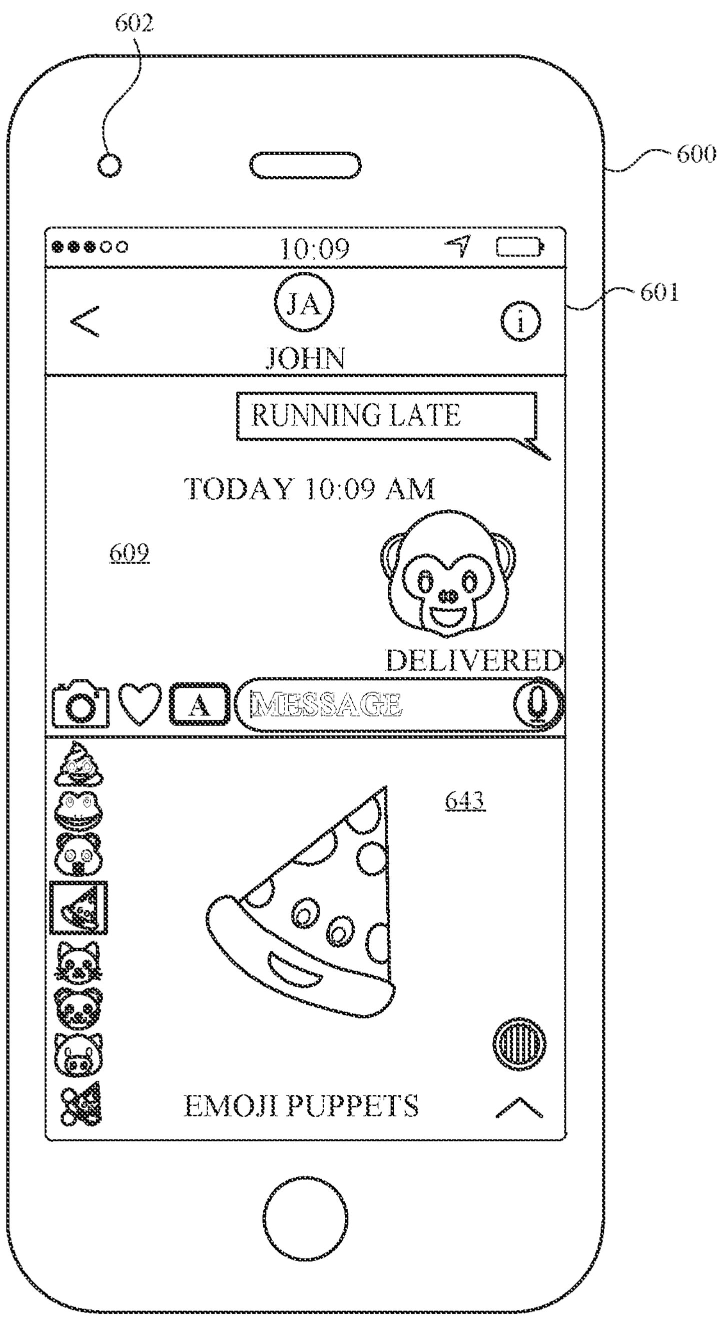
Figure 6H:
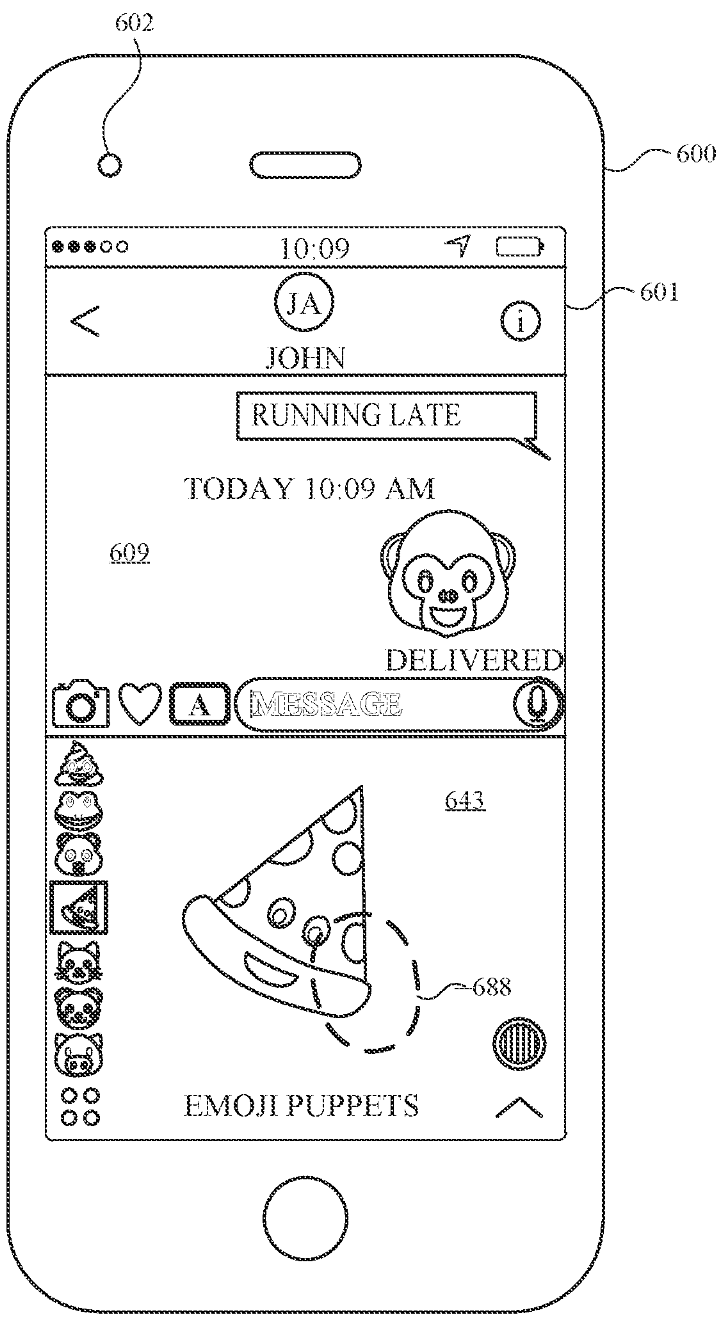
Figure 6I:
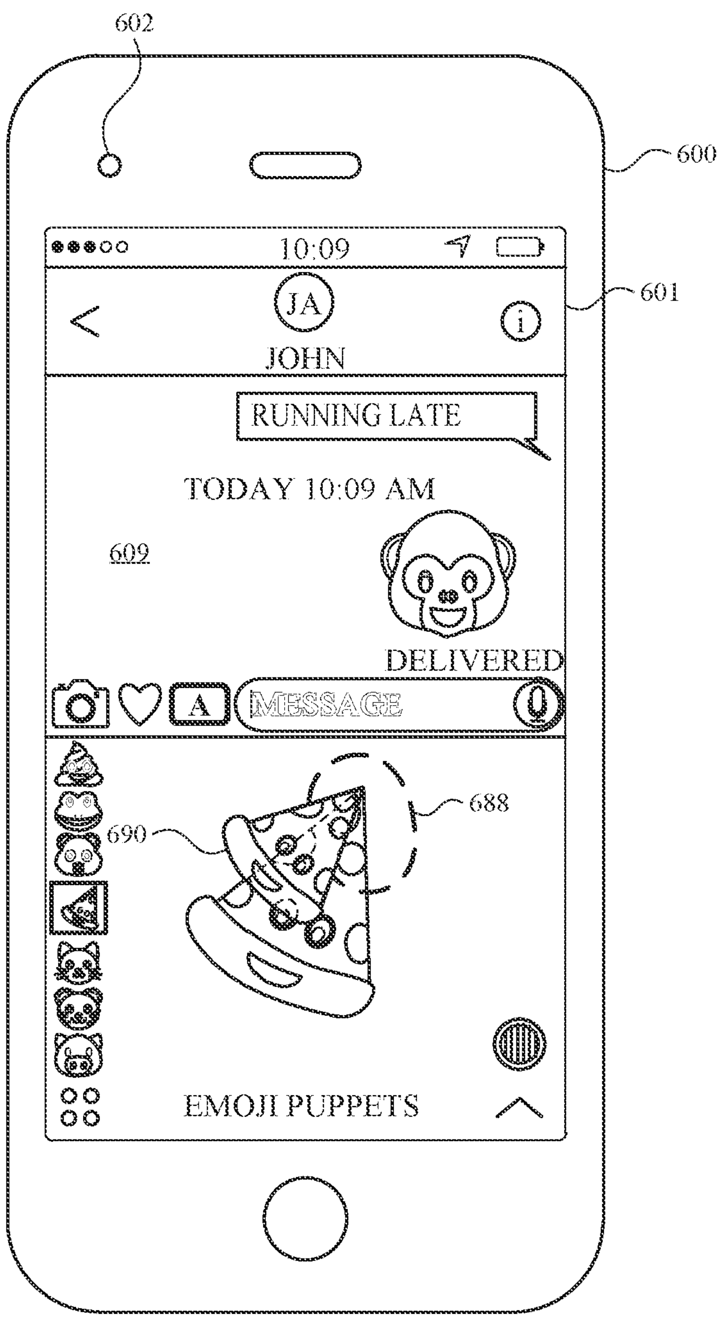
Figure 6J:
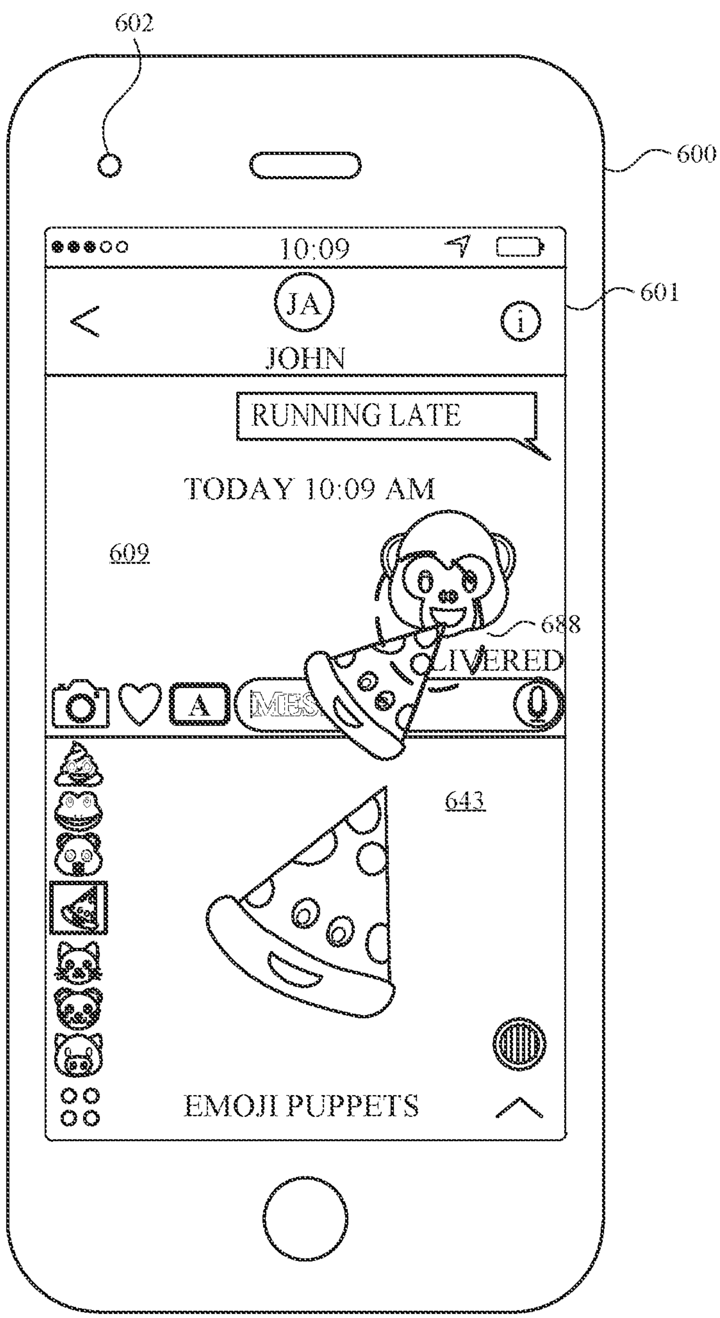
Figure 6K:
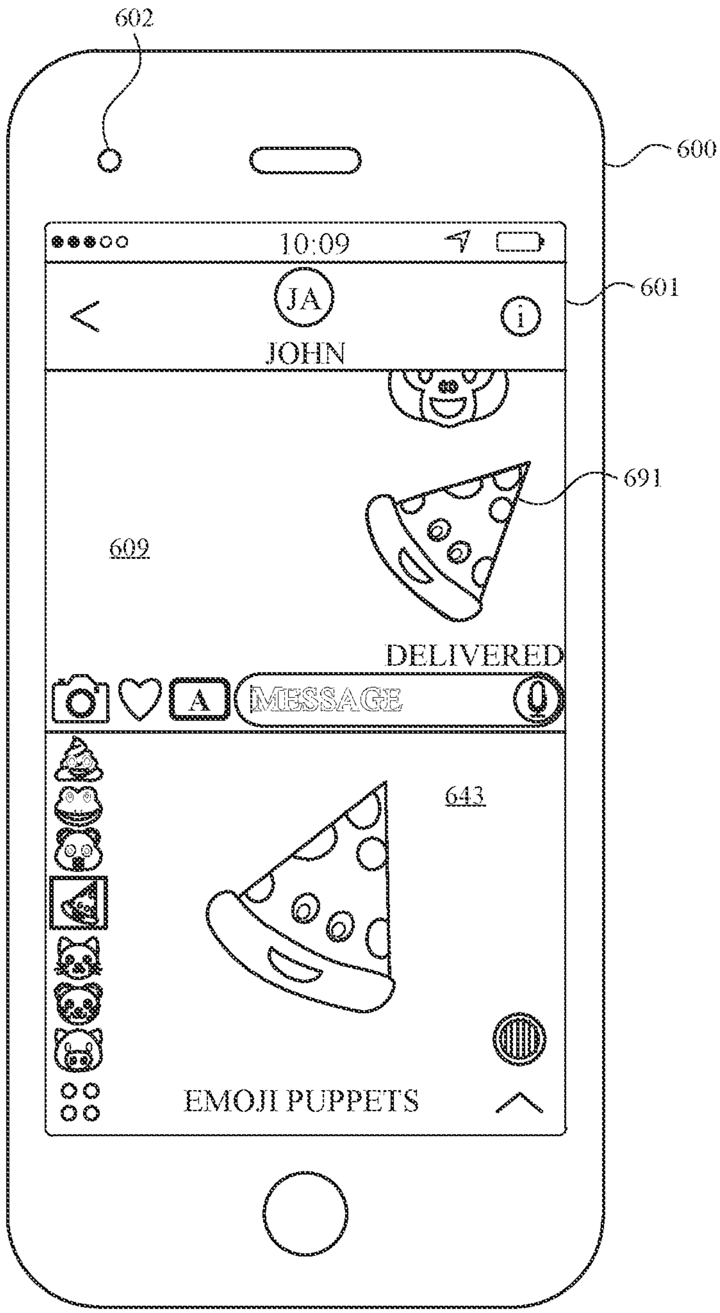
Figure 6L:
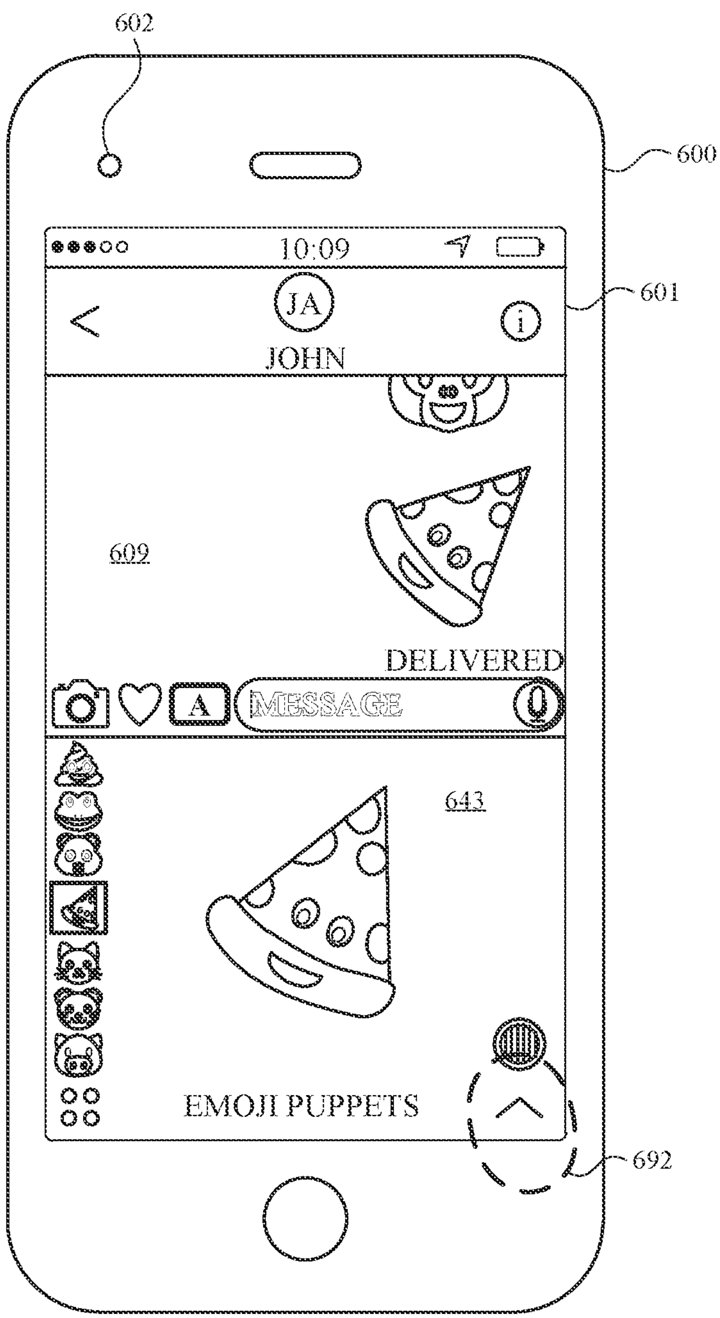
Figure 6M:
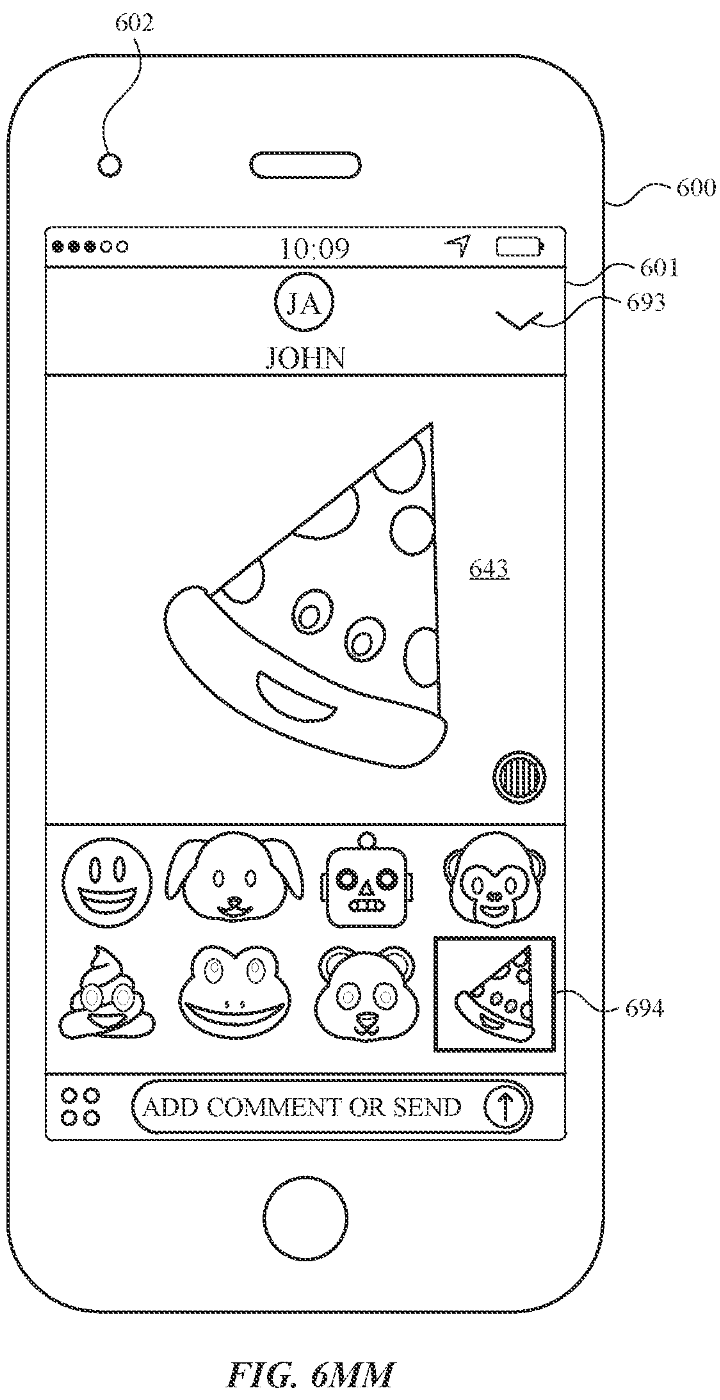

FIGS. 6Y-6BB depict the response of virtual avatar interface 643 to user input scrolling through the list of avatar templates. For example, in response to swipe gestures (e.g., representation by the movement of contact 676 vertically across the avatar templates, as depicted in FIGS. 6Y-6AA), device 600 scrolls the avatar templates and changes which avatar template is currently selected. The avatar template present within avatar template indicator 645 is updated based on the swipe gesture. In response to detecting new avatar templates being selected, device 600 updates the virtual avatar preview. For example, in FIG. 6Z, when device 600 detects selection of avatar template representation 644-5, virtual avatar preview 678 (which is based on an avatar template corresponding to representation 644-5) is displayed and in FIG. 6AA, when avatar template representation 644-8 is selected, virtual avatar preview 680 (which is based on an avatar template corresponding to representation 644-8) is displayed.

In addition to generating a recording of animated puppet emoji, emoji interface 643 also allows for generating static virtual avatars (e.g., stickers with an expression/appearance that is determined based on the state of a virtual avatar). For example, in FIG. 6CC, in response to user input (e.g., a tap and hold gesture represented by contact 682) on virtual avatar preview 680, device 600 generates a sticker corresponding to the state of virtual avatar preview 680 at a time associated with the user input (e.g., when the input was received, when it ended, or some other time associated with the user input). In embodiments, device 600 displays sticker 683 (FIGS. 6DD and 6EE) being peeled off of virtual avatar preview 680 to indicate that a sticker has been generated and/or that the user can place the sticker.

After device 600 generates a sticker, the user optionally chooses from several operations for the sticker. For example, the user can cause device 600 to place the sticker in the recent menu or other similar interface that allows for later use. The user can also cause device 600 to place the sticker in message composition area 612 before device 600 sends a message that includes the sticker, the user can place the sticker in message area 609 (and optionally) on a specific message to cause device 600 to send the sticker to one or more users participating in the communication in message area 609.

For example, in FIG. 6FF, device 600 has detected lift off of contact 682 while contact was still over virtual avatar preview 680. In response, device 600 has saved the generated sticker to device 600, such as in a database or library in device 600's memory that is accessible by recent item menu 629 (FIG. 6I) so that the sticker is optionally selectable through recent item menu 629 or via other interfaces on device 600. Device 600 optionally shows that the sticker is being save locally via an animation with different graphical versions 684 and 686, as depicted in FIGS. 6FF-6GG, moving towards menu selection button 632.

As another example, FIGS. 6HH-6KK show an example of device 600 sending a generated sticker to one or more users participating in the communication represented in message area 609. In FIG. 6II, device 600 detects user input on virtual avatar preview 680 (e.g., a tap and drag gesture represented by contact 688 in FIGS. 6HH-6JJ that starts on virtual avatar preview 680). Sticker representation 690 follows contact 688 as device 600 detects the user dragging the sticker representation into message area 609. Once device 600 detects lift off of contact 688 in message area 609, device 600 sends sticker 691 to one or more remote users that are participants of the communication represented in message area 609, as depicted in FIG. 6KK.

In FIG. 6LL, device 600 updates virtual avatar interface 643 to display more of the screen (or in a full-screen mode) in response to selection of full-screen button 634 (e.g., via a tap gesture represented by contact 692 in FIG. 6LL). FIG. 6MM depicts virtual avatar interface 643 after it is enlarged to use more of display 601. Button 692, when selected, causes device 600 to return virtual avatar interface 643 to its previous configuration.

FIGS. 7A-7J depict messaging interface 608 after receiving an animated emoji from a remote user. While FIGS. 7A-7J use device 600 of FIGS. 6A-6MM as an example, the user interfaces and functionality depicted in FIGS. 7A-7J also apply to other devices (e.g., devices 100, 300, or 500), including those that have not previously sent a sticker or animated virtual avatar.

Figure 7A:
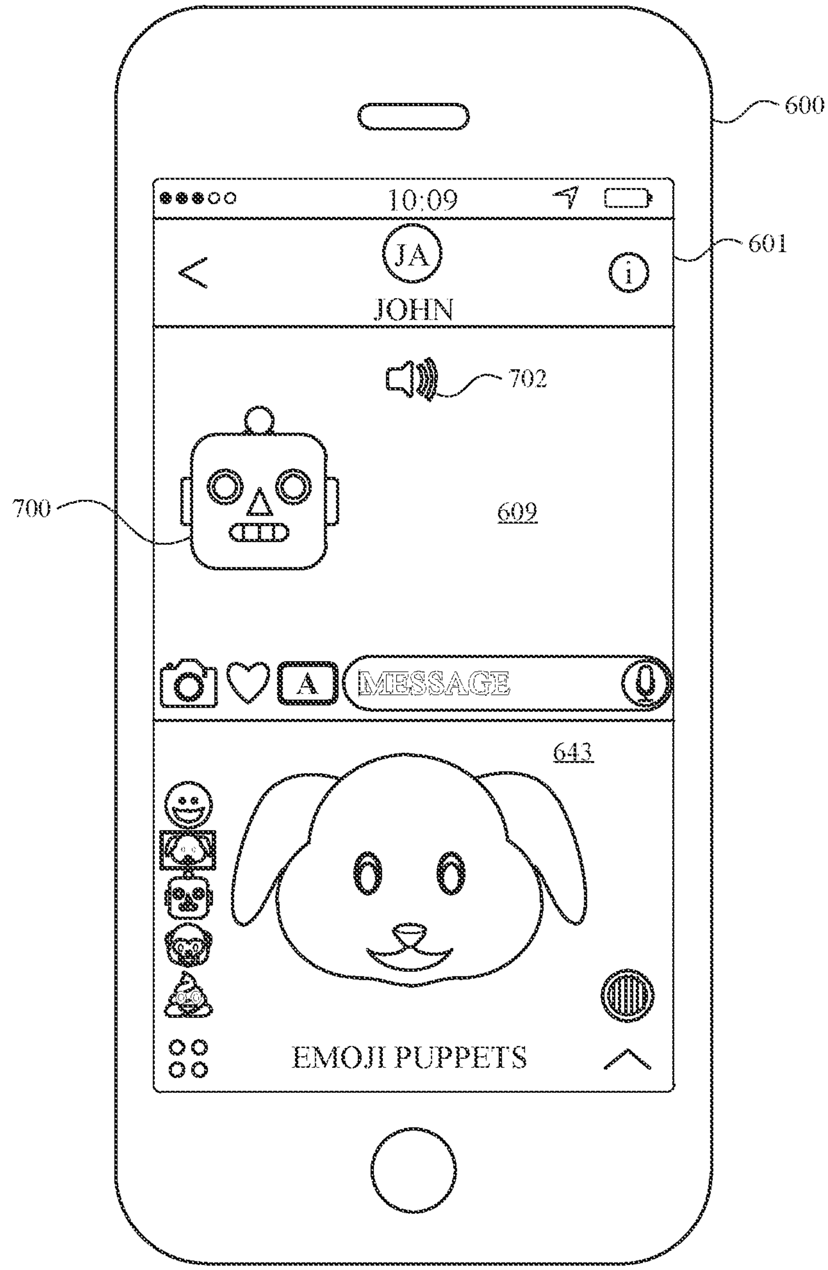
FIGS. 7A-7J illustrate exemplary user interfaces for receiving emojis, stickers, virtual avatars, and/or other multimedia content.

FIG. 7A depicts message interface 608 after having received animated virtual avatar 700 from the remote user named "John" (and has initials or a monogram "JA"), just prior to playing the animated virtual avatar. After receiving it, device 600 plays animated virtual avatar 700 automatically in some embodiments. Mute button 702, when selected, causes device 600 to mute any sound that is associated with animated virtual avatar 700. In some embodiments, any sound is also muted if the animated virtual avatar is scrolled off of the display. In some embodiments, virtual avatar interface 643 is displayed as described with respect to FIGS. 6A-6MM (e.g., virtual avatar interface 643 includes a preview virtual avatar based on detected facial movements/expressions and a selected avatar template).

Figure 7B:
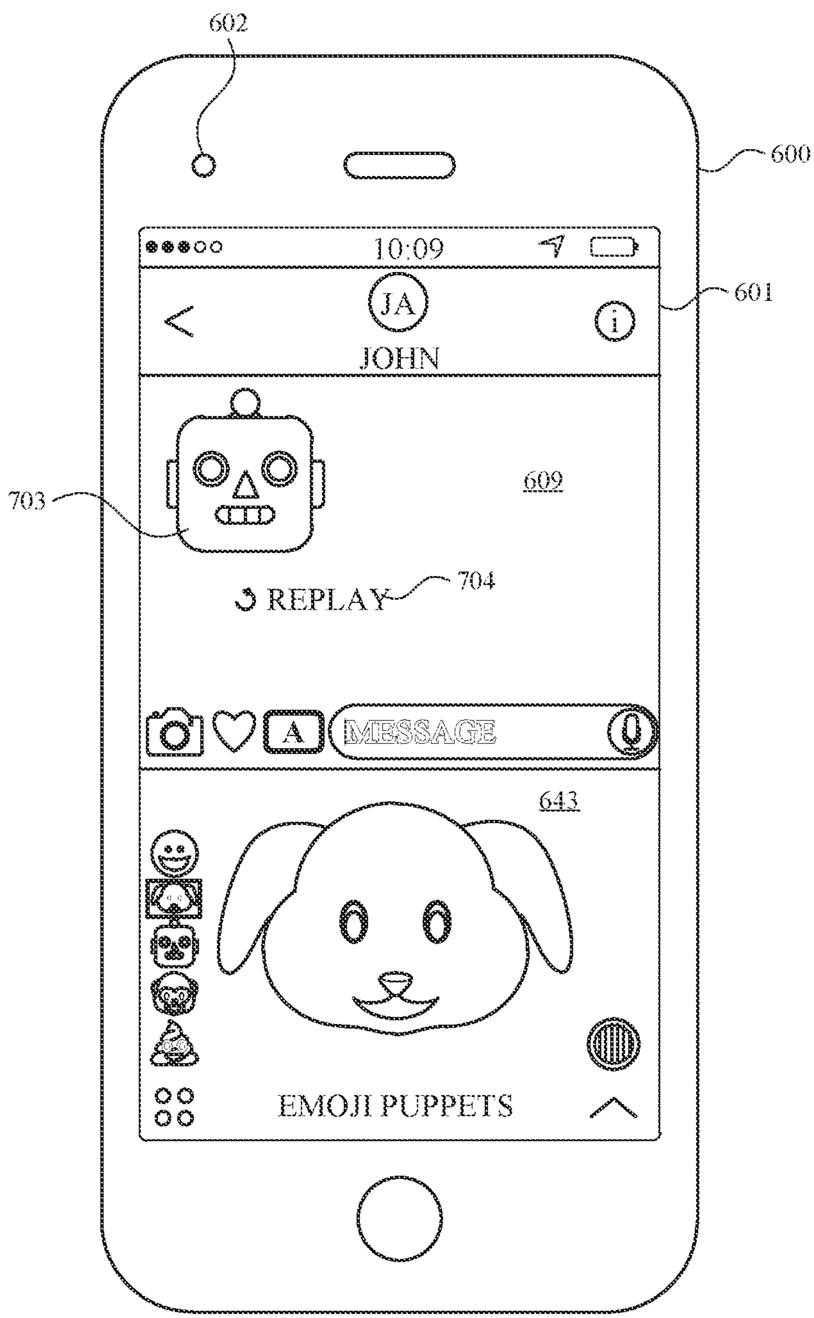
Figure 7C:
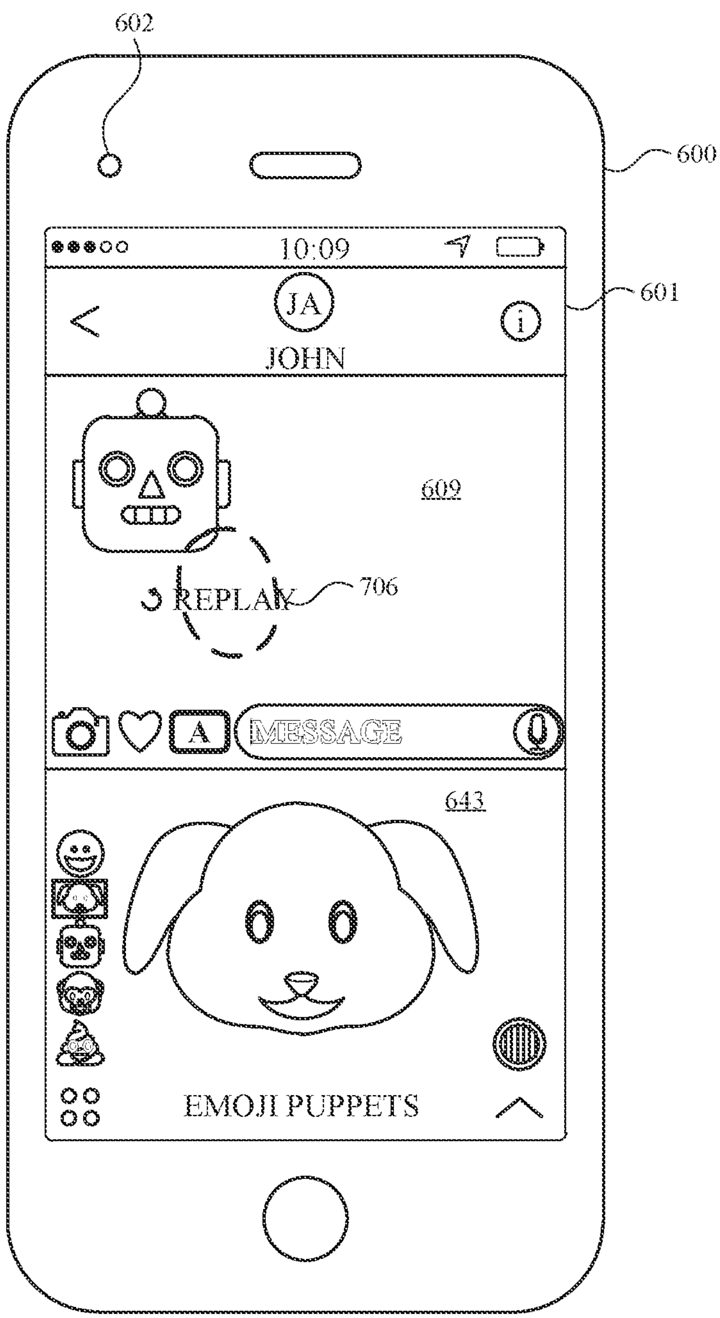
Figure 7D:
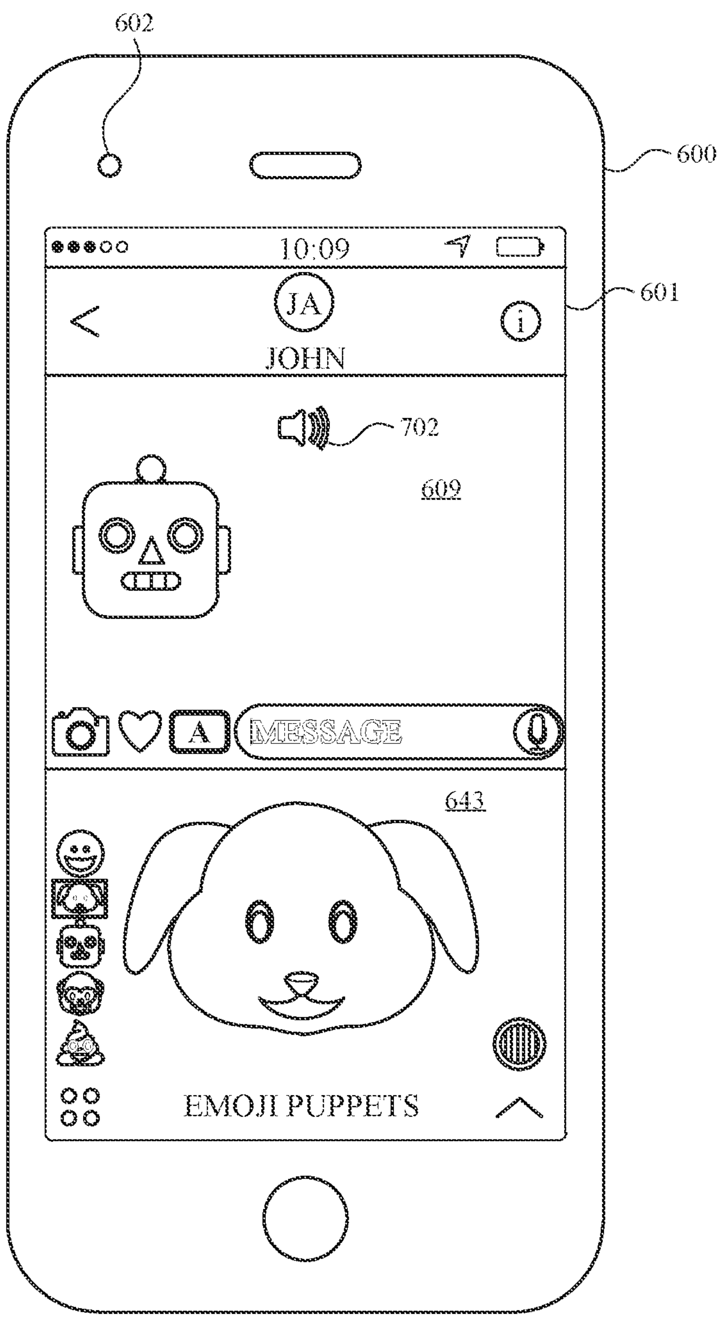
Figure 7E:
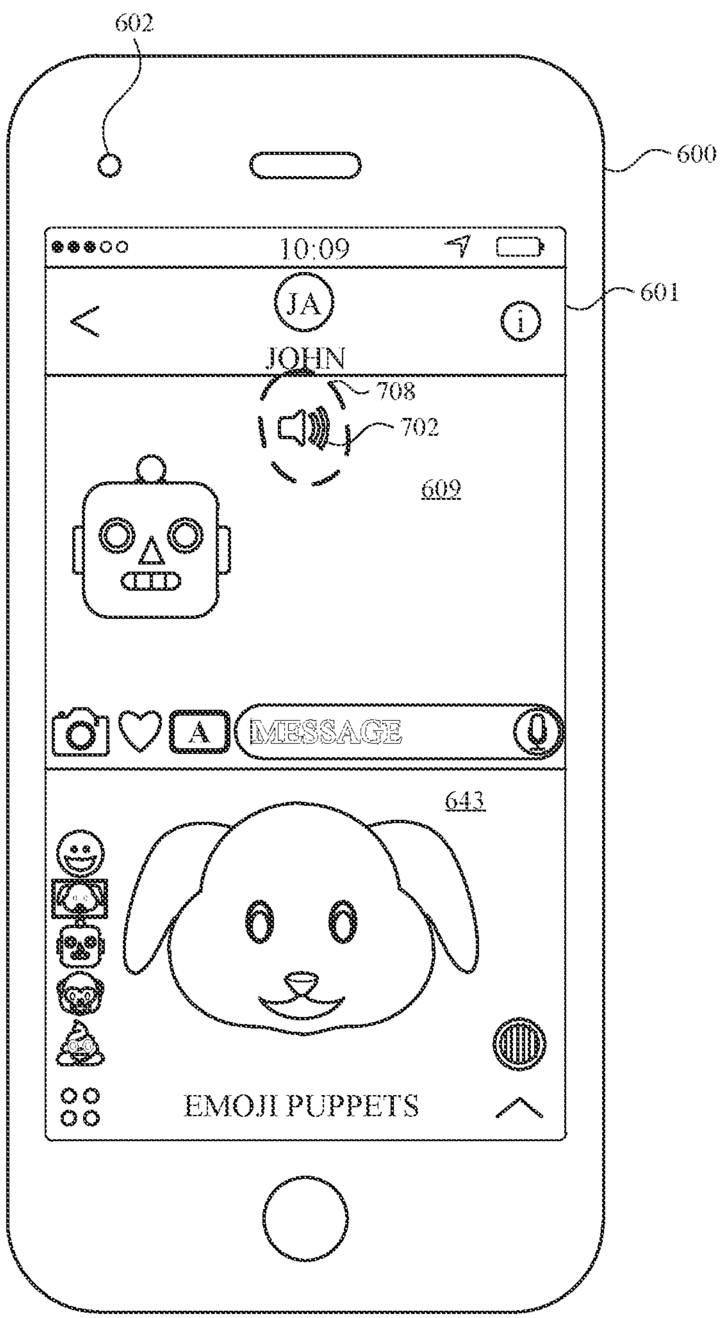
Figure 7F:
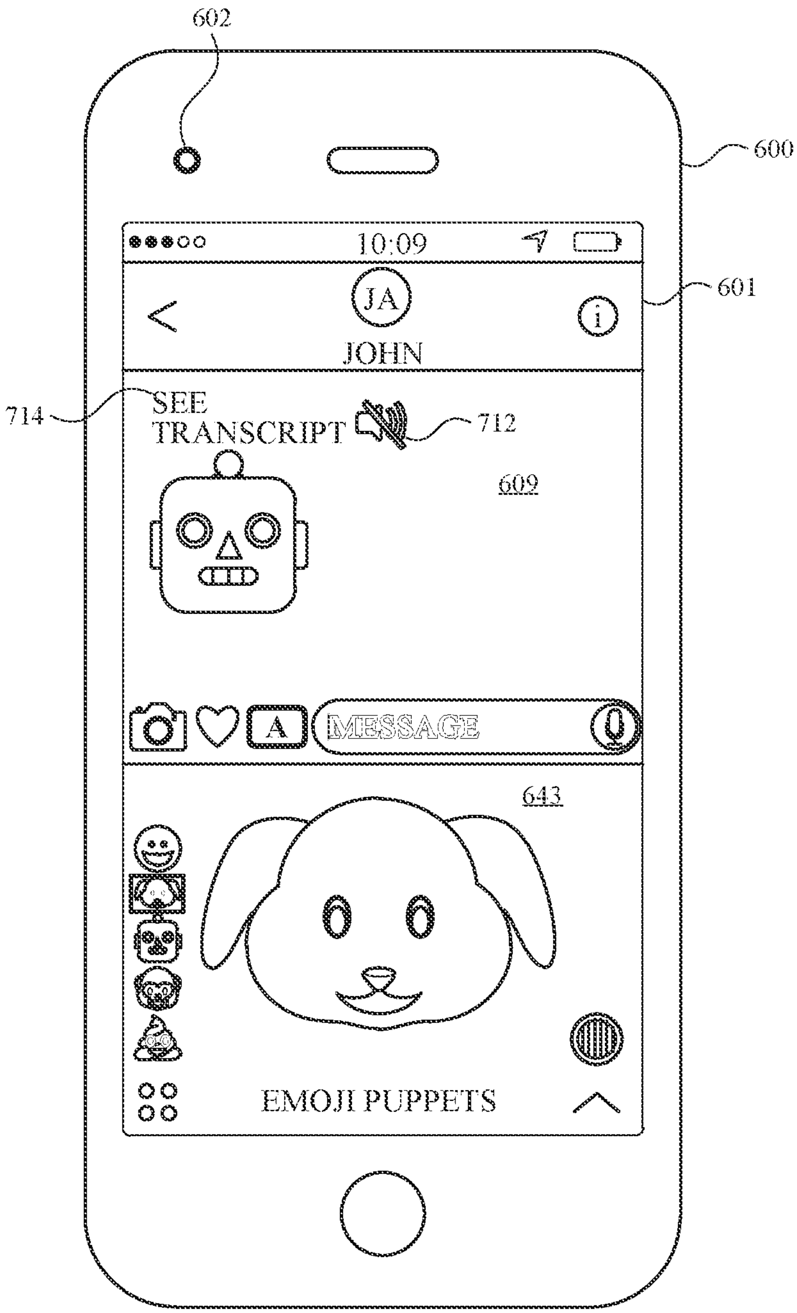
Figure 7G:
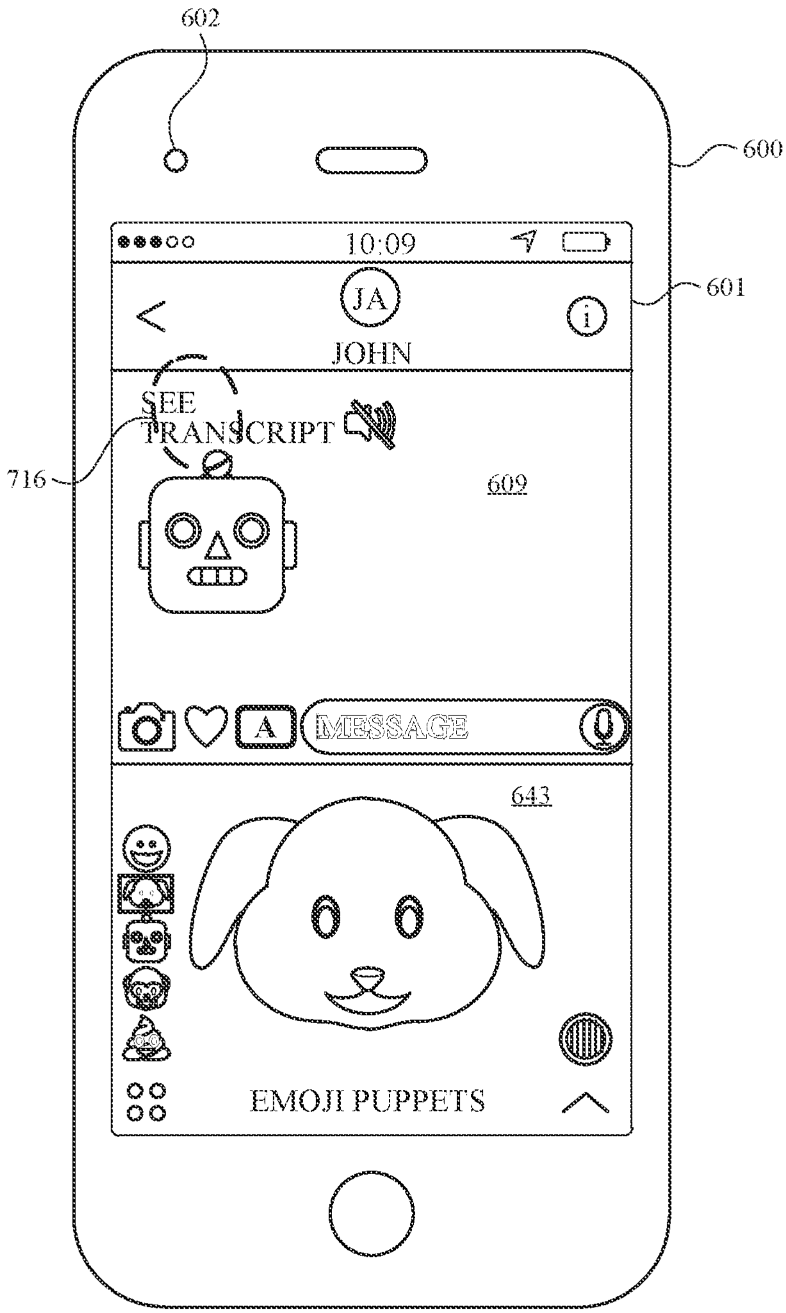

In FIG. 7B, in response to animated virtual avatar 700 being played once (e.g., played from start to finish, once), still frame 703 of animated virtual avatar 700 is displayed in place of the animated virtual avatar 700. Replay button 704 is also displayed in message area 609 and allows for animated virtual avatar 700 to be played again by, for example, a tap feature represented by contact 706 of FIG. 7C. FIG. 7D depicts device 600 playing animated virtual avatar 700 again (playing the animated emoji is described with respect to FIG. 7A).

Figure 7H:
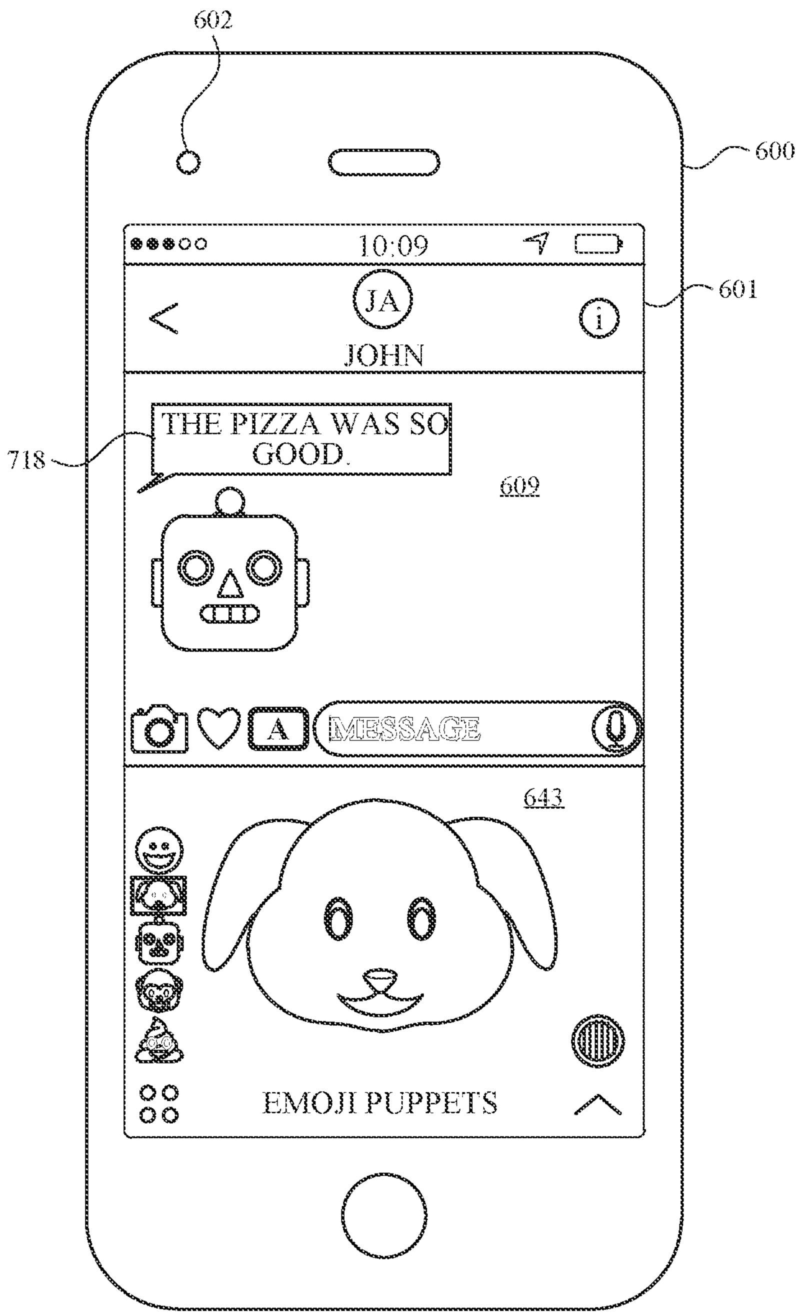
Figure 7I:
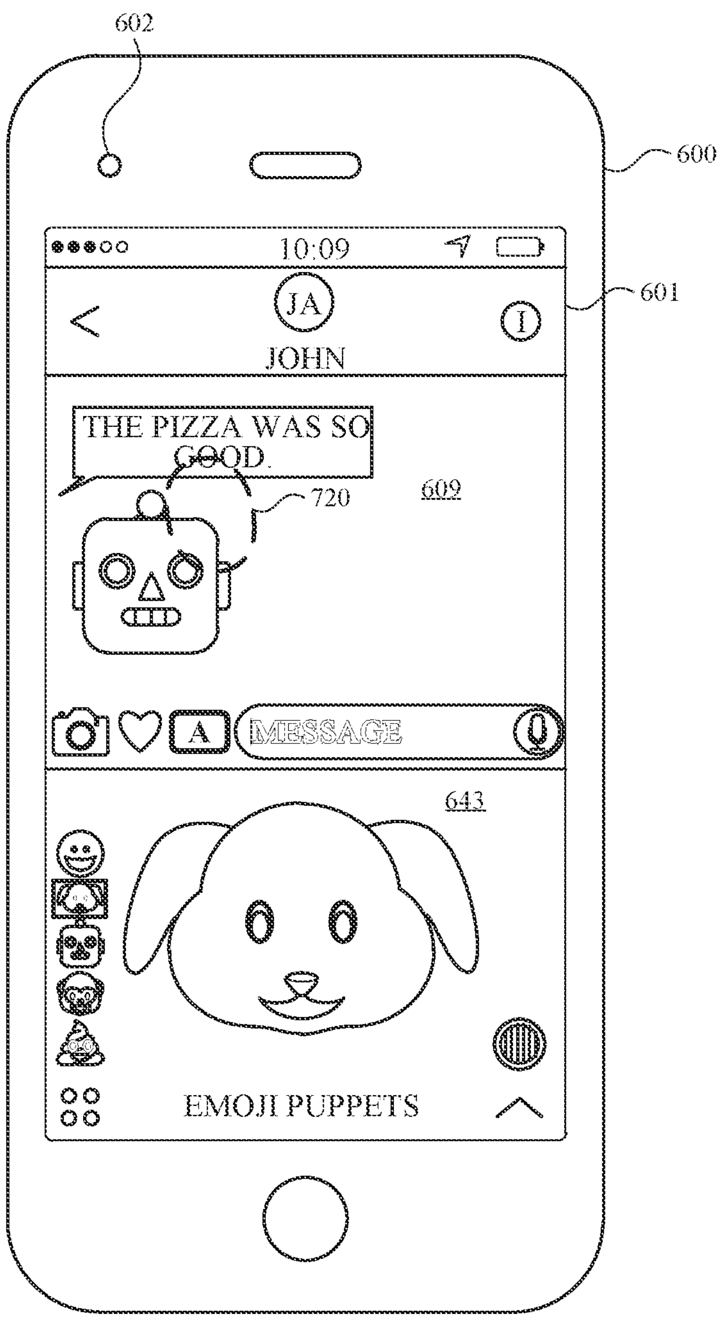

In some embodiments, while animated virtual avatar 700 is playing, if device 600 receives user input on mute button 702 (e.g., a tap gesture represented by contact 708 of FIG. 7E), device 600 stops playing any sounds associated with animated virtual avatar 700 while continuing to play animated virtual avatar 700 (e.g., animated virtual avatar 700 still moves without sound). In some embodiments, in response to selection of mute button 702 (or if sound is turned off on device 600 or device 600 has accessibility features enabled) transcript button 714 is displayed, as depicted in FIG. 7H. In response to selection of transcript button 714 (e.g., via a tap gesture represented by contact 716 of FIG. 7G) transcript 718 of the sound for animated virtual avatar 700 is displayed, as depicted in FIG. 7H. The content of transcript 718 is generated local to device 600 or remotely (e.g., using remote server computing resources).

Figure 7J:
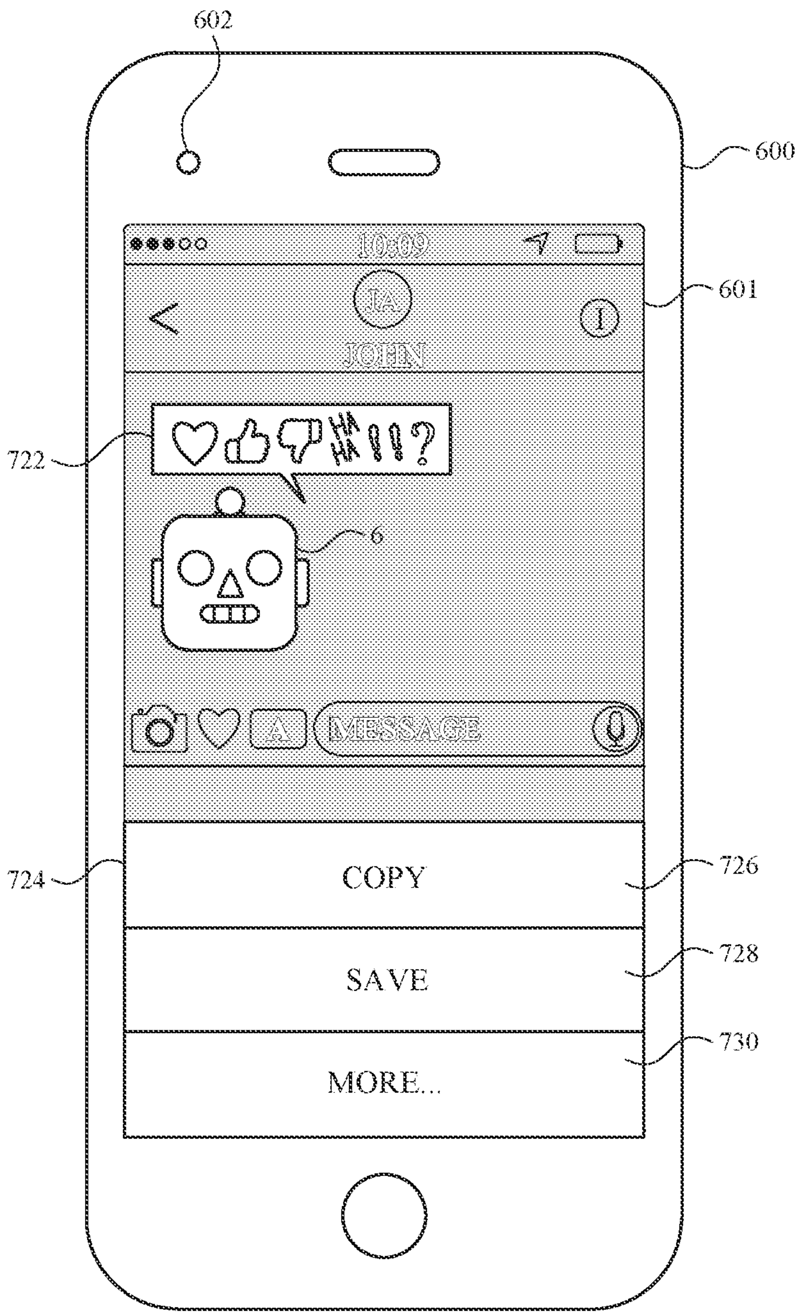

In response to user input on animated virtual avatar 700 (e.g., a tap and hold gesture represented by contact 720 in FIG. 7I), device 600 displays a menu of options related to animated virtual avatar 700, as depicted in FIG. 7J. For example, menu 722 includes several response buttons 723-1 to 723-6 that device 600 can send to one or more remote users participating in the communication represented in message area 609. Additionally, menu 724 is also displayed having copy button 726, save button 728, and more button 730. Copy button 726 copies animated virtual avatar 700 to a clipboard of device 600. Save button 728 saves animated virtual avatar 700 to device 600 (e.g., to a database or library that can be later access by applications installed on device 600). More button 730 displays additional operations that can be performed with respect to animated virtual avatar 700.

Figure 8A:
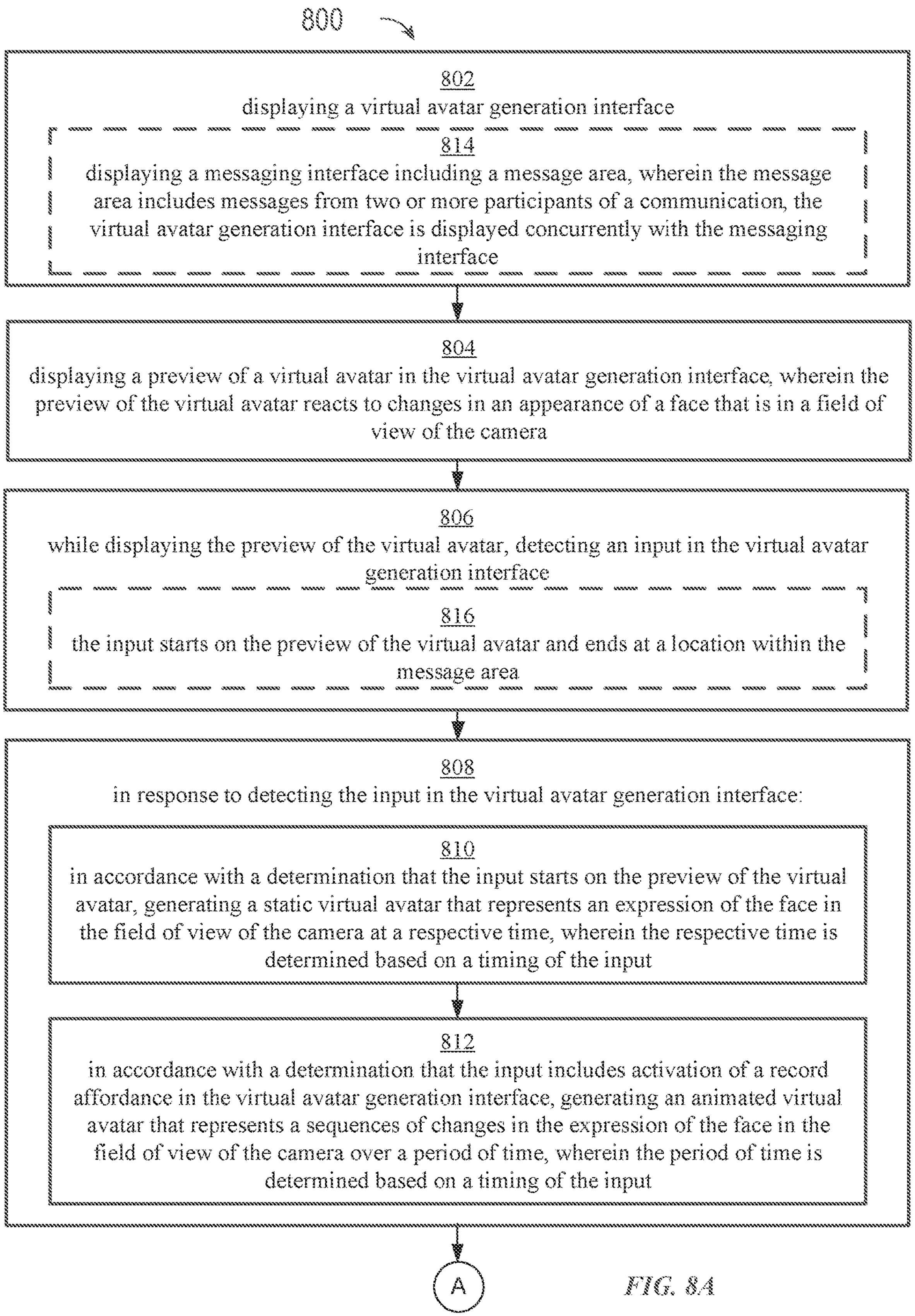
FIGS. 8A-8B are a flow diagram illustrating a method for generating and sending emojis, stickers, virtual avatars, and/or other multimedia content.
Figure 8B:
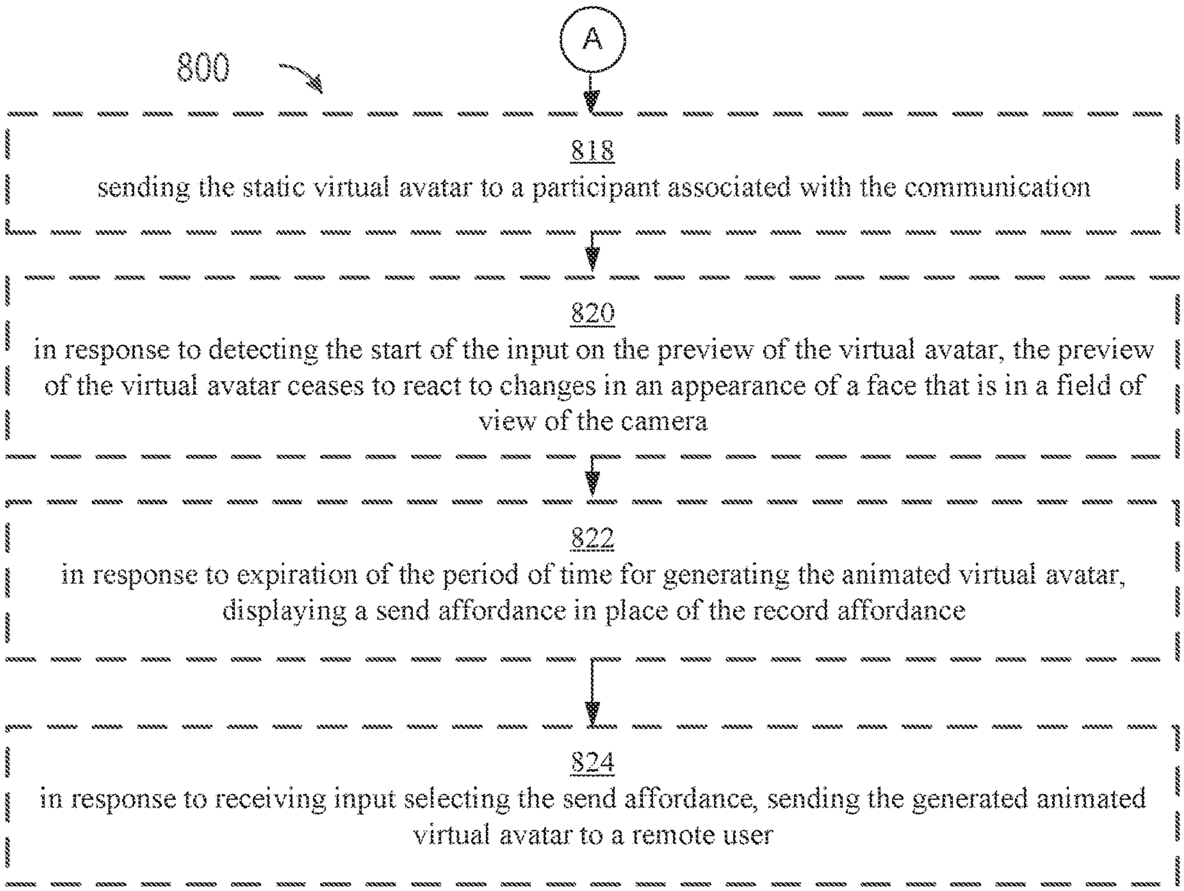

FIGS. 8A-8B are a flow diagram illustrating a method for 800 using an electronic device in accordance with some embodiments. Method 800 is performed at a device (e.g., 100, 300, 500, 600) with a display and a camera. Some operations in method 800 are, optionally, combined, the order of some operations are, optionally, changed, and some operations are, optionally, omitted.

As described below, method 800 provides an intuitive way for generating and sending emojis, such as virtual avatars. The method reduces the cognitive burden on a user for generating and sending emojis, thereby creating a more efficient human-machine interface. For battery-operated computing devices, enabling a user to generate and send emojis faster and more efficiently conserves power and increases the time between battery charges.

An electronic device (e.g., 600) having a camera (e.g., 602) (e.g., configured with one or more sensors for capturing data representing visible light, IR light, depth data, etc.) and a display (e.g., 601), displays (802) a virtual avatar generation interface (e.g. 643 of FIG. 6N) (e.g., for selecting emojis (animated or static), generating static stickers, and/or recording animated virtual avatars). The electronic device displays (804) a preview of a virtual avatar (e.g., 646 of FIG. 6N) (e.g., a 2D or 3D computer generated graphical object, in some cases intended to convey a non-verbal message, such as an emotion or reaction) in the virtual avatar generation interface (e.g., an animated virtual avatar selected from multiple different available virtual avatar templates). The preview of the virtual avatar reacts to changes in an appearance of a face that is in a field of view of the camera (e.g., FIG. 6O) (e.g., the animated virtual avatar will reflect the user's head movements, facial expressions, and orientation as detected in image data from one or more image sensors in the camera). While displaying the preview of the virtual avatar, the electronic device detects (806) an input (e.g., contact 652, 682, or 690) in the virtual avatar generation interface. In response (808) to detecting the input in the virtual avatar generation interface and in accordance with a determination that the input starts on the preview of the virtual avatar (e.g., 682 or 690) (e.g., a touch and hold input on the animated virtual avatar or a trackpad input controlling a cursor), the electronic device generates (810) a static virtual avatar a sticker (e.g., 683 or 691) (e.g., a still image of the animated emoji that is "stickable" on a particular location in a message area) that represents an expression of the face in the field of view of the camera at a respective time. In some embodiments, the respective time is determined based on a timing of the input (e.g., at the time the input was first received, at the time the input ended, at the time a gesture corresponding to the input started a moving across a touch-sensitive surface, or any other time related to the input). In accordance with a determination that the input includes activation of a record affordance (e.g., 648) in the virtual avatar generation interface (e.g., a tap on a record affordance), the electronic device generates (812) an animated virtual avatar (e.g., 668) that represents a sequences of changes in the expression of the face in the field of view of the camera over a period of time (e.g., as shown in FIG. 6Q-6S). In some embodiments, the period of time is determined based on a timing of the input (e.g., the period of time starts when the start of the input is detected, when the end of the input is detected, when some sort of movement of the input, such as when the input is a gesture on a touch-sensitive surface, is detected, or some other period of time based on the input). In some embodiments, the virtual avatar is three-dimensional. In some embodiments, the preview of the virtual avatar (e.g., 646) or the animated virtual avatar (e.g., 659) is displayed in 3D. Disambiguating a user input between two possible styles of communication (e.g., animated virtual avatars and static virtual avatars) avoids the need for separate interfaces to generate each type of message content. Reducing the number of inputs needed to communicate a desired message enhances the operability of the device and makes the user-device interface more efficient (e.g., by helping the user to achieve an intended communication by allowing for multiple types of multimedia communication from a single interface) which, additionally, reduces power usage and improves battery life of the device by enabling the user to use the device more quickly and efficiently.

In some embodiments, the electronic device displays (814) a messaging interface (e.g., interface 608) (e.g., a messaging application such as Apple's Messages) including a message area (e.g., 609). The message area includes messages (e.g., 610-1 to 610-4) from two or more participants (e.g., in FIG. 6C, remote user "John" and the user of device 600) (e.g., a message sent from the user of the electronic device and a message received from a remote user of a different electronic device) of a communication (e.g., the communication in message area 609 of FIG. 6N) (e.g., a messaging thread). The virtual avatar generation interface is displayed concurrently with the messaging interface (e.g., FIG. 6N) (e.g., the virtual avatar generation interface is display in the bottom half of the messaging interface). In some embodiments, the preview of the virtual avatar (e.g., 646) is displayed automatically as part of the initial display of the virtual avatar generation interface.

In some embodiments, the messaging interface includes a message composition area (e.g., 612) (e.g., a message entry area for entering text, emojis, and other content before sending the message to a recipient) and the input is a tap on the preview of the virtual avatar (e.g., 646). The electronic device, in response to detecting the input in the virtual avatar generation interface, displays the static virtual avatar (e.g., 683 or 691) in the message composition area. In some embodiments, displaying the virtual avatar generation interface includes replacing display of a virtual keyboard (e.g., 622) of the messaging interface with display of the virtual avatar generation interface (e.g., a transition from FIG. 6H to FIG. 6N, without intervening figures). Displaying multimedia content of a message prior to sending the message reduces the likelihood of an erroneous message and allows a user to add more content (e.g., via text or other content) prior to sending the message. Reducing the number of messages needed to communicate a desired message enhances the operability of the device and makes the user-device interface more efficient (e.g., by helping the user to achieve an intended communication while reducing the number of messages needed for the communication), which, additionally, reduces power usage and improves battery life of the device by enabling the user to use the device more quickly and efficiently.

In some embodiments, the avatar generation interface includes a static virtual avatar area (e.g., 629) (e.g., a tray of previously generated stickers displayed at the bottom of the avatar generation interface) that includes a collection of one or more previously generated virtual avatars (e.g., 630-1 to 630-4). In response to a user input (e.g., 682 of FIG. 6CC), the electronic device adds (612) the generated virtual avatar to the collection of one or more previously generated virtual avatars (e.g., sending an avatar, marking a virtual avatar as a favorite or otherwise marking the virtual avatar for inclusion in the collection of virtual avatars). In some embodiments, the collection of virtual avatars (e.g., stickers) is displayed in response to a user input (e.g. 626) (e.g., selection of a virtual avatar collection affordance in the avatar generation user interface or in the messaging user interface) (e.g., including a miniature version of the newly generated sticker in the tray). In some embodiments, the tray of previously generated stickers is hidden until an input (e.g., input 626) is received from the user requesting display of the tray or until some other event detected on the electronic device indicates that the tray is possibly relevant to a current state of the message interface or avatar generation interface. In some embodiments, after adding the virtual avatar to the collection of virtual avatars, the electronic device receives, from the user a request to share the collection of virtual avatars with a second user and in response, and the electronic device sends the collection of virtual avatars to the second user. Maintaining previously sent message multimedia content allows a user to add and reuse previous content when applicable to new messages. Eliminating the need to recreate content enhances the operability of the device and makes the user-device interface more efficient (e.g., by eliminating repetitive generation of content) which, additionally, reduces power usage and improves battery life of the device by enabling the user to use the device more quickly and efficiently.

In some embodiments, the input starts (816) on the preview of the virtual avatar (e.g., 680) and ends at a location within the message area (e.g., see FIGS. 6HH-6KK) (e.g., a gesture that starts with a finger contacting the preview of the virtual avatar (e.g., 680), continues with the finger dragging to the message area, and ends with the lift off of the finger in the message area (in some cases, the gesture may end on a particular message in the message area and the sticker is associated with that particular message and, optionally, moves as that message moves in the conversation)). The electronic device sends (818) the static virtual avatar (e.g., 691) to a participant (e.g., one or more remote users) associated with the communication (e.g., FIG. 6KK). In some embodiments, an animation is displayed in response to the gesture that shows the static virtual avatar being peeled off of the preview of the virtual avatar (FIGS. 6CC-6FF).

In some embodiments, the static virtual avatar (e.g., 691) has an appearance that is determined based on an expression of the face in the field of view of the camera at the time that input (e.g., 688) was detected on the preview of the virtual avatar (e.g., 680). In some embodiments, the electronic device, in response to detecting the start of the input on the preview of the virtual avatar, causes the preview of the virtual avatar to cease (820) to react to changes in an appearance of a face that is in a field of view of the camera. This indicates to the user that the sticker has been generated and previews to the user the appearance of the sticker that will be sent if the sticker is dragged to the communication displayed in message are 609 by sending it to a user. This enhances the operability of the device by showing a preview of the sticker that will be generated without the user having to perform additional interactions or completing the full sticker generation gesture before seeing the resulting sticker, which makes for an improved and more efficient man-machine interface. This reduces power usage and improves battery life of the device by enabling the user to use the device more quickly and efficiently.

In some embodiments, the preview of the virtual avatar (e.g., 680) resumes reacting to changes after the input moves away from the virtual avatar (e.g., the animation resumes when the static avatar is dragged toward the message conversation). In some embodiments, the preview of the virtual avatar (e.g., 680) ceases to react to changes in the appearance of the face until the input that is dragging the static avatar ends. Resuming the updates to the virtual avatar preview enables the user to compare the appearance of the sticker that was generated to other possible appearances of the virtual avatar that may potentially be the basis for a different/additional sticker. This enhances the operability of the device and makes the user-device interface more efficient (e.g., by helping the user to achieve an intended result by providing feedback about other content that can be generated before the user sends the generated content) which, additionally, reduces power usage and improves battery life of the device by enabling the user to use the device more quickly and efficiently.

In some embodiments, the electronic device, in response to expiration of the period of time (e.g., the expiration of a timer for 5, 10, or 15 seconds or a user input that stops the period of time) for generating the animated virtual avatar, displays a send or confirmation affordance (e.g., 664) in place of the record affordance (e.g., a virtual record button is no longer displayed and instead a virtual send button is displayed in place of the virtual record button). The electronic device, in response to receiving input selecting the send or confirmation affordance (e.g., a tap gesture on the send affordance on a touch-sensitive display), sends (824) the generated animated virtual avatar to a remote user (e.g., see FIGS. 6U and 6X without first sending the animated virtual avatar to the message composition area 612 as shown in FIGS. 6V and 6W) (e.g., the animated virtual avatar is sent to a remote user associated with a messaging thread or session without the animated virtual avatar being placed first into another area of the messaging interface, such as a message composition area). Displaying a send or confirmation button in place of a record button after the recording of the animated virtual avatar is completed enables more information to be displayed in the interface by reusing areas occupied for buttons that are not applicable to the current state of the interface and by providing the user with more contextually relevant functionality. This enhances the operability of the device and makes the user-device interface more efficient (e.g., by displaying more information/options on a display without cluttering the display with unused elements) which, additionally, reduces power usage and improves battery life of the device by enabling the user to use the device more quickly and efficiently.

In some embodiments, the electronic device, in response to expiration of the period of time for generating the animated virtual avatar, displays (822) a confirm affordance (e.g., 664) in place of the record affordance. In response to receiving input selecting the confirm affordance (e.g., via contact 667) (e.g., a tap gesture on the confirm affordance on a touch-sensitive display), the electronic device displays a representation of the animated virtual avatar (e.g., a static graphical element or the animated virtual avatar) in a message composition area (e.g., 612) of the messaging interface (e.g., FIG. 6V) (e.g., a region of the messaging interface that would display text typed on the keyboard). In some embodiments, the period of time is based on a predetermined amount of time (e.g., represented by progress indicator 656). The electronic device, after generating the animated virtual avatar, ceases to display the preview of the virtual avatar and displaying a looping version of the animated virtual avatar (e.g., FIG. 6T). The displaying of the looping version of the animated virtual avatar includes displaying the animation sequence two or more times (e.g., as described below with respect to method 900). Displaying a send or confirmation button in place of a record button after the recording of the animated virtual avatar is completed enables more information to be displayed in the interface by reuse areas occupied for buttons that are not applicable (or less applicable) to the current state of the interface. This enhances the operability of the device and makes the user-device interface more efficient (e.g., by displaying more information/options on a display without cluttering the display with unused elements) which, additionally, reduces power usage and improves battery life of the device by enabling the user to use the device more quickly and efficiently.

In some embodiments, the looping version of the animated virtual avatar is displayed using a first virtual avatar template (e.g., represented by element 644-4, or another element indicated by indicator 645 of FIG. 6N). The electronic device displays representations of a plurality of other virtual avatar templates (e.g., elements 644-1 to 644-7) (e.g., miniature generic versions of different virtual avatar templates, such a smiley faces, animals, robots, or other objects) including a representation of a second virtual avatar template (e.g., element 644-8 of FIG. 6Z), wherein the second virtual avatar template is different from the first virtual avatar template. In some embodiments, one or more of the virtual avatar templates in the plurality of virtual avatar templates are based on emojis that are available to be sent via the messaging application. The electronic device, after starting to display the looping version of the animated virtual avatar (e.g., FIG. 6T) and in response to receiving user input (e.g., 665) selecting the first virtual avatar template representation, updates the display of the looping version of the animated virtual avatar to reflect the second virtual avatar template (e.g., FIG. 6U) (e.g., while the animated virtual avatar is still based on the sequences of changes in the expression of the face, the animated virtual avatar's appearance is changed to reflect the new virtual avatar template). For example, the animated virtual avatar may change from a monkey to a robot but it will still reflect the same sequence of changes in the expression of the face in the field of view of the camera over time (e.g., see transition from FIG. 6T to FIG. 6U). Updating animated virtual avatars based on newly selected avatar templates allows a user to fine tune the multimedia content for an intended message by allowing for the selection of the style of animated virtual avatar after recording the movements and actions of the animated virtual avatar. Eliminating the need to rerecord animated virtual avatars to try new avatar templates enhances the operability of the device and makes the user-device interface more efficient (e.g., by eliminating repetitive generation of content) which, additionally, reduces power usage and improves battery life of the device by enabling the user to use the device more quickly and efficiently.

In some embodiments, the preview of the virtual avatar (e.g., 646) is automatically displayed in response to launching the virtual avatar generation interface. In some embodiments, the preview of the virtual avatar is displayed, without user input, as soon as the virtual avatar generation interface is displayed.

In some embodiments, the electronic device, in response to detecting a characteristic (e.g., position, orientation, movement) of a first physical feature (e.g., a mouth smiling, a tongue sticking out, ear wiggling, eye brows raise, or any other movement of any other physical feature) of the face in the field of view of the camera, updates a first physical feature of the displayed preview of the virtual avatar based on the detected characteristic, wherein a type (e.g., eyes, eye brows, mouth, tongue, ears) of the first physical feature of the face is the same as a type of the first physical feature of the displayed preview. In some embodiments, if a user's mouth opens, the virtual avatar's mouth will open in response (e.g., FIG. 6O at 650-1 and 651-1). Similar results can be based on facial expressions. For example, if one or more movements of physical features or characteristics of the face are detected, the electronic device may determine that a predefined emotion is being displayed. In response, the displayed preview of the virtual avatar may be updated to reflect the predefined motion by updating the corresponding physical features or characteristics to reflect the detected facial expression. Mapping physical features of the user to like physical features of the virtual avatar enables a user to provide movements, expressions, and poses that provide inputs to the system that intuitively map onto the virtual avatar, without the need for cumbersome or time consuming touch or key inputs. This enhances the operability of the device and makes the user-device interface more efficient (e.g., by helping the user to achieve an intended result by mapping features of the user to the virtual avatar in a predictable manner and reducing user mistakes when operating/interacting with the device) which, additionally, reduces power usage and improves battery life of the device by enabling the user to use the device more quickly and efficiently.

In some embodiments, the electronic device, in response to detecting a characteristic of a second physical feature of the face in the field of view of the camera, updates a second physical feature of the displayed preview of the virtual avatar based on the detected the characteristic, wherein a type of the second physical feature of the face is different than a type of the second physical feature of the displayed preview (e.g., FIG. 6O movement of eyebrows of 650-2 and ears of 651-2). In some embodiments, if a user is smiling indicating that the user is happy, a different feature of the virtual avatar, such as a unicorn horn or a light on a robot, may change to reflect the smiling. Similar results can be based on facial expressions. For example, if one or more movements of physical features or characteristics of the face are detected, the electronic device may determine that a predefined emotion is being displayed. In response, the displayed preview of the virtual avatar is, optionally, updated to reflect the predefined motion by updating a different set of physical features or characteristics to reflect the detected facial expression. Mapping physical features of the user to different physical features of the virtual avatar enables a user to provide movements, expressions, and poses that provide inputs to the system that map to features of the avatar that the user cannot otherwise easily control. This enhances the operability of the device and makes the user-device interface more efficient (e.g., by helping the user to achieve an intended result by mapping features of the user to the virtual avatar so that additional features of the virtual avatar are controlled and reducing user mistakes when operating/interacting with the device) which, additionally, reduces power usage and improves battery life of the device by enabling the user to use the device more quickly and efficiently.

In some embodiments, the electronic device, the electronic device, in response to detecting movement of the face in the field of view of the camera, updates a third physical feature of the displayed preview of the virtual avatar based on a physics model for the virtual avatar and the detected movement (e.g., FIG. 6O at 650-5 and 651-5). In some embodiments, for example, if the virtual avatar is based on a virtual avatar template for a puppy, then when the user's face is detected as shaking, the virtual avatar's face will shake and the virtual avatar's ears might stick out to reflect the physics of the shaking motion even though the user's ears did not stick out in response to the shaking. In some embodiments, the same physical feature of the displayed preview of the virtual avatar is updated based on movement of the corresponding feature of the face in the field of view of the camera and the physics model (e.g., an ear moves based on the movement of the user's ear but also based on a physics model for a floppy puppy ear). Updating the virtual avatar based on a physics model for the virtual avatar enables the user to create a realistic and interactive virtual avatar that can communicate a wider range of non-verbal information. This enhances the operability of the device and makes the user-device interface more efficient (e.g., by helping the user to communicate an intended message using more realistic movements of the virtual avatar) which, additionally, reduces power usage and improves battery life of the device by enabling the user to use the device more quickly and efficiently.

In some embodiments, the preview of the virtual avatar is based on a pre-defined virtual avatar template (e.g., avatar template associated with representation 644-4 of FIG. 6N). The electronic device updates the preview of the virtual avatar based on one or more predefined behaviors associated with the pre-defined virtual avatar template. In some embodiments, if no movement or change in facial expression is detected (e.g., 650-3 and 650-4) from the face in the field of view of the camera, the preview of the virtual avatar shows a predefined response (e.g., 651-4), such as blinking eyes, rotating a head, making a facial expression, or other action.

In some embodiments, the electronic device, in response to a determination that the face is no longer detected in the field of view of the camera (e.g., tracking of the face has failed because the face has moved out of the field of view of the camera, the face has been obscured from view of the camera, or the face has been repositioned so that the device can no longer accurately track the movement of features on the face), gradually fades the display of the preview of the virtual avatar (e.g., virtual avatar preview 646 would fade). In some embodiments, the device makes other modifications to the virtual avatar preview to indicate that it can no longer track a user's face, such as degrading the virtual avatar preview from last information that the device detected, including changing the size, rotation, motion, etc. of the virtual avatar preview. In some embodiments, the electronic device, in response to a determination that the face is no longer detected in the field of view of the camera (e.g., tracking of the face has failed because the face has moved out of the field of view of the camera, the face has been obscured from view of the camera, or the face has been repositioned so that the device can no longer accurately track the movement of features on the face), displays a message indicating that the face is no longer being properly detected by the camera (e.g., a display prompt is displayed over virtual avatar 643 of FIG. 6N or in place of virtual avatar preview 646 of FIG. 6N). In some embodiments, the electronic device, in response to a determination that the face is no longer detected in the field of view of the camera (e.g., tracking of the face has failed because the face has moved out of the field of view of the camera, the face has been obscured from view of the camera, or the face has been repositioned so that the device can no longer accurately track the movement of features on the face), updates the display of the preview of the virtual avatar based on a change in appearance of the face that was occurring during a time period before (e.g., immediately before or shortly before) the face was no longer detected in the field of view (e.g., device 600 repeatedly displays a transition from a smile to a frown or a movement of eyes). In some embodiments, updating the display of the preview of the virtual avatar based on a change in appearance of the face that was occurring during a time period before the face was no longer detected in the field of view of the camera includes gradually slowing the updating of the preview of the virtual avatar over time so that the updating of the virtual avatar gradually stops (e.g., an avatar that is turning slowly stops turning, eyes that are opening or closing slowly stop opening or closing, a mouth that was opening or closing slowly stops opening or closing). Displaying feedback about whether the virtual avatar preview is tracking the user's face enables the user to determine whether the device is being held properly and whether the conditions for detection of the user's face are proper. Providing improved feedback to the user of a state of the device, enhances the operability of the device, and makes the user-device interface more efficient by providing better continuity of the user interface through indications that the device is still trying to track the user's face. This provides for a better and more intuitive man-machine interface and will result in the user continuing to interact with the device even when the device cannot track the user's face.

Note that details of the processes described above with respect to method 800 (e.g., FIGS. 8A-8B) are also applicable in an analogous manner to the methods described below. For example, method 900 optionally includes one or more of the characteristics of the various methods described above with reference to method 800. For example, the generation of stickers described above with respect to method 800 is optionally incorporated with the user interface described below with respect to method 900. As another example, the muting of sound prior to sending an animated virtual avatar (e.g., an animated virtual avatar) as described above with respect to method 800 is optionally incorporated with the user interface described below with respect to method 900. For brevity, these details are not repeated below.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 8A and 8B are, optionally, implemented by components depicted in FIGS. 1A-1B. For example, detecting an input in the virtual avatar generation interface (806) is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9B are a flow diagram illustrating a method for 900 using an electronic device in accordance with some embodiments. Method 900 is performed at a device (e.g., 100, 300, 500, 600) with a display and a camera. Some operations in method 900 are, optionally, combined, the order of some operations are, optionally, changed, and some operations are, optionally, omitted.

As described below, method 900 provides an intuitive way for generating and sending emojis, such as virtual avatars. The method reduces the cognitive burden on a user for generating and sending emojis, thereby creating a more efficient human-machine interface. For battery-operated computing devices, enabling a user to generate and send emojis faster and more efficiently conserves power and increases the time between battery charges.

An electronic device (e.g., 600), having a camera (e.g., configured with one or more sensors for capturing data representing visible light, IR light, depth data, etc.) and a display (e.g., 601), displays (902) a virtual avatar generation interface (e.g., 643 of FIG. 6N) (e.g., selecting emojis, generating static emojis, and recording animated emojis). The electronic device displays (904) a preview of a virtual avatar (e.g., 646 of FIG. 6N) (e.g., a 2D or 3D computer generated graphical object, in some cases intended to convey a non-verbal message, such as an emotion or reaction) in the virtual avatar generation interface (e.g., a moving emoji selected from multiple different available emoji styles or templates). The preview of the virtual avatar reacts to changes in an appearance of a face that is in a field of view of the camera (e.g., FIG. 6O) (e.g., the animated emoji will reflect the user's head movements, facial expressions, and orientation as detected in image data from the one or more image sensors). The electronic device receives (906) a request (e.g., contact 652) to generate an animated virtual avatar based on changing facial expressions of the face that is in the field of view of the camera. In response to receiving the request to generate the animated virtual avatar, the electronic device records (908) (e.g., FIGS. 6Q-6S) a sequence of facial expressions of the face in the field of view of the camera (e.g., the sequence includes a series of data points that for provide a mapping of points that can be applied a virtual avatar template to generate the animated virtual avatar). The electronic device, after recording the facial expressions of the face that is in the view of the camera, displays (910) a looping version (e.g., FIGS. 6T and 6U) of an animated virtual avatar (e.g., 659) that includes an animation sequence based on the sequence of facial expressions recorded in response to the request to generate the animated virtual avatar (e.g., the animated virtual avatar is displaying by sequentially mapping the series of data points representing the recorded facial expressions to a predefined animated virtual avatar template). The electronic device displays the looping version of the animated virtual avatar two or more times. In some embodiments, recording the sequence of facial expressions includes recording a time sequence of values for discrete mapping points of a predefined virtual avatar template. Displaying a looping version of an animated virtual avatar enables the user to subsequently review the animated virtual avatar content to understand whether the appropriate message is being communicated. Providing improved visual feedback to the user enhances the operability of the device, reduces the instances of errors, and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the electronic device stops the recording of the sequence of facial expressions in response to the expiration of a timer (e.g., as represented by progress indicator 656) (e.g., a 5, 10, or 15 second timer). In some embodiments, the electronic device stops the recording of the sequence of facial expressions in response to receiving user input (e.g., contact 658) (e.g., a user tap on a virtual button displayed on the display). Limiting the time of an animated virtual avatar recording enables a user to create animated virtual avatar recordings while limiting the impact on the computing resources (e.g., storage) of the device. This enhances the operability of the device by preserving the device's computing resources.

In some embodiments, the electronic device replaces (912) display of the preview with the display of the looping version of the animated virtual avatar (e.g., see transition from FIG. 6S to FIG. 6T) (e.g., in response to the recording of the sequence of facial expressions being completed, the generated animated virtual avatar is played back to the user in a loop). Playing a looping version of the recorded animated emoji automatically enables the user to review the animated emoji prior to deciding whether to send, delete, or save the animated emoji. This enhances the operability of the device and makes the user-device interface more efficient (e.g., by helping the user to achieve an intended result by providing feedback indicative result before the user commits to the result and reducing user mistakes when operating/interacting with the device) which, additionally, reduces power usage and improves battery life of the device by enabling the user to use the device more quickly and efficiently.

In some embodiments, the request to generate the animated virtual avatar includes the selection of a record affordance (e.g., 648) displayed in the virtual avatar generation interface. The electronic device, after recording the facial expressions of the face that is in the view of the camera, replaces display of the record affordance with a send or a confirm affordance (e.g., 664). In some embodiments, the send affordance operates as explained above with respect to method 800. Recording an animated virtual avatar in response to selection of a record affordance enables a user to use the virtual avatar preview to verify that the device is tracking the user and the currently selected virtual avatar template is consistent with the message that the user wishes to convey. This enhances the operability of the device and makes the user-device interface more efficient (e.g., by helping the user to achieve an intended result by providing a preview of the intended result prior to the user generating the intended result and reducing user mistakes when operating/interacting with the device) which, additionally, reduces power usage and improves battery life of the device by enabling the user to use the device more quickly and efficiently.

In some embodiments, the looping version of the animated virtual avatar is displayed (918) using a first virtual avatar template (e.g., avatar template corresponding to element 644-4). The electronic device displays representations of a plurality of other virtual avatar templates (e.g., elements 644-1 to 644-7) (e.g., miniature generic versions of different virtual avatar templates, such a smiley faces, animals, robots, or other objects) including a representation of a second virtual avatar template (e.g., element 644-8 of FIG. 6Z). The second virtual avatar template is different from the first virtual avatar template. In some embodiments, one or more of the virtual avatar templates in the plurality of virtual avatar templates are based on emoji that are available to be sent via the messaging application. After starting to display the looping version of the animated virtual avatar and in response to receiving user input selecting the first virtual avatar template representation, the electronic device updates (922) the display of the looping version of the animated virtual avatar to reflect the second virtual avatar template (e.g., while the animated virtual avatar is still based on the sequences of changes in the expression of the face, the animated virtual avatar's appearance is change to reflect the new virtual avatar template). For example, the animated virtual avatar may change from a monkey to a robot but it will still reflect the same sequence of changes in the expression of the face in the field of view of the camera over time (e.g., see transition from FIG. 6T to 6U). In some embodiments, the electronic device displays (914) a plurality of representations of virtual avatar templates (e.g., miniature generic versions of different virtual avatar templates, such a smiley faces, animals, robots, or other objects) including a representation of a first virtual avatar template. In response to receiving user input corresponding to a selection of the representation of the first virtual avatar template, the electronic device updates (916) the display of the looping version of the animated virtual avatar to correspond to the first virtual avatar template (e.g., changing the animation to be of a robot based on a robot virtual avatar template instead of a puppy based on a puppy virtual avatar template without the user having to rerecord any facial expressions). Updating animated virtual avatars based on newly selected avatar templates allows a user to fine tune the multimedia content for an intended message by allowing for the selection of the style of animated virtual avatar after recording the movements and actions of the animated virtual avatar. Eliminating the need to rerecord animated virtual avatars to preview new avatar templates enhances the operability of the device and makes the user-device interface more efficient (e.g., by eliminating repetitive generation of content) which, additionally, reduces power usage and improves battery life of the device by enabling the user to use the device more quickly and efficiently.

In some embodiments, the preview virtual avatar is based on a second avatar template. In response to detecting a first characteristic of a first physical feature (e.g., movement of a user's eyebrows) of the face in the field of view of the camera (e.g., 650-2 of FIG. 6O), the electronic device updates (920) a first physical feature of the displayed preview of the virtual avatar based on the detected first characteristic (e.g., causing the preview of the virtual avatar to move its eyebrows). The first physical feature of the displayed preview has a first feature type (e.g., an eyebrow). After receiving user input corresponding to the selection of the first graphical element (e.g., switching the avatar template from a puppy to a monkey) and in response to detecting a second characteristic of the first physical feature (e.g., movement of a user's eyebrows) of the face in the field of view of the camera, the electronic device updates (922) a second physical feature (e.g., 651-2 of FIG. 6O) of the displayed preview of the virtual avatar based on the detected second characteristic (e.g., moving the monkey's ears), wherein the second physical feature of the displayed preview has a second feature type (e.g., ears) different than the first feature type (e.g., eyebrows). Mapping the same physical feature of a user to different physical features of different avatar templates enables the user to have a wider range of options for communicating a message by having the same inputs produce a variety of virtual avatars. This enhances the operability of the device and makes the user-device interface more efficient (e.g., by helping the user to achieve an intended message by providing more choices to convey the message) which, additionally, reduces power usage and improves battery life of the device by enabling the user to use the device more quickly and efficiently.

In some embodiments, the electronic device, in response to receiving user input corresponding to a request to scroll (e.g., via contact 676 of FIGS. 6Y-6AA) the plurality of representations of virtual avatar templates, scrolls the display of the plurality of representations of virtual avatar templates to display a second graphical element not part of the plurality of representations of virtual avatar templates. In some embodiments, the scrolling is based on a velocity of the user input corresponding to the request. Scrolling through virtual avatar template enables a user to quickly see the different options for the virtual avatar. Additionally, scrolling the display of the plurality of representations of virtual avatar templates enables the user to see the previous and next virtual avatar template. This enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the speed of scrolling gradually decreases over time after detecting an end of the user input (e.g., the scrolling gradually stops as though the plurality of representations of virtual avatars had an inertia that was being gradually slowed by friction). Gradually decreasing the speed of scroll over time enables the user to continue to see different virtual avatar template options without having to provide additional input. This enhances the operability of the device and makes the user-device interface more efficient (e.g., by helping the user to achieve an intended result by providing feedback of possible results without requiring additional interaction and reducing user mistakes when operating/interacting with the device) which, additionally, reduces power usage and improves battery life of the device by enabling the user to use the device more quickly and efficiently.

In some embodiments, the electronic device, in response to receiving the user input corresponding to the request, generates audible output and/or tactile output that corresponds to the currently selected virtual avatar template changing from one virtual avatar template to a different virtual avatar template. For example, audible and/or tactile outputs are generated as each of a plurality of the representations of the virtual avatar templates scroll past a location that indicates a currently selected virtual avatar template. Generating audible or tactile feedback enables the user to determine when a new selection has occurred. This enhances the operability of the device and makes the user-device interface more efficient (e.g., by helping the user to achieve an intended result by providing feedback indicative of when a new selection is made and reducing user mistakes when operating/interacting with the device) which, additionally, reduces power usage and improves battery life of the device by enabling the user to use the device more quickly and efficiently.

In some embodiments, the electronic device, in response to receiving user input on the animated virtual avatar, the input corresponding to a request to save the animated virtual avatar, stores data for the animated virtual avatar to a database on the electronic device (e.g., FIGS. 6CC-6GG). For example, the electronic device stores data representing the animated virtual avatar to a directory or library in non-volatile storage in the electronic device.

In some embodiments, the electronic device receives a request (e.g., contact 688) to send the animated virtual avatar to a remote user of a remote device (e.g., FIGS. 6HH-6KK). In accordance with a determination that the remote device meets a first set of criteria (e.g., the remote device has a required version of a required application to play the first version of the animated virtual avatar), the electronic device sends a first version of the animated virtual avatar to a user of the remote device (e.g., sending non-graphical data representing the recorded sequence of facial expressions and an indication of an virtual avatar template so that the remote device can reproduce the animated virtual avatar). In accordance with a determination that the remote device does not meet the first set of criteria (e.g., the remote device does not have an appropriate messaging application or version of a messaging application to play the first version of the animated virtual avatar), the electronic device sends a second version (e.g., sending a video file representing the animated virtual avatar) of the animated virtual avatar different than the first version to the user of the remote device. Determining which version of an animated virtual avatar to send to a remote user saves the device's resource by sending only the minimal amount of compatible information to the remote user. Further, doing so reduces the need for the user to re-send information in a more compatible format (e.g., in response to a remote user indicating that the initial format was not viewable). Efficient and effective data transfer enhances the operability of the device, which, additionally, reduces power usage and improves battery life of the device by enabling the user to use the device more quickly and efficiently.

In some embodiments, the electronic device, while displaying the looping version of the animated virtual avatar, plays (924) audio data based on sound recorded while recording the sequence of facial expressions and based on an audio filter associated with a predefined avatar template. In some embodiments, the electronic device, while displaying the looping version of the animated virtual avatar, plays audio data based on sound recorded while recording the sequence of facial expressions. In response to receiving user input corresponding to a selection of a mute affordance (e.g., 662 of FIGS. 6T and 6U), the electronic device ceases to play the audio data. Playing filtered audio for an animated virtual avatar based on a filter specific to the avatar template for the virtual avatar enables a user to more effectively communicate a message by providing for more options in how the message is communicated and a more engaging animated virtual avatar. This enhances the operability of the device and makes the user-device interface more efficient (e.g., by helping the user to achieve an intended message by providing the user with more options on how the message is conveyed) which, additionally, reduces power usage and improves battery life of the device by enabling the user to use the device more quickly and efficiently.

In some embodiments, the electronic device, in response (926) to receiving a request to send the animated virtual avatar to a remote user and in accordance with a determination that the request (e.g., contact 667) to send the animated virtual avatar to the remote user was received while audio data associated with the display of the looping version of the animated virtual avatar was muted, sends (928) data representing the animated virtual avatar to the remote user without sending the sound data for the animated virtual avatar. In accordance with a determination that the request to send the animated virtual avatar to the remote user was received while audio data associated with the display of the looping version of the animated virtual avatar was not muted, the electronic device sends (930) data representing the animated virtual avatar to the remote user along with sound data for the animated virtual avatar. Sending an animated virtual avatar without sound when the user has muted the sound in the playback of the animated virtual avatar enables the user to efficiently choose whether sound is included in the message that is sent to a remote user. This enhances the operability of the device and makes the user-device interface more efficient (e.g., by helping the user to achieve an intended result with minimal interactions) which, additionally, reduces power usage and improves battery life of the device by enabling the user to use the device more quickly and efficiently.

In some embodiments, the electronic device, in response to receiving the request (e.g., contact 652) to generate the animated virtual avatar, records a first face movement of the face that is in the view of the camera, wherein displaying the looping version of an animated virtual avatar includes animating the virtual avatar based on a physics model for the animated virtual avatar and the first face movement (e.g., see image data 650-5 and update 651-5 of FIG. 6O). Updating the animated virtual avatar based on a physics model for the virtual avatar enables the user to create a realistic and interactive virtual avatar that can communicate a wider range of non-verbal communication. This enhances the operability of the device and makes the user-device interface more efficient (e.g., by helping the user to communicate an intended message using more realistic movements of the virtual avatar) which, additionally, reduces power usage and improves battery life of the device by enabling the user to use the device more quickly and efficiently.

In some embodiments, the electronic device, in response to detecting that a particular feature of the face that is in the view of the camera while recording the sequence of facial expressions is maintained in a particular pose for more than a threshold amount of time (e.g., see 650-4 and 650-5 of FIG. 6O), adds, to the animated virtual avatar, a predefined animated expression (e.g., see 651-5 of FIG. 6O) that corresponds to the particular pose of the face. For example, if the face has a neutral expression for a predetermined period of time, a predefined movement, such as a head turn or a wink, is added to the animated virtual avatar. As another example, if the face has an angry expression for a predetermined period of time, one or more additional features, such as color or steam coming out of ears, that connote anger are added to the animated virtual avatar. Updating the animated virtual avatar based on the device detecting that a feature of the user's face is maintained in a particular pose for a threshold amount of time enables a user to add more actions to the animated virtual avatar than is possible with only facial expressions, features, and movements. This enhances the operability of the device and makes the user-device interface more efficient (e.g., by helping the user to achieve an intended result by providing additional mechanism to communicate actions that do not otherwise correspond to an easily achievable facial expression, movement, or feature) which, additionally, reduces power usage and improves battery life of the device by enabling the user to use the device more quickly and efficiently.

In some embodiments, the electronic device, while recording the sequence of facial expression, in response receiving user input via an input mechanism separate from the camera (e.g., a touch on a touch-sensitive surface, a movement of the electronic device detected by motion sensors, activation of a button, or other input), adds a first facial expression to the sequence of facial expressions (e.g., record a happy facial expression, facial expression with a tongue sticking out, or any other facial expression that was not actually recorded as a facial expression that was made by the face in the field of view of the camera while recording facial expressions for inclusion in the animated virtual avatar). The first facial expression is based on the user input received via the input mechanism. In some embodiments, while the animated virtual avatar is looping, the user can use touch screen controls to add additional expressions to the animated virtual avatar, so that as the animated virtual avatar is looping, the user can gradually add expressions to the an animated virtual avatar, so that the animated virtual avatar includes the changes in expression selected by the user, even if those changes in expression differ from the changes in expression recorded based on the facial expressions of the face in the field of view of the camera (e.g., the user's face) when initially creating the animated virtual avatar. Updating the animated virtual avatar based on user input other than captured with a camera enables a user to add more actions to the animated virtual avatar than is possible with only facial expressions, features, and movements. This enhances the operability of the device and makes the user-device interface more efficient (e.g., by helping the user to achieve an intended result by providing additional mechanism to communicate actions that do not otherwise correspond to an easily achievable facial expression, movement, or feature) which, additionally, reduces power usage and improves battery life of the device by enabling the user to use the device more quickly and efficiently.

Note that details of the processes described above with respect to method 900 (e.g., FIGS. 9A-9B) are also applicable in an analogous manner to the methods described above. For example, method 900 optionally includes one or more of the characteristics of the various methods described above with reference to method 800. For example, displaying an animated virtual avatar preview based on a sequence of record facial features, movements, and/or expressions and based on a framework associated with an avatar template as described with respect to method 900 can be applied to the sticker and animated virtual avatar interface described with respect to method 800, above.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 9A and 9B are, optionally, implemented by components depicted in FIGS. 1A-1B. For example, receiving a request to generate an animated virtual avatar (906) is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10I, 11A-11C, 12A-12C, 13, 14A-14D, 15A-15B, 16A-16B, and 17A-17B illustrate exemplary user interfaces for generating and modifying virtual avatars, in accordance with some embodiments. The user interfaces in these figures are used to illustrate the processes described below, including the processes in FIGS. 18A, 18B, 19, 20, 21, 22, 23, 24, and 25.

In some embodiments, a virtual avatar is a representation of the user that can be graphically depicted. In some embodiments, the virtual avatar is non-photorealistic (e.g., is cartoonish). In some embodiments, the avatar is an anthropomorphic construct such as stylized animal (e.g., avatars 1100, 1300,1500, 1600, and 1700), a stylized robot (e.g., avatar 1400), or a stylization of a normally inanimate object (e.g., avatar 1000). In some embodiments, the virtual avatar includes an avatar face having one or more avatar features (e.g., avatar facial features). In some embodiments, the avatar features correspond (e.g., are mapped) to one or more physical features of a user's face such that detected movement of the user's physical feature affect the avatar feature (e.g., affect the feature's graphical representation).

In some examples, a user is able to manipulate characteristics or features of a virtual avatar using a camera sensor (e.g., camera 602) (e.g., camera module 143, optical sensor 164, depth camera sensor 175). As a user's physical features (such as facial features) and position (such as head position or head tilt) changes, the electronic device detects the changes and modifies the displayed image of the virtual avatar to reflect the changes in the user's physical features and position. In some embodiments, the changes to the user's physical features and position are indicative of various expressions, emotions, context, tone, or other non-verbal communication. In some embodiments, the electronic device modifies the displayed image of the virtual avatar to represent these expressions, emotions, context, tone, or other non-verbal communication.

FIGS. 10A-10I, 11A-11C, 12A-12C, 13, 14A-14D, 15A-15B, 16A-16B, 17A-17B, and 26A-26D illustrate exemplary user inputs and corresponding changes to exemplary virtual avatars (e.g., poo, bear, alien, rabbit, robot, unicorn, chicken, and pig avatars) displayed on an electronic device. In some embodiments, the electronic device includes one or more elements and/or features of devices 100, 300, and 500. The images on the left side of FIGS. 10A-10I, 11A-11C, 12A-12C, 13, 14A-14D, 15A-15B, 16A-16B, 17A-17B, 26A-26D represent images of a user as detected by the electronic device when the user is within the field of view of one or more cameras (e.g., camera 602) (e.g., camera module 143, optical sensor 164, depth camera sensor 175) and/or other sensors (e.g., infrared sensors). In other words, the images of the user are from the perspective of the camera (e.g., camera 602) (e.g., camera module 143, optical sensor 164, depth camera sensor 175), which may be positioned on the electronic device (e.g., device 100, 300, and 500) in some embodiments and, in other embodiments, may be positioned separate from the electronic device (e.g., an external camera or sensor passing data to the electronic device). In some embodiments, the borders of the images on the left side of FIGS. 10A-10I, 11A-11C, 12A-12C, 13, 14A-14D, 15A-15B, 16A-16B, 17A-17B, and 26A-26D represent the boundaries of the field of view of the one or more cameras (e.g., 602) (e.g., camera module 143, optical sensor 164, depth camera sensor 175) and/or other sensors (e.g., infrared sensors). In some embodiments, the images of the user are displayed on a display (e.g., touch screen 112, display 340, display 450, display 504) of the electronic device. In some embodiments, the image of the user is transmitted to an external electronic device for display. In some embodiments, the external electronic device includes one or more elements and/or features of devices 100, 300, and 500. In some embodiments, the image data of the user is collected and processed by the device, but is not immediately displayed on the electronic device or transmitted to an external device.

Each of the images on the right side of FIGS. 10A-10I, 11A-11C, 12A-12C, 13, 14A-14D, 15A-15B, 16A-16B, and 17A-17B illustrate a virtual avatar (e.g., poo avatar) in a state that is presented (e.g., displayed after being modified) based on the corresponding detected image of the user located on the left side of the figure. In some embodiments, the virtual avatar is shown from the perspective of a user viewing the virtual avatar. In some embodiments, the virtual avatar is displayed on the display of the electronic device (e.g., touch screen 112, display 340, display 450, display 504). In some embodiments, the virtual avatar is transmitted to the external electronic device for display. In some embodiments, the images on the right side of FIGS. 10A-10I, 11A-11C, 12A-12C, 13, 14A-14D, 15A-15B, 16A-16B, and 17A-17B represent a position of the virtual avatar within a display region of the display of the electronic device (e.g., touch screen 112, display 340, display 450, display 504), and the borders of the images on the right side of FIGS. 10A-10I, 11A-11C, 12A-12C, 13, 14A-14D, 15A-15B, 16A-16B, and 17A-17B represent the boundaries of the display region that includes the virtual avatar. In some embodiments, the display region represented in the right side corresponds to an avatar display region of an application user interface, such as virtual avatar interface 643, message composition area 612, message area 609 (or a portion thereof) discussed above.

In some embodiments, the magnitude of a reaction of an avatar feature (e.g., a discrete element of the avatar that can be moved or modified discretely with respect to other avatar features) corresponds to a magnitude of a change in a physical feature of the user (e.g., a detected or tracked feature such as a user muscle, muscle group, or anatomical feature such as an eye). For example, the magnitude of the change in the physical feature is, in some embodiments, determined in accordance with a potential range of motion of the physical feature, wherein the magnitude is representative of a relative position of the physical feature within the range of motion (e.g., the predicted or modeled range of motion) of that physical feature. In such embodiments, the magnitude of the reaction of the avatar feature is similarly a relative position of the avatar feature within a range of motion of the avatar feature. In some embodiments, the magnitude of change is determined based on a comparison or measurement (e.g., a distance) of the starting position and ending position of the physical feature, through the change. In such embodiments, the change in the physical feature may be translated to a modification of the first avatar feature by applying the measured change in the physical feature to the avatar feature (e.g., directly or as a scaled or adjusted value).

In some embodiments, modifications to an avatar feature have both a magnitude component and a directional component, with the directional component of the modification in the avatar feature being based on a directional component of a change in one or more of the physical features that the avatar feature is reactive to. In some embodiments, the direction of a reaction of an avatar feature corresponds (e.g., directly or inversely) to a relative direction of a change in a physical feature of the user, wherein the relative direction of the change in the physical feature is determined based on a direction of movement of the physical feature from an initial position (e.g., a neutral, resting position of the physical feature or, in some embodiments, a position of the physical feature that is initially detected by the device). In some embodiments, the direction of the reaction of the avatar feature corresponds directly (e.g., the physical feature moves up, the avatar feature also moves up) to the relative direction of the change in the physical feature. In other embodiments, the direction of the reaction of the avatar feature corresponds inversely (e.g., the physical feature moves up, the avatar feature moves down) to the relative direction of the change in the physical feature.

In some embodiments, the directional component of the change in the avatar feature is mirrored with respect to the directional component of the change in the physical feature. For example, when the physical feature (e.g., user's mouth) moves left, the avatar feature (e.g., avatar mouth) moves right. In some embodiments, the directional component of the change in the avatar feature is the same as the directional component of the change in the physical feature for movement along a vertical axis and mirrored for movement along a horizontal axis, similar to the effect seen when looking in a mirror. In some embodiments, the neutral, resting position of a user's iris is determined to be a particular position (e.g., centered) relative to the perimeter of the user's eyeball.

Figure 10A:
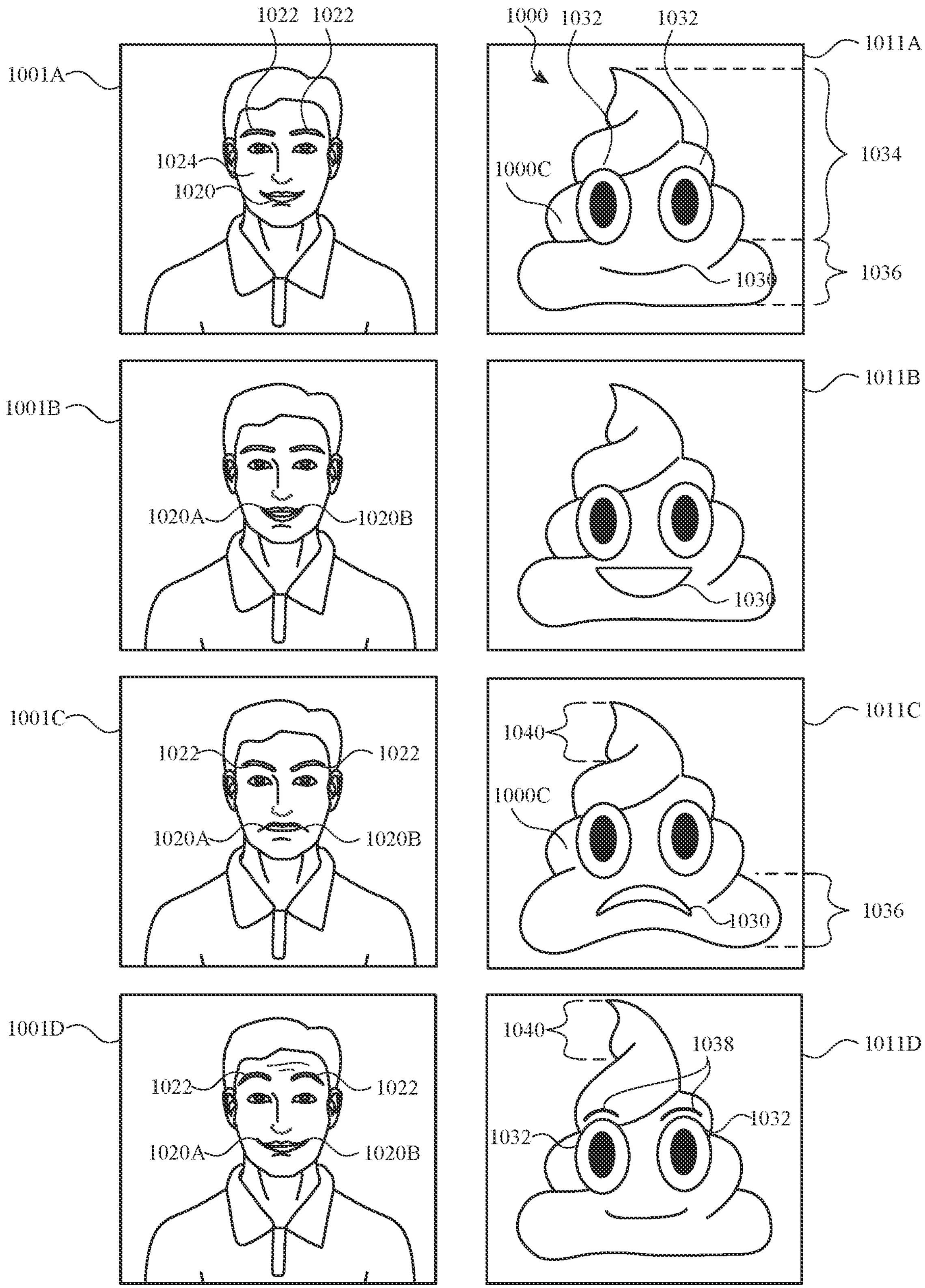
FIGS. 10A-10I illustrate exemplary user interfaces for generating and modifying a poo virtual avatar.

FIG. 10A illustrates an exemplary embodiment illustrating the electronic device modifying a poo avatar 1000 in response to detecting changes in a user's facial features. The poo avatar is shown having four displayed states (1011A, 1011B, 1011C, and 1011D), with each of the four displayed states of the poo avatar corresponding, respectively, to four detected states of the user (1001A, 1001B, 1001C, and 1001D). Specifically, in each displayed state in FIG. 10A, the electronic device positions or modifies features of the poo avatar in response to detecting a position, or change in position, of one or more of the physical features, such as facial features, of the user detected in the respective states of the user. In the embodiment shown in FIG. 10A, the detected facial features of the user include the user's mouth 1020 (having corners 1020A and 1020B) and the user's eyebrows 1022. In some embodiments, tracked physical features may include other facial features such as eyelids, irises, muscles, muscle groups, and so forth. In the embodiment of FIG. 10A, the features of the poo avatar include an avatar face 1000C, mouth 1030, avatar eyes 1032, an upper portion 1034 of the avatar, a lower portion 1036 of the avatar, and (in certain states) avatar eyebrows 1038.

As illustrated in 1001A, the electronic device detects a neutral facial expression of the user. For example, the electronic device detects that the user's mouth 1020 and eyebrows 1022 are positioned in a relaxed, neutral state, and not in a position that is associated with a particular facial expression (e.g., a smile or frown). In response to detecting the neutral facial expression of the user, the electronic device displays the poo avatar 1000 having a neutral expression (e.g., a neutral state) in 1011A. Specifically, the electronic device displays the poo avatar having an avatar mouth 1030 that is in a relaxed, neutral state, and not in a position that is typically associated with a particular facial expression (e.g., a smile or frown). In some embodiments, the neutral position of the avatar corresponds to other representations of a related image, such as a static poo emoji that may be found in messaging applications. In addition, the electronic device displays the poo avatar's face 1000C without eyebrows 1038 and displays the avatar eyes 1032 looking in a direction perpendicular to the display (or a plane of focus of the camera (e.g., camera 143, optical sensor 164)). The electronic device also displays the upper portion 1034 of the poo avatar situated in a neutral, upright position above the lower portion 1036.

As illustrated in 1001B, the electronic device detects a position of the user's mouth 1020 forming a smiling facial expression (e.g., one or both of the corners 1020A and 1020B of the user's mouth are positioned in an upward pose (e.g., an upward position) to form the smiling facial expression). In response to detecting the position of the user's mouth 1020, the electronic device modifies the display of the avatar mouth 1030 to have a smiling expression, such that the avatar mouth 1030 has an opened, smiling position as shown in 1011B. As shown in 1011B, the eyes 1032, upper portion 1034, and lower portion 1036 remain unchanged with respect to their original positions in 1011A.

As illustrated in 1001C, the electronic device detects a frowning facial expression of the user. In some embodiments, the electronic device detects a frowning facial expression by detecting one or both of the corners 1020A and 1020B of the user's mouth positioned in a downward pose (e.g., a downward position) and the user's eyebrows 1022 in a downward position (e.g., furrowed or positioned lower on the user's face when compared to the position of the eyebrows 1022 when in the relaxed, neutral state in 1001A and 1001B). In response to detecting the user's frowning facial expression, the electronic device modifies the poo avatar to have a frowning, drooping face as shown in 1011C. For example, the electronic device modifies the poo avatar such that the corners of the avatar's mouth 1030 are turned down with a slightly opened position of the mouth 1030, and the lower portion 1036 of the poo avatar is curved downward similar to the turned-down position of the poo avatar's mouth 1030. In the embodiment of FIG. 10A, while the electronic device detects the downward position of the user's eyebrows 1022, no modifications are made to the anatomically corresponding portion of the poo avatar that is above the avatar eyes 1032.

In some embodiments, the electronic device modifies the poo avatar to have the drooping face shown in 1011C by displaying an animation of the mouth 1030 turning down and the lower portion 1036 curving down as the mouth 1030 is moving to the turned-down position. In some embodiments, the electronic device further modifies the poo avatar such that a tip 1040 of the poo avatar is slumped or tilted down when the poo avatar makes the drooping face. In some embodiments, the position of tip 1040 is based, specifically, on the position of the user's eyebrows 1022 (a physical feature that does not anatomically correspond to the tip 1040). In some embodiments, the electronic device modifies the poo avatar to return to its neutral position when the user is no longer making the frowning expression. In such embodiments, the electronic device modifies the poo avatar to return to the neutral state in 1011A by displaying an animation of the mouth 1030 moving to the neutral position and the lower portion 1036 moving back to its neutral position. In some embodiments, returning the poo avatar from the drooping face to the neutral state includes the electronic device displaying the tip 1040 of the poo avatar straightening to its neutral position.

As illustrated in 1001D, the electronic device detects the corners 1020A and 1020B of the user's mouth are slightly raised and the user's eyebrows 1022 are in a raised position (e.g., positioned higher on the user's face when compared to the position of the eyebrows 1022 when in the relaxed, neutral state shown in 1001A and 1001B). In response to detecting the positions of the corners 1020A and 1020B of the user's mouth 1020, the electronic device modifies the display of the poo avatar such that the corners of the avatar's mouth 1030 are slightly raised to match the position of the corners 1020A and 1020B of the user's mouth 1020. In response to detecting the raised position of the user's eyebrows 1022, the electronic device modifies the poo avatar by introducing eyebrows 1038 positioned above the poo avatar's eyes 1032 in a raised position (e.g., to convey the impression that the poo avatar 1000 is raising its eyebrows 1038), and extending the upper portion 1034 of the poo avatar in an upward direction (e.g., by extending a tip 1040 of the poo avatar, while maintaining the original position of the lower portion 1036). In the embodiment shown in 1001D and 1011D, the electronic device introduces the avatar's eyebrows 1038 and extends the tip 1040 of the poo avatar when the user's eyebrows 1022 are raised. In some embodiments, the electronic device removes the avatar eyebrows 1038 and relaxes the tip 1040 when the user's eyebrows 1022 return to their neutral position. In some embodiments, the electronic device removes the poo avatar's eyebrows 1038 by animating the eyebrows 1038 moving downward towards the poo avatar's eyes 1032 and disappearing into the poo avatar's face 1000C above the eyes 1032.

Figure 10B:
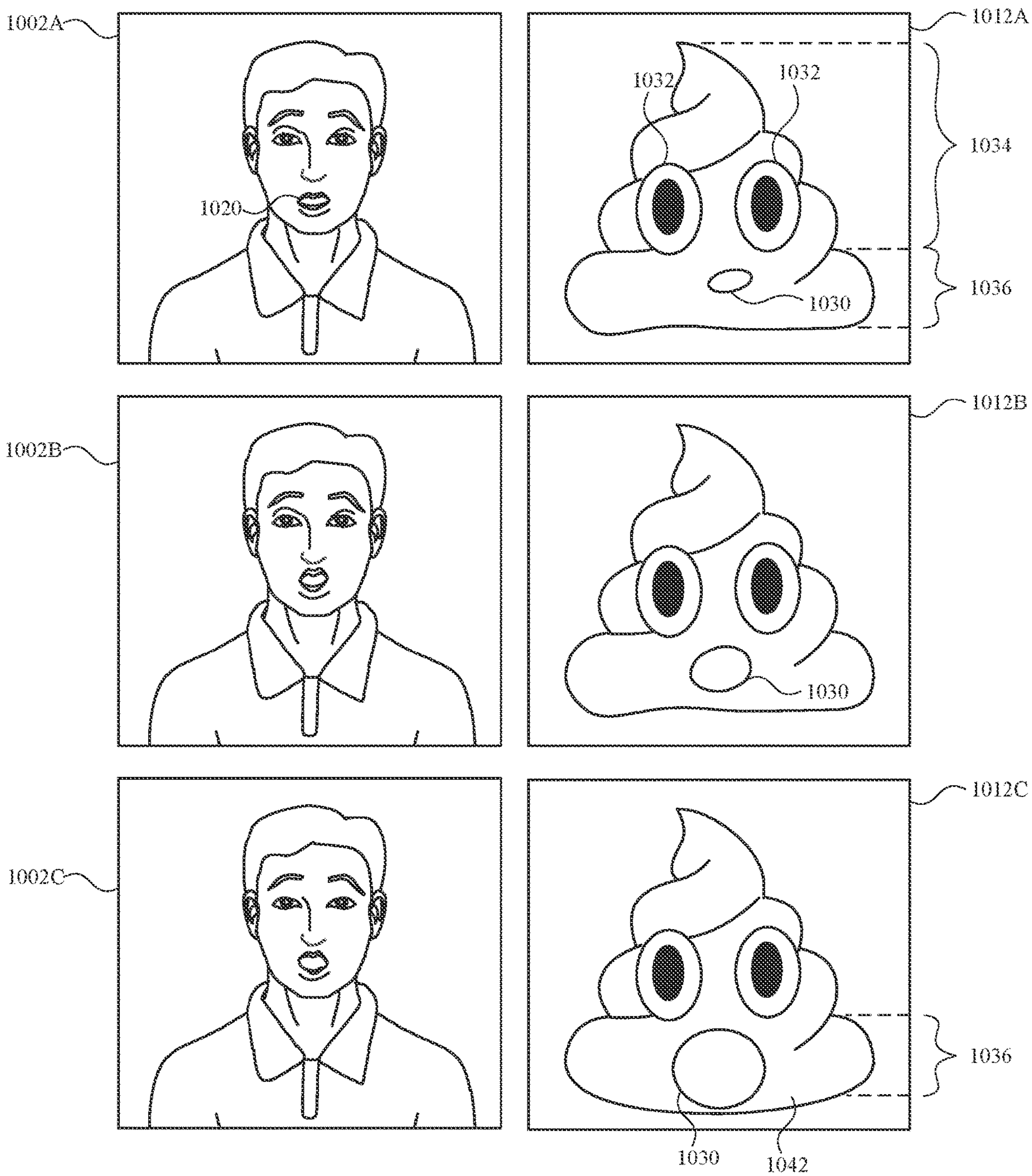

FIG. 10B illustrates an exemplary embodiment illustrating the electronic device modifying the poo avatar in response to detecting changes in the user's facial features, with the modifications to the poo avatar including moving avatar features in an exaggerated manner. In some embodiments, exaggerating the features of the virtual avatar allows a user to affect maximum changes to the avatar feature, without having to uncomfortably change the corresponding feature(s) of their face. For example, as shown in FIG. 10B, the user can cause the avatar to open its mouth as wide as possible (e.g., in a surprised expression) without having to uncomfortably open the user's mouth (e.g., without having to open the user's mouth to the maximum range of predicted or determined range of motion of the user's mouth).

The poo avatar is shown in FIG. 10B having three displayed states (1012A, 1012B, and 1012C), with each of the three displayed states of the poo avatar corresponding, respectively, to three detected states of the user (1002A, 1002B, and 1002C). Specifically, in each displayed state in FIG. 10B, the electronic device positions or modifies features of the poo avatar in response to detecting a position, or change in position, of one or more of the physical features, such as facial features, of the user detected in the respective states of the user. In the embodiment shown in FIG. 10B, the detected facial features of the user include the user's mouth 1020. In some embodiments, tracked physical features may include other facial features such as eyelids, irises, muscles, muscle groups, and so forth. In the embodiment of FIG. 10B, the features of the poo avatar include an avatar mouth 1030, avatar eyes 1032, an upper portion 1034 of the avatar, and a lower portion 1036 of the avatar.

As illustrated in 1002A, the electronic device detects a first state of the user in which the user's mouth 1020 is slightly opened (e.g., 10% of the maximum range of predicted or determined range of motion of the user's mouth). In response to detecting the slightly opened mouth 1020 of the user, the electronic device modifies the poo avatar, as shown in 1012A, such that the mouth 1030 of the poo avatar has an opened position (e.g., 20% of the maximum range of a modeled range of motion for the avatar's mouth) that is greater (e.g., within their respective ranges of motion) than that of the user's mouth 1020, while leaving unchanged other features of the avatar, such as the poo avatar's eyes 1032, upper portion 1034, and lower portion 1036.

As illustrated in 1002B, the electronic device detects a change in the user's facial features in which the user's mouth 1020 is opened wider (e.g., 25% of the maximum range of predicted or determined range of motion of the user's mouth) than it was in state 1002A. In response to detecting the user's mouth 1020 transitioning from the slightly opened position in 1002A to the wider opening in 1002B, the electronic device modifies the poo avatar's mouth 1030 to increase in size, as shown in 1012B, such that the mouth 1030 has an opened position that is even greater (e.g., 50% of the maximum range of the modeled range of motion for the avatar's mouth) than shown in 1012A, while still maintaining the positioning of the other avatar features, including the poo avatar's eyes 1032, upper portion 1034, and lower portion 1036.

As illustrated in 1002C, the electronic device detects yet another change in the user's facial features in which the user's mouth 1020 is opened even wider (e.g., 50% of the maximum range of predicted or determined range of motion of the user's mouth) than it was in 1002B. In response to detecting the user's mouth 1020 transitioning from the opened position in 1002B to the wider opening in 1002C, the electronic device modifies the poo avatar's mouth 1030 to further increase in size, as shown in 1012C, such that the mouth 1030 has an opened position that is even greater (e.g., 100% of the maximum range of the modeled range of motion for the avatar's mouth) than that shown in 1012B. In 1012C, however, the opening of the mouth 1030 is larger than the height of the lower portion 1036. As a result, the electronic device expands the lower portion 1036 of the poo avatar 1000 at 1042 to maintain the structural integrity of the poo avatar 1000 in response to the user's opened mouth 1020. In other words, to maintain consistent positioning of the avatar and its features in response to the user's opened mouth 1020, the device modifies one or more interconnected portions of the virtual avatar (e.g., the lower portion 1036). For example, as shown in 1012C, the electronic device expands the lower portion 1036 of the poo avatar, which is adjacent the avatar mouth 1030, at region 1042 to accommodate the increased size of the enlarged avatar mouth 1030. If the electronic device did not modify the lower portion 1036 in this manner, the enlarged mouth 1030 would extend beyond the structure of the virtual avatar, thereby potentially impeding the context and/or tone the user intends to communicate using the virtual avatar.

In some embodiments, the increase in size of the avatar mouth 1030 (e.g., from the position illustrated in 1012A to the position illustrated in 1012B, or from the position illustrated in 1012B to the position illustrated in 1012C) is not proportional to the increase in size of the user's mouth 1020 (e.g., from the position illustrated in 1002A to the position illustrated in 1002B, or from the position illustrated in 1002B to the position illustrated in 1002C), but rather is scaled to provide an exaggerated rate of change in size. For example, in some embodiments the scale is a multiplication factor of two such that the relative opened position of the avatar's mouth is two times the relative opened position of the user's mouth. For example, if the user's mouth is opened 10% of the maximum range of motion of the user's mouth, the electronic device displays the avatar's mouth opened 20% of the maximum range of the modeled range of motion of the avatar's mouth.

Figure 10C:
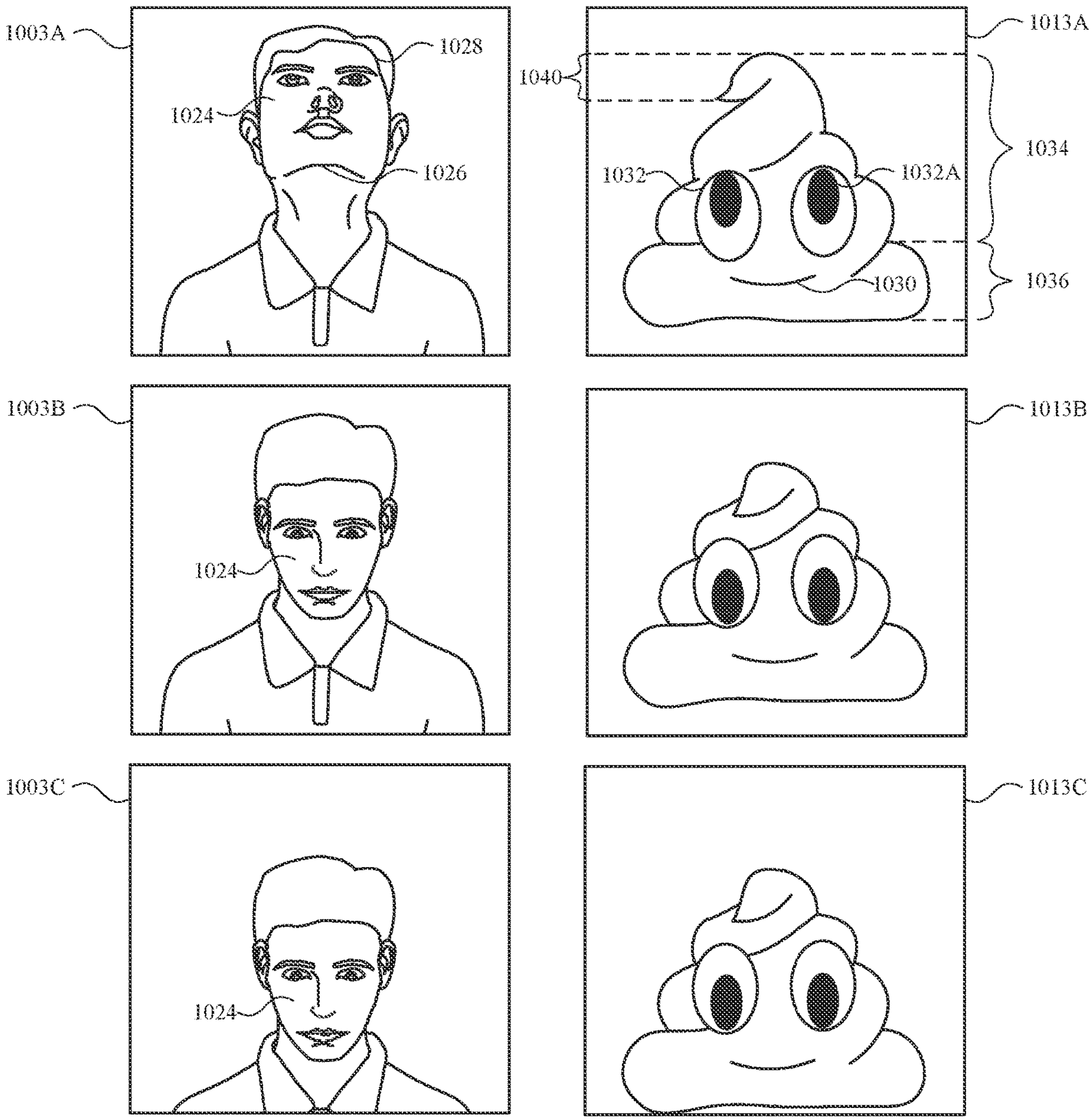

FIG. 10C illustrates an exemplary embodiment illustrating the electronic device modifying the poo avatar in response to detecting changes in a user's physical features, wherein the modifications to the poo avatar include rotating (e.g., tilting) an upper portion of the poo avatar forward and backward while keeping a lower portion of the poo avatar stationary. The electronic device displays the poo avatar having three displayed states (1013A, 1013B, and 1013C), with each of the three displayed states of the poo avatar corresponding, respectively, to three detected states of the user (1003A, 1003B, and 1003C). Specifically, in each displayed state in FIG. 10C, the electronic device positions or modifies features of the poo avatar in response to detecting a position, or change in position, of one or more of the physical features, such as facial features, of the user detected in the respective states of the user. In the embodiment shown in FIG. 10C, the physical features of the user include the user's face 1024, chin 1026, and head 1028. In some embodiments, tracked physical features may include other facial features such as eyelids, irises, muscles, muscle groups, and so forth. In the embodiment of FIG. 10C, the features of the poo avatar include an avatar mouth 1030, avatar eyes 1032, an upper portion 1034 of the avatar (including a tip 1040 of the poo avatar), and a lower portion 1036 of the avatar.

As illustrated in 1003A, the electronic device detects the user's face 1024 having a position rotated in an upward direction. For example, the user has lifted their chin 1026 and tilted their head 1028 back (e.g., away from the plane of view of the camera (e.g., camera 143, optical sensor 164)) to position their face 1024 in an upward direction. In response to detecting the upward position of the user's face 1024, the electronic device modifies the poo avatar to look up by tilting the upper portion 1034 of the poo avatar in a direction away from the display (e.g., back—away from a plane of focus of the camera (e.g., camera 143, optical sensor 164)) as shown in 1013A. In this back-tilted position, the electronic device displays the tip 1040 of the poo avatar positioned towards a back side of the poo avatar 1000 to illustrate a shifted position of the tip 1040 when modifying the poo avatar to look up. In addition, the electronic device modifies the eyes 1032 of the poo avatar to look up (e.g., by shifting the pupil or iris 1032A of the poo avatar towards the top of the avatar eye 1032) as shown in 1013A. While the electronic device tilts the upper portion 1034 of the poo avatar and modifies the eyes 1032 to look up, the electronic device leaves other features of the poo avatar unchanged. For example, the electronic device maintains the position of the avatar mouth 1030 and fixes the position of the lower portion 1036 of the poo avatar such that the electronic device shows the upper portion 1034 rotated backward about an axis (e.g., an x-axis) extending along a width of the lower portion 1036.

As illustrated in 1003B, the electronic device detects the user's face 1024 having a position rotated in a downward direction. For example, the user has lowered (or tucked) their chin 1026 and tilted their head 1028 forward (e.g., towards the plane of focus of the camera (e.g., camera 143, optical sensor 164)) to position their face 1024 in a downward direction. In response to detecting the downward position of the user's face 1024, the electronic device modifies the poo avatar to look down by tilting the upper portion 1034 of the poo avatar in a direction towards the display (e.g., forward—towards a plane of focus of the camera (e.g., camera 143, optical sensor 164)) as shown in 1013B. In this forward-tilted position, the electronic device displays the tip 1040 of the poo avatar positioned towards a front side of the poo avatar to illustrate a shifted position of the tip 1040 when modifying the poo avatar to look down. In addition, the electronic device modifies the eyes 1032 of the poo avatar to look down (e.g., by shifting the pupil or iris 1032A of the poo avatar towards the bottom of the avatar eye 1032) as shown in 1013B. While the electronic device tilts the upper portion 1034 of the poo avatar and modifies the eyes 1032 to look down, the electronic device leaves other features of the poo avatar unchanged. For example, the electronic device maintains the position of the avatar mouth 1030, and fixes the position of the lower portion 1036 of the poo avatar such that the electronic device shows the upper portion 1034 rotated forward about an axis (e.g., an x-axis) extending along a width of the lower portion 1036.

As illustrated in 1003C, the electronic device detects the position of the user (specifically, the position of the user's face 1024 and head 1028) is in the downward-rotated position shown in 1003B, but is also shifted downward within the field of view of the camera (e.g., camera 143, optical sensor 164) from the position shown in 1003B. In response, the electronic device displays the poo avatar 1000 in the forward-tilted position shown in 1013B, but also shifted downward within the displayed region in 1013C to mirror the downward direction of the user's shift within the field of view of the camera.

Figure 10D:
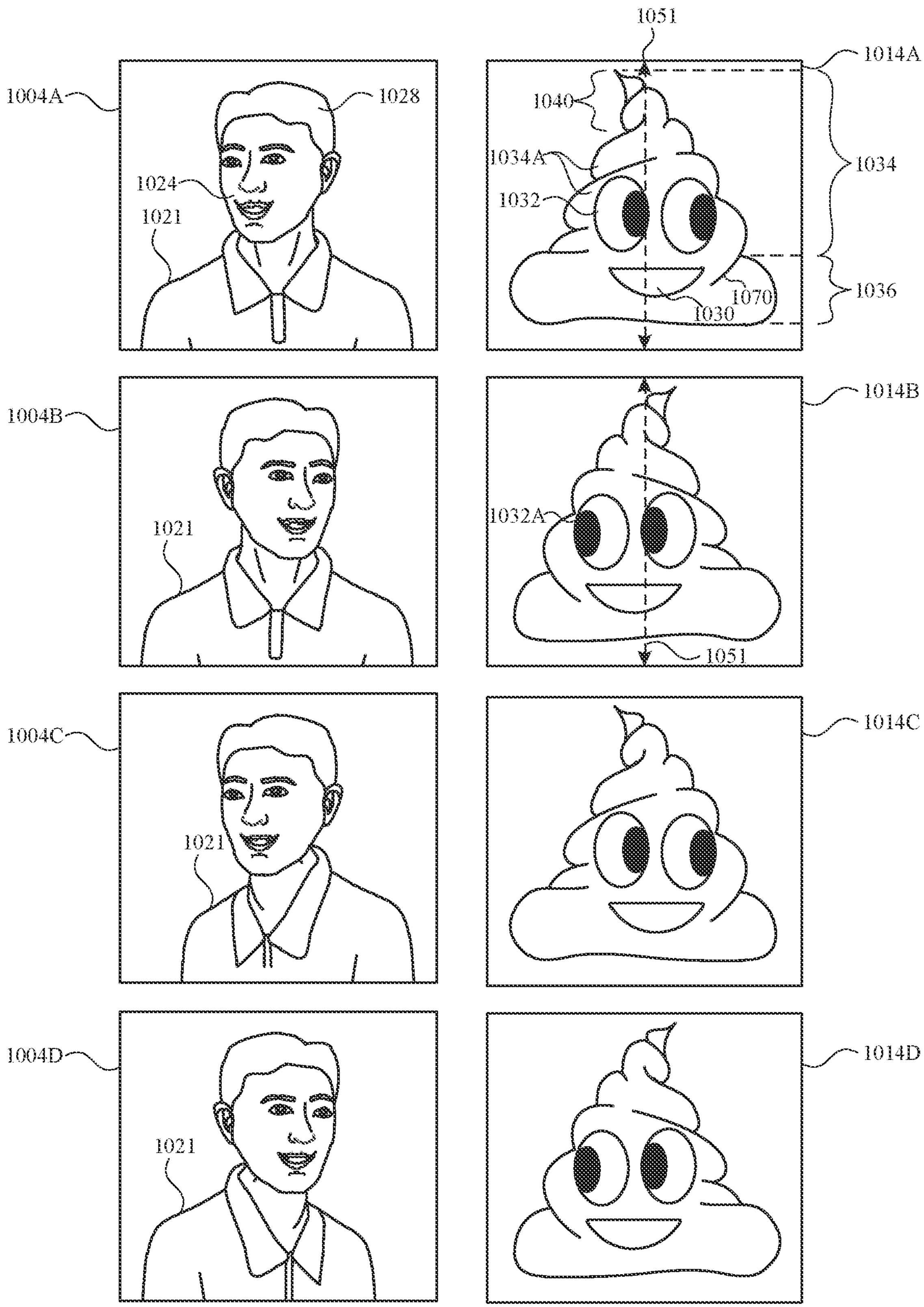

FIG. 10D illustrates an exemplary embodiment illustrating the electronic device modifying the poo avatar in response to detecting changes in a user's physical features, wherein the modifications to the poo avatar include rotating an upper portion of the poo avatar while keeping a lower portion of the poo avatar stationary. The poo avatar is shown having four displayed states (1014A, 1014B, 1014C, and 1014D), with each of the four displayed states of the poo avatar corresponding, respectively, to four detected states of the user (1004A, 1004B, 1004C, and 1004D). In each displayed state in FIG. 10D, the electronic device positions or modifies features of the poo avatar in response to detecting a position, or change in position, of one or more of the physical features, such as facial features, of the user detected in the respective states of the user. In the embodiment shown in FIG. 10D, the physical features of the user include the user's mouth 1020, face 1024, head 1028, and shoulders 1021. In some embodiments, tracked physical features may include other facial features such as eyelids, irises, muscles, muscle groups, and so forth. In the embodiment of FIG. 10D, the features of the poo avatar include an avatar mouth 1030, avatar eyes 1032, an upper portion 1034 of the avatar (including a tip 1040 of the poo avatar), and a lower portion 1036 of the avatar.

As illustrated in 1004A, the electronic device detects the user's head 1028 and, optionally, the user's face 1024 (or various physical features comprising the face 1024), rotated to the user's right side while the user's shoulders 1021 remain positioned forward. In response, the electronic device modifies the poo avatar, as shown in 1014A, by twisting the upper portion 1034 of the poo avatar to the right (while keeping the lower portion 1036 stationary) so that the twisting motion of the virtual avatar mirrors the rightward rotating movement of the user's head 1028 and face 1024. The electronic device also detects the smiling pose of the user's mouth 1020 and modifies the avatar mouth 1030 to smile. As shown in 1014A, the electronic device twists the upper portion 1034 of the poo avatar about an axis 1051 (e.g., y-axis) that extends vertically through the center of the poo avatar. When the electronic device twists the upper portion 1034 of the poo avatar to the right, the electronic device also shifts the tip 1040 of the poo avatar to the left, moves the eyes 1032 of the poo avatar to the right, and increases the amount of wrinkles 1034A or layers formed in the upper portion 1034 of the poo avatar, thereby giving the poo avatar a contorted appearance that includes a slight twisting 1070 of the lower portion 1036, which is modeled based on an interconnected relationship between the upper portion 1034 and the lower portion 1036. These modifications to the poo avatar provide an animated effect that mimics the physical movements of the user, even though portions of the avatar (e.g., the tip 1040 of the poo avatar) do not necessarily correspond anatomically to physical features of the user.

1004B and 1014B illustrate a similar effect in which the electronic device detects the user's head 1028 and, optionally, the user's face 1024 (or various physical features comprising the face 1024), rotated to the user's left side while the user's shoulders 1021 remain positioned forward. In response, the electronic device modifies the poo avatar, as shown in 1014B, by twisting the upper portion 1034 of the poo avatar to the left (while keeping the lower portion 1036 stationary) so that the twisting motion of the virtual avatar mirrors the leftward rotating movement of the user's head 1028 and face 1024. As shown in 1014B, the electronic device twists the upper portion 1034 of the poo avatar about axis 1051 extending vertically through the center of the poo avatar. When the electronic device twists the upper portion 1034 of the poo avatar to the left, the electronic device also shifts the tip 1040 of the poo avatar to the right, moves the eyes 1032 of the poo avatar to the left, and increases the amount of wrinkles 1034A or layers formed in the upper portion 1034 of the poo avatar, thereby giving the poo avatar a contorted appearance that includes a slight twisting 1070 of the lower portion 1036, which is modeled based on an interconnected relationship between the upper portion 1034 and the lower portion 1036.

In some embodiments, the electronic device does not track movement (e.g., rotational movement) or positioning of the user's shoulders 1021 so that the user may affect change in the virtual avatar without having to maintain a fixed orientation or position in front of the camera (e.g., camera 143, optical sensor 164). For example, as shown in 1004C the user's shoulders 1021 are tilted or turned to the user's right, but the lower portion 1036 of the poo avatar remains fixed as shown in 1014C. The electronic device does, however, detect the user's head 1028 and, optionally, the user's face 1024, rotated to the user's right side. Thus, as shown in 1014C, the electronic device modifies the poo avatar accordingly as discussed above with respect to 1014A, without further modifying the poo avatar in response to the user turning their shoulders 1021. A similar effect is shown in 1004D and 1014D wherein the user's shoulders 1021 are tilted or turned to the user's left along with the user's head 1028, and the electronic device modifies the poo avatar as discussed above with respect to 1014B, without further modifying the poo avatar (e.g., the lower portion 1036) in response to the user turning their shoulders 1021.

Figure 10E:
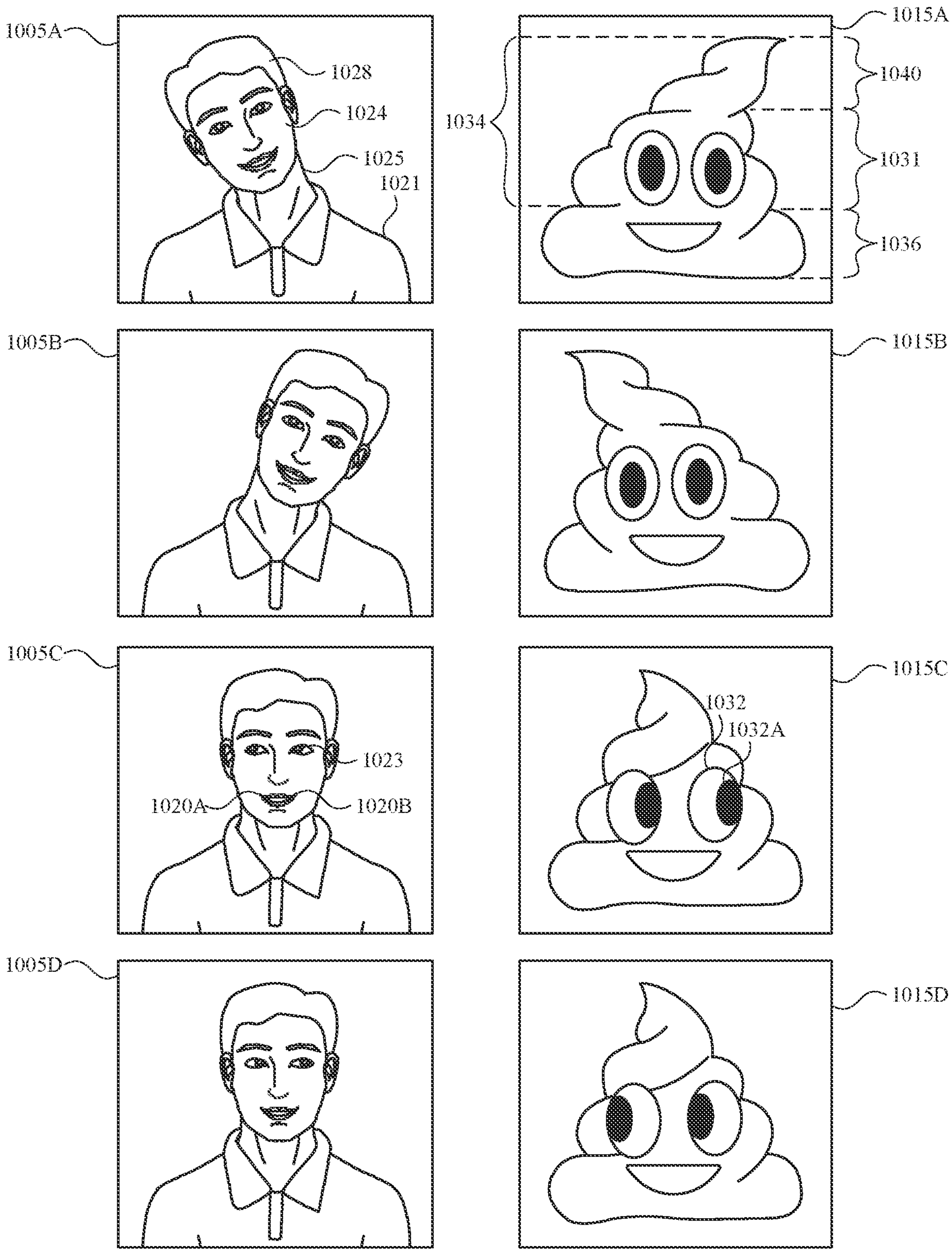

FIG. 10E illustrates an exemplary embodiment illustrating the electronic device modifying the poo avatar in response to detecting changes in a user's physical features, wherein the modifications to the poo avatar include tilting an upper portion of the poo avatar while keeping a lower portion of the poo avatar stationary. The poo avatar is shown having four displayed states (1015A, 1015B, 1015C, and 1015D), with each of the four displayed states of the poo avatar corresponding, respectively, to four detected states of the user (1005A, 1005B, 1005C, and 1005D). In each displayed state, the electronic device positions or modifies features of the poo avatar in response to detecting a position, or change in position, of one or more of the physical features, such as facial features, of the user detected in the respective states of the user. In the embodiment shown in FIG. 10E, the physical features of the user include the user's mouth 1020, face 1024, head 1028, shoulders 1021, eyes 1023, and neck 1025. In some embodiments, tracked physical features may include other facial features such as eyelids, irises, muscles, muscle groups, and so forth. In the embodiment of FIG. 10E, the features of the poo avatar include an avatar mouth 1030, avatar eyes 1032, an upper portion 1034 of the avatar (including a tip 1040 of the poo avatar and middle portion 1031), and a lower portion 1036 of the avatar.

As illustrated in 1005A, the electronic device detects the user's head 1028 and, optionally, the user's face 1024 (or various physical features comprising the face 1024), tilted to the user's right side while the user's shoulders 1021 remain positioned forward. The electronic device also detects the user's neck 1025 is tilted slightly to the user's right. In response, the electronic device modifies the poo avatar, as shown in 1015A, by tilting the upper portion 1034 of the poo avatar to the right (the upper portion 1034 of the poo avatar includes the tip 1040 and middle portion 1031) while keeping the lower portion 1036 stationary so that the tilting motion of the virtual avatar mirrors the rightward tilt of the user's head 1028 (and/or face 1024) and neck 1025.

In addition to mirroring the direction of tilt, the electronic device modifies the virtual avatar to account for the varying degrees of tilt present in the various physical features of the user shown in 1005A. For example, the upper portions of the user (e.g., the user's head 1028) tilt to a greater degree than the lower portions of the user (e.g., the user's neck 1025). Therefore, as shown in 1015A, the electronic device modifies the virtual avatar such that the amount of movement or tilt is greatest at the top of the virtual avatar (e.g., at the tip 1040) and is least at the bottom of the virtual avatar (e.g., at the lower portion 1036). In other words, the amount of tilt decreases from the top of the virtual avatar to the bottom, which is consistent with the variation in the degree of tilt shown in the user in 1005A. This is demonstrated in 1015A by the tip 1040 of the poo avatar having a large degree of tilt, the middle portion 1031 having a lesser degree of tilt than the tip 1040, and the lower portion 1036 having no tilt. These modifications to the poo avatar provide an animated effect that mimics the physical movements of the user, even though portions of the avatar (e.g., the tip 1040 of the poo avatar) do not necessarily correspond anatomically to physical features of the user. Moreover, the electronic device modifies the virtual avatar with the varying degree of tilt to mimic the decreased range of motion in the physical features of the user, such as when the user tilts their head 1028 and neck 1025.

1005B and 1015B illustrate a similar effect in which the electronic device detects the user's head 1028 and neck 1025 tilted to the user's left side. In response, the electronic device modifies the poo avatar, as shown in 1015B, by tilting the upper portion 1034 of the poo avatar to the left with varying degrees of tilt (e.g., the tip 1040 tilts to a greater degree than the middle portion 1031) while keeping the lower portion 1036 stationary so that the tilting motion of the virtual avatar mirrors the leftward tilt of the user's head 1028 and neck 1025, as discussed in greater detail above with respect to 1005A and 1015A.

As illustrated in 1005C, the electronic device detects the user's eyes 1023 (e.g., the iris or pupil of the user's eye) shifted to the user's right side and a smiling facial expression formed by the corners 1020A and 1020B of the user's mouth 1020 positioned in an upward pose. In response to detecting the rightward shift of the user's eyes 1023, the electronic device modifies the eyes 1032 of the poo avatar to look right (e.g., by shifting the pupil or iris 1032A of the poo avatar towards the right side of the avatar eye 1032) as shown in 1015C. In response to detecting one or both of the corners 1020A and 1020B of the user's mouth positioned in the upward pose, the electronic device modifies the display of the avatar mouth 1030 to have a smiling expression, wherein the avatar mouth 1030 has an opened, smiling position as shown in 1015C. As shown in 1015C, the upper portion 1034 and lower portion 1036 remain unchanged with respect to their respective neutral positions (shown in 1011A).

1005D and 1015D illustrate a similar effect in which the electronic device detects the user's smiling facial expression and the user's eyes 1023 (e.g., the iris or pupil of the user's eye) shifted to the user's left side. In response to detecting the leftward shift of the user's eyes 1023, the electronic device modifies the eyes 1032 of the poo avatar to look left (e.g., by shifting the pupil or iris 1032A of the poo avatar towards the left side of the avatar eye 1032) as shown in 1015D. In response to detecting one or both of the corners 1020A and 1020B in the upward pose, the electronic device modifies the display of the avatar mouth 1030 to have a smiling expression as discussed above with respect to 1015C. Again, the upper portion 1034 and lower portion 1036 remain unchanged in 1015D with respect to their respective neutral positions (shown in 1011A and 1015C).

Figure 10F:
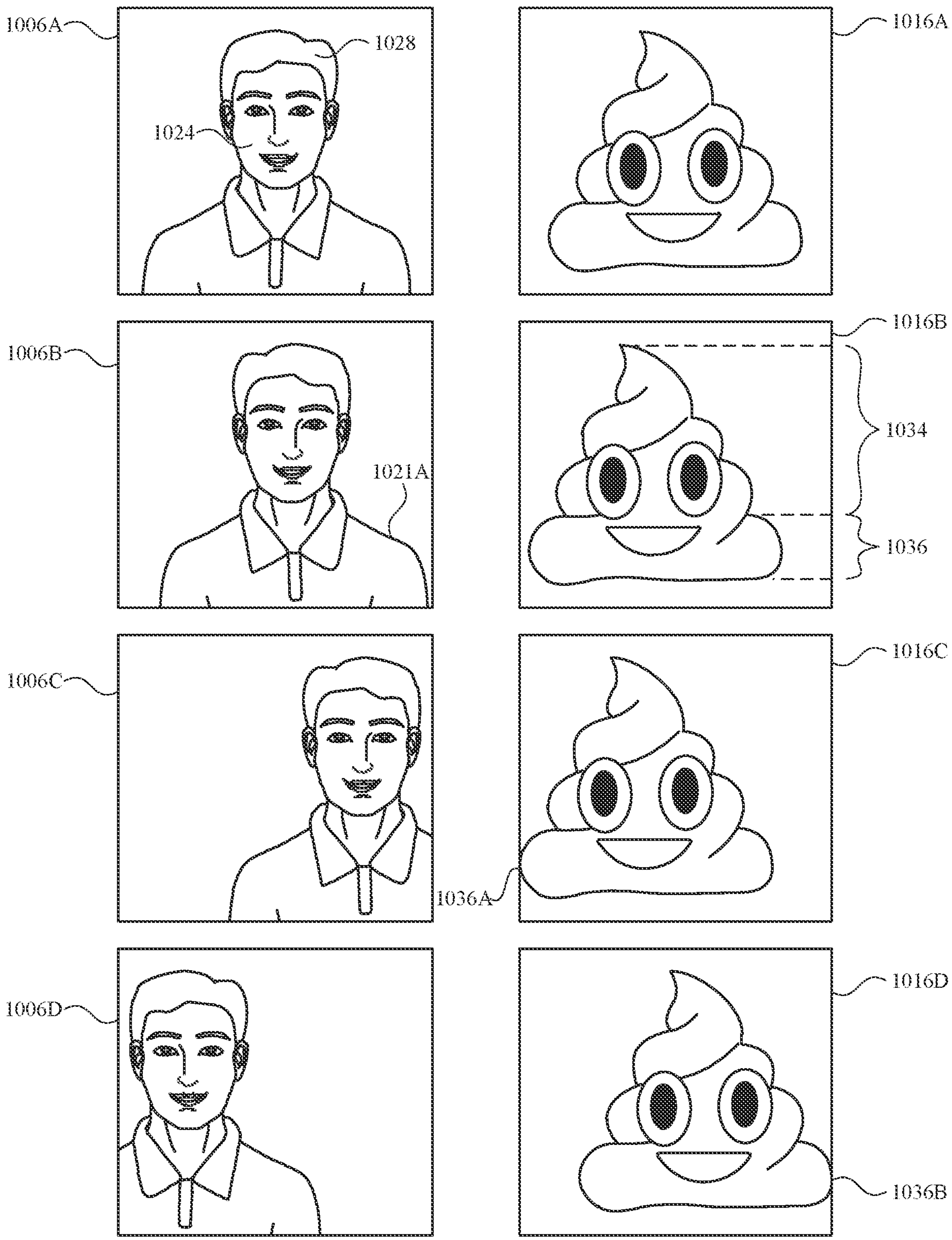

FIG. 10F illustrates an exemplary embodiment of the electronic device modifying the poo avatar in response to detecting a shift in the user's position within the field of view of the camera (e.g., camera 143, optical sensor 164). The modifications to the poo avatar include shifting (e.g., translating) the poo avatar in a direction corresponding to the shift in the user's position within the field of view of the camera. The poo avatar is shown having four displayed states in four display regions (1016A, 1016B, 1016C, and 1016D), with each of the four displayed states of the poo avatar corresponding, respectively, to four detected states of the user (1006A, 1006B, 1006C, and 1006D). In each displayed state in FIG. 10F, the electronic device positions or modifies the poo avatar in response to detecting a position, or change in position, of the user detected within the field of view of the camera as shown in the respective states of the user. In each of the four displayed states, the boundaries of the displayed states (e.g., the borders of 1016A, 1016B, 1016C, and 1016D) represent the boundaries of a displayed region that includes the virtual avatar.

As illustrated in 1006A, the electronic device detects the user's position as being centered horizontally within the field of view of the camera (e.g., camera 143, optical sensor 164). In response to detecting the horizontally centered position of the user within the camera's field of view, the electronic device displays the poo avatar having a horizontally centered position within the display region as shown in 1016A.

In 1006B, the electronic device detects the user's position being off-center (e.g., shifted or translated) in a rightward direction in the field of view of the camera (e.g., camera 143, optical sensor 164). In other words, the user is shifted to the user's left direction (e.g., shifted to the right with respect to the field of view of the camera), but remains completely visible within the camera's field of view. In response to detecting the shifted position of the user in 1006B, the electronic device shifts the horizontal position of the entire poo avatar (including both the upper portion 1034 and lower portion 1036) so that the poo avatar is displayed in a leftward-shifted position, as shown in 1016B, so as to mirror the directional shift of the user to the user's left direction. As shown in 1006B, the user is shifted to their left side with their left shoulder 1021A near the right edge of the field of view. Accordingly, the electronic device displays the poo avatar positioned near the left edge of the display region of 1016B, mirroring the direction of the shifted position of the user within the camera field of view. In some embodiments, the shifted position of the user is mirrored by the shift of the virtual avatar in both direction and magnitude. In some embodiments, the shifted position of the user is mirrored by the shift of the virtual avatar in direction only, and the magnitude of the virtual avatar's shift is tuned (e.g., dampened) to maintain a position of the virtual avatar within the boundaries of the display region. An example of such an embodiment is discussed below with respect to 1006C, 1016C, 1006D, and 1016D.

In 1006C, the electronic device detects the user's position as being off-center (e.g., shifted or translated) in a far right direction in the field of view of the camera (e.g., camera 143, optical sensor 164). In other words, the user is shifted far to the user's left direction (e.g., shifted to the right with respect to the field of view of the camera), but is shifted so much that the user's left shoulder 1021A is no longer within the field of view of the camera. In response to detecting the drastically shifted position of the user in 1006C, the electronic device shifts the horizontal position of the poo avatar so that the entire poo avatar (including both the upper portion 1034 and lower portion 1036) is displayed in a completely leftward-shifted position with the outermost edge of the poo avatar (e.g., the edge 1036A of the lower portion 1036) positioned against the left border of the display region shown in 1016C. The shifted display of the poo avatar in 1016C mirrors the direction of the user's shift to the user's left direction, but instead of shifting the poo avatar such that a portion of the avatar extends beyond the display region in 1016C (as the user does in 1006C), the device positions the poo avatar at the edge of the display region 1016C. By maintaining a position of the virtual avatar within the display region (e.g., 1016A, 1016B, 1016C, and 1016D), even when a portion of the user is beyond the field of view of the camera (e.g., camera 143, optical sensor 164), the electronic device allows a user to affect change in the virtual avatar without having to maintain a fixed orientation or position in front of the camera.

A similar effect is illustrated in 1006D and 1016D. In 1006D the electronic device detects the user shifted to their right (e.g., to the left in the field of view of the camera) such that the user's right shoulder is no longer within the field of view of the camera. In response to detecting the far-shifted position of the user, the electronic device shifts the horizontal position of the poo avatar so that the entire poo avatar (including both the upper portion 1034 and lower portion 1036) is displayed in a completely rightward-shifted position with the outermost edge of the poo avatar (e.g., the edge 1036B of the lower portion 1036) positioned against the right border of the display region shown in 1016D. As explained above, by maintaining a position of the virtual avatar within the display region 1016D, even when a portion of the user is beyond the field of view of the camera (e.g., camera 143, optical sensor 164), the electronic device allows a user to affect change in the virtual avatar without having to maintain a fixed orientation or position in front of the camera.

Figure 10G:
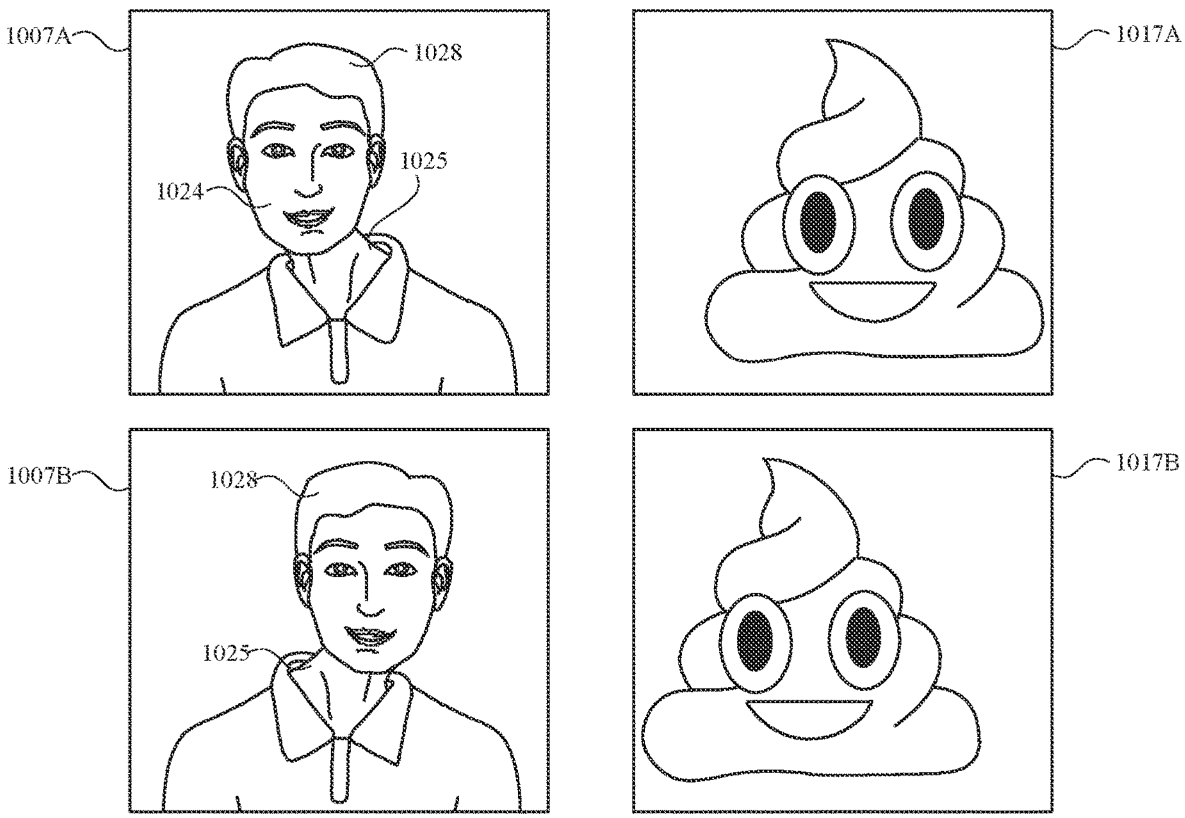

FIG. 10G illustrates an exemplary embodiment of the electronic device modifying the poo avatar in response to detecting a shift in the position of the user's physical features within the field of view of the camera (e.g., camera 143, optical sensor 164). The modifications to the poo avatar include shifting (e.g., translating) the poo avatar in a direction corresponding to the shift in the position of the user's physical features within the field of view of the camera. The embodiment illustrated in FIG. 10G is similar to those discussed above with respect to FIGS. 10D-10F in that the electronic device tracks movement and positioning (e.g., rotational movement and/or translational movement) of the user's head 1028, but not movement or positioning of the user's shoulders 1021 and, optionally, the user's neck 1025. In addition, the embodiment illustrated in FIG. 10G is similar to the embodiment in FIG. 10F in that the modifications to the virtual avatar mirror movement of the user in direction, but not necessarily in magnitude. By implementing these techniques, the electronic device allows the user to affect change in the virtual avatar without having to maintain a fixed orientation or position in front of the camera (e.g., camera 143, optical sensor 164).

The poo avatar is shown having two displayed states in two display regions (1017A and 1017B), with each of the two displayed states of the poo avatar corresponding, respectively, to two detected states of the user (1007A and 1007B). In each displayed state in FIG. 10G, the device positions or modifies the poo avatar in response to detecting a position, or change in position, of the user's physical features detected within the field of view of the camera as shown in the respective states of the user. In each of the two displayed states, the boundaries of the displayed states (e.g., the borders of 1017A and 1017B) represent the boundaries of a displayed region that includes the virtual avatar.

In 1007A, the electronic device detects the user's head 1028 and, optionally, the user's neck 1025 shifted (e.g., translated) in a leftward direction in the field of view of the camera (e.g., camera 143, optical sensor 164). In other words, the user's head 1028 and neck 1025 are shifted to the user's right direction (e.g., shifted to the left with respect to the field of view of the camera). In response to detecting the shifted position in 1007A of the user's head 1028 and, optionally, the user's neck 1025, the electronic device shifts the horizontal position of the entire poo avatar (including both the upper portion 1034 and lower portion 1036) so that the poo avatar is displayed in a rightward-shifted position, as shown in 1017A, so as to mirror the shift of the user's head to the user's right direction.

A similar effect is illustrated in 1007B and 1017B. In 1007B the electronic device detects the user's head 1028 and, optionally, the user's neck 1025 shifted (e.g., translated) in a rightward direction in the field of view of the camera (e.g., camera 143, optical sensor 164). In other words, the user's head 1028 and neck 1025 are shifted to the user's left direction (e.g., shifted to the right with respect to the field of view of the camera). In response to detecting the shifted position in 1007B of the user's head 1028 and, optionally, the user's neck 1025, the electronic device shifts the horizontal position of the entire poo avatar (including both the upper portion 1034 and lower portion 1036) so that the poo avatar is displayed in a leftward-shifted position, as shown in 1017B, so as to mirror the shift of the user's head to the user's left direction.

Figure 10H:
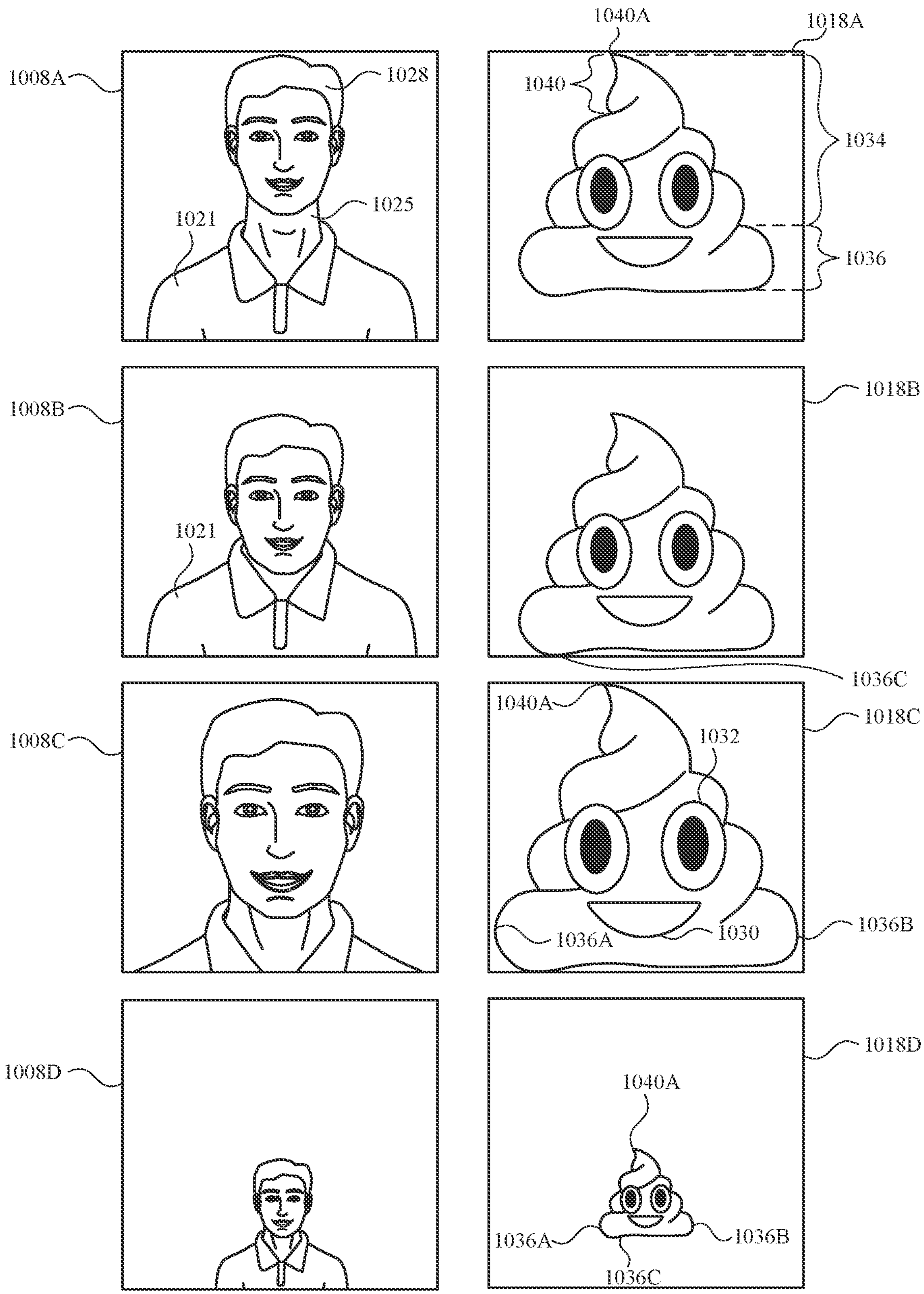

FIG. 10H illustrates an exemplary embodiment of the electronic device modifying the poo avatar in response to detecting changes in the position of the user's physical features within the field of view of the camera (e.g., camera 143, optical sensor 164). The modifications to the poo avatar include increasing or decreasing the size of the poo avatar, and shifting (e.g., translating) the poo avatar in a direction corresponding to the shift in the position of the user's physical features within the field of view of the camera. The poo avatar is shown having four displayed states in four display regions (1018A, 1018B, 1018C, and 1018D), with each of the four displayed states of the poo avatar corresponding, respectively, to four detected states of the user (1008A, 1008B, 1008C, and 1008D). In each displayed state in FIG. 10H, the electronic device positions or modifies the poo avatar in response to detecting a position, or change in position, of the user's physical features detected within the field of view of the camera as shown in the respective states of the user. In each of the four displayed states, the boundaries of the displayed states (e.g., the borders of 1018A, 1018B, 1018C, and 1018D) represent the boundaries of a displayed region that includes the virtual avatar.

In 1008A, the electronic device detects the user's head 1028 shifted (e.g., translated) in an upward direction relative to their shoulders 1021 (e.g., the user is stretching their neck 1025 upward) in the field of view of the camera (e.g., camera 143, optical sensor 164). In response to detecting the upward-shifted position of the user's head 1028 in 1008A, the electronic device shifts the vertical position of the entire poo avatar (including both the upper portion 1034 and lower portion 1036) so that the entire poo avatar is displayed in an upward-shifted position with the uppermost edge of the poo avatar (e.g., the edge 1040A of the tip 1040) positioned near the upper border of the display region shown in 1018A, so as to mirror the shift of the user's head 1028 in the upward direction shown in 1008A.

In 1008B, the electronic device detects the user's head 1028 shifted (e.g., translated) in a downward direction relative to the user's shoulders 1021 (e.g., the user is ducking their head 1028) in the field of view of the camera (e.g., camera 143, optical sensor 164). In response to detecting the downward-shifted position of the user's head 1028 in 1008B, the electronic device shifts the vertical position of the entire poo avatar (including both the upper portion 1034 and lower portion 1036) so that the entire poo avatar is displayed in a downward-shifted position with the lowermost edge of the poo avatar (e.g., the edge 1036C of the lower portion 1036) positioned near the lower border of the display region shown in 1018B, so as to mirror the shift of the user's head 1028 in the downward direction shown in 1008B.

In 1008C, the electronic device detects an increase in the size of the user's head 1028 within the field of view of the camera (e.g., camera 143, optical sensor 164), for example, when the user's head 1028 is positioned closer to the camera. In response to detecting the increased size of the user's head 1028 in 1008C, the electronic device increases the size of the entire poo avatar. In some embodiments, the electronic device increases the size of the poo avatar in accordance with the detected change in size of the user's head 1028 from one detected state (e.g., the neutral state in 1001A of FIG. 10A) to another (e.g., the detected state 1008C). In 1018C, the electronic device increases the size of the poo avatar to fill the display region without extending a portion of the poo avatar beyond the borders of the display region. In some embodiments, the electronic device increases the size of the virtual avatar to give the impression the avatar is located extremely close to the display (e.g., touch screen 112, display 340, display 450, display 504) of the electronic device.

For example, the electronic device increases the size of the poo avatar in 1018C such that the tip 1040 of the poo avatar is adjacent the upper border of the display region at 1040A, the lower portion 1036 of the poo avatar is adjacent the lower border of the display region at 1036C, the left edge of the lower portion 1036 is near the left border of the display region at 1036A, and the right edge of the lower portion 1036 is near the right border of the display region at 1036B. In some embodiments, such as that shown in 1018C, the electronic device increases the size of the poo avatar proportionally so that the relative position of the various avatar features (e.g., the avatar's eyes 1032, mouth 1030, upper portion 1034, and lower portion 1036) are not distorted with respect to the shape of the poo avatar. For example, when the electronic device increases the size of the poo avatar in 1018C, the avatar eyes 1032, mouth 1030, upper portion 1034 (including the tip 1040), and the lower portion 1036 also increase in size, but otherwise remain unchanged.

In 1008D, the electronic device detects a decrease in the size of the user's head 1028 within the field of view of the camera (e.g., camera 143, optical sensor 164), for example, when the user's head 1028 is positioned farther from the camera. In response to detecting the decreased size of the user's head 1028 in 1008D, the electronic device decreases the size of the entire poo avatar. In some embodiments, the electronic device decreases the size of the poo avatar in accordance with the detected change in size of the user's head 1028 from one detected state (e.g., the neutral state in 1001A of FIG. 10A) to another (e.g., the detected state 1008D). In some embodiments, such as in 1018D, the electronic device decreases the size of the poo avatar to give the impression that the virtual avatar is positioned distant from the display (e.g., touch screen 112, display 340, display 450, display 504) of the electronic device.

For example, the electronic device decreases the size of the poo avatar in 1018D such that the tip 1040 of the poo avatar is located away from the upper border of the display region at 1040A, the lower portion 1036 of the poo avatar is located away from the lower border of the display region at 1036C, the left edge of the lower portion 1036 is located away from the left border of the display region at 1036A, and the right edge of the lower portion 1036 is located away from the right border of the display region at 1036B. In some embodiments, such as that shown in 1018D, the electronic device decreases the size of the poo avatar proportionally so that the relative position of the various avatar features (e.g., the avatar's eyes 1032, mouth 1030, upper portion 1034, and lower portion 1036) are not distorted with respect to the shape of the poo avatar. For example, when the electronic device decreases the size of the poo avatar in 1018D, the avatar eyes 1032, mouth 1030, upper portion 1034 (including the tip 1040), and the lower portion 1036 also decrease in size, but otherwise remain unchanged.

Figure 10I:
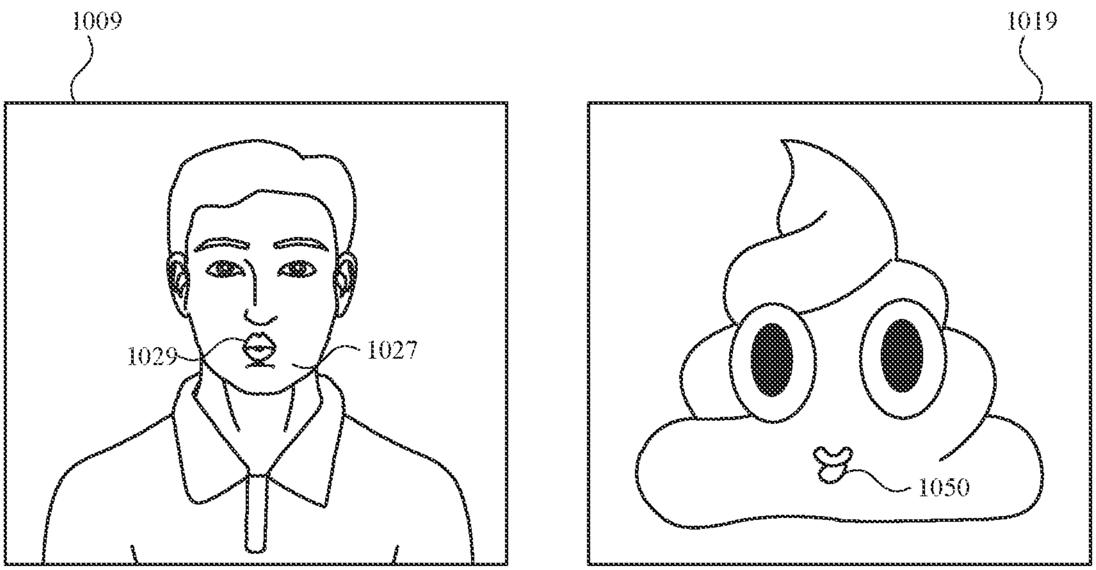

FIG. 10I illustrates an exemplary embodiment illustrating the electronic device modifying the poo avatar 1000 in response to detecting changes in a user's physical features, such as facial features. The poo avatar is shown having one displayed state 1019 corresponding to a user's detected state 1009. As illustrated in 1009 and 1019, the electronic device detects the user making a puckering expression and, in response, modifies the poo avatar 1000 by replacing the poo avatar's mouth 1030 with a set of puckered lips 1050. In some embodiments, such as that shown in 1009, the electronic device determines the user is making a puckering facial expression by detecting the user's jaw 1027 in a closed position and detecting the corners 1020A and 1020B of the user's mouth 1020 moving towards each other to cause the user's lips 1029 (e.g., both the user's upper lip 1029A and lower lip 1029B) to extend outward from the user's mouth 1020 in a puckered pose. Although it is not illustrated in FIG. 10I, in some embodiments, the electronic device modifies the poo avatar to emit hearts from the puckered lips 1050 in a manner similar to that illustrated in FIG. 16B and discussed in greater detail below.

Figure 11A:
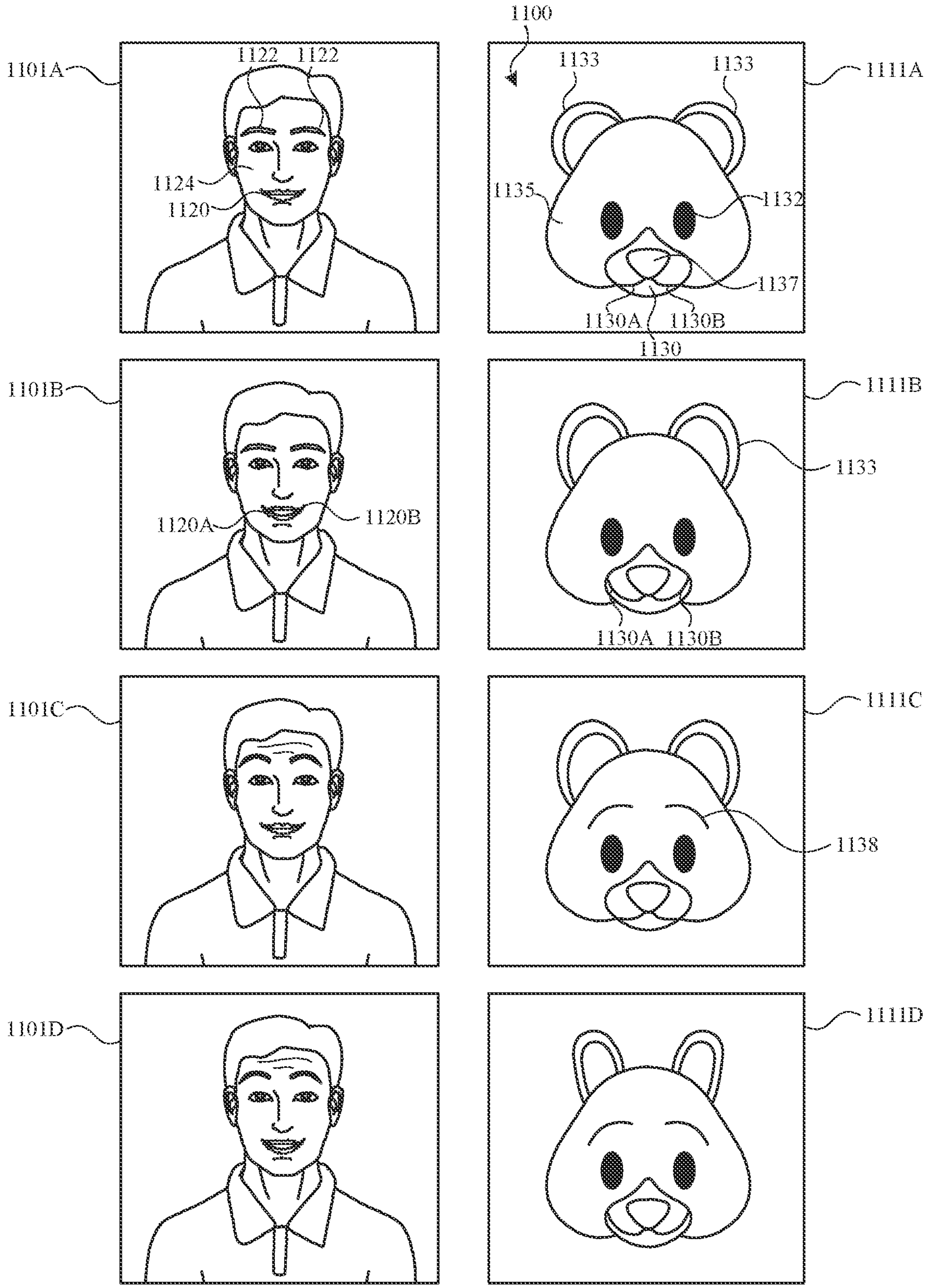
FIGS. 11A-11C illustrate exemplary user interfaces for generating and modifying a bear virtual avatar.

FIG. 11A illustrates an exemplary embodiment illustrating the electronic device modifying a bear avatar 1100 in response to detecting changes in a user's facial features. The bear avatar is shown having four displayed states (1111A, 1111B, 1111C, and 1111D), with each of the four displayed states of the bear avatar corresponding, respectively, to four detected states of the user (1101A, 1101B, 1101C, and 1101D). In each displayed state in FIG. 11A, the electronic device positions or modifies features of the bear avatar in response to detecting a position, or change in position, of one or more of the physical features, such as facial features, of the user detected in the respective states of the user. In the embodiment shown in FIG. 11A, the detected facial features of the user include the user's mouth 1120 (having corners 1120A and 1120B) and the user's eyebrows 1122. In some embodiments, tracked physical features may include other facial features such as eyelids, irises, muscles, muscle groups, and so forth. In the embodiment of FIG. 11A, the features of the bear avatar include an avatar mouth 1130, avatar eyes 1132, avatar ears 1133, an avatar nose 1137, an avatar head 1135, and (in certain states) avatar eyebrows 1138.

As illustrated in 1101A, the electronic device detects a neutral facial expression of the user. For example, the device detects that the user's mouth 1120 and eyebrows 1122 are positioned in a relaxed, neutral state, and not in a position that is associated with a particular facial expression, such as a smile or frown. In response to detecting the neutral facial expression of the user, the electronic device displays the bear avatar 1100 having a neutral expression or state in 1111A. Specifically, the electronic device displays the bear avatar having an avatar mouth 1130 that is in a relaxed, neutral state, and not in a position that is typically associated with a particular facial expression (e.g., a smile or frown). In some embodiments, the neutral position of the avatar corresponds to other representations of a related image, such as a static bear emoji that may be found in messaging applications. In 1111A the neutral state of the bear's mouth 1130 is indicated by lines 1130A and 1130B extending horizontally from the outsides of the bear's mouth 1130 or "snout" region and then curving up slightly at the base of the bear's nose 1137. The electronic device also displays the bear avatar with a nose 1137 that rests above the relaxed mouth 1130, and ears 1133 that are in a relaxed, neutral state positioned along the side of the bear's head 1135, and not curled or stretched. In addition, the electronic device displays the bear avatar without eyebrows 1138 and displays the avatar eyes 1132 looking in a direction perpendicular to the display (or a plane of focus of the camera (e.g., camera 143, optical sensor 164)).

As illustrated in 1101B and 1111B, the electronic device detects a position of the user's mouth 1120 (e.g., detecting one or both of the corners 1120A and 1120B of the user's mouth positioned in an upward pose (e.g., an upward position) to form a smiling facial expression) and, in response, modifies two features of the bear avatar. For example, in response to detecting one or both of the corners 1120A and 1120B of the user's mouth 1120 positioned in the upward pose, the electronic device modifies both the bear's ears 1133 and the bear's mouth 1130. The electronic device modifies the bear's mouth 1130 to have a smiling expression by turning up lines 1130A and 1130B, which indicates the smiling expression of the bear's mouth 1130, as shown in 1111B. The electronic device modifies the bear's ears 1133 to "perk up" or extend in an upward direction. In some embodiments, such as that shown in 1111B, the modification to the bear's ears 1133 also includes slightly narrowing the width of each ear 1133 and changing a vertical position of the ears 1133 on the side of the bear's head 1135 so that the ears 1133 are positioned higher on the bear's head 1135 when the ears are perked up (when compared to the vertical position of the ears 1133 on the side of the bear's head 1135 when in the neutral state in 1111A). As shown in 1111B, the eyes 1132 and nose 1137 remain unchanged with respect to their original positions in 1111A. It should be understood that, in this embodiment, the electronic device changes the bear's mouth 1130 to a smile and perks up the ears 1133 when the user smiles. The electronic device returns the mouth 1130 and ears 1133 to their neutral positions when the user is no longer smiling.

As illustrated in 1101C, the electronic device detects the user's eyebrows 1122 are in a raised position (e.g., positioned higher on the user's face when compared to the position of the eyebrows 1122 when in the relaxed, neutral state shown in 1101A and 1101B). In response to detecting the raised eyebrows 1122, the electronic device modifies two features of the bear avatar. For example, the electronic device modifies the bear's ears 1133 to perk up, and modifies the bear avatar to introduce eyebrows 1138 positioned above the bear's eyes 1132 to convey the impression that the bear avatar 1100 is raising its eyebrows 1138, as shown in 1111C. As shown in 1111B, the bear's mouth 1130 is returned to its neutral position, and the eyes 1132 and nose 1137 remain unchanged with respect to their original positions in 1111A. It should be understood that, in this embodiment, the electronic device introduces the avatar's eyebrows 1138 and perks up the ears 1133 when the user's eyebrows 1122 are raised. Thus, the electronic device removes the avatar eyebrows 1138 and relaxes the ears 1133 when the user's eyebrows 1122 return to their neutral position.

In 1101D, the electronic device detects the user's eyebrows 1122 are raised and the one or both of the corners 1120A and 1120B of the user's mouth 1120 positioned in the upward pose. In response, the electronic device modifies the bear avatar 1100 to perform an extreme ear perk, introduce raised eyebrows 1138, and smile, as shown in 1111D. The electronic device modifies the ears 1133 to perform an extreme ear perk by substantially narrowing the width of each ear 1133, extending the ears in an upward direction, and changing the vertical position of the ears 1133 on the side of the bear's head 1135 so that the ears 1133 are positioned even higher on the bear's head 1135 than they were when in the perked position shown in 1111B and 1111C. This combination of modifications to the bear's ears 1133 gives the appearance of the ears 1133 being extremely stretched in the upward direction, to a greater extent than the ear perk shown in 1111B and 1111C. It should be understood that, in this embodiment, the electronic device introduces the avatar's eyebrows 1138, modifies the bear's mouth 1130 into a smile, and extremely perks up the ears 1133 when the user raises their eyebrows 1122 and smiles (e.g., positions one or both of the corners 1120A and 1120B of the user's mouth 1120 in the upward pose). Thus, the electronic device removes the avatar eyebrows 1138 and relaxes the ears 1133 and mouth 1130 when the user's eyebrows 1122 and mouth 1120 return to their neutral positions.

Figure 11B:
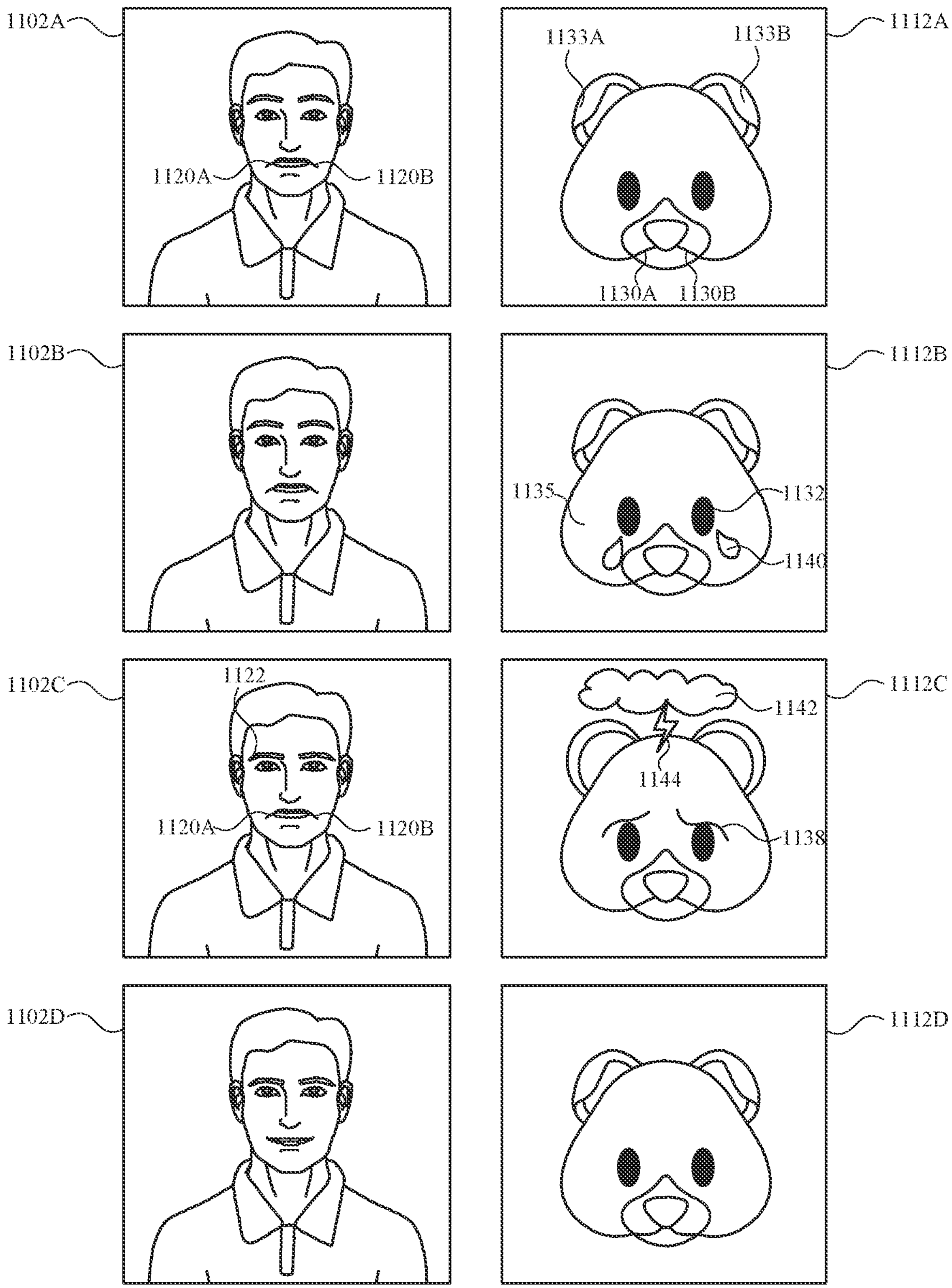

FIG. 11B illustrates an exemplary embodiment illustrating the electronic device modifying the bear avatar 1100 in response to detecting changes in the user's facial features. The bear avatar is shown having four displayed states (1112A, 1112B, 1112C, and 1112D), with each of the four displayed states of the bear avatar corresponding, respectively, to four detected states of the user (1102A, 1102B, 1102C, and 1102D). In each displayed state in FIG. 11B, the electronic device positions or modifies features of the bear avatar in response to detecting a position, or change in position, of one or more of the physical features, such as facial features, of the user detected in the respective states of the user. In each of the four displayed states, the boundaries of the displayed states (e.g., the borders of 1112A, 1112B, 1112C, and 1112D) represent the boundaries of a displayed region that includes the virtual avatar.

In the embodiment shown in FIG. 11B, the detected facial features of the user include the user's mouth 1120 (having corners 1120A and 1120B) and the user's eyebrows 1122. In some embodiments, tracked physical features may include other facial features such as eyelids, irises, muscles, muscle groups, and so forth. In the embodiment of FIG. 11B, the features of the bear avatar include an avatar mouth 1130, avatar eyes 1132, avatar ears 1133, an avatar nose 1137, an avatar head 1135, and (in certain states) avatar eyebrows 1138.

As illustrated in 1102A, the electronic device detects one or both of the corners 1120A and 1120B of the user's mouth 1120 positioned in a downward pose (e.g., a downward position) and, in response, modifies two features of the bear avatar. In some embodiments, the electronic device determines the user is making a sad facial expression by detecting one or both of the corners 1120A and 1120B of the user's mouth in the downward position and, optionally, detecting one or both of the user's eyebrows 1122 are not in a lowered position (e.g., the eyebrows 1122 are either raised or in their neutral position). In response to detecting the downward pose or position of the corners 1120A and 1120B of the user's mouth 1120, the electronic device modifies both the bear's mouth 1130 and the bear's ears 1133, as shown in 1112A.

The electronic device modifies the bear's mouth 1130 to have a sad expression by turning down lines 1130A and 1130B, which forms the sad expression of the bear's mouth 1130, as shown in 1112A. The electronic device modifies the bear's ears 1133 to "curl" or "wilt" in a downward direction by turning down (e.g., folding, rotating, or tilting) the outer edges 1133A and 1133B of the bear's ears 1133. In some embodiments, curling the bear's ears 1133 also includes changing a vertical position of the ears 1133 on the side of the bear's head 1135 so that the ears 1133 are positioned lower on the bear's head 1135 when the ears are curled (when compared to the vertical position of the ears 1133 on the side of the bear's head 1135 when in the neutral state in 1111A of FIG. 11A). As shown in 1112A, the bear's eyes 1132 and nose 1137 remain unchanged with respect to their original positions in 1111A. It should be understood that, in this embodiment, the electronic device changes the bear's mouth 1130 to a sad expression and curls the bear's ears 1133 when the user's mouth 1120 forms the sad facial expression. The electronic device returns the bear's mouth 1130 and ears 1133 to their neutral positions when the user is no longer making the sad facial expression.

In 1102B and 1112B, the electronic device detects the user holding the sad facial expression for a threshold amount of time and, in response, modifies the bear avatar 1100 by introducing tears 1140 emitted from the bear's eyes 1132 to show the bear avatar crying while making a sad face with curled ears 1133. In some embodiments, the electronic device modifies the bear avatar to introduce only a single tear 1140 emitted from one or both of the bear's eyes 1132 when the user holds the sad expression for a first threshold amount of time (e.g., 0.3 seconds), and then modifies the bear avatar to introduce additional tears 1140 emitted from the eyes 1132 after the user continues to hold the sad expression to reach a second threshold amount of time (e.g., 0.6 seconds). The electronic device displays the tears 1140 forming from the bear's eyes 1132, streaming down the bear's face, falling from the bear's head 1135, and disappearing from view at the bottom edge of the display region in 1112B. In some embodiments, the electronic device displays the tears 1140 intermittently and, optionally, in random intervals. In some embodiments, the tears 1140 continue until the user stops making the sad facial expression. As shown in 1112B, the electronic device continues to display the bear's ears 1133 curled, and the bear's mouth 1130 in a sad expression.

In 1102C and 1112C, the electronic device detects the user holding a frowning facial expression for a threshold amount of time and, in response, modifies the bear avatar 1100 to have a frowning expression and storm clouds 1142 positioned above the bear's head 1135. The electronic device detects the user's frowning expression by detecting one or both of the corners 1120A and 1120B of the user's mouth 1120 positioned in a downward pose and detecting the user's eyebrows 1122 in a downward position (e.g., furrowed or positioned lower on the user's face when compared to the position of the eyebrows 1122 when in the relaxed, neutral state in 1101A). In response to detecting the user's frowning facial expression, the electronic device modifies the bear avatar by turning down the bear's mouth 1130 (e.g., by curving lines 1130A and 1130B downward as shown in 1112C) and introducing the bear's eyebrows 1138 in a furrowed state to form a frowning brow pose as shown in 1112C. In the embodiment illustrated in 1112B, the electronic device does not immediately introduce the storm clouds 1142 in response to detecting the user's frowning facial expression, nor does the electronic device modify the bear's ears 1133 or nose 11311.

After the electronic device detects the user holding the frowning facial expression for the threshold amount of time, the electronic device modifies the frowning bear avatar 1100 to introduce the storm cloud(s) 1142 positioned above the bear's head 1135. In some embodiments, the storm clouds 1142 are animated and dynamic. For example, the electronic device can modify the storm clouds 1142 to introduce lightning 1144 and/or rain. In some embodiments, electronic device displays the rain falling from the storm clouds 1142 and landing on the bear avatar's head 1135. In some embodiments, the falling rain runs down the bear's face, falls from its head 1135, and disappears from view at the bottom edge of the display region in 1112C. In some embodiments, the electronic device displays the lightning 1144 and rain intermittently and, optionally, in random intervals. In some embodiments, the electronic device continues to display the storm clouds 1142 until the user stops making the frowning facial expression. When the user stops making the frowning facial expression, the electronic device modifies the bear avatar 1100 such that the storm clouds 1142 disappear, the frowning eyebrows 1138 disappear, and the mouth 1130 returns to the neutral position shown in 1111A. In some embodiments, the electronic device displays the storm clouds 1142 without lightning 1144 or rain when the user holds the frowning facial expression for a first threshold amount of time (e.g., 0.3 seconds), and then modifies the storm clouds 1142 to produce the lightning 1144 and rain after the user continues to hold the frowning facial expression to reach a second threshold amount of time (e.g., 0.6 seconds).

As illustrated in 1102D and 1112D, the electronic device detects the user lowering one or both of their eyebrows 1122 and, in response, modifies the bear's ears 1133 to curl. In this embodiment, the electronic device curls the bear avatar's ears 1133 in response to detecting the user lowering their eyebrows 1122. As the user returns their eyebrows 1122 to their neutral position, the electronic device uncurls the bear's ears 1133. In the embodiment illustrated in 1102D and 1112D, the electronic device foregoes modifying other features of the bear avatar 1100. Therefore, the electronic device maintains the neutral positions of the bear's eyes 1132, mouth 1130, and nose 1137, and does not introduce eyebrows 1138 or other objects (e.g., tears 1140 or storm clouds 1142).

Figure 11C:
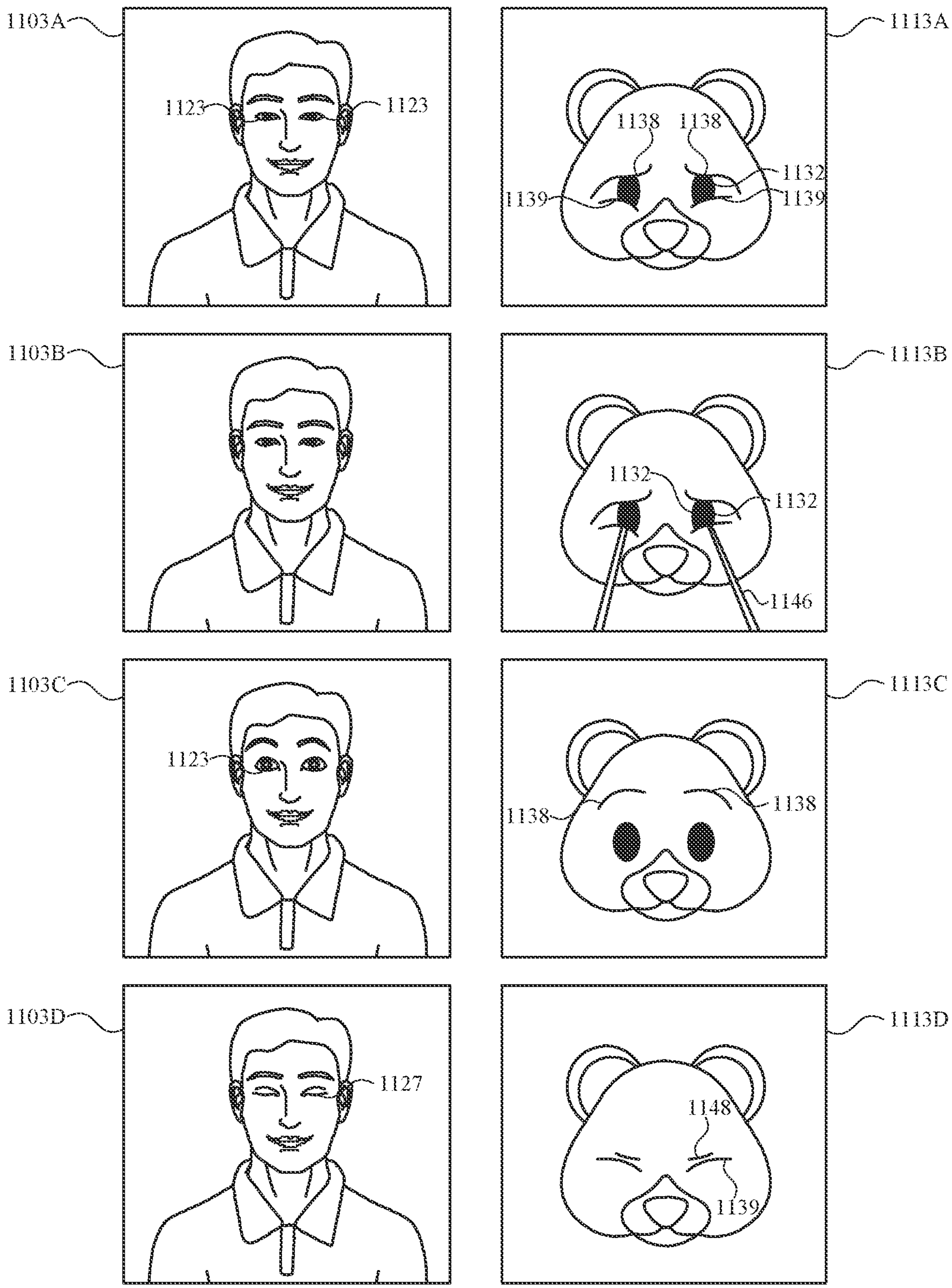

FIG. 11C illustrates an exemplary embodiment illustrating the electronic device modifying the bear avatar 1100 in response to detecting changes in the user's facial features. The bear avatar is shown having four displayed states (1113A, 1113B, 1113C, and 1113D), with each of the four displayed states of the bear avatar corresponding, respectively, to four detected states of the user (1103A, 1103B, 1103C, and 1103D). In each displayed state in FIG. 11C, the electronic device positions or modifies features of the bear avatar in response to detecting a position, or change in position, of one or more of the physical features, such as facial features, of the user detected in the respective states of the user. In each of the four displayed states, the boundaries of the displayed states (e.g., the borders of 1113A, 1113B, 1113C, and 1113D) represent the boundaries of a displayed region that includes the virtual avatar.

As illustrated in 1103A and 1113A, the electronic device detects the user squinting their eyes 1123 (e.g., narrowing their eyes 1123 or glowering) and, in response, modifies the bear avatar 1100 to squint its eyes 1132 by introducing avatar facial structures around the bear's eyes 1132. In some embodiments, the electronic device detects the user squinting by detecting a decrease in the size of the user's eyes 1123 (e.g., with respect to the neutral position of the user's eyes 1123) and/or wrinkles forming at the outside corners of the user's eyes 1123. In response, the electronic device modifies the bear avatar to show the bear squinting its eyes 1132 by introducing cheekbones 1139 appearing in an arched position under the bear's eyes 1132 and introducing eyebrows 1138 appearing in a lowered position (similar to the frowning brow pose shown in 1112C) above the bear's eyes 1132. The electronic device displays the cheekbones 1139 arching to eclipse a lower portion of the bear's eyes 1132 and form the bottom portion of the bear's squint, and displays the eyebrows 1138 curving downward to eclipse an upper portion of the bear's eyes 1132 and form the top portion of the bear's squint. As the user returns their eyes 1123 to their neutral position, the electronic device removes the bear's eyebrows 1138 and cheekbones 1139 to return the bear avatar 1100 to its neutral pose (shown in 1111A). In some embodiments, the electronic device removes the bear's eyebrows 1138 by animating the eyebrows 1138 moving upward from the bear's eyes 1132 and disappearing into the bear avatar's face. In some embodiments, the electronic device removes the bear's cheekbones 1139 by animating the cheekbones 1139 lowering and straightening out to remove the arch, and disappearing into the bear avatar's face. In the embodiment illustrated in 1103A and 1113A, the electronic device foregoes modifying other features of the bear avatar 1100. Therefore, the electronic device maintains the neutral positions of the bear's mouth 1130 and nose 1137.

As illustrated in 1103B and 1113B, the electronic device detects the user holding the squinting facial expression for a threshold amount of time and, in response, modifies the bear avatar 1100 by introducing laser beams 1146 shooting from the bear's eyes 1132 while the bear retains the squinting expression discussed above with respect to 1113A. The electronic device displays the laser beams 1146 forming from the bottom of the bear's eyes 1132, shooting in a downward direction, and disappearing from view at the bottom edge of the display region in 1113B. In some embodiments, the electronic device displays the laser beams 1146 as a continuous beam. In some embodiments, the electronic device displays the laser beams 1146 as intermittent bursts and, optionally, emitted in random intervals. In some embodiments, the electronic device continues to display the laser beams 1146 until the user stops squinting. In some embodiments, the electronic device displays a single burst of a laser beam 1146 shooting from each eye 1132 when the user holds the squinting expression for a first threshold amount of time (e.g., 0.3 seconds), and displays a continuous laser beam 1146 (or repeated bursts of laser beams 1146) shooting from each eye 1132 after the user continues to hold the squinting expression to reach a second threshold amount of time (e.g., 0.6 seconds).

As illustrated in 1103C and 1113C, the electronic device detects the user widening their eyes 1123 and, in response, modifies the bear avatar 1100 to show widened eyes 1132 by introducing avatar facial structures around the bear's eyes 1132. In the embodiment illustrated in 1103C and 1113C, the electronic device detects the user widening their eyes by detecting an increase in the size of the user's eyes 1123 (e.g., with respect to the neutral position of the user's eyes 1123). In some embodiments, detecting the widened eyes includes, optionally, the electronic device detecting a raised position of the user's eyebrows 1122. In response to detecting the widened user eyes 1123, the electronic device modifies the bear avatar to show the bear widening its eyes 1132 by introducing eyebrows 1138 in a raised position above the bear's eyes 1132. As the user returns their eyes 1123 to their neutral position, the electronic device removes the bear's eyebrows 1138 to return the bear avatar 1100 to its neutral pose (shown in 1111A). In some embodiments, the electronic device removes the bear's eyebrows 1138 by animating the eyebrows 1138 moving downward towards the bear's eyes 1132 and disappearing into the bear avatar's face above the bear's eyes 1132. In the embodiment illustrated in 1103C and 1113C, the electronic device foregoes modifying other features of the bear avatar 1100. Therefore, the electronic device maintains the neutral positions of the bear's ears 1133, mouth 1130, eyes 1132, and nose 1137.

As illustrated in 1103D and 1113D, the electronic device detects the user closing their eyes 1123 and, in response, modifies the bear avatar 1100 to close its eyes 1132 by introducing avatar facial structures (e.g., features) around the bear's eyes 1132. In some embodiments, the electronic device detects the user closing their eyes by detecting the user's eyelids 1127 completely covering the user's eyes 1123. In response, the electronic device modifies the bear avatar to show the bear closing its eyes 1132 by introducing cheekbones 1139 appearing in a raised, slightly arched position under the bear's eyes 1132 and introducing eyelids 1148 appearing above the bear's eyes 1132 and moving in a downward direction to cover the bear's eyes 1132 as shown in 1113D. As the user raises their eyelids 1127 to their neutral position, the electronic device removes the bear's eyelids 1148 and cheekbones 1139 to return the bear avatar 1100 to its neutral pose (shown in 1111A). In some embodiments, the electronic device removes the bear's eyelids 1148 by animating the eyelids 1148 moving upward to reveal the bear's eyes 1132 and disappearing into the bear avatar's face above the bear's eyes 1132. In some embodiments, the electronic device removes the bear's cheekbones 1139 by animating the cheekbones 1139 lowering and straightening out to remove the slight arch, and disappearing into the bear avatar's face. In the embodiment illustrated in 1103D and 1113D, the electronic device foregoes modifying other features of the bear avatar 1100. Therefore, the electronic device maintains the neutral positions of the bear's mouth 1130, ears 1133, and nose 1137.

Figure 12A:
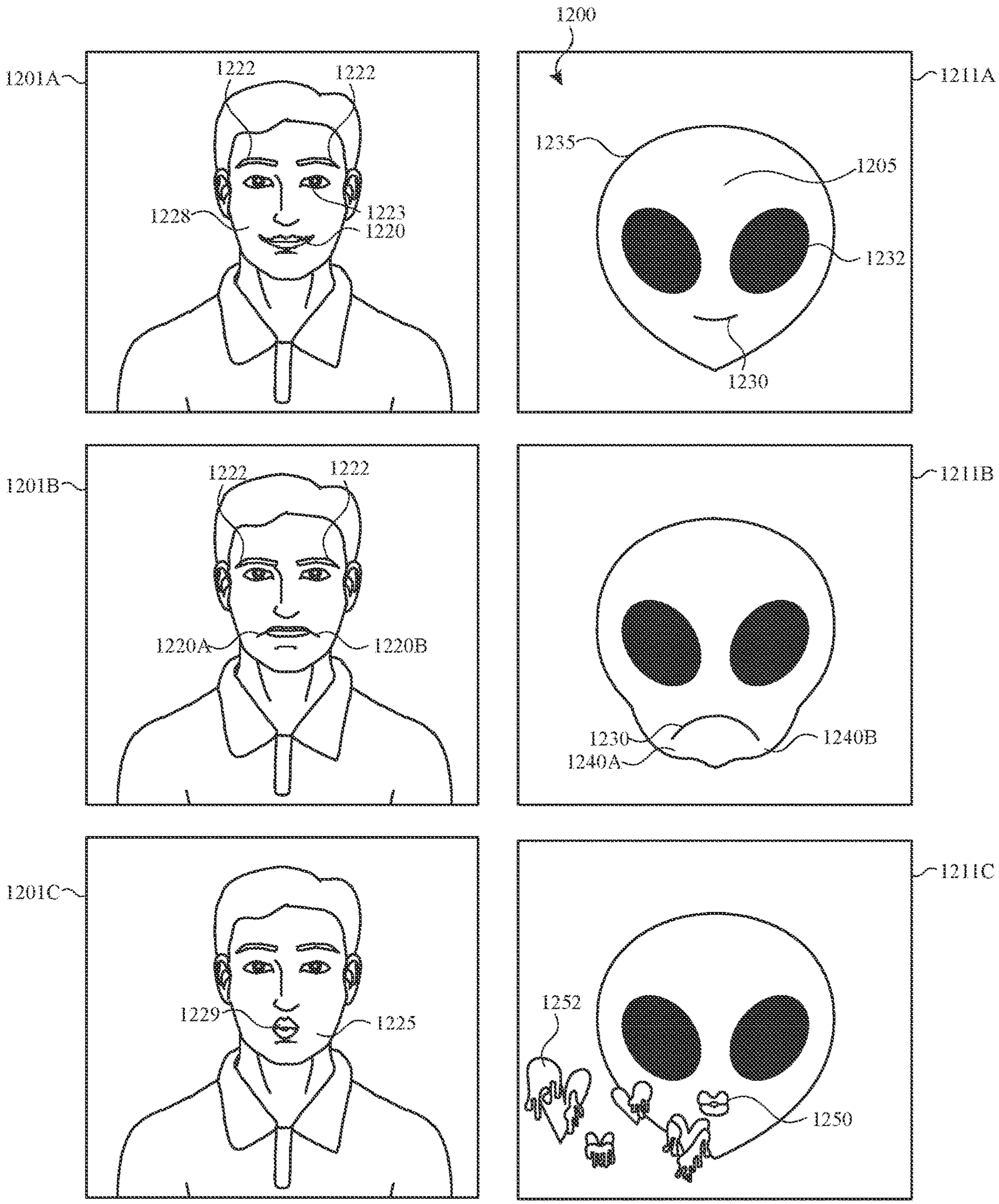
FIGS. 12A-12C illustrate exemplary user interfaces for generating and modifying an alien virtual avatar.

FIG. 12A illustrates an exemplary embodiment illustrating the electronic device modifying an alien avatar 1200 in response to detecting changes in a user's facial features. The alien avatar is shown having three displayed states (1211A, 1211B, and 1211C), with each of the three displayed states of the alien avatar corresponding, respectively, to three detected states of the user (1201A, 1201B, and 1201C). In each displayed state in FIG. 12A, the electronic device positions or modifies features of the alien avatar in response to detecting a position, or change in position, of one or more of the physical features, such as facial features, of the user detected in the respective states of the user. In each of the three displayed states, the boundaries of the displayed states (e.g., the borders of 1211A, 1211B, and 1211C) represent the boundaries of a displayed region that includes the virtual avatar.

As illustrated in 1201A and 1211A, the electronic device detects the neutral facial expression of the user (e.g., the user's eyes 1223 are open, eyebrows 1222 are in a relaxed position above the user's eyes 1223, the user's cheeks 1228 are relaxed and not expanded, and the user's mouth 1220 is in a relaxed, neutral state, and not a position associated with a particular facial expression) and, in response, displays the alien avatar 1200 having a neutral expression or state in 1211A. For example, the electronic device displays the alien avatar 1200 having a large, angular head 1235 that is wide at the top and narrows to a pointed bottom (e.g., chin), with a mouth 1230 that is in a relaxed, neutral state, and not in a position that is typically associated with a particular facial expression such as smiling or frowning. In addition, the electronic device displays the alien avatar having a face 1205 with large, oval-shaped eyes 1232 that are angled to match the angular structure of the alien's head 1235. The electronic device displays the alien eyes 1232 looking in a direction perpendicular to the display (or a plane of focus of the camera (e.g., camera 143, optical sensor 164)). The electronic device also displays the alien's head 1235 and face 1205 without various features such as a nose, ears, or eyebrows. In some embodiments, the neutral position of the avatar corresponds to other representations of a related image, such as a static alien emoji that may be found in messaging applications.

As illustrated in 1201B and 1211B, the electronic device detects a frowning facial expression of the user by detecting one or both of the corners 1220A and 1220B of the user's mouth 1220 positioned in a downward pose and the user's eyebrows 1222 positioned in a downward pose (e.g., furrowed or positioned lower on the user's face when compared to the position of the eyebrows 1222 when in the relaxed, neutral state in 1201A). In response to detecting the user's frowning facial expression, the electronic device modifies the alien avatar to have a frowning, drooping face as shown in 1211B. For example, the electronic device modifies the alien 1200 so that the corners of the alien's mouth 1230 are turned down, and the alien's face 1205 is expanded at regions 1240A and 1240B, located near the corners of the alien's turned-down mouth 1230. In some embodiments, the electronic device modifies the alien to have the drooping face shown in 1211B by displaying an animation of the mouth 1230 turning down and the regions 1240A and 1240B expanding from the alien's face 1205 as the mouth 1230 is moving to the turned-down position. In some embodiments, the electronic device modifies the alien avatar to return to its neutral position when the user is no longer making the frowning facial expression. In some embodiments, the electronic device modifies the alien to return to the neutral expression in 1211A by displaying an animation of the mouth 1230 moving to the neutral position and the regions 1240A and 1240B retracting into the alien's face 1205 as the mouth 1230 moves to the neutral position.

As illustrated in 1201C and 1211C, the electronic device detects the user making a puckering expression and, in response, modifies the alien avatar 1200 by replacing the alien's mouth 1230 with a set of puckered lips 1250 that emit slimy hearts 1252. In some embodiments, such as that shown in 1201C, the electronic device determines the user is making a puckering expression by detecting the user's jaw 1225 in a closed position and detecting the corners 1220A and 1220B of the user's mouth 1220 moving towards each other to cause the user's lips 1229 (e.g., both the user's upper lip 1229A and lower lip 1229B) to extend outward from the user's mouth 1220 in a puckered pose. In response to detecting the user's puckering expression, the electronic device modifies the alien avatar 1200 by changing the alien's mouth 1230 into a set of puckered lips 1250. In some embodiments, the electronic device modifies the alien avatar 1200 by introducing one or more of the slimy hearts 1252 displayed emitting from the alien's puckered lips 1250. In some embodiments, the electronic device foregoes modifying any other features of the alien avatar 1200.

In some embodiments, the electronic device does not immediately introduce the slimy hearts 1252 in response to detecting the user's puckering expression. In such embodiments, the electronic device modifies the puckering alien avatar 1200 to introduce the slimy hearts 1252 emitting from the puckered lips 1250 only after the electronic device detects the user holding the puckering expression for a threshold amount of time. In some embodiments, the electronic device modifies the alien avatar to introduce only a single slimy heart 1252 emitted from the puckered lips 1250 when the user holds the puckering expression for a first threshold amount of time (e.g., 0.3 seconds), and then modifies the alien avatar to introduce additional slimy hearts 1252 emitted from the puckered lips 1250 after the user continues to hold the puckering expression to reach a second threshold amount of time (e.g., 0.6 seconds). In some embodiments, the slimy hearts 1252 are animated and dynamic. For example, in some embodiments, the electronic device displays the slimy hearts 1252 emitting from the puckered lips 1250 intermittently and, optionally, in random intervals. In some embodiments, the electronic device displays the slimy hearts 1252 having different sizes. In some embodiments, the electronic device displays the slimy hearts 1252 increasing in size as they move away from the puckered lips 1250. Additionally, the electronic device displays, in some embodiments, each slimy heart 1252 moving in a randomized trajectory and disappearing at a random location located within the display region of 1211C or, alternatively, disappearing from view as it exits the display region of 1211C. In some embodiments, the electronic device displays the slimy hearts 1252 emitting from the puckered lips 1250 in a direction that is based on the direction the user or avatar is facing. For example, if the electronic device detects the user's face, or the avatar, is turned to the left, the puckered lips 1250 emit the slimy hearts 1252 to the left, and if the electronic device detects the user's face, or the avatar, is turned to the right, the puckered lips 1250 emit the slimy hearts 1252 to the right. In some embodiments, the electronic device continues to display the slimy hearts 1252 emitting from the alien's puckered lips 1250 until the user stops making the puckering facial expression. In some embodiments, when the user stops making the puckering facial expression, the electronic device modifies the alien avatar 1200 such that the slimy hearts 1252 disappear and the puckered lips 1250 are replaced with the alien mouth 1230.

Figure 12B:
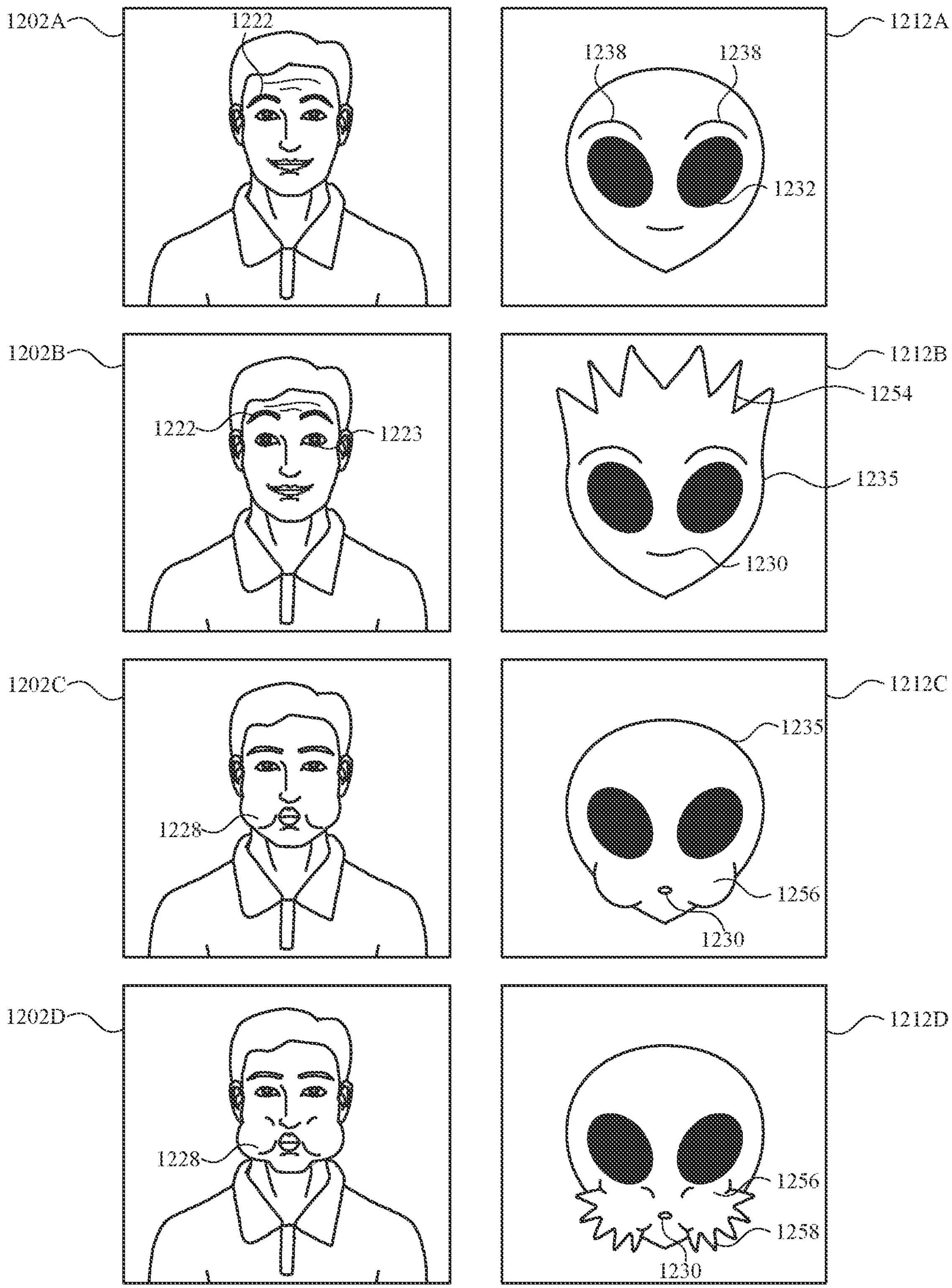

FIG. 12B illustrates an exemplary embodiment illustrating the electronic device modifying the alien avatar 1200 in response to detecting changes in the user's facial features. The alien avatar is shown having four displayed states (1212A, 1212B, 1212C, and 1212D), with each of the four displayed states of the alien avatar corresponding, respectively, to four detected states of the user (1202A, 1202B, 1202C, and 1202D). In each displayed state in FIG. 12B, the electronic device positions or modifies features of the alien avatar in response to detecting a position, or change in position, of one or more of the physical features, such as facial features, of the user detected in the respective states of the user.

As illustrated in 1202A and 1212A, the electronic device detects the user's eyebrows 1222 are in a slightly raised position (e.g., positioned slightly higher than the neutral position shown in 1201A) and adds eyebrows to the alien to show the alien raising its eyebrows in response to the user slightly raising their eyebrows 1222. For example, in response to detecting the slightly raised position of the user's eyebrows 1222, the electronic device modifies the alien avatar 1200 by introducing eyebrows 1238 positioned above the alien avatar's eyes 1232 in a raised position (e.g., to convey the impression that the alien avatar 1200 is raising its eyebrows 1238). In this embodiment, the electronic device introduces the alien's eyebrows 1238 when the user's eyebrows 1222 are slightly raised. Thus, the electronic device removes the alien's eyebrows 1238 when the user's eyebrows 1222 return to their neutral position. In some embodiments, the electronic device removes the alien eyebrows 1238 by animating the eyebrows 1238 moving downward towards the alien's eyes 1232 and disappearing into the alien's face 1205 above the alien's eyes 1232.

As illustrated in 1202B, the electronic device detects the user's eyebrows 1222 have moved from the slightly raised position in 1202A to an extremely raised position (e.g., positioned higher than the slightly raised position shown in 1202A). In some embodiments, detecting the user's extreme eyebrow raise optionally includes the electronic device also detecting the user widening their eyes 1223 in addition to raising their eyebrows 1222. In response to detecting the user's extreme eyebrow raise, the electronic device maintains the position of the eyebrows 1238 introduced in 1212A, and modifies the alien's head 1235 by introducing spikes 1254 at the top of the alien's head 1235, as shown in 1212B. In some embodiments, the electronic device introduces the spikes 1254 by animating the spikes 1254 rising from the top of the alien's head 1235 as the user is raising their eyebrows 1222 beyond the slightly raised position shown in 1202A. In some embodiments, as the user returns their eyebrows 1222 to their neutral position or the slightly raised position, the electronic device removes the spikes 1254 by animating the spikes 1254 retracting into the alien's head 1235. In the embodiment illustrated in 1202B and 1212B, the electronic device foregoes modifying other features of the alien avatar 1200. Therefore, the electronic device maintains the neutral positions of the alien's mouth 1230 and eyes 1232.

As illustrated in 1202C and 1212C, the electronic device detects the user's cheeks 1228 in a slightly puffed or expanded position (e.g., the user slightly fills their cheeks 1228 with air so that they slightly expand beyond the neutral position shown in 1201A) and adds cheeks to the alien to show the alien puffing its cheeks in response to the user slightly puffing their cheeks 1228. For example, in response to detecting the slightly puffed position of the user's cheeks 1228, the electronic device modifies the alien avatar 1200 by introducing avatar cheeks 1256 in a slightly expanded position (e.g., to convey the impression that the alien avatar 1200 is puffing its cheeks 1256). As shown in 1212C, the electronic device displays the alien's cheeks 1256 expanded beyond the narrow, lower portion of the alien's head 1235. In this embodiment, the electronic device introduces the alien's cheeks 1256 when the user's cheeks 1228 are slightly puffed. Thus, the electronic device removes the alien's cheeks 1256 when the user's cheeks 1228 return to their neutral position. In some embodiments, the electronic device removes the alien cheeks 1256 by animating the cheeks 1256 retracting back into the alien's face 1205 and disappearing into the alien's face 1205 below the alien's eyes 1232.

In some embodiments, such as that shown in 1212C, the electronic device also modifies the alien mouth 1230 in response to detecting the user's slightly puffed cheeks 1228. For example, as shown in 1212C, the electronic device modifies the alien's mouth 1230 from its neutral position shown in 1211A to a narrow, rounded shape that mimics the narrowing (and sometimes puckering) of the user's lips when the user puffs their cheeks 1228.

As illustrated in 1202D, the electronic device detects the user's cheeks 1228 have expanded from the slightly puffed position in 1202C to an extremely puffed position (e.g., expanded beyond the slightly puffed position shown in 1202C). In response to detecting the user's extreme cheek puff, the electronic device modifies the alien's puffed cheeks 1256 by introducing spikes 1258 protruding from the alien's cheeks 1256, as shown in 1212D. In some embodiments, the electronic device introduces the spikes 1258 by animating the spikes 1258 extending from the outer portions of the alien's puffed cheeks 1256 as the user is expanding their cheeks 1228 beyond the slightly puffed position shown in 1202C. In some embodiments, as the user returns their cheeks 1228 to their neutral position or the slightly puffed position, the electronic device removes the spikes 1258 by animating the spikes 1258 retracting into the alien's cheeks 1256. In the embodiment illustrated in 1202D and 1212D, the electronic device foregoes modifying other features of the alien avatar 1200. Therefore, the electronic device maintains the neutral position of the alien's eyes 1232 and the narrowed position of the alien's mouth 1230.

Figure 12C:
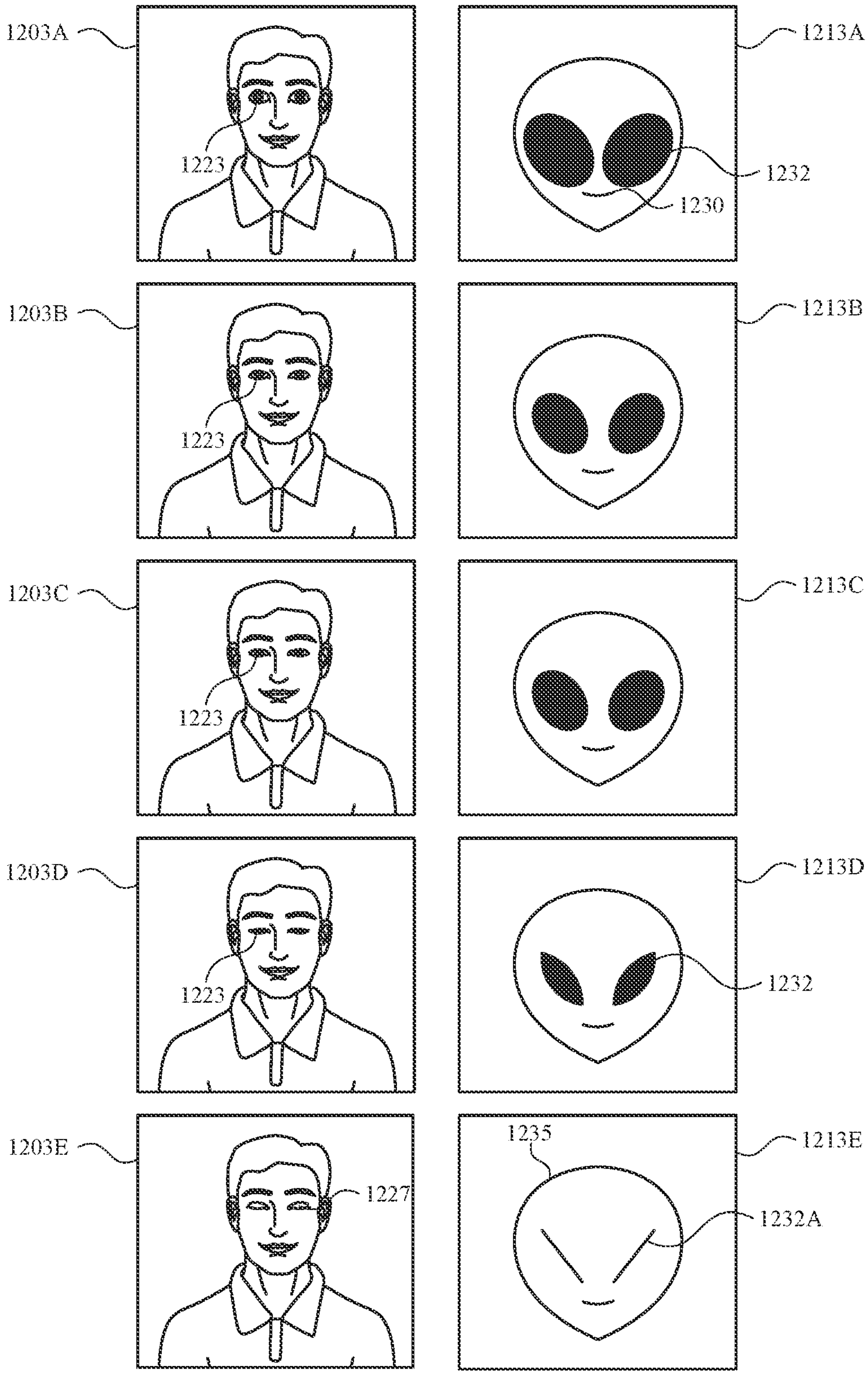

FIG. 12C illustrates an exemplary embodiment illustrating the electronic device modifying the alien avatar 1200 in response to detecting changes in the user's facial features. The alien avatar is shown having five displayed states (1213A, 1213B, 1213C, 1213D, and 1213E), with each of the five displayed states of the alien avatar corresponding, respectively, to five detected states of the user (1203A, 1203B, 1203C, 1203D, and 1203E). In each displayed state in FIG. 12C, the electronic device positions or modifies features of the alien avatar in response to detecting a position, or change in position, of one or more of the physical features, such as facial features, of the user detected in the respective states of the user.

In the embodiments illustrated in FIG. 12C, the electronic device decreases the size of the alien's eyes only when the user closes or narrows their eyes by at least a threshold amount (e.g., half way). Otherwise, the electronic device foregoes modifying the alien's eyes 1232 in response to the user closing their eyes 1223 in an amount less than the threshold amount. This allows the electronic device to display the alien without unintentionally closing or narrowing the alien's eyes 1232 in response to detecting a user whose eyes appear to be partially closed when they are, in fact, in their neutral, open position.

As illustrated in 1203A and 1213A, the electronic device detects the user widening their eyes 1223 and, in response, modifies the alien avatar 1200 to show widened eyes 1232 by increasing the size of the alien's eyes 1232. In the embodiment illustrated in 1203A and 1213A, the electronic device detects the user widening their eyes 1223 by detecting an increase in the size of the user's eyes 1223 (e.g., with respect to the neutral position of the user's eyes 1223). In some embodiments, detecting the widened eyes includes, optionally, the electronic device detecting a raised position of the user's eyebrows 1222. In response to detecting the widened user eyes 1223, the electronic device modifies the alien avatar to show the alien widening its eyes 1232 by increasing the area of the alien's eyes 1232 as shown in 1213A. As shown in 1203A and 1213A, the change in the alien's eyes 1232 are exaggerated with respect to the change in the user's eyes 1223 in that change in the avatar's eyes is a greater percentage (e.g., 30%) of a maximum range of modelled motion compared to the percentage change (e.g., 10% of a predicted or determined range of motion) in the user's eyes.

As shown in 1203B and 1213B, as the user returns their eyes 1223 from the widened position in 1203A to the neutral position in 1203B, the electronic device shrinks the alien's eyes 1232 from the enlarged state in 1213A to the neutral state in 1213B.

In 1203C, the electronic device detects the user narrowing or closing their eyes 1223, but not beyond the threshold amount for modifying the alien's eyes 1232. In response to determining the user's eyes 1223 are not closed beyond the threshold, the electronic device foregoes modifying the alien's eyes 1232, as shown in 1213C.

In 1203D, the electronic device detects the user closing their eyes 1223 in an amount beyond the threshold, but not in a completely closed position. In other words, the electronic device detects the user's eyes 1223 are slightly opened in 1203D. In response, the electronic device decreases the size of the alien's eyes 1232 in 1213D to display the alien's eyes 1232 in a slightly opened state that corresponds to the user's slightly opened eyes 1223 in 1203D.

In 1203E, the electronic device determines the user's eyes 1223 are completely closed by detecting the user's eyelids 1227 completely covering the user's eyes 1223. In response, the electronic device further decreases the size of the alien's eyes 1232 in 1213E to display the alien's eyes 1232 in a closed state. As shown in 1213E, the alien's closed eyes are displayed as angled lines 1232A on the alien's head 1235.

In the embodiments illustrated in FIG. 12C, the electronic device modifies the alien's eyes 1232 in response to detecting changes in the user's eyes 1223, and foregoes modifying other features of the alien avatar 1200. Accordingly, the alien's mouth 1230 remains in a neutral pose, and no other features (e.g., spikes, eyebrows, cheeks, etc.) are introduced, as shown in 1213A, 1213B, 1213C, 1213D, and 1213E.

Figure 13:
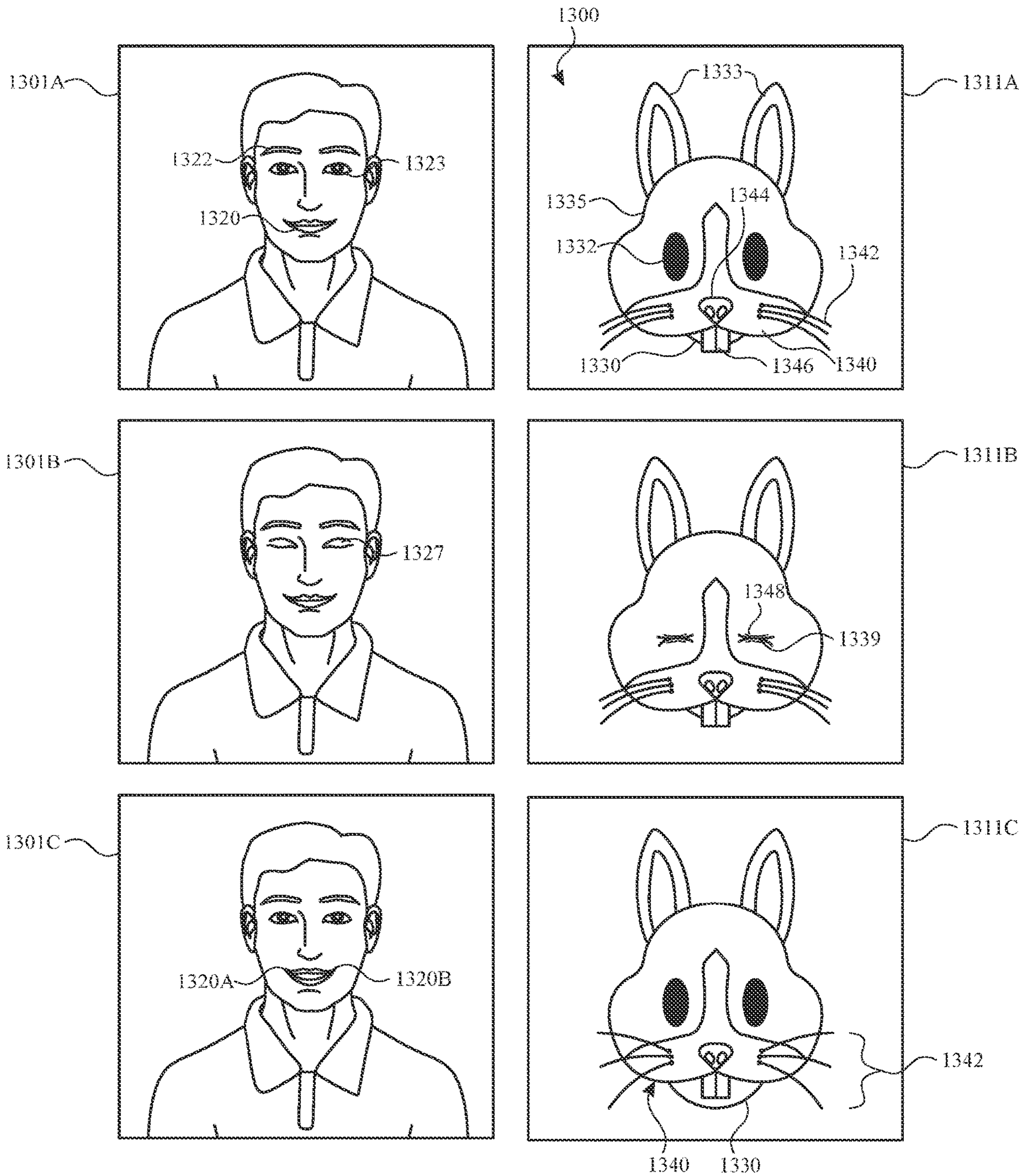
FIG. 13 illustrates exemplary user interfaces for generating and modifying a rabbit virtual avatar.

FIG. 13 illustrates an exemplary embodiment illustrating the electronic device modifying a rabbit avatar 1300 in response to detecting changes in a user's physical features, such as facial features. The rabbit avatar is shown having three displayed states (1311A, 1311B, and 1311C), with each of the three displayed states of the rabbit avatar corresponding, respectively, to three detected states of the user (1301A, 1301B, and 1301C). In each displayed state in FIG. 13, the electronic device positions or modifies features of the rabbit avatar in response to detecting a position, or change in position, of one or more of the facial features of the user detected in the respective states of the user.

In 1301A, the electronic device detects the neutral facial expression of the user (e.g., the user's eyes 1323 are open, eyebrows 1322 are in a relaxed position above the user's eyes 1323, and the user's mouth 1320 is in a relaxed, neutral state, and not a position associated with a particular facial expression). In response to detecting the neutral facial expression, the electronic device displays the rabbit avatar 1300 having a neutral expression or state in 1311A. For example, the electronic device displays the rabbit avatar 1300 having long ears 1333 extending vertically from the top of the rabbit's head 1335, eyes 1332 having an open position, and a mouth region 1340 that includes whiskers 1342, a nose 1344, teeth 1346, and a mouth 1330. In 1311A the neutral state of the rabbit's mouth 1330 is indicated by the closed position of the rabbit's mouth 1330 and the whiskers 1342 positioned close together and extending in a limp, downward direction from the rabbit's mouth region 1340. In addition, the electronic device displays the rabbit avatar 1300 without eyebrows 1338 and displays the rabbit's eyes 1332 looking in a direction perpendicular to the display (or a plane of focus of the camera (e.g., camera 143, optical sensor 164)). In some embodiments, the neutral position of the avatar corresponds to other representations of a related image, such as a static rabbit emoji that may be found in messaging applications.

As illustrated in 1301B and 1311B, the electronic device detects the user closing their eyes 1323 and, in response, modifies the rabbit avatar 1300 to close its eyes 1332 by introducing avatar facial structures (e.g., features) around the rabbit's eyes 1332. In some embodiments, the electronic device detects the user closing their eyes by detecting the user's eyelids 1327 completely covering the user's eyes 1323. In response, the electronic device modifies the rabbit avatar to show the rabbit closing its eyes 1332 by introducing cheekbones 1339 appearing in a raised, slightly arched position under the rabbit's eyes 1332 and introducing eyelids 1348 appearing above the rabbit's eyes 1332 and moving in a downward direction to cover the rabbit's eyes 1332 as shown in 1311B. As the user raises their eyelids 1327 to their neutral position, the electronic device removes the rabbit's eyelids 1348 and cheekbones 1339 to return the rabbit avatar 1300 to its neutral pose (shown in 1311A). In some embodiments, the electronic device removes the rabbit's eyelids 1348 by animating the eyelids 1348 moving upward to reveal the rabbit's eyes 1332 and disappearing into the rabbit's face above the rabbit's eyes 1332. In some embodiments, the electronic device removes the rabbit's cheekbones 1339 by animating the cheekbones 1339 lowering and straightening out to remove the slight arch, and disappearing into the rabbit's face. In the embodiment illustrated in 1301B and 1311B, the electronic device foregoes modifying other features of the rabbit avatar 1300. Therefore, the electronic device maintains the neutral positions of the rabbit's ears 1333 and mouth region 1340, including the whiskers 1342, mouth 1330, teeth 1346, and nose 1344.

As illustrated in 1301C and 1311C, the electronic device detects one or both of the corners 1320A and 1320B of the user's mouth 1320 positioned in an upward pose (e.g., forming a smiling facial expression) and, in response, modifies the rabbit avatar to have a smiling facial expression. For example, the electronic device modifies the rabbit's mouth region 1340 to form a smiling facial expression by lowering (e.g., opening) the rabbit's mouth 1330 and increasing the spacing between each of the whiskers 1342, as shown in 1311C. By increasing the spacing between the whiskers 1342, the electronic device conveys an interconnected facial relationship between the rabbit's features, particularly the features of the mouth region 1340. Thus, as the user moves their mouth 1320, the electronic device modifies the rabbit's mouth 1330, which effects a change in the interconnected facial features of the rabbit's mouth region 1340. The electronic device represents this connection between the features of the rabbit's mouth region 1340 by adjusting the spacing between the whiskers 1342, which are connected to the rabbit's mouth 1330 through the mouth region 1340. In this embodiment, the electronic device changes the rabbit's mouth region 1340 to a smiling expression when the user smiles. The electronic device returns the mouth region 1340, including the mouth 1330 and whiskers 1342, to their neutral positions when the user is no longer smiling. The rabbit's eyes 1332, teeth 1346, nose 1344, and ears 1333 remain unchanged with respect to their neutral positions in 1311A.

Figure 14A:
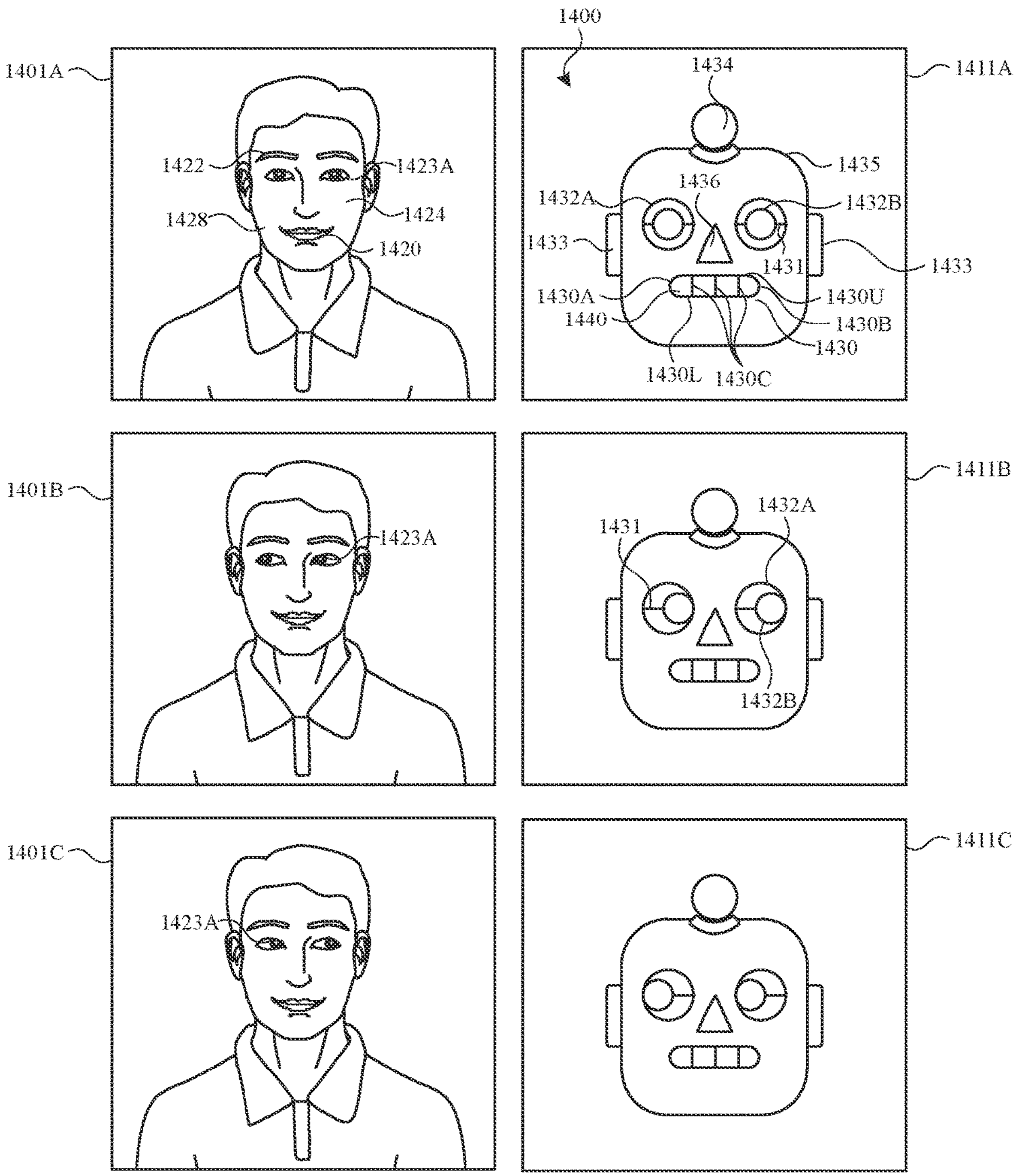
FIGS. 14A-14D illustrate exemplary user interfaces for generating and modifying a robot virtual avatar.

FIG. 14A illustrates an exemplary embodiment illustrating the electronic device modifying a robot avatar 1400 in response to detecting changes in a user's physical features, such as facial features. The robot avatar is shown having three displayed states (1411A, 1411B, and 1411C), with each of the three displayed states of the robot avatar corresponding, respectively, to three detected states of the user (1401A, 1401B, and 1401C). In each displayed state in FIG. 14A, the electronic device positions or modifies features of the robot avatar in response to detecting a position, or change in position, of one or more of the physical features, such as facial features, of the user detected in the respective states of the user.

In 1401A, the electronic device detects the neutral facial expression of the user. For example, the user's eyes 1423 are open (with irises 1423A or pupils pointed in a direction perpendicular to a plane of focus of the camera (e.g., camera 143, optical sensor 164)), eyebrows 1422 are in a relaxed position above the user's eyes 1423, and the user's cheeks 1428 are relaxed and not expanded. In addition, the user's mouth 1420 (having a first portion of a user's lip 1420A, which may, optionally, form a corner of the user's mouth 1420, and a second portion of a user's lip 1420B, which may, optionally, form a corner of the user's mouth 1420) is in a relaxed, neutral state, and not a position associated with a particular facial expression. In response to detecting the neutral facial expression, the electronic device displays the robot avatar 1400 having a neutral expression or state in 1411A. For example, the electronic device displays the robot avatar 1400 having ears 1433 positioned against the sides of the robot's head 1435 in a vertically centered alignment, an antenna 1434 having a lowered position in a horizontally centered location on the top of the robot's head 1435, and a nose 1436 having a triangular shape with its base aligned parallel with the bottom edge of the robot's head 1435 and the opposite corner directed upward towards the antenna 1434.

In 1411A, the neutral position of the robot's mouth 1430 is indicated by the position and shape of the mouth 1430 displayed by the electronic device. For example, the electronic device displays the robot's mouth 1430 in a neutral position by horizontally centering the mouth 1430 below the robot's nose 1436. In addition, the robot mouth 1430 is in the neutral position when the electronic device displays the robot's mouth 1430 having a "pill" shape formed by rounded ends 1430A and 1430B connected by an upper edge 1430U and lower edge 1430L positioned horizontally and parallel to each other. When the mouth is in the neutral position, the electronic device displays vertical lines 1430C forming the robot's "teeth" 1440. The teeth 1440 have a fixed horizontal position with respect to the robot's head 1435 that is centered below the robot's nose 1436.

As shown in 1411A, the electronic device displays the robot's eyes 1432 in a neutral position by displaying an outer circle 1432A having an inner circle 1432B, or aperture, positioned in the center of the outer circle 1432A, with lines 1431 extending horizontally between the outer circles 1432A and inner circles 1432B. This combination of robot eye features (e.g., the centered aperture 1432B and horizontal lines 1431) represent the robot's eyes 1432 looking in a direction perpendicular to the display (or a plane of focus of the camera (e.g., camera 143, optical sensor 164)). In some embodiments, the openness of the robot's eye 1432 is indicated by the size of the inner circle 1432B. For example, when the diameter of the inner circle 1432B increases, the robot's eye 1432 is considered widening or opening. When the diameter of the inner circle 1432B decreases, the robot's eye 1432 is considered narrowing or closing. In some embodiments, the electronic device displays the robot's eye 1432 in a closed position by removing the inner circle 1432B and displaying a single line 1431 extending across the outer circle 1432A. In other embodiments, the electronic device displays the robot's eye 1432 in a closed position by displaying the inner circle 1432B having a minimum diameter. In the embodiments illustrated in FIG. 14A-14D, the size of the inner circle 1432B illustrated in 1411A represents the neutral position or size of the inner circle 1432B. In some embodiments, the neutral position of the avatar corresponds to other representations of a related image, such as a static robot emoji that may be found in messaging applications.

As illustrated in 1401B, the electronic device detects the user's eyes 1423 (e.g., the iris 1423A and/or pupil of the user's eye) shifted to the user's right side. In response to detecting the rightward shift of the user's irises 1423A, the electronic device modifies the eyes 1432 of the robot avatar to look right. For example, for each robot eye 1432, the electronic device shifts the inner circle 1432B to the far right edge of the outer circle 1432A, as shown in 1411B. In addition, when the electronic device shifts the inner circles 1432B to the far right edges of the outer circles 1432A, the electronic device also adjusts the lengths of the horizontal lines 1431 to maintain their horizontal extension between the inner circle 1432B and outer circle 1432A. As shown in 1411B, the electronic device forgoes modifying the other features of the robot avatar 1400.

1401C and 1411C illustrate a similar effect in which the electronic device detects the user's eyes 1423 (e.g., the iris 1423A and/or pupil of the user's eye) shifted to the user's left side. In response to detecting the leftward shift of the user's irises 1423A, the electronic device modifies the eyes 1432 of the robot avatar to look left, as shown in 1411C. For example, for each robot eye 1432, the electronic device shifts the inner circle 1432B to the far left edge of the outer circle 1432A and adjusts the lengths of the horizontal lines 1431 to maintain their horizontal extension between the inner circle 1432B and outer circle 1432A. Again, as shown in 1411C, the electronic device forgoes modifying the other features of the robot avatar 1400.

Figure 14B:
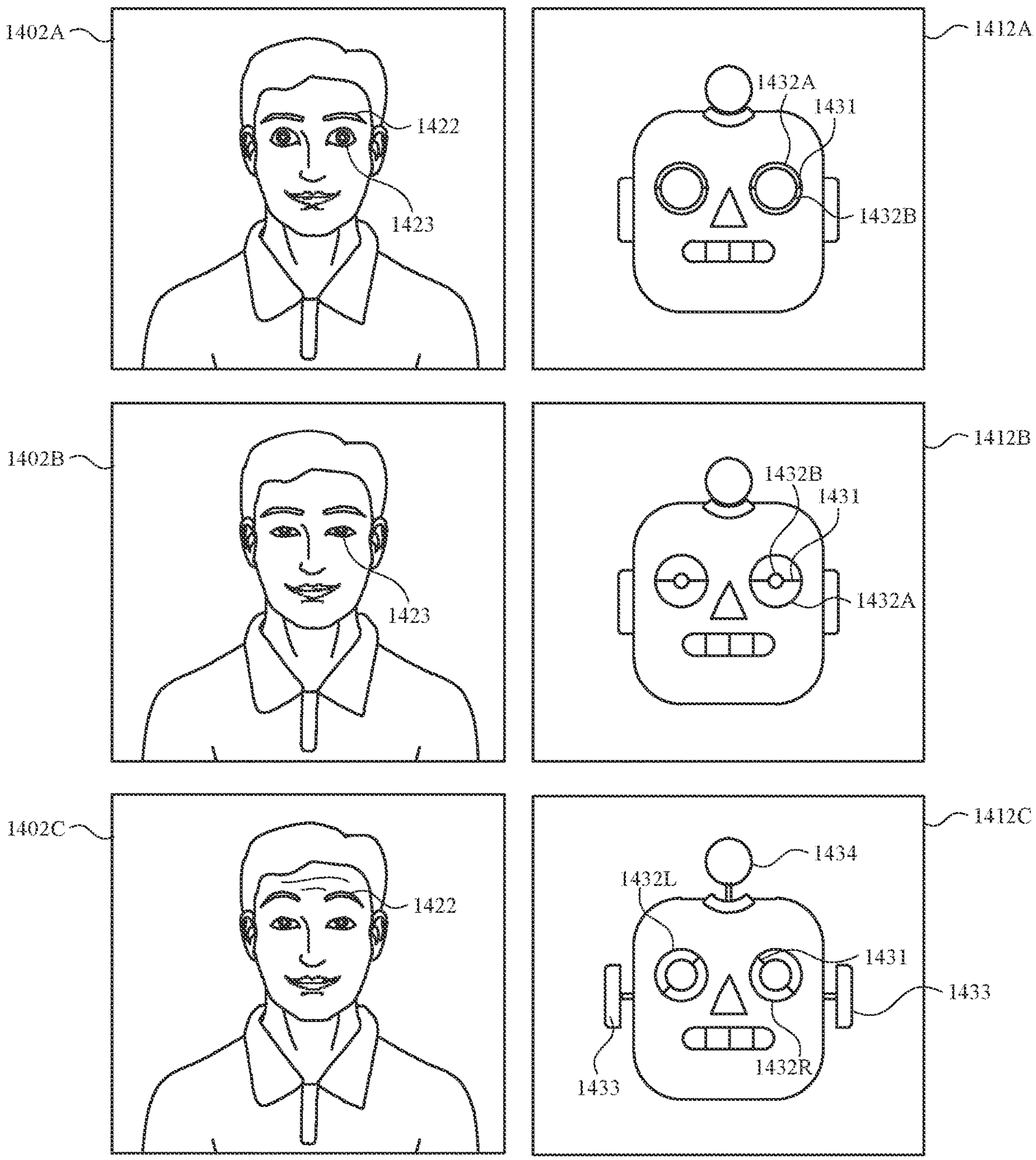

FIG. 14B illustrates an exemplary embodiment illustrating the electronic device modifying the robot avatar 1400 in response to detecting changes in the user's physical features, such as facial features. The robot avatar is shown having three displayed states (1412A, 1412B, and 1412C), with each of the three displayed states of the robot avatar corresponding, respectively, to three detected states of the user (1402A, 1402B, and 1402C). In each displayed state in FIG. 14B, the electronic device positions or modifies features of the robot avatar in response to detecting a position, or change in position, of one or more of the physical features, such as facial features, of the user detected in the respective states of the user.

As illustrated in 1402A and 1412A, the electronic device detects the user widening their eyes 1423 and, in response, modifies the robot avatar 1400 to display widened eyes 1432. In the embodiment illustrated in 1402A and 1412A, the electronic device detects the user widening their eyes 1423 by detecting an increase in the size of the user's eyes 1423 (e.g., with respect to the neutral position of the user's eyes 1423). In some embodiments, detecting the widened eyes includes, optionally, the electronic device detecting a raised position of the user's eyebrows 1422. In response to detecting the widened user eyes 1423, the electronic device modifies the robot avatar 1400 to show the robot widening its eyes 1432 by increasing the diameter of the inner circle 1432B as shown in 1412A. In addition, the electronic device decreases the lengths of the horizontal lines 1431 to maintain their horizontal extension between the inner circle 1432B and outer circle 1432A. As shown in 1412A, the electronic device forgoes modifying other features of the robot avatar 1400.

As illustrated in 1402B and 1412B, the electronic device detects the user narrowing their eyes 1423 and, in response, modifies the robot avatar 1400 to narrow its eyes 1432. In the embodiment illustrated in 1402B and 1412B, the electronic device detects the user narrowing their eyes 1423 by detecting a decrease in the size of the user's eyes 1423 (e.g., with respect to the neutral position of the user's eyes 1423). In response to detecting the narrowed user eyes 1423, the electronic device modifies the robot avatar 1400 to show the robot narrowing its eyes 1432 by decreasing the diameter of the inner circle 1432B as shown in 1412B. In addition, the electronic device increases the lengths of the horizontal lines 1431 to maintain their horizontal extension between the inner circle 1432B and outer circle 1432A. As shown in 1412B, the electronic device forgoes modifying other features of the robot avatar 1400.

As illustrated in 1402C and 1412C, the electronic device detects the user's eyebrows 1422 are in a raised position (e.g., positioned higher than the neutral position shown in 1401A) and, in response, modifies various features of the robot avatar 1400. For example, as shown in 1412C, the electronic device modifies the robot avatar 1400 by extending the antenna 1434 from the top of the robot's head 1435, extending the robot's ears 1433 from the sides of the robot's head 1435, and rotating the lines 1431 connecting the inner circles 1432B and outer circles 1432A of the robot's eyes 1432. In the embodiment shown in 1412C, the electronic device rotates lines 1431 so that they are angled to mimic robot eyebrows in a "raised" position. For example, the electronic device rotates the lines 1431 located in the right robot eye 1432R by approximately 45 degrees in a clockwise direction, and rotates the lines 1431 located in the left robot eye 1432L by approximately 45 degrees in a counter-clockwise direction. In this embodiment, the electronic device modifies the robot avatar 1400 as discussed above when the user raises their eyebrows 1422. Thus, when the electronic device detects the user's eyebrows 1422 returning to their neutral position, the electronic device displays the antenna 1434, ears 1433, and lines 1431 returning to their neutral positions shown in 1411A.

Figure 14C:
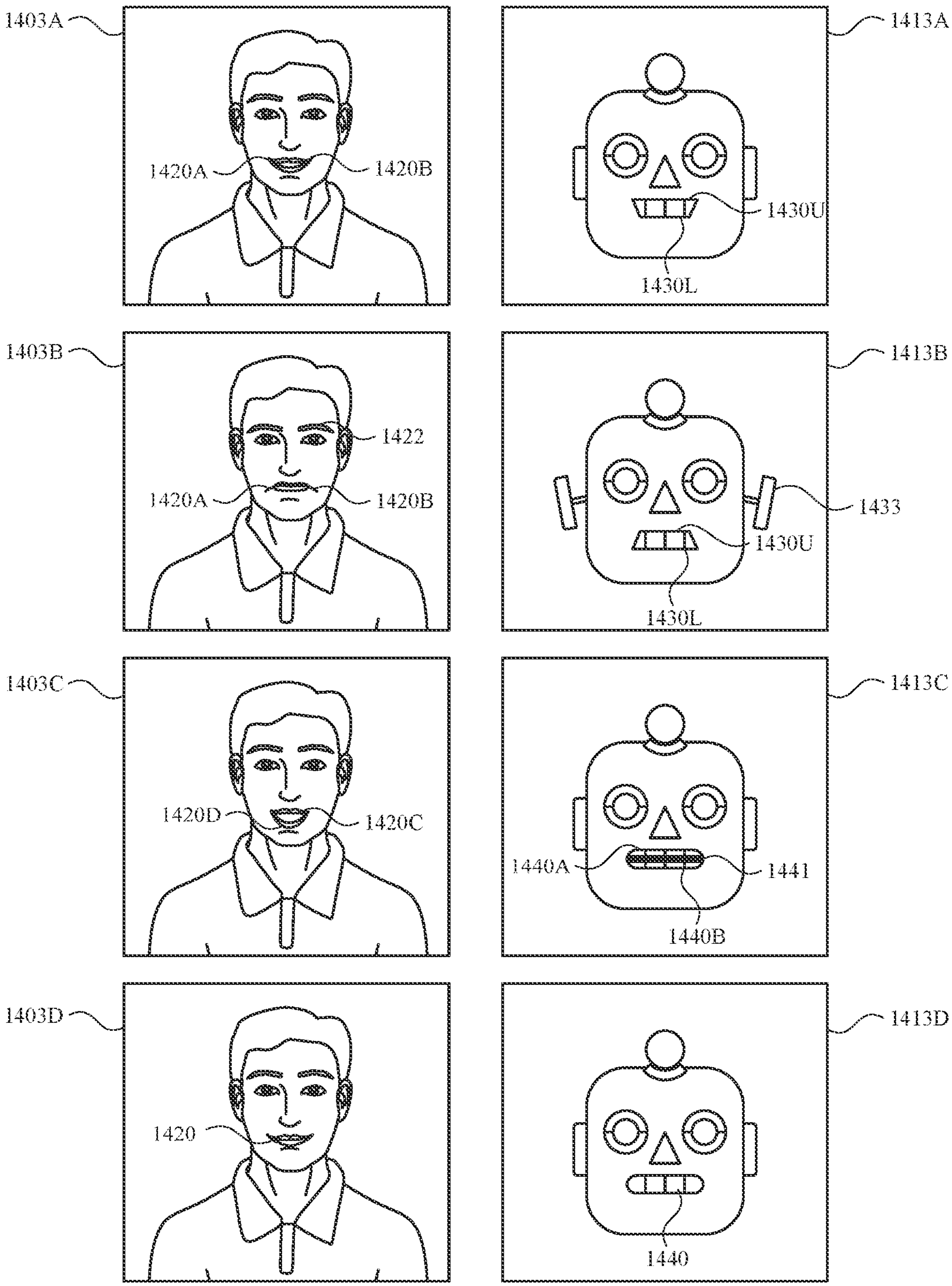

FIG. 14C illustrates an exemplary embodiment illustrating the electronic device modifying the robot avatar 1400 in response to detecting changes in the user's physical features, such as facial features. The robot avatar is shown having four displayed states (1413A, 1413B, 1413C, and 1413D), with each of the four displayed states of the robot avatar corresponding, respectively, to four detected states of the user (1403A, 1403B, 1403C, and 1403D). In each displayed state in FIG. 14C, the electronic device positions or modifies features of the robot avatar in response to detecting a position, or change in position, of one or more of the physical features, such as facial features, of the user detected in the respective states of the user.

As illustrated in 1403A and 1413A, the electronic device detects the portions of the user's lips 1420A and 1420B in a position that is different from that shown in 1401A. Specifically, the electronic device detects the portions of the lips 1420A and 1420B are positioned in an upward pose (e.g., a smiling facial expression) and, in response, modifies the robot avatar 1400 to have a smiling expression. For example, the electronic device modifies the robot's mouth 1430 to have a smiling expression by changing the shape of the robot's mouth to a trapezoidal shape having a shorter lower edge 1430L and a longer upper edge 1430U, as shown in 1413A. As shown in 1413A, the electronic device forgoes modifying other features of the robot avatar 1400.

As illustrated in 1403B and 1413B, the electronic device detects one or both of the portions of the user's lips 1420A and 1420B positioned in a downward pose and the user's eyebrows 1422 in a downward position (e.g., furrowed or positioned lower on the user's face when compared to the position of the eyebrows 1422 when in the relaxed, neutral state in 1401A) and, in response, modifies multiple features of the robot avatar 1400 to display the robot having a frowning expression. For example, the electronic device displays the robot having a frowning expression by modifying both the robot's mouth 1430 and the robot's ears 1433. The electronic device modifies the robot's mouth 1430 to have a frowning expression by changing the shape of the robot's mouth to a trapezoidal shape having a longer lower edge 1430L and a shorter upper edge 1430U, as shown in 1413A. In addition, the electronic device modifies the robot's ears 1433 so that they extend from the sides of the robot's head 1435 and tilt in a downward direction, angled away from the sides of the robot's head 1435 as shown in 1413B. In the embodiment illustrated in 1413B, the electronic device forgoes modifying other features of the robot avatar 1400.

In 1403C, the electronic device detects portions 1420C and 1420D of the user's mouth 1420 are spaced apart with the user's mouth 1420 opened (e.g., as if the user's mouth 1420 is moving in a talking motion). In response to detecting this "talking" motion of the user's mouth 1420, the electronic device modifies the robot avatar 1400, as shown in 1413C, to display the robot's mouth 1430 mimicking the user's talking motion. For example, the electronic device changes the robot's teeth 1440 by introducing a horizontal space 1441 that separates the robot's teeth 1440 into an upper row of teeth 1440A and a lower row of teeth 1440B. As the electronic device detects the user's mouth moving in the talking motion, the electronic device increases the height of the horizontal space 1441 between the upper row of teeth 1440A and the lower row of teeth 1440B to show the robot's teeth 1440 moving in an opening direction, and decreases the height of the horizontal space 1441 between the upper row of teeth 1440A and the lower row of teeth 1440B to show the robot's teeth 1440 moving in a closing direction. By modifying the height of the horizontal spacing 1441 in this manner, the electronic device modifies the robot's mouth 1430 to mimic the talking motion of the user's mouth 1420. In some embodiments, such as the embodiment illustrated in 1403C and 1413C, the electronic device does not modify the shape or position of the robot's mouth 1430 in response to detecting the portions 1420C and 1420D of the user's mouth 1420 moving in the talking motion. Instead, the robot's teeth 1440 are modified as discussed above. In some embodiments, such as the embodiment of FIG. 14C, changes in a physical feature (e.g., the user's lips and/or mouth) can result in exaggerated changes in the corresponding avatar feature (e.g., the robot mouth 1430,1430U, 1430L), with the exaggeration being in the form of a change in shape that is different than the change in shape detected for the physical feature.

As illustrated in 1403D and 1413D, when the electronic device detects the user's mouth 1420 returning to the closed position in 1403D (e.g., the portions 1420C and 1420D of the user's mouth 1420 are closed), the electronic device removes the horizontal space 1441 so that the robot's teeth 1440 return to the neutral, closed position as shown in 1413D.

Figure 14D:
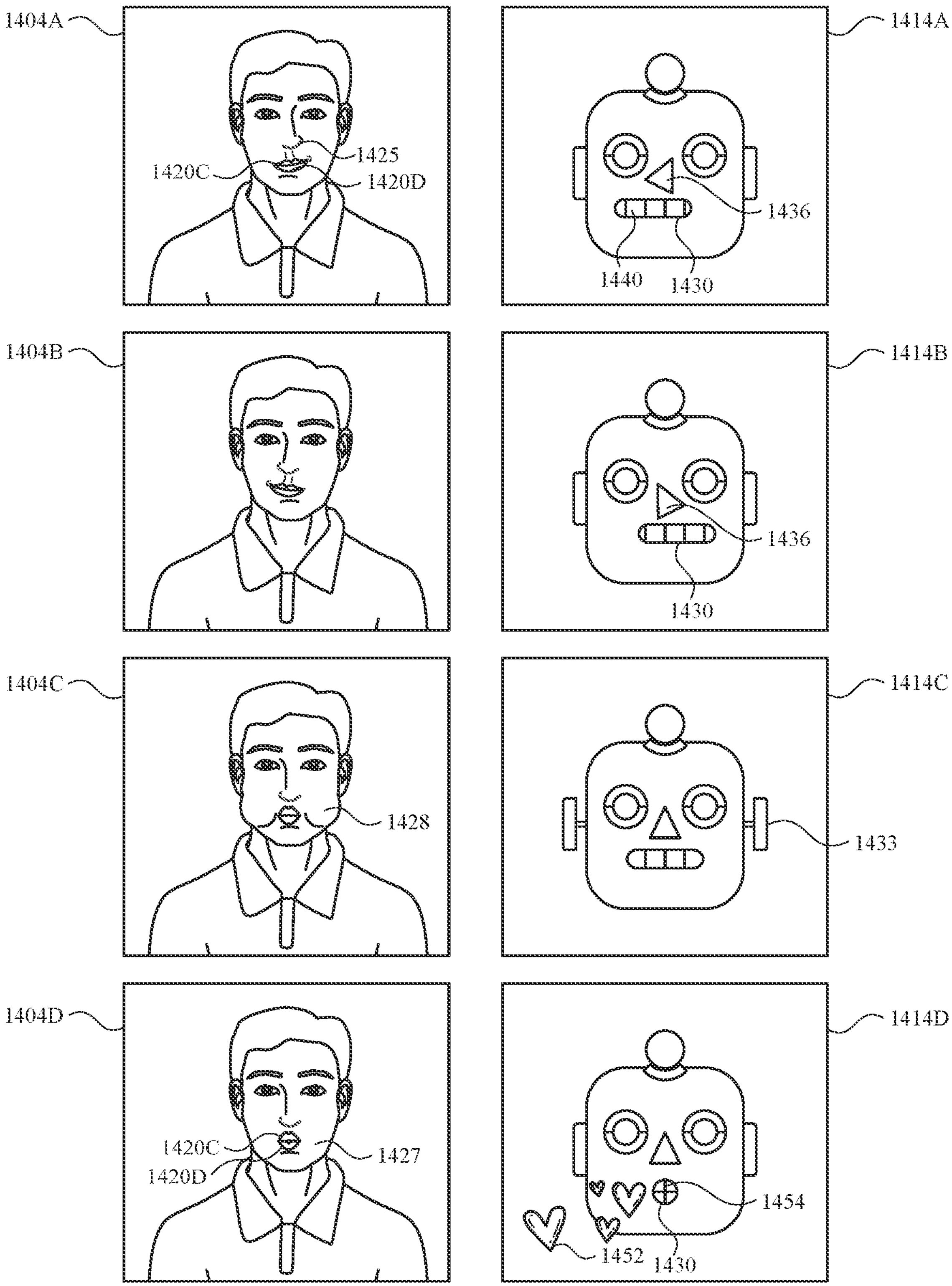

FIG. 14D illustrates an exemplary embodiment illustrating the electronic device modifying the robot avatar 1400 in response to detecting changes in the user's physical features, such as facial features. The robot avatar is shown having four displayed states (1414A, 1414B, 1414C, and 1414D), with each of the four displayed states of the robot avatar corresponding, respectively, to four detected states of the user (1404A, 1404B, 1404C, and 1404D). In each displayed state in FIG. 14D, the electronic device positions or modifies features of the robot avatar in response to detecting a position, or change in position, of one or more of the physical features, such as facial features, of the user detected in the respective states of the user. In each of the four displayed states, the boundaries of the displayed states (e.g., the borders of 1414A, 1414B, 1414C, and 1414D) represent the boundaries of a displayed region that includes the virtual avatar.

As illustrated in 1404A and 1414A, the electronic device detects the user's mouth 1420 (e.g., upper lip 1420C and lower lip 1420D) is shifted to the user's right (e.g., shifted to the left with respect to the field of view of the camera) and, in response, modifies both the robot's mouth 1430 and nose 1436. The electronic device modifies the robot's mouth 1430 by shifting the shape of the robot's mouth 1430 to the right so as to mirror the movement of the user's mouth 1420, while maintaining the relative position of the robot's teeth 1440 with respect to the robot's head 1435. For example, as shown in 1414A, the pill shape of the robot's mouth 1430 is shifted to the right and the position of the teeth 1440 remains fixed so that the robot's mouth 1430 appears shifted with respect to both the robot's head 1435 and teeth 1440.

As shown in 1404A, the tip of the user's nose 1425 shifts slightly with the user's mouth 1420. In some embodiments, the electronic device does not directly monitor or detect movement of the user's nose 1425 but, nevertheless, accounts for movement of the user's nose 1425 by modifying the robot's nose 1436 to move in response to the shifting robot mouth 1430. For example, the electronic device modifies the robot's nose 1436 so that it rotates as the robot's mouth 1430 shifts, thereby conveying an interconnected facial relationship between the robot's mouth 1430 and nose 1436 that is similar to the interconnected facial relationship between the user's mouth 1420 and nose 1425. In the embodiment illustrated in 1414A, the electronic device shifts the robot's mouth 1430 to the right and rotates the nose 1436 clockwise. This combination of modifications to the robot's mouth 1430 and nose 1436 mimics the movement of the user's mouth 1420 and nose 1425 and gives the appearance that the robot's facial features, particularly the robot's nose 1436 and mouth 1430, are interconnected in a manner similar to that of the user's mouth 1420 and nose 1425.

1404B illustrates movements of the user's mouth 1420 and nose 1425 in a direction opposite that shown in 1404A, and 1414B illustrates the electronic device's corresponding modifications to the robot avatar 1400. These modifications to the robot avatar 1400 are similar to those discussed above with respect to 1414A, but are instead shown in opposite directions. For example, in 1404B, the user's mouth 1420 and nose 1425 are shown shifted to the user's left (e.g., shifted to the right with respect to the field of view of the camera) and, in response, the electronic device shifts the robot's mouth 1430 the right and rotates the robot's nose 1436 counterclockwise, as shown in 1414B. Again, this combination of modifications to the robot's mouth 1430 and nose 1436 mimics the movement of the user's mouth 1420 and nose 1425 and gives the appearance that the robot's facial features are interconnected in a manner similar to that of the user's mouth 1420 and nose 1425.

As illustrated in 1404C and 1414C, the electronic device detects the user's cheeks 1428 in a puffed or expanded position (e.g., the user fills their cheeks 1428 with air so that they expand beyond the neutral position shown in 1401A) and, in response, modifies the robot avatar 1400 by extending the robot's ears 1433 from the sides of the robot's head 1435. In some embodiments, the electronic device modifies the extension of the ears 1433 based on the amount the user expands their cheeks 1428. For example, as the user continues to expand their cheeks 1428, the electronic device continues to extend the ears 1433. Similarly, as the user's cheeks 1428 retract (e.g., in response to the user releasing the air from their cheeks 1428), the electronic device retracts the robot's ears 1433.

As illustrated in 1404D, the electronic device detects the user making a puckering facial expression by detecting the user's jaw 1427 in a closed position and detecting the corners 1420A and 620B of the user's mouth 1420 moving towards each other to cause the user's lips (e.g., both the user's upper lip 1420C and lower lip 1420D) to extend outward from the user's mouth 1420 in a puckered pose. In response to detecting the user's puckering facial expression, the electronic device modifies the robot avatar 1400 by changing the shape of the robot's mouth 1430 and displaying metallic hearts 1452 emitted from the robot's mouth 1430, as shown in 1414D. For example, the electronic device modifies the shape of the robot's mouth 1430 to a circle with a "+" shape 1454 in the center of the circle to form a robot "pucker." In addition, the electronic device introduces one or more metallic hearts 1452 displayed emitting from the robot's "puckered" mouth 1430. In some embodiments, the electronic device forgoes modifying any other features of the robot avatar 1400.

In some embodiments, the electronic device does not immediately introduce the metallic hearts 1452 in response to detecting the user's puckering facial expression. In such embodiments, the electronic device modifies the puckering robot avatar 1400 to introduce the metallic hearts 1452 emitting from the puckered mouth 1430 only after the electronic device detects the user holding the puckering facial expression for a threshold amount of time. In some embodiments, the electronic device modifies the robot avatar to introduce only a single metallic heart 1452 emitted from the puckered mouth 1430 when the user holds the puckering facial expression for a first threshold amount of time (e.g., 0.3 seconds), and then modifies the robot avatar to introduce additional metallic hearts 1452 emitted from the puckered mouth 1430 after the user continues to hold the puckering facial expression to reach a second threshold amount of time (e.g., 0.6 seconds).

In some embodiments, the metallic hearts 1452 are animated and dynamic. For example, in some embodiments, the electronic device displays the metallic hearts 1452 emitting from the puckered mouth 1430 intermittently and, optionally, in random intervals. In some embodiments, the electronic device displays the metallic hearts 1452 having different sizes. In some embodiments, the electronic device displays the metallic hearts 1452 increasing in size as they move away from the puckered mouth 1430. Additionally, the electronic device displays, in some embodiments, each metallic heart 1452 moving in a randomized trajectory and disappearing at a random location located within the display region of 1414D or, alternatively, disappearing from view as it exits the display region of 1414D. In some embodiments, the electronic device displays the metallic hearts 1452 emitting from the puckered mouth 1430 in a direction that is based on the direction the user or avatar is facing. For example, if the electronic device detects the user's face, or the avatar, is turned to the left, the puckered mouth 1430 emits the metallic hearts 1452 to the left, and if the electronic device detects the user's face, or the avatar, is turned to the right, the puckered mouth 1430 emits the metallic hearts 1452 to the right. In some embodiments, the electronic device continues to display the metallic hearts 1452 emitting from the robot's puckered mouth 1430 until the user stops making the puckering facial expression. In some embodiments, when the user stops making the puckering facial expression, the electronic device modifies the robot avatar 1400 such that the metallic hearts 1452 disappear and the puckered mouth 1430 returns to the neutral shape illustrated in 1411A.

Figure 15A:
FIGS. 15A-15B illustrate exemplary user interfaces for generating and modifying a unicorn virtual avatar.

FIG. 15A illustrates an exemplary embodiment illustrating the electronic device modifying a unicorn avatar 1500 in response to detecting changes in a user's physical features, such as facial features. The unicorn avatar is shown having four displayed states (1511A, 1511B, 1511C, and 1511D), with each of the four displayed states of the unicorn avatar corresponding, respectively, to four detected states of the user (1501A, 1501B, 1501C, and 1501D). In each displayed state in FIG. 15A, the electronic device positions or modifies features of the unicorn avatar in response to detecting a position, or change in position, of one or more of the physical features, such as facial features, of the user detected in the respective states of the user.

In 1501A, the electronic device detects the neutral facial expression of the user (e.g., the user's eyes 1523 are open, eyebrows 1522 are in a relaxed position above the user's eyes 1523, and the user's mouth 1520 is in a relaxed, neutral state, and not a position associated with a particular facial expression). In response to detecting the neutral facial expression, the electronic device displays the unicorn avatar 1500 having a neutral state in 1511A. For example, the electronic device displays the unicorn 1500 having ears 1533 extending vertically from the top of the unicorn's head 1535, an eye 1532 in an opened position, and a mane 1552 resting naturally at the top of the unicorn's head 1535 and down the back of the unicorn's head 1535 and neck 1539. In addition, the electronic device displays the unicorn 1500 having a horn 1550 positioned towards the top of the unicorn's head 1535, adjacent the unicorn's ears 1533 and mane 1552. The electronic device displays the unicorn 1500 with no eyebrow or cheek features and displays the unicorn's eye 1532 looking in a direction perpendicular to the display (or a plane of focus of the camera (e.g., camera 143, optical sensor 164)).

The electronic device also displays the unicorn 1500 having a muzzle region 1540 that includes a mouth 1530 and nostril 1536. In 1511A, the electronic device displays the unicorn's muzzle region 1540 in a neutral state that includes the unicorn's mouth 1530 in a closed position and a relaxed position of the nostril 1536.

In the neutral state illustrated in 1511A, the electronic device displays the unicorn avatar 1500 in a skewed orientation such that the unicorn 1500 is facing to the left side of the display region of 1511A with approximately half of the unicorn's features visible. For example, the electronic device displays one of the unicorn's eyes 1532, half of the unicorn's mouth 1530, and one nostril 1536 in the neutral state shown in 1511A. In some embodiments, the neutral position of the avatar corresponds to other representations of a related image, such as a static unicorn emoji that may be found in messaging applications.

As illustrated in 1501B and 1511B, the electronic device detects the user's upper lip 1520A in a raised position and the user's eyebrows 1522 in a lowered position (e.g., the user is making a sneering facial expression) and, in response, modifies the displayed unicorn avatar 1500 to display a sneering expression. For example, the electronic device modifies the unicorn avatar 1500 to introduce an eyebrow 1538 positioned in a furrowed state that partially obstructs an upper portion of the unicorn's eye 1532 as shown in 1511B. In addition, the electronic device modifies the muzzle region 1540 by changing the unicorn's mouth 1530 to an opened position with a protruding upper lip 1530A to reveal the unicorn's teeth 1542. The electronic device also modifies the muzzle region 1540 to form the sneer pose by displaying the nostril 1536 in an expanded or flexed position and expanding the muzzle region 1540 to cover an increased portion of the unicorn's face, as shown in 1511B.

In the embodiment illustrated in 1501B and 1511B, the electronic device modifies the unicorn avatar 1500 to display a sneer expression in response to detecting the user's sneering facial expression. In some embodiments, the electronic device displays the changes to the avatar as a gradual animation of the changes to each of the modified features (e.g., the mouth, nostril, muzzle region, eyebrow), with the animated changes matching the direction and magnitude of the changes to the corresponding physical features of the user (e.g., the user's lips and eyebrows). In other embodiments, the electronic device modifies the features of the virtual avatar (e.g., the mouth, nostril, muzzle region, eyebrow) to a predefined position representing the unicorn's sneer.

In some embodiments, when the electronic device detects the user is no longer making the sneering facial expression, the electronic device modifies the unicorn avatar 1500 to return to the neutral state illustrated in 1511A. For example, when the user releases the sneer expression, the electronic device removes the unicorn's eyebrow 1538 by animating the eyebrow 1538 moving upward from the unicorn's eye 1532 and disappearing into the unicorn's face below the unicorn's mane 1552 and ears 1533. In addition, the electronic device animates the muzzle region 1540 moving to its neutral position, the nostril 1536 returning to its relaxed state, and the unicorn's mouth 1530 closing to return to its neutral position. In some embodiments, the electronic device displays the unicorn 1500 returning to its neutral position without animating the changes to the modified features (e.g., the eyebrow, mouth, nostril, and muzzle region). In other words, the electronic device displays an instant change of the unicorn from the sneering expression shown in 1511B to the neutral state shown in 1511A.

As illustrated in 1501C and 1511C, the electronic device detects the user raising their eyebrows 1522 and, in response, modifies the displayed unicorn avatar 1500 to raise its eyebrows. For example, in response to detecting the user's raised eyebrows 1522, the electronic device modifies a front portion 1552A of the unicorn's mane 1552 to perk up, and introduces a unicorn eyebrow 1538 positioned above the unicorn's eye 1532 to convey the impression that the unicorn avatar 1500 is raising its eyebrows 1538, as shown in 1511C. In this embodiment, the electronic device introduces the unicorn's eyebrow 1538 and perks up the front portion of the mane 1552 when the user's eyebrows 1522 are raised. The electronic device removes the unicorn's eyebrow 1538 and relaxes the mane 1552 when the user's eyebrows 1522 return to their neutral position. In some embodiments, the device returns the unicorn 1500 to the neutral position by animating the eyebrow 1538 moving towards the unicorn's eye 1532 and disappearing into the unicorn's face above the unicorn's eye 1532. In addition, the electronic device animates the front portion 1552A of the mane 1552 falling to its neutral position as the eyebrow 1538 is removed.

As illustrated in 1501D and 1511D, the electronic device detects the user rotating their head 1528 and, optionally, face 1524 (or various physical features comprising the face 1524) to the user's left side and, in response, modifies the unicorn avatar 1500 by rotating the unicorn's head 1535 while leaving the unicorn's neck 1539 stationary. For example, the electronic device rotates the unicorn's head 1535 so that it turns toward the perspective of a user viewing the unicorn avatar 1500 on a display (e.g., touch screen 112, display 340, display 450, display 504) of the electronic device. When the electronic device rotates the unicorn's head 1535 while maintaining the position of the unicorn's neck 1539, the electronic device reveals features of the unicorn that were previously hidden when the unicorn 1500 was facing in the skewed orientation illustrated in 1511A. For example, as shown in 1511D, the electronic device turns the unicorn's head 1535 to display both of the unicorn's eyes 1532, both nostrils 1536, and portions of the unicorn's ears 1533, horn 1550, and muzzle region 1540 that were previously hidden from view. In addition, when the electronic device rotates the unicorn's head 1535, the unicorn's mane 1552 moves with the unicorn's head 1535 and the head 1535 tilts slightly downward so that the unicorn's mouth 1530 disappears from view.

Figure 15B:
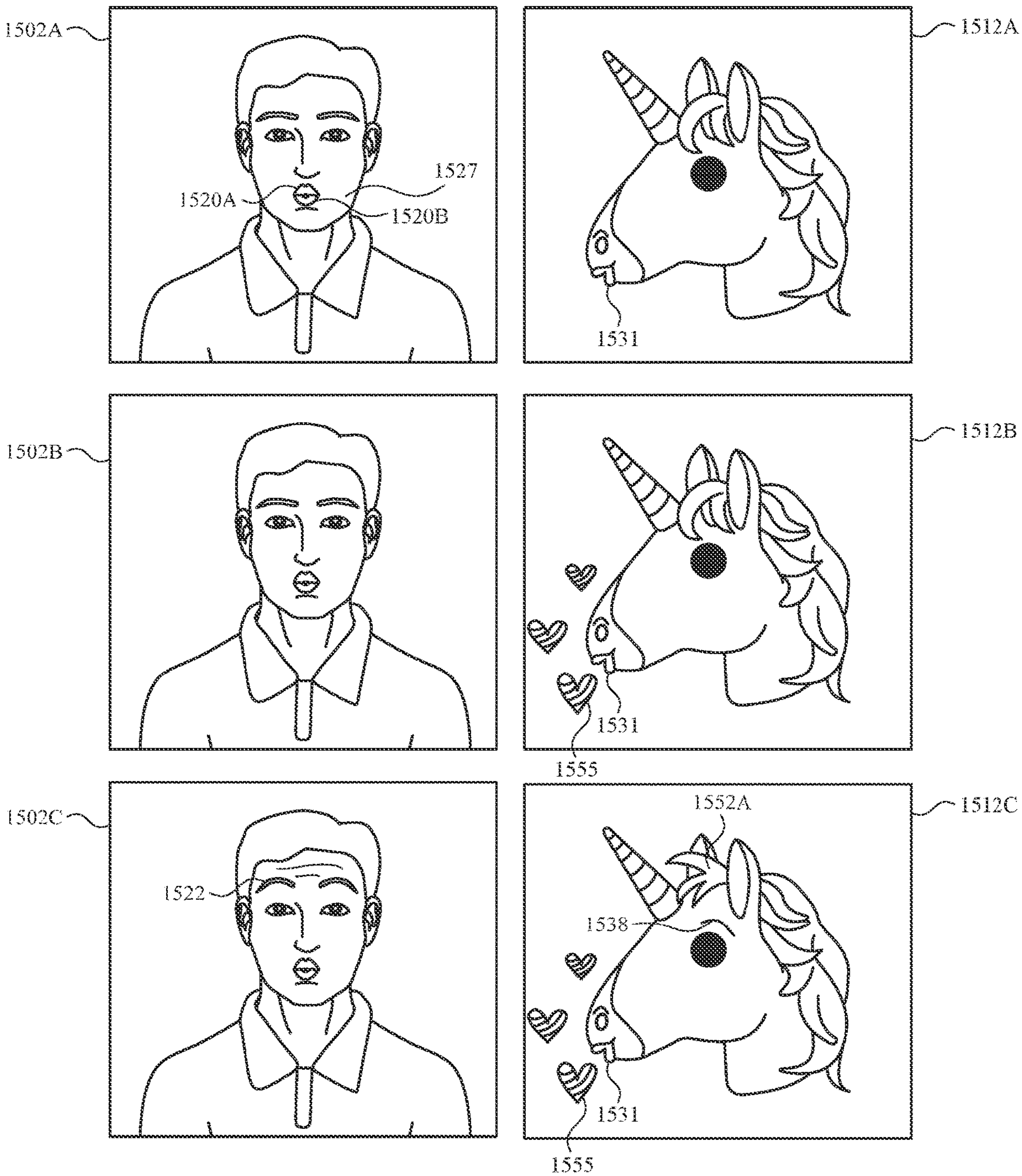

FIG. 15B illustrates an exemplary embodiment illustrating the electronic device modifying the unicorn avatar 1500 in response to detecting changes in the user's physical features, such as facial features. The unicorn avatar is shown having three displayed states (1512A, 1512B, and 1512C), with each of the three displayed states of the unicorn avatar corresponding, respectively, to three detected states of the user (1502A, 1502B, and 1502C). In each displayed state in FIG. 15B, the electronic device positions or modifies features of the unicorn avatar in response to detecting a position, or change in position, of one or more of the physical features, such as facial features, of the user detected in the respective states of the user. In each of the three displayed states, the boundaries of the displayed states (e.g., the borders of 1512A, 1512B, and 1512C) represent the boundaries of a displayed region that includes the virtual avatar.

As illustrated in 1502A and 1512A, the electronic device detects the user making a puckering expression and, in response, modifies the unicorn avatar 1500 by replacing the unicorn's mouth 1530 with a set of puckered lips 1531. In some embodiments, such as that shown in 1502A, the electronic device determines the user is making a puckering expression by detecting the user's jaw 1527 in a closed position and detecting the corners of the user's mouth 1520 moving towards each other to cause the user's lips (e.g., both the user's upper lip 1520A and lower lip 1520B) to extend outward from the user's mouth 1520 in a puckered pose. In response to detecting the user's puckering expression, the electronic device modifies the unicorn avatar 1500 by changing the unicorn's mouth 1530 into a set of puckered lips 1531, while foregoing modifying any other features of the unicorn 1500 as shown in 1512A.

As illustrated in 1502B and 1512B, the electronic device detects the user holding the pucker expression for a threshold amount of time and, in response, modifies the unicorn avatar 1500 by introducing one or more rainbow hearts 1555 displayed emitting from the unicorn's puckered lips 1531. In the embodiments illustrated in 1512A and 1512B, the electronic device does not immediately introduce the rainbow hearts 1555 in response to detecting the user's puckering expression. Instead, the electronic device modifies the puckering unicorn avatar 1500 to introduce the rainbow hearts 1555 emitting from the puckered lips 1531 only after the electronic device detects the user holding the puckering expression for a threshold amount of time.

In some embodiments, the electronic device modifies the unicorn avatar to introduce only a single rainbow heart 1555 emitted from the puckered lips 1531 when the user holds the puckering expression for a first threshold amount of time (e.g., 0.3 seconds), and then modifies the unicorn avatar to introduce additional rainbow hearts 1555 emitted from the puckered lips 1531 after the user continues to hold the puckering expression to reach a second threshold amount of time (e.g., 0.6 seconds). In some embodiments, the rainbow hearts 1555 are animated and dynamic. For example, in some embodiments, the electronic device displays the rainbow hearts 1555 emitting from the puckered lips 1531 intermittently and, optionally, in random intervals. In some embodiments, the electronic device displays the rainbow hearts 1555 having different sizes. In some embodiments, the electronic device displays the rainbow hearts 1555 increasing in size as they move away from the puckered lips 1531. Additionally, the electronic device displays, in some embodiments, each rainbow heart 1555 moving in a randomized trajectory and disappearing at a random location located within the display region of 1512B or, alternatively, disappearing from view as it exits the display region of 1512B.

In some embodiments, the electronic device displays the rainbow hearts 1555 emitting from the puckered lips 1531 in a direction that is based on the direction the user or avatar is facing. For example, if the electronic device detects the user's face, or the avatar, is turned to the left, the puckered lips 1531 emit the rainbow hearts 1555 to the left, and if the electronic device detects the user's face, or the avatar, is turned to the right, the puckered lips 1531 emit the rainbow hearts 1555 to the right. In some embodiments, the electronic device continues to display the rainbow hearts 1555 emitting from the unicorn's puckered lips 1531 until the user stops making the puckering facial expression. In some embodiments, when the user stops making the puckering facial expression, the electronic device modifies the unicorn avatar 1500 such that the rainbow hearts 1555 disappear and the puckered lips 1531 are replaced with the unicorn mouth 1530.

In 1502C, the electronic device detects the user raising their eyebrows 1522 while simultaneously maintaining the puckered expression discussed above with respect to 1502B. As shown in 1512C, in response to detecting the user raising their eyebrows 1522, the electronic device modifies the unicorn's head 1535 to raise its eyebrows while still producing the rainbow hearts 1555 discussed above with respect to 1512B. For example, while displaying the unicorn 1500 emitting rainbow hearts 1555 from the puckered lips 1531, the electronic device further modifies the unicorn 1500 (in response to detecting the user raising their eyebrows 1522) such that the front portion 1552A of the unicorn's mane 1552 perks up, and the unicorn's eyebrow 1538 is introduced above the unicorn's eye 1532 to convey the impression that the unicorn avatar 1500 is raising its eyebrows 1538 while emitting rainbow hearts 1555, as shown in 1512C. In some embodiments, movement of mane 1552 occurs in accordance with one or more physics models (e.g., a model of inertia, a model of gravity, a force transfer model, a friction model).

Figure 16A:
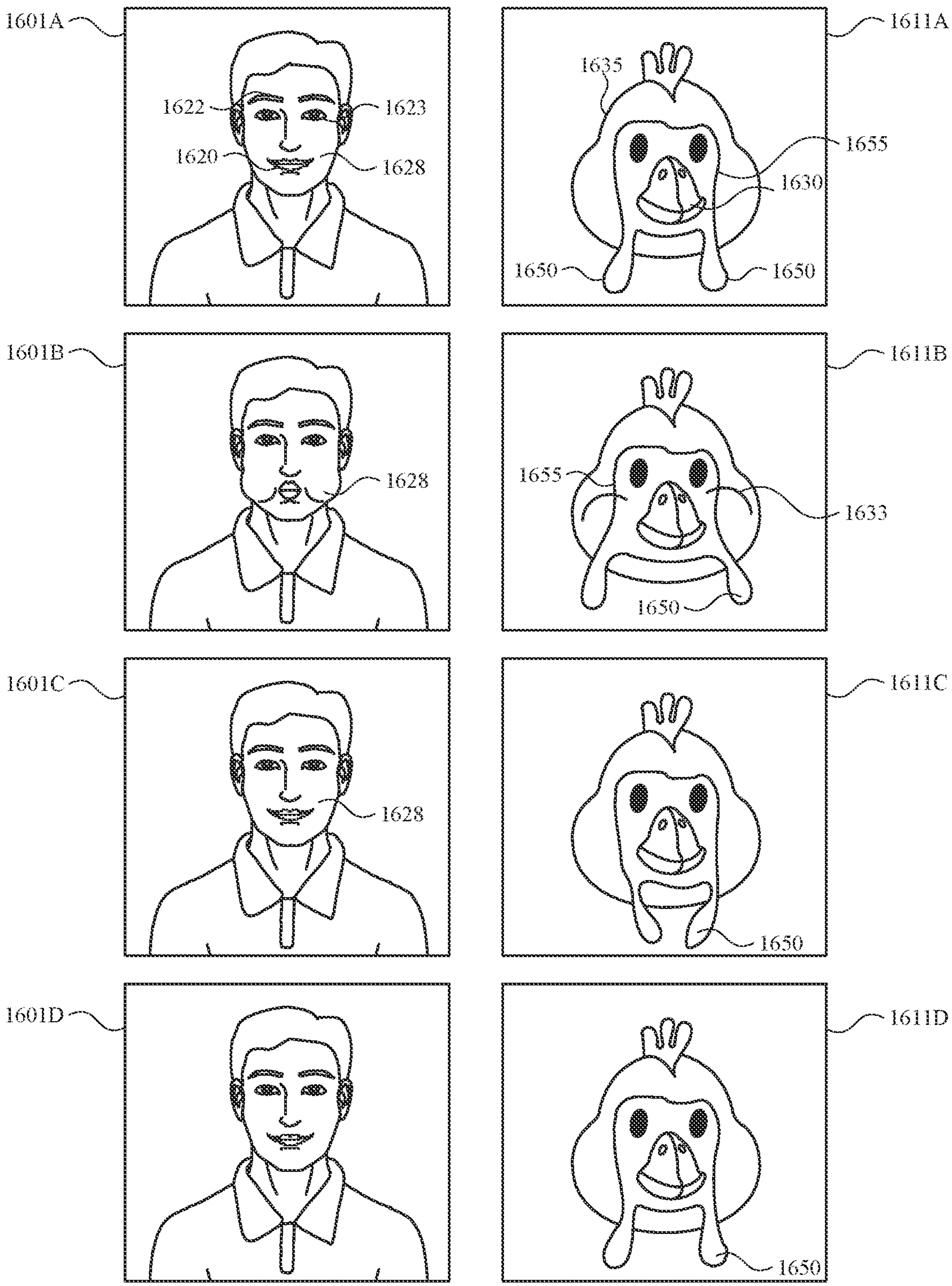
FIGS. 16A-16B illustrate exemplary user interfaces for generating and modifying a chicken virtual avatar.

FIG. 16A illustrates an exemplary embodiment illustrating the electronic device modifying a chicken avatar 1600 in response to detecting changes in a user's physical features, such as facial features. The chicken avatar is shown having four displayed states (1611A, 1611B, 1611C, and 1611D), with each of the four displayed states of the chicken avatar corresponding, respectively, to four detected states of the user (1601A, 1601B, 1601C, and 1601D). In each displayed state in FIG. 16A, the electronic device positions or modifies features of the chicken avatar in response to detecting a position, or change in position, of one or more of the physical features, such as facial features, of the user detected in the respective states of the user.

In 1601A, the electronic device detects the neutral facial expression of the user (e.g., the user's eyes 1623 are open, eyebrows 1622 are in a relaxed position above the user's eyes 1623, the user's cheeks 1628 are relaxed and not expanded, and the user's mouth 1620 is in a relaxed, neutral state, and not a position associated with a particular facial expression). In response to detecting the neutral facial expression, the electronic device displays the chicken avatar 1600 having a neutral state in 1611A. For example, the electronic device displays the chicken 1600 having a beak 1630 in a closed position and wattles 1650 extending from the chicken's facial region 1655 and hanging loosely from the chicken's head 1635. In addition, the electronic device displays the chicken 1600 with no cheeks. In some embodiments, the neutral position of the avatar corresponds to other representations of a related image, such as a static chicken emoji that may be found in messaging applications.

As illustrated in 1601B and 1611B, the electronic device detects the user's cheeks 1628 in a puffed or expanded position (e.g., the user fills their cheeks 1628 with air so that they expand beyond the neutral position shown in 1601A)

and, in response, modifies the chicken avatar 1600 by introducing cheeks 1633 to display the chicken puffing its cheeks 1633. In addition to introducing the puffed chicken cheeks 1633, the electronic device displays an animation of the chicken wattles 1650 swinging from their neutral position (shown in 1611A) to a widened position (shown in 1611B) when the chicken's cheeks 1633 are puffed. In some embodiments, the electronic device displays the wattles 1650 having inertia by displaying the wattles 1650 wiggling as a result of being moved from their neutral position in 1611A to the widened position in 1611B.

In 1601C and 1601D, the electronic device detects the user's cheeks 1628 returning to their neutral position (e.g., not expanded or puffed). In response, the electronic device modifies the chicken avatar 1600 to remove the puffed cheeks 1633, as shown in 1611C and 1611D. For example, the electronic device removes the cheeks 1633 and displays the chicken wattles 1650 swinging from the widened position in 1611B to in a narrowed position in 1611C, before ultimately settling in their neutral position in 1611D.

Figure 16B:
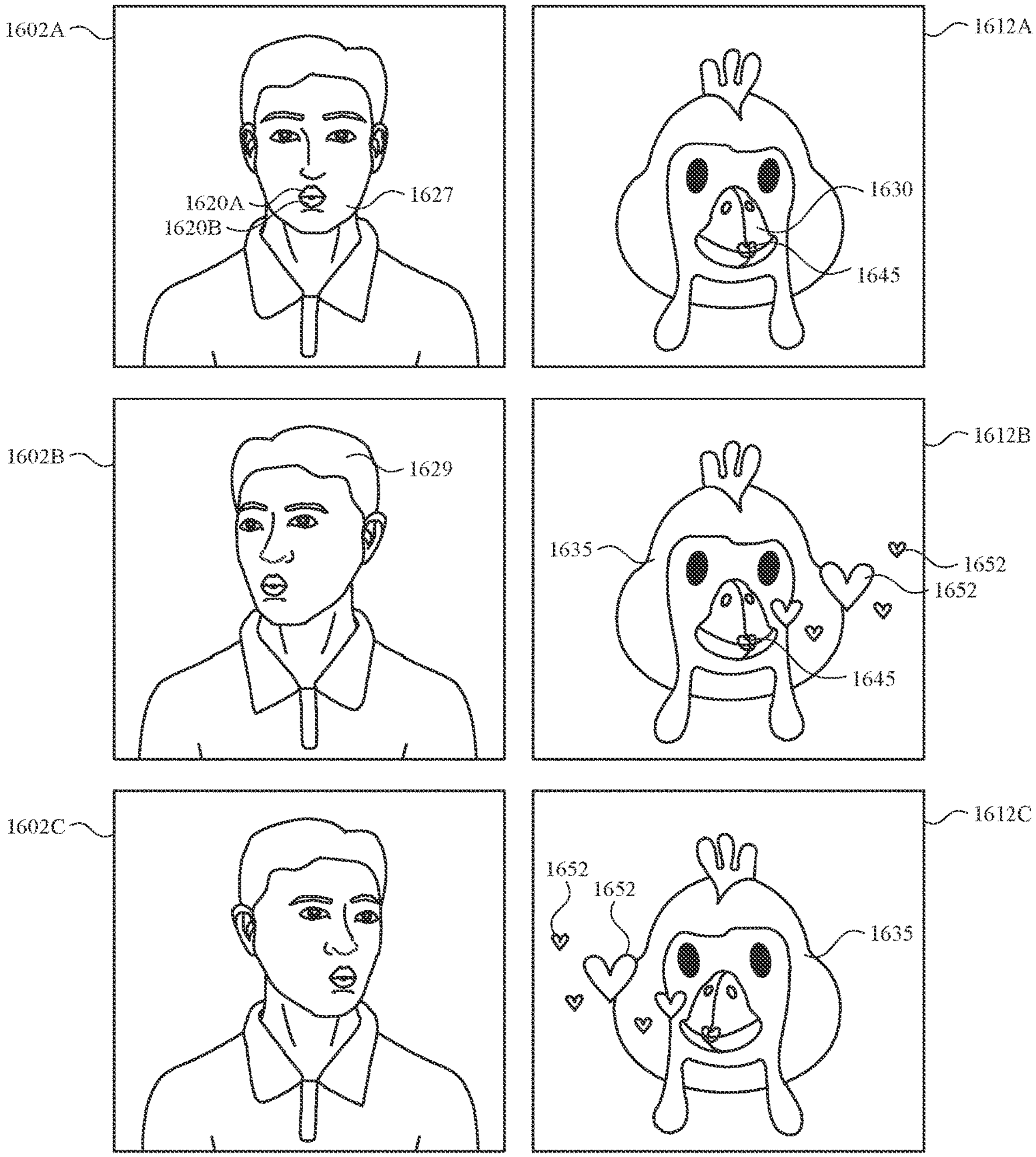

FIG. 16B illustrates an exemplary embodiment illustrating the electronic device modifying the chicken avatar 1600 in response to detecting changes in the user's physical features, such as facial features. The chicken avatar is shown having three displayed states (1612A, 1612B, and 1612C), with each of the three displayed states of the chicken avatar corresponding, respectively, to three detected states of the user (1602A, 1602B, and 1602C). In each displayed state in FIG. 16B, the electronic device positions or modifies features of the chicken avatar in response to detecting a position, or change in position, of one or more of the physical features, such as facial features, of the user detected in the respective states of the user. In each of the three displayed states, the boundaries of the displayed states (e.g., the borders of 1612A, 1612B, and 1612C) represent the boundaries of a displayed region that includes the virtual avatar.

As illustrated in 1602A and 1612A, the electronic device detects the user making a puckering expression and, in response, modifies the chicken avatar 1600 by replacing the tip of the chicken's beak 1630 with a set of puckered lips 1645. In some embodiments, such as that shown in 1602A, the electronic device determines the user is making a puckering expression by detecting the user's jaw 1627 in a closed position and detecting the corners of the user's mouth 1620 moving towards each other to cause the user's lips (e.g., both the user's upper lip 1620A and lower lip 1620B) to extend outward from the user's mouth 1620 in a puckered pose. In response to detecting the user's puckering expression, the electronic device modifies the chicken avatar 1600 by changing a tip of the chicken's beak 1630 into a set of puckered lips 1645, while foregoing modifying any other features of the chicken 1600 as shown in 1612A.

In 1602B and 1602C, the electronic device detects the user's head 1629 turned to the side while holding the pucker expression for a threshold amount of time. In response, the electronic device modifies the chicken avatar 1600 by facing the chicken's head 1635 to the left or right (depending on the detected direction of the user's head 1629) and introducing one or more hearts 1652 displayed emitting from the chicken's puckered lips 1645. In the embodiments illustrated in FIG. 16B, the electronic device does not immediately introduce the hearts 1652 in response to detecting the user's puckering expression. Instead, the electronic device modifies the puckering chicken avatar 1600 to introduce the hearts 1652 emitting from the puckered lips 1645 only after the electronic device detects the user holding the puckering expression for a threshold amount of time.

In some embodiments, the electronic device modifies the chicken avatar 1600 to introduce only a single heart 1652 emitted from the puckered lips 1645 when the user holds the puckering expression for a first threshold amount of time (e.g., 0.3 seconds), and then modifies the chicken avatar 1600 to introduce additional hearts 1652 emitted from the puckered lips 1645 after the user continues to hold the puckering expression to reach a second threshold amount of time (e.g., 0.6 seconds). In some embodiments, the hearts 1652 are animated and dynamic. For example, in some embodiments, the electronic device displays the hearts 1652 emitting from the puckered lips 1645 intermittently and, optionally, in random intervals. In some embodiments, the electronic device displays the hearts 1652 having different sizes. In some embodiments, the electronic device displays the hearts 1652 increasing in size as they move away from the puckered lips 1645. Additionally, the electronic device displays, in some embodiments, each heart 1652 moving in a randomized trajectory and disappearing at a random location located within the display region (e.g., the display region of 1612B or 1612C) or, alternatively, disappearing from view as it exits the display region (e.g., the display region of 1612B or 1612C).

In some embodiments, the electronic device displays the hearts 1652 emitting from the puckered lips 1645 in a direction that is based on the direction the user or avatar is facing. For example, as shown in 1602B and 1612B, the electronic device detects the user's head 1629 is turned to the user's right direction (e.g., turned to the left with respect to the field of view of the camera), and the electronic device displays the chicken's head 1635 facing to the right to mirror the user's head 1629. Thus, the electronic device displays the hearts 1652 emitting from the puckered lips 1645 in the rightward direction that the chicken avatar 1600 is facing, as shown in 1612B. Conversely, as shown in 1602C and 1612C, the electronic device detects the user's head 1629 is turned to the user's left direction (e.g., turned to the right with respect to the field of view of the camera), and the electronic device displays the chicken's head 1635 facing to the left to mirror the user's head 1629. Thus, the electronic device displays the hearts 1652 emitting from the puckered lips 1645 in the leftward direction that the chicken avatar 1600 is facing, as shown in 1612C.

In some embodiments, the electronic device continues to display the hearts 1652 emitting from the chicken's puckered lips 1645 until the user stops making the puckering facial expression. In some embodiments, when the user stops making the puckering facial expression, the electronic device modifies the chicken avatar 1600 such that the hearts 1652 disappear and the puckered lips 1645 are replaced with the tip of the chicken's beak 1630.

Figure 17A:
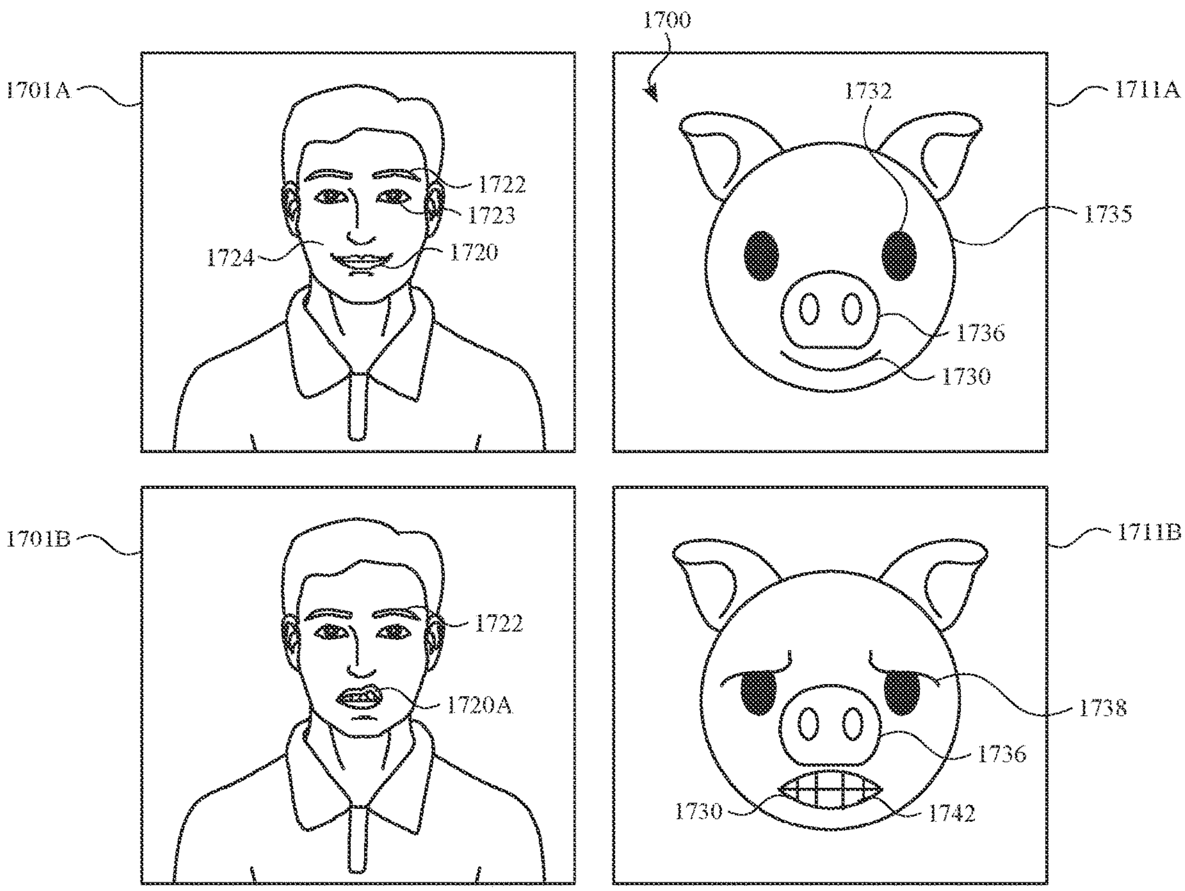
FIGS. 17A-17B illustrate exemplary user interfaces for generating and modifying a pig virtual avatar.

FIG. 17A illustrates an exemplary embodiment illustrating the electronic device modifying a pig avatar 1700 in response to detecting changes in a user's physical features, such as facial features. The pig avatar is shown having two displayed states (1711A and 1711B), with each of the two displayed states of the pig avatar corresponding, respectively, to two detected states of the user (1701A and 1701B). In each displayed state in FIG. 17A, the electronic device positions or modifies features of the pig avatar in response to detecting a position, or change in position, of one or more of the physical features, such as facial features, of the user detected in the respective states of the user.

In 1701A, the electronic device detects the neutral facial expression of the user (e.g., the user's eyes 1723 are open, eyebrows 1722 are in a relaxed position above the user's eyes 1223, and the user's mouth 1720 is in a relaxed, neutral state, and not a position associated with a particular facial expression). In response to detecting the neutral facial expression, the electronic device displays the pig avatar 1700 having a neutral state in 1711A. For example, the electronic device displays the pig 1700 having eyes 1732 vertically centered on the pig's head 1735 and displayed without eyebrows and looking in a direction perpendicular to the display (or a plane of focus of the camera (e.g., camera 143, optical sensor 164)). The electronic device also displays the pig 1700 having a nose 1736 horizontally centered on the pig's head 1735 and positioned slightly below the pig's eyes 1732. In the neutral state, the electronic device displays the pig 1700 having a mouth 1730 in a closed position located below the pig's nose 1736, as shown in 1711A. In some embodiments, the neutral position of the avatar corresponds to other representations of a related image, such as a static pig emoji that may be found in messaging applications.

As illustrated in 1701B and 1711B, the electronic device detects the user's upper lip 1720A in a raised position and the user's eyebrows 1722 in a lowered position (e.g., the user is making a sneering facial expression) and, in response, modifies the displayed pig avatar 1700 to display a sneering expression. For example, the electronic device modifies the pig avatar 1700 to introduce eyebrows 1738 positioned in a furrowed state that partially obstructs upper portions of the pig's eyes 1732 as shown in 1711B. In addition, the electronic device modifies the pig's mouth 1730 and nose 1736 to display the pig's sneering expression. For example, the electronic device displays the pig's mouth 1730 in an opened position revealing the pig's teeth 1742, and shifts the pig's nose 1736 in an upward direction. As shown in 1701B and 1711B, the change in the pig's nose 1736 is exaggerated with respect to the change in the user's upper lip 1720A in that change in the avatar's nose is a greater percentage (e.g., 30%) of a maximum range of modelled motion compared to the percentage change (e.g., 10% of a predicted or determined range of motion) in the user's lip.

In some embodiments, when the electronic device detects the user is no longer making the sneering expression, the electronic device modifies the pig avatar 1700 to return to the neutral state illustrated in 1711A. For example, when the user releases the sneer expression, the electronic device removes the pig's eyebrows 1738 by animating the eyebrows 1738 moving upward from the pig's eyes 1732 and disappearing into the pig's face below the top of the pig's head 1735. In addition, the electronic device animates the pig's mouth 1730 closing to hide the teeth 1742 and return to its neutral position, and animates the pig's nose 1736 moving to its relaxed state shown in 1711A.

Figure 17B:
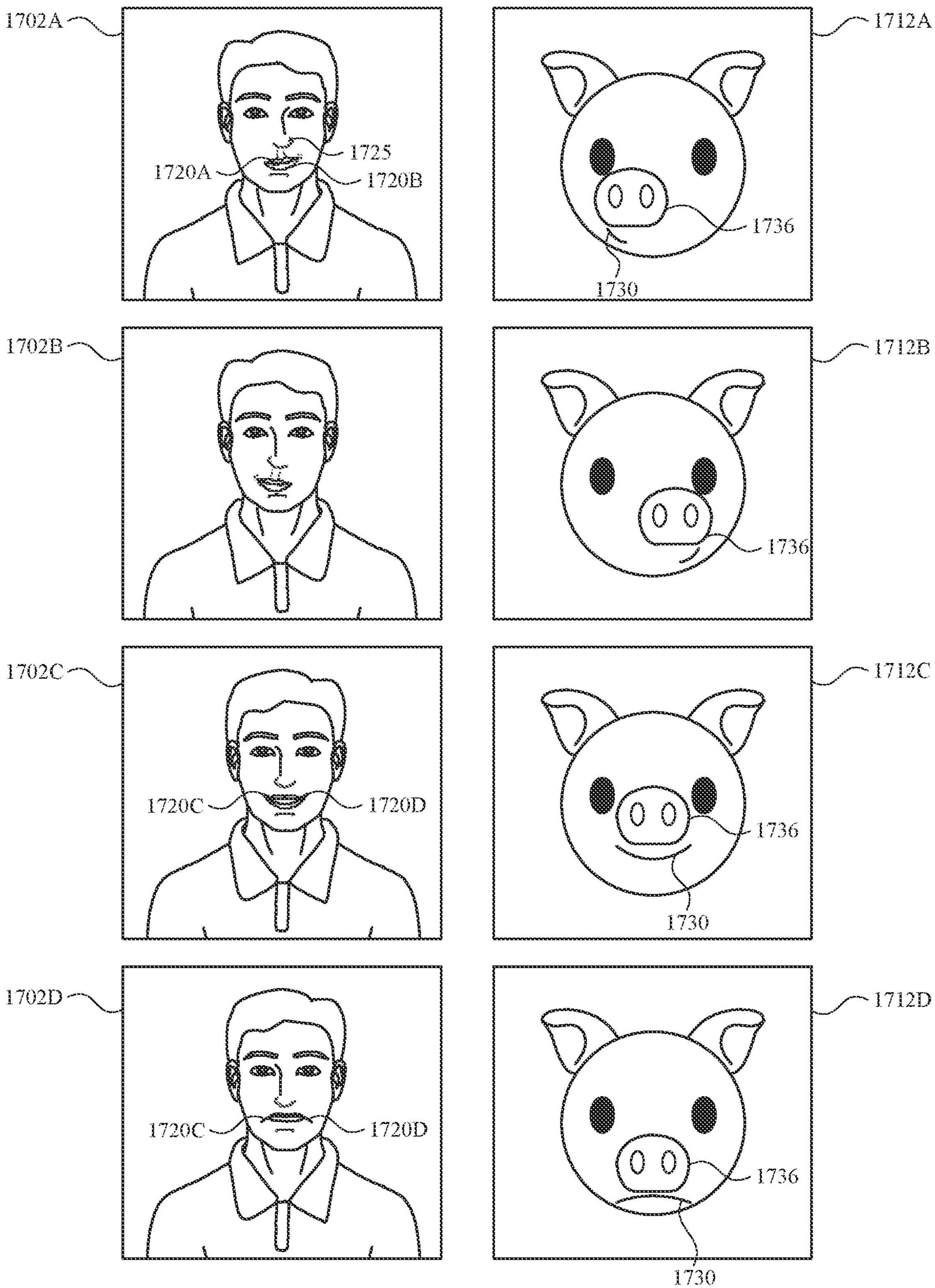

FIG. 17B illustrates an exemplary embodiment illustrating the electronic device modifying the pig avatar 1700 in response to detecting changes in the user's physical features, such as facial features. The pig avatar is shown having four displayed states (1712A, 1712B, 1712C, and 1712D), with each of the four displayed states of the pig avatar corresponding, respectively, to four detected states of the user (1702A, 1702B, 1702C, and 1702D). In each displayed state in FIG. 17B, the electronic device positions or modifies features of the pig avatar in response to detecting a position, or change in position, of one or more of the physical features, such as facial features, of the user detected in the respective states of the user.

As illustrated in 1702A and 1712A, the electronic device detects the user's mouth 1720 (e.g., upper lip 1720A and lower lip 1720B) is shifted to the user's left (e.g., shifted to the right with respect to the field of view of the camera) and, in response, modifies both the pig's mouth 1730 and nose 1736. For example, the electronic device shifts the pig's nose 1736 horizontally to the left side of the pig's head 1735. In addition, the electronic device modifies the pig's mouth 1730 by shortening the mouth 1730, and rotating and shifting the mouth 1730 horizontally to the left side of the pig's head 1735 so as to mirror the movement of the user's mouth 1720.

As shown in 1702A, the tip of the user's nose 1725 shifts slightly with the user's mouth 1720. In some embodiments, the electronic device does not directly monitor or detect movement of the user's nose 1725 but, nevertheless, accounts for movement of the user's nose 1725 by modifying the pig's nose 1736 to move in response to the shifting pig's mouth 1730, as shown in 1712A. For example, the electronic device modifies the pig's nose 1736 so that it shifts horizontally as the pig's mouth 1730 shifts, thereby conveying an interconnected facial relationship between the pig's mouth 1730 and nose 1736 that is similar to the interconnected facial relationship between the user's mouth 1720 and nose 1725. In the embodiment illustrated in 1712A, the electronic device shifts the pig's mouth 1730 and nose 1736 to the left and slightly rotates the mouth 1730 clockwise. This combination of modifications to the pig's mouth 1730 and nose 1736 mimics the movement of the user's mouth 1720 and nose 1725 and gives the appearance that the pig's facial features, particularly the pig's nose 1736 and mouth 1730, are interconnected in a manner similar to that of the user's mouth 1720 and nose 1725.

1702B illustrates movements of the user's mouth 1720 and nose 1725 in a direction opposite that shown in 1702A, and 1712B illustrates the electronic device's corresponding modifications to the pig avatar 1700. These modifications to the pig avatar 1700 are similar to those discussed above with respect to 1712A, but are instead shown in opposite directions. For example, in 1702B, the user's mouth 1720 and nose 1725 are shown shifted to the user's right (e.g., shifted to the left with respect to the field of view of the camera) and, in response, the electronic device shifts the pig's nose 1736 the right side of the pig's head 1735, shortens the pig's mouth 1730, rotates the mouth 1730 slightly in a counter-clockwise direction, and shifts the mouth 1730 horizontally to the right side of the pig's head 1735 under the shifted nose 1736, as shown in 1712B. Again, this combination of modifications to the pig's mouth 1730 and nose 1736 mimics the movement of the user's mouth 1720 and nose 1725 and gives the appearance that the pig's facial features are interconnected in a manner similar to that of the user's mouth 1720 and nose 1725.

As illustrated in 1702C and 1712C, the electronic device detects one or both of the corners 1720C and 1720D of the user's mouth 1720 in an upward pose (e.g., forming a smiling facial expression) and, in response, modifies the pig avatar 1700 to have a smiling expression. For example, the electronic device modifies the position of the pig's mouth 1730 and nose 1736 so that they are both raised with respect to their neutral positions shown in 1711A. For example, in 1712C, the electronic device raises the pig's nose 1736 so that the top of the pig's nose 1736 is positioned at or above the middle of the pig's eyes 1732. Similarly, the electronic device raises the pig's mouth 1730 so that it retains the same relative positioning with respect to the pig's nose 1736 as it has in the neutral state. As a result, the electronic device displays both the pig's nose 1736 and the pig's mouth 1730 in a raised position on the pig's head 1735 in response to detecting the user's smiling facial expression. In some embodiments, the electronic device also adjusts the shape of the pig's mouth 1730 to form a smiling expression (e.g., with an opened, smiling shape).

As illustrated in 1702D and 1712D, the electronic device detects one or both of the corners 1720C and 1720D of the user's mouth 1720 positioned in a downward pose (e.g., a sad facial expression) and, in response, modifies the pig avatar 1700 to have a sad expression. For example, the electronic device modifies the position of the pig's mouth 1730 and nose 1736 so that they are both lowered with respect to their neutral positions shown in 1711A. For example, in 1712D, the electronic device lowers the pig's nose 1736 so that the top of the pig's nose 1736 is positioned at or below the bottom of the pig's eyes 1732. Similarly, the electronic device lowers the pig's mouth 1730 so that it retains the same relative positioning with respect to the pig's nose 1736 as it has in the neutral state. As a result, the electronic device displays both the pig's nose 1736 and the pig's mouth 1730 in a lowered position on the pig's head 1735 in response to detecting the user's sad facial expression. In some embodiments, such as that shown in 1712D, the electronic device also adjusts the shape of the pig's mouth 1730 to form a sad expression by curving the pig's mouth 1730 in a downward direction.

In the examples provided in FIGS. 10A-10I, 11A-11C, 12A-12C, 13, 14A-14D, 15A-15B, 16A-16B, and 17A-17B, the electronic device detects the user transitioning between various positions of the user's physical features, and then updates or modifies the virtual avatar (e.g., poo, bear, alien, rabbit, robot, unicorn, chicken, or pig avatar) in accordance with the detected changes in the user's physical features. In these examples, the electronic device transitions display of the virtual avatar between various expressions and positions by maintaining characteristics of certain features of the virtual avatar and animating changes to other virtual avatar features. For example, as shown in 1001A-1001D of FIG. 10A, the device maintains the position of the avatar eyes 1030 while modifying other avatar features, such as the avatar mouth 1030, eyebrows 1038, and upper portion 1034. It should be appreciated that while states of the avatar correspond to the respective detected states of the user (e.g., displayed avatar states 1011A-1011D correspond to detected user states 1001A-1001D, respectively), the order of the detected user states (and resulting avatar states) is not limited to that shown in FIGS. 10A-10I, 11A-11C, 12A-12C, 13, 14A-14D, 15A-15B, 16A-16B, and 17A-17B. Accordingly, the user can change any physical features or assume any desired positions, and the electronic device modifies the virtual avatar in response to the detected changes, regardless of the order in which they occur.

Figure 18A:
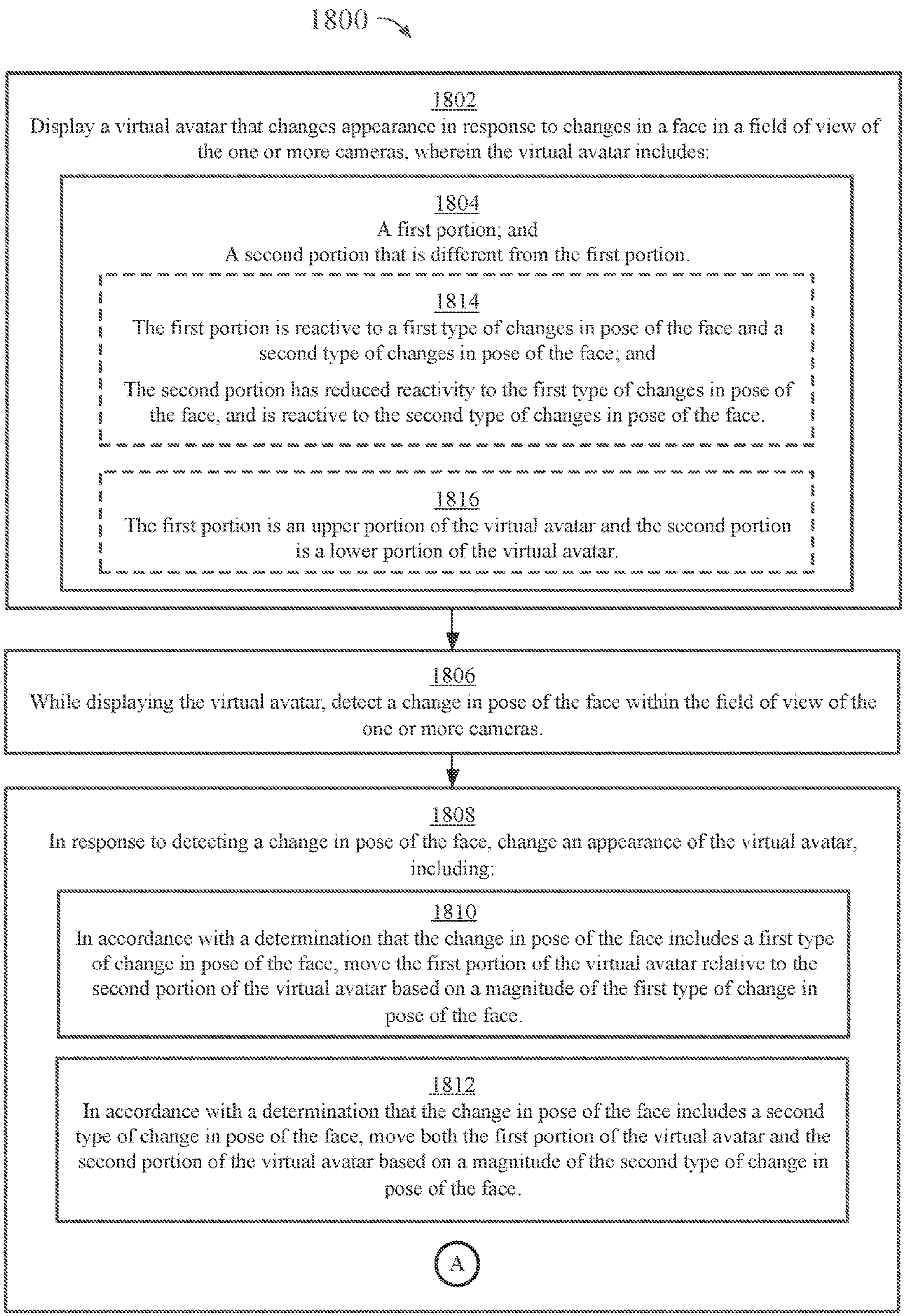

FIGS. 18A and 18B are a flow diagram illustrating a method, at an electronic device, for generating a virtual avatar based on a face detected by one or more cameras in accordance with some embodiments. Method 1800 is performed at an electronic device (e.g., 100, 300, 500, 600) with one or more cameras (e.g., 164, 602) and a display apparatus (e.g., 112, 340, 504, 601). Some operations in method 1800 are, optionally, combined, the orders of some operations are, optionally, changed, and some operations are, optionally, omitted.

As described below, method 1800 provides an intuitive way for generating virtual avatars that have portions that react differently to different types of change in pose. The method reduces the physical and cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 1800 may be found in the user interfaces and virtual avatars discussed with reference to FIGS. 10A-10I and 15A-15B.

The electronic device (e.g., 100, 300, 500, 600) displays (1802), via the display apparatus (e.g., 112, 340, 504, 601) a virtual avatar (e.g., 1000, 1500) (e.g., a representation of the user that can be graphically depicted) that changes appearance in response to changes in a face in a field of view of the one or more cameras. Changing the appearance of the virtual avatar in response to changes in a face in the field of view of one or more cameras provides the user with options for controlling modifications to a virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The virtual avatar includes a first portion (e.g., 1034, 1535) (e.g., the head and face (e.g., non-lower neck portion)), and a second portion (e.g., 1036, 1539) (e.g., lower neck (e.g., non-head and upper neck)) that is different from the first portion (1804).

In some examples (1814), the first portion (e.g., 1034, 1535) is reactive (e.g., detected movements are modeled, the visual appearance (especially the displayed orientation) is updated based on movement) to a first type of changes in pose (e.g., rotation along the x-axis (e.g., nodding of the head) or y-axis (e.g., shaking head side-to-side)) of the face (e.g., a user's head, a collection of one or more interrelated facial features (e.g., mouth, eyes, noses, muscles or muscle groups) that are collectively interpreted as a face) and a second type of changes in pose of the face (e.g., translation of the entire face/head along the x, y, or z axes (e.g., re-positioning of the entire face/head within the field of view)).

In some examples, the second portion (e.g., 1036, 1539) has reduced reactivity (e.g., the second portion reacts less to the first type of changes in orientation of the face) than the first portion reacts to the first type of changes in orientation of the face. In some examples, the second portion is unreactive to the first type of changes in orientation of the face such that detected orientation changes of the first type are not directly modeled, and the visual appearance (especially the displayed orientation) is not updated based on detected movement. In some examples, the second portion is a non-facial feature (e.g., a neck) that is not mapped to, or directly controlled by, any detected facial features. In some examples, the second portion is not directly reactive to changes in orientation of the first type, but can be indirectly reactive (e.g., based on movement of the first portion caused by changes in orientation of the first type, based on a connection between the first portion and the second portion) to the first type of changes in pose of the face and is reactive to the second type of changes in pose of the face. In some examples, changes in pose of the user's face (e.g., translation changes) that occur along an axis parallel to (e.g., an x-axis, a y-axis), or normal to (e.g., a z-axis), the plane of the field of view of the one or more cameras result in movement of both a first portion of the virtual avatar (e.g., 1034 or head 1535 of the virtual avatar) and a second portion of the virtual avatar (e.g., 1036 or a neck 1539 of the virtual avatar). In contrast, in such embodiments, changes in pose of the user's face that occur around (e.g., rotational changes) an axis parallel to (e.g., an x-axis, a y-axis), or normal to (e.g., a z-axis), the plane of the field of view of the one or more cameras result in movement of the first portion of the virtual avatar without movement (or with lesser movement) of the second portion of the virtual avatar. Having reduced reactivity to the second portion of the virtual avatar, compared to the first portion of the virtual avatar, for a first type of change in pose of the face provides the user with options for differentially affecting portions of the virtual avatar without requiring displayed user interface control (e.g., touch control) elements. Providing additional control options without cluttering the user interface with additional controls enhances the operability of the device, making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, prior to detecting the change in pose of the face within the field of view of the one or more cameras, the first portion (e.g., 1034, 1535) of the virtual avatar is not visually delineated (e.g., there is no visual indication of where the first portion ends (e.g., the bottom of the head 1535 or top of the neck 1539) and where the second portion begins (e.g., below the top of the neck)) from the second portion (e.g., 1036, 1539) of the virtual avatar. In some embodiments, the virtual avatar is a representation of a pile of semi-solid matter (e.g., a pile of poo such as poo avatar 1000), and the top (e.g., 1034 and/or 1040) moves based on the first type of change in pose of the face while the bottom (e.g., 1036) does not move based on the first type of change in pose of the face.

In some examples, the first portion (e.g., 1034, 1535) of the virtual avatar is at least a portion of a head feature of the virtual avatar and the second portion (e.g., 1036, 1539) of the virtual avatar is at least a portion of a neck feature of the virtual avatar. In some examples, the first portion of the virtual avatar is a head of a unicorn or horse (e.g., 1535), and the second portion of the virtual avatar is a neck of the unicorn or horse (e.g., 1539).

In some examples, prior to detecting the change in pose of the face within the field of view of the one or more cameras, the face is oriented in a first orientation with respect to the field of view of the one or more cameras (e.g., the face is oriented so as to be directly facing the one or more cameras), and, prior to detecting the change in pose of the face within the field of view of the one or more cameras, the virtual avatar (e.g., 1500) is displayed in a second orientation different than the first orientation. In some examples, the virtual avatar is displayed having a skewed orientation in comparison to the orientation of the user's face. For example, when the user is directly facing the one or more cameras, such that the user's facial features are visible (e.g., as shown in FIG. 15A), the virtual avatar (e.g., 1500) is displayed at a skewed angle such that portions (e.g., avatar features such as an eye 1532, an ear 1533, etc.) of the virtual avatar are not displayed (e.g., hidden or partially hidden). In some examples, one or more of the hidden avatar features are revealed in response to movement of the face (e.g., if the face rotates to the side, at least a portion of a formerly hidden avatar feature such as an eye 1532 or ear 1533 is displayed via the display device as shown in 1511D of FIG. 15A).

In some examples, movement of the first portion (e.g., 1034, 1535 or a portion thereof) (e.g., an ear for a canine virtual avatar, a mane (e.g., 1552) of an equine virtual avatar (e.g., 1500)) of the virtual avatar or movement of the second portion (e.g., 1036, 1539 or a portion thereof) of the virtual avatar occurs in accordance to one or more physics models (e.g., a model of inertia, a model of gravity, a force transfer model, a friction model). In some examples, the physics model specifies a magnitude and direction of movement of an avatar feature based on a magnitude and direction of movement of the face or a portion of the face and one or more predefined properties of the virtual avatar feature such as a simulated mass, simulated elasticity, simulated coefficient of friction or other simulated physical property.

In some examples (1816), the first portion (e.g., 1034, 1535) is an upper portion of the virtual avatar and the second portion (e.g., 1036, 1539) is a lower portion of the virtual avatar. In some embodiments, the first portion is a first side of the virtual avatar and the second portion is a second side of the virtual avatar that is different from (e.g., opposite from) the first side.

In some examples, the change in pose of the face includes only the first type of change (e.g., a change in pose that only includes a rotational component, without a translational component), and moving the first portion (e.g., 1034, 1535) of the virtual avatar relative to the second portion (e.g., 1036, 1539) of the virtual avatar based on the magnitude of the first type of change in pose of the face includes moving the first portion of the virtual avatar without moving the second portion of the virtual avatar. Moving the first portion of the virtual avatar without moving the second portion of the virtual avatar provides the user with feedback indicating that further movement of the same physical feature will cause the device to move only the first portion, without moving the second portion of the virtual avatar. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, a change in pose of the first type (e.g., a rotational change in pose) of the face causes movement of only the first portion (e.g., 1034, 1535) of the virtual avatar, without movement of the second portion (e.g., 1036, 1539) of the virtual avatar. For example, if the user in the field of view of the camera rotates their entire body (e.g., face, neck, and shoulders as shown in FIG. 10D) only the first portion (e.g., an avatar face (e.g., 1000C, 1535)) of the virtual avatar moves (e.g., rotates), while a second portion (e.g., an avatar neck (e.g., 1539) or lower portion (e.g., 1036)) of the virtual avatar does not move. That is, the portions of the virtual avatar react differentially to movement of the user. In some examples, a portion of the virtual avatar that anatomically/physiologically corresponds to a portion of the user (e.g., an avatar neck that anatomically corresponds to the user's neck) does not react to certain movements of the corresponding feature, even if movements of those features are tracked. In some examples, only the movement of the user's face (e.g., 1024) is tracked or used to affect the virtual avatar, even if other features (e.g., the user's neck (e.g., 1025)) are present in the field of view of the camera.

In some examples, the virtual avatar further includes a third portion (e.g., an upper-neck portion, a portion in between or connecting 1034 to 1036 or 1535 to 1539) that is different from the first portion (e.g., 1034, 1535) and the second portion (e.g., 1036, 1539). In some embodiments, such as that shown in FIG. 10E, the first portion is the tip 1040, the second portion is the lower portion 1036, and the third portion is a middle portion 1031 that forms a portion of the upper portion (e.g., 1034) and connects the tip 1040 of the upper portion to the lower portion 1036. Further in accordance with a determination that the change in pose of the face includes the first type of change in pose of the face (e.g., rotational movement), the electronic device (e.g., 100, 300, 500, 600) moves the third portion of the virtual avatar relative to the second portion of the virtual avatar, wherein the movement of the third portion relative to the second portion is less than the movement of the first portion relative to the second portion. Moving the third portion of the virtual avatar relative to the second portion of the virtual avatar in an amount less than the movement of the first portion relative to the second portion provides the user with feedback indicating that further movement of the same physical feature will cause the device to move the third portion (relative to the second portion) to a lesser degree than it will cause the device to move the first portion (relative to the second portion). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the rotational movement results in a first degree of movement of the first portion (e.g., 1040, 1535) relative to the second portion (e.g., 1036, 1539) of the virtual avatar, and a second degree of movement of the third portion (e.g., 1031) relative to the second portion of the virtual avatar, wherein the second degree of movement is less than the first degree of movement. In some examples, the second portion is a non-facial feature (e.g., a lower neck portion (e.g., 1036, 1539)) that is not mapped to, or directly controlled by, any detected facial features. In some examples, the second portion is not reactive to changes in orientation of the first type. In some examples, the third portion is a non-facial feature (e.g., an upper neck portion) that is not mapped to, or directly controlled by, any detected facial features. In some examples, the third portion provides a connection between the first portion and the second portion. In some examples, the amount of change in the virtual avatar due to the first type of change in pose of the face scales gradually from a small amount of change near the second portion of the virtual avatar (e.g., near 1036) to a large amount of change near the first portion of the virtual avatar (e.g., near 1040).

In some examples, the third portion (e.g., an upper-neck portion, a portion in between or connecting 1034 to 1036 or 1535 to 1539) of the virtual avatar is positioned between the first portion (e.g., 1040, 1535) of the virtual avatar and the second portion (e.g., 1036, 1539) of the virtual avatar. In some examples, the third portion is a middle region of the virtual avatar (e.g., 1031 or an upper-neck region) that has dampened movement characteristics relative to the first portion of the virtual avatar.

In some examples, moving the third portion (e.g., an upper-neck portion, a portion in between or connecting 1034 to 1036 or 1535 to 1539) of the virtual avatar relative to the second portion (e.g., 1036, 1539) of the virtual avatar includes moving the third portion of the virtual avatar about an axis (e.g., 1051) extending between the first portion (e.g., 1034, 1535) of the virtual avatar and the second portion of the virtual avatar. Moving the third portion of the virtual avatar about an axis extending between the first portion and the second portion of the virtual avatar provides the user with feedback indicating that further movement of the same physical feature will cause the device to restrict movement of the third portion about the axis between the first and second portions of the virtual avatar. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, movement of the third portion (e.g., middle portion 1031) is a twisting motion about the axis (e.g., 1051) extending between the first and second portions (e.g., tip 1040 and bottom 1036) of the virtual avatar. In some examples, the movement of the third portion is a rotational movement about an axis that is parallel to the plane of the display or a plane of focus of the one or more cameras (e.g., an up/down axis 1051). In some examples, the movement of the third portion is a rotational movement about an axis extending out of the plane of the display or a plane of focus of the one or more cameras. For example, when the user rotates their face about an axis normal to the plane of the field of view of the camera, portions of the virtual avatar (e.g., the first portion, the second portion, and/or the third portion) are rotated about an axis extending out of the plane of the display.

In some examples, the change in pose of the face includes only the second type of change (e.g., a change in pose that only includes a translational component, without a rotational component), and moving both the first portion (e.g., 1034, 1535) of the virtual avatar and the second portion (e.g., 1036, 1539) of the virtual avatar based on a magnitude of the second type of change in pose of the face includes maintaining the relative position of the first portion of the virtual avatar with respect to the position of the second portion of the virtual avatar. Maintaining the relative position of the first portion of the virtual avatar with respect to the position of the second portion of the virtual avatar provides the user with feedback indicating that further movement of the same type of change will cause the device to move both the first portion of the virtual avatar and the second portion of the virtual avatar in the same direction without moving the first and second portions relative to each other. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, a change in pose of the second type (e.g., a translational change in pose) of the face causes movement of both the first and second portions of the virtual avatar by a similar magnitude, such that the relative positions of the first and second portions remain unchanged (e.g., movement of the first portion and the second portion occurs without moving the first portion relative to the second portion). For example, as shown in FIG. 10F, if the user in the field of view of the camera translates their face with respect to the camera (e.g., shifts their face 1024 in a respective direction parallel to a plane of focus of the one or more cameras or a plane of the display as shown in 1006B, 1006C, and 1006D), both the first portion (e.g., an avatar face or upper portion 1034) and the second portion (e.g., an avatar neck or lower portion 1036) move (e.g., translate as shown in 1016B, 1016C, and 1016D). That is, the portions of the virtual avatar react similarly to the translational movement of the user's face.

While displaying, via the display apparatus, the virtual avatar, the electronic device (e.g., 100, 300, 500, 600) detects (1806) a change in pose (e.g., position and/or orientation) of the face within the field of view of the one or more cameras.

In response to detecting the change in pose of the face, the electronic device (e.g., 100, 300, 500, 600) changes (1808) an appearance of the virtual avatar and can perform one or more of the following operations. In accordance with a determination that the change in pose of the face includes a first type of change in pose of the face (e.g., a change in orientation of the face), the electronic device (e.g., 100, 300, 500, 600) changes (1810) the appearance of the virtual avatar, including moving the first portion (e.g., 1034, 1535) of the virtual avatar relative to the second portion (e.g., 1036, 1539) of the virtual avatar in accordance with a magnitude of the first type of change in pose of the face. Moving the first portion of the virtual avatar relative to the second portion of the virtual avatar in accordance with a magnitude of the first type of change in pose of the face provides the user with feedback indicating that further movement of the same type of change will cause the device to move the first portion of the virtual avatar (with respect to the second portion) in an amount determined by the magnitude of the further movement of the same type. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the movement of the first portion (e.g., 1034, 1535) relative to the second portion (e.g., 1036, 1539) occurs without moving the second portion relative to the displayed frame of view. That is, the first portion moves within the displayed frame of view whereas the second portion remains fixed or substantially fixed within the displayed frame of view as shown in 1015B of FIG. 10E and 1511D of FIG. 15A. In some examples, the movement of the first portion is a rotational movement around an axis, such as a rotation around a y-axis (e.g., vertical axis, as displayed).

In accordance with a determination that the change in pose of the face includes a second type of change in pose of the face (e.g., a change in position of the face), the electronic device (e.g., 100, 300, 500, 600) changes (1812) the appearance of the virtual avatar, including moving both the first portion of the virtual avatar and the second portion of the virtual avatar based on a magnitude of the second type of change in pose of the face. Moving both the first portion of the virtual avatar and the second portion of the virtual avatar based on a magnitude of the second type of change in pose of the face provides the user with feedback indicating that further movement of the same type of change in pose of the face will cause the device to move both the first portion of the virtual avatar and the second portion of the virtual avatar in an amount determined by the magnitude of the further movement of the same type. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. In some examples, the movement of the first portion and the second portion are translational movements along an axis (e.g., along the same axis), such as an x-axis (e.g., a horizontal axis, as displayed).

In some examples (1818), in accordance with a determination that the change in pose of the face includes both the first type of change in pose of the face and the second type of change in pose of the face (e.g., as shown in FIG. 10C), changing the appearance of the virtual avatar includes moving (1820) the first portion (e.g., 1034, 1535) of the virtual avatar relative to the second portion (e.g., 1036, 1539) of the virtual avatar based on a magnitude of the first type of change in pose of the face (e.g., twisting a top (e.g., 1040 or 1034) of the virtual avatar based on rotation of the face from side-to-side with reduced twisting or no twisting of the bottom (e.g., 1036) of the virtual avatar), and moving both the first portion of the virtual avatar and the second portion of the virtual avatar based on a magnitude of the second type of change in pose of the face (e.g., moving the top (e.g., 1040 or 1034) and the bottom (e.g., 1036) of the virtual avatar based on shifting of the face in a particular direction such as up, down, left, or right). Moving the first portion of the virtual avatar relative to the second portion of the virtual avatar based on a magnitude of the first type of change in pose of the face, and moving both the first portion and second portion of the virtual avatar based on a magnitude of the second type of change in pose of the face provides the user with feedback indicating that further movement of both the first and second types of change will cause the device to move the first portion of the virtual avatar (with respect to the second portion) in an amount determined by the magnitude of the further movement of the first type, and to move both the first portion of the virtual avatar and the second portion of the virtual avatar in an amount determined by the magnitude of the further movement of the second type. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

Note that details of the processes described above with respect to method 1800 (e.g., FIG. 18A-18B) are also applicable in an analogous manner to the methods described above and to methods 1900, 2000, 2100 2200, 2300, 2400, and 2500, described below. For example, method 1800 optionally includes one or more of the characteristics of the various methods described below and above with reference to methods 800, 900, 1900, 2000, 2100, 2200, 2300, 2400, and 2500. For example, the methods of generating, sending, and receiving animated avatars in accordance with method 800 and 900 may employ virtual avatars (e.g., virtual avatars that have portions that react differently to different types of change in pose) generated in accordance with method 1800. Similarly, virtual avatars generated and/or modified in accordance method 1800 may be included in the displayed preview of a virtual avatar in a virtual avatar generation interface (e.g., 804, 904) of method 800 or 900. For another example, virtual avatars (e.g., virtual avatars that have portions that react differently to different types of change in pose) generated in accordance with method 1800 may also be generated in accordance with the virtual avatar generation and modification methods of methods 800, 900, 1900, 2000, 2100, 2200, 2300, 2400, and 2500. For example, a virtual avatar generated in accordance with method 1800 may include one or more animated effects (e.g., 1140, 1142, 1252, 1452, 1531, 1555, 1652). Similarly, a virtual avatar generated in accordance with method 1800 may include an avatar feature (e.g., 1133) that reacts (e.g., 1904, 1910, 1914) to changes in both first (e.g., 1122) and second (e.g., 1120A-B) physical features. For brevity, further examples are excluded.

Figure 19:
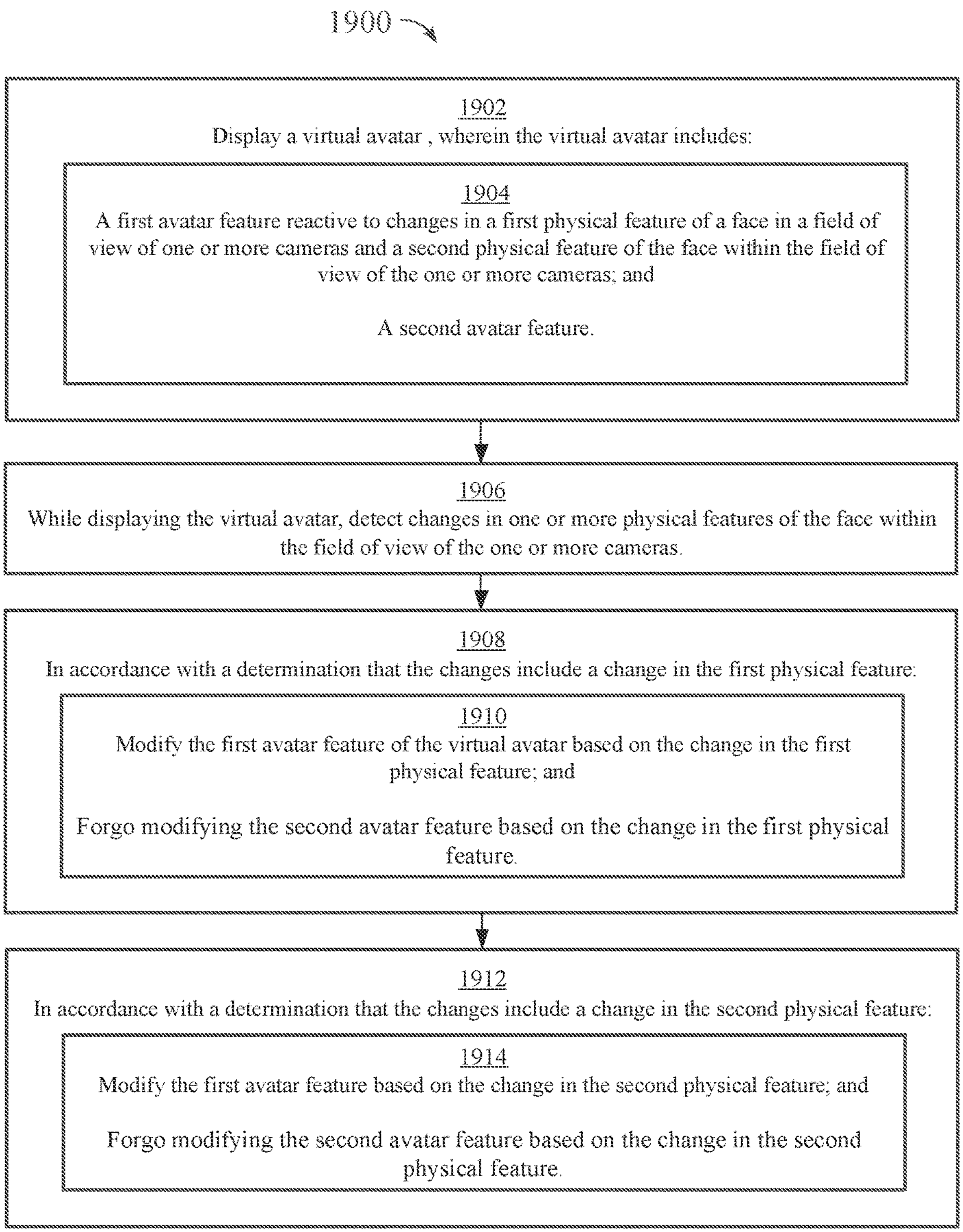
FIG. 19 is a flow diagram illustrating a method for generating and modifying a virtual avatar based on a face detected by one or more cameras.

FIG. 19 is a flow diagram illustrating a method, at an electronic device, for generating a virtual avatar based on a face detected by one or more cameras in accordance with some embodiments. Method 1900 is performed at an electronic device (e.g., 100, 300, 500, 600) with one or more cameras (e.g., 164, 602) and a display apparatus (e.g., 112, 340, 504, 601). Some operations in method 1900 are, optionally, combined, the orders of some operations are, optionally, changed, and some operations are, optionally, omitted.

As described below, method 1900 provides an intuitive way for generating virtual avatars, while reacting to changes in position of the user's face. The method reduces the cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 1900 may be found in the user interfaces and virtual avatars discussed with reference to FIGS. 11A-11C, 14A-14D, and 17A-17B.

The electronic device (e.g., 100, 300, 500, 600) displays (1902), via the display apparatus (e.g., 112, 340, 504, 601) a virtual avatar (e.g., 1100, 1400, 1700). In some examples (1904), the virtual avatar includes a first avatar feature (e.g., ears 1133 of an animal-based avatar 1100, ears 1433 of a robot avatar 1400, nose 1736 of an animal-based avatar 1700) and a second avatar feature (e.g., 1132, 1440, 1730). The first avatar feature is reactive to changes in a first physical feature (e.g., 1122, 1420A/1420B, 1722) of a face (e.g. 1124, 1424, 1724) in a field of view of the one or more cameras (e.g., 164, 602) and a second physical feature of the face within the field of view of the one or more cameras. In some embodiments the first physical feature is a distinctly identified user facial feature such as an eyebrow (1122), a single facial muscle (e.g., the corrugator supercilii or the frontalis muscle), or a collection of related facial muscles (e.g., a set of muscles that control movement of an eyebrow (1122), including the currugator supercilii and the frontalis muscle), and the second physical feature is a distinctly identified user facial feature such as a mouth (1120) or portion of a user's lip (1720A), a single facial muscle (e.g., the zygomaticus major or the levator labii superioris), or a collection of related facial muscles (e.g., a set of muscles that control movement of the mouth (e.g., such as when smiling), including the zygomaticus major and the levator labii superioris). Displaying a virtual avatar having a first avatar feature reactive to changes in a first physical feature of a face in the field of view of one or more cameras provides the user with options for controlling modifications to portions of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the virtual avatar (e.g., 1100, 1400, 1700), the electronic device (e.g., 100, 300, 500, 600) detects (1906) changes (e.g., displacement or movement) in one or more physical features (e.g., 1122, 1420A/1420B, 1722) of the face (e.g., 1124, 1424, 1724) within the field of view of the one or more cameras (e.g., 164, 602).

In accordance with a determination (1908) that the changes include a change in the first physical feature (e.g., a raising or lowering of the user's eyebrow (1122, 1722), or a change in position of the user's lips (1420A/1420B)), the electronic device (e.g., 100, 300, 500, 600) modifies (1910) the first avatar feature (e.g., 1133, 1430, 1736) of the virtual avatar (e.g., 1100, 1400, 1700) based on the change in the first physical feature, and forgoes modifying the second avatar feature (e.g., 1132, 1440, 1730) based on the change in the first physical feature. Modifying the first avatar feature of the virtual avatar based on the change in the first physical feature, and forgoing modifying the second avatar feature based on the change in the first physical feature, provides the user with feedback indicating that further movement of, or changes to, the same physical feature will cause the device to change the first avatar feature without changing the second avatar feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. In some embodiments, when the user moves (e.g., raises or lowers) their eyebrow 1122, the first avatar feature (e.g., the avatar's ear 1133) moves in response to the eyebrow movement, and the second avatar feature (e.g., the eyes 1132 of the avatar 1100) does not move in response to the eyebrow movement.

In some embodiments, the change in the first physical feature (e.g., 1122) includes at least a vertical displacement of the first physical feature of the face (e.g., the user raises or lowers their eyebrows 1122), and modifying the first avatar feature (e.g., 1133) based on the change in the first physical feature includes moving the first avatar feature in a direction that includes at least one of a vertical displacement (e.g., an inferior or superior vertical movement either towards (superior) or away from (inferior) the top of the virtual avatar's head (e.g., 1135)) of at least a portion of the first avatar feature and a horizontal displacement (e.g., a medial or lateral horizontal movement either towards (medial) or away from (lateral) the top of the virtual avatar's head) of at least a portion of the first avatar feature. Modifying the first avatar feature based on the change in the first physical feature by moving the first avatar feature in a direction that includes at least one of a vertical displacement of at least a portion of the first avatar feature and a horizontal displacement of at least a portion of the first avatar feature provides the user with feedback indicating that further movement of the same physical feature will cause the device to move the first avatar feature in at least one of a horizontal and vertical direction. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, when the user raises their eyebrows (e.g., 1122), the eyebrows move in a vertical direction towards the top of the user's head (e.g., in an upward, or superior, direction). In response to this upward (e.g., superior) vertical movement of the user's eyebrows, the ears of the virtual avatar (e.g., ears 1133 of bear avatar 1100) move in a direction towards the top of the avatar's head (e.g., 1135). In some examples, the direction of movement towards the top of the avatar's head includes a superior (e.g., upward) vertical displacement (e.g., when the ears are positioned on a side portion of the avatar's head), a medial horizontal displacement (e.g., when the ears are positioned on a top portion of the avatar's head), or a combination thereof. In some examples, when the user lowers their eyebrows (e.g., 1122), the eyebrows move in a vertical direction away from the top of the user's head (e.g., in a downward, or inferior, direction). In response to this downward (e.g., inferior) vertical movement of the user's eyebrows, the ears (e.g., 1133) of the virtual avatar move in a direction away from the top of the avatar's head. In some examples, the direction of movement away from the top of the avatar's head includes an inferior (e.g., downward) vertical displacement (e.g., when the ears are positioned on a side portion of the avatar's head), a lateral horizontal displacement (e.g., when the ears are positioned on a top portion of the avatar's head), or a combination thereof.

In some embodiments, the change in the first physical feature (e.g., the user's mouth 1120) includes at least a displacement (e.g., horizontal or vertical displacement (e.g., translation)) of the first physical feature of the face. For example, the corners 1120A and 1120B of the user's mouth 1120 have a position that is vertically displaced (e.g., in a downward direction towards the bottom of the user's head (e.g., the user's chin), or in an upward direction towards the top of the user's head, when compared to the position of the corners of the user's mouth in a neutral, resting position). In such embodiments, modifying the first avatar feature (e.g., an ear 1133 of the virtual avatar) of the virtual avatar (e.g., 1100) based on the change in the first physical feature includes rotating (e.g., curling, uncurling, folding, unfolding, etc.) at least a portion of the first avatar feature. Rotating at least a portion of the first avatar feature, based on the change in the first physical feature, provides the user with feedback indicating that further movement of the same physical feature will cause the device to move the first avatar feature in the rotating direction. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, a distal end of the first avatar feature (e.g., the tip of the virtual avatar's ear 1133) is rotated in a direction along an axis extending between the distal end of the first avatar feature and a proximal end of the first avatar feature (e.g., the base of the avatar's ear 1133), wherein the direction of rotation is determined in accordance with the vertical displacement of the at least a portion of the first physical feature of the face. In some examples, when the user raises the corners of their mouth (e.g., 1120A/1120B) (e.g., in a smiling expression), the tips of the ears (e.g., 1133) of the virtual avatar (e.g., 1100) move in an unfolding or uncurling manner in a direction extending from the base of the avatar's ear. In some examples, when the user lowers the corners of their mouth (e.g., in a sad expression), the tips of the ears of the virtual avatar move in a folding or curling manner in a direction towards the base of the avatar's ear (e.g., as shown in 1102D and 1112D of FIG. 11B).

In some embodiments, the first avatar feature includes an avatar ear (e.g., 1133), the first physical feature includes at least a corner region (e.g., 1120A or 1120B) of a user's mouth (e.g., 1120), the change in the first physical feature includes at least a displacement of the at least a corner region of the user's mouth, and modifying the first avatar feature based on the change in the first physical feature includes rotating at least a portion of the avatar ear based on a magnitude of the displacement of the at least a corner region of the user's mouth. One example of such an embodiment is illustrated in 1102A and 1112A and is described in greater detail above with respect to FIG. 11B, showing the curling (e.g., rotating) of the avatar's ear is controlled by movements of the corner of the user's mouth.

In some embodiments, the second physical feature includes at least a portion of a user's eyebrow (e.g., 1122), the changes in the one or more physical features of the face includes a vertical shift in the position of the user's eyebrow, and modifying the first avatar feature (e.g., 1133) based on the change in the second physical feature includes shifting a position of the avatar ear (e.g., 1133) vertically (e.g., an inferior or superior vertical movement either towards (superior) or away from (inferior) the top of the virtual avatar's head). In some examples, the avatar's ears are reactive to both the corner (e.g., 1120A and/or 1120B) of the user's mouth (e.g., 1120) and the user's eyebrows (e.g., 1122). In some such embodiments, the corner of the user's mouth controls curling (e.g., rotation) of the avatar ears while the user's eyebrows control the position (e.g., the vertical position) of the avatar's ears.

In some embodiments, the first avatar feature includes an avatar ear (e.g., 1133), the first physical feature includes at least a portion of a user's eyebrow (e.g., 1122), the changes in the one or more physical features of the face includes a vertical shift in the position of the user's eyebrow, and modifying the first avatar feature of the virtual avatar (e.g., 1100) based on the change in the first physical feature includes shifting a position of the avatar ear horizontally. In some examples, the avatar ears shift inward as the user's eyebrow moves up. An example of such an embodiment is illustrated in 1101B and 1111B and is described in greater detail above with respect to FIG. 11A. In some examples, the avatar ears shift outward as the user's eyebrow moves down (for example, as the user's eyebrows (e.g., 1122) lower from their raised position, the avatar's ears move from their inward position (e.g., as shown in 1111B) in an outward direction to their neutral position (e.g., as shown in 1111A)). In some examples, the avatar has two ears each reactive to a respective user eyebrow. In such embodiments, raising both user's eyebrows would result in both ears shifting inward, reducing the spacing between the ears.

In accordance with a determination (1912) that the changes include a change in the second physical feature (e.g., a raising or lowering of the corners 1120A and 1120B of the user's mouth 1120), the electronic device (e.g., 100, 300, 500, 600) modifies (1914) the first avatar feature (e.g., 1133) based on the change in the second physical feature, and forgoes modifying the second avatar feature (e.g. 1132) based on the change in the second physical feature. Modifying the first avatar feature based on the change in the second physical feature, and forgoing modifying the second avatar feature based on the change in the second physical feature, provides the user with feedback indicating that further movement of, or changes to, the same physical feature will cause the device to change the first avatar feature without changing the second avatar feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, when the user moves (e.g., raises or lowers) the corners (1120A and 1120B) of their mouth (1120), the first avatar feature (e.g., the avatar's ears 1133) moves in response to the movement of the corners of the mouth, and the second avatar feature (e.g., the eyes 1132 of the avatar 1100) does not move in response to the movement of the corners of the mouth.

In some embodiments, the second avatar feature (e.g., 1132) is reactive to changes in a third physical feature (e.g., 1123) that is different from the first physical feature and the second physical feature. Displaying a virtual avatar having a second avatar feature reactive to changes in a third physical feature that is different from the first physical feature and the second physical feature provides the user with options for controlling modifications to a second portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

For example, the second avatar feature (e.g., avatar eyes 1132) is not primarily reactive (or, optionally, unreactive) to changes in the first physical feature (e.g., user eyebrows 1122) and changes in the second physical feature (e.g., the user's mouth 1120). In other words, the second avatar feature is not directly modified based on a change in the facial features (e.g., the first and second physical features 1122 and 1120), but may be affected by other changes in the avatar that are directly reactive to the changes in the face. For example, the avatar feature (e.g., 1132) is modeled based on one or more of the location, movement characteristics, size, color, and/or shape of the physical feature (1123). In accordance with a determination that the changes in the one or more physical features of the face include a change in the third physical feature of the face (e.g., a distinctly identified user facial feature such as the iris or an eyelid, a single facial muscle (e.g., the orbicularis oculi muscle), or a collection of related facial muscles (e.g., a set of muscles that control movement of an eyelid, including the orbicularis oculi muscle)), the electronic device modifies the second avatar feature based on the change in the third physical feature. Modifying the second avatar feature based on the change in the third physical feature provides the user with options for controlling modifications to portions of the virtual avatar without requiring displayed user interface control (e.g., touch control) elements. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the first avatar feature (e.g., 1133) is anatomically distinct from at least one of the first physical feature (e.g., 1122) and the second physical feature (e.g., 1120), and the second avatar feature (e.g., 1132) anatomically corresponds to the third physical feature (e.g., 1123). In other words, the first avatar feature does not anatomically/physiologically correspond to the first physical feature (e.g., 1122) or second physical feature (e.g., 1120). In some embodiments, the first avatar feature is ears (e.g., 1133) of an animal-based virtual avatar (e.g., 1100), the first physical feature is an eyebrow (e.g., 1122), and the second physical feature is a mouth (e.g., 1120). In some examples, the second avatar feature is avatar eyes (e.g., 1132) that anatomically/physiologically correspond to the third physical feature (e.g., the user's eyes 1123). In some embodiments, the first avatar feature (e.g., avatar ears 1133) anatomically corresponds to a fourth physical feature (e.g., the user's ears). In some embodiments, despite anatomically corresponding to the fourth physical feature (e.g., the user's ears), the first avatar feature (e.g., avatar ears 1133) does not react (e.g., is unreactive) to changes in the fourth physical feature. For example, the first avatar feature can be avatar ears (e.g., 1133) that react to changes in the user's mouth (e.g., 1120) and eyebrows (e.g., 1122), but that do not react to movement of the user's ears.

In some embodiments, modifying the second avatar feature (e.g., 1132) based on the change in the third physical feature (e.g., 1123) includes modifying the second avatar feature based on a magnitude of the change in the third physical feature. Modifying the second avatar feature based on a magnitude of the change in the third physical feature provides the user with feedback indicating that further movement of the same physical feature will cause the device to change the second avatar feature in an amount determined by the magnitude of the further movement of the same physical feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the magnitude of a reaction of an avatar feature corresponds to a magnitude of a change in a physical feature of the user. In some embodiments, the magnitude of the change in the physical feature is determined in accordance with a potential range of motion of the physical feature, wherein the magnitude is representative of a relative position of the physical feature within the range of motion (e.g., the predicted or modeled range of motion) of that physical feature. In such embodiments, the magnitude of the reaction of the avatar feature is similarly a relative position of the avatar feature within a range of motion of the avatar feature. In some embodiments, the magnitude of change is determined based on a comparison or measurement (e.g., a distance) of the starting position and ending position of the physical feature, through the change. In such embodiments, the change in the physical feature (e.g., first physical feature (e.g., 1122)) may be translated to a modification of the first avatar feature (e.g., 1133) by applying the measured change in the physical feature to the avatar feature (e.g., directly or as a scaled or adjusted value).

In some embodiments, modifying the second avatar feature (e.g., 1132) of the virtual avatar (e.g., 1100) based on the change in the second physical feature (e.g., 1120) includes modifying a pose (e.g., a rotational orientation, the angle at which the avatar feature is displayed, or a displayed position) of at least a portion of the second avatar feature based on a direction of a change in pose of the third physical feature (e.g., 1123) (e.g., a direction of rotation, a direction of change in the angle of the physical feature with respect to the field of view of the one or more cameras, or a direction of translation). Modifying a pose of at least a portion of the second avatar feature based on a direction of a change in pose of the third physical feature provides the user with feedback indicating that further movement of the third physical feature in a particular direction will cause the device to change a pose of the second avatar feature based on the direction of the further movement of the third physical feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, modifications to an avatar feature have both a magnitude component and a directional component. In some examples, the directional component of the modification in the avatar feature is based on a directional component of a change in the one or more physical features that the avatar feature is reactive to. In some examples, the directional component of the change in the avatar feature is the same as the directional component of the change in the physical feature. For example, as shown in 1702D and 1712D of FIG. 17B, when the physical feature (e.g., mouth 1720) moves down, the avatar feature (e.g., avatar mouth 1730) moves down. In some examples, the directional component of the change in the avatar feature is mirrored with respect to the directional component of the change in the physical feature. For example, as shown in 1702A/1712A and 1702B/1712B of FIG. 17B, when the physical feature (e.g., mouth 1420) moves left, the avatar feature (e.g., avatar mouth 1430) moves right, and vice versa. In some examples, such as that shown in FIGS. 11A-11B, 14A-14D and 17B, the directional component of the change in the avatar feature is the same as the directional component of the change in the physical feature for movement along a vertical axis and mirrored for movement along a horizontal axis, similar to the effect seen when looking in a mirror.

In some examples, a change in relative position of a physical feature (e.g., the user's iris (e.g., 1423A) or eyelid) is in a direction determined from a neutral, resting position of the physical feature. In some examples, the neutral, resting position of a user's iris is determined to be a particular position (e.g., centered) relative to the perimeter of the user's eyeball. In some examples, the direction of a reaction of an avatar feature corresponds (e.g., directly or inversely) to a relative direction of a change in a physical feature of the user. In some examples, the relative direction of the change in the physical feature is determined based on a direction of movement of the physical feature from a neutral, resting position of the physical feature. In some examples, the direction of the reaction of the avatar feature corresponds directly (e.g., the physical feature moves up, the avatar feature moves up) to the relative direction of the change in the physical feature. In some examples, the direction of the reaction of the avatar feature corresponds inversely (e.g., the physical feature moves up, the avatar feature moves down) to the relative direction of the change in the physical feature.

In some embodiments, the first avatar feature includes an avatar mouth (e.g., 1430), and the second avatar feature includes at least a portion of avatar teeth (e.g., 1440). For example, in the embodiment shown in FIG. 14C, avatar teeth (e.g., 1440) are displayed as an upper set of teeth (e.g., 1440A) and a lower set of teeth (e.g., 1440B) within the perimeter of the avatar mouth (e.g., 1430), and movement of the teeth in a vertical direction (e.g., representing opening or closing the avatar's mouth—without moving the avatar's mouth) is indicated by increasing or decreasing a vertical spacing (e.g., 1441) between upper and lower sets of the avatar teeth as shown in 1413C of FIG. 14C. In some embodiments, the first physical feature includes at least a portion of a user's lip (e.g., 1420A or 1420B), the third physical feature includes at least a portion of a user's mouth (e.g., 1420C and 1420D), the change in the first physical feature includes a displacement of the at least a portion of the user's lip from a first position (e.g., 1401A) to a second position (e.g., 1403A), and modifying the first avatar feature of the virtual avatar based on the change in the first physical feature includes modifying a shape of the avatar mouth (e.g., 1430) based on the second position of the at least a portion of the user's lip. For example, the avatar mouth (e.g., 1430) does not move in a vertical direction (e.g., open or close). Instead, changes in the avatar mouth (e.g., 1430) are indicated by changing a shape of the avatar mouth (e.g., to indicate an expression associated with the avatar's mouth shape), wherein the shape change of the avatar mouth is driven by changes in the user's lips (e.g., 1420A and 1420B).

In some examples, the mouth forms a trapezoid shape (e.g., as shown in 1413A or 1413B) to indicate a frown or a smile. For example, the trapezoid shape corresponds to a smile (e.g., 1413A) when the top edge of the trapezoid (e.g., 1430U) is longer than the bottom edge of the trapezoid (e.g., 1430L), and the trapezoid shape corresponds to a frown (e.g., 1413B) when the top edge of the trapezoid is shorter than the bottom edge of the trapezoid. In some examples, the mouth forms a circular shape (e.g., 1430 in 1414D) to indicate a pucker expression or surprised expression.

In some embodiments, such as that shown in FIG. 14C, the change in the third physical feature includes opening or closing the at least a portion of the user's mouth, and modifying the second avatar feature based on the change in the third physical feature includes modifying a vertical spacing (e.g., 1441) between a first portion of the avatar teeth (e.g., the set of upper teeth 1440A) and a second portion of the avatar teeth (e.g., the set of lower teeth 1440B), wherein a magnitude of the vertical spacing is based on a magnitude of the opening or closing of the at least a portion of the user's mouth (e.g., 1420C and 1420D). In some embodiments, a vertical spacing 1441 between the upper and lower sets of teeth indicates an opening between the avatar's top set of teeth and the avatar's bottom set of teeth without adjusting the shape of the avatar's mouth 1430. In some examples, the spacing between the upper and bottom teeth can be used to simulate a talking action by the virtual avatar (e.g., when the virtual avatar is a robot 1400).

In some embodiments, the electronic device (e.g., 100, 300, 500, 600) modifying the first avatar feature (e.g., 1133) of the virtual avatar (e.g., 1100) based on the change in the first physical feature includes modifying the first avatar feature based on a magnitude of the change in the first physical feature (e.g., a degree of change in the position of the first physical feature (e.g., 1122)), and modifying the first avatar feature based on the change in the second physical feature (e.g., 1120) includes modifying the first avatar feature based on a magnitude of the change in the second physical feature. In some embodiments, the magnitude of change is determined based on the starting position and ending position of the physical feature (e.g., 1122 or 1120). In some embodiments, the magnitude of change is determined as a percentage of change within a maximum range of change.

In some embodiments, modifying the first avatar feature (e.g., 1133) of the virtual avatar (e.g., 1100) based on the change in the first physical feature (e.g., 1122) includes modifying a pose (e.g., a rotational orientation, the angle at which the avatar feature is displayed, or a displayed position) of at least a portion of the first avatar feature based on a direction of a change in pose of the first physical feature (e.g., a direction of rotation, a direction of change in the angle of the physical feature with respect to the field of view of the one or more cameras, or a direction of translation). Modifying a pose of at least a portion of the first avatar feature based on a direction of a change in pose of the first physical feature provides the user with feedback indicating that further movement of the first physical feature in a particular direction will cause the device to change a pose of the first avatar feature based on the direction of the further movement of the first physical feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, modifying the first avatar feature (e.g., 1133) of the virtual avatar based on the change in the second physical feature (e.g., 1120) includes modifying the pose (e.g., a rotational orientation, the angle at which the avatar feature is displayed, or a displayed position) of at least a portion of the first avatar feature based on a direction of a change in pose of the second physical feature (e.g., a direction of rotation, a direction of change in the angle of the physical feature with respect to the field of view of the one or more cameras, or a direction of translation). Modifying a pose of at least a portion of the first avatar feature based on a direction of a change in pose of the second physical feature provides the user with feedback indicating that further movement of the second physical feature in a particular direction will cause the device to change a pose of the first avatar feature based on the direction of the further movement of the second physical feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the changes in the one or more physical features of the face include a change in the first physical feature (e.g., 1122) of a first magnitude and a change in the second physical feature (e.g., 1120) of a second magnitude, and modifying the first avatar feature (e.g., 1133) of the virtual avatar (e.g., 1100) includes modifying the first avatar feature by a modification magnitude based on both the first magnitude and the second magnitude. One example of such an embodiment is illustrated in 1101D and 1111D and is discussed in greater detail above with respect to FIG. 11A. In some examples, the modification magnitude is the sum of the first magnitude and the second magnitude. In some examples, the modification magnitude is based on a weighted sum of the first magnitude and the second magnitude. For example, the magnitude of the change in the first physical feature may have a greater effect (e.g., a 1× or 2×) effect on the modification magnitude, as compared to the second magnitude.

In some embodiments, the first avatar feature includes an avatar eye (e.g., 1432B), the first physical feature includes at least a portion of a user's eye (e.g., 1423), the second physical feature includes at least a portion of a user's eyebrow (e.g., 1422), the change in the first physical feature includes at least one of a displacement of an iris portion (e.g., 1423A) of the user's eye (e.g., a change in gaze or a translation of the user's iris (e.g., 1423A) when the user moves their eye to look in a particular direction as shown in 1401B and 1401C of FIG. 14A) and a change in a size of the at least a portion of the user's eye (e.g., a change in the visible amount of the user's eye (e.g., 1423) as shown in 1402A and 1402B of FIG. 14B) (e.g., a magnitude (e.g., a percentage of a maximum range) of the eye's openness), and the change in the second physical feature includes at least a vertical displacement of the at least a portion of the user's eyebrow (e.g., 1422). In such embodiments, modifying the first avatar feature based on the change in the first physical feature includes translating at least a portion of the avatar eye (e.g., the avatar eye (e.g., 1432A) looks in a particular direction as shown in 1411B and 1411C) when the change in the first physical feature includes the displacement of the iris portion (e.g., 1423A) of the user's eye (e.g., as shown in 1401B and 1401C).

In some embodiments, modifying the first avatar feature based on the change in the first physical feature includes adjusting a size of at least a portion of the avatar eye (e.g., the size of an iris portion (e.g., 1432B) of the avatar eye increases or decreases with changes in the size (e.g., the openness) of the user's eye (e.g., as shown in 1402A, 1402B, 1412A, and 1412B)) when the change in the first physical feature includes the change in the size of the at least a portion of the user's eye (e.g., a magnitude (e.g., a percentage of a maximum range) of the eye's openness). In some examples, the avatar is a robot (e.g., 1400) and the robot eye mimics a camera shutter, wherein the iris (e.g., 1432B) of the avatar eye corresponds to the aperture of the camera shutter. In such embodiments, the increase/decrease in the size of the iris portion of the avatar eye is caused by increasing/decreasing the aperture formed in the robot eye in a manner similar to adjusting the aperture in a camera shutter.

In some embodiments, modifying the first avatar feature based on the change in the second physical feature includes adjusting a degree of rotation of at least a portion of the avatar eye (e.g., 1431), wherein the degree of rotation is based on the vertical displacement of the at least a portion of the user's eyebrow (e.g., 1422). For example, when the avatar is a robot (e.g., 1400), the avatar eye includes a line (e.g., a horizontal line (e.g., 1431) when the avatar eye is in a neutral, resting position) that represents an avatar pseudo-eyebrow that is incorporated into the avatar eye (e.g., 1432). In some examples, rotation of the avatar eye (e.g., 1432) is represented by a rotation in the position of the line (e.g., 1431), wherein the rotated position of the line can be used to indicate an eyebrow position of the robot avatar. In some examples, the degree to which the avatar eyes (and the line) rotate or tilt is determined based on the magnitude of the vertical displacement of the user's eyebrow.

In some embodiments, the first avatar feature includes at least a portion of an avatar nose (e.g., 1736), the first physical feature includes at least a portion of a user's eyebrow (e.g., 1722), the second physical feature includes at least a portion of a user's lip (e.g., 1720A), the change in the first physical feature includes at least a vertical displacement of the at least a portion of the user's eyebrow (e.g., shown in 1701B), modifying the first avatar feature of the virtual avatar based on the change in the first physical feature includes modifying a position of the avatar nose based on a direction of the vertical displacement of the at least a portion of the user's eyebrow (e.g., the user's eyebrow (e.g., 1722) moves in a downward direction away from the top of the user's head when the eyebrows form a portion of a sneer pose as shown in 1701B), wherein the position of the avatar nose is modified in a direction that is determined based on (e.g., inversely related to) the direction of vertical displacement of the at least a portion of the users' eyebrow. For example, when the eyebrows move in the downward direction, the avatar nose (e.g., 1736) is raised in an upward direction towards the top of the avatar's head (e.g., 1735). In some embodiments, the change in the second physical feature includes at least one of a horizontal displacement of the at least a portion of the user's lip (e.g., when moving the user's mouth or lip in a left or right direction (as shown in 1702A and 1702B)) and a vertical displacement of the at least a portion of the user's lip (e.g., when raising the user's lip (e.g., upper lip 1720A) in a sneer pose as shown in 1701B), and modifying the first avatar feature of the virtual avatar based on the change in the second physical feature includes further modifying the position of the avatar nose based on at least one of a direction of the horizontal displacement of the at least a portion of the user's lip and a direction of the vertical displacement of the at least a portion of the user's lip, wherein the position of the avatar nose is further modified in a direction that corresponds to the direction of the horizontal displacement of the at least a portion of the user's lip. For example, when the user's lip (e.g., upper lip 1720A and/or lower lip 1720B) is pulled to a side (e.g., left or right as shown in 1702A and 1702B) of a user's face, the user's lip has a horizontal displacement in a left or right direction, and the avatar nose moves in direction that corresponds to the left/right direction of the user's lip (as shown in 1712A and 1712B). In some examples, this movement of the avatar nose corresponds to the horizontal movement of the user's lip by moving in a mirrored direction (e.g., if the user's lip moves to the right side of the user's face (from the perspective of the field of view as shown in 1702A), the avatar nose moves in a direction towards the left side of the avatar's face (as shown in 1712A), and vice-versa) and in a direction that corresponds to the direction of the vertical displacement of the at least a portion of the user's lip (e.g., when the user's lip (e.g., upper lip 1720A) is raised in a sneer pose (as shown in 1701B), the lip has a vertical displacement in a direction towards the top of the user's head, and the avatar nose also moves in a corresponding direction towards the top of the avatar's head 1735 as shown in 1711B).

In some embodiments, the first avatar feature includes an avatar hair feature (e.g., mane 1552), the first physical feature includes at least a portion of a user's eyebrow (e.g., 1522), the second physical feature includes at least a portion of a user's head (e.g., 1528), the change in the first physical feature includes at least a vertical displacement of the at least a portion of the user's eyebrow (e.g., as shown in 1501C), and the change in the second physical feature includes a change in pose (e.g., rotation along the x (e.g., nodding of the head) or y (e.g., shaking head side-to-side) axes) of the user's head (e.g., 1501D). In this embodiment, modifying the first avatar feature of the virtual avatar based on the change in the first physical feature includes displacing at least a portion of the avatar hair (e.g., mane) feature based on a direction of the vertical displacement of the at least a portion of the user's eyebrow. For example, in 1501C the user's eyebrow moves in an upward direction away from the bottom of the user's head, and, in 1511C, a portion of the avatar mane (e.g., 1552A located at the top of the avatar's head 1535) moves in an upward direction away from the bottom of the avatar's head. In some embodiments, when the user's eyebrow moves in a downward direction towards the bottom of the user's head, the portion of the avatar mane (e.g., located at the top of the avatar's head) moves in a downward direction towards the bottom of the avatar's head, and modifying the first avatar feature of the virtual avatar based on the change in the second physical feature includes rotating at least a portion of the avatar hair feature (e.g., mane 1552) based on a direction or magnitude of the change in pose of the user's head (e.g., 1511D).

Note that details of the processes described above with respect to method 1900 (e.g., FIG. 19) are also applicable in an analogous manner to the method 1800 described above and the methods described below. For example, method 1900 optionally includes one or more of the characteristics of the various methods described below with reference to methods 800, 900, 1800, 2000, 2100, 2200, 2300, 2400, and 2500. For example, the methods of generating, sending, and receiving animated avatars in accordance with method 800 may employ virtual avatars (e.g., avatars generated while reacting to changes in position of the user's face) generated in accordance with method 1900. Similarly, virtual avatars and animated effects generated and/or modified in accordance method 1900 may be included in the displayed preview of a virtual avatar in a virtual avatar generation interface (e.g., 804, 904) of method 800 or 900. For another example, virtual avatars (e.g., avatars generated while reacting to changes in position of the user's face) generated in accordance with method 1900 may also be generated in accordance with the virtual avatar generation and modification methods of methods 800, 900, 1800, 2000, 2100, 2200, 2300, 2400, and 2500. For example, a virtual avatar generated in accordance with method 1900 may include a first avatar portion (e.g., 1535) that reacts differently than a second avatar portion (e.g., 1539) to changes in pose of a user's face, depending on the type of change in pose (e.g., 1810 and 1812). For brevity, further examples are excluded.

Figure 20:
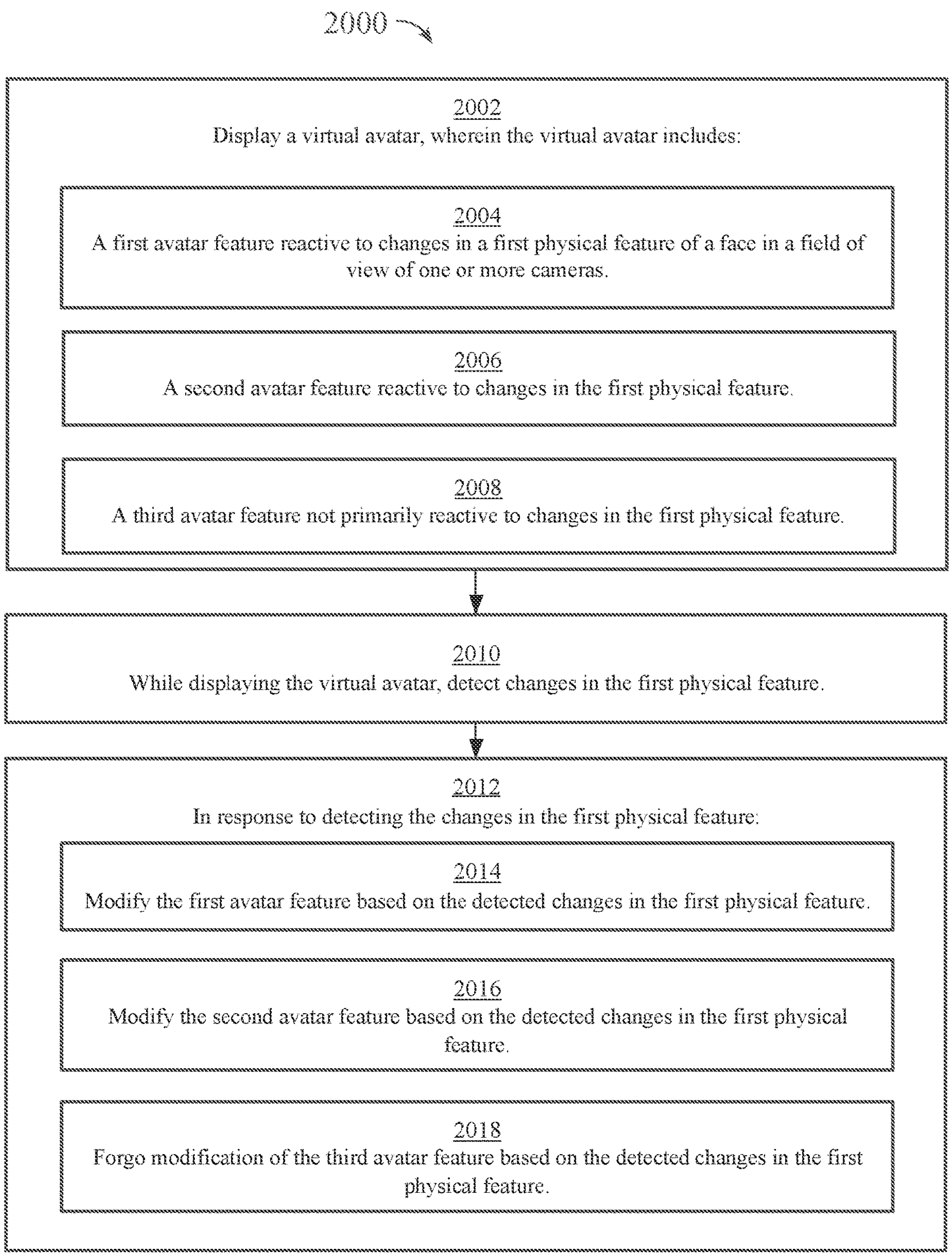
FIG. 20 is a flow diagram illustrating a method for generating and modifying a virtual avatar based on a face detected by one or more cameras.

FIG. 20 is a flow diagram illustrating a method, at an electronic device, for generating a virtual avatar based on a face detected by one or more cameras in accordance with some embodiments. Method 2000 is performed at an electronic device (e.g., 100, 300, 500, 600) with one or more cameras (e.g., 164, 602) and a display apparatus (e.g., 112, 340, 504, 601). Some operations in method 2000 are, optionally, combined, the orders of some operations are, optionally, changed, and some operations are, optionally, omitted.

As described below, method 2000 provides an intuitive way for generating virtual avatars, while reacting to changes in position of the user's face. The method reduces the cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 2000 may be found in the user interfaces and virtual avatars discussed with reference to FIGS. 11A-11C, 13, 14A-14D, 15A-15B, 16A-16B, and 17A-17B.

The electronic device (e.g., 100, 300, 500, 600) displays (2002), via the display apparatus (e.g., 112, 340, 504, 601) a virtual avatar (e.g., 1100, 1300, 1400, 1500, 1600, 1700). In some examples, the virtual avatar includes (2004) a first avatar feature (e.g., an avatar's eyebrow (e.g., 1538), mouth (e.g., 1130, 1330, 1430, 1730), cheek (e.g., 1633), or a non-human equivalent avatar feature such as an inner portion of one or more camera lenses (e.g., 1431) or antenna (e.g., 1434) of a robotic avatar (e.g., 1400)) reactive to changes in a first physical feature (e.g., the user's mouth (e.g., 1120, 1320, 1420, 1720), eyebrow (e.g., 1422, 1522), or cheek (e.g., 1628)) of a face within the field of view of the one or more cameras (e.g., 164, 602). Displaying a virtual avatar having a first avatar feature reactive to changes in a first physical feature of a face in the field of view of one or more cameras provides the user with options for controlling modifications to a first portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The virtual avatar also includes (2006) a second avatar feature (e.g., an avatar's ear (e.g., 1133, 1433) or nose (e.g., 1736), or non-human equivalent avatar features such as whiskers (e.g., 1342), a mane (e.g., 1552), a wattle (e.g., 1650), or an antenna (e.g., 1434) of a robotic avatar (e.g., 1400)) reactive to changes in the first physical feature. Displaying a virtual avatar having a second avatar feature reactive to changes in the first physical feature of a face in the field of view of one or more cameras provides the user with options for controlling modifications to a second portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The virtual avatar also includes (2008) a third avatar feature (e.g., a nose (e.g., 1436), eyebrow (e.g., 1138, 1738), eyelid (e.g., 1348), mouth (e.g., 1530) or a non-human equivalent avatar feature such as an inner portion of one or more camera lenses (e.g., 1431) of a robotic avatar (e.g., 1400)) not primarily reactive (e.g., optionally reactive) to changes in the first physical feature. For example, the third avatar feature is not directly modified based on a change in the facial features (e.g., the first physical feature), but may be affected by other changes in the avatar that are directly reactive to the changes in the facial features. For example, in some embodiments the third avatar feature may include whiskers (e.g., 1342) that are not reactive to changes in a first physical feature such as the user's mouth (e.g., 1320), but move in response to movement of the avatar mouth (e.g., 1330), which is driven by movement of the first physical feature (e.g., user's mouth 1342). In some embodiments, the avatar feature (e.g., whiskers 1342) that is unreactive to changes in the first physical feature is unreactive to changes in any physical features of the face within the field of view of the one or more cameras. In some embodiments, the avatar feature that is unreactive to changes in the first physical feature is reactive to changes in a second physical feature of the face within the field of view of the one or more cameras that is different than the first physical feature. For example, in some embodiments, the third avatar feature may include eyelids (e.g., 1348) that are not reactive to changes in a first physical feature such as the user's mouth (e.g., 1320), but are reactive to changes in a second physical feature such as the user's eyelids (e.g., 1327).

In some embodiments, the first avatar feature (e.g., 1130, 1330, 1430, 1431, 1538, 1633, 1730) anatomically corresponds to the first physical feature (e.g., 1120, 1320, 1420, 1422, 1522, 1628, 1720) (e.g., the avatar feature is modeled based on one or more of the location, movement characteristics, size, color, and/or shape of the physical feature), and the second avatar feature (e.g., 1133, 1342, 1433, 1434, 1552, 1650, 1736) does not anatomically correspond (e.g., is anatomically distinct or anatomically corresponds to a physical feature other than the first physical feature) to the first physical feature. For example, the second avatar feature corresponds to eye size and the first physical feature corresponds to eyebrow position.

While displaying the virtual avatar (e.g., 1100, 1300, 1400, 1500, 1600, 1700), the electronic device (e.g., 100, 300, 500, 600) detects (2010) changes in the first physical feature (e.g., the user's mouth (e.g., 1120, 1320, 1420, 1720), eyebrow (e.g., 1422, 1522), or cheek (e.g., 1628)).

In response to detecting (2012) the changes in the first physical feature (e.g., the user's mouth (e.g., 1120, 1320, 1420, 1720), eyebrow (e.g., 1422, 1522), or cheek (e.g., 1628)), the electronic device (e.g., 100, 300, 500, 600) modifies (2014) the first avatar feature (e.g., an avatar's eyebrow (e.g., 1538), mouth (e.g., 1130, 1330, 1430, 1730), cheek (e.g., 1633), or a non-human equivalent avatar feature such as an inner portion of one or more camera lenses (e.g., 1431) of a robotic avatar (e.g., 1400)) based on the detected changes in the first physical feature. The electronic device also modifies (2016) the second avatar feature (e.g., an avatar's ear (e.g., 1133, 1433) or nose (e.g., 1736), or non-human equivalent avatar features such as whiskers (e.g., 1342), a mane (e.g., 1552), a wattle (e.g., 1650), or an antenna (e.g., 1434) of a robotic avatar (e.g., 1400)) based on the detected changes in the first physical feature. Additionally, the electronic device forgoes (2018) modification of the third avatar feature (e.g., a nose (e.g., 1436), eyebrow (e.g., 1138, 1738), eyelid (e.g., 1348), mouth (e.g., 1530) or a non-human equivalent avatar feature such as an inner portion of one or more camera lenses (e.g., 1431) of a robotic avatar (e.g., 1400)) based on the detected changes in the first physical feature.

Modifying the first and second avatar features based on the detected changes in the first physical feature, and forgoing modifying the third avatar feature based on the changes in the first physical feature, provides the user with feedback indicating that further movement of, or changes to, the same physical feature will cause the device to change the first and second avatar features without changing the third avatar feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the third avatar feature (e.g., an eyebrow (e.g., 1138, 1738), eyelid (e.g., 1348), or mouth (e.g., 1530)) is reactive to changes in a second physical feature (e.g., a user eyebrow (e.g., 1122, 1722), eyelid (e.g., 1327), or mouth (1520)), and the third avatar feature anatomically corresponds to the second physical feature. Displaying a virtual avatar having a third avatar feature reactive to changes in a second physical feature of a face in the field of view of one or more cameras, and anatomically corresponding to the user's second physical feature, provides the user with intuitive options for controlling modifications to a third portion of the virtual avatar that corresponds to the second physical feature of the user without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In such embodiments, while displaying the virtual avatar, the electronic device (e.g., 100, 300, 500, 600) detects changes in the second physical feature (e.g., a user eyebrow (e.g., 1122, 1722), eyelid (e.g., 1327), or mouth (1520)) and, in response to detecting the changes in the second physical feature, modifies the third avatar feature (e.g., an eyebrow (e.g., 1138, 1738), eyelid (e.g., 1348), or mouth (e.g., 1530)) based on the detected changes in the second physical feature. In some embodiments, the first avatar feature (e.g., mouth (e.g., 1130, 1330)) is not primarily reactive (or, optionally, unreactive) to changes in the second physical feature. In some embodiments, the second avatar feature does not anatomically correspond to either the first physical feature or the second physical feature. For example, the second avatar feature is an avatar ear (e.g., 1133, 1433) that is reactive to the user's eyebrow (e.g., 1122, 1422) and mouth (e.g., 1120, 1420).

In some embodiments, the second avatar feature (e.g., 1133, 1552, 1736) is reactive to changes in the second physical feature (e.g., 1122, 1520, 1722). Displaying a virtual avatar having a second avatar feature that is reactive to changes in the second physical feature of the user's face provides the user with additional options for controlling modifications to a second portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

For example, the second avatar feature (e.g., 1133, 1552, 1736) is reactive to changes in the second physical feature (e.g., 1122, 1520, 1722), such that the second avatar feature is reactive to changes in both the first physical feature (e.g., 1120, 1522, 1720) and the second physical feature. Accordingly, the second avatar feature may be modified independent of modifications to the first avatar feature, based on detecting changes in the second physical feature.

In some embodiments, the first avatar feature (e.g., 1730) is reactive to changes in the second physical feature (e.g., 1722). Displaying a virtual avatar having a first avatar feature that is reactive to changes in the second physical feature of the user's face provides the user with additional options for controlling modifications to a first portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently. For example, the first avatar feature is reactive to changes in the second physical feature, such that the first avatar feature is reactive to changes in both the first physical feature and the second physical feature.

In some embodiments, the first physical feature includes at least a portion of a user's lips (e.g., 1420A, 1420B), the second physical feature includes at least a portion of a user's eyebrow (e.g., 1422), the first avatar feature includes an avatar mouth (e.g., 1430), and the second avatar feature includes an avatar ear (e.g., 1433) positioned on a side portion of an avatar head (e.g., 1435). For example, when the avatar is a robot (e.g., 1400), the avatar ear (e.g., 1433) is represented by a rounded, plate-like structure. In such embodiments, movement of the ear (e.g., 1433) is represented by extending the structure horizontally from the side of the robot head (e.g., 1435). In some embodiments, movement of the ear (e.g., 1433) is represented by tilting the structure from the side of the robot head (e.g., 1435).

In some embodiments, the changes in the first physical feature include a displacement of the at least a portion of the user's lips (e.g., 1420A, 1420B) from a first position (e.g., shown in 1401A) to a second position (e.g., shown in 1403B). For example, the user's lips move in a downward curving direction (e.g., the corners of the user's mouth curve down) to form the mouth portion of the frowning expression. In some embodiments, the changes in the second physical feature include at least a vertical displacement of the at least a portion of the user's eyebrow. For example, the user's eyebrow (e.g., 1422) moves in a downward direction as shown in 1403B.

In some embodiments, a frown is detected when the user's eyebrows have a position that is vertically displaced towards the user's nose, when compared to a neutral, resting position of the eyebrows. In some embodiments, modifying the first avatar feature based on the detected changes in the first physical feature includes modifying at least a shape of the avatar mouth (e.g., 1430) based on the second position of the at least a portion of the user's lips (e.g., 1420A, 1420B). For example, the avatar mouth does not move in a manner that directly mirrors the user's mouth (e.g., moving in a vertical direction, opening and closing, etc.). Instead, in some embodiments, changes in the avatar mouth (e.g., 1430) are indicated by changing a shape of the avatar mouth (e.g., to indicate an expression associated with the mouth shape), wherein the shape change of the avatar mouth is driven by changes in the user's lips (e.g., 1420A/1420B). In some examples, the mouth forms a trapezoid shape to indicate a frown as shown in 1413B (e.g., the trapezoid shape corresponds to a frown when the top edge 1430U of the trapezoid is shorter than the bottom edge 1430L of the trapezoid). In some embodiments, modifying the second avatar feature based on the detected changes in the first physical feature includes adjusting a degree of tilt of the avatar ear (e.g., 1433), wherein the degree of tilt is based on at least one of a magnitude and a direction of the displacement of the at least a portion of the user's lips from the first position to the second position. In some embodiments, the degree to which the ear (e.g., 1433) tilts is determined based on a magnitude or direction of the displacement of the user's lips (e.g., 1420A/1420B) from the first position to the second position.

In some embodiments, the changes in the first physical feature (e.g., 1120, 1320, 1420, 1422, 1522, 1628, 1720) include a change of a first magnitude, modifying the first avatar feature (e.g., 1130, 1330, 1430, 1431, 1538, 1633, 1730) based on the detected changes in the first physical feature includes modifying the first avatar feature by a first modification magnitude based on the first magnitude, and modifying the second avatar feature (e.g., 1133, 1342, 1433, 1434, 1552, 1650, 1736) based on the detected changes in the first physical feature includes modifying the second avatar feature by a second modification magnitude based on the first magnitude, the second modification magnitude different than the first modification magnitude. Modifying the first avatar feature by a first modification magnitude and modifying the second avatar feature by a second modification magnitude, the modification magnitudes based on a first magnitude of the detected changes in the first physical feature, provides the user with options for controlling different avatar features by different amounts without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the first avatar feature and second avatar feature are both reactive to changes in the first physical feature, the magnitude (e.g., degree) of the modifications to the avatar features are different. For example, when the change in the physical feature includes a shift in position (e.g., a translational change) of a first magnitude (e.g., a shift in position of one inch) the first avatar feature may be modified by a first modification magnitude that is equal to the first magnitude (e.g., the first avatar feature is also shifted in position by an inch), whereas the second avatar feature may be modified by a second modification magnitude that is different that the first modification magnitude (e.g., the second avatar feature is shifted by a value other than an inch (e.g., greater than, less than)). In some embodiments, the different modification magnitudes are generated by applying different adjustment factors (e.g., multipliers) to the magnitude of the change in the first physical feature. In some embodiments, the magnitude of a change may be represented as a percentage of a maximum amount of change available for a given feature.

In some embodiments, the change in the first physical feature (e.g., 1120, 1320, 1420, 1422, 1522, 1628, 1720) is a change of a first type (e.g., rotational change, a size change, a color change, a positional/translational change), and modifying the first avatar feature (e.g., 1130, 1330, 1430, 1431, 1538, 1633, 1730) based on the detected changes in the first physical feature includes modifying the first avatar feature based on a second type of change (e.g., rotational change, a size change, a color change, a positional/translational change). In some embodiments, the second type of change is the same as the first type of change. In some embodiments, modifying the second avatar feature (e.g., 1133, 1342, 1433, 1434, 1552, 1650, 1736) based on the detected changes in the first physical feature includes modifying the second avatar feature based on a third type of change (e.g., rotational change, a size change, a color change, a positional/translational change), the third type of change being different than the second type of change. In some embodiments, the third type of change is the same as the first type of change. Modifying the first avatar feature based on a second type of change and modifying the second avatar feature based on a third type of change different than the second type of change provides the user with options for controlling different features of the avatar based on different types of user input without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the first avatar feature and the second avatar feature are both reactive to changes in the first physical feature, the changes in the first physical feature affect (e.g., modify) the first avatar feature and the second avatar feature differently. For example, the change in the first physical feature may be a rotational change (e.g., a rotation of an eyeball) that causes a rotational change in the first avatar feature (e.g., a rotation of an avatar eyeball) but causes a translational change in the second avatar feature (e.g., a shift in position of an avatar ear). In some embodiments, the changes in the first avatar feature and the second avatar feature are the same type of change (e.g., the same type of change as the change to the physical feature).

In some embodiments, the first avatar feature includes an avatar mouth (e.g., 1330), the second avatar feature includes at least a portion of avatar facial hair (e.g., 1342), the first physical feature includes at least a portion of a user's mouth (e.g., 1320), and the changes in the first physical feature include a displacement of the at least a portion of the user's mouth (e.g., the corners of the user's mouth are displaced in an upward direction (with respect to a position of the corners of the user's mouth when in a neutral, resting position) when the user's mouth is a smile). In some such embodiments, modifying the first avatar feature based on the detected changes in the first physical feature includes modifying a shape of the avatar mouth based on the displacement of the at least a portion of the user's mouth (e.g., the avatar mouth is modified to a shape that corresponds to a smile when the corners of the user's mouth are displaced in an upward direction (with respect to a position of the corners of the user's mouth when in a neutral, resting position)). Further in some such embodiments, modifying the second avatar feature based on the detected changes in the first physical feature includes modifying, based on a magnitude or direction of the displacement of the at least a portion of the user's mouth, at least one of a location of the at least a portion of avatar facial hair (e.g., the location of the avatar facial hair changes based on a change in the position or shape of the user's mouth), and a spacing of the at least a portion of the avatar facial hair (e.g., the location of the avatar facial hair changes based on a change in the position or shape of the user's mouth). In some embodiments, the modification in the location and spacing of the avatar facial hair is accomplished by driving a change (e.g., displacement) in the shape or position of the avatar's mouth and the surrounding, connected facial structure, which in turn drives a change to the position, location, or spacing of avatar facial hair located in a region proximate the avatar mouth.

In some embodiments, the first avatar feature includes an avatar mouth (e.g., 1730), the second avatar feature includes an avatar nose (e.g., 1736), the first physical feature includes at least a portion of a user's mouth (e.g., 1720), and the changes in the first physical feature include a displacement of the at least a portion of the user's mouth (e.g., the corners of the user's mouth are displaced in an upward direction (with respect to a position of the corners of the user's mouth when in a neutral, resting position) when the user's mouth is a smile). In some such embodiments, modifying the first avatar feature based on the detected changes in the first physical feature includes modifying a shape of the avatar mouth based on the displacement of the at least a portion of the user's mouth (e.g., the avatar mouth is modified to a shape that corresponds to a smile when the corners of the user's mouth are displaced in an upward direction (with respect to a position of the corners of the user's mouth when in a neutral, resting position)). Further in some such embodiments, modifying the second avatar feature based on the detected changes in the first physical feature includes modifying a position of the avatar nose (e.g., the avatar nose moves based on a displacement of a physical feature other than the user's nose (e.g., the user's mouth 1720)) based on a magnitude or direction of the displacement of the at least a portion of the user's mouth. For example, when the user's mouth moves from side-to-side (e.g., left or right) on a user's face, the user's mouth has a horizontal displacement in a left or right direction, and the avatar nose moves in a direction that corresponds to the left/right direction of the user's mouth. In some embodiments, this movement of the avatar nose corresponds to a horizontal movement of the user's mouth by moving in a mirrored direction (e.g., if the user's mouth moves to the right side of the user's face, the avatar nose moves in a direction towards the left side of the avatar's face, and vice-versa). Similarly, when the user's mouth has a vertical displacement (e.g., in a direction towards the top of the user's head), the avatar nose also moves in a corresponding direction (e.g., towards the top of the avatar's head).

In some embodiments, the virtual avatar (e.g., 1400) further includes a fourth avatar feature (e.g., 1431) reactive to changes in the first physical feature (e.g., 1422). In response to detecting the changes in the first physical feature, the electronic device (e.g., 100, 300, 500, 600) modifies the fourth avatar feature based on the detected changes in the first physical feature (e.g., a user eyebrow 1422). Displaying a virtual avatar having a fourth avatar feature that is reactive to changes in the first physical feature of the user's face provides the user with additional options for controlling modifications to a fourth portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first physical feature includes at least a portion of a user's eyebrow (e.g., 1422), the first avatar feature includes an avatar antenna feature (e.g., 1434) positioned at a top portion of an avatar head (e.g., 1435) (e.g., an antenna positioned on the top of the avatar head (e.g., when the avatar is a robot) that moves in a vertical direction in response to movement of a user facial feature (e.g., the user's eyebrow 1422)). In some such embodiments, the second avatar feature includes an avatar ear (e.g., 1433) positioned on a side portion of the avatar head (e.g., when the avatar is a robot, the avatar ear is represented by a rounded, plate-like structure, wherein movement of the ear is represented by extending the structure horizontally from the side of the robot head), and the fourth avatar feature includes an avatar eyebrow (e.g., 1431). For example, when the avatar is a robot (e.g., 1400), the avatar eyebrow is represented by a line (e.g., a horizontal line 1431 when the avatar eyebrow is in a neutral, resting position) that is incorporated into the structure of the avatar's eye 1432. In some embodiments, movement of the robot eyebrow is represented by rotating the position of the line (which may include rotating the avatar eye) as shown in 1412C, wherein the rotated position of the line can be used to indicate an eyebrow position of the robot avatar. In some embodiments, the degree to which the line (and the avatar eye) rotates or tilts is determined based on the magnitude of the vertical displacement of the user's eyebrow.

In some embodiments, the changes in the first physical feature include a displacement of the at least a portion of the user's eyebrow (e.g., 1422) (e.g., a magnitude (e.g., a percentage of a maximum range) of the eyebrow's movement in a vertical direction towards or away from the top of the user's head), and modifying the first avatar feature based on the detected changes in the first physical feature includes extending the avatar antenna feature (e.g., 1434) from the top portion of the avatar head (e.g., 1435), wherein an extended position of the avatar antenna feature is based on a magnitude of the displacement of the at least a portion of the user's eyebrow. In some such embodiments, modifying the second avatar feature based on the detected changes in the first physical feature includes extending the avatar ear (e.g., 1433) from the side portion of the avatar head, wherein an extended position of the avatar ear is based on the magnitude of the displacement of the at least a portion of the user's eyebrow. In some such embodiments, modifying the fourth avatar feature based on the detected changes in the first physical feature includes adjusting a degree of rotation of at least a portion of the avatar eyebrow, wherein the degree of rotation is based on the magnitude of the displacement of the at least a portion of the user's eyebrow. For example, when the avatar is a robot (e.g., 1400), the avatar eye rotates or tilts to indicate various facial expressions. In some embodiments, the degree to which the eyes rotate or tilt is determined based on the magnitude of the vertical displacement of the user's eyebrow.

In some embodiments, the first physical feature includes at least a portion of a user's eyelid (e.g., 1327), the first avatar feature includes an avatar eyelid (e.g., 1348), the second avatar feature includes an avatar eye (e.g., 1332), and the changes in the first physical feature include a displacement of the at least a portion of the user's eyelid (e.g., a magnitude (e.g., a percentage of a maximum range) of the eyelid's movement in a vertical direction towards or away from the top of the user's head). In some embodiments, modifying the first avatar feature based on the detected changes in the first physical feature includes introducing the avatar eyelid (in some embodiments, the avatar eyelid is introduced in a closed position) and moving the avatar eyelid towards a closed position, wherein a position of the avatar eyelid towards the closed position is based on a magnitude of the displacement of the at least a portion of the user's eyelid. In some embodiments, the avatar eyelid is not displayed until the magnitude of displacement of user's eyelid reaches a threshold magnitude (e.g., more than 50% closed) for introducing the avatar eyelid. In such embodiments, the avatar eyelid may be displayed in a closed position, or transitioning from an open position towards a closed position, wherein the instant position of the avatar eyelid, as it transitions to the closed position, is determined based on the magnitude of displacement of the user's eyelid. In some embodiments, modifying the second avatar feature based on the detected changes in the first physical feature includes adjusting a size of the avatar eye based on the magnitude of the displacement of the at least a portion of the user's eyelid. For example, the avatar eye is modified to display a greater amount of the avatar's eye (or to increase the size of the avatar's eye) than was displayed prior to detecting the changes in the first physical feature.

In some embodiments, the first physical feature includes at least a portion of a user's lip (e.g., 1420C), the first avatar feature includes an avatar mouth (e.g., 1430), the second avatar feature includes an avatar nose (e.g., 1436), the changes in the first physical feature include a displacement of the at least a portion of the user's lip from a first position to a second position. For example, the first position can be a neutral position and the second position can be the resulting position of the lips when the user adjusts their lips/mouth to a particular pose. In some embodiments, the change in the user's lip position corresponds to a change in the pose of the mouth (e.g., from a frown to a smile) and/or a change in displacement of the user's mouth/lips (e.g., shifting the user's lips to one side of their face (e.g., lips are shifted to the right)). In some embodiments, modifying the first avatar feature based on the detected changes in the first physical feature includes modifying at least one of a shape and horizontal shift of the avatar mouth based on the second position of the at least a portion of the user's lip. For example, the avatar mouth does not move in a manner that directly mirrors the user's mouth (e.g., moving in a vertical direction, opening and closing, etc.). Instead, changes in the avatar mouth are indicated by shifting the horizontal position of the avatar mouth (e.g., translating the mouth along an x-axis) and/or changing a shape of the avatar mouth (e.g., to indicate an expression associated with the mouth shape), wherein the shift and shape change of the avatar mouth is driven by changes in the user's lips.

In some embodiments, the mouth forms a trapezoid shape to indicate a frown or a smile (e.g., the trapezoid shape corresponds to a smile when the top edge of the trapezoid is longer than the bottom edge of the trapezoid; and the trapezoid shape corresponds to a frown when the top edge of the trapezoid is shorter than the bottom edge of the trapezoid). In some embodiments, the mouth forms a circular shape to indicate a pucker expression or surprised expression. In some embodiments, the avatar mouth shifts from side-to-side as the shape of the user's mouth changes (e.g., the user shifts their lips from side-to-side), and modifying the second avatar feature based on the detected changes in the first physical feature includes adjusting a degree of rotation of the avatar nose, wherein the degree of rotation is based on at least one of a magnitude and a direction of the displacement of the at least a portion of the user's lip from the first position to the second position. In some embodiments, the degree to which the nose rotates is determined based on a magnitude or direction of the displacement of the user's lip from the first position to the second position.

In some embodiments, the first physical feature includes at least a portion of a user's cheek (e.g., 1628), the first avatar feature includes an avatar cheek (e.g., 1633), the second avatar feature includes an avatar feature (e.g., 1650) that extends away from the avatar's face (e.g., 1655) (e.g., an elephant's trunk, a chicken's wattle, a bird's beak). For example, when the avatar is a chicken (e.g., 1600), the avatar includes a wattle (e.g., 1650) that moves based on detected changes in the user's cheek (e.g., 1628). The changes in the first physical feature include a displacement of the at least a portion of the user's cheek from a first position (e.g., 1601A) to an expanded position (e.g., 1601B), wherein the expanded position is based on a magnitude of the displacement of the at least a portion of the user's cheek from the first position to the expanded position. For example, the first position corresponds to a position of the user's cheek when the cheek is in a relaxed state, and the expanded position corresponds to a position of the user's cheek when the user expands, or puffs, their cheek.

In some embodiments, modifying the first avatar feature based on the detected changes in the first physical feature includes modifying the avatar cheek from an initial position (e.g., 1611A) to an expanded position (e.g., 1633 in 1611B). For example, the avatar cheek moves from an initial position to an expanded position (e.g., a puffed-out, or expanded, pose), wherein the initial position corresponds to a position of the avatar cheek when the user's cheek is in a relaxed state, and the expanded position is based on the magnitude of the displacement of the user's cheek from it's position in the relaxed state to its expanded position. In some embodiments, the initial position of the virtual avatar is a position that is undistinguished.

In some embodiments, modifying the second avatar feature based on the detected changes in the first physical feature includes modifying a position of the avatar feature that extends away from the avatar's face based on the magnitude of the displacement of the at least a portion of the user's cheek from the first position to the expanded position. In some embodiments, movement of the chicken wattles is based on a physics model (e.g., a model of inertia, a model of gravity, a force transfer model, a friction model). In some embodiments, the physics model specifies a magnitude and direction of movement of an avatar feature based on a magnitude and direction of movement of the face or a portion of the face (e.g., the avatar cheek) and one or more predefined properties of the virtual avatar feature (e.g., the wattle) such as a simulated mass, simulated elasticity, simulated coefficient of friction or other simulated physical property.

In some embodiments, the first physical feature includes at least a portion of a user's cheek (e.g., 1428), and the first avatar feature includes an avatar ear (e.g., 1433) positioned on a side portion of an avatar head (e.g., 1435). For example, when the avatar is a robot (e.g., 1400), the avatar ear (e.g., 1433) is represented by a rounded, plate-like structure. In some embodiments, movement of the ear is represented by extending the structure horizontally from the side of the robot head. In some embodiments, movement of the ear is represented by tilting the structure from the side of the robot head. In some embodiments, the second avatar feature includes an avatar antenna feature (e.g., 1434) positioned at a top portion of the avatar head (e.g., an antenna positioned on the top of the avatar head (e.g., when the avatar is a robot) that moves in a vertical direction in response to movement of a user facial feature (e.g., the user's cheek)). In some such embodiments, the changes in the first physical feature include a displacement of the at least a portion of the user's cheek from a first position (e.g., 1401A) to an expanded position (e.g., 1404C) (e.g., the first position corresponds to a position of the user's cheek when the cheek is in a relaxed state, and the expanded position corresponds to a position of the user's cheek when the user expands, or puffs, their cheek). Further in such embodiments, modifying the first avatar feature based on the detected changes in the first physical feature includes extending the avatar ear from the side portion of the avatar head, wherein an extended position of the avatar ear is based on a magnitude of the displacement of the at least a portion of the user's cheek from the first position to the expanded position, and modifying the second avatar feature based on the detected changes in the first physical feature includes extending the avatar antenna feature from the top portion of the avatar head, wherein an extended position of the avatar antenna feature is based on the magnitude of the displacement of the at least a portion of the user's cheek from the first position to the expanded position.

Note that details of the processes described above with respect to method 2000 (e.g., FIG. 20) are also applicable in an analogous manner to the methods 1800 and 1900 described above and the methods described below. For example, method 2000 optionally includes one or more of the characteristics of the various methods described below with reference to methods 800, 900, 1800, 1900, 2100, 2200, 2300, 2400, and 2500. For example, the methods of generating, sending, and receiving animated avatars in accordance with method 800 may employ virtual avatars (e.g., avatars generated while reacting to changes in position of the user's face) generated in accordance with method 2000. Similarly, virtual avatars and animated effects generated and/or modified in accordance method 2000 may be included in the displayed preview of a virtual avatar in a virtual avatar generation interface (e.g., 804, 904) of method 800 or 900. For another example, virtual avatars (e.g., avatars generated while reacting to changes in position of the user's face) generated in accordance with method 2000 may also be generated in accordance with the virtual avatar generation and modification methods of methods 800, 900, 1800, 1900, 2100, 2200, 2300, 2400, and 2500. For example, a virtual avatar generated in accordance with method 2000 may include a first avatar portion (e.g., 1535) that reacts differently than a second avatar portion (e.g., 1539) to changes in pose of a user's face, depending on the type of change in pose (e.g., 1810 and 1812). For brevity, further examples are excluded.

Figure 21:
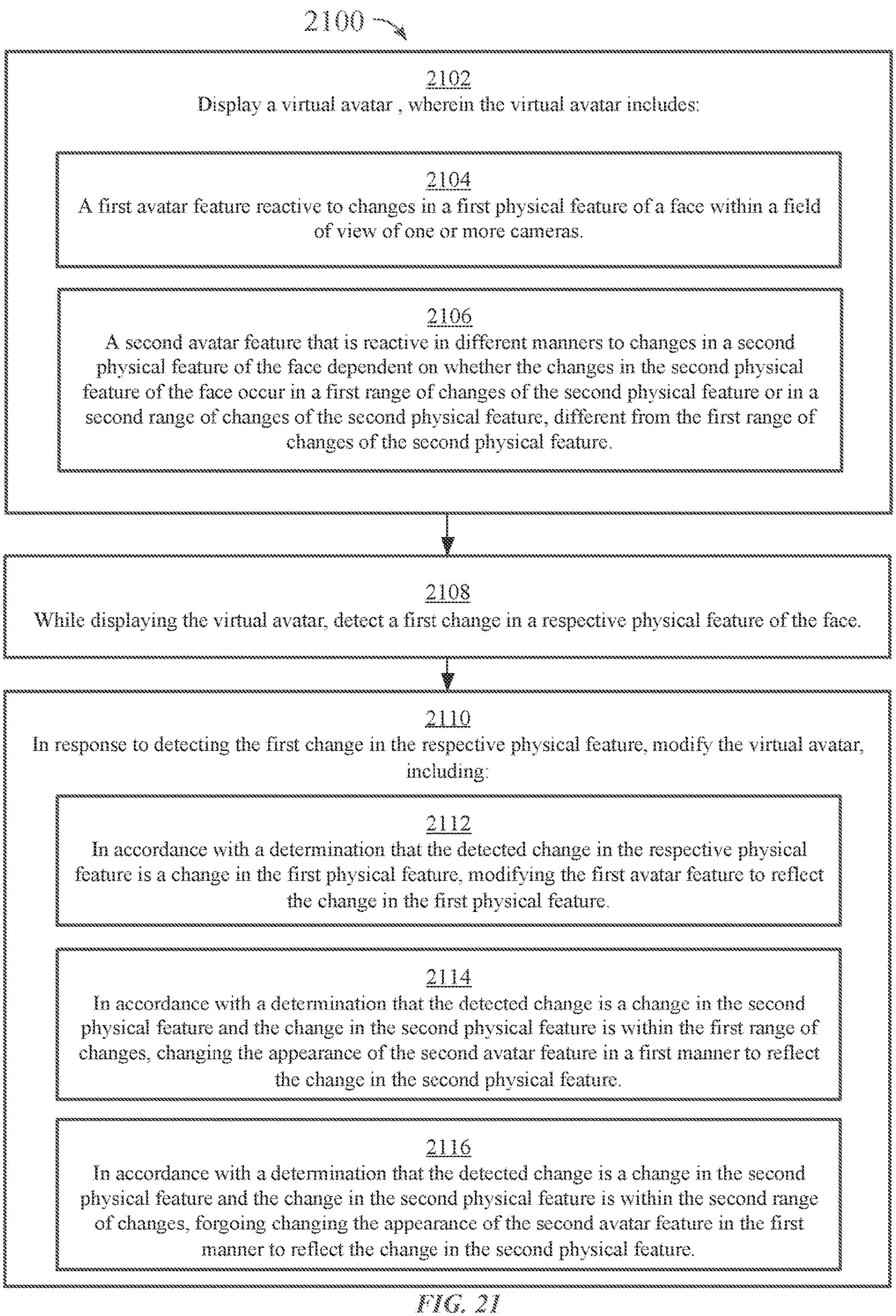
FIG. 21 is a flow diagram illustrating a method for generating and modifying a virtual avatar based on a face detected by one or more cameras.

FIG. 21 is a flow diagram illustrating a method, at an electronic device, for generating a virtual avatar based on a face detected by one or more cameras in accordance with some embodiments. Method 2100 is performed at an electronic device (e.g., 100, 300, 500, 600) with one or more cameras (e.g., 164, 602) and a display apparatus (e.g., 112, 340, 504, 601). Some operations in method 2100 are, optionally, combined, the orders of some operations are, optionally, changed, and some operations are, optionally, omitted.

As described below, method 2100 provides an intuitive way for generating virtual avatars that can exhibit different behavior across ranges of changes of physical features. The method reduces the physical and cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 2100 may be found in the user interfaces and virtual avatars discussed with reference to FIGS. 12A-12C.

The electronic device (e.g., 100, 300, 500, 600) displays (2102), via the display apparatus (e.g., 112, 340, 504, 601) a virtual avatar (e.g., 1200) that includes a first avatar feature (e.g., 1230) reactive to changes in a first physical feature (e.g., 1220) of a face within the field of view of the one or more cameras (2104). For example, the first avatar feature is consistently reactive, reactive according to a singular function (e.g., a linear function) across a range of possible motion of the detected physical feature. Displaying a virtual avatar having a first avatar feature reactive to changes in a first physical feature of a face in the field of view of one or more cameras provides the user with options for controlling modifications to a first portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The virtual avatar also includes a second avatar feature (e.g., 1232) that is reactive in different manners to changes in a second physical feature (e.g., 1223) of the face dependent on whether the changes in the second physical feature of the face occur in a first range of changes of the second physical feature or in a second range of changes of the second physical feature, different from the first range of changes of the second physical feature (2106). For example, the second avatar feature is inconsistently reactive, reactive according to multiple functions across a range of possible motion of the detected physical feature, including being non-reactive for certain portions of the range of possible motion of the detected physical feature. Displaying a virtual avatar having a second avatar feature reactive in different manners to changes in a second physical feature of the face dependent on whether the changes in the second physical feature of the face occur in a first range of changes of the second physical feature or in a second range of changes of the second physical feature different from the first range of changes of the second physical features, provides the user with ranges of options for controlling different modifications to a second portion of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the virtual avatar (e.g., 1200), the electronic device (e.g., 100, 300, 500, 600) detects a first change in a respective physical feature (e.g., 1220, 1223) of the face within the field of view of the one or more cameras (2108). In some examples, changes in a physical feature are tracked as a physical feature value (e.g., a magnitude value) within a range of potential change for a feature, with the range being determined based on empirical calibration or based on predictive modeling based on various characteristics of the user's face and/or historical data. For example, a change may be assessed as having a magnitude of 2 within a possible magnitude range of 0-10.

In response to detecting the first change in the respective physical feature, the electronic device (e.g., 100, 300, 500, 600) modifies the virtual avatar (2110), including performing one or more of the following operations. In accordance with a determination that the detected first change in the respective physical feature is a change in the first physical feature (e.g., 1220), the electronic device (e.g., 100, 300, 500, 600) modifies (2112) the first avatar feature (e.g., 1230) to reflect the change in the first physical feature. In some examples, the manner of change of the first physical feature is not dependent on the range of changes of the first physical feature. Modifying the first avatar feature to reflect the change in the first physical feature provides the user with feedback indicating that further movement of the same physical feature will cause the device to change the first avatar feature based on the further movement. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In accordance with a determination that the detected first change is a change in the second physical feature (e.g., 1223) and the change in the second physical feature is within the first range of changes (e.g., in accordance with the second physical feature value of the second physical feature meeting or exceeding a modification threshold) (e.g., having a magnitude of 5 or greater in a possible magnitude range of 0-10), the electronic device (e.g., 100, 300, 500, 600) changes (2114) the appearance of the second avatar feature (e.g., 1232) in a first manner to reflect the change in the second physical feature. Changing the appearance of the second avatar feature in a first manner to reflect the change in the second physical feature, when the first change is a change in the second physical feature and the change in the second physical feature is within the first range of changes, provides the user with feedback indicating that further movement of the same physical feature, in the same range of movement, will cause the device to change the second avatar feature in the same manner. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the avatar feature has a possible range of motion having a possible range of 0-10 and the user physical feature also has a range of possible motion of 0-10, with a modification threshold of 5. In some examples, changes in the physical feature that result in an end physical feature value that meets or exceeds the threshold result in exaggerated motion across the full range of possible motion of the avatar feature: a change in the physical feature from 5 to 6 would result in avatar feature being modified from a value of 0 to 2, whereas a change of the physical feature from 6 to 7 would result in the avatar feature being modified from 2 to 4. In this way, changes in the physical feature, once the modification threshold is met or exceeded, can control the full range of motion of the avatar feature. In some examples, the exaggeration is modeled according to a non-linear function such that a change in the physical feature from 5 to 6 would cause the avatar feature to transition from 0 to 8, in the possible range of 0-10, with changes in the physical feature from 6 to 10 causing less dramatic changes in the avatar feature (e.g., changes from 8-10). In this way, the changes in the user's physical feature can cause extremely exaggerated initial changes in the avatar feature, once the modification threshold is met. In some examples, changes in the physical feature that occur, at least in part, within a first sub-portion (e.g., a later portion, such as 6-10 of a range of 0-10) of the range of possible motion of the physical feature result in modification of the corresponding avatar feature. In such examples, the first sub-portion is the portion of the range that meets or exceeds the modification threshold.

In accordance with a determination that the detected first change is a change in the second physical feature (e.g., 1223) and the change in the second physical feature is within the second range of changes (2116) (e.g., the first physical feature value and the second physical feature value not meeting or exceeding a modification threshold), the electronic device (e.g., 100, 300, 500, 600) forgoes changing the appearance of the second avatar feature in the first manner to reflect the change in the second physical feature. In some examples, changes in the physical feature that occur entirely within a second sub-portion (e.g., an initial portion, such as 0-5 of a range of 0-10) of the range of possible motion of the physical feature do not result in modification of the corresponding avatar feature. In such embodiments, the second sub-portion is the portion of the range that does not meet or exceed the modification threshold.

In some examples, further in response to detecting the first change in the respective physical feature and in accordance with the determination that the detected first change is a change in the second physical feature (e.g., 1223) and the change in the second physical feature is within the second range of changes, the electronic device (e.g., 100, 300, 500, 600) changes the appearance of the second avatar feature (e.g., 1232) in a second manner to reflect the change in the second physical feature. In some examples, the second range of changes represents a subset in a range of possible motion of the second physical feature. In some examples, the subset corresponds to the upper limits (e.g., a range of 8-10 out of a possible range of 0-10, with 0 being no motion and 10 being the greatest possible motion) of the range of motion. In some examples, the second manner of changing the appearance of the second avatar feature includes an exaggerated effect applied to the second avatar feature. In some examples, this exaggerated effect includes spikes or protrusions extending from the second avatar feature. Changing the appearance of the second avatar feature in a second manner to reflect the change in the second physical feature, when the first change is a change in the second physical feature and the change in the second physical feature is within the second range of changes, provides the user with feedback indicating that further movement of the same physical feature, in the same range of movement, will cause the device to change the second avatar feature in the same manner that is different from the manner of change effected when the change in the second physical feature is within the first range of changes. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the first manner of changing the appearance of the second avatar feature (e.g., 1232) is different from the second manner of changing the appearance of the second avatar feature. In some examples, the first manner of changing the appearance of the second avatar feature includes a movement or modification of the second avatar feature that corresponds to a movement of the second physical feature, whereas the second manner of changing the appearance of the second avatar feature includes an exaggerated effect applied to the second avatar feature. In some examples, this exaggerated effect includes spikes or protrusions extending from the second avatar feature.

In some examples, the virtual avatar that is displayed while the first change in the respective physical feature is detected is based on a first virtual avatar template (e.g., an avatar template corresponding to alien avatar 1200). In such examples, the electronic device, after modifying the virtual avatar based on the first virtual avatar template in response to detecting the first change in the respective physical feature and while displaying a virtual avatar that is based on a second virtual avatar template (e.g., an avatar template corresponding to bear avatar template 1100) that is different from the first virtual avatar template, detects a second change in the second physical feature (e.g., 1223). Further in such examples, in response to detecting the second change in the second physical feature, the electronic device (e.g., 100, 300, 500, 600) modifies the second avatar feature (e.g., eyes 1132, 1232) to reflect the second change in the second physical feature, wherein the appearance of the second avatar feature is changed in a same manner without regard to whether the change in the second physical feature is within the first range of changes or within the second range of changes. Modifying the second avatar feature to reflect the second change in the second physical feature such that the appearance of the second avatar feature is changed in a same manner without regard to whether the change in the second physical feature is within the first range of changes or the second range of changes, provides the user with feedback indicating that further movement of the same physical feature will cause the device to change the second avatar feature in a manner that is independent of the range of changes. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. In some examples, for a different virtual avatar template, changes in the second physical feature cause a smooth variation in the second avatar feature rather than causing different changes in the second avatar feature depending on whether the change in the second physical feature is within the first range of changes or within the second range of changes.

In some examples, further in response to detecting the first change in the respective physical feature and in accordance with the determination that the detected first change is a change in the second physical feature (e.g., 1223) and the change in the second physical feature is within the first range of changes, the electronic device (e.g., 100, 300, 500, 600) foregoes changing the appearance of the second avatar feature (e.g., 1232) in the second manner to reflect the change in the second physical feature.

In some examples, the second physical feature includes a user's eyelid (e.g., a part of 1223), the second avatar feature includes an avatar eye (e.g., 1232), and changing the appearance of the second avatar feature in the second manner based on the change in the second physical feature being within the second range of changes (e.g., changes above a predetermined threshold value within the range of changes (e.g., the user's eyelid is closed by 50% or greater within the range of changes possible for the user's eyelid)) includes decreasing a size of the avatar eye. For example, when the virtual avatar is an alien (e.g., 1200), and the user's eyelid is closed by 50% or greater, the size of the alien's eye 1232 begins to decrease to appear as if the alien's eye is moving towards a closed position. In some examples, when the user's eyelid is completely closed (e.g., closed by 100%), the avatar's eye is represented by a shape (e.g., a line) that indicates the avatar eye is completely closed. In some embodiments, changing the appearance of the second avatar feature in the first manner based on the change in the second physical feature being within the first range of changes (e.g., the user's eyelid is closed by less than 50% of the range of changes possible for the user's eyelid) does not include decreasing the size of the avatar eye. In some examples, the threshold magnitude is 50% of the range of possible motion of the second physical feature (e.g., the user's eyelids). In such examples, the first range of changes correspond to 0% to less than 50% and the second range of changes correspond to 50% to 100%. In such embodiments, the corresponding modification of the second avatar feature (e.g., the virtual avatar's eye) only occurs when the change in the second physical feature meets or exceeds 50% of the possible range of motion of the second physical feature. For example, when the user's eyelids move beyond the threshold magnitude (e.g., more than 50% closed), the eyes of the virtual avatar begin to move towards a closed position (e.g., by reducing in size) to reflect the instant position of the user's eyelids.

In some examples, the second physical feature includes a user's cheek (e.g., 1228), the second avatar feature includes an avatar cheek (e.g., 1256), changing the appearance of the second avatar feature in the second manner based on the change in the second physical feature being within the second range of changes (e.g., changes above a predetermined threshold value within the range of changes (e.g., the user's cheek is puffed or expanded by 70% or greater within the range of changes possible for the user's cheek)) includes introducing an exaggerated avatar effect at the avatar cheek (e.g., protrusions or spikes 1258 extending from the virtual avatar when the user exhibits an extreme cheek puff), and changing the appearance of the second avatar feature in the first manner based on the change in the second physical feature being within the first range of changes (e.g. the user's cheek is puffed or expanded by less than 70% of the range of changes possible for the user's cheek) includes modifying the avatar cheek based on a magnitude of change in the user's cheek. In some examples, modifying the avatar cheek based on a magnitude of change in the user's cheek occurs without introducing the exaggerated avatar effect. In some examples, the threshold magnitude is 70% of the range of possible motion of the second physical feature (e.g., the user's cheek). In such examples, the first range of changes correspond to 0% to less than 70% and the second range of changes correspond to 70% to 100%. In such examples, the introduction of the exaggerated avatar effect (e.g., the spikes or protrusions) at the second avatar feature (e.g., the virtual avatar's cheek) only occurs when the change in the second physical feature meets or exceeds a predefined threshold such as 70% of the possible range of motion of the second physical feature (e.g., when the user's cheek moves beyond the threshold magnitude (e.g., puffed by 70% or more)). Further in such examples, the virtual avatar feature (e.g., the virtual avatar's cheek) is modified based on the magnitude of the change in the second physical feature when the change in the second physical feature is less than 70% of the possible range of motion of the second physical feature (e.g., when the user's cheek moves less than the threshold magnitude (e.g., puffed by less than 70%)).

In some examples, the second physical feature includes a user's eyebrow (e.g., 1222), the second avatar feature includes an upper portion of the avatar's head, changing the appearance of the second avatar feature in the second manner based on the change in the second physical feature being within the second range of changes (e.g., changes above a predetermined threshold value within the range of changes (e.g., the user's eyebrow is raised 70% or greater within the range of changes possible for the user's eyebrow)) includes introducing an exaggerated avatar effect at the upper portion of the avatar's head (e.g., protrusions or spikes 1254 extending from the virtual avatar when the user exhibits an extreme eyebrow raise), and changing the appearance of the second avatar feature in the first manner based on the change in the second physical feature being within the first range of changes (e.g. the user's eyebrow is raised by less than 70% of the range of changes possible for the user's eyebrow) does not include introducing the exaggerated avatar effect at the upper portion of the avatar's head. In some examples, the threshold magnitude is 70% of the range of possible motion of the second physical feature (e.g., the user's eyebrow). In such examples, the first range of changes correspond to 0% to less than 70% and the second range of changes correspond to 70% to 100%. In such embodiments, the introduction of the exaggerated avatar effect (e.g., the spikes or protrusions) at the second avatar feature (e.g., the virtual avatar's head) only occurs when the change in the second physical feature meets or exceeds a predetermined threshold such as 70% of the possible range of motion of the second physical feature (e.g., when the user's eyebrow moves beyond the threshold magnitude (e.g., raised by 70% or more)). Further in such examples, the exaggerated avatar effect is not introduced at the virtual avatar feature (e.g., the virtual avatar's head) when the change in the second physical feature is less than 70% of the possible range of motion of the second physical feature (e.g., when the user's eyebrow moves less than the threshold magnitude (e.g., raised by less than 70%)).

In some examples, modifying the first avatar feature of the virtual avatar to reflect the change in the first physical feature (e.g., 1220) includes modifying the first avatar feature based on a magnitude of the change in the first physical feature (e.g., a degree of change in the position of the first physical feature). Modifying the first avatar feature based on a magnitude of the change in the first physical feature provides the user with feedback indicating that further movement of the same physical feature will cause the device to modify the first avatar feature based on the magnitude of movement of the same physical feature. In some examples, the magnitude of change is determined based on the starting position and ending position of the physical feature. In some examples, the magnitude of change is determined as a percentage of change within a maximum range of change. Further, changing the appearance of the second avatar feature (e.g., 1232) in the first manner to reflect the change in the second physical feature includes modifying the second avatar feature based on a first magnitude of the change in the second physical feature (e.g., 1223) (e.g., a degree of change in the position of the second physical feature). In some examples, for a greater magnitude of movement of the second physical feature there is a greater amount of modification of the second avatar feature in the first manner and for a smaller magnitude of movement of the second physical feature there is a smaller amount of modification of the second avatar feature in the first manner, or vice versa. In some examples, the magnitude of a reaction of an avatar feature corresponds to a magnitude of a change in a physical feature of the user. In some examples, the magnitude of the change in the physical feature is determined in accordance with a potential range of motion of the physical feature, wherein the magnitude is representative of a relative position of the physical feature within the range of motion (e.g., the predicted or modeled range of motion) of that physical feature. In such embodiments, the magnitude of the reaction of the avatar feature is similarly a relative position of the avatar feature within a range of motion of the avatar feature. In some examples, the magnitude of change is determined based on a comparison or measurement (e.g., a distance) of the starting position and ending position of the physical feature, through the change. In such examples, the change in the physical feature (e.g., first physical feature) may be translated to a modification of the first avatar feature by applying the measured change in the physical feature to the avatar feature (e.g., directly or as a scaled or adjusted value). Further in such examples, changing the appearance of the second avatar feature in the second manner to reflect the change in the second physical feature includes modifying the second avatar feature based on a second magnitude of the change in the second physical feature. For example, for a greater magnitude of movement of the second physical feature there is a greater amount of modification of the second avatar feature in the second manner and for a smaller magnitude of movement of the second physical feature there is a smaller amount of modification of the second avatar feature in the second manner, or vice versa. In some examples, the first magnitude of the change in the second physical feature is less than the second magnitude of the change in the second physical feature. In some examples, the first magnitude of the change in the second physical feature is greater than the second magnitude of the change in the second physical feature.

In some examples, modifying the first avatar feature (e.g., 1230) of the virtual avatar to reflect the change in the first physical feature (e.g., 1220) includes modifying a pose (e.g., a rotational orientation, the angle at which the avatar feature is displayed, or a displayed position) of at least a portion of the first avatar feature based on a direction of a change in pose of the first physical feature (e.g., a direction of rotation, a direction of change in the angle of the first physical feature with respect to the field of view of the one or more cameras, or a direction of translation). Further in such examples, changing the appearance of the second avatar feature in the first manner to reflect the change in the second physical feature includes modifying a pose (e.g., a rotational orientation, the angle at which the avatar feature is displayed, or a displayed position) of at least a portion of the second avatar feature based on a direction of a change in pose of the second physical feature (e.g., a direction of rotation, a direction of change in the angle of the second physical feature with respect to the field of view of the one or more cameras, or a direction of translation). Further in such examples, changing the appearance of the second avatar feature in the second manner to reflect the change in the second physical feature includes modifying the pose of at least a portion of the second avatar feature based on the direction of the change in pose of the second physical feature.

In some examples, modifications to an avatar feature have both a magnitude component and a directional component. In some examples, the directional component of the modification in the avatar feature is based on a directional component of a change in the one or more physical features that the avatar feature is reactive to. In some examples, the directional component of the change in the avatar feature is the same as the directional component of the change in the physical feature. For example, when the physical feature (e.g., eyebrow) moves up, the avatar feature (e.g., avatar eyebrow) moves up. In some examples, the directional component of the change in the avatar feature is mirrored with respect to the directional component of the change in the physical feature. For example, when the physical feature (e.g., mouth) moves left, the avatar feature (e.g., avatar mouth) moves right. In some examples, the directional component of the change in the avatar feature is the same as the directional component of the change in the physical feature for movement along a vertical axis and mirrored for movement along a horizontal axis, similar to the effect seen when looking in a mirror. In some examples, a change in relative position of a physical feature (e.g., the user's iris or eyelid) is in a direction determined from a neutral, resting position of the physical feature. In some examples, the neutral, resting position of a user's iris is determined to be a particular position (e.g., centered) relative to the perimeter of the user's eyeball. In some examples, the direction of a reaction of an avatar feature corresponds (e.g., directly or inversely) to a relative direction of a change in a physical feature of the user. In some examples, the relative direction of the change in the physical feature is determined based on a direction of movement of the physical feature from a neutral, resting position of the physical feature. In some examples, the direction of the reaction of the avatar feature corresponds directly (e.g., the physical feature moves up, the avatar feature moves up) to the relative direction of the change in the physical feature. In some examples, the direction of the reaction of the avatar feature corresponds inversely (e.g., the physical feature moves up, the avatar feature moves down) to the relative direction of the change in the physical feature.

In some examples, the first range of changes of the second physical feature (e.g., 1223) and the second range of changes of the second physical feature are adjacent ranges in a potential range of changes of the second physical feature (e.g., the full range of predicted, pre-mapped, or detectable range of changes for the second physical feature), the first change in the respective physical feature includes a change in the second physical feature that includes a transition from a first portion of change within the first range of changes to a second portion of change within the second range of changes, and an appearance of the second avatar feature (e.g., 1232) as it is reflecting the change in the second physical feature at the end of the first portion of the change is substantially similar to an appearance of the second avatar feature as it is reflecting the change in the second physical feature at the beginning of the second portion of change.

In some examples, the electronic device (e.g., 100, 300, 500, 600), in accordance with a determination that the detected first change is a change in the second physical feature (e.g., 1223) and the change in the second physical feature is a change from the first range of changes to the second range of changes (e.g., a change of the second physical feature from above the modification threshold to below the modification threshold), modifies the second avatar feature (e.g., 1232) based on a predetermined configuration of the second avatar feature. In some examples, the change in the second physical feature (e.g., the user's eyelid) from above the modification threshold to below the modification threshold results in modifying the second avatar feature (e.g., the avatar's eyelids) to a predetermined configuration without transitioning the second avatar feature though intermediate positions of the second avatar feature corresponding to the second physical feature. For example, when the user's eyelid transitions from a position above the modification threshold to a position below the modification threshold (e.g., from a closed position to a slightly opened position), the avatar's eyelid transitions from a closed position to a fully opened position without traversing through intermediate positions (e.g., partially closed or partially opened positions) of the virtual eyelid, even though the user's eyelid traverses the intermediate positions as it transitions to a fully opened position.

In some examples, the first range of changes of the second physical feature (e.g., 1223) and the second range of changes of the second physical feature are adjacent ranges in a possible range of changes of the second physical feature, the first change in the respective physical feature includes a change in the second physical feature that includes a transition from a first portion of change within the second range of changes to a second portion of change within the first range of changes, and an appearance of the second avatar feature (e.g., 1232) changes from a configuration of the second avatar feature that is based on a magnitude of a change in the second physical feature to a predetermined configuration of the second avatar feature (e.g., a configuration of the second avatar feature that is not based on a magnitude of the change in the second physical feature)

when the change in the second physical feature transitions from the first portion of the change within the second range of changes to the second portion of the change within the first range of changes. In some examples, the change in the second physical feature (e.g., the user's eyelid) from the first portion of change within the second range of changes (e.g., from a closed position) to the second portion of change within the first range of changes (e.g., to a slightly opened position) results in modifying the second avatar feature (e.g., the avatar's eyelids) to a predetermined configuration without transitioning the second avatar feature though intermediate positions of the second avatar feature corresponding to the second physical feature. For example, when the user's eyelid transitions from a closed position to a slightly opened position, the avatar's eyelid transitions from a closed position to a fully opened position without traversing through intermediate positions (e.g., partially closed or partially opened positions) of the virtual eyelid, even though the user's eyelid traverses the intermediate positions as it transitions to a fully opened position.

Note that details of the processes described above with respect to method 2100 (e.g., FIG. 21) are also applicable in an analogous manner to the methods described above and to methods 2200, 2300, 2400, and 2500, described below. For example, method 2100 optionally includes one or more of the characteristics of the various methods described below and above with reference to methods 800, 900, 1800, 1900, 2000, 2200, 2300, 2400, and 2500. For example, the methods of generating, sending, and receiving animated avatars in accordance with method 800 and 900 may employ virtual avatars (e.g., virtual avatars that can exhibit different behavior across ranges of changes of physical features) generated in accordance with method 2100. Similarly, virtual avatars generated and/or modified in accordance method 2100 may be included in the displayed preview of a virtual avatar in a virtual avatar generation interface (e.g., 804, 904) of method 800 or 900. For another example, virtual avatars (e.g., virtual avatars that can exhibit different behavior across ranges of changes of physical features) generated in accordance with method 2100 may also be generated in accordance with the virtual avatar generation and modification methods of methods 800, 900, 1800, 1900, 2000, 2200, 2300, 2400, and 2500. For example, a virtual avatar generated in accordance with method 2100 may include a first avatar portion (e.g., 1034) that reacts differently than a second avatar portion (e.g., 1036) to changes in pose of a user's face differently, depending on the type of change in pose (e.g., 1810 and 1812). Similarly, a virtual avatar generated in accordance with method 2100 may include an avatar feature (e.g., 1133) that reacts (e.g., 1904, 1910, 1914) to changes in both first (e.g., 1122) and second (e.g., 1120A-B) physical features. For brevity, further examples are excluded.

Figure 22:
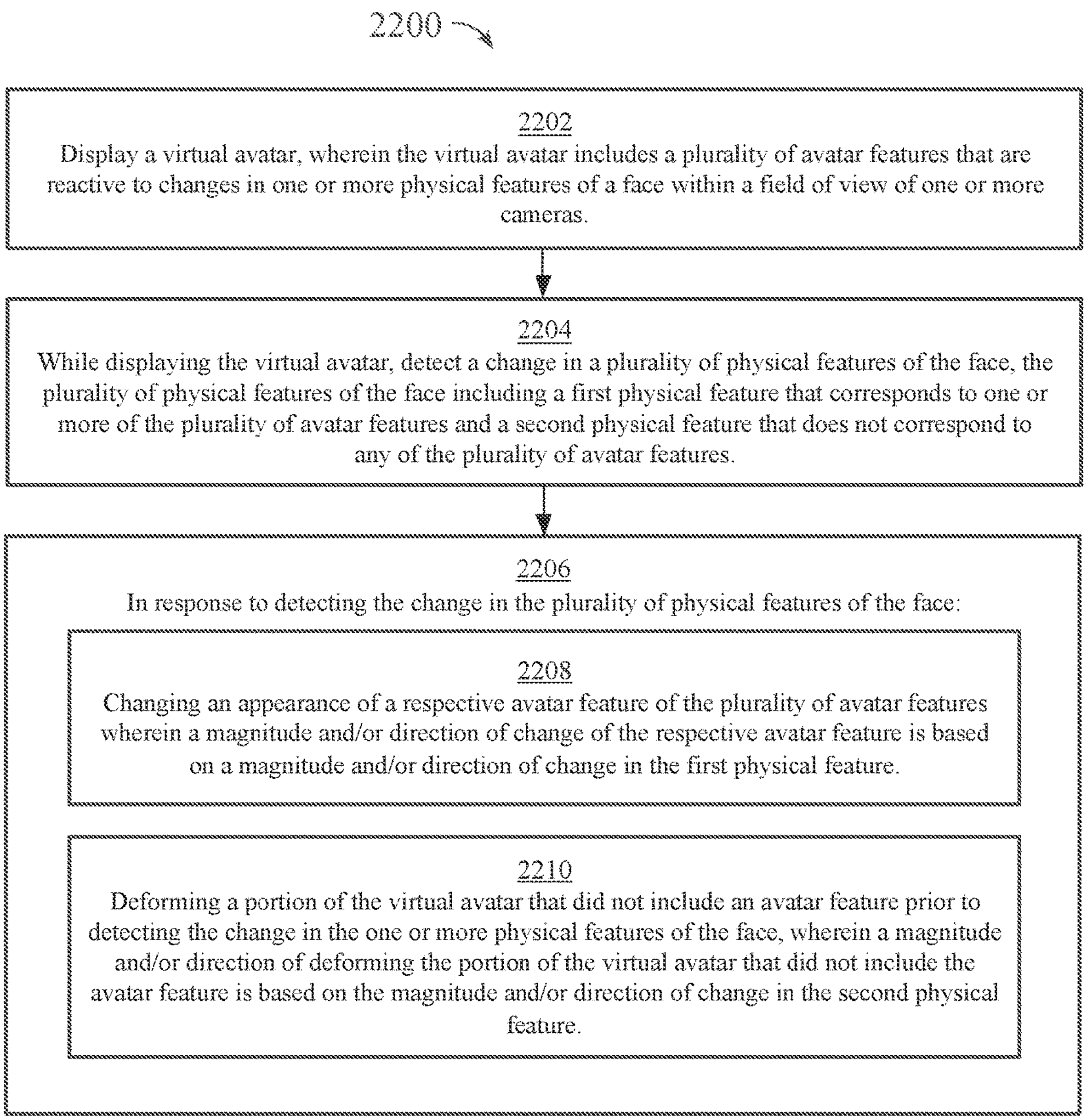
FIG. 22 is a flow diagram illustrating a method for generating and modifying a virtual avatar based on a face detected by one or more cameras.

FIG. 22 is a flow diagram illustrating a method, at an electronic device, for generating a virtual avatar based on a face detected by one or more cameras in accordance with some embodiments. Method 2200 is performed at an electronic device (e.g., 100, 300, 500, 600) with one or more cameras (e.g., 164, 602) and a display apparatus (e.g., 112, 340, 504, 601). Some operations in method 2200 are, optionally, combined, the orders of some operations are, optionally, changed, and some operations are, optionally, omitted.

As described below, method 2200 provides an intuitive way for generating virtual avatars that can exhibit increased complexity (e.g., having increased avatar features) as required. The method reduces the physical and cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 2200 may be found in the user interfaces and virtual avatars discussed with reference to FIGS. 10A-10I, 11A-11C, 12A-12C, 13, 15A-15B, 16A-16B, and 17A-17B.

The electronic device (e.g., 100, 300, 500, 600) displays (2202), via the display apparatus (e.g., 112, 340, 504, 601) a virtual avatar (e.g., 1000, 1100, 1200, 1300, 1500, 1600, 1700), the virtual avatar includes a plurality of avatar features (e.g., 1032, 1132, 1232, 1332, 1532, 1630, 1732) that are reactive to changes in one or more physical features (e.g., 1023, 1122, 1123, 1223, 1327, 1523, 1620A, 1620B, 1723) of a face within the field of view of the one or more cameras.

In some embodiments, the plurality of avatar features (e.g., 1032, 1132, 1232, 1332, 1532, 1630, 1732) that are displayed prior to detecting the change in the plurality of physical features of the face are displayed without regard to a current position of the physical features of the face (e.g., eyes, nose, mouth and other features that are always displayed when the avatar is visible).

While displaying the virtual avatar, the electronic device (e.g., 100, 300, 500, 600) detects (2204) a change in a plurality of physical features (e.g., 1022, 1020, 1122, 1123, 1222, 1223, 1228, 1323, 1327, 1522, 1523, 1620A, 1620B, 1722, 1723) of the face, the plurality of physical features of the face including a first physical feature (e.g., 1020, 1123, 1223, 1323, 1523, 1623, 1723) (e.g., a user's mouth or eye) that corresponds to one or more of the plurality of avatar features (e.g., avatar mouth or eye) and a second physical feature (e.g., 1022, 1122, 1222, 1228, 1327, 1522, 1722, 1620A, 1620B) (e.g., user's eyebrow, eyelid, cheeks, or lips) that does not correspond to any of the plurality of avatar features (e.g., 1032, 1132, 1232, 1332, 1532, 1633, 1732). In such examples, the avatar is initially displayed without the respective eyebrows, eyelids, lips, or cheeks.

In response to detecting the change in the plurality of physical features (e.g., 1022, 1020, 1122, 1123, 1222, 1223, 1228, 1323, 1327, 1522, 1523, 1620A, 1620B, 1722, 1723) of the face (2206), the electronic device (e.g., 100, 300, 500, 600) changes (2208) an appearance of a respective avatar feature (e.g., 1032, 1030, 1132, 1232, 1332, 1532, 1630, 1732) of the plurality of avatar features wherein a magnitude and/or (e.g., an inclusive "or") direction of change of the respective avatar feature is based on a magnitude or direction of change in the first physical feature (at least one of the magnitude and direction). Changing an appearance of a respective avatar feature such that a magnitude and/or direction of change of the respective avatar feature is based on a magnitude or direction of change in the first physical feature provides the user feedback indicating that further movement of the same physical feature will cause the device to modify an appearance of the respective avatar feature based on a direction or magnitude of change in the further movements of the same physical feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

Further in response to detecting the change in the plurality of physical features (e.g., 1022, 1020, 1122, 1123, 1222, 1223, 1228, 1323, 1327, 1522, 1523, 1620A, 1620B, 1722, 1723) of the face (2206), the electronic device (e.g., 100, 300, 500, 600) deforms (2210) a portion of the virtual avatar that did not include an avatar feature prior to detecting the change in the one or more physical features of the face (e.g., 1038, 1050, 1138, 1139, 1250, 1254, 1256, 1258, 1339, 1348, 1538, 1531, 1633, 1645, 1738) (e.g., deforming an eyebrow-less forehead region of the virtual avatar), wherein a magnitude and/or direction of deforming the portion of the avatar feature is based on the magnitude and/or direction of change in the second physical feature. In some examples, the portion of the virtual avatar that is deformed was displayed prior to detecting the change in the plurality of physical features of the face (e.g., a region between a top of the avatar's head and the avatar's eyes is deformed to create eyebrows when more than a threshold amount of eyebrow movement is detected in the one or more physical features). Deforming, in response to detecting the change in the plurality of physical features, a portion of the virtual avatar that did not include an avatar feature prior to detecting the change in the one or more physical features of the face provides the user with feedback indicating that further movement of the same physical features will cause the device to introduce a new avatar feature by deforming the portion of the virtual avatar. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the one or more physical features include a third physical feature (e.g., 1022, 1122, 1222, 1327, 1522, 1722, 1620A, 1620B) (e.g., user's eyebrow, lips, or eyelid). In such examples, while a first physical feature value of the third physical feature is below a first avatar feature inclusion threshold (e.g., having a magnitude of 1 or greater in a possible magnitude range of 0-10) and the virtual avatar does not include a first avatar feature (e.g., 1038, 1050, 1138, 1139, 1250, 1254, 1256, 1258, 1339, 1348, 1538, 1531, 1633, 1645, 1738) (e.g., an avatar feature (e.g., avatar eyelid) different than the respective avatar feature that is not initially displayed) that is at least partially reactive to the third physical feature, the electronic device (e.g., 100, 300, 500, 600) detects a change in the third physical feature from the first physical feature value to a second physical feature value. In such examples, in accordance with the second physical feature value of the third physical feature meeting or exceeding the first avatar feature inclusion threshold, the electronic device (e.g., 100, 300, 500, 600) modifies the virtual avatar to include the first avatar feature (e.g., 1038, 1050, 1138, 1139, 1250, 1254, 1256, 1258, 1339, 1348, 1538, 1531, 1633, 1645, 1738) (e.g., introducing a previously undisplayed avatar eyelid when the user's eyelid changes position (e.g., moves) a value that is equal to or greater than a position change threshold). Further in such examples, in accordance with the second physical feature value of the third physical feature not meeting or exceeding the first avatar feature inclusion threshold, the electronic device (e.g., 100, 300, 500, 600) forgoes modifying the virtual avatar to include the first avatar feature (e.g., the avatar continues to be displayed without avatar eyelids, lips, or eyebrows, for example). Modifying the virtual avatar to include the first avatar feature in accordance with the second physical feature value of the third physical feature meeting or exceeding the first avatar feature inclusion threshold provides the user with options for controlling the inclusion of modifications to features of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the third physical feature includes at least a portion of a user's eye (e.g., 1123), the first avatar feature (e.g., 1138) includes at least a portion of an avatar eyebrow (e.g., an avatar eyebrow that is not displayed prior to detecting the change in the plurality of physical features of the face), the first avatar feature inclusion threshold is met or exceeded when the size of the at least a portion of the user's eye (e.g., a magnitude (such as a percentage of a maximum range) of the eye's openness) is greater than a threshold size value. In such examples, modifying the virtual avatar to include the first avatar feature includes modifying the virtual avatar to include the at least a portion of the avatar eyebrow (e.g., an avatar eyebrow is added to the avatar). In some examples, the added avatar eyebrow has a raised position.

In some examples, the third physical feature includes at least a portion of a user's eye (e.g., 1127), the first avatar feature includes at least a portion of an avatar eyebrow or eyelid (e.g., 1148) (e.g., an avatar eyebrow or eyelid that is not displayed prior to detecting the change in the plurality of physical features of the face) and at least a portion of an avatar cheek (e.g., 1139) (e.g., an avatar cheekbone that is not displayed prior to detecting the change in the plurality of physical features of the face). In such examples, the first avatar feature inclusion threshold is met or exceeded when the size of the at least a portion of the user's eye (e.g., a magnitude (such as a percentage of a maximum range) of the eye's openness) is less than a threshold size value. Further in such examples, modifying the virtual avatar to include the first avatar feature includes modifying the virtual avatar to include the at least a portion of the avatar eyebrow or eyelid and the at least a portion of the avatar cheek. For example, as shown in FIG. 11C, an avatar eyebrow or eyelid is added to the avatar, and an avatar cheekbone is added to the avatar at a position below the avatar's eye. In some examples, the added avatar eyebrow has a lowered position.

In some examples, the third physical feature includes at least a portion of a user's eyebrow (e.g., 1222), the first avatar feature includes one or more protrusions (e.g., 1254), the first avatar feature inclusion threshold is met or exceeded when a magnitude of a vertical displacement of the at least a portion of the user's eyebrow (e.g., a magnitude (such as a percentage of a maximum range) of the eyebrow's movement in a vertical direction towards the top of the user's head) is greater than a threshold displacement value, and modifying the virtual avatar to include the first avatar feature includes modifying the virtual avatar to include the one or more protrusions positioned on least an upper portion of an avatar's head. For example, one or more spikes or protrusions are extended from the top of the avatar's head as shown in FIG. 12B.

In some examples, the third physical feature includes at least a portion of a user's cheek (e.g., 1228), the first avatar feature includes one or more protrusions (e.g., 1258), the first avatar feature inclusion threshold is met or exceeded when the at least a portion of the user's cheek is expanded (e.g., a magnitude (such as a percentage of a maximum range) of the cheek puff) greater than a threshold expanding value, and modifying the virtual avatar to include the first avatar feature includes modifying the virtual avatar to include the one or more protrusions positioned on at least a portion of an avatar cheek. For example, one or more spikes or protrusions are extended from the avatar's cheek as shown in FIG. 12B.

In some examples, the third physical feature includes at least a portion of a user's eyebrow (e.g., 1222), the first avatar feature includes a curved orientation of an upper portion (e.g., the "face" or "head portion" of the virtual avatar) of the virtual avatar about a lower portion (e.g., the base or lower-neck portion) of the virtual avatar (e.g., 1240A, 1240B), the first avatar feature inclusion threshold is met or exceeded when a magnitude of a vertical displacement of the at least a portion of the user's eyebrow (e.g., a magnitude (such as a percentage of a maximum range) of the eyebrow's movement in a vertical direction away from the top of the user's head) is greater than a threshold displacement value (e.g., the threshold displacement value is a relative position of the user's eyebrow that corresponds to a frown pose of a single one of the user's eyebrows or both of the user's eyebrows), and modifying the virtual avatar to include the first avatar feature includes modifying the upper portion of the virtual avatar to curve (e.g., the face or head of the virtual avatar droops by having a curved orientation about the lower portion (e.g., the base or lower-neck portion) of the virtual avatar) about the lower portion of the virtual avatar. In some examples, one or more avatar features (e.g., 1230, 1240A, 1240B) have a curved orientation such that the drooping pose of the avatar includes drooping of the avatar features. In some examples, the upper portions of the virtual avatar droop below the lower portion of the virtual avatar (e.g., one or more corners of a bottom edge of the virtual avatar droop down below a level of the face of the virtual avatar). One such example is shown in 1011C of FIG. 10A.

In some examples, the first physical feature includes at least a portion of a user's eye (e.g., 1023, 1123, 1523, 1723), the respective avatar feature includes at least a portion of an avatar eye (1032, 1132, 1532, 1732), and the second physical feature includes at least a portion of a user's eyebrow (1022, 1122, 1522, 1722). In such embodiments, detecting the change in the plurality of physical features of the face includes detecting the at least a portion of the user's eye opening wider (e.g., a greater amount of the user's eye is visible when compared to the amount of the user's eye that is visible when the user's eye is open and in a neutral, resting position) and the at least a portion of the user's eyebrow raising (e.g., the eyebrow has a position that is vertically displaced (e.g., in a direction away from the user's eyes or towards the top of the user's head) with respect to the neutral, resting position of the eyebrow). In some examples, the detection of the user's eye widening is tied to a position of the user's upper eyelid. In such examples, the determination is based on whether the user's upper eyelid has a position that is vertically displaced when compared to the neutral, resting position of the eyelid when the user's eye is opened. If the eyelid is vertically displaced in a direction towards the top of the user's head, the eye is considered to be widened or opened (or moving in an opening direction). Conversely, if the eyelid is vertically displaced in a direction towards the user's cheeks, the eye is considered to be narrowed or closed (or moving in a closing direction). Further in such embodiments, changing an appearance of the respective avatar feature includes opening the at least a portion of the avatar eye wider (e.g., the avatar eye is modified to display a greater amount of the avatar's eye (or to increase the size of the avatar's eye) than was visible prior to detecting the change in the one or more physical features of the face), and deforming a portion of the virtual avatar that did not include an avatar feature prior to detecting the change in the one or more physical features of the face includes deforming a portion of the virtual avatar above the at least a portion of the avatar eye by introducing an avatar eyebrow feature (e.g., 1038, 1138, 1538, 1738) (e.g., an avatar eyebrow is added to the avatar at a position corresponding to the raised position of the user's eyebrow).

In some examples, the first physical feature includes at least a portion of a user's eye (e.g., 1127), the respective avatar feature includes at least a portion of an avatar eye (e.g., 1132), the second physical feature includes at least a portion of a user's eyebrow (e.g., 1122), detecting the change in the plurality of physical features of the face includes detecting the at least a portion of the user's eye narrowing (e.g., a lesser amount of the user's eye is visible when compared to the amount of the user's eye that is visible when the user's eye is open and in a neutral, resting position) and the at least a portion of the user's eyebrow lowering (e.g., the eyebrow has a position that is vertically displaced (e.g., in a direction towards the user's eyes or away from the top of the user's head) with respect to the neutral, resting position of the eyebrow). In some examples, the detection of the user's eye narrowing is tied to a position of the user's upper eyelid. In such examples, the determination is based on whether the user's upper eyelid has a position that is vertically displaced when compared to the neutral, resting position of the eyelid when the user's eye is opened. If the upper eyelid is vertically displaced in a direction towards the user's cheeks, the eye is considered to be narrowed or closed (or moving in a closing or narrowing direction). Conversely, if the upper eyelid is vertically displaced in a direction towards the top of the user's head, the eye is considered to be widened or opened (or moving in an opening or widening direction). In some examples, the detection of the user's eye narrowing is tied to a position of the user's lower eyelid (or a combination of the user's upper and lower eyelids). In such embodiments, the determination is based on whether the user's lower eyelid has a position that is vertically displaced when compared to the neutral, resting position of the eyelid when the user's eye is opened. If the lower eyelid is vertically displaced in a direction away from the user's cheeks, the eye is considered to be narrowed or closed (or moving in a closing or narrowing direction). In such embodiments, changing an appearance of the respective avatar feature includes closing the at least a portion of the avatar eye (e.g., the avatar eye is modified to display a lesser amount of the avatar's eye than was visible prior to detecting the change in the one or more physical features of the face). In some examples, closing the avatar eye includes introducing an avatar eyelid, wherein the avatar eyelid is in a closed position or moving towards a closed position. In some examples, closing the avatar eye includes moving a displayed eyelid to a closed position. In some examples, closing the avatar eye includes decreasing the size of the avatar's eye. In such embodiments, the decrease in the size of the avatar's eye can include decreasing the size of the avatar's eyelids. Further in such embodiments, deforming a portion of the virtual avatar that did not include an avatar feature prior to detecting the change in the one or more physical features of the face includes deforming a portion of the virtual avatar above the at least a portion of the avatar eye by introducing an avatar eyebrow or eyelid feature (e.g., 1148) (e.g., an avatar eyebrow or eyelid is added to the avatar at a position corresponding to the lowered position of the user's eyebrow) and deforming a portion of the virtual avatar below the at least a portion of the avatar eye by introducing an avatar cheek feature (e.g., 1139) (e.g., an avatar cheekbone is added to the avatar at a position below the avatar's eye).

In some examples, the first physical feature includes at least a portion of a user's eye (e.g., 1323), the respective avatar feature includes at least a portion of an avatar eye (e.g., 1332), the second physical feature includes at least a portion of a user's eyelid (e.g., 1327), detecting the change in the plurality of physical features of the face includes detecting the at least a portion of the user's eye narrowing (e.g., a lesser amount of the user's eye is visible when compared to the amount of the user's eye that is visible when the user's eye is open and in a neutral, resting position) and the at least a portion of the user's eyelid lowering (e.g., the eyelid has a position that is vertically displaced when compared to the neutral, resting position of the eyelid when the user's eye is opened). In some examples, the detection of the user's eye narrowing is tied to a position of the user's upper eyelid. In such examples, the determination is based on whether the user's upper eyelid has a position that is vertically displaced when compared to the neutral, resting position of the eyelid when the user's eye is opened. If the upper eyelid is vertically displaced in a direction towards the user's cheeks, the eye is considered to be narrowed or closed (or moving in a closing or narrowing direction). Conversely, if the upper eyelid is vertically displaced in a direction towards the top of the user's head, the eye is considered to be widened or opened (or moving in an opening or widening direction). In some examples, the detection of the user's eye narrowing is tied to a position of the user's lower eyelid (or a combination of the user's upper and lower eyelids). In such embodiments, the determination is based on whether the user's lower eyelid has a position that is vertically displaced when compared to the neutral, resting position of the eyelid when the user's eye is opened. If the lower eyelid is vertically displaced in a direction away from the user's cheeks, the eye is considered to be narrowed or closed (or moving in a closing or narrowing direction). In some examples, the user's eyelid is the upper eyelid. In such embodiments, if the upper eyelid is vertically displaced in a direction towards the user's cheeks, the eye is considered to be narrowed or closed (or moving in a closing or narrowing direction). In some examples, the user's eyelid is the lower eyelid. In such examples, if the lower eyelid is vertically displaced in a direction away from the user's cheeks, the eye is considered to be narrowed or closed (or moving in a closing or narrowing direction). In such embodiments, changing an appearance of the respective avatar feature includes closing the at least a portion of the avatar eye (e.g., the avatar eye is modified to display a lesser amount of the avatar's eye than was visible prior to detecting the change in the one or more physical features of the face) and deforming a portion of the virtual avatar that did not include an avatar feature prior to detecting the change in the one or more physical features of the face includes deforming a portion of the avatar eye by introducing an avatar eyelid feature (e.g., 1348, 1339) (e.g., an avatar eyelid is added to the avatar). In some examples, closing the avatar eye includes decreasing the size of the avatar's eye. In such examples, the decrease in the size of the avatar's eye can include decreasing the size of the avatar's eyelids. In some examples, the avatar eyelid is introduced at a closed position or moving towards a closed position.

In some examples, the first physical feature includes at least a portion of a user's lip (e.g., 1029, 1229, 1520A, 1520B, 1620A, 1620B), the respective avatar feature includes at least a portion of an avatar mouth (e.g., 1030, 1230, 1530, 1630), detecting the change in the plurality of physical features of the face includes detecting the at least a portion of the user's lip having a pucker pose, and changing an appearance of the respective avatar feature includes modifying the at least a portion of the avatar mouth to include a set of avatar lips having a pucker pose (e.g., 1050, 1250, 1531, 1645). For example, the avatar mouth transitions into a different avatar feature (e.g., a set of lips) having a predetermined configuration that includes puckered lips.

In some examples, the first physical feature includes at least a portion of a user's lip (e.g., 1620A, 1620B), the respective avatar feature includes at least a portion of an avatar beak (e.g., 1630), detecting the change in the plurality of physical features of the face includes detecting the at least a portion of the user's lip having a pucker pose, and changing an appearance of the respective avatar feature includes modifying the at least a portion of the avatar beak to include a set of avatar lips having a pucker pose (e.g., 1645). For example, the tip of the avatar beak transitions into a different avatar feature (e.g., a set of lips) having a predetermined configuration that includes puckered lips.

In some examples, the one or more physical features include a third physical feature (e.g., a user's cheek 1228) that does not correspond to any of the plurality of avatar features (e.g., initial avatar features 1232, 1230). In such examples, the electronic device (e.g., 100, 300, 500, 600) deforms a second portion of the virtual avatar (e.g., a cheek portion 1256) that did not include an avatar feature prior to detecting the change in the one or more physical features of the face, wherein a magnitude or direction of deforming the second portion of the avatar feature is based on a magnitude or direction of change in the third physical feature. For example, in it's neutral state, the avatar (e.g., an alien avatar 1200) does not include an avatar feature (e.g., avatar cheeks 1256) that corresponds to the third physical feature (e.g., the user's cheeks 1228). In some examples, this additional avatar feature appears when a change is detected in the third physical feature (e.g., the user expands their cheeks, and the avatar is modified to include expanded cheeks). In such embodiments, the virtual avatar is capable of being modified to introduce a plurality of avatar features (e.g., avatar eyebrows, avatar cheeks, etc.) that correspond to a plurality of user features. Deforming a second portion of the virtual avatar that did not include an avatar feature prior to detecting the change in the one or more physical features of the face, wherein a magnitude or direction of the deformation is based on a magnitude or direction of change in the third physical feature, provides the user with feedback indicating that further movement of the same physical feature will cause the device to deform a second portion of the avatar feature based on a direction or magnitude of change in the further movements of the same physical feature. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, the second physical feature includes at least a portion of a user's eyelid (e.g., 1227), the third physical feature includes at least a portion of a user's cheek (e.g., 1228), and detecting the change in the plurality of physical features of the face includes detecting the at least a portion of the user's eyelid closing (e.g., the eyelid has a closed position in which very little or no portion of the user's eyeball is visible) and a change in the at least a portion of the user's cheek (e.g. the user puffs, or expands, their cheek). In such embodiments, deforming a portion of the virtual avatar that did not include an avatar feature prior to detecting the change in the one or more physical features of the face includes deforming a portion of the virtual avatar by introducing an avatar eyelid feature (e.g., eyelids associated with eyes 1232). For example, an avatar eyelid is added to the avatar. In some examples, the avatar eyelid is introduced at a closed position (e.g., when the virtual avatar is an alien). Further in such embodiments, deforming a second portion of the virtual avatar that did not include an avatar feature prior to detecting the change in the one or more physical features of the face includes deforming the second portion of the virtual avatar by introducing a cheek feature (e.g., 1256). For example, the virtual avatar is modified to include an avatar cheek having a puffed-out, or expanded, pose as shown in FIG. 12B.

In some examples, the second physical feature includes at least a portion of a user's eyebrow (e.g., 1222), detecting the change in the plurality of physical features of the face includes detecting the at least a portion of the user's eyebrow raising (e.g., the eyebrow has a position that is vertically displaced (e.g., in a direction away from the user's eyes or towards the top of the user's head) with respect to the neutral, resting position of the eyebrow), and deforming a portion of the virtual avatar that did not include an avatar feature prior to detecting the change in the one or more physical features of the face includes deforming an upper portion of an avatar head (e.g., the top of the virtual avatar's head) by introducing one or more protrusions (e.g., 1254) extending from the upper portion of the avatar head. For example, one or more spikes or protrusions 1254 are extended from the top of the avatar's head as shown in 1212B of FIG. 12B. Deforming an upper portion of an avatar head to include one or more protrusions based on raising of a user's eyebrow provides the user with efficient controls for introducing a new avatar feature without requiring additional displayed controls or inputs (e.g., touch inputs). Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first physical feature includes at least a portion of a user's cheek (e.g., 1228), the respective avatar feature includes at least a portion of an avatar cheek (e.g., 1256), detecting the change in the plurality of physical features of the face includes detecting the at least a portion of the user's cheek having an expanded pose (e.g., the user's cheeks have an expanded pose when the user puffs their cheeks out with air), and changing an appearance of the respective avatar feature includes modifying the at least a portion of the avatar cheek to include one or more protrusions (e.g., 1258) extending from the avatar cheek. For example, one or more spikes or protrusions 1258 are extended from the avatar's cheek as shown in 1212D of FIG. 12B. Modifying at least a portion of the avatar cheek to include one or more protrusions based on a change in a user's check provides the user with efficient controls for introducing a new avatar feature without requiring additional displayed controls or inputs (e.g., touch inputs). Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2200 (e.g., FIG. 22) are also applicable in an analogous manner to the methods described above and to methods 2300, 2400, and 2500, described below. For example, method 2200 optionally includes one or more of the characteristics of the various methods described below and above with reference to methods 800, 900, 1800, 1900, 2000, 2100, 2300, 2400, and 2500. For example, the methods of generating, sending, and receiving animated avatars in accordance with method 800 and 900 may employ virtual avatars (e.g., virtual avatars that can exhibit increased complexity (e.g., having increased avatar features) as required) generated in accordance with method 2200. Similarly, virtual avatars generated and/or modified in accordance method 2200 may be included in the displayed preview of a virtual avatar in a virtual avatar generation interface (e.g., 804, 904) of method 800 or 900. For another example, virtual avatars (e.g., virtual avatars that can exhibit increased complexity (e.g., having increased avatar features) as required) generated in accordance with method 2200 may also be generated in accordance with the virtual avatar generation and modification methods of methods 800, 900, 1800, 1900, 2000, 2100, 2300, 2400, and 2500. For example, a virtual avatar generated in accordance with method 2200 may include a first avatar portion (e.g., 1034) that reacts differently than a second avatar portion (e.g., 1036) to changes in pose of a user's face differently, depending on the type of change in pose (e.g., 1810 and 1812). Similarly, a virtual avatar generated in accordance with method 2200 may include an avatar feature (e.g., 1133) that reacts (e.g., 1904, 1910, 1914) to changes in both first (e.g., 1122) and second (e.g., 1120A-B) physical features. For brevity, further examples are excluded.

Figure 23:
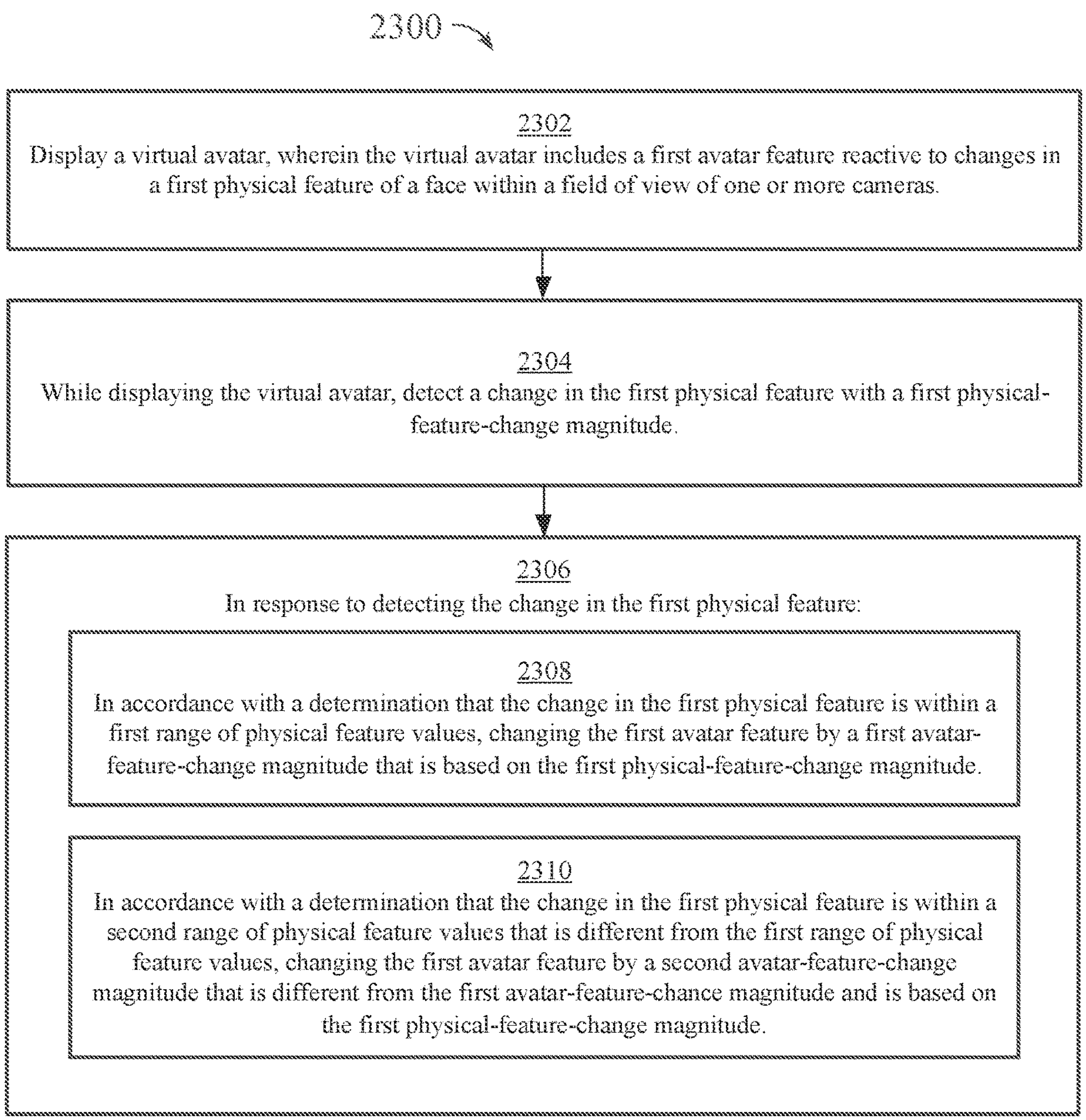
FIG. 23 is a flow diagram illustrating a method for generating and modifying a virtual avatar based on a face detected by one or more cameras.

FIG. 23 is a flow diagram illustrating a method, at an electronic device, for generating a virtual avatar based on a face detected by one or more cameras in accordance with some embodiments. Method 2300 is performed at an electronic device (e.g., 100, 300, 500, 600) with one or more cameras (e.g., 164, 602) and a display apparatus (e.g., 112, 340, 504, 601). Some operations in method 2300 are, optionally, combined, the orders of some operations are, optionally, changed, and some operations are, optionally, omitted.

As described below, method 2300 provides an intuitive way for generating virtual avatars that can exhibit exaggerated movement compared to user movement. The method reduces the physical and cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 2300 may be found in the user interfaces and virtual avatars discussed with reference to FIGS. 10A-10I, 12A-12C, 14A-14D, and 17A-17B.

The electronic device (e.g., 100, 300, 500, 600) displays (2302), via the display apparatus (e.g., 112, 340, 504, 601) a virtual avatar (e.g., 1000, 1200, 1400, 1700), that includes a first avatar feature (e.g., 1030, 1232, 1430, 1430L, 1430U, 1736) reactive to changes in a first physical feature (e.g., 1020, 1223, 1420, 1420A, 1420B, 1720) of a face within the field of view of the one or more cameras.

While displaying the virtual avatar (e.g., 1000, 1200, 1400, 1700), the electronic device (e.g., 100, 300, 500, 600) detects (2304) a change in the first physical feature (e.g., 1020, 1223, 1420, 1420A, 1420B, 1720) with a first physical-feature-change magnitude.

In response to detecting the change in the first physical feature, the electronic device (e.g., 100, 300, 500, 600) can perform one or more of the following operations. In accordance with a determination that the change in the first physical feature (e.g., 1020, 1223, 1420, 1420A, 1420B, 1720) is within a first range of physical feature values, the electronic device (e.g., 100, 300, 500, 600) changes the first avatar feature (e.g., 1030, 1232, 1430, 1430L, 1430U, 1736) by a first avatar-feature-change magnitude (e.g., a degree of change of the avatar feature that is based on, but not necessarily equal to, the first physical-feature-change magnitude) that is based on the first physical-feature-change magnitude (e.g., for the first range of changes in the first physical feature, the changes in the avatar feature change at a normal or reduced rate). In some examples, the avatar-feature-change magnitude is arrived at by applying a multiplier value to the physical-feature-change magnitude. In accordance with a determination that the change in the first physical feature (e.g., 1020, 1223, 1420, 1420A, 1420B, 1720) is within a second range of physical feature values that is different from (e.g., greater than) the first range of physical feature values, the electronic device (e.g., 100, 300, 500, 600) changes the first avatar feature (e.g., 1030, 1232, 1430, 1430L, 1430U, 1736) by a second avatar-feature-change magnitude that is different from (e.g., greater than) the first avatar-feature-change magnitude and is based on the first physical-feature-change magnitude (e.g., for the second range of changes in the first physical feature, the changes in the avatar feature change at an exaggerated rate). In some embodiments, the first range of physical feature values and the second range of physical feature values are non-overlapping. Changing the first avatar feature by a change magnitude that varies with the range of the changes in the physical feature value provides the user with feedback about the state of the physical feature change data detected by the electronic device and whether that detected change data is within first or second ranges of physical feature values. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first avatar feature is an avatar lip or mouth (e.g., 1030, 1430, 1430L, 1430U, or part thereof), the first physical feature of the face is a user lip or mouth (e.g., 1020, 1420, 1420A, 1420B, or part thereof), the first range of physical feature values includes a relaxed state value (e.g., a default value, an initial value) corresponding to a relaxed state of the user lip, the second range of physical feature values includes a first displacement state value (e.g., a value greater than the relaxed state value (e.g., 50% displacement in a range of possible displacement)) corresponding to a displaced state of the user lip (e.g., a state in which the lip is shifted (or shifted further compared to the relaxed, initial, or neutral state)), and the first avatar-feature-change magnitude is less than the second avatar-feature-change magnitude. In some examples, the relaxed state value is a minimum movement value within a range of potential movement (e.g., a 0% movement value). In some examples, the first displacement state value is a maximum displacement state value. In some examples, the maximum displacement state value is a maximum movement value (e.g., a maximum predicted movement value, a maximum tracked movement value) within a range of potential movement (e.g., a 100% movement value).

In some examples, changes in the first avatar feature (e.g., the avatar lip) become more exaggerated as the physical feature (e.g., the user's lip) changes from a relaxed state to state closer to a maximum displacement state. As a result, the changes in the avatar feature become more exaggerated, as compared to the changes in the user's physical feature, as changes in the physical feature increase with respect to a relaxed state. In some examples, the first avatar-feature-change magnitude is arrived at by applying a multiplier of 1 or less to the first physical-feature-change magnitude and the second avatar-feature-change magnitude is arrived at by applying a multiplier of greater than 1 to the first physical-feature-change magnitude. Changing the mouth of the virtual avatar by a greater magnitude as the user's mouth moves beyond a relaxed state provides the user with a method to amplify changes to the avatar mouth. Performing an operation (e.g., amplified changing of an avatar's mouth) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the relaxed state of the user mouth (e.g., 1020, 1420, 1420A, 1420B, or part thereof) has a first user mouth shape (e.g., a closed or mostly closed shape formed by a human mouth), the displaced state of the user mouth has a second user mouth shape (e.g., an open or mostly open shape formed by a human mouth), changing the first avatar feature (e.g., 1030, 1430, 1430L, 1430U, or part thereof) by a first avatar-feature-change magnitude includes changing the avatar mouth (e.g., 1430, 1430L, 1430U or part thereof) to assume one or more shapes (e.g., a circle or trapezoid as shown in FIGS. 14C and 14D) that do not correspond to the first user mouth shape (e.g., a human smile, a human frown). In such embodiments, changing the first avatar feature by a second avatar-feature-change magnitude includes changing the avatar mouth to assume one or more shapes (e.g., trapezoid or circle) that do not correspond to the second user mouth shape. In some examples, while the magnitude of changes to an avatar feature are based on the first physical-feature-change magnitude (e.g., the magnitude of change of the physical feature), changes to the shape of the avatar feature are not based on (or not completely or directly based on) changes to the shape of the physical feature. In some such embodiments, the changes to the shape of the avatar feature are, instead, based on transitioning (e.g., gradually or progressively transitioning) from an initial state of the avatar feature (e.g., a resting state, a neutral state (e.g., a circle)) to a displaced state of the avatar feature (e.g., a trapezoid). Changing the shape of the mouth of the virtual avatar to assume a shape different than the user's mouth provides the user with a method to affect changes to the avatar mouth without having to have the user's mouth assume the desired shape and without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first avatar feature is an avatar mouth (e.g., 1030, 1430, 1430L, 1430U, or part thereof), the first physical feature of the face is a user mouth (e.g., 1020, 1420, 1420A, 1420B, or part thereof), the first range of physical feature values includes a relaxed state value (e.g., a default value, an initial value) corresponding to a relaxed state of the user mouth, the second range of physical feature values includes a first displacement state value (e.g., a value greater than the relaxed state value (e.g., 50% displacement in a range of possible displacement)) corresponding to a displaced state of the user mouth (e.g., a state in which the mouth is opened (or opened wider compared to the relaxed, initial, or neutral state)), and the first avatar-feature-change magnitude is less than the second avatar-feature-change magnitude. In some examples, the relaxed state value is a minimum movement value within a range of potential movement (e.g., a 0% movement value). In some examples, the first displacement state value is a maximum displacement state value. In some examples, the maximum displacement state value is a maximum movement value (e.g., a maximum predicted movement value, a maximum tracked movement value) within a range of potential movement (e.g., a 100% movement value). In some examples, such as that shown in FIG. 10B, changes in the first avatar feature (e.g., the avatar mouth 1030) become more exaggerated as the physical feature (e.g., the user's mouth 1020) changes from a relaxed state to state closer to a maximum displacement state. As a result, the changes in the avatar feature become more exaggerated, as compared to the changes in the user's physical feature, as changes in the physical feature increase with respect to a relaxed state. In some examples, the first avatar-feature-change magnitude is arrived at by applying a multiplier of 1 or less to the first physical-feature-change magnitude and the second avatar-feature-change magnitude is arrived at by applying a multiplier of greater than 1 to the first physical-feature-change magnitude. Changing the mouth of the virtual avatar by a greater magnitude as the user's mouth moves beyond a relaxed state provides the user with a method to amplify changes to the avatar mouth. Performing an operation (e.g., amplified changing of an avatar's mouth) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first avatar feature is an avatar eye (e.g., 1232), the first physical feature of the face is a user eye or eyelid (e.g., 1223, 1227, or part thereof), the first range of physical feature values includes a relaxed state value (e.g., a default value, an initial value) corresponding to a relaxed state of the user eyelid (e.g., when the user's eyelid is in an open position), the second range of physical feature values includes a first displacement state value (e.g., a value greater than the relaxed state value (e.g., 50% displacement in a range of possible displacement)) corresponding to a displaced state of the user eyelid (e.g., a state in which the eyelid is opened (or opened wider compared to the relaxed, initial, or neutral state)), and the first avatar-feature-change magnitude is less than the second avatar-feature-change magnitude. In some examples, the relaxed state value is a minimum movement value within a range of potential movement (e.g., a 0% movement value). In some examples, the first displacement state value is a maximum displacement state value. In some examples, the maximum displacement state value is a maximum movement value (e.g., a maximum predicted movement value, a maximum tracked movement value) within a range of potential movement (e.g., a 100% movement value). In some examples, such as that shown in FIG. 12C, changes in the first avatar feature (e.g., the avatar eye 1232) become more exaggerated as the physical feature (e.g., the user's eye or eyelid) changes from a relaxed state to state closer to a maximum displacement state. As a result, the changes in the avatar feature become more exaggerated, as compared to the changes in the user's physical feature, as changes in the physical feature increase with respect to a relaxed state. In some examples, the first avatar-feature-change magnitude is arrived at by applying a multiplier of 1 or less to the first physical-feature-change magnitude and the second avatar-feature-change magnitude is arrived at by applying a multiplier of greater than 1 to the first physical-feature-change magnitude. Changing the eye of the virtual avatar by a greater magnitude as the user's eyelid moves beyond a relaxed state provides the user with a method to amplify changes to the avatar eye. Performing an operation (e.g., amplified changing of an avatar's eye) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first avatar feature is an avatar eye (e.g., 1032 or 1032A), the first physical feature of the face is a user eye (e.g., 1023 or part thereof), the first range of physical feature values includes a relaxed state value (e.g., a default value, an initial value) corresponding to a relaxed state of the user eye, the second range of physical feature values includes a first displacement state value (e.g., a value greater than the relaxed state value (e.g., 50% displacement in a range of possible displacement)) corresponding to a displaced state of the user eye (e.g., a state in which the eye is shifted (or shifted further compared to the relaxed, initial, or neutral state)), and the first avatar-feature-change magnitude is less than the second avatar-feature-change magnitude. In some examples, the relaxed state value is a minimum movement value within a range of potential movement (e.g., a 0% movement value). In some embodiments, the first displacement state value is a maximum displacement state value. In some examples, the maximum displacement state value is a maximum movement value (e.g., a maximum predicted movement value, a maximum tracked movement value) within a range of potential movement (e.g., a 100% movement value). In some examples, changes in the first avatar feature (e.g., the avatar eye) become more exaggerated as the physical feature (e.g., the user's eye) changes from a relaxed state to state closer to a maximum displacement state. As a result, the changes in the avatar feature become more exaggerated, as compared to the changes in the user's physical feature, as changes in the physical feature increase with respect to a relaxed state. In some examples, the first avatar-feature-change magnitude is arrived at by applying a multiplier of 1 or less to the first physical-feature-change magnitude and the second avatar-feature-change magnitude is arrived at by applying a multiplier of greater than 1 to the first physical-feature-change magnitude. Changing the eye of the virtual avatar by a greater magnitude as the user's eye moves beyond a relaxed state provides the user with a method to amplify changes to the avatar eye. Performing an operation (e.g., amplified changing of an avatar's eye) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, an avatar feature is reactive to changes in a physical feature of a face that does not anatomically or physiologically correspond with the avatar feature. For example, the first avatar feature is an avatar nose (e.g., 1736), the first physical feature of the face is a user lip (e.g., 1720, 1720A, or part thereof), and the avatar's nose may be reactive to changes in the user's lip. In such embodiments, the first range of physical feature values includes a relaxed state value (e.g., a default value, an initial value) corresponding to a relaxed state of the user lip, the second range of physical feature values includes a first displacement state value (e.g., a value greater than the relaxed state value (e.g., 50% displacement in a range of possible displacement)) corresponding to a displaced state of the user lip (e.g., a state in which the lip is shifted (or shifted further) compared to the relaxed, initial, or neutral state), and the first avatar-feature-change magnitude is less than the second avatar-feature-change magnitude. In some examples, the relaxed state value is a minimum movement value within a range of potential movement (e.g., a 0% movement value). In some examples, the first displacement state value is a maximum displacement state value. In some examples, the maximum displacement state value is a maximum movement value (e.g., a maximum predicted movement value, a maximum tracked movement value) within a range of potential movement (e.g., a 100% movement value). In some examples, changes in the first avatar feature (e.g., the avatar nose) become more exaggerated as the physical feature (e.g., the user's lip or mouth) changes from a relaxed state to state closer to a maximum displacement state. As a result, the changes in the avatar feature become more exaggerated, as compared to the changes in the user's physical feature, as changes in the physical feature increase with respect to a relaxed state. In some examples, the first avatar-feature-change magnitude is arrived at by applying a multiplier of 1 or less to the first physical-feature-change magnitude and the second avatar-feature-change magnitude is arrived at by applying a multiplier of greater than 1 to the first physical-feature-change magnitude. Changing the nose of the virtual avatar based on a user's lip (a physical feature that does not anatomically correspond to the avatar nose) provides the user with an input-efficient method for defining characteristics of the virtual avatar (e.g., movement of the user's nose may be difficult). Performing an operation (e.g., changing an avatar nose) when a set of conditions has been met (e.g., movement of the user's lip) without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first avatar feature (e.g., 1736) is also reactive to changes in a second physical feature (e.g., 1722 in addition to 1720A) of the face within the field of view of the one or more cameras. In such examples, the electronic device (e.g., 100, 300, 500, 600), while displaying the virtual avatar (e.g., 1000, 1200, 1400, 1700), detects a change in the second physical feature with a second physical-feature-change magnitude. In such examples, in response to detecting the change in the second physical feature, the electronic device (e.g., 100, 300, 500, 600) can perform one or more of the following operations. In accordance with a determination that the change in the second physical feature is within a third range of physical feature values, the electronic device (e.g., 100, 300, 500, 600) changes the first avatar feature by a third avatar-feature-change magnitude that is based on the second physical-feature-change magnitude (e.g., for the first range of changes in the first physical feature, the changes in the avatar feature change at a normal or reduced rate). In accordance with a determination that the change in the second physical feature is within a fourth range of physical feature values that is different from (e.g., greater than) the third range of physical feature values, the electronic device (e.g., 100, 300, 500, 600) changes the first avatar feature by a fourth avatar-feature-change magnitude that is different from (e.g., greater than) the third avatar-feature-change magnitude and is based on the second physical-feature-change magnitude (e.g., for the second range of changes in the first physical feature, the changes in the avatar feature change at an exaggerated rate). Changing the first avatar feature based on at least two physical features provides the user with an efficient input modality for changing the avatar feature without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the virtual avatar (e.g., 1000, 1200, 1400, 1700) includes a second avatar feature (e.g., 1030, 1430, 1430L, 1430U) (e.g., an avatar's mouth) reactive to changes in a third physical feature (e.g., 1020, 1420, 1420A, 1420B) (e.g., a user's mouth) of the face within the field of view of the camera. In such examples, the third physical feature has a range of possible physical feature values based on a predetermined range of motion of the third physical feature (e.g., a range of motion expressed as magnitude values with respect to an initial (e.g., resting) value), the second avatar feature has a range of possible avatar feature values based on a predetermined range of motion of the second avatar feature, and the predetermined range of motion of the second avatar feature is greater than the predetermined range of motion of the third physical feature (e.g., the range of motion of the first avatar feature, assessed based on an initial or resting magnitude value is greater than that for the corresponding physical feature). For example, the mouth of the avatar may expand in width by 300% compared to its initial size, whereas the physical feature has range of motion that is only 200% its initial size. Further in such examples, the electronic device (e.g., 100, 300, 500, 600), while the second avatar feature has a first avatar feature value of the second avatar feature based on a detected first physical feature value of the third physical feature, detects a change in the third physical feature from the first physical feature value of the third physical feature to a second physical feature value of the third physical feature. In response to detecting the change in the third physical feature, the electronic device (e.g., 100, 300, 500, 600) changes the second avatar feature from the first avatar feature value of the second avatar feature to a second avatar feature value of the second avatar feature that is within the predetermined range of motion of the second avatar feature. Further in such examples, the second avatar feature value of the second avatar feature is based on the relative value of the second physical feature value of the third physical feature relative to the predetermined range of motion of the third physical feature. Further in such examples, the difference between the first avatar feature value of the second avatar feature and the second avatar feature value of the second avatar feature is greater than the difference between the first physical feature value of the third physical feature and second physical feature value of the third physical feature. In some examples, changes to an avatar feature (e.g., a second avatar feature (e.g., an avatar mouth)) that are based on a physical feature of the face (e.g., a third physical feature of the face (e.g., a user mouth)) are exaggerated, within the respective predetermined ranges of motion of the avatar feature and the physical feature. For example, when a user's mouth opens by 50% of the maximum size by which the mouth can open, the avatar's mouth opens to 100% of the maximum size by which the avatar mouth can open. In such embodiments, this exaggerated movement of the avatar feature can allow the user to affect maximum changes to the avatar feature, without having to uncomfortably change the corresponding feature of their face (e.g., causing the avatar to open its mouth as wide as possible without having to uncomfortably open the user's mouth as wide as possible).

Note that details of the processes described above with respect to method 2300 (e.g., FIG. 23) are also applicable in an analogous manner to the methods described above and to methods 2400 and 2500, described below. For example, method 2300 optionally includes one or more of the characteristics of the various methods described below and above with reference to methods 800, 900, 1800, 1900, 2000, 2100, 2200, 2400, and 2500. For example, the methods of generating, sending, and receiving animated avatars in accordance with method 800 and 900 may employ virtual avatars (e.g., virtual avatars that can exhibit exaggerated movement compared to user movement) generated in accordance with method 2300. Similarly, virtual avatars generated and/or modified in accordance method 2300 may be included in the displayed preview of a virtual avatar in a virtual avatar generation interface (e.g., 804, 904) of method 800 or 900. For another example, virtual avatars (e.g., virtual avatars that can exhibit exaggerated movement compared to user movement) generated in accordance with method 2300 may also be generated in accordance with the virtual avatar generation and modification methods of methods 800, 900, 1800, 1900, 2000, 2100, 2200, 2400, and 2500. For example, a virtual avatar generated in accordance with method 2300 may include a first avatar portion (e.g., 1034) that reacts differently than a second avatar portion (e.g., 1036) to changes in pose of a user's face differently, depending on the type of change in pose (e.g., 1810 and 1812). Similarly, a virtual avatar generated in accordance with method 2300 may include an avatar feature (e.g., 1133) that reacts (e.g., 1904, 1910, 1914) to changes in both first (e.g., 1122) and second (e.g., 1120A-B) physical features. For brevity, further examples are excluded.

FIG. 24 is a flow diagram illustrating a method, at an electronic device, for generating a virtual avatar based on a face detected by one or more cameras in accordance with some embodiments. Method 2400 is performed at an electronic device (e.g., 100, 300, 500, 600) with one or more cameras (e.g., 164, 602) and a display apparatus (e.g., 112, 340, 504, 601). Some operations in method 2400 are, optionally, combined, the orders of some operations are, optionally, changed, and some operations are, optionally, omitted.

As described below, method 2400 provides an intuitive way for generating virtual avatars, while reacting to changes in position of the user's face. The method reduces the cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 2400 may be found in the user interfaces and virtual avatars discussed with reference to FIGS. 10A-10I.

The electronic device (e.g., 100, 300, 500, 600) displays (2402), via the display apparatus (e.g., 112, 340, 504, 601) a virtual avatar (e.g., 1000). In some examples, the virtual avatar has a respective spatial position within a frame of reference (e.g., a frame of reference used for determining how the virtual avatar should be displayed (e.g., at the electronic device or a separate electronic device)), wherein the respective spatial position is based on a position of a face (e.g., 1003A-C, 1004A-D, 1005A-D, 1006A-D, 1007A-B, 1008A-D) within a field of view of the one or more cameras (e.g., 164, 602). Examples of such positioning of a virtual avatar within a frame of reference is illustrated in 1013A-B, 1014A-D, 1015A-D, 1016A-D, 1017A-B, 1018A-D of FIGS. 10C-10H.

While displaying the virtual avatar (e.g., 1000), the electronic device (e.g., 100, 300, 500, 600) detects (2404) a change in position of the face (e.g., 1003A-B, 1004A-D, 1005A-D, 1006A-D, 1007A-B, 1008A-D) within the field of view of the one or more cameras (e.g., 164, 602) by a respective amount. For example, from a first position of the face to a second position of the face with respect to the field of view of the one or more cameras, such as a horizontal translational shift, a vertical translational shift, a translational shift in distance with respect to the position of the one or more cameras (e.g., translational shift along the x, y, or z axes), or a rotational shift along a cardinal axis within the field of view (e.g., a rotational shift along the x, y, or z axes).

In response to detecting the change in position of the face (e.g., 1003A-B, 1004A-D, 1005A-D, 1006A-D, 1007A-B, 1008A-D) within the field of view of the one or more cameras (e.g., 164, 602) (2406), the electronic device (e.g., 100, 300, 500, 600) can perform one or more of the following operations. In accordance with a determination that the change in position of the face includes a first component of change in a first direction (e.g., 1003A-B, 1004A-D, 1005A-D, 1006A-D, 1007A-B, 1008A-D), the electronic device (e.g., 100, 300, 500, 600) modifies (2408) the spatial position of the virtual avatar (e.g., 1000) within the frame of reference (e.g., 1013A-B, 1014A-D, 1015A-D,

1016A-D, 1017A-B, 1018A-D) based on the magnitude of the first component of change and a first modification factor (e.g., a factor that dampens or amplifies motion affecting the position of the virtual avatar with respect to the detected motion of the user's face in the field of view of the one or more cameras).

In accordance with a determination that the change in position includes a second component of change in second direction (e.g., 1003A-B, 1004A-D, 1005A-D, 1006A-D, 1007A-B, 1008A-D), different than the first direction, the electronic device (e.g., 100, 300, 500, 600) modifies (2410) the spatial position of the virtual avatar (e.g., 1000) within the frame of reference (e.g., 1013A-B, 1014A-D, 1015A-D, 1016A-D, 1017A-B, 1018A-D) based on the magnitude of the second component of change and a second modification factor, different than the first modification factor. In some examples, detected motion of the user's face is translated into dampened motion of the virtual avatar differently depending on the nature of the detected motion. For example, translational movement in the horizontal (e.g., x-axis) direction may be dampened by half using a modification factor of 50%, whereas translational movement in the vertical (e.g., y-axis) direction may be dampened by only a quarter by using a modification factor of 25%, when the device is oriented such that the field of view is narrower in the horizontal than the vertical. In some examples, using different modification factors may assist the user to stay within a desired frame of reference, while still being responsive to the user's physical repositioning. Thus, modifying the spatial position of the virtual avatar within the frame of reference based on the magnitude of the second component of change (e.g., a translational component of change) and a second modification factor, different than the first modification factor assists in maintaining the virtual avatar within the frame of reference when the component of change would otherwise result in the virtual avatar shifting out of the frame of reference. Reducing the inputs needed to perform an operation (e.g., maintaining the virtual avatar within the frame of reference) enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change, the first component of change is a horizontal component of change with respect to the field of view of the one or more cameras (e.g., 1006A-D), and the first modification factor is a dampening factor (e.g., a fractional modifier that, when applied to the magnitude of the first component of change, results in a lesser, modified magnitude value). In such examples, modifying the spatial position of the virtual avatar within the frame of reference includes modifying the spatial position, in the horizontal direction, by a magnitude less than the magnitude of the first component of change (e.g., 1016A-D). In some examples, the magnitude of change is determined as a percentage change of position within the field of view of the one or more cameras (e.g., for the face) or within the spatial frame of reference (e.g., for the virtual avatar). For example, the spatial position of the face may shift in the horizontal direction by 60% of the full horizontal width of the field of view of the one or more cameras. In some such embodiments, applying a dampening factor of 50% would result in the spatial position of the virtual avatar shifting by 30% (e.g., 60%*0.5) of the full horizontal width of the frame of reference (e.g., the display area designated for display of the virtual avatar). Dampening modifications of the spatial position of the virtual avatar, in the horizontal direction, within the frame of reference assists in maintaining the virtual avatar horizontally aligned within the frame of reference when the component of change would otherwise result in the virtual avatar shifting out of the frame of reference. Reducing the inputs needed to perform an operation (e.g., maintaining the horizontal position of the virtual avatar within the frame of reference) enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change, the first component of change is a vertical component of change with respect to the field of view of the one or more cameras (e.g., 1008A-B), and the first modification factor is a dampening factor (e.g., a fractional modifier that, when applied to the magnitude of the first component of change, results in a lesser, modified magnitude value). In such examples, modifying the spatial position of the virtual avatar (e.g., 1000) within the frame of reference includes modifying the spatial position, in the vertical direction, by a magnitude less than the magnitude of the first component of change (e.g., 1018A-B). In some examples, the magnitude of change is determined as a percentage change of position within the field of view of the one or more cameras (e.g., for the face) or within the spatial frame of reference (e.g., for the virtual avatar). For example, the spatial position of the face may shift in the vertical direction by 60% of the full vertical length of the field of view of the one or more cameras. In some such embodiments, applying a dampening factor of 50% would result in the spatial position of the virtual avatar shifting by 30% (e.g., 60%*0.5) of the full vertical length of the frame of reference (e.g., the display area designated for display of the virtual avatar). Dampening modifications of the spatial position of the virtual avatar, in the vertical direction, within the frame of reference assists in maintaining the virtual avatar vertically aligned within the frame of reference when the component of change would otherwise result in the virtual avatar shifting out of the frame of reference. Reducing the inputs needed to perform an operation (e.g., maintaining the vertical position of the virtual avatar within the frame of reference) enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change, the first component of change is a depth-related component of change with respect to the field of view of the one or more cameras (e.g., 1008C-D) (e.g., a change (e.g., a shift) along the axis normal to the plane of the field of view of the one or more cameras, a change along the z-axis, a change inward or outward with respect to the plane of the field of view of the one or more cameras), and the first modification factor is a dampening factor (e.g., a fractional modifier that, when applied to the magnitude of the first component of change, results in a lesser, modified magnitude value). In such examples, modifying the spatial position of the virtual avatar (e.g., 1000) within the frame of reference includes modifying the spatial position, in the depth-related direction, by a magnitude less than the magnitude of the first component of change (e.g., 1018C-D). In some examples, the magnitude of change is determined as an absolute value (e.g., distance) as determined by the one or more cameras (e.g., one or more cameras capable of assessing depth). For example, the spatial position of the face may move away from the one or more cameras by 6 feet. In some such embodiments, applying a dampening factor of 50% would result in the spatial position of the virtual avatar shifting by 3 feet further away, with respect to the virtual avatar's initial position (e.g., represented by the virtual avatar being presented at a smaller size indicative of moving further away by a distance of 3 feet). Dampening modifications of the spatial position of the virtual avatar, in the depth-specific direction, within the frame of reference assists in maintaining the virtual avatar properly sized within the frame of reference when the component of change would otherwise result in the virtual avatar changing to a suboptimal size. Reducing the inputs needed to perform an operation (e.g., maintaining the optimal size of the virtual avatar) enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change, the first component of change includes rotation of the face around a vertical axis (e.g., a vertical axis that is parallel to the display) with respect to the field of view of the one or more cameras (e.g., 1004A-D) (e.g., there is a change in pose of the face that includes the face rotating along the vertical axis (e.g., y-axis) such that a different sides of the face become exposed/visible to the one or more cameras), and the first modification factor is a neutral modification factor (e.g., a modification factor that does not affect the magnitude of the first component of change, a multiplier of 1) or an amplifying modification factor (e.g., a non-dampening modification factor, or a modification factor that, when applied to the magnitude of the first component of change, increases the magnitude, a multiplier greater than 1). In such examples, modifying the spatial position of the virtual avatar (e.g., 1000) within the frame of reference includes rotating the spatial position of the virtual avatar around a vertical axis by a magnitude at least equal to the magnitude of the first component of change (1014A-D). Modifying the spatial position of the virtual avatar, without dampening the modifications when the change in position of the user's face is a rotational change around a vertical axis, provides the user with options for altering the spatial position (e.g., rotational orientation around a vertical axis) of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change, the first component of change includes tilting of the face around the horizontal axis (e.g., a horizontal axis that is parallel to the display) with respect to the field of view of the one or more cameras (e.g., 1003A-B). For example, there is a change in pose of the face that includes the face tilting along the horizontal axis (e.g., x-axis) such that portions of the top or bottom of the face or head that were not previously exposed to the one or more cameras become exposed to the one or more cameras, such as occurs when a user nods their head while facing the one or more cameras. Further in such embodiments, the first modification factor is a neutral modification factor (e.g., a modification factor that does not affect the magnitude of the first component of change, a multiplier of 1) or an amplifying modification factor (e.g., a non-dampening modification factor, or a modification factor that, when applied to the magnitude of the first component of change, increases the magnitude, a multiplier greater than 1). In such examples, modifying the spatial position of the virtual avatar (e.g., 1000) within the frame of reference includes tilting the spatial position of the virtual avatar around the horizontal axis by a magnitude at least equal to the magnitude of the first component of change (e.g., 1013A-B). Modifying the spatial position of the virtual avatar, without dampening the modifications when the change in position of the user's face is a tilting change around a horizontal axis, provides the user with options for altering the spatial position (e.g., tilting orientation around a horizontal axis) of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change, the first component of change includes rotation of the face around a simulated z-axis (e.g., an axis that is perpendicular to the display) with respect to the field of view of the one or more cameras (e.g., 1005A-B). For example, there is a change in pose of the face that includes the face rotating around the perpendicular axis (e.g., z-axis), such as occurs when a user tilts their head to the side while facing the one or more cameras. Further in such embodiments, the first modification factor is a neutral modification factor (e.g., a modification factor that does not affect the magnitude of the first component of change, a multiplier of 1) or an amplifying modification factor (e.g., a non-dampening modification factor, or a modification factor that, when applied to the magnitude of the first component of change, increases the magnitude, a multiplier greater than 1). In such examples, modifying the spatial position of the virtual avatar (e.g., 1000) within the frame of reference includes rotating the spatial position of the virtual avatar around the simulated z-axis (e.g., the axis that is perpendicular to the display) by a magnitude at least equal to the magnitude of the first component of change (e.g., 1015A-B). Modifying the spatial position of the virtual avatar, without dampening the modifications when the change in position of the user's face is a rotational change around a z-axis, provides the user with options for altering the spatial position (e.g., rotational orientation around a z-axis) of the virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change (e.g., 1006A-D, 1007A-B, 1008A-D) and the first modification factor is a multiplier applied to the magnitude of the first component of change, the multiplier having a value of less than one. In such examples, modifying the spatial position of the virtual avatar (e.g., 1000) within the frame of reference includes modifying the spatial position of the virtual avatar by a magnitude less than the magnitude of the first component of change (e.g., 1016A-D, 1017A-D, 1018A-D). In such examples, the magnitude of change is determined as a percentage change of position within the field of view of the one or more cameras (e.g., for the face) or within the spatial frame of reference (e.g., for the virtual avatar). For example, the spatial position of the face may shift in the vertical direction by 60% of the full vertical length of the field of view of the one or more cameras. In some such embodiments, applying a dampening factor of 50% would result in the spatial position of the virtual avatar shifting by 30% (e.g., 60%*0.5) of the full vertical length of the frame of reference (e.g., the display area designated for display of the virtual avatar). Modifying the spatial position of the virtual avatar through use of a multiplier provides the user with options for amplifying changes to the spatial position of the virtual avatar without requiring displayed user interface control (e.g., touch control) elements or more strenuous changes in a detected physical feature. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that exceeds a threshold value (e.g., 1006C-D). In such examples, the electronic device (e.g., 100, 300, 500, 600), in response detecting the change in position of the face that exceeds the threshold value, forgoes modifying the spatial position of the virtual avatar (e.g., 1000) within the frame of reference based on the change in position of the face within the field of view of the one or more cameras (e.g., 1016C-D). In some examples, changes in the position of the face (e.g., a change in the vertical position, horizontal position, or depth position of the face) that exceed a threshold value does not result in modifications (e.g., changes) in the spatial position of the virtual avatar. In some such embodiments, the spatial position of the virtual avatar is modified based on the change in position of the face up until the point at which the change in position of the face exceeds the threshold value (e.g., the position of the face moves outside of a valid zone (e.g., out of the field of view of the one or more cameras, or outside of a designated area that is within the field of view of the one or more cameras)). After the change in position of the face exceeds the threshold value, the spatial position of the virtual avatar is no longer modified based on the change in position of the face (e.g., the virtual avatar no longer tracks or reflects motion of the face). Forgoing modifications to the spatial position of the virtual avatar (e.g., maintaining an existing spatial position of the virtual avatar) within the frame of reference when the change in the position of the face exceeds a threshold value prevents the virtual avatar from exiting the frame of reference. Performing an operation (e.g., maintaining the position of the virtual avatar) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, detecting the change in position of the face within the field of view of the one or more cameras (e.g., 164, 602) includes detecting a change in position of the face that includes the first component of change and the second component of change, the first component of change includes movement of the face along a translational axis (e.g., along the x-, y-, or z-axis, shifting or translation of the face along an axis) within the field of view of the one or more cameras (e.g., 1006A-D, 1008A-D), the second component of change includes rotation of the face around a rotational axis (e.g., around the x-, y-, or z-axis, rotation of the face around an axis (such as caused by twisting or tilting of the user's head)) within the field of view of the one or more cameras (e.g., 1003A-B, 1004A-D, 1005A-B), the first modification factor is a dampening factor (e.g., a fractional modifier that, when applied to the magnitude of the first component of change, results in a lesser, modified magnitude value), and the second modification factor is not a dampening factor. In such examples, modifying the spatial position of the virtual avatar (e.g., 1000) within the frame of reference based on the magnitude of the first component of change and a first modification factor includes modifying the spatial position, along the translational axis, by a magnitude less than the magnitude of the first component of change (e.g., 1013A-B, 1014A-D, 1015A-B). Further in such examples, modifying the spatial position of the virtual avatar within the frame of reference based on the magnitude of the second component of change and a second modification factor includes modifying the spatial position, around the rotational axis, by a magnitude at least equal to the magnitude of the second component of change (e.g., 1013A-B, 1014A-D, 1015A-B). In some examples, translational (e.g., shifts along an axis) changes in position of the face are dampened (as applied to the virtual avatar), whereas rotational changes in the position of the face are not dampened. Doing so may reduce the likelihood that the translational change would result in the virtual avatar moving outside of a desired frame of reference. In contrast, rotational changes need not be dampened as they typically would not result in the virtual avatar moving outside of the desired frame of reference. Modifying the spatial position of the virtual avatar within the frame of reference differently for rotational changes of the face as compared to translational changes of the face provides the user with an input-efficient method for dampening changes that can result in suboptimal positioning of the virtual avatar within the frame of reference while affecting rotational changes that are less disruptive to the positioning of the virtual avatar within the frame of reference. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2400 (e.g., FIG. 24) are also applicable in an analogous manner to the methods described above and to method 2500, described below. For example, method 2400 optionally includes one or more of the characteristics of the various methods described below with reference to methods 800, 900, 1800, 1900, 2000, 2100, 2200, 2300, and 2500. For example, the methods of generating, sending, and receiving animated avatars in accordance with method 800 may employ virtual avatars (e.g., avatars generated while reacting to changes in position of the user's face) generated in accordance with method 2400. Similarly, virtual avatars and animated effects generated and/or modified in accordance method 2400 may be included in the displayed preview of a virtual avatar in a virtual avatar generation interface (e.g., 804, 904) of method 800 or 900. For another example, virtual avatars (e.g., avatars generated while reacting to changes in position of the user's face) generated in accordance with method 2400 may also be generated in accordance with the virtual avatar generation and modification methods of methods 800, 900, 1800, 1900, 2000, 2100, 2200, 2300, and 2500. For example, a virtual avatar generated in accordance with method 2400 may include a first avatar portion (e.g., 1034) that reacts differently than a second avatar portion (e.g., 1036) to changes in pose of a user's face differently, depending on the type of change in pose (e.g., 1810 and 1812). Similarly, a virtual avatar generated in accordance with method 2400 may include an avatar feature (e.g., 1133) that reacts (e.g., 1904, 1910, 1914) to changes in both first (e.g., 1122) and second (e.g., 1120A-B) physical features. For brevity, further examples are excluded.

Figure 25:
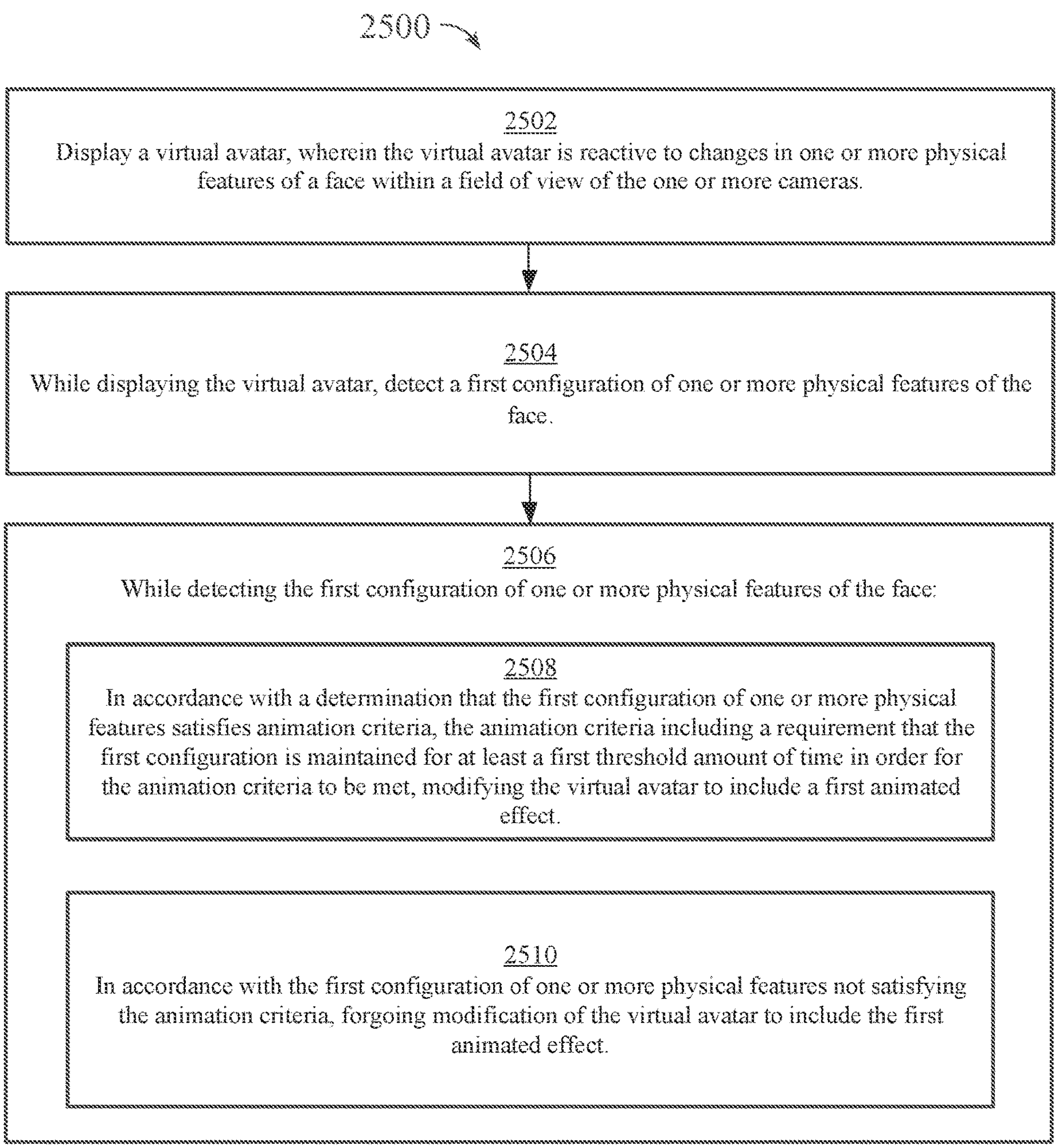
FIG. 25 is a flow diagram illustrating a method for generating and modifying a virtual avatar based on a face detected by one or more cameras.

FIG. 25 is a flow diagram illustrating a method, at an electronic device, for generating a virtual avatar based on a face detected by one or more cameras in accordance with some embodiments. Method 2500 is performed at an electronic device (e.g., 100, 300, 500, 600) with one or more cameras (e.g., 164, 602) and a display apparatus (e.g., 112, 340, 504, 601). Some operations in method 2500 are, optionally, combined, the orders of some operations are, optionally, changed, and some operations are, optionally, omitted.

As described below, method 2500 provides an intuitive way for generating virtual avatars (e.g., virtual avatars with animated effects). The method reduces the cognitive burden on a user for generating virtual avatars, thereby creating a more efficient human-machine interface. For battery-operated computing devices, enabling a user to generate a desired virtual avatar faster and more efficiently conserves power and increases the time between battery charges. Examples of method 2500 may be found in the user interfaces and virtual avatars discussed with reference to FIGS. 11A-11C, 12A-12C, 14A-14D, 15A-15B, and 16A-16B.

The electronic device (e.g., 100, 300, 500, 600) displays (2502), via the display apparatus (e.g., 112, 340, 504, 601) a virtual avatar (e.g., 1100, 1200, 1400, 1500, 1600). In some examples, the virtual avatar is reactive to changes in one or more physical features (e.g., 1120A-B, 1122, 1123, 1229, 1225, 1420C-D, 1427, 1520A-B, 1527, 1620A-B, 1627) of a face within a field of view of the one or more cameras (e.g., 164, 602).

While displaying the virtual avatar (e.g., 1100, 1200, 1400, 1500, 1600), the electronic device (e.g., 100, 300, 500, 600) detects (2504) a first configuration of one or more physical features (e.g., 1120A-B, 1122, 1123, 1229, 1225, 1420C-D, 1427, 1520A-B, 1527, 1620A-B, 1627) of the face (e.g., a facial configuration (e.g., an expression, a distinctive configuration of a collection of related facial muscles (e.g., a set of muscles that control movement of an eyebrow, including the currugator supercilii and the frontalis muscle) formed by a plurality of tracked physical features of the user's face)). In some examples, the configuration is the puckering of lips, a frown, a sneer, a grin, or a glower.

In some examples, the virtual avatar includes one or more avatar features and, in response to detecting the first configuration of one or more physical features of the face, the electronic device modifies at least one of the one or more avatar features based on the first configuration of the one or more physical features of the face.

While detecting the first configuration of one or more physical features (e.g., 1120A-B, 1122, 1123, 1229, 1225, 1420C-D, 1427, 1520A-B, 1527, 1620A-B, 1627) of the face (2506), the electronic device (e.g., 100, 300, 500, 600) can perform one or more of the following operations. In accordance with a determination that the first configuration of one or more physical features satisfies animation criteria, the animation criteria including a requirement that the first configuration is maintained for at least a first threshold amount of time (e.g., the facial expression is substantially maintained for a period of time (e.g., 0.5 seconds, 0.6 seconds, 1 second, 2 seconds) in order for the animation criteria to be met), the electronic device modifies (2508) the virtual avatar (e.g., 1100, 1200, 1400, 1500, 1600) to include a first animated effect. Such animated effects may include a visual effect such as animated hearts (e.g., 1252, 1452, 1555, 1652) emitting from the avatar's lips (e.g., when the configuration is a puckering of the lips), a storm cloud (e.g., 1142, 1144) positioned above the avatar (e.g., when the configuration is a frown), laser beams (e.g., 1146) emitting from the avatar's eyes (e.g., when the configuration is a glower), or tear drops (e.g., 1140) emitting from the avatar's eyes (e.g., when the configuration is a sad expression). In accordance with the first configuration of one or more physical features not satisfying the animation criteria, the electronic device forgoes (2510) modification of the virtual avatar to include the first animated effect. Modifying the virtual avatar to include a first animated effect based on satisfying animation criteria using the user's physical features provides the user with options for controlling the generation of animated effects in a virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first animated effect (e.g., 1140, 1142, 1144, 1146, 1252, 1452, 1555, 1652) includes the electronic device (e.g., 100, 300, 500, 600) visually introducing (e.g., newly or initially displaying) one or more virtual objects (e.g., hearts, storm clouds, lightning, tears, lasers) that are distinct (e.g., the virtual objects do not correspond to an anatomical feature of the virtual avatar) from the displayed virtual avatar (e.g., 1100, 1200, 1400, 1500, 1600). Visually introducing one or more virtual objects that are distinct from the displayed virtual avatar, based on satisfying animation criteria using the user's physical features, provides the user with an efficient input modality for adding distinct virtual objects to an existing virtual avatar that does not require multiple inputs (e.g., touch inputs). Reducing the inputs needed to perform an operation enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the virtual objects are animated hearts emitted from the avatar's lips (e.g., when the configuration is a puckering of the lips). In some examples, the virtual object is a storm cloud with, optionally, lightning positioned above the avatar (e.g., when the configuration is a frown). In some examples, the virtual objects are laser beams emitted from the avatar's eyes (e.g., when the configuration is a glower). In some examples, the virtual objects are tears emitted from the avatar's eyes (e.g., when the configuration is a sad expression). In some examples, the virtual objects do not anatomically or physiological correspond to any feature of the face within the field of view of the one or more cameras). In some examples, the one or more virtual objects are introduced gradually (e.g., the one or more virtual objects appear spaced apart over time, the one or more objects start out relatively small and then grow larger over time, and/or the one or more objects start out relatively transparent and gradually increase in opacity over time.

In some examples, modifying the virtual avatar (e.g., 1100, 1200, 1400, 1500, 1600) to include the first animated effect (e.g., 1140, 1252, 1452, 1555, 1652) further includes the electronic device (e.g., 100, 300, 500, 600) displaying an animation of the one or more virtual objects (e.g., 1140, 1252, 1452, 1555, 1652) moving relative to the virtual avatar. In some examples, the movement of the one or more objects is randomized or otherwise varied (e.g., according to predetermined pattern) with respect to other virtual objects.

In some examples, animation of the one or more virtual objects (e.g., 1140, 1252, 1452, 1555, 1652) moving relative to the virtual avatar includes the electronic device (e.g., 100, 300, 500, 600) displaying animated movement of the one or more virtual objects from an origination location (e.g., the lips of the avatar) to a destination location. In some examples, for each of the one or more virtual objects, the destination location is assigned a position relative to the virtual avatar based on a distribution function (e.g., an algorithm that randomly or pseudo-randomly selects destinations for the one or more virtual objects).

In some examples, the animation of the one or more virtual objects (e.g., 1252, 1452, 1555, 1652) moving relative to the virtual avatar (e.g., 1100, 1200, 1400, 1500, 1600) includes movement having a direction based on a displayed orientation of the virtual avatar. For example, if the virtual avatar is facing left, the objects move to the left side of the avatar; if the virtual avatar is facing right, the objects move to the right side of the avatar. Moving the virtual objects based on a displayed orientation of the virtual avatar provides the user as with feedback about the user's orientation (e.g., which controls the avatar's orientation), as it is being detected by the device. Proving improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the one or more virtual objects (e.g., 1140, 1252, 1452, 1555, 1652) are a plurality of virtual objects emitted at time intervals selected based on a distribution function (e.g., an algorithm that randomly or pseudo-randomly selects times for the appearance of the one or more virtual objects).

In some examples, the first configuration of one or more physical features (e.g., 1120A-B, 1122, 1123, 1229, 1225, 1420C-D, 1427, 1520A-B, 1527, 1620A-B, 1627) satisfies the animation criteria when the first configuration of one or more physical features includes a first predetermined relative spatial positioning of two or more of the physical features of the face (e.g., a first predetermined facial expression identified by tracking the relative spatial positioning of a plurality of facial features) from a set of predetermined relative spatial positionings of two or more of the physical features of the face. Modifying the virtual avatar to include a first animated effect based on satisfying animation criteria based on the relative spatial positioning of two or more physical features provides the user with low-error options for controlling the generation of animated effects in a virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the one or more virtual objects (e.g., 1140, 1142, 1146, 1252, 1452, 1555, 1652) are determined based on the first predetermined relative spatial positioning. In some examples, the animated effect includes displaying virtual objects that are selected based on the particular identified facial expression.

In some examples, the first predetermined relative spatial positioning of two or more of the physical features of the face correspond to (e.g., anatomically correspond or are determined to be (e.g., via pattern-matching)) a pucker expression (e.g., 1229 and 1225, 1420C-D and 1427, 1502A-B and 1527, 1620A-B and 1627) formed by at least a puckering of upper and lower lips of the face and a closed jaw of the face, and the one or more virtual objects include one or more hearts (e.g., 1252, 1452, 1555, 1652).

In some examples, the first predetermined relative spatial positioning of two or more of the physical features of the face correspond to a sad expression (e.g., 1120A-B) formed by at least a first corner and second corner of the mouth being lower than a middle portion of the mouth, and wherein the one or more virtual objects include one or more tears (e.g., 1140).

In some examples, the first predetermined relative spatial positioning of two or more of the physical features of the face correspond to a frown (e.g., 1120A-B and 1122) formed by at least two eyebrows of the face having a lowered position (e.g., a frown is detected when the user's eyebrows have a position that is vertically displaced towards the user's nose, when compared to a neutral, resting position of the eyebrows), and wherein the one or more virtual objects include one or more storm clouds (e.g., 1142), which may optionally include intermittent lightning strikes (e.g., 1144).

In some examples, the first predetermined relative spatial positioning of two or more of the physical features of the face correspond to a glower (e.g., 1103A-B) formed by at least a narrowing of two eyes of the face (e.g., the upper and lower eyelids of the user's eyes are moved slightly towards a closed position without actually closing the eyes), and wherein the one or more virtual objects include one or more laser beams (e.g., 1146). In some examples, detecting a glower may also include detecting a raised position of the user's cheek muscles (e.g., the zygomaticus).

In some examples, the virtual avatar (e.g., 1100, 1200, 1400, 1500, 1600) corresponds to a first virtual avatar template (e.g., the templates for avatars 1100, 1200, 1400, 1500, 1600) of a plurality of virtual avatar templates (e.g., dog, cat, bear, robot, unicorn, alien, poo). For example, the virtual avatar template may include a virtual avatar model (e.g., a base model that may or may not include one or more variations) that defines core characteristics of the virtual avatar such as: included (or excluded) avatar features, avatar size, avatar color, and so forth. In some examples, a visual characteristic of the first animated effect is based on the first virtual avatar template. In other words, the visual characteristic of the first animated effect varies in accordance with the avatar template such that the animated effect appears differently depending on the avatar template. In some examples, the avatar template corresponds to a robot and the animated effect includes displaying virtual objects (e.g., hearts 1452) having a metallic appearance. In some examples, the avatar template corresponds to a unicorn and the animated effect includes displaying virtual objects (e.g., hearts 1555) having a rainbow-based appearance. In some examples, the avatar template corresponds to an alien and the animated effect includes displaying virtual objects (e.g., hearts 1252) having a slimy appearance and texturing. Basing the virtual avatar on an avatar template (e.g., a template that defines core characteristics) provides the user with an input-efficient method for defining characteristics of the virtual avatar. Performing an operation (e.g., defining the core characteristics of the virtual avatar) when a set of conditions has been met (e.g., a template is selected) without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, after modifying the virtual avatar (e.g., 1100, 1200, 1400, 1500, 1600) to include the first animated effect (e.g., 1140, 1252, 1452, 1555, 1652) and in accordance with a determination that the first configuration of one or more physical features satisfies additional animation criteria, the additional animation criteria including a requirement that the first configuration is maintained for at least a second threshold amount of time after modifying the virtual avatar to include the first animated effect (e.g., the facial expression is substantially maintained for a period of time (e.g., 0.3 seconds, 0.6 seconds, 1 second, etc.) after modifying the virtual avatar to include the first animated effect (e.g., generating an animated heart, storm cloud, laser beam, etc.) in order for the additional animation criteria to be met), the electronic device modifies the virtual avatar to include a second animated effect (e.g., a second animated effect that can be based on the first animated effect). In some examples, the second animated effect includes sustaining, or repeating, the first animated effect. In some examples, the second animated effect is a variation of the first animated effect (e.g., larger or more frequent versions of the virtual objects displayed as part of the first animated effect). Modifying the virtual avatar to include a second animated effect based on satisfying additional animation criteria using the user's physical features provides the user with options for controlling the generation of additional animated effects in a virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples where the first configuration of one or more physical features (e.g., 1520A-B and 1527) satisfies animation criteria and the avatar is modified to include the first animated effect, while detecting the first configuration of one or more physical features of the face, the electronic device detects a change in a first physical feature of the face (e.g., physical feature that is not a physical feature that is part of the first configuration of one or more physical features). In some examples, in response to detecting the change in the first physical feature of the face that satisfies the animation criteria, the electronic device modifies a first avatar feature (e.g., 1538) based on the change in the first physical feature of the face (e.g., 1522). In some examples, the animation criteria includes an assessment based on less than all of the tracked features of the users face. For example, the animation criteria may only be based on portions of the user's mouth and eyes. Accordingly, the animation criteria may be satisfied even if physical features (e.g., the user's eyebrows) that are not assessed by the animation feature move (e.g., are not maintained in position). Example modifications of avatar features based on changes in physical features of a face are described in greater detail above with reference to methods 1800, 1900, 2000, 2100, 2200, 2300, and 2400. Providing options for a user to modify a first avatar feature based on changes in a first physical feature, while satisfying animation criteria to include a first animated effect (e.g., using a set of different physical features), provides the user with options for controlling the generation of a virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2500 (e.g., FIG. 25) are also applicable in an analogous manner to the methods described above. For example, method 2500 optionally includes one or more of the characteristics of the various methods described below with reference to methods 800, 900, 1800, 1900, 2000, 2100, 2200, 2300, and 2400. For example, the methods of generating, sending, and receiving animated avatars in accordance with method 800 and 900 may employ virtual avatars and animated effects generated in accordance with method 2500. Similarly, virtual avatars and animated effects generated and/or modified in accordance with method 2500 may be included in the displayed preview of a virtual avatar in a virtual avatar generation interface (e.g., 804, 904) of method 800 or 900. For another example, virtual avatars (e.g., with animated effects) generated in accordance with method 2500 may also be generated further in accordance with the virtual avatar generation and modification methods of methods 800, 900, 1800, 1900, 2000, 2100, 2200. For example, a virtual avatar generated in accordance with method 2500 may include a first avatar portion (e.g., 1034) that reacts differently than a second avatar portion (e.g., 1036) to changes in pose of a user's face differently, depending on the type of change in pose (e.g., 1810 and 1812). Similarly, a virtual avatar generated in accordance with method 2500 may include an avatar feature (e.g., 1133) that reacts (e.g., 1904, 1910, 1914) to changes in both first (e.g., 1122) and second (e.g., 1120A-B) physical feature. For brevity, further examples are excluded.

As previously mentioned above, in some embodiments, the electronic device modifies the displayed virtual avatar after the user's face is no longer detected in the field of view of the camera (e.g., 602) (e.g. camera module 143, optical sensor 164, depth camera sensor 175). FIGS. 26A-26D illustrate such an embodiment in which the device (e.g., 600) continues to modify the displayed appearance of the virtual avatar after the user's face is no longer detected in the field of view of the camera (e.g., camera 602) (e.g., camera module 143, optical sensor 164, depth camera sensor 175).

FIGS. 26A-26D illustrate exemplary user inputs and corresponding changes to an exemplary virtual avatar (e.g., dog avatar). The images in the left columns of FIGS. 26A-26D represent images of a user as detected by the electronic device when the user is within the field of view of one or more cameras (e.g., camera 602) (e.g., camera module 143, optical sensor 164, depth camera sensor 175) and/or other sensors (e.g., infrared sensors). In other words, the images of the user are from the perspective of the camera (e.g., camera 602) (e.g., camera module 143, optical sensor 164, depth camera sensor 175), which may be positioned on the electronic device (e.g., device 100, 300, and 500) in some embodiments and, in other embodiments, may be positioned separate from the electronic device (e.g., an external camera or sensor passing data to the electronic device). In some embodiments, the borders of the images in the left columns of FIGS. 26A-26D represent the boundaries of the field of view of the one or more cameras (e.g., 602) (e.g., camera module 143, optical sensor 164, depth camera sensor 175) and/or other sensors (e.g., infrared sensors).

The images in the middle columns of FIGS. 26A-26D illustrate a reference avatar (e.g., dog avatar) that represents an appearance of a virtual avatar corresponding to detected images of the user located in the left column, for a hypothetical scenario in which the device continues to track the user's face for all movement in the left columns (e.g., face tracking does not fail). The reference avatar is shown from the perspective of a user viewing the reference avatar. In some embodiments, the images in the middle columns of FIGS. 26A-26D represent a position of the reference avatar within a display region of the display of the electronic device (e.g., touch screen 112, display 340, display 450, display 504), and the borders of the images in the middle columns of FIGS. 26A-26D represent the boundaries of the display region that includes the reference avatar. In some embodiments, the display region represented in the middle columns corresponds to an avatar display region of an application user interface, such as virtual avatar interface 643, message composition area 612, message area 609 (or a portion thereof) discussed above.

The images in the right columns of FIGS. 26A-26D illustrate virtual avatar 2600 (e.g., dog avatar) in a state that is presented (e.g., displayed after being modified) based on some of the detected images of the user located in the left column, for a scenario in which the device fails to track the user's face for a portion of the movement in the left columns (e.g., face tracking fails). In some embodiments, the virtual avatar is shown from the perspective of a user viewing the virtual avatar. In some embodiments, the virtual avatar is displayed on the display of the electronic device (e.g., touch screen 112, display 340, display 450, display 504). In some embodiments, the virtual avatar is transmitted to an external electronic device for display. In some embodiments, the images in the right columns of FIGS. 26A-26D represent a position of the virtual avatar within a display region of the display of the electronic device (e.g., touch screen 112, display 340, display 450, display 504), and the borders of the images in the right columns of FIGS. 26A-26D represent the boundaries of the display region that includes the virtual avatar. In some embodiments, the display region represented in the right columns corresponds to an avatar display region of an application user interface, such as virtual avatar interface 643, message composition area 612, message area 609 (or a portion thereof) discussed above.

Figure 26A:
FIGS. 26A-26H illustrate exemplary user interfaces for generating and modifying a virtual avatar after face tracking fails.

FIG. 26A illustrates an example of inertial movement of the displayed virtual avatar 2600 after face tracking is lost. The column on the left shows the user's movement in various states (e.g., 2601A-2601D). The column on the right shows the modifications the device makes to the virtual avatar in various states (e.g., 2603A-2603D) for a period in which the device tracks the user's face (e.g., states 2603A and 2603B), and then when the device no longer tracks the user's face (e.g., states 2603C and 2603D). For reference, the middle column illustrates states 2602A-2602D of a reference avatar representing what the virtual avatar in the right column would look like if face tracking did not fail.

In state 2601A, the user is positioned in the center of the field of view with their head 2604 facing forward and having a neutral facial expression (e.g., the user's mouth 2606 has a neutral pose as described in other embodiments provided herein). In state 2602A, the reference avatar's head 2614' is centered in the bordered region with ears 2618' resting along the sides of the reference avatar's head, and a mouth 2616' having a neutral pose matching that of the user. In state 2603A, the device detects the user's head 2604 and mouth 2606 in the field of view of the camera and having the positions shown in state 2601A. Accordingly, the device displays the dog avatar having head 2614, mouth 2616, and ears 2618 having the same positions as the corresponding features of reference avatar in state 2602A.

In state 2601B, the user is moved higher within the field of view of the camera, and is beginning to turn his head to his left (e.g., the user's head 2604 is positioned higher than in state 2601A and is slightly rotated to the right from the camera's perspective), while moving slightly beyond the field of view of the camera. At the same time, the user is starting to smile (e.g., the user's mouth 2606 is moving to a smiling position and, in state 2601B, the user's mouth is shown slightly raised (as the user is beginning to smile)). In state 2602B, the reference avatar's head 2614' is moved higher within the bordered region than in state 2602A (e.g., to match the vertical position of the user's head 2604 in state 2601B), and is slightly rotated to the left (from the user's perspective) while shifting to the edge of border 2605 to represent the movement of the user's head in state 2601B. As the reference avatar rotates its head 2614', the ears 2618' sway slightly with the rotation of the head in accordance with a physics model associated with the ears 2618'. The reference avatar's mouth 2616' is turned up to a slight smile, matching the movement and position of the user's mouth 2606 in state 2601B. In state 2603B, the device detects the user's head 2604 and mouth 2606 in the field of view of the camera and having the positions shown in state 2601B. Accordingly, state 2603B shows the device displaying the dog avatar having the same position as the reference avatar in state 2602B.

In state 2601C, the user quickly turns his head 2604 to face forward and changes his mouth 2606 into a frowning expression (e.g., the user's mouth is turned down into a frown). In state 2602C, the reference avatar's head quickly rotates forward to match the rotation of the user's head. The reference avatar's ears 2618' swing out in accordance with the physics of the quick rotation of reference avatar's head 2614'. The reference avatar's mouth 2616' transitions from a slight smile to a frowning expression matching that of the user.

In state 2603C, the device no longer detects the user in the field of view of the camera. Accordingly, the device continues to modify the dog avatar based on the previously detected state of the user (e.g., state 2601B). For example, because the device last detected the user turning his head to his left, the device continues to modify the rotation of the dog's head 2614 so that it continues to turn based on the previously detected leftward turning of the user's head in state 2601B. In some embodiments, the device also decreases the rate of rotation for the dog's head 2614 so that the head gradually slows to a resting position turned to the avatar's right, and the dog's ears 2618 slightly move based on the physics of the gradual slowing of the dog's head 2614. In addition, the device last detected the user moving vertically in the field of view of the camera and, therefore, continues to modify the dog avatar's head 2614 so that it moves in the vertical position that was detected for the user. In some embodiments, the device also decreases the rate at which the dog's head 2614 continues to move vertically so that it gradually slows to a resting position. The device last detected the user's mouth 2606 moving from a neutral position to a slight smile. Therefore, the device modifies the dog avatar's mouth 2616 so that it continues with the smiling motion to achieve the smiling expression shown in state 2603C (e.g., having a larger smile than the slight smile shown in state 2603B). In some embodiments, the device decreases the rate at which the dog's mouth 2616 changes so that is gradually slows to a resting, smiling position.

In some embodiments, different avatar features change at different rates and/or magnitudes after face tracking fails. For example, the avatar head 2614 may continue to rotate at a faster rate than the rate at which the avatar mouth 2616 continues to change after face tracking fails. As another example, the magnitude of the change in the avatar head 2614 may be greater than the magnitude of the change in the avatar mouth 2616 after face tracking fails.

In state 2601D, the user remains in the same position as in 2601C. In state 2602D, the reference avatar's ears 2618' settle to a resting position after moving as shown in state 2602C. In state 2603D, the device still does not detect the user. The device modifies the dog's ears 2618 so that they settle to a resting position because movement of the other avatar features has stopped. In some embodiments, the device no longer modifies the dog avatar (e.g., does not continue rotating the dog avatar's head to the right or continue increasing the dog avatar's smile) because the modified avatar features have reached a limit on the amount they are modified after the user is not detected in the field of view of the camera. In some embodiments, the device limits the final changed position of a feature (after face tracking is lost) so that the feature does not become overly exaggerated. For example, the dog's mouth 2616 may be limited so that, after face tracking fails, the smile does not exceed the smiling pose shown in state 2603D. As another example, the changed position of the head 2614 may be limited so that the avatar head 2614 cannot turn around backwards. In some embodiments, the limit on the final changed position of a feature after face tracking is lost is set as a predefined cap on the range of motion for which a modified avatar feature can be changed. In some embodiments, the limit on the final changed position of a feature after face tracking is lost is set as a scaled value of the change detected for the corresponding feature of the user at a moment before face tracking failed. In some embodiments, the limit on the final changed position of a feature, after face tracking is lost, is determined so as to avoid triggering exaggerated facial expressions. For example, if the virtual avatar is an alien avatar (e.g., such as that discussed herein) and the changing avatar feature is eyebrows or cheeks, movement of the avatar eyebrows or cheeks may be limited, after facial tracking fails, to a range of motion that does not invoke the displayed spikes on the alien's head or cheeks.

Figure 26B:

FIG. 26B illustrates an example of modifying the virtual avatar 2600 after face tracking resumes within a threshold amount of time (e.g., less than 1.5 seconds after face tracking failed). In this embodiment, the device detects the user again and modifies the virtual avatar to resume tracking of the detected user. For example, in state 2601E, the user remains in the position shown in state 2601D. In state 2602E, the reference avatar remains in the position shown in state 2602D. In state 2603E, the modified virtual avatar is in the position shown in state 2603D. State 2603E is a state of the displayed, modified virtual avatar a moment before face tracking resumes.

In states 2601F and 2601G, the user's head 2604 has shifted down in the field of view of the camera and back to the center of the field of view, while the user's mouth 2606 maintains the frowning facial expression. In states 2602F and 2602G, the reference avatar in the middle column shifts down to match the position of the user while maintaining the frowning expression. In state 2603F, the device now detects the user, and begins to modify the displayed virtual avatar based on the detected appearance of the user in state 2601F. The modification to the dog avatar is shown in states 2603F and 2603G, with state 2603F being a transitory state between the displayed appearance of the avatar in state 2603E and the final displayed appearance of the avatar in state 2603G. Specifically, the device modifies the dog avatar's mouth 2616 so that it transitions from the large smile in state 2603E to a frown shown in 2603G, with an intermediate position shown in state 2603F. Additionally, the device modifies the orientation and position of the dog avatar's head 2614 to match that of the user. For example, the device moves the position of the dog avatar's head 2614 from the top left corner of the bordered region in state 2603E, to the lower position shown in state 2603G, with an intermediate position shown in state 2603F. Similarly, the device rotates the avatar's head 2614 from the sideways orientation in state 2603E to the front-facing orientation shown in state 2603G, with an intermediate position shown in state 2603F.

In some embodiments, the physics of various avatar features are dampened when face tracking resumes. For example, as shown in FIG. 26B, the avatar's ears 2618 do not move (or move slightly) in state 2603F so that the reacquisition of the user's face in the field of view, and the subsequent modification of the virtual avatar, does not cause a drastic movement of the avatar's ears 2618, which would exacerbate the motions of the virtual avatar's features and impede the smooth transitioning effect that is achieved with the modification technique disclosed herein.

Figure 26C:

FIG. 26C illustrates an example of modifying the virtual avatar 2600 after face tracking fails to resume within a threshold amount of time (e.g., less than 1.5 seconds after face tracking failed). In this embodiment, the device modifies the avatar so that it prompts the user to return to the field of view of the camera and displays an animation of the virtual avatar moving to a predetermined position in the middle of the display region (e.g., re-centering) and transitioning to a neutral pose.

In states 2601H-2601J, the user is positioned partially outside the field of view of the camera at a top right corner of the bordered region and with a frowning facial expression. In states 2602H-2602J, the reference avatar is positioned in the top left corner of the bordered region, and having a frowning expression, to represent the position and facial expression of the user. In states 2603H-2603J, the device does not detect the user in the field of view of the camera.

In state 2603H, the device determines that the user has not been detected in the field of view of the camera for the threshold amount of time and modifies the displayed avatar (having the position described above in state 2603D) to include a displayed prompt instructing the user to position their head in the field of view of the camera. In some embodiments, the prompt includes a frame 2620 positioned in the center of the border region and a message 2622 instructing the user to position their head in the field of view of the camera. As shown in states 2603I and 2603J, the device also modifies the virtual avatar to transition from the modified position of state 2603H, to a centered position within the frame 2620. In state 2603J, the virtual avatar is shown in the center of frame 2620 and having a neutral expression. State 2603I shows a transitory state of the virtual avatar as it is displayed moving from the appearance in state 2603H to the appearance in state 2603J. In the transitory state in state 2603I, the virtual avatar's head 2614 is rotating from the sideways position in state 2603H to a slightly forward-facing state, and the avatar's mouth 2616 is shown transitioning from the large smile in state 2603H to a slight smile in state 2603I, as it transitions to the neutral state in state 2603J.

In some embodiments, the device dampens the physics of avatar features as the avatar transitions from the appearance in state 2603H to the appearance in state 2603J. For example, in state 2603I, the avatar's ears 2618 do not move (or move slightly) as the avatar is displayed transitioning from the appearance in state 2603H to the appearance in state 2603J.

Figure 26D:
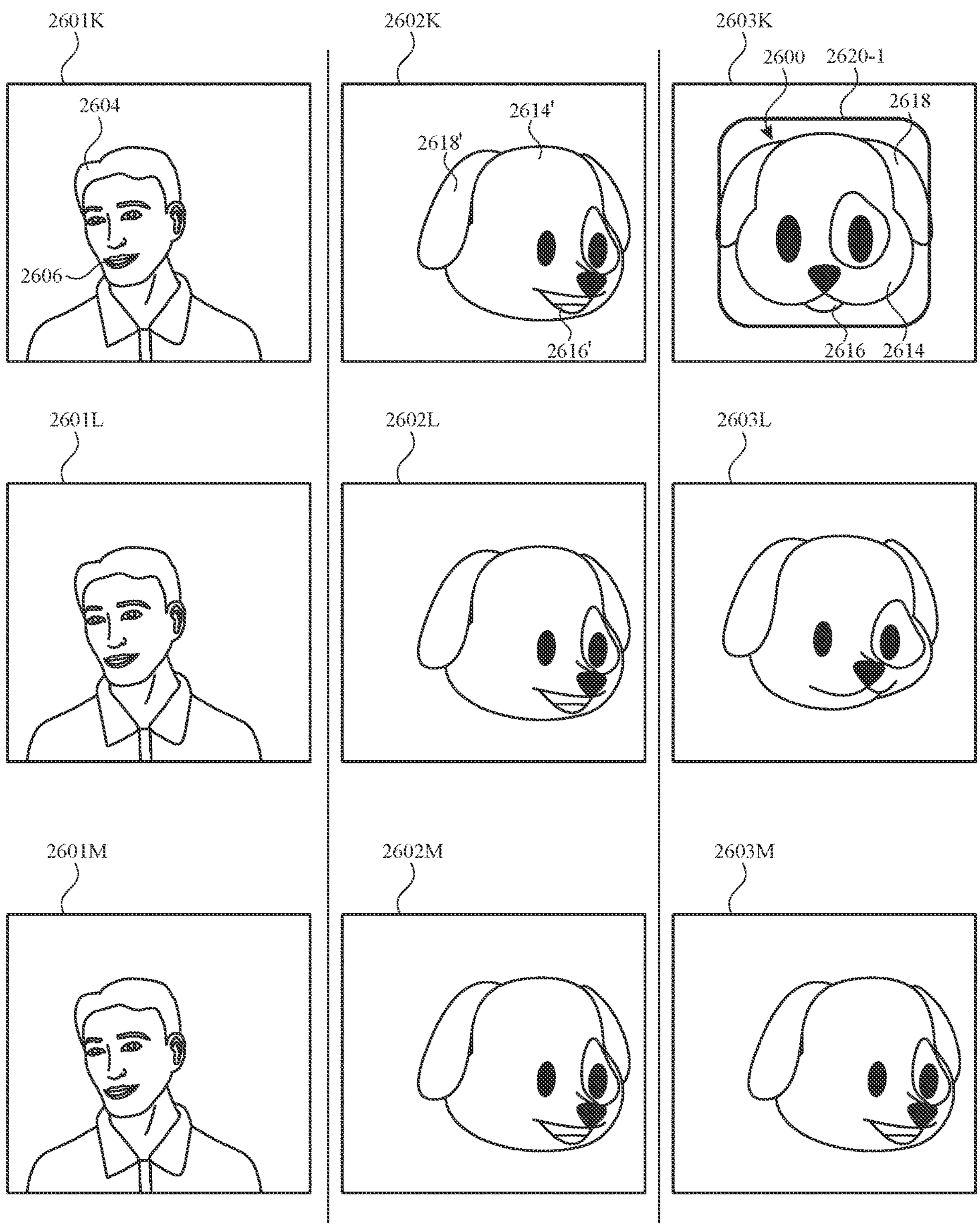

FIG. 26D illustrates an example of modifying the virtual avatar 2600 to resume face tracking after failing to detect a face for more than the threshold amount of time. After the device again detects the user in the field of view of the camera, the device modifies the virtual avatar to resume tracking of the detected user.

In states 2601K-2601M, the user's head 2604 is positioned low in the field of view of the camera and shifted to the user's right with his head turned to his right and smiling widely. In states 2602K-2602M, the reference avatar is positioned down and to the right in the border region and having a head 2614' turned to the left to match the user's appearance. The reference avatar's mouth 2616' is a large smile matching the user's mouth 2606. In state 2603K, the device is determining that the user is entering the field of view of the camera and, therefore, displays the virtual avatar having the appearance discussed above with respect to state 2603J, but with a solid frame 2620-1 displayed around the virtual avatar 2600.

In some embodiments, after the device determines the user is positioned in the field of view of the camera, the device modifies the avatar 2600 as a gradual transition from the neutral pose in state 2603K, to an appearance that represents the detected pose of the user. This gradual transition can be displayed as the avatar 2600 changing from an appearance shown in state 2603K to an appearance shown in state 2603M (e.g., avatar 2600 is positioned down and to the right in the border region and having a head 2614 turned to the left to match the user's rotated head 2606 and mouth 2616 is a large smile matching the user's mouth 2606), with a transitory appearance shown in state 2603L (e.g., the avatar 2600 is positioned slightly down and slightly to the right, the head is turned slightly, and the mouth 2616 is transitioning from a neutral pose to a large smile). In some embodiments, after the device determines the user is positioned in the field of view of the camera, the device modifies the virtual avatar 2600 to transition directly to the appearance representing the detected state of the user. In other words, the device modifies the avatar to appear as the state shown in 2603M, without displaying the gradual transition (e.g., the transitory state shown in state 2603L).

In some embodiments, when the device modifies the virtual avatar 2600 after face tracking resumes from the lost tracking embodiment shown in FIG. 26C, the device dampens the physics of various avatar features to avoid a visual effect where the avatar features abruptly move based on a rapid movement of the avatar to a new displayed position matching the user's newly detected state. For example, as shown in state 2603L, the avatar's ears 2618 do not move (or move slightly) when the avatar 2600 is transitioning to the appearance shown in state 2603M. In some embodiments, these physics are enabled again after the avatar is updated to reflect the appearance of the user (e.g., shown in state 2603M) and face tracking resumes. In some embodiments, the physics are gradually enabled after the avatar is updated by gradually increasing a gain value or other scaling factor for physics-based animations over time (e.g., incrementally increasing the scaling factor from a small number such as 0 to a larger number such as 1) so as to avoid a jarring transition where physics based animation for avatar features is enabled suddenly.

In some embodiments, a displayed representation of a virtual avatar can include a display of the virtual avatar on image data (e.g., image data including depth data, for example, a live camera preview, a captured image, or a recorded video), including a representation of a subject positioned within a field of view of a camera (e.g., camera 602) and a background. FIGS. 26E-26H illustrate an example of such an embodiment.

Figure 26E:
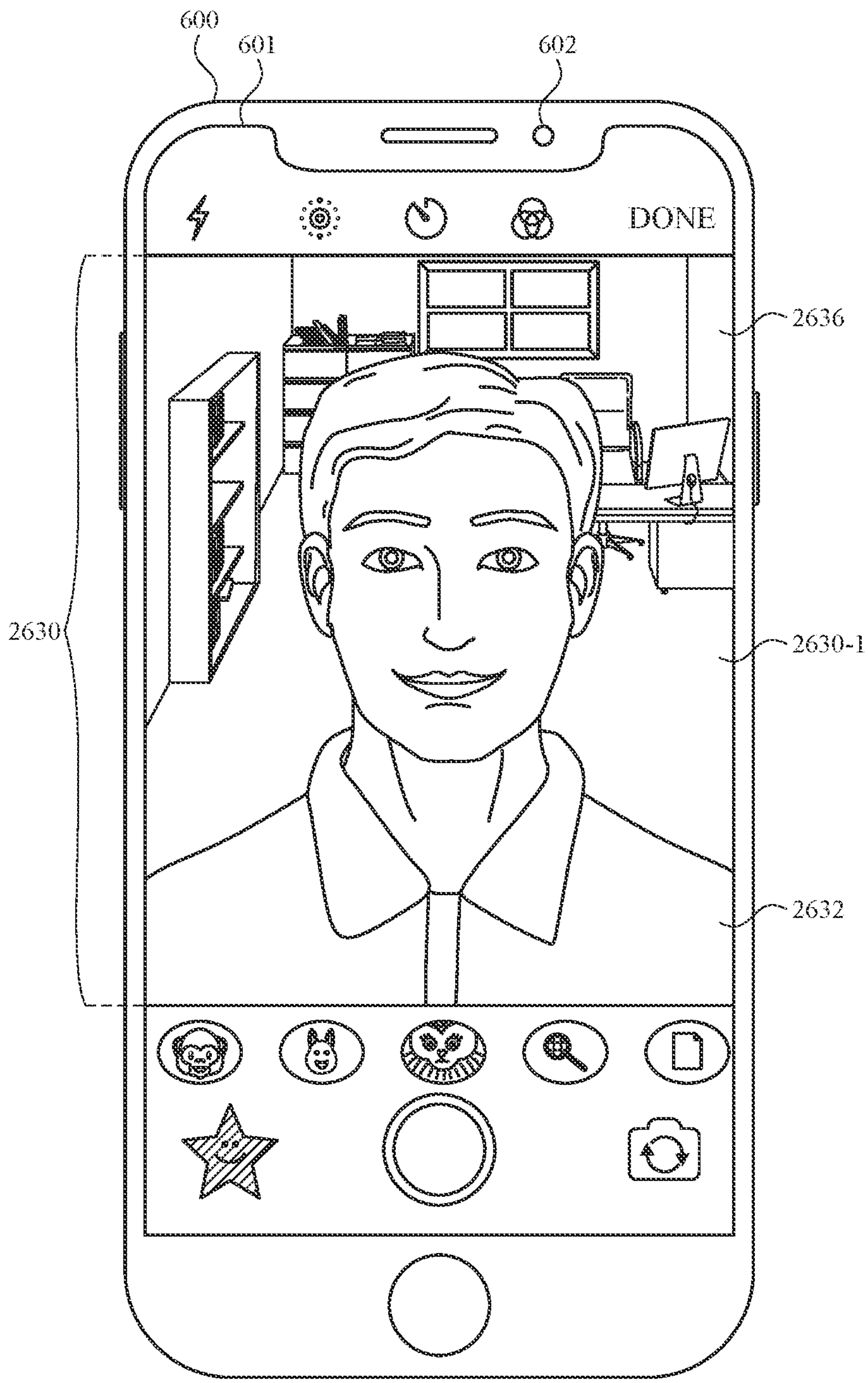

FIG. 26E shows device 600 having display 601 and camera 602. Device 600 displays an image display region 2630 presenting a live camera preview 2630-1 from camera 602 showing a representation of subject 2632 positioned in the field-of-view of camera 602 and background 2636 displayed behind subject 2632. As discussed herein, image data captured using camera 602 includes, in some embodiments, depth data that can be used to determine a depth of objects in the field-of-view of camera 602. In some embodiments, device 600 parses objects (e.g., in image data) based on a detected depth of those objects, and uses this determination to apply the visual effects (e.g., virtual avatars) discussed herein. For example, device 600 can categorize subject 2632 as being in the foreground of the live camera preview 2630-1 and objects positioned behind the user as being in the background of the live camera preview 2630-1. These background objects are referred to generally as background 2636.

Figure 26F:
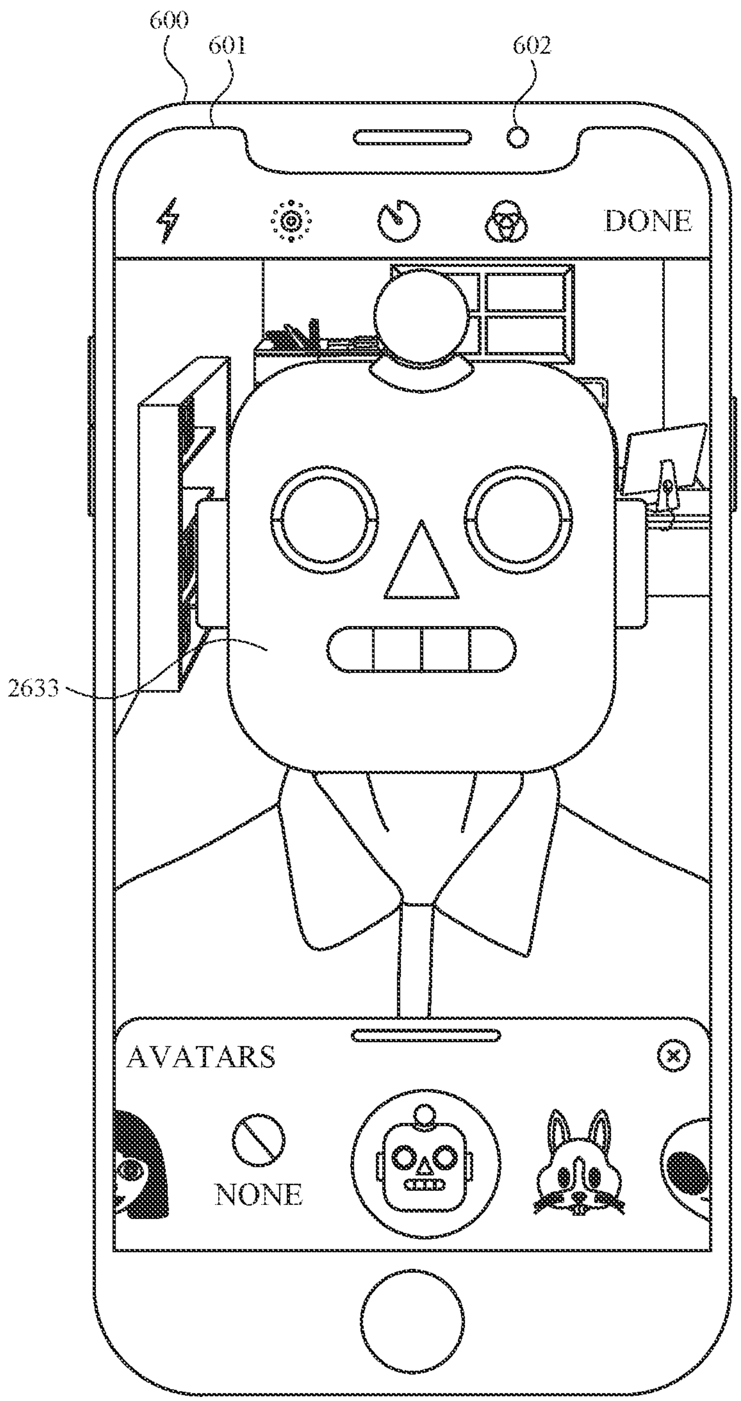
Figure 26G:
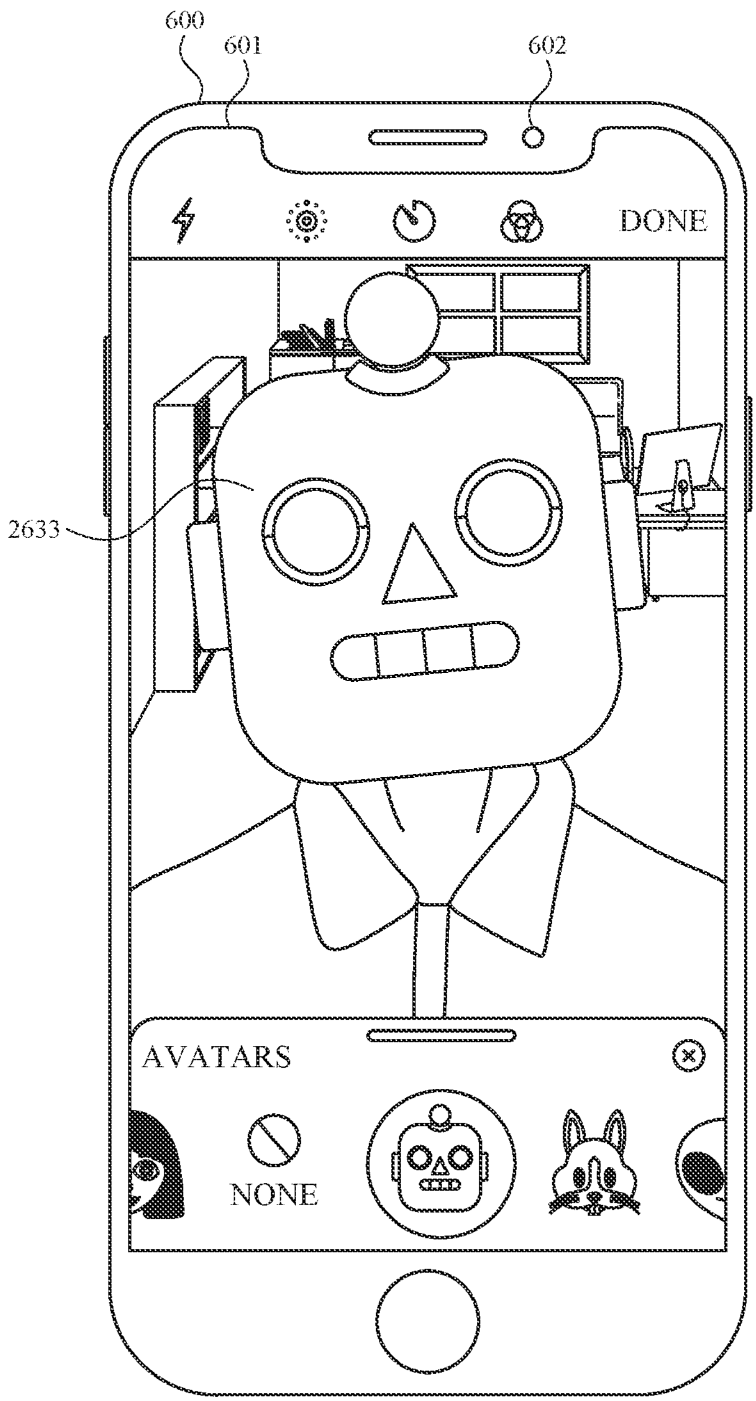
Figure 26H:
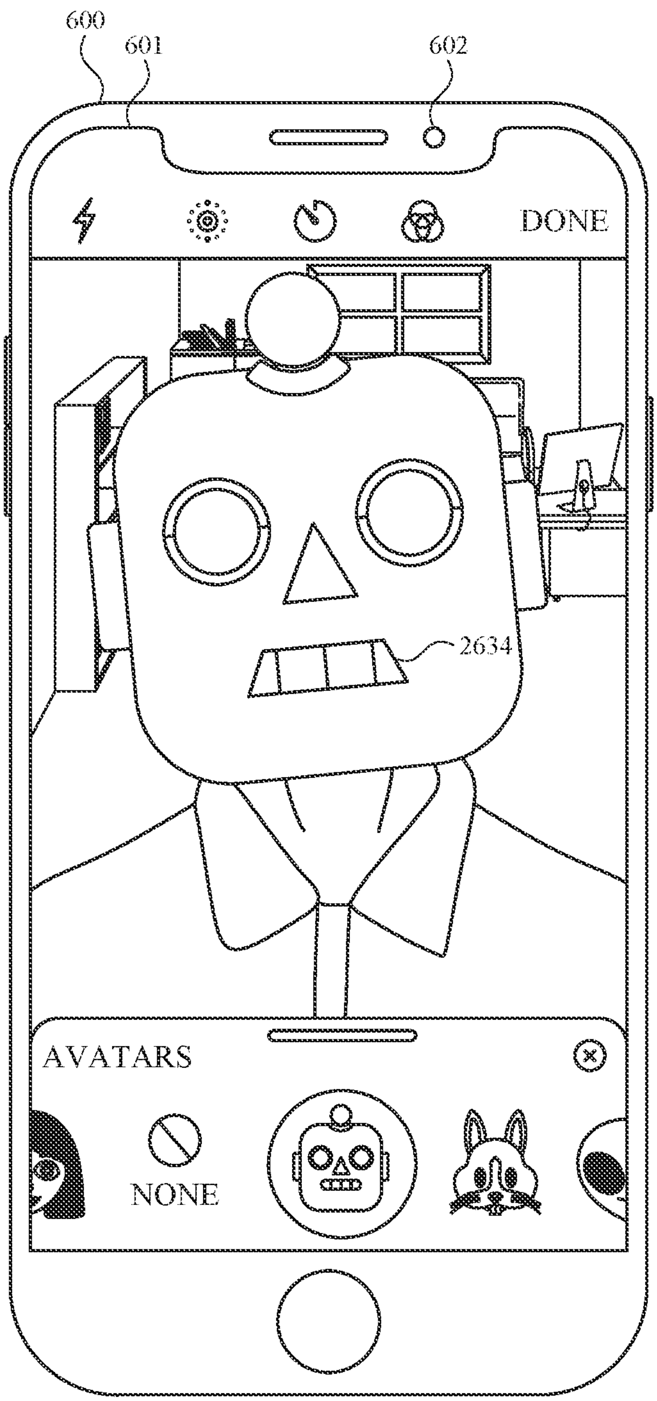

As shown in FIG. 26F, virtual avatar 2633 can be displayed on the representation of subject 2632 (e.g., on the subject's face). Specifically, the virtual avatar is transposed onto the face of the subject in the image display region 2630, while other portions of the image in image display region (such as a background or other portions of the user, such as their body) remain displayed. A user (e.g., subject 2632) positioned in the field-of-view of camera 602 can control visual aspects of the virtual avatar by changing the pose (e.g., rotation or orientation) of their face, including moving various facial features (e.g., winking, sticking out their tongue, smiling, etc.) as discussed in greater detail herein. For example, FIG. 26G shows the virtual avatar 2633 tilting its head in response to device 600 detecting movement of the user's head in the field of view of camera 602. Similarly, FIG. 26H shows device 600 modifying the virtual avatar's facial features (e.g., mouth 2634) in response to detecting a change in the physical features of the user's face (e.g., the user's mouth).

In some embodiments, if device 600 fails to detect the user's face in the field of view of camera 602, device 600 can modify the virtual avatar (e.g., 2633) as discussed above with respect to FIGS. 26A-26D, while, optionally, maintaining the display of subject 2632 and background 2636. For example, device 600 can modify virtual avatar 2633 to exhibit inertial movement based on the last detected movement of the user's face as discussed above with respect to FIG. 26A. If device 600 detects the user's face in the field of view of camera 602 within a threshold amount of time, device 600 can modify virtual avatar 2633 as discussed above with respect to FIG. 26B. If device 600 fails to detect the user's face in the field of view of camera 602 within the threshold amount of time, device 600 can modify virtual avatar 2633 as discussed above with respect to FIG. 26C. In some embodiments, such modifications can include applying a blurring visual effect to obscure the subject 2632 and background 2636 when face tracking is lost. If device 600 detects the user's face in the field of view of camera 602 after previously failing to detect the face for the threshold period of time, device 600 can modify virtual avatar 2633 as discussed above with respect to FIG. 26D.

Figure 27:
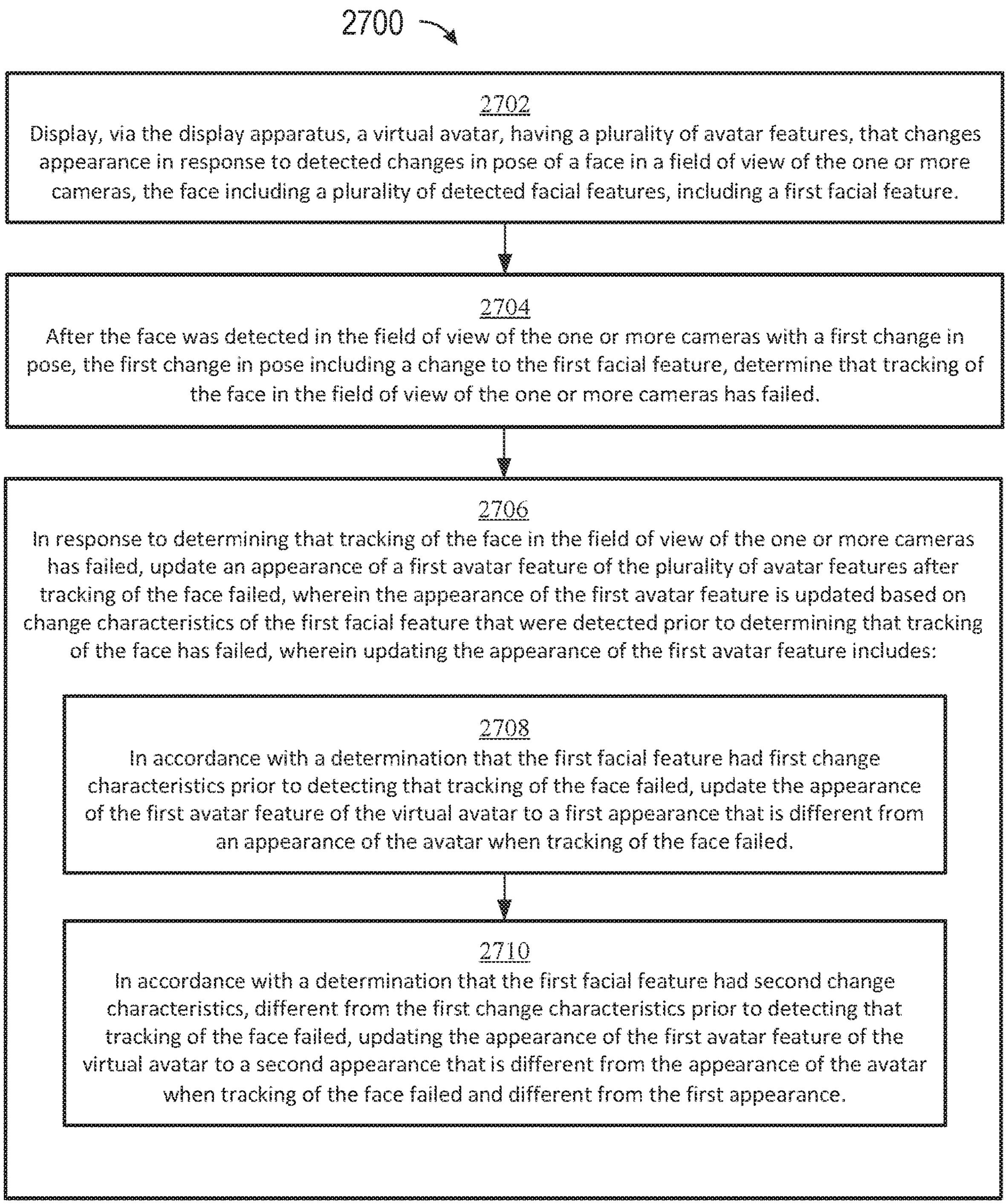
FIG. 27 is a flow diagram illustrating a method for generating and modifying a virtual avatar after face tracking fails.

FIG. 27 is a flow diagram illustrating a method for generating and modifying a virtual avatar after face tracking fails using an electronic device in accordance with some embodiments. Method 2700 is performed at a device (e.g., 100, 300, 500) with one or more cameras and a display. Some operations in method 2700 are, optionally, combined, the orders of some operations are, optionally, changed, and some operations are, optionally, omitted.

As described below, method 700 provides an intuitive way for generating and modifying a virtual avatar after face tracking fails. The method reduces the cognitive burden on a user for generating and modifying a virtual avatar after face tracking fails, thereby creating a more efficient human-machine interface. For battery-operated computing devices, enabling a user to generate and modify a virtual avatar after face tracking fails faster and more efficiently conserves power and increases the time between battery charges.

The electronic device (e.g., 600) displays (2702), via the display apparatus (e.g., 601), a virtual avatar (e.g., 2600), having a plurality of avatar features (e.g., 2614, 2616, 2618, a facial feature (e.g., eyes, mouth, part of mouth) or macro feature (e.g., head, neck)), that changes appearance in response to detected changes in pose (e.g., orientation, translation) (e.g., a change in a facial expression) of a face in a field of view of the one or more cameras, the face including a plurality of detected facial features, including a first facial feature (e.g., 2604, a head, a mouth, or a part of a mouth).

In some embodiments, displaying the virtual avatar (e.g., 2633) includes displaying, via the display apparatus (e.g., 601), a representation of a subject (e.g., 2632, a person in the field of view of the one or more cameras; e.g., a subject that corresponds to the face in the field of view) and a background (e.g., 2636, objects in the field of view of the one or more cameras other than the subject) positioned in the field of view of the one or more cameras (e.g., 602), wherein the virtual avatar is displayed on the representation of the subject (e.g., a displayed head or face portion of the subject (user) is replaced with (or overlaid by (e.g., opaquely, transparently, translucently)) a head of a virtual avatar). In some embodiments, the virtual avatar displayed on the subject is responsive to detected changes in the subject's head and face such that a change in the subject's head or face effects a change in the displayed virtual avatar while still displaying the background. In some embodiments, the position of the virtual avatar on the subject's head is determined using depth data in the image (e.g., image data that includes a depth aspect (e.g., depth data independent of RGB data) of a captured image or video). In some embodiments, the image data includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background). In some embodiments, the depth data is a depth map. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the depth data has a second depth component (e.g., a second portion of depth data that encodes a spatial position of the background in the camera display region; a plurality of depth pixels that form a discrete portion of the depth map, such as a background), separate from the first depth component, the second depth aspect including the representation of the background in the camera display region. In some embodiments, the first depth aspect and second depth aspect are used to determine a spatial relationship between the subject in the camera display region and the background in the camera display region. This spatial relationship can be used to distinguish the subject from the background. This distinction can be exploited to, for example, apply different visual effects (e.g., visual effects having a depth component) to the subject and background. In some embodiments, all areas of the image data that do not correspond to the first depth component (e.g., areas of the image data that are out of range of the depth camera) are segmented out (e.g., excluded) from the depth map.

Displaying the virtual avatar on the representation of the subject and a background positioned in the field of view of the one or more cameras allows the user to quickly recognize whether the placement of the subject and background objects within the camera's field of view are optimal for the applied virtual avatar and enables the user to see which portions of an image would include the virtual avatar and which portions would not include the virtual avatar, if the image were to be captured. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After the face was detected in the field of view of the one or more cameras with a first change in pose (e.g., 2601B, last detected change in pose for one or more facial features prior to loss of detection; an average of a plurality of detected change in poses for the one or more facial features), the first change in pose including a change to the first facial feature (e.g., 2604, a direction of change of a facial feature or a set of facial features), the electronic device (e.g., 600) determines (2704) that tracking of the face in the field of view of the one or more cameras (e.g., 602) has failed (e.g., because the face is no longer within the field of view of the one or more cameras, the features of the face that the device was using to track the face are obscured, or the device has otherwise failed to be able to track the face).

In response to determining that tracking of the face in the field of view of the one or more cameras (e.g., 602) has failed, the electronic device (e.g., 600) updates (2706) an appearance of a first avatar feature (e.g., 2614) of the plurality of avatar features after tracking of the face failed, wherein the appearance of the first avatar feature is updated based on change characteristics (e.g., an amplitude and/or direction of the change) of the first facial feature (e.g., 2604) that were detected prior to (e.g., immediately prior to or during a time period just prior to) determining that tracking of the face has failed. In some embodiments, updating the appearance of the first avatar feature includes one or more of the embodiments below. Updating an appearance of a first avatar feature after tracking of the face failed, based on change characteristics of the first facial feature that were detected prior to determining that tracking of the face has failed, provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the first facial feature (e.g., 2604) had first change characteristics prior to detecting that tracking of the face failed (e.g., 2601B, the face was moving in a first direction; e.g., the user's head turning to the left), updating the appearance of the first avatar feature (e.g., updating the angle of an avatar head (e.g., 2614)) of the virtual avatar (e.g., 2600) to a first appearance that is different from an appearance of the avatar when tracking of the face failed (e.g., from the appearance of avatar 2600 in state 2603B to the appearance in state 2603C). Updating an appearance of a first avatar feature to a first appearance that is different from an appearance of the avatar after tracking of the face failed provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the first facial feature had second change characteristics, different from the first change characteristics prior to detecting that tracking of the face failed (e.g., the face was moving in a second direction different than the first direction; e.g., user's head turning to the right), updating the appearance of the first avatar feature of the virtual avatar to a second appearance that is different from the appearance of the avatar when tracking of the face failed and different from the first appearance. Updating an appearance of a first avatar feature to a second appearance that is different from an appearance of the avatar after tracking of the face failed, and different from the first appearance, provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first change characteristics include a first changed direction of the first facial feature (e.g., the user's head turns to the left), updating the appearance of the first avatar feature (e.g., 2614) to the first appearance includes updating the appearance of the first avatar feature based on the first changed direction of the first facial feature (e.g., updating the angle of the avatar's head based on the leftward turn of the user's head; e.g., updating the avatar in a mirrored direction (e.g., when the user's head turns to the user's left, the avatar turns to the avatar's right)). Updating an appearance of a first avatar feature based on the first changed direction of the first facial feature gives visual feedback to the user that changes to the virtual avatar, when face tracking is lost, are based, at least in part, on the direction of movement of the first avatar feature previously detected in the field of view of the camera. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first change characteristics include a second changed direction of the first facial feature (e.g., 2604), different from the first changed direction (e.g., the user's head turns to the right), updating the appearance of the first avatar feature to the second appearance includes updating the appearance of the first avatar feature (e.g., 2614) based on the second changed direction of the first facial feature (e.g., updating the angle of the avatar's head based on the rightward turn of the user's head). Updating the appearance of the first avatar to the second appearance based on the second changed direction of the first facial feature gives visual feedback to the user that changes to the virtual avatar, when face tracking is lost, are based, at least in part, on the direction of movement of the first avatar feature previously detected in the field of view of the camera. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first change characteristics include a first magnitude of change of the first facial feature (e.g., 2604) (e.g., the user's head rotates 75 degrees; e.g., shifting the user's head to the left by 5 inches; increasing the diameter of the user's mouth by 20%), updating the appearance of the first avatar feature (e.g., 2614) to the first appearance includes updating the appearance of the first avatar feature based on the first magnitude of change of the first facial feature (e.g., updating the angle of the avatar's head based on the 75 degrees of rotation of the user's head; shifting the position of the avatar's head by 5 inches (scaled); increasing the diameter of the avatar's mouth by 20%). Updating an appearance of a first avatar feature based on the first magnitude of change of the first facial feature gives visual feedback to the user that changes to the virtual avatar, when face tracking is lost, are based, at least in part, on the magnitude of movement of the first avatar feature previously detected in the field of view of the camera. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first change characteristics include a second magnitude of change of the first facial feature (e.g., 2604) different from the first magnitude of change (e.g., the user's head rotates 90 degrees), updating the appearance of the first avatar feature (e.g., 2614) to the second appearance includes updating the appearance of the first avatar feature based on the second magnitude of change of the first facial feature (e.g., updating the angle of the avatar's head based on the 90 degrees of rotation of the user's head). Updating the appearance of the first avatar to the second appearance based on the second magnitude of change of the first facial feature gives visual feedback to the user that changes to the virtual avatar, when face tracking is lost, are based, at least in part, on the magnitude of movement of the first avatar feature previously detected in the field of view of the camera. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the method (2700) further comprises: after updating the appearance of the first avatar feature (e.g., 2614) after tracking of the face failed (e.g., after determining that the face is no longer within the field of view), the electronic device (e.g., 600) resumes tracking of the face while the face is in a first pose (e.g., a pose different than the pose of the face at the time detecting was lost) (e.g., a pose shown in state 2601F, 2601G). In response to resuming tracking of the face, the electronic device updates the appearance of the first avatar feature to a pose based on the first pose of the face (e.g., as shown in states 2603F and 2603G in FIG. 26B). Resuming tracking of the face while the face is in the first pose provides the user with feedback that their face is positioned within the field of view of the camera. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, updating the appearance of the first avatar feature (e.g., 2614) to a pose based on the first pose of the face includes gradually updating (e.g., 2603F, 2603G, 2603L, 2603M) the appearance of the first avatar feature to the pose based on the first pose of the face (e.g., the avatar's head gradually moves to a position that matches the detected position (e.g., 2601F, 2601G, 2601L, 2601M) of the user's head after the user's face is re-detected in the field of view of the one or more cameras). Gradually updating the appearance of the first avatar feature to the pose based on the first pose of the face provides the user with feedback that their face is positioned within the field of view of the camera. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the method (2700) further comprises: in response to resuming tracking of the face, performing the following steps. First, prior to updating the appearance of the first avatar feature (e.g., 2614) to the pose based on the first pose of the face, the electronic device (e.g., 600) disables a physics model associated with at least one of the first avatar feature, the second avatar feature (e.g., 2616), or a third avatar feature (e.g., an avatar's ears, 2618). Second, after updating the appearance of the first avatar feature to the pose based on the first pose of the face, the electronic device gradually resumes the disabled physics model (e.g., the physics model is enabled, but with damped movement to avoid a jerking motion from movement of the avatar feature after face tracking resumes). Third, the electronic device detects a change in the first pose of the face, and updates the appearance of the first avatar feature based on the detected change in the first pose of the face and the resumed physics model. Disabling the physics model associated with at least one of the first, second, or third avatar features, gradually resuming the disabled physics model after updating the appearance of the first avatar feature to the pose based on the first pose of the face, and updating the first avatar feature based on detected changes in the first pose of the face and the resumed physics model provide visual feedback to the user that, after face tracking failed, the device detected the user's face in the field of view of the camera and has resumed tracking the user's face and modifying the virtual avatar based on detected changes. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of detected facial features includes a second facial feature (e.g., 2606, a head, a mouth, part of a mouth, eyes, etc.) and the first change in pose includes a change to the second facial feature (e.g., a direction of change of a second facial feature or a second set of facial features). In some embodiments, the method (2700) further comprises one or more of the following steps.

In some embodiments, in response to determining that tracking of the face in the field of view of the one or more cameras (e.g., 602) has failed, the electronic device (e.g., 600) updates an appearance of a second avatar feature (e.g., 2616) of the plurality of avatar features after tracking of the face failed, wherein the appearance of the second avatar feature is updated based on change characteristics (e.g., an amplitude and/or direction of change) of the second facial feature (e.g., 2606) that were detected prior to (e.g., immediately prior to or during a time period just prior to) determining that tracking of the face has failed. In some embodiments, the update includes one or more of the embodiments below. Updating an appearance of a second avatar feature after tracking of the face failed, based on change characteristics of the second facial feature that were detected prior to determining that tracking of the face has failed, provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the second facial feature (e.g., 2606) had third change characteristics prior to detecting that tracking of the face failed (e.g., the second facial feature was moving in a third direction different than the first and/or second directions; e.g., user's mouth turning up into a smile), the electronic device (e.g., 600) updates the appearance of a second avatar feature (e.g., 2616) (e.g., updating a position of an avatar's mouth) of the virtual avatar (e.g., 2600) to a third appearance (e.g., 2603C) that is different from the appearance of the avatar when tracking of the face failed (e.g., 2603B). Updating an appearance of a second avatar feature to a third appearance that is different from the appearance of the avatar when tracking of the face failed provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the second facial feature (e.g., 2606) had fourth change characteristics prior to detecting that tracking of the face failed (e.g., the second facial feature was moving in a fourth direction different than the first, second, and/or third directions; e.g., user's mouth turning downward into a frown), updating the appearance of the second avatar feature of the virtual avatar to a fourth appearance that is different from the appearance of the avatar when tracking of the face failed and different from the third appearance. Updating the appearance of the second avatar feature to a fourth appearance that is different from the appearance of the avatar after tracking of the face failed, and different from the third appearance, provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the appearance of the first avatar feature (e.g., 2614) is updated at a first rate of change (e.g., based on a detected rate of change of the first facial feature (e.g., 2604) (e.g., before the face is no longer detected)), and the appearance of the second avatar feature (e.g., 2616) is updated at a second rate of change (e.g., based on a detected rate of change of the second facial feature (e.g., 2606) (e.g., before the face is no longer detected)), different than the first rate of change. Updating the appearance of the first avatar feature at a first rate of change, and updating the appearance of the second avatar feature at a second rate of change different than the first rate of change provides the user with more control over the device by allowing the user to continue the process for modifying a virtual avatar, even when face tracking has failed. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first avatar feature is an avatar head (e.g., 2614), and the second avatar feature is a facial feature (e.g., 2616) (e.g., an avatar mouth, eyes, etc.) of the virtual avatar (e.g., 2600). In some embodiments, the avatar head continues to move (e.g., rotating) at a rate that is faster than a rate at which the avatar's facial feature continues moving.

In some embodiments, updating the appearance of the first avatar feature (e.g., 2614) includes updating the appearance in accordance with a first physics model (e.g., a model of inertia, a model of gravity, a force transfer model, a friction model), and updating the appearance of the second avatar feature (e.g., 2616) includes updating the appearance in accordance with a second physics model, different than the first physics model (e.g., with a different degree of damping such as a different amount of friction). Updating the appearance of the first avatar feature in accordance with a first physics model, and updating the appearance of the second avatar feature in accordance with a second physics model different than the first physics model provides the user with feedback that changes in the user's facial features effects changes to the first and second avatar features in a different manner based on different physics models applied to the avatar features. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the appearance of the first avatar feature (e.g., 2614) (e.g., the avatar's head) is updated at a first decreasing rate of change (e.g., the update to the avatar's head is a decrease in movement of the avatar head based on the changed direction of the first facial feature of the user), and the appearance of the second avatar feature (e.g., 2616) (e.g., the avatar's mouth) is updated at a second decreasing rate of change, different than the first decreasing rate of change (e.g., the update to the avatar's mouth is a decrease in movement of the avatar's mouth based on the changed direction of the second facial feature of the user). Updating the appearance of the first avatar feature at a first decreasing rate of change, and updating the appearance of the second avatar feature at a second decreasing rate of change different than the first decreasing rate of change, provides the user with feedback that updates to the first and second avatar features are applied in a different manner when face tracking is lost. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first avatar feature is an avatar head (e.g., 2614), the second avatar feature is a facial feature (e.g., 2616) (e.g., an avatar mouth, eyes, etc.) of the virtual avatar (e.g., 2600), and the second decreasing rate of change decreases at a faster rate than a rate of decrease of the first decreasing rate of change (e.g., movement of the second avatar feature (e.g., opening or closing of the avatar's mouth, movement of the avatar's mouth into a smile or frown, raising or lowering of the avatar's eyebrows, or the like) decreases at greater rate than the decrease in movement of the first avatar feature (e.g., the avatar's head)).

In some embodiments, the appearance of the first avatar feature (e.g., 2614) is updated until a value associated with a range of motion of the first avatar feature (e.g., a range representative of a full range of motion associated with the first avatar feature) reaches a predetermined value (e.g., a value within the range of motion that is less than the maximum value of the range of motion). In some embodiments, a range of motion associated with the avatar head is a rotation of 90 degrees from a front-facing position of the avatar's head, and the predetermined value is 75 degrees from the front-facing position of the avatar's head. In some embodiments, the predetermined value is determined before the updated appearance of the first avatar feature reaches the predetermined value so that the rate at which the first avatar feature is updated can be gradually reduced to avoid an abrupt termination of the updating when the predetermined value is reached (e.g., thereby avoiding a jerking effect of the first avatar feature and other avatar features (e.g., those having a physics model that is affected by updates to the first avatar feature) caused by the sudden stop to the updating). Updating the appearance of the first avatar feature until a value associated with a range of motion of the first avatar feature reaches a predetermined value provides feedback to the user of the current state of the virtual avatar, even when the user's face is no longer being tracked. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the appearance of the second avatar feature (e.g., 2616) is updated until a value associated with a range of motion of the second avatar feature (e.g., a range representative of a full range of motion associated with the first avatar feature) reaches a predetermined value (e.g., a value within the range of motion that is less than the maximum value of the range of motion). In some embodiments, a range of motion associated with the avatar's mouth is a range from 0 to 100, and the predetermined value within the range for the avatar's mouth is 75. In some embodiments, the predetermined value is determined before the updated appearance of the second avatar feature reaches the predetermined value so that the rate at which the second avatar feature is updated can be gradually reduced to avoid an abrupt termination of the updating when the predetermined value is reached (e.g., thereby avoiding a jerking effect of the second avatar feature and other avatar features (e.g., those having a physics model that is affected by updates to the second avatar feature) caused by the sudden stop to the updating). Updating the appearance of the second avatar feature until a value associated with a range of motion of the second avatar feature reaches a predetermined value provides feedback to the user of the current state of the virtual avatar, even when the user's face is no longer being tracked. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the appearance of the first avatar feature (e.g., 2614) is updated based on a scaled value of the first decreasing rate of change (e.g., the displayed change to the first avatar feature after the face is no longer detected is determined based on a scaled value of the vector of the first facial feature at the time face tracking was lost (or just prior to losing face tracking)). In some embodiments, the scaled value is determined before the updated appearance of the first avatar feature reaches the scaled value so that the rate at which the first avatar feature is updated can be gradually reduced to avoid an abrupt termination of the updating when the scaled value is reached (e.g., thereby avoiding a jerking effect of the first avatar feature and other avatar features (e.g., those having a physics model that is affected by updates to the first avatar feature) caused by the sudden stop to the updating). Updating the appearance of the first avatar feature based on a scaled value of the first decreasing rate of change provides feedback to the user of the current state of the virtual avatar, even when the user's face is no longer being tracked. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the appearance of the second avatar feature (e.g., 2616) is updated based on a scaled value of the second decreasing rate of change (e.g., the displayed change to the second avatar feature after the face is no longer detected is determined based on a scaled value of the vector of the second facial feature at the time face tracking was lost (or just prior to losing face tracking)). In some embodiments, the scaled value is determined before the updated appearance of the second avatar feature reaches the scaled value so that the rate at which the second avatar feature is updated can be gradually reduced to avoid an abrupt termination of the updating when the scaled value is reached (e.g., thereby avoiding a jerking effect of the second avatar feature and other avatar features (e.g., those having a physics model that is affected by updates to the second avatar feature) caused by the sudden stop to the updating). Updating the appearance of the second avatar feature based on a scaled value of the second decreasing rate of change provides feedback to the user of the current state of the virtual avatar, even when the user's face is no longer being tracked. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the appearance of the second avatar feature (e.g., 2616) is updated until the second avatar feature reaches a predetermined position (e.g., the predetermined position is determined as a preset value that acts as a limit on the magnitude of the change to the second avatar feature). In some embodiments, the predetermined position is determined before the updated appearance of the second avatar feature reaches the predetermined position so that the rate at which the second avatar feature is updated can be gradually reduced to avoid an abrupt termination of the updating when the predetermined position is reached (e.g., thereby avoiding a jerking effect of the second avatar feature and other avatar features (e.g., those having a physics model that is affected by updates to the second avatar feature) caused by the sudden stop to the updating). Updating the appearance of the second avatar feature until it reaches a predetermined position provides feedback to the user of the current state of the virtual avatar, even when the user's face is no longer being tracked. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to determining that the face (e.g., 2604, 2606) has not been detected within the field of view of the one or more cameras (e.g., 602) for a threshold amount of time (e.g., 1.5 seconds), the electronic device (e.g., 600) updates the appearance of the first avatar feature (e.g., 2614) to a first default pose (e.g., 2603J) (e.g., a front-facing position with no rotation or translation of the first avatar feature (e.g., an avatar head) within the displayed region showing the virtual avatar). In some embodiments, this update is a smooth animation of the first avatar feature moving to the default pose (e.g., 2603I). In some embodiments, the default pose is determined (e.g., predetermined) independent of the change characteristics of the first facial feature when face tracking failed. Updating the appearance of the first avatar feature to a first default pose provides feedback to the user that the user's face has not been detected in the field of view of the cameras for a period of time and that the device is no longer modifying the virtual avatar. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to determining that the face (e.g., 2604, 2606) has not been detected within the field of view of the one or more cameras (e.g., 602) for a threshold amount of time (e.g., 1.5 seconds), the electronic device (e.g., 600) updates the appearance of the second avatar feature (e.g., 2616) to a second default pose (e.g., 2603J) (e.g., a position of the second avatar feature (e.g., an avatar mouth) associated with a neutral pose of the second avatar feature). In some embodiments, this update is a smooth animation of the second avatar feature moving to the default pose (e.g., 2603I). In some embodiments, the default pose is determined independent of the change characteristics of the second facial feature when face tracking failed. Updating the appearance of the second avatar feature to a second default pose provides feedback to the user that the user's face has not been detected in the field of view of the cameras for a period of time and that the device is no longer modifying the virtual avatar. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the threshold amount of time is achieved after the appearance of the first avatar feature (e.g., 2614) is updated (e.g., 2603D) and after the appearance of the second avatar feature (e.g., 2616) is updated (e.g., 2603D) (e.g., the first and second avatar features move to their respective default poses after being updated based on the changes to the first and second facial features that were detected when the face was detected in the field of view of the one or more cameras).

In some embodiments, the method (2700) further includes one or more of the following steps.

In some embodiments, prior to determining that tracking of the face in the field of view of the one or more cameras (e.g., 602) has failed, the device (e.g., 600) detects the face within the field of view of the one or more cameras with a second change in pose (e.g., a change in pose occurring before the first change in pose), the second change in pose including a second change to the plurality of detected facial features (e.g., 2604, 2606) (e.g., a direction of change of a facial feature or a set of facial features while the face is still detected in the field of view of the one or more cameras).

In some embodiments, in response to detecting the face in the field of view of the one or more cameras with the second change in pose, the method (2700) further includes one or more of the following embodiments.

In some embodiments, in accordance with a determination that the plurality of detected facial features had fifth change characteristics while tracking the face (e.g., user's head tilting up, user's eyes looks to the side, and user's mouth opening), the device (e.g., 600) updates the appearance of the first avatar feature (e.g., 2614, 2616) (e.g., updating the angle of the avatar head, the position of the avatar's eyes, and the position of the avatar's mouth) of the virtual avatar (e.g., 2600) to a fifth appearance that is based on the fifth change characteristics (e.g., continuing to update/move the virtual avatar, while detecting the face in the field of view of the camera). Updating the appearance of the first avatar feature to a fifth appearance that is based on the fifth change characteristics detected prior to face tracking failing provides the user with more control over the device by allowing the user to provide input for controlling a virtual avatar without having to display an interface for receiving the user input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the plurality of detected facial features had sixth change characteristics while tracking the face (e.g., a user's head tilting in a different direction, user's eyes looking in a different direction, and user's mouth moving in a different direction; e.g., user's head tilting down, user's eyes looking forward, and user's mouth closing), the device (e.g., 600) updates the appearance of the first avatar feature (e.g., 2614, 2616) of the virtual avatar (e.g., 2600) to a sixth appearance that is based on the sixth change characteristics and different from the fifth appearance. In some embodiments, the updates to the avatar are based on detected changes to multiple features of the user's face occurring simultaneously. In some embodiments, while a face continues to be detected, the updates to the virtual avatar occur within a time period (e.g., a reaction time period, a reaction delay time period) from when the change in pose of the face is detected to when the virtual avatar is updated that is shorter than the time period between the detected first change in pose of the face and the update to the avatar feature that occurs after the face is no longer detected. That is, the updating of the virtual avatar after the face is no longer detected is offset, in time, by a greater period from the change in pose that the update is based on, than compared to updates occurring while the face is still detected. Updating the appearance of the first avatar feature to a sixth appearance that is based on the sixth change characteristics detected prior to face tracking failing, and different from the fifth appearance, provides the user with more control over the device by allowing the user to provide input for controlling a virtual avatar without having to display an interface for receiving the user input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2700 (e.g., FIG. 27) are also applicable in an analogous manner to the methods described above. For example, method 800 optionally includes one or more of the characteristics of the various methods described above with reference to method 2700. For example, when displaying a preview of the virtual avatar being modified in response to detected changes in a face, the device may continue to modify the virtual avatar in accordance with the steps provided in method 2700, if face tracking is lost during the virtual avatar modifications discussed in method 800. As another example, method 900 optionally includes one or more of the characteristics of the various methods described above with reference to method 2700. For example, when displaying a preview of the virtual avatar being modified in response to detected changes in a face, the device may continue to modify the virtual avatar in accordance with the steps provided in method 2700, if face tracking is lost during the virtual avatar modifications discussed in method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources for sharing with other users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better communicate represent a user in a conversation. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sending an avatar, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
at an electronic device having one or more cameras and a display apparatus:
  displaying, via the display apparatus, a virtual avatar, wherein the virtual avatar includes:
    a first avatar feature reactive to changes in a first physical feature of a face within a field of view of the one or more cameras;
    a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature;
  while displaying the virtual avatar, detecting a first change in a respective physical feature of the face within the field of view of the one or more cameras; and
  in response to detecting the first change in the respective physical feature, modifying the virtual avatar, including:
    in accordance with a determination that the virtual avatar is based on a first virtual avatar template:
      in accordance with a determination that the detected first change in the respective physical feature is a change in the first physical feature, modifying the first avatar feature to reflect the change in the first physical feature;
      in accordance with a determination that the detected first change is a change in the second physical feature and the change in the second physical feature is within the first range of changes, changing the appearance of the second avatar feature in a first manner to reflect the change in the second physical feature; and
      in accordance with a determination that the detected first change is a change in the second physical feature and the change in the second physical feature is within the second range of changes, forgoing changing the appearance of the second avatar feature in the first manner to reflect the change in the second physical feature; and in accordance with a determination that the virtual avatar is based on a second virtual avatar template that is different from the first virtual avatar template:

in accordance with a determination that the detected first change in the respective physical feature is a change in the first physical feature, modifying the first avatar feature to reflect the change in the first physical feature; and in accordance with a determination that the detected first change in the respective physical feature is a change in the second physical feature, modifying the second avatar feature to reflect the first change in the second physical feature, wherein the appearance of the second avatar feature is changed in a same manner without regard to whether the change in the second physical feature is within the first range of changes or within the second range of changes.

2. The method of claim 1, wherein:

the first range of changes of the second physical feature and the second range of changes of the second physical feature are adjacent ranges in a potential range of changes of the second physical feature, the first change in the respective physical feature includes a change in the second physical feature that includes a transition from a first portion of change within the first range of changes to a second portion of change within the second range of changes, and an appearance of the second avatar feature as it is reflecting the change in the second physical feature at an end of the first portion of the change is substantially similar to an appearance of the second avatar feature as it is reflecting the change in the second physical feature at a beginning of the second portion of change.

3. The method of claim 1, further comprising:

in accordance with a determination that the detected first change is a change in the second physical feature and the change in the second physical feature is a change from the first range of changes to the second range of changes, modifying the second avatar feature based on a predetermined configuration of the second avatar feature.

4. The method of claim 1, wherein:

the first range of changes of the second physical feature and the second range of changes of the second physical feature are adjacent ranges in a possible range of changes of the second physical feature, the first change in the respective physical feature includes a change in the second physical feature that includes a transition from a first portion of change within the second range of changes to a second portion of change within the first range of changes, and an appearance of the second avatar feature changes from a configuration of the second avatar feature that is based on a magnitude of a change in the second physical feature to a predetermined configuration of the second avatar feature when the change in the second physical feature transitions from the first portion of the change within the second range of changes to the second portion of the change within the first range of changes.

5. The method of claim 1, further comprising:

further in response to detecting the first change in the respective physical feature:

in accordance with a determination that the virtual avatar is based on the first virtual avatar template:

in accordance with the determination that the detected first change is a change in the second physical feature and the change in the second physical feature is within the second range of changes, changing the appearance of the second avatar feature in a second manner to reflect the change in the second physical feature.

6. The method of claim 5, wherein the first manner of changing the appearance of the second avatar feature is different from the second manner of changing the appearance of the second avatar feature.

7. The method of claim 5, further comprising:

further in response to detecting the first change in the respective physical feature:

in accordance with a determination that the virtual avatar is based on the first virtual avatar template:

in accordance with the determination that the detected first change is a change in the second physical feature and the change in the second physical feature is within the first range of changes, forgoing changing the appearance of the second avatar feature in the second manner to reflect the change in the second physical feature.

8. The method of claim 5, wherein:

the second physical feature includes a user's eyelid;

the second avatar feature includes an avatar eye;

changing the appearance of the second avatar feature in the second manner based on the change in the second physical feature being within the second range of changes includes decreasing a size of the avatar eye; and changing the appearance of the second avatar feature in the first manner based on the change in the second physical feature being within the first range of changes does not include decreasing the size of the avatar eye.

9. The method of claim 5, wherein:

modifying the first avatar feature of the virtual avatar to reflect the change in the first physical feature includes modifying the first avatar feature based on a magnitude of the change in the first physical feature;

changing the appearance of the second avatar feature in the first manner to reflect the change in the second physical feature includes modifying the second avatar feature based on a first magnitude of the change in the second physical feature; and changing the appearance of the second avatar feature in the second manner to reflect the change in the second physical feature includes modifying the second avatar feature based on a second magnitude of the change in the second physical feature.

10. The method of claim 5, wherein:

modifying the first avatar feature of the virtual avatar to reflect the change in the first physical feature includes modifying a pose of at least a portion of the first avatar feature based on a direction of a change in pose of the first physical feature;

changing the appearance of the second avatar feature in the first manner to reflect the change in the second physical feature includes modifying a pose of at least a portion of the second avatar feature based on a direction of a change in pose of the second physical feature; and changing the appearance of the second avatar feature in the second manner to reflect the change in the second physical feature includes modifying the pose of at least a portion of the second avatar feature based on the direction of the change in pose of the second physical feature.

11. An electronic device, comprising:

one or more cameras;

a display apparatus;

one or more processors; and memory storing one or more programs configured to be executed by the one or more processors, the one or more programs including instructions for:

displaying, via the display apparatus, a virtual avatar, wherein the virtual avatar includes:

a first avatar feature reactive to changes in a first physical feature of a face within a field of view of the one or more cameras;

a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature;

while displaying the virtual avatar, detecting a first change in a respective physical feature of the face within the field of view of the one or more cameras; and in response to detecting the first change in the respective physical feature, modifying the virtual avatar, including:

in accordance with a determination that the virtual avatar is based on a first virtual avatar template:

in accordance with a determination that the detected first change in the respective physical feature is a change in the first physical feature, modifying the first avatar feature to reflect the change in the first physical feature;

in accordance with a determination that the detected first change is a change in the second physical feature and the change in the second physical feature is within the first range of changes, changing the appearance of the second avatar feature in a first manner to reflect the change in the second physical feature; and in accordance with a determination that the detected first change is a change in the second physical feature and the change in the second physical feature is within the second range of changes, forgoing changing the appearance of the second avatar feature in the first manner to reflect the change in the second physical feature; and in accordance with a determination that the virtual avatar is based on a second virtual avatar template that is different from the first virtual avatar template:

in accordance with a determination that the detected first change in the respective physical feature is a change in the first physical feature, modifying the first avatar feature to reflect the change in the first physical feature; and in accordance with a determination that the detected first change in the respective physical feature is a change in the second physical feature, modifying the second avatar feature to reflect the first change in the second physical feature, wherein the appearance of the second avatar feature is changed in a same manner without regard to whether the change in the second physical feature is within the first range of changes or within the second range of changes.

12. The electronic device of claim 11, wherein:

the first range of changes of the second physical feature and the second range of changes of the second physical feature are adjacent ranges in a potential range of changes of the second physical feature, the first change in the respective physical feature includes a change in the second physical feature that includes a transition from a first portion of change within the first range of changes to a second portion of change within the second range of changes, and an appearance of the second avatar feature as it is reflecting the change in the second physical feature at an end of the first portion of the change is substantially similar to an appearance of the second avatar feature as it is reflecting the change in the second physical feature at a beginning of the second portion of change.

13. The electronic device of claim 11, the one or more programs further including instructions for:

in accordance with a determination that the detected first change is a change in the second physical feature and the change in the second physical feature is a change from the first range of changes to the second range of changes, modifying the second avatar feature based on a predetermined configuration of the second avatar feature.

14. The electronic device of claim 11, wherein:

the first range of changes of the second physical feature and the second range of changes of the second physical feature are adjacent ranges in a possible range of changes of the second physical feature, the first change in the respective physical feature includes a change in the second physical feature that includes a transition from a first portion of change within the second range of changes to a second portion of change within the first range of changes, and an appearance of the second avatar feature changes from a configuration of the second avatar feature that is based on a magnitude of a change in the second physical feature to a predetermined configuration of the second avatar feature when the change in the second physical feature transitions from the first portion of the change within the second range of changes to the second portion of the change within the first range of changes.

15. The electronic device of claim 11, the one or more programs further including instructions for:

further in response to detecting the first change in the respective physical feature:

in accordance with a determination that the virtual avatar is based on the first virtual avatar template:

in accordance with the determination that the detected first change is a change in the second physical feature and the change in the second physical feature is within the second range of changes, changing the appearance of the second avatar feature in a second manner to reflect the change in the second physical feature.

16. The electronic device of claim 15, wherein the first manner of changing the appearance of the second avatar feature is different from the second manner of changing the appearance of the second avatar feature.

17. The electronic device of claim 15, wherein:
- modifying the first avatar feature of the virtual avatar to reflect the change in the first physical feature includes modifying the first avatar feature based on a magnitude of the change in the first physical feature;
- changing the appearance of the second avatar feature in the first manner to reflect the change in the second physical feature includes modifying the second avatar feature based on a first magnitude of the change in the second physical feature; and
- changing the appearance of the second avatar feature in the second manner to reflect the change in the second physical feature includes modifying the second avatar feature based on a second magnitude of the change in the second physical feature.

18. The electronic device of claim 15, wherein:
- modifying the first avatar feature of the virtual avatar to reflect the change in the first physical feature includes modifying a pose of at least a portion of the first avatar feature based on a direction of a change in pose of the first physical feature;
- changing the appearance of the second avatar feature in the first manner to reflect the change in the second physical feature includes modifying a pose of at least a portion of the second avatar feature based on a direction of a change in pose of the second physical feature; and
- changing the appearance of the second avatar feature in the second manner to reflect the change in the second physical feature includes modifying the pose of at least a portion of the second avatar feature based on the direction of the change in pose of the second physical feature.

19. The electronic device of claim 15, the one or more programs further including instructions for:
- further in response to detecting the first change in the respective physical feature:
  - in accordance with a determination that the virtual avatar is based on the first virtual avatar template:
    - in accordance with the determination that the detected first change is a change in the second physical feature and the change in the second physical feature is within the first range of changes, forgoing changing the appearance of the second avatar feature in the second manner to reflect the change in the second physical feature.

20. The electronic device of claim 19, wherein:
- the second physical feature includes a user's eyelid;
- the second avatar feature includes an avatar eye;
- changing the appearance of the second avatar feature in the second manner based on the change in the second physical feature being within the second range of changes includes decreasing a size of the avatar eye; and
- changing the appearance of the second avatar feature in the first manner based on the change in the second physical feature being within the first range of changes does not include decreasing the size of the avatar eye.

21. A non-transitory computer-readable storage medium storing one or more programs configured to be executed by one or more processors of an electronic device with one or more cameras and a display apparatus, the one or more programs including instructions for:
- displaying, via the display apparatus, a virtual avatar, wherein the virtual avatar includes:
  - a first avatar feature reactive to changes in a first physical feature of a face within a field of view of the one or more cameras;
  - a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature;
- while displaying the virtual avatar, detecting a first change in a respective physical feature of the face within the field of view of the one or more cameras; and
- in response to detecting the first change in the respective physical feature, modifying the virtual avatar, including:
  - in accordance with a determination that the virtual avatar is based on a first virtual avatar template:
    - in accordance with a determination that the detected first change in the respective physical feature is a change in the first physical feature, modifying the first avatar feature to reflect the change in the first physical feature;
    - in accordance with a determination that the detected first change is a change in the second physical feature and the change in the second physical feature is within the first range of changes, changing the appearance of the second avatar feature in a first manner to reflect the change in the second physical feature; and
    - in accordance with a determination that the detected first change is a change in the second physical feature and the change in the second physical feature is within the second range of changes, forgoing changing the appearance of the second avatar feature in the first manner to reflect the change in the second physical feature; and
  - in accordance with a determination that the virtual avatar is based on a second virtual avatar template that is different from the first virtual avatar template:
    - in accordance with a determination that the detected first change in the respective physical feature is a change in the first physical feature, modifying the first avatar feature to reflect the change in the first physical feature; and
    - in accordance with a determination that the detected first change in the respective physical feature is a change in the second physical feature, modifying the second avatar feature to reflect the first change in the second physical feature, wherein the appearance of the second avatar feature is changed in a same manner without regard to whether the change in the second physical feature is within the first range of changes or within the second range of changes.

22. The non-transitory computer-readable storage medium of claim 21, wherein:
- the first range of changes of the second physical feature and the second range of changes of the second physical feature are adjacent ranges in a potential range of changes of the second physical feature,
- the first change in the respective physical feature includes a change in the second physical feature that includes a transition from a first portion of change within the first range of changes to a second portion of change within the second range of changes, and an appearance of the second avatar feature as it is reflecting the change in the second physical feature at an end of the first portion of the change is substantially similar to an appearance of the second avatar feature as it is reflecting the change in the second physical feature at a beginning of the second portion of change.

23. The non-transitory computer-readable storage medium of claim 21, the one or more programs further including instructions for:

in accordance with a determination that the detected first change is a change in the second physical feature and the change in the second physical feature is a change from the first range of changes to the second range of changes, modifying the second avatar feature based on a predetermined configuration of the second avatar feature.

24. The non-transitory computer-readable storage medium of claim 21, wherein:

the first range of changes of the second physical feature and the second range of changes of the second physical feature are adjacent ranges in a possible range of changes of the second physical feature, the first change in the respective physical feature includes a change in the second physical feature that includes a transition from a first portion of change within the second range of changes to a second portion of change within the first range of changes, and an appearance of the second avatar feature changes from a configuration of the second avatar feature that is based on a magnitude of a change in the second physical feature to a predetermined configuration of the second avatar feature when the change in the second physical feature transitions from the first portion of the change within the second range of changes to the second portion of the change within the first range of changes.

25. The non-transitory computer-readable storage medium of claim 21, the one or more programs further including instructions for:

further in response to detecting the first change in the respective physical feature:

in accordance with a determination that the virtual avatar is based on the first virtual avatar template:

in accordance with the determination that the detected first change is a change in the second physical feature and the change in the second physical feature is within the second range of changes, changing the appearance of the second avatar feature in a second manner to reflect the change in the second physical feature.

26. The non-transitory computer-readable storage medium of claim 25, wherein the first manner of changing the appearance of the second avatar feature is different from the second manner of changing the appearance of the second avatar feature.

27. The non-transitory computer-readable storage medium of claim 25, wherein:

modifying the first avatar feature of the virtual avatar to reflect the change in the first physical feature includes modifying the first avatar feature based on a magnitude of the change in the first physical feature;

changing the appearance of the second avatar feature in the first manner to reflect the change in the second physical feature includes modifying the second avatar feature based on a first magnitude of the change in the second physical feature; and changing the appearance of the second avatar feature in the second manner to reflect the change in the second physical feature includes modifying the second avatar feature based on a second magnitude of the change in the second physical feature.

28. The non-transitory computer-readable storage medium of claim 25, wherein:

modifying the first avatar feature of the virtual avatar to reflect the change in the first physical feature includes modifying a pose of at least a portion of the first avatar feature based on a direction of a change in pose of the first physical feature;

changing the appearance of the second avatar feature in the first manner to reflect the change in the second physical feature includes modifying a pose of at least a portion of the second avatar feature based on a direction of a change in pose of the second physical feature; and changing the appearance of the second avatar feature in the second manner to reflect the change in the second physical feature includes modifying the pose of at least a portion of the second avatar feature based on the direction of the change in pose of the second physical feature.

29. The non-transitory computer-readable storage medium of claim 25, the one or more programs further including instructions for:

further in response to detecting the first change in the respective physical feature:

in accordance with a determination that the virtual avatar is based on the first virtual avatar template:

in accordance with the determination that the detected first change is a change in the second physical feature and the change in the second physical feature is within the first range of changes, forgoing changing the appearance of the second avatar feature in the second manner to reflect the change in the second physical feature.

30. The non-transitory computer-readable storage medium of claim 29, wherein:

the second physical feature includes a user's eyelid;

the second avatar feature includes an avatar eye;

changing the appearance of the second avatar feature in the second manner based on the change in the second physical feature being within the second range of changes includes decreasing a size of the avatar eye; and changing the appearance of the second avatar feature in the first manner based on the change in the second physical feature being within the first range of changes does not include decreasing the size of the avatar eye.

31. A method, comprising:

at an electronic device having one or more cameras and a display apparatus:

displaying, via the display apparatus, a virtual avatar, wherein the virtual avatar includes:

a first avatar feature reactive to changes in a first physical feature of a face within a field of view of the one or more cameras;

a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature, wherein the second physical feature of the face includes a user's cheek and the second avatar feature includes an avatar cheek;

while displaying the virtual avatar, detecting a first change in a respective physical feature of the face within the field of view of the one or more cameras; and in response to detecting the first change in the respective physical feature, modifying the virtual avatar, including:

in accordance with a determination that the detected first change in the respective physical feature is a change in the first physical feature, modifying the first avatar feature to reflect the change in the first physical feature;

in accordance with a determination that the detected first change is a change in the second physical feature and the change in the second physical feature is within the first range of changes, changing the appearance of the second avatar feature in a first manner to reflect the change in the second physical feature; and in accordance with a determination that the detected first change is a change in the second physical feature and the change in the second physical feature is within the second range of changes, forgoing changing the appearance of the second avatar feature in the first manner to reflect the change in the second physical feature and changing the appearance of the second avatar feature in a second manner to reflect the change in the second physical feature;

wherein changing the appearance of the second avatar feature in the second manner based on the change in the second physical feature being within the second range of changes includes introducing an exaggerated avatar effect at the avatar cheek, and changing the appearance of the second avatar feature in the first manner based on the change in the second physical feature being within the first range of changes includes modifying the avatar cheek based on a magnitude of change in the user's cheek.

32. An electronic device, comprising:

one or more cameras;

a display apparatus;

one or more processors; and memory storing one or more programs configured to be executed by the one or more processors, the one or more programs including instructions for:

displaying, via the display apparatus, a virtual avatar, wherein the virtual avatar includes:

a first avatar feature reactive to changes in a first physical feature of a face within a field of view of the one or more cameras;

a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature, wherein the second physical feature of the face includes a user's cheek and the second avatar feature includes an avatar cheek;

while displaying the virtual avatar, detecting a first change in a respective physical feature of the face within the field of view of the one or more cameras; and in response to detecting the first change in the respective physical feature, modifying the virtual avatar, including:

in accordance with a determination that the detected first change in the respective physical feature is a change in the first physical feature, modifying the first avatar feature to reflect the change in the first physical feature;

in accordance with a determination that the detected first change is a change in the second physical feature and the change in the second physical feature is within the first range of changes, changing the appearance of the second avatar feature in a first manner to reflect the change in the second physical feature; and in accordance with a determination that the detected first change is a change in the second physical feature and the change in the second physical feature is within the second range of changes, forgoing changing the appearance of the second avatar feature in the first manner to reflect the change in the second physical feature and changing the appearance of the second avatar feature in a second manner to reflect the change in the second physical feature;

wherein changing the appearance of the second avatar feature in the second manner based on the change in the second physical feature being within the second range of changes includes introducing an exaggerated avatar effect at the avatar cheek, and changing the appearance of the second avatar feature in the first manner based on the change in the second physical feature being within the first range of changes includes modifying the avatar cheek based on a magnitude of change in the user's cheek.

33. A non-transitory computer-readable storage medium storing one or more programs configured to be executed by one or more processors of an electronic device with one or more cameras and a display apparatus, the one or more programs including instructions for:

displaying, via the display apparatus, a virtual avatar, wherein the virtual avatar includes:

a first avatar feature reactive to changes in a first physical feature of a face within a field of view of the one or more cameras;

a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature, wherein the second physical feature of the face includes a user's cheek and the second avatar feature includes an avatar cheek;

while displaying the virtual avatar, detecting a first change in a respective physical feature of the face within the field of view of the one or more cameras; and in response to detecting the first change in the respective physical feature, modifying the virtual avatar, including:

in accordance with a determination that the detected first change in the respective physical feature is a change in the first physical feature, modifying the first avatar feature to reflect the change in the first physical feature;

in accordance with a determination that the detected first change is a change in the second physical feature and the change in the second physical feature is within the first range of changes, changing the appearance of the second avatar feature in a first manner to reflect the change in the second physical feature; and in accordance with a determination that the detected first change is a change in the second physical feature and the change in the second physical feature is within the second range of changes, forgoing changing the appearance of the second avatar feature in the first manner to reflect the change in the second physical feature and changing the appearance of the second avatar feature in a second manner to reflect the change in the second physical feature;

wherein changing the appearance of the second avatar feature in the second manner based on the change in the second physical feature being within the second range of changes includes introducing an exaggerated avatar effect at the avatar cheek, and changing the appearance of the second avatar feature in the first manner based on the change in the second physical feature being within the first range of changes includes modifying the avatar cheek based on a magnitude of change in the user's cheek.

34. A method, comprising:

at an electronic device having one or more cameras and a display apparatus:

displaying, via the display apparatus, a virtual avatar, wherein the virtual avatar includes:

a first avatar feature reactive to changes in a first physical feature of a face within a field of view of the one or more cameras;

a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature, wherein the second physical feature of the face includes a user's eyebrow and the second avatar feature includes an upper portion of the avatar's head;

while displaying the virtual avatar, detecting a first change in a respective physical feature of the face within the field of view of the one or more cameras; and in response to detecting the first change in the respective physical feature, modifying the virtual avatar, including:

in accordance with a determination that the detected first change in the respective physical feature is a change in the first physical feature, modifying the first avatar feature to reflect the change in the first physical feature;

in accordance with a determination that the detected first change is a change in the second physical feature and the change in the second physical feature is within the first range of changes, changing the appearance of the second avatar feature in a first manner to reflect the change in the second physical feature; and in accordance with a determination that the detected first change is a change in the second physical feature and the change in the second physical feature is within the second range of changes, forgoing changing the appearance of the second avatar feature in the first manner to reflect the change in the second physical feature and changing the appearance of the second avatar feature in a second manner to reflect the change in the second physical feature;

wherein changing the appearance of the second avatar feature in the second manner based on the change in the second physical feature being within the second range of changes includes introducing an exaggerated avatar effect at the upper portion of the avatar's head, and changing the appearance of the second avatar feature in the first manner based on the change in the second physical feature being within the first range of changes does not include introducing the exaggerated avatar effect at the upper portion of the avatar's head.

35. An electronic device, comprising:

one or more cameras;

a display apparatus;

one or more processors; and memory storing one or more programs configured to be executed by the one or more processors, the one or more programs including instructions for:

displaying, via the display apparatus, a virtual avatar, wherein the virtual avatar includes:

a first avatar feature reactive to changes in a first physical feature of a face within a field of view of the one or more cameras;

a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature, wherein the second physical feature of the face includes a user's eyebrow and the second avatar feature includes an upper portion of the avatar's head;

while displaying the virtual avatar, detecting a first change in a respective physical feature of the face within the field of view of the one or more cameras; and in response to detecting the first change in the respective physical feature, modifying the virtual avatar, including:

in accordance with a determination that the detected first change in the respective physical feature is a change in the first physical feature, modifying the first avatar feature to reflect the change in the first physical feature;

in accordance with a determination that the detected first change is a change in the second physical feature and the change in the second physical feature is within the first range of changes, changing the appearance of the second avatar feature in a first manner to reflect the change in the second physical feature; and in accordance with a determination that the detected first change is a change in the second physical feature and the change in the second physical feature is within the second range of changes, forgoing changing the appearance of the second avatar feature in the first manner to reflect the change in the second physical feature and changing the appearance of the second avatar feature in a second manner to reflect the change in the second physical feature;

wherein changing the appearance of the second avatar feature in the second manner based on the change in the second physical feature being within the second range of changes includes introducing an exaggerated avatar effect at the upper portion of the avatar's head, and changing the appearance of the second avatar feature in the first manner based on the change in the second physical feature being within the first range of changes does not include introducing the exaggerated avatar effect at the upper portion of the avatar's head.

36. A non-transitory computer-readable storage medium storing one or more programs configured to be executed by one or more processors of an electronic device with one or more cameras and a display apparatus, the one or more programs including instructions for:

displaying, via the display apparatus, a virtual avatar, wherein the virtual avatar includes:

a first avatar feature reactive to changes in a first physical feature of a face within a field of view of the one or more cameras;

a second avatar feature that is reactive in different manners to changes in a second physical feature of the face dependent on whether the changes in the second physical feature of the face occur in a first range of changes of the second physical feature or in a second range of changes of the second physical feature, different from the first range of changes of the second physical feature, wherein the second physical feature of the face includes a user's eyebrow and the second avatar feature includes an upper portion of the avatar's head;

while displaying the virtual avatar, detecting a first change in a respective physical feature of the face within the field of view of the one or more cameras; and in response to detecting the first change in the respective physical feature, modifying the virtual avatar, including:

in accordance with a determination that the detected first change in the respective physical feature is a change in the first physical feature, modifying the first avatar feature to reflect the change in the first physical feature;

in accordance with a determination that the detected first change is a change in the second physical feature and the change in the second physical feature is within the first range of changes, changing the appearance of the second avatar feature in a first manner to reflect the change in the second physical feature; and in accordance with a determination that the detected first change is a change in the second physical feature and the change in the second physical feature is within the second range of changes, forgoing changing the appearance of the second avatar feature in the first manner to reflect the change in the second physical feature and changing the appearance of the second avatar feature in a second manner to reflect the change in the second physical feature;

wherein changing the appearance of the second avatar feature in the second manner based on the change in the second physical feature being within the second range of changes includes introducing an exaggerated avatar effect at the upper portion of the avatar's head, and changing the appearance of the second avatar feature in the first manner based on the change in the second physical feature being within the first range of changes does not include introducing the exaggerated avatar effect at the upper portion of the avatar's head.

* * * * *